US011627639B2

(12) United States Patent
Verzun et al.

(10) Patent No.: US 11,627,639 B2
(45) Date of Patent: Apr. 11, 2023

(54) METHODS AND APPARATUS FOR HYPERSECURE LAST MILE COMMUNICATION

(71) Applicants: Ievgen Verzun, Kiev (UA); Oleksandr Holub, Kiev (UA); Richard K. Williams, Cupertino, CA (US)

(72) Inventors: Ievgen Verzun, Kiev (UA); Oleksandr Holub, Kiev (UA); Richard K. Williams, Cupertino, CA (US)

( * ) Notice: Subject to any disclaimer, the term of this patent is extended or adjusted under 35 U.S.C. 154(b) by 0 days.

(21) Appl. No.: 15/943,418

(22) Filed: Apr. 2, 2018

(65) Prior Publication Data

US 2018/0359811 A1 Dec. 13, 2018

Related U.S. Application Data

(63) Continuation-in-part of application No. 14/803,869, filed on Jul. 20, 2015, now Pat. No. 9,998,434.

(Continued)

(51) Int. Cl.

*H04W 88/16* (2009.01)
*H04L 29/06* (2006.01)
*H04W 4/06* (2009.01)
*H04W 28/12* (2009.01)
*H04L 12/28* (2006.01)

(Continued)

(52) U.S. Cl.

CPC ............ *H04W 88/16* (2013.01); *H04L 12/28* (2013.01); *H04L 63/0428* (2013.01); *H04L 63/18* (2013.01); *H04L 63/30* (2013.01); *H04L 65/102* (2013.01); *H04L 65/1069* (2013.01); *H04W 4/06* (2013.01); *H04W 12/001* (2019.01);

(Continued)

(58) Field of Classification Search

CPC ..... G06F 21/606; G06Q 30/04; H04W 12/02; H04W 28/12; H04W 4/06; H04W 84/12; H04W 88/06; H04W 88/16; H04W 12/001; H04L 63/0464; H04L 63/102; H04L 9/0662; H04L 9/34; H04L 12/28; H04L 63/0428; H04L 63/18; H04L 63/30; H04L 65/102; H04L 65/1069

See application file for complete search history.

(56) References Cited

U.S. PATENT DOCUMENTS

| | | | | |
|---|---|---|---|---|
| 9,154,327 B1 * | 10/2015 | Marino | .................. | G06Q 30/04 |
| 2014/0201256 A1 * | 7/2014 | Pinheiro | ........... | H04M 1/72533 709/201 |

(Continued)

FOREIGN PATENT DOCUMENTS

| | | | | |
|---|---|---|---|---|
| EP | 3136651 A1 | 3/2017 | | |
| WO | WO-2016003525 A2 * | 1/2016 | ......... | G06F 21/6218 |
| WO | WO2016003525 A2 | 1/2016 | | |

*Primary Examiner* — Abiy Getachew

(74) *Attorney, Agent, or Firm* — Patentability Associates; David E. Steuber

(57) ABSTRACT

A variety of techniques for concealing the content of a communication between a client device, such as a cell phone or laptop, and a network or cloud of media nodes are disclosed. Among the techniques are routing data packets in the communication to different gateway nodes in the cloud, sending the packets over different physical media, such as an Ethernet cable or WiFi channel, and disguising the packets by giving them different source addressees. Also disclosed are a technique for muting certain participants in a conference call and a highly secure method of storing data files.

25 Claims, 181 Drawing Sheets

Related U.S. Application Data

(60) Provisional application No. 62/480,696, filed on Apr. 3, 2017, provisional application No. 62/107,650, filed on Jan. 26, 2015.

(51) Int. Cl.

| | |
|---|---|
| ***H04W 12/00*** | (2009.01) |
| ***H04W 84/12*** | (2009.01) |
| ***H04W 88/06*** | (2009.01) |
| ***H04L 65/1069*** | (2022.01) |
| ***H04L 65/102*** | (2022.01) |
| ***H04L 9/40*** | (2022.01) |

(52) U.S. Cl.

CPC ........... *H04W 28/12* (2013.01); *H04W 84/12* (2013.01); *H04W 88/06* (2013.01)

(56) References Cited

U.S. PATENT DOCUMENTS

| | | | | |
|---|---|---|---|---|
| 2016/0219024 | A1* | 7/2016 | Verzun | H04L 63/102 |
| 2017/0078197 | A1 | 3/2017 | Cj et al. | |

* cited by examiner

Packet Unscrambling

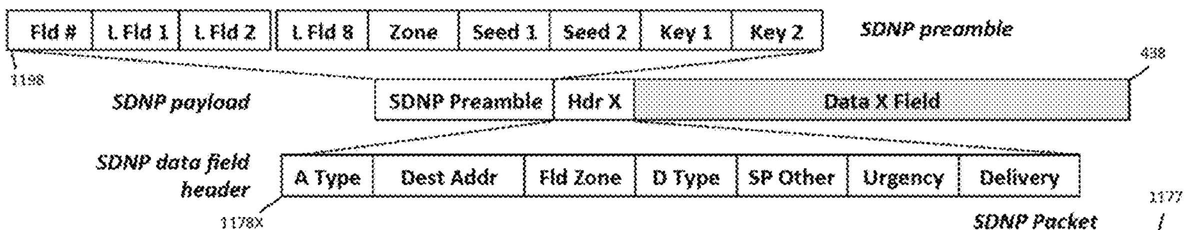

| Layer | Packet Field | Size | Function |
|---|---|---|---|
| 3 | Field # | 4b | Number of Fields |
| 3 | L Field 1, 2, X | 4B | Length of Data Field1, 2, ..., 8 |
| 3 | Zone | 12b | Current SDNP zone (one of 4096 zones) |
| 5 | Seed 1, 2 | 8B, 8B | Two 32 bit seeds (for scrambling, mixing, etc.) |
| 6 | Key 1, 2 | 64B, 64B | Two 512 bit keys (for encryption) |
| 3 | A (Address) Type | 2b | Type of Destination Address (tag, SDNP Zip, IPv6, NAT, POTS #) |
| 3 | Destination Addr | 1B to 12B | Tag, IP Address, SDNP address, NAT address, SDNP ZIP, phone # |
| 3 | Field Zone | 12b | SDNP zone carry-forward (one of 4096 zones) |
| 4 | D (Data) Type | 2b | Type of Data (voice, text, video, data, software...) |
| 6 | Field Other | 8B | Field expansion, Field unscrambling info, etc. |
| 4 | Urgency | 2b | Urgency of sub-packet (snail, normal, priority, urgent) |
| 4 | Delivery | 2b | QoS Marker (Normal, Redundant, Special, VIP...) |
| 5 to 7 | Data in Packet X | 0 to 200B | Data up to 200B per sub-packet, 8 sub-packet max |

Figure 9F

SDNP Single Route Last Mile, Static Addressing

SDNP Single Route Last Mile, Static Addressing

SDNP Single Route Last Mile, Dynamic Client Addressing

SDNP Single Route Last Mile, Dynamic Client Addressing

SDNP Single Route Last Mile, Dynamic Client Addressing

SDNP Multiroute Last Mile, Dynamic Client Addressing, Expanded Single-PHY Last Link SDNP Multiroute Last Mile, Dynamic Client Addressing, Multi-PHY Last Link SDNP Multiroute Last Mile, Dynamic Client Addressing, Single-PHY Last Link

SDNP Last Mile Routing Over Ethernet

| # | Route | Client Address | Last Link | IP Source | IP Destination | MAC Client |
|---|---|---|---|---|---|---|
| 1 | Multi | Dynamic | Multi-PHY | Variable $C_{1,n}$ | Multiple Gateways $M_{0,n}$ | MAC $C_{1,n}$ to $R_n$ |
| 2 | Multi | Dynamic | Multi-PHY | Variable $C_{1,n}$ | | MAC $C_{1,n}$ to R |
| 3 | Multi | Dynamic | Single-PHY | Variable $C_{1,n}$ | | MAC $C_{1,1}$ to R |
| 4 | Multi | Static | Multi-PHY | Fixed $C_{1,1}$ | | MAC $C_{1,n}$ to $R_n$ |
| 5 | Multi | Static | Multi-PHY | Fixed $C_{1,1}$ | | MAC $C_{1,n}$ to R |
| 6 | Multi | Static | Single PHY | Fixed $C_{1,1}$ | | MAC $C_{1,1}$ to R |
| 7 | Single | Dynamic | Multi-PHY | Variable $C_{1,n}$ | Single Gateway $M_{0,0}$ | MAC $C_{1,n}$ to R |
| 8 | Single | Dynamic | Single PHY | Variable $C_{1,n}$ | | MAC $C_{1,1}$ to R |
| 9 | Single | Static | Multi-PHY | Fixed $C_{1,1}$ | | MAC $C_{1,n}$ to R |
| 10 | Single | Static | Single PHY | Fixed $C_{1,1}$ | | MAC $C_{1,1}$ to R |

Figure 52A

| Group Call Client | | Regular Call | Private Call | |
|---|---|---|---|---|
| **Network Node** | **User Authorization** | **All Participants** | **Authenticated SDNP Client** | **Unauthenticated SDNP Client** |
| $C_{1,1}$ | SDNP Client *Group Host* | Listen, Talk | Listen, Talk | – |
| $C_{7,1}$ | SDNP Client *Participant* | Listen, Talk | Listen, Talk | Microphone & Speaker Muted |
| $C_{9,1}$ | SDNP Client *Participant* | Listen, Talk | Listen, Talk | |
| $C_{9,4}$ | SDNP Client *Listener* | Listen Only, Mic Muted | Listen Only, Mic Muted | |
| Ph #1 | Call Out *Participant* | Listen, Talk | Microphone & Speaker Muted | |
| Ph #2 | Call Out *Listener* | Listen Only, Mic Muted | Microphone & Speaker Muted | |

Figure 79A

<table>
<tr><th colspan="2">Group Call Client</th><th>Regular Call</th><th colspan="2">Hyper-Private Call</th></tr>
<tr><th>Network Node</th><th>User Authorization</th><th>All Participants</th><th>Authenticated SDNP Client</th><th>Unauthenticated SDNP Client</th></tr>
<tr><td>$C_{1,1}$</td><td>SDNP Client<br>*Private Group Host*</td><td>Listen, Talk</td><td>Listen, Talk</td><td>--</td></tr>
<tr><td>$C_{7,1}$</td><td>SDNP Client<br>*Private Participant*</td><td>Listen, Talk</td><td>Listen, Talk</td><td rowspan="6">Microphone & Speaker Muted</td></tr>
<tr><td>$C_{9,1}$</td><td>SDNP Client<br>*Participant*</td><td>Listen, Talk</td><td>Microphone & Speaker Muted</td></tr>
<tr><td>$C_{9,4}$</td><td>SDNP Client<br>*Private Listener*</td><td>Listen Only, Mic Muted</td><td>Listen Only, Mic Muted</td></tr>
<tr><td>$C_{9,5}$</td><td>SDNP Client<br>*Listener*</td><td>Listen Only, Mic Muted</td><td>Microphone & Speaker Muted</td></tr>
<tr><td>Ph #1</td><td>Call Out<br>*Participant*</td><td>Listen, Talk</td><td>Microphone & Speaker Muted</td></tr>
<tr><td>Ph #2</td><td>Call Out<br>*Listener*</td><td>Listen Only, Mic Muted</td><td>Microphone & Speaker Muted</td></tr>
</table>

Figure 79B

| PTT Group Call Client | | Regular Push-to-Talk | | Private Push-to-Talk | | |
|---|---|---|---|---|---|---|
| **Network Node** | **User Authorization** | **Host PTT** | **Other PTT** | **Authenticated Host PTT** | **Authenticated Other PTT** | **Unauthenticated Party** |
| $C_{1,1}$ | SDNP Client Group Host | **Talk,** Priority Mute | Listen Only, Mic Mute | **Talk,** Priority Mute | Listen Only, Mic Muted | – |
| $C_{7,1}$ | SDNP Client Participant | Listen Only, Mic Mute | **Talk,** Mute Others | Listen Only, Mic Mute | **Talk,** Mute All Others | |
| $C_{9,1}$ | SDNP Client Participant | Listen Only, Mic Mute | Listen Only, Mic Mute | Listen Only, Mic Mute | Listen Only, Mic Mute | |
| $C_{9,4}$ | SDNP Client Listener | Listen Only, Mic Mute | Listen Only, Mic Mute | Listen Only, Mic Mute | Listen Only, Mic Mute | Microphone & Speaker Muted |
| $C_{9,5}$ | SDNP Client Listener | Listen Only, Mic Mute | Listen Only, Mic Mute | Listen Only, Mic Mute | Listen Only, Mic Mute | |
| Ph #1 | Call Out | Listen Only, Mic Mute | Listen Only, Mic Mute | Microphone & Speaker Muted | Microphone & Speaker Muted | |

Figure 80A

| PTT Group Call Client | | Regular Push-to-Talk | | Hyper-Private Push-to-Talk | | |
|---|---|---|---|---|---|---|
| Network Node | User Authorization | Host PTT | Other PTT | Authenticated Host PTT | Authenticated Other PTT | Unauthenticated Party |
| $C_{1,1}$ | SDNP Client Group Host | **Talk,** Priority Mute | Listen Only, Mic Muted | **Talk,** Priority Mute | Listen Only, Mic Mute | – |
| $C_{7,1}$ | SDNP Client Private Participant | Listen Only, Mic Mute | **Talk,** Mute Others | Listen Only, Mic Muted | **Talk,** Mute Others | Microphone & Speaker Muted |
| $C_{9,1}$ | SDNP Client Participant | Listen Only, Mic Mute | Listen Only, Mic Mute | Microphone & Speaker Muted | Microphone & Speaker Muted | |
| $C_{9,4}$ | SDNP Client Private Listener | Listen Only, Mic Mute | Listen Only, Mic Mute | Listen Only, Mic Muted | Listen Only, Mic Muted | |
| $C_{9,5}$ | SDNP Client Listen Only | Listen Only, Mic Mute | Listen Only, Mic Mute | Microphone & Speaker Muted | Microphone & Speaker Muted | |
| Ph # | Call Out | Listen Only, Mic Mute | Listen Only, Mic Mute | Microphone & Speaker Muted | Microphone & Speaker Muted | |

Figure 80B

Link Refresh

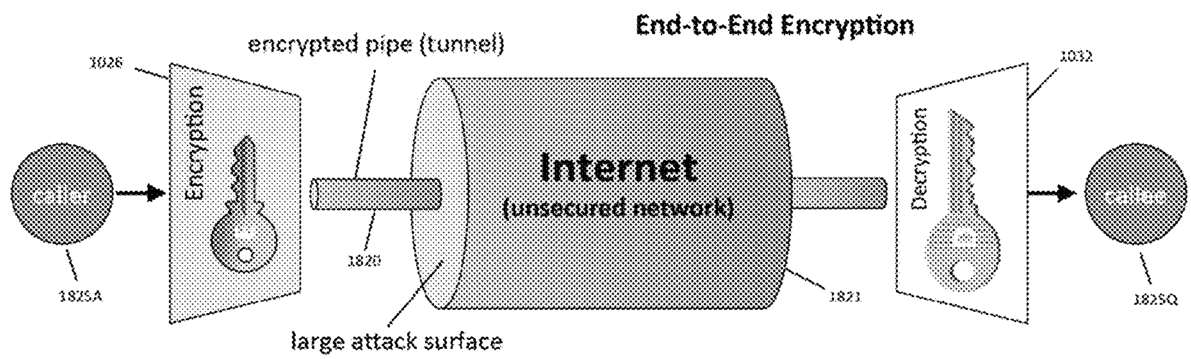
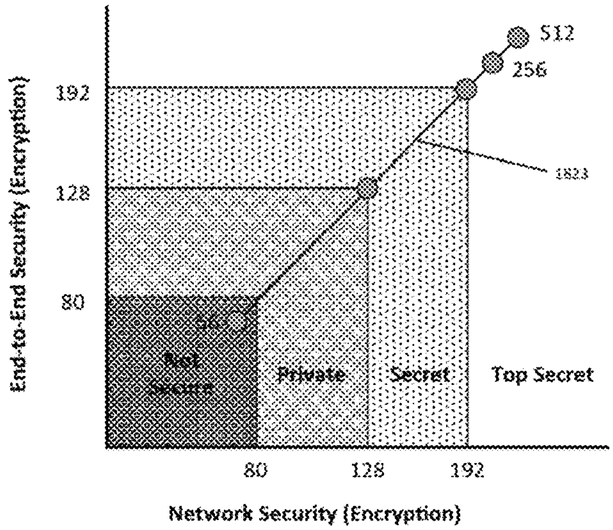
1824
| Key Size | Possible combinations |
|---|---|
| 1-bit | 2 |
| 2-bit | 4 |
| 4-bit | 16 |
| 8-bit | 256 |
| 16-bit | 65536 |
| 32-bit | $4.2 \times 10^{9}$ |
| 56-bit (DES) | $7.2 \times 10^{16}$ |
| 64-bit | $1.8 \times 10^{19}$ |
| 128-bit (AES) | $3.4 \times 10^{38}$ |
| 192-bit (AES) | $6.2 \times 10^{57}$ |
| 256-bit (AES) | $1.1 \times 10^{77}$ |
Figure 104A

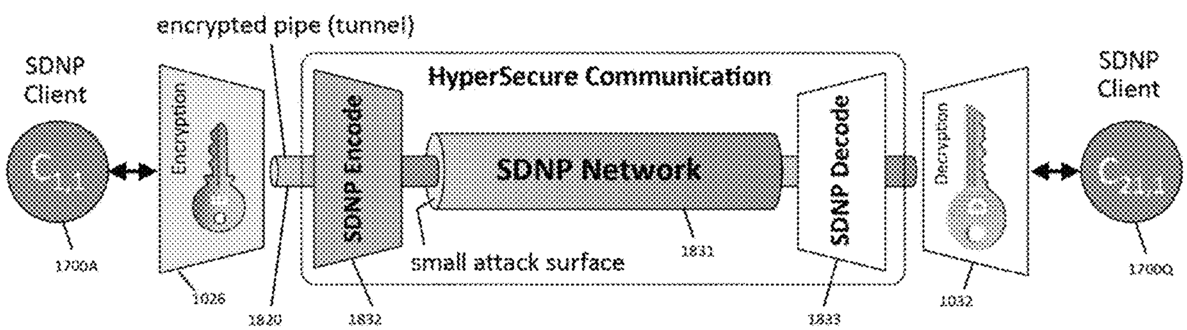
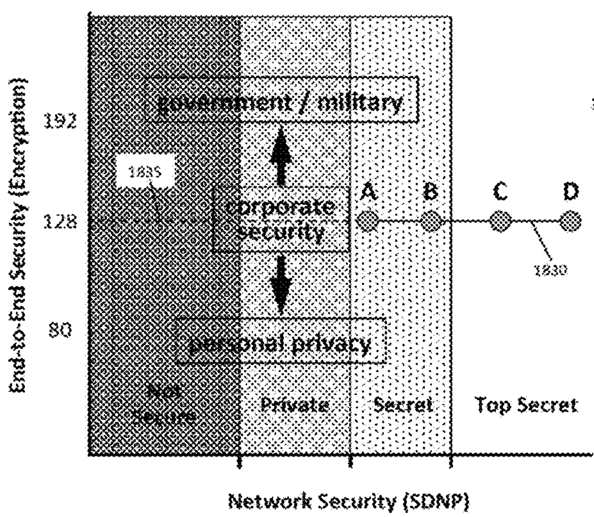
1834
| | |
|---|---|
| A | Scrambled, Fragmented |
| B | Dynamic, Scrambled, Fragmented |
| C | Dynamic, Scrambled, Fragmented, Encrypted |
| D | Dynamic, Scrambled, Fragmented, Junk, Encryption |
Figure 104B

METHODS AND APPARATUS FOR HYPERSECURE LAST MILE COMMUNICATION

CROSS REFERENCE TO RELATED APPLICATIONS

This application claims the priority of U.S. Provisional Application 62/480,696, filed Apr. 3, 2017, and is a continuation-in-part of U.S. application Ser. No. 14/803,869, titled "Secure Dynamic Communication Network And Protocol," filed Jul. 20, 2015, which in turn claimed the priority of U.S. Provisional Application No. 62/107,650, filed Jan. 26, 2015.

Each of the foregoing applications is incorporated herein by reference in its entirety.

FIELD OF THE INVENTION

This invention relates to the methods and apparatus to facilitate HyperSecure "last mile" communication between a 8device and a gateway to a network or cloud.

BACKGROUND OF THE INVENTION

Improving means of communication have fueled the progress of civilization from mankind's earliest beginnings. From the use of couriers and messengers traveling by foot or horseback; through mail postal delivery by train, truck and airplane; to the advent of the telegram and telegraph, telephone, radio, television, computers, the cell phone; the Internet, email and World Wide Web; and more recently, through social media, voice-over-Internet, machine-to-machine (M2M) connectivity, the Internet of Things (IoT), and the Internet of Everything (IoE), communication has always led the way in exploiting the newest technologies of the day. With each new generation of telecommunications technology employed, the number of people connected and the rate by which information is transferred among them has also increased.

The effect of this trend is that humanity is more connected than at any time in history, with people trusting and relying on communication technology to safely and reliably deliver their private, personal, family, and financial information to only those to which they intend to contact. Knowledge and information can now be distributed in seconds to millions of people, and friends and family can contact one another half way around the world as casually as pushing a button. It is often said, "the world has become a very small place."

While such progress is tremendously beneficial to everyone, there are also negative consequences of our heavy reliance on technology. It is not surprising that when the communication system fails to perform, e.g. during an earthquake or severe weather, people become disoriented or even panicked by their being "unplugged", even if only temporarily. The quality of service, or QoS, of a communication system or media is then a critical measurement of a communication network's performance. Peoples' peace-of-mind, financial assets, identity, and even their very lives rely on dependable and secure communication.

Another key consideration of a communication network is its ability to insure privacy, safety, and security to the client using it. As communication technology has evolved, so too has the sophistication of criminals and "hackers" intending to inflict mischief, disrupt systems, steal money, and accidentally or maliciously harm others. Credit card fraud, stolen passwords, identity theft, and the unauthorized publicizing of confidential information, private pictures, files, emails, text messages, and private tweets (either stolen to embarrass or blackmail victims) are but a few examples of modern cyber-crime.

Notable examples of privacy violations and cybercrime at the time of this patent application are listed below to highlight the epidemic proportion of the security problem in today's open communication networks (arranged chronologically):

"Target: Stolen Information Involved at Least 70 million People," CNBC 10 Jan. 2014

"Hackers Made Smart Fridge and TV Send Malicious emails," BGR (www.bgr.com) 20 Jan. 2014

"Nest Google Privacy Row Resumes as Thermostat Hacked," Slash Gear (www.slashgear.com) 24 Jun. 2014

"Account Hijackings Call Line's Data Security into Question. Line, the free call and messaging app, has been rocked by a recent spate of data security breaches. The app has seen hundreds of user accounts illegally accessed by parties other than the accounts' users," Nikkei Asian Review, 2 Jul. 2014

"Ordinary Americans Caught up in NSA Data Sweep, Report Claims," AP 6 Jul. 2014

"Smart LED Light Bulbs Leak Wi-Fi Passwords," BBC News 8 Jul. 2014

"Six People Charged Over StubHub Scam for Prime Tickets. StubHub was targeted by hackers who used stolen passwords and credit card numbers to buy and sell thousands of tickets for pop-music concerts and Yankees games, New York authorities said", Bloomberg, 24 Jul. 2014

"'Internet Of Things' Very Susceptible To Hacking, Study Shows," International Business Times (www.ibtimes.com) 4 Aug. 2014

"Russian Hackers Amass Over a Billion Internet Passwords", New York Times 5 Aug. 2014

"New Leaker Disclosing U.S. Secrets, Government Concludes," CNN 6 Aug. 2014

"Hackers Root Google's Nest Thermostat in 15 seconds," The Enquirer (www.theinquirer.net) 11 Aug. 2014

"Dairy Queen Hacked by Same Malware that Hit Target," Christian Science Monitor 29 Aug. 2014

"Celebrity Victims in Leak of Nude Photos—Security Vulnerability in iCloud Accounts," CBS News, 1 Sep. 2014

"Home Depot May be the Latest Target of Credit Card Breach . . . Home Depot breach could be much larger than Target (40M cards stolen over 3 weeks)," Fortune, 2 Sep. 2014

"Mysterious Fake Cellphone Towers Are Intercepting Calls All Over The US," Business Insider 3 Sep. 2014

"Hack Attack: From Banks to Retail, Signs of Cyberwarfare?" Yahoo Finance 3 Sep. 2014

"Home Depot Confirms Payment System Hacked In U.S. And Canadian Stores," Fox News 9 Sep. 2014

"Yahoo Waged Court Fight with U.S. Government Over Surveillance," CBS/AP 11 Sep. 2014

"Your Medical Record is Worth More to Hackers than Your Credit Card," Reuters 24 Sep. 2014

"Red Alert: HTTPS Has Been Hacked. Browser exploit against SSL/TLS (BEAST) attack will rank among the worst hacks [sic] because it compromises browser connections hundreds of millions of people rely on every day," InfoWorld, 26 Sep. 2014

"Sony Cyberattack, First A Nuisance, Swiftly Grew Into a Firestorm," New York Times, 30 Dec. 2014

In what appears to be an escalating pace of cybercrime, security breaches, identity thefts, and privacy invasions, it begs the question, "how are all these cyber-attacks possible and what can be done to stop them?" At the same time that society seeks greater privacy and security, consumers also want greater connectivity, cheaper higher-quality communication, and more convenience in conducting financial transactions.

To understand the performance limitations and vulnerabilities in modern communication networks, data storage, and connected devices, it is first importa3nt to understand how today's electronic, radio, and optical communication operates, transports, and stores data including files, email, text, audio, and video images.

Circuit-Switched Telephonic Network Operation

Electronic communication involves a variety of hardware components or devices connected into networks of wires, radio, microwave, or optical fiber links. Information is passed from one device to others by sending electrical or electromagnetic energy through this network, using various methods to embed or encode informational "content" into the data stream. Theoretically, the laws of physics set the maximum data rate of such networks at the speed of light, but in most cases practical limitations in data encoding, routing and traffic control, signal-to-noise quality, and overcoming electrical, magnetic and optical noise and unwanted parasitics disturb or inhibit information flow, limiting the communication network's capability to a fraction of its ideal performance.

Historically, electronic data communication was first achieved using dedicated "hardwired" electrical connections forming a communication "circuit" between or among two or more electrically connected devices. In the case of a telegraph, a mechanical switch was used to manually make and break a direct current (DC) electrical circuit, magnetizing a solenoid which in turned moved a metallic lever, causing the listening device or "relay" to click in the same pattern that the sender depressed the switch. The sender then used an agreed upon language, i.e. Morse code, to encode information into the pulse stream. The listener would likewise need to understand Morse code, a series of long and short pulses, called dots and dashes, to interpret the message.

Later, Alexander Graham Bell developed the first telephone using the concept of an "undulating current", now referred to as alternating current (AC), in order to carry sound through an electrical connection. The telephone network comprised two magnetic transducers connected by an electrical circuit where each magnetic transducer comprised a movable diaphragm and coil, or "voice coil", surrounded by a fixed permanent magnet enclosure. When speaking into the transducer, changes in air pressure from the sound causes the voice coil to move back and forth within the surrounding magnetic field inducing an AC current in the coil. At the listener's end, the time-varying current flowing in the voice coil induces an identical waveform and time-varying magnetic field opposing the surrounding magnetic field causing the voice coil to move back-and-forth in the same manner as the transducer capturing the sound. The resulting movement reproduces the sound in a manner similar to the device capturing the sound. In the modern vernacular, when the transducer is converting sound into electrical current, it is operating as a microphone and when the transducer is converting electrical current into sound it is operating as a speaker. Also, because the conducted electrical signal is analogous to the audio waveform carried as an elemental pressure wave in air, i.e. sound, today such electrical signals are referred to as analog signals or analog waveforms.

Since the transducer, as described, is used both for speaking and for listening, in conversation both parties have to know when to speak and when to listen. Similar to two tin cans connected by a string, in such a system, a caller cannot talk and listen at the same time. While such one-way operation, called "half-duplex" mode, may sound archaic, it is actually still commonly used in radio communication today in walkie-talkies, and in modern telephony by the name "push-to-talk" or PTT.

Later full-duplex (i.e., two-way or send-and-receive) telephones with separate microphones and speakers became commonplace, where the parties could speak and listen at the same time. But even today care is required in operating full-duplex telephonic communication to prevent feedback, a condition where a receiver's sound is picked up by its microphone and fed back to the caller resulting in confusing echoes and sometimes uncomfortable whistling sounds—problems especially plaguing long distance telephonic communication.

Early telegraphic and telephonic systems suffered from another issue, one of privacy. In these early incarnations of communication networks, everyone connected to the network hears everything communicated on the circuit, even if they don't want to. In rural telephone networks, these shared circuits were known as "party lines". The phone system then rapidly evolved into multi-line networks where dedicated circuits connected a telephone branch office directly to individual customers' phones. Within the branch exchange office, a system operator would manually connect callers to one another through a switchboard using jumper cables, and also had the capability of connecting one branch to others to form the first "long distance" phone call services. Large banks of relays forming telephonic "switch" networks gradually replaced human operators, which was subsequently replaced by electronic switches comprising vacuum tubes.

After Bell Laboratories developed the transistor in the late 1950s, telephone switches and branch exchanges replaced their fragile and hot vacuum tubes with cool running solid-state devices comprising transistors and ultimately integrated circuits. As the network grew, phone numbers expanded in digits from a seven-digit prefix and private number to include area codes and ultimately country codes to handle international calls. Copper cables carrying voice calls soon covered the world and crossed the oceans. Despite the magnitude of the network, the principle of operation remained constant, that calls represented a direct electrical connection or "circuit" between the callers with voice carried by analog signals and the routing of the call determined by telephone switches. Such a telephonic system eventually came to be known as a "circuit-switched telephonic network", or colloquially as the plain old telephone system or POTS. Circuit switched telephony reached its peak adoption in the 1980s and thereafter relentlessly has been replaced by "packet-switched telephony" described in the next section.

Evolving nearly in parallel to the telephone network, regular radio communication commenced with radio broadcasting in the 1920s. The broadcast was unidirectional, emanating from radio broadcast stations on specific government-licensed frequencies, and received by any number of radio receivers tuned to that specific broadcast frequency or radio station. The broadcasted signal carried an analog signal using either amplitude modulation (AM) or later by frequency modulation (FM) methods, each on dedicated portions of the licensed radio spectrum. In the United States, the Federal Communications Commission or FCC evolved in order to manage the assignment and regulation of such licensed bands. The broadcast concept was expanded into airing television programs using radio transmission, initially comprising black and white content, then in color. Later, television signals could also be carried to people's homes either by microwave satellite dishes or through coaxial cables. Because any listener tuned to the specific broadcast frequency can receive the broadcast, the term "multicast" is now used for such unidirectional multi-listener communication.

Concurrent with advent of radio broadcasting, the first two-way communication commenced with commercial and military ocean ships, and by the time of World War II, radios had evolved into walkie-talkie handheld radio transceivers, devices combining transmitters and receivers into single unit. Like telephony, early two-way radio transmission, operated in "simplex" mode, allowing only one radio to broadcast on a single radio channel while others listened. By combining transmitters and receivers on different frequencies, simultaneous transmission and reception became possible at each end of the radio link, enabling full-duplex mode communication between two parties.

To prevent overlapping transmissions from multiple parties, however, a protocol called half-duplex or push-to-talk is commonly used for channel management, letting anyone exclusively transmit on a specific channel on a first-come first serve basis. Industry standard radio types using analog modulation include amateur (ham or CB) radio, marine VHF radio, UNICOM for air traffic control, and FRS for personal walkie-talkie communication. In these two-way radio networks, radios send their data over specific frequency "channels" to a central radio tower, where the tower amplifies and repeats the signal, sending it on to the entire radio network. The number of available frequencies carrying information over the broadcast area sets the total bandwidth of the system and the number of users able to independently communicate on the radio network at one time.

In order to expand the total capacity of the radio network to handle a greater number of callers, the concept of a cellular network, one where a large area is broken into smaller pieces or radio "cells" was demonstrated in the 1970s and reached widespread adoption within a decade thereafter. The cellular concept was to limit the broadcast range of a radio tower to a smaller area, i.e. to a shorter distance, and therefore be able to reuse the same frequency bands to simultaneously handle different callers present in different cells. To do so, software was created to manage the handoff of a caller passing from one cell into an adjacent cell without "dropping" and suddenly disconnecting the call. Like POTS, two-way radio, as well as radio and television broadcasting, the initial cellular networks were analog in nature. To control call routing, the telephone number system was adopted to determine the proper wireless electrical connection. This choice also had the benefit that it seamlessly connected the new wireless cellular network to the "wire-line" plain old telephone system, providing interconnection and interoperability across the two systems.

Starting in the 1980s, telephonic and radio communication, along with radio and TV broadcasting began an inexorable migration from analog to digital communication methods and formats, driven by the need to reduce power consumption and increase battery life, to improve quality with better signal-to-noise performance, and to begin addressing the need to carry data and text with voice. Radio formats such as EDACS and TETRA emerged capable of concurrently enabling one-to-one, one-to-many, and many-to-many communication modes. Cellular communication also quickly migrated to digital formats such as GPRS, as did TV broadcasting.

By 2010, most countries had ceased, or were in the process of ceasing, all analog TV broadcasting. Unlike broadcast television, cable TV carriers were not required to switch to the digital format, maintaining a hybrid composite of analog and digital signals till as recently as 2013. Their ultimate migration to digital was motivated not by government standards, but by commercial reasons to expand the number of available channels of their network, to be able to deliver HD and UHD content, to offer more pay-per-view (PPV, also know an as "unicast") programming, and to enable high-speed digital connectivity services to their customers.

While it is common to equate the migration of global communication networks from analog to digital formats with the advent of the Internet and more specifically with the widespread adoption of the Internet protocol (IP), the switch to digital formats preceded the commercial acceptance of IP in telephony, enabling, if not catalyzing, the universal migration of communication to IP and "packet-switched networks" (described in the next section).

The resulting evolution of circuit-switched telephony is schematically, as a "public switched telephone network" or PSTN comprising an amalgamation of radio, cellular, PBX, and POTS connections and sub-networks, each comprising dissimilar technologies. The network includes PSTN gateways connected by high bandwidth trunk lines and, by example, connected through wire-line connections to POTS gateways, cellular network base stations PBX and two-way radio networks. Each sub-network operates independently, driving like-kind devices.

The PSTN also connects to circuit-switched cellular networks over base stations 17 running AMPS, CDMA and GSM analog and digital protocols. Through cellular towers, circuit-switched cellular network base stations connect using standardized cellular radio frequencies of cellular links to mobile devices such as cell phones. In the case of GPRS networks, an enhancement to GSM, the circuit-switched cellular network base stations may also connect to tablets, concurrently delivering low speed data and voice. Two-way radio networks such as TETRA and EDACS connect the PSTN to handheld radios and larger in-dash and desktop radios via high-power radio towers and cellular link. Such two-way radio networks, commonly used by police officers, ambulances, paramedics, fire departments, and even port authorities, are also referred to as professional communication networks and services, and target governments, municipalities, and emergency responders rather than consumers. (Note: As used herein, the terms "desktop," "tablet" and "notebook" are used as a shorthand reference to the computers having those names.)

Unlike POTS gateways, cellular network base stations, and PBX which use traditional phone numbers to complete call routing, two-way radio network uses dedicated RF radio channels (rather than phone numbers) to establish radio links between towers and the mobile devices it serves. As such, professional radio communication services remain distinct and uniquely dissimilar from consumer cellular phone networks.

As such, PSTN networks flexibly interconnect sub-networks of diverse technologies. It is this very diversity that defines an intrinsic weakness of today's circuit switched networks—interoperability among sub-networks. Because the various sub-networks do not communicate with any common control protocol or language, and since each technology handles the transport of data and voice differently, the various systems are essentially incompatible except for their limited capability of placing a phone call through the PSTN backbone or trunk lines. For example, during the September 11 terrorist attack on the World Trade Center in New York City, many emergency responders from all over the USA flocked to Manhattan in an attempt to help fight the disaster, only to learn their radio communication system and walkie-talkies were incompatible with volunteers from other states and cities, making it impossible to manage a centralized command and control of the relief effort. With no standardization in their radio's communication protocol, their radios simply couldn't connect to one another. Moreover with the direct electrical and RF connections of circuit switched telephonic networks, especially using analog or unsecured digital protocols, it is simple matter for a hacker with a RF scanner to find active communication channels and to sniff, sample, listen, or intercept the conversations occurring at the time. Because the PSTN forms a "continuously on" link or circuit between the parties communicating, there is plenty of time for a hacker to identify the connection and to "tap it", either legally by governments operating under a federal court ordered wiretap, or criminally by cybercriminals or governments performing illegal, prohibited, or unsanctioned surveillance. The definition of legal and illegal spying and surveillance and any obligation for compliance for cooperation by a network operator varies dramatically by country and has been a heated point of contention among global companies such as Google, Yahoo, and Apple operating across numerous international boundaries. Communication networks and the Internet are global and know no borders or boundaries, yet laws governing such electronic information are local and subject to the jurisdictional authority of the government controlling domestic and international communication and commerce at the time.

Regardless of its legality or ethics, electronic snooping and surveillance today is commonplace, ranging from the monitoring of ubiquitous security cameras located at every street corner and overhead in every roadway or subway, to the sophisticated hacking and code cracking performed by various countries' national security divisions and agencies. While all networks are vulnerable, the antiquity and poor security provisions of PSTNs render them especially easy to hack. As such, a PSTN connected to even a secure modern network represents a weak point in the overall system, creating vulnerability for security violations and cybercrimes. Nonetheless, it will still take many years, if not decades, to retire the global PSTN network and completely replace it with IP-based packet-switched communication. Such packet-based networks (described here below), while more modern than PSTNs, are still unsecure and subject to security breaks, hacks, denial of service attacks, and privacy invasions.

Packet-Switched Communication Network Operation

If two tin cans connected by a string represent a metaphor for the operation of modern day circuit-switched telephony, then the post office represents the similar metaphor for packet-switch communication networks. In such an approach, text, data, voice, and video are converted into files and streams of digital data, and this data is then subsequently parsed into quantized "packets" of data to be delivered across the network. The delivery mechanism is based on electronic addresses that uniquely identify where the data packet is going to and where it is coming from. The format and communication protocol is also designed to include information as to the nature of the data contained in the packet including content specific to the program or application for which it will be used, and the hardware facilitating the physical links and electrical or radio connections carrying the packets.

Born in the 1960s, the concept of packet switching networks was created in the paranoiac era of the post Sputnik cold war. At that time, the US Department of Defense (DoD) expressed concerns that a spaced-based nuclear missile attack could wipe out the entire communication infrastructure of the United States, disabling its ability to respond to a USSR preemptive strike, and that the vulnerability to such an attack could actually provoke one. So the DoD sponsored the creation of a redundant communication system or grid-like "network", one where the network's ability to deliver information between military installations could not be thwarted by destroying any specific data link or even numerous links within the network. The system, known as ARPANET, became the parent of the Internet and the proverbial Eve of modern digital communications.

Despite the creation of the packet-switched network, explosive growth of the Internet didn't occur until the 1990s when the first easy-to-use web browser Mosaic, the advent of hypertext defined web pages, the rapid adoption of the World Wide Web, and the widespread use of email, collectively drove global acceptance of the Internet platform. One of its fundamental tenets, lack of central control or the need for a central mainframe, propelled the Internet to ubiquity in part because no country or government could stop it (or even were fully aware of its global implications) and also because its user base comprised consumers using their newly acquired personal computers.

Another far reaching implication of the Internet's growth was the standardization of the Internet Protocol (IP) used to route data packets through the network. By the mid 1990s, Internet users realized that the same packet-switched network that carries data could also be used to carry voice, and soon thereafter "voice over Internet protocol" or VoIP was born. While the concept theoretically enabled anyone with Internet access to communicate by voice over the Internet for free, propagation delays across the network, i.e. latency, rendered voice quality poor and often unintelligible. While delay times have improved with the adoption of high-speed Ethernet links, high-speed WiFi connectivity, and 4G data to improve connection quality in the "last-mile", the Internet itself was created to insure accurate delivery of data packets, but not to guarantee the time required to deliver the packets, i.e. the Internet was not created to operate as a real-time network.

So the dream of using the Internet to replace expensive long distance telecommunication carriers or "telco's" has remained largely unfulfilled despite the availability of "over-the-top" (OTT) providers such as Skype, Line, KakaoTalk, Viper, and others. OTT telephony suffers from poor quality of service (QoS) resulting from uncontrolled network latency, poor sound quality, dropped calls, echo, reverberation, feedback, choppy sound, and oftentimes the inability to even initiate a call. The poor performance of OTT communication is intrinsically not a weakness of the VoIP based protocol but of the network itself, one where OTT carriers have no control over the path which data takes or the delays the communication encounters. In essence, OTT carriers cannot insure performance or QoS because OTT communication operates as an Internet hitchhiker. Ironically, the companies able to best utilize VoIP based communications today are the long distance telephone carriers with dedicated low-latency hardware-based networks, the very telco's that have the least motivation to do so.

Aside from its intrinsic network redundancy, one of the greatest strengths of packet-switched communication is its ability to carry information from any source to any destination so long that the data is arranged in packets consistent with the Internet Protocol and provided that the communicating devices are connected and linked to the Internet. Internet Protocol manages the ability of the network to deliver the payload to its destination, without any care or concern for what information is being carried or what application will use it, avoiding altogether any need for customized software interfaces and expensive proprietary hardware. In many cases, even application related payloads have established predefined formats, e.g. for reading email, for opening a web page on a browser, for viewing a picture or video, for watching a flash file or reading a PDF document, etc.

Because its versatile file format avoids any reliance on proprietary or company-specific software, the Internet can be considered an "open source" communication platform, able to communicate with the widest range of devices ever connected, ranging from computers, to cell phones, from cars to home appliances. The most recent phrase describing this universal connectivity is the "Internet of Everything" or IoE.

As shown, a large array of computers include high-speed cloud servers and cloud data storage interconnected by high bandwidth connections, typically optical fiber, among with countless other servers (not shown) to form the Internet cloud. The cloud metaphor is appropriate because there is no well-defined boundary defining which servers are considered part of the cloud and which ones are not. On a daily and even on a minute-to-minute basis, servers come online while others may be taken offline for maintenance, all without any impact to the Internet's functionality or performance. This is the benefit of a truly redundant distributed system—there is no single point of control and therefore no single point of failure.

The cloud may be connected to the user or connected device through any variety of wire-line, WiFi or wireless links. Wireless packet-switched capable telephonic communication comprises cellular protocols 3G including HSUPA and HSDPA, as well as 4G/LTE. LTE, or long-term-evolution, refers to the network standards to insure interoperability with a variety of cellular protocols including the ability to seamlessly hand-off phone calls from one cell to another cell even when the cells are operating with different protocols. Note: As a matter of definition, as used herein "last-mile" refers to the link between any type of client device, such as a tablet, desktop or cell phone, and a cloud server. Directionally, the term "first-mile" is sometimes also used to specify the link between the device originating the data transmission and the cloud server. In such cases the "last-mile" link is also the "first-mile" link.

For shorter distance communication, WiFi access points connect smartphones, tablets, notebooks, desktops or connected appliances and may be used in localized wireless applications in homes, cafes, restaurants, and offices. WiFi comprises communication operating in accordance with IEEE defined standards for single-carrier frequency specifications 802.11a, 802.11b, 802.11g, 802.11n, and most recently for the dual frequency band 802.11ac format. WiFi security, based on a simple static login key, is primarily used to prevent unauthorized access of the connection, but is not intended to indefinitely secure data from sniffing or hacking.

Wire-line distribution unit, i.e. routers, may connect by fiber, coaxial cable, or Ethernet to a variety of devices including notebooks, desktops, phones, televisions or by twisted pair copper wire phone lines to point-of-sale terminal serving immobile or fixed wire-line connected markets including hotels, factories, offices, service centers, banks, and homes. The wire-line connection may comprise fiber or coaxial cable distribution to the home, office, factory, or business connected locally though a modem to convert high-speed data (HSD) connection into WiFi, Ethernet, or twisted pair copper wire. In remote areas where fiber or cable is not available, digital subscriber line (DSL) connections are still used but with dramatically compromised data rates and connection reliability. Altogether, counting access through wireless, WiFi, and wire-line connections, the number of Internet connected objects is projected to reach 20 billion globally by the year 2020.

In contrast to circuit switched networks that establish and maintain a direct connection between devices, packet-switched communications uses an address to "route" the packet through the Internet to its destination. As such, in packet-switched communication networks, there is no single dedicated circuit maintaining a connection between the communicating devices, nor does data traveling through the Internet travel in a single consistent path. Each packet must find its way through the maze of interconnected computers to reach its target destination.

In routing of an IP packet from a notebook to a desktop using packet-switched network communication for example the first data packet sent from the notebook to a local WiFi router via wireless connection is directed toward array of DNS servers, DNS being an acronym for domain name servers. The purpose of the array of DNS servers is to convert the textual name or phone number of the destination device, in this case the desktop, into an IP address. Once identified, the IP address is passed from the array of DNS servers back to the source address, i.e. to the notebook. This address, which clearly identifies the communicating device, is used in routing the data packets through the network.

Thereafter the notebook assembles its IP data packets and commences sending them sequentially to their destination, for example first through WiFi radio to a local WiFi router and then subsequently across the network of routers and servers acting as intermediary routers and computer servers to its destination. Together the routers and computer servers network operating either as nodes in the Internet or as a point of presence or POP, i.e. gateways of limited connectivity capable of accessing the Internet. While some routers or servers acting as a POP connect to the Internet through only a small number of adjacent devices, other servers are interconnected to numerous devices, and are sometimes referred to as a "super POP". For clarity's sake it should be noted the term POP in network vernacular should not be confused with the application name POP, or plain old post office, used in email applications.

Each router, or server acting as a router, contains in its memory files a routing table identifying the IP addresses it can address and possibly also the addresses that the routers above it can address. These routing tables are automatically downloaded and installed in every router when it is first connected to the Internet and are generally not loaded as part of routing a packet through the network. When an IP packet comes into a router, POP or super POP, the router reads enough of the IP address, generally the higher most significant digits of the address, to know where to next direct the packet on its journey to its destination. For example a packet headed to Tokyo from New York may be routed first through Chicago then through servers in San Francisco, Los Angeles, or Seattle before continuing on to Tokyo. Since the number of routers a packet traverses and the available data rate of each of the connections between routers varies by infrastructure and by network traffic and loading, there is no way to determine a priori which path is fastest or best.

Unlike in circuit-switched telephonic communication that establishes and maintains a direct connection between clients, with packet-switched data, there is no universal intelligence looking down at the Internet to decide which path is the best, optimum, or fastest path to route the packet nor is there any guarantee that two successive packets will even take the same route. As such, the packet "discovers" its way through the Internet based on the priorities of the companies operating the routers and servers the packet traverses. Each router, in essence, contains certain routing tables and routing algorithms that define its preferred routes based on the condition of the network. For example, a router's preferences may prioritize sending packets to other routers owned by the same company, balancing the traffic among connections to adjacent routers, finding the shortest delay to the next router, directing business to strategic business partners, or creating an express lane for VIP clients by skipping as many intermediate routers as possible. When a packet enters a router, there is no way to know whether the routing choices made by the specific POP were made in the best interest of the sender or of the network server operator.

So in some sense, the route a packet takes is a matter of timing and of luck. In the previous New York to Tokyo routing example, the routing and resulting QoS can vary substantially based on even a small perturbation in the path, i.e. in non-linear equations the so-called "butterfly effect". Consider the case where the packet from New York goes through "router A" in Chicago and because of temporary high traffic in California, it is forwarded to Mexico City rather than to California. The Mexico City router then in turn forwards the IP packet to Singapore, from where it is finally sent to Tokyo. The very next packet sent is routed through Chicago "router B", which because of low traffic at that moment directs the packet to San Francisco and then directly to Tokyo in only two hops. In such a case, the second packet may arrive in Tokyo before the first one routed through a longer more circuitous path. This example highlights the problematic issue of using the Internet for real-time communication such as live video streaming or VoIP, namely that the Internet is not designed to guarantee the time of delivery or to control network delays in performing the delivery. Latency can vary from 50 ms to over 1 second just depending on whether a packet is routed through only two servers or through fifteen.

The Internet's lack of routing control is problematic for real-time applications and is especially an issue of poor QoS for OTT carriers—carriers trying to provide Internet based telephony by catching a free ride on top of the Internet's infrastructure. Since the OTT carrier doesn't control the routing, they can't control the delay or network latency. Another issue with packet-switched communication, is that it is easy to hijack data without being detected. If a pirate intercepts a packet and identifies its source or destination IP address, they can use a variety of methods to intercept data from intervening routers and either sniff or redirect traffic through their own pirate network to spy on the conversation and even crack encrypted files.

The source and destination IP addresses and other important information used to route a packet (and also used by pirates to hack a packet) are specified as a string of digital data called an IP packet, IP datagram, or TCP/IP packet. The IP packet contains digital information defining the physical connection between devices, the way the data is organized to link the devices together, the network routing of the packet, a means to insure the useful data (payload) was delivered accurately and what kind of data is in the payload, and then the payload data itself to be used by various application programs. The IP packet is sent and received in sequence as a string of serial digital bits, organized in a specific manner called the Internet Protocol as established by various standards committees including the Internet Engineering Task Force or IETF among others. The standard insures that any IP packet following the prescribed protocol can communicate with and be understood by any connected device complying with the same IP standard. Insuring communication and interoperability of Internet connected devices and applications are hallmarks of the Internet, and represent a guiding principal of the Open Source Initiative or OSI, to prevent any company, government, or individual from taking control of the Internet or limiting its accessibility or its functionality.

The OSI model, an abstraction comprising seven layers of functionality, precisely prescribes the format of an IP packet and what each segment of the packet is used for. Each portion or "segment" of the IP packet corresponds to data applying to function of the particular OSI layer 4. The roles of the seven OSI layers are as follows:

- Layer 1, the physical or PHY layer, comprises hardware specific information articulating the physical nature of communication as electrical, RF and optical signals and the way those signals can be converted into bits for use in the communicating system. Converting a specific communication medium such as WiFi radio, Ethernet, serial ports, optical fiber, 3G or 4G cellular radio, DSL on twisted pair copper wire, USB, Bluetooth, cable or satellite TV, or digital broadcasts of audio, video, or multimedia content into a bit stream is the task of the PHY layer. In the IP packet, the preamble, represents Layer 1 data, and is used to synchronize the entire data packet or "frame", to the hardware transceiving it.
- Layer 2, the data link layer, comprising bits arranged as frames, defines the rules and means by which bit streams delivered from PHY Layer 1 are converted into interpretable data. For example, WiFi radio based bit streams may comply with any number of IEEE defined standards including 802.11a, b, g, n, and ac; 3G radio communication may be modulated using high-speed packet access methods HSDPA or HSUPA; modulated light in an optical fiber or electrical signals on a coaxial cable can be decoded into data in accordance with the DOCSIS 3 standard; etc. In the IP packet, Layer 2 data encapsulates its payload into a datagram with a leading "data link header", and a trailing "data link trailer", together defining when the encapsulated payload being delivered starts and stops, as well as to insure nothing was lost in the transmission process. One key element of Layer 2 data is the MAC or media access address, used to direct the data traffic to and from specific Ethernet addresses, RF links, or hardware specific transceiver links.
- Layer 3, the network or Internet layer, comprises packets called "datagrams" containing Internet Protocol (IP) information used for routing an IP packet including whether the packet contains IPv4 or IPv6 data and the corresponding source and destination IP addresses as well as information regarding the nature of the payload contained within the packet, i.e. whether the type of transport protocol used comprises Transmission Control Protocol (TCP), User Datagram Protocol (UDP) or something else. Layer 3 also includes a function to prevent immortals—IP packets that are never delivered yet never die. A specific type of Layer 3 packet, ICMP is used to diagnose the condition of a network, including the well-known "ping" function. In the IP packet, Layer 3 comprises "IP header" 82 and encapsulates its payload comprising transport and upper layer segments.

Layer 4, the transport layer, comprises segments of data defining the nature of the connection between communicating devices, where UDP defines a minimal description of the payload for connectionless communication, namely how large is the payload, were any bits lost, and what application service (port) will use the delivered data. UDP is considered connectionless because it does not confirm delivery of the payload, relying instead on the application to check for errors or lost data. UDP is typically used for time sensitive communication such as broadcasting, multicasting, and streaming where resending a packet is not an option. In contrast, TCP insures a virtual connection by confirming the packet and payload are reliably delivered before the next packet is sent, and resends dropped packets. TCP also checks the data integrity of the delivered packets using a checksum, and includes provisions for reassembling out-of-sequence packets in their original order. Both TCP and UDP define the source and destination ports, a description of an upper layer service or application, e.g. a web server or an email server, concerned with the information contained within the Layer 4 payload. In the IP packet, Layer 4 comprises the TCP/UDP header and encapsulates its data/payload comprising content used by upper OSI Layers 5, 6 and 7.

Layers 5, 6 and 7, the upper or application layers describe the content delivered by the Internet as data/payload. Layer 7, the "application" layer, represents the highest level in the OSI model and relies on the six underlying OSI layers to support both open source and proprietary application software. Commonly used Level 7 applications include email using SMTP, POP or IMAP, web browsing using HTTP (Chrome, Safari, Explorer, Firefox), file transfers using FTP, and terminal emulation using Telnet. Proprietary applications include the Microsoft Office suite of products (Word, Excel, PowerPoint), Adobe Illustrator and Photoshop; Oracle and SAP database applications; Quicken, Microsoft Money, and QuickBooks financial software; plus audio and video players (such as iTunes, QuickTime, Real Media Player, Window Media Player, Flash), as well as document readers such Adobe Acrobat Reader and Apple Preview. Level 7 applications generally also utilize embedded objects defined syntactically by Level 6, the "presentation" layer, comprising text, graphics & pictures, sound and video, document presentations such as XML or PDF, along with security functions such as encryption. Level 5, the "session" layer, establishes cross-application connectivity, such as importing one object into another program file, and control initiating and terminating a session.

As described, the OSI seven-layer model defines the functions of each layer, and the corresponding IP packet encapsulates data relating to each layer, one inside the other in a manner analogous to the Babushka or Russian nesting doll, the wooden dolls with one doll inside another inside another and so on . . . . The outer packet or Layer 1 PHY defines the entire IP frame containing information relating to all the higher levels. Within this PHY data, the Layer 2 data frame describes the data link layer and contains the Layer 3 network datagram. This datagram in turn describes the Internet layer as its payload, with Layer 4 segment data describing the transport layer. The transport layer carries upper layer data as a payload including Layer 5, 6 and 7 content. The seven-layer encapsulation is also sometimes referred to by the mnemonic "all people seem to need data processing" ordering the seven OSI layers successively from top to bottom as application, presentation, session, transport, network, data-link, and physical layers.

While the lower physical and link layers are hardware specific, the middle OSI layers encapsulated within the IP packet describing the network and transport information are completely agnostic to the hardware used to communicate and deliver the IP packet. Moreover, the upper layers encapsulated as the payload of the transport layer are specific only to the applications to which they apply and operate completely independently from how the packet was routed or delivered through the Internet. This partitioning enables each layer to essentially be supervised independently, supporting a myriad of possible combinations of technologies and users without the need for managerial approval of packet formatting or checking the viability of the packet's payload. Incomplete or improper IP packets are simply discarded. In this manner, packet-switched networks are able to route, transport and deliver diverse application related information over disparate communication mediums in a coherent fashion between and among any Internet connected devices or objects.

In conclusion, switched circuit networks require a single direct connection between two or more parties communicating (similar to the plain old telephone system of a century ago), while packet switches network communication involves fragmenting documents, sound, video, and text into multiple packets, and deliver those packets through multiple network paths (similar to the post office using best efforts to provide delivery in an accurate and timely manner), then reassembling the original content and confirming nothing was lost along the way. A comparison between circuit-switched PSTNs versus packet-switched VoIP is summarized in the following table:

| Network | PSTN | Internet |
|---|---|---|
| Technology | Circuit-switched | Packet-switched |
| Connection | Dedicated electrical connection | Each packet routed over Internet |
| Data delivery | Real-time (circuit) | Best effort (packet) |
| Signal | Analog or digital | Digital, IP, VoIP |
| Content | Voice | Voice, text, data, video |
| Data Rate | Low | High |
| Error Checking | None, or minimal | Extensive |
| Effect of Broken Line | Broken or cropped call | Call rerouted |
| Effect of Power Failure | Network delivers power | Battery backup required |

It should be mentioned here that while PSTNs operate using real-time electrical circuit connections, packet-switched networks deliver content using "best effort" methods to find a way to deliver a packet and payload, not unlike the post office using different trucks and letter carriers to eventually deliver the mail, even if its late to arrive. Operation of packet switched networks and communication is explained in greater detail in the background section of a related patent application entitled "Secure Dynamic Communication Network and Protocol," of which this disclosure is a Continuation in Part.

When considering the performance of a network, several factors are considered namely, Data rate, i.e. bandwidth Quality of service Network and data security User privacy Of the above considerations, data rates are easily quantified in millions of bits per second or Mbps. Quality of Service or QoS, on the other the other hand, includes several factors including latency, sound quality, network stability, intermittent operation or frequent service interruptions, synchronization or connection failures, low signal strength, stalled applications, and functional network redundancy during emergency conditions. Cybersecurity and cyberprivacy deals with preventing attacks on the network and thwarting unauthorized access to data traffic and contents, including cybercrime, cybersurveillance, IP packet sniffing, port interrogation and denial of service attacks, profiling, imposters, packet hijacking, cyber-infections, surveillance, pirate administration & infiltration Quality of Service Quality of Service describes the performance of the network in capacity, bandwidth, latency, data rate, scalability, sound quality data integrity, data bit error rates, and other performance based parameters. For programs, files, and security related verifications, data accuracy is a critical factor. Which factors are important depends on the nature of the payload being carried across a packet-switched network. In contrast, for voice and video comprising real-time applications, factors affecting packet delivery time are key. Quality factors and how they affect various applications such as video, voice, data, and text vary depending on the application. A good network condition typified by consistent high data rate IP packet waveform is one where there are minimal time delays, clear strong signal strength, no signal distortion, stable operation, and no packet transmission loss.

Intermittent networks with lower data rate packet waveforms suffer occasional intermittencies affect video functions most significantly, causing painfully slow video downloads and making video streaming unacceptable. Congested networks operating a lower effective data throughput rates with regular short duration interruptions exemplified by IP packet waveform not only severely degrade video with jerky intermittent motion, fuzzy pictures, and improper coloring and brightness, but also begin to degrade sound or vocal communication with distortion, echo, and even whole sentences dropped from a conversation or soundtrack. In congested networks, however, data can still be delivered using TCP by repeated requests for rebroadcasts. In the extreme, unstable networks exhibit low data throughput rates with numerous data stoppages of unpredictable durations. Unstable networks also include corrupted IP packages as represented by the darkly shaded packets in waveform 610D, which in TCP based transport must be resent and in UDP transport are simply discarded as corrupt or improper data. At some level of network degradation even emails become intermittent and IMAP fie synchronization fails. Because of their lightweight data format, most SMS and text messages will be delivered, albeit with some delivery delay, even with severe network congestion but attachments will fail to download. In unstable networks every application will fail and can even result in freezing a computer or cellphone's normal operation waiting for an expected file to be delivered. In such cases video freezes, sound become so choppy it becomes unintelligible, VoIP connections drop repeatedly even over a dozen times within a few minute call, and in some cases fails to connect altogether. Likewise, emails stall or freeze with computer icons spinning round and round interminably. Progress bars halt altogether. Even text messages bounce and "undeliverable".

While many factors can contribute to network instability, including power failures on key servers and super POPs, overloaded call volumes, the transmission of huge data files or UHD movies, and during significant denial of service attacks on select servers or networks, the key factors used to track a network's QoS are its packet drop rate and packet latency. Dropped packets occur when an IP packet cannot be delivered and "times out" as an immortal, or where a router or server detects a checksum error in the IP packet's header. If the packet using UDP, the packet is lost and the Layer 7 application must be smart enough to know something was lost. If TCP is used for Layer 4 transport, the packet will be requested for retransmission, further adding loading to a potentially already overloaded network.

The other factor determining QoS, propagation delay, may be measured quantitatively in several ways, either as an IP packet's delay from node-to-node, or unidirectionally from source to destination, or alternatively as the round-trip delay from source to destination and back to the source. The effects of propagation delay on packet delivery differ using UDP and TCP transport protocols. As the intermodal network propagation delay increases, the time needed to perform round-trip communication such as in VoIP conversation increases. In the case of UDP transport, the round trip delay increases linearly with propagation delay. Since long propagation delays correlate to higher bit error rates, the number of lost UDP packets increases, but because UDP does request the resending of dropped packets, the round trip time remains linear with increased delay. TCP transport exhibits a substantially longer round trip time for each packet sent than UDP because of the handshaking required confirming packet delivery. If the bit error rate remains low and most packets do not require resending then TCP propagation delay increases linearly with intermodal propagation delay. If, however, the communication network becomes unstable as the propagation delay increases, then the round trip time resulting from TCP transport grows exponentially because of the protocol's need for retransmission of dropped packets. As such, TCP is contraindicated for time sensitive applications such as VoIP and video streaming.

Since all packet communication is statistical, with no two packets having the same propagation time, the best way to estimate the single direction latency of a network is by measuring the round trip time of a large number of similarly sized IP packets and dividing by two to estimate the single-direction latency. Latencies under 100 ms are outstanding, up to 200 ms are considered very good, and up to 300 ms still considered acceptable. For propagation delays of 500 ms, easily encountered by OTT applications running on the Internet, the delays become uncomfortable to users and interfere which normal conversation. In voice communication, in particular such long propagation delays sound "bad" and can result in reverberation, creating a "twangy" or metallic sounding audio, interrupting normal conversation while the other party waits to get your response to their last comment, and possibly resulting in garbled or unintelligible speech.

To be clear, the single-direction latency of a communication is different than the ping test performed by the Layer 3 ICMP utility (such as the free network test at http://www.speedtest.net) in part because ICMP packets are generally lightweight compared to real IP packets, because the ping test does not employ the "request to resend" feature of TCP, and because there is no guarantee over a public network of the Internet, that the ping test's route will match the actual packet route. In essence, when the ping experiences a long delay, something is wrong with the network or some link between the device and the network, e.g. in the WiFi router, or the last mile, but a good ping result by itself cannot guarantee low propagation delay of a real packet.

In order to improve network security, encryption and verification methods are often employed to prevent hacking, sniffing or spying. But heavy encryption and multiple key encryption protocols constantly reconfirming the identity of a conversing parties, create additional delays and in so doing increase the effective network latency, degrading QoS at the expense of improving security.

Cybersecurity and Cyberprivacy

The other two major considerations in communications are that of cybersecurity cyberprivacy. While related, the two issues are somewhat different. "Cybersecurity including network security, computer security and secure communications, comprises methods employed to monitor, intercept, and prevent unauthorized access, misuse, modification, or denial of a computer or communications network, network-accessible resources, or the data contained within network connected devices. Such data may include personal information, biometric data, financial records, health records, private communications and recordings, as well as private photographic images and video recordings. Network-connected devices include cell phones, tablets, notebooks, desktops, file servers, email servers, web servers, data bases, personal data storage, cloud storage, Internet-connected appliances, connected cars, as well as publically shared devices used by an individual such as point-of-sale or POS terminals, gas pumps, ATMs, etc.

Clearly, cybercriminals and computer hackers who attempt to gain unauthorized access to secure information are committing a crime. Should illegally obtained data contain personal private information, the attack is also a violation of the victim's personal privacy. Conversely, however, privacy violations may occur without the need for cybercrime and may in fact be unstoppable. In today's network-connected world, unauthorized use of a person's private information may occur without the need of a security breach. In many cases, companies collecting data for one purpose may choose to sell their data base to other clients interested in using the data for another purpose altogether. Even when Microsoft purchased Hotmail, it was well known that the mail list was sold to advertisers interested in spamming potential clients. Whether such actions should be considered a violation of cyberprivacy remains a matter of opinion.

"Cyberprivacy" including Internet privacy, computer privacy, and private communication involves an individual's personal right or mandate to control their personal and private information and its use, including the collection, storage, displaying or sharing of information with others. Private information may involve personal identity information including height, weight, age, fingerprints, blood type, driver's license number, passport number, social-security number, or any personal information useful to identify an individual even without knowing their name. In the future, even an individual's DNA map may become a matter of legal record. Aside from personal identifying information, non-personal private information may include what brands of clothes we buy, what web sites we frequent, whether we smoke, drink, or own a gun, what kind of car we drive, what diseases we may have contracted in our life, whether our family has a history of certain diseases or ailments, and even what kind of people we are attracted to.

This private information, when combined with public records relating to personal income, taxes, property deeds, criminal records, traffic violations, and any information posted on social media sites, forms a powerful data set for interested parties. The intentional collection of large data sets capturing demographic, personal, financial, biomedical, and behavioral information and mining the data for patterns, trends and statistical correlations today is known as "big data". The healthcare industry, including insurance companies, healthcare providers, pharmaceutical companies, and even malpractice lawyers, are all intensely interested in personal information stored as big data. Automotive and consumer products companies likewise want access to such databases in order to direct their market strategy and advertising budgets. In recent elections, even politicians have begun to look to big data to better understand voters' opinions and points of political controversy to avoid.

The question of cyberprivacy is not whether big data today captures personal information (it's already standard procedure), but whether the data set retains your name or sufficient personal identity information to identify you even in the absence of knowing your name. For example, originally, the U.S. government stated that the personal information gathered by the healthcare.gov web site used for signing up to the Affordable Care Act would be destroyed once the private medical accounts were set up. Then, in a recent revelation, it was disclosed that a third-party corporation facilitating the data collection for the U.S. government had previously signed a government contract awarding it the right to retain and use the data it collected, meaning that personal private data divulged to the U.S. government is in fact not private.

As a final point, it should be mentioned that surveillance is practiced both by governments and by crime syndicates using similar technological methods. While the criminals clearly have no legal right to gather such data, the case of unauthorized government surveillance is murkier, varying dramatically from country to country. The United States NSA for example has repeatedly applied pressure on Apple, Google, Microsoft and others to provide access to their clouds and databases. Even government officials have had their conversations and communiqués wiretapped and intercepted. When asked if Skype, a division of Microsoft, monitors the content of its callers, the Skype Chief Information Officer abruptly replied "no comment."

Methods of Cybercrime & Cybersurveillance—

Focusing on the topic of cybersecurity, numerous means exist to gain unauthorized access to device, network and computer data, including a variety of malware and hacker technologies used to commit cybercrime and achieve unauthorized intrusions into allegedly secure networks.

For example, an individual using a tablet connected to the Internet may wish to place a call to a business office phone, send a message to a TV, call a friend in the country still using a circuit switched POTS network, download files from web storage, or send emails through email server. While all of the applications represent normal applications of the Internet and global interconnectivity, many opportunities for surveillance, cybercrime, fraud, and identity theft exist through the entire network.

For example, for a tablet connecting to the network through a cellular radio antenna and LTE cellular base station or through short-range radio antenna and public WiFi base station, an unauthorized intruder can monitor the radio link. Likewise LTE calls over cellular link can be monitored or "sniffed" by an intercepting radio receiver or sniffer. The same sniffer can be adjusted to monitor WiFi links and on the receiving end on cable between the cable CMTS and cable modem.

In some instances, the LTE call can also be intercepted by a pirate faux-tower, establishing a diverted communication path between a tablet and cellular tower. Communications sent through the packet-switched network to a router, server, server, and cloud storage are also subject to man in the middle attacks. Wiretaps can intercept calls on the POTS line from PSTN gateway to phones and also on a corporate PBX line between PBX servers and office phones.

Through a series of security breaches, spyware can install itself onto a tablet or notebook, on a router, on a PSTN-bridge, on cloud storage, on a cable CMTS, or on a desktop computer. Trojan horse software may install itself on a tablet or desktop to phish for passwords. A worm may also be used to attack a desktop, especially if the computer runs Microsoft operating system with active X capability enabled. Finally, to launch denial of service attacks, a virus can attack any number of network-connected devices including servers, desktops, and tablets.

Malware may therefore operate on differing portions of the communication network and infrastructure, where cyber-assaults may include viruses, man in the middle attacks government surveillance, and denial of service attacks. The last mile of the communication network offers an even more extensive opportunity for malware and cyber-assaults, divided into three sections, the local telco/network, the last link, and the device. The local telco/network as shown comprises high-speed wired or fiber links, routers, cable CMTS, cable/fiber, cable modems, WiFi antennas, and LTE radio networks. In this portion of the network radio sniffers, spyware, viruses, and man in the middle attacks are all possible.

In the last link, the local connection to the device, the network connection comprises wireline connections, WiFi links, and LTE/radio cellular links subject to spyware, radio sniffers, wiretaps, and faux towers. The device itself, including for example tablets, notebooks, desktops smartphones, smart TVs, POS terminals, etc. are subject to a number of attacks including spyware, Trojan horses, viruses, and worms. Such surveillance methods and spy devices are readily available in the commercial and online marketplace, including devices used for monitoring traffic on Ethernet local area networks, devices for monitoring WiFi data, and for surveillance of cellular communications. While sniffing of optical fiber cloud connections was initially not considered as a threat, recently non-invasive data sniffers for optical communications have emerged, i.e. one where the fiber need not be cut or its normal operation impaired even temporarily, now exists.

Aside from using hacking and surveillance methods, a wide variety of commercial spyware is readily available for monitoring cell phone conversations and Internet communications. Today, commercially available spyware programs advertise a number of features such as the ability to beneficially spy on your employees, your kids, and your spouse. The feature set is surprisingly comprehensive including spying on calls, photos and videos, SMS/MMS texting, third party instant messaging, emails, GPS location tracking, Internet use, address book, calendar events, bugging, control apps, and even remote control features, together comprising a frighteningly convincing number of a ways to violate cyberprivacy. In fact cyber-assaults have now become so frequent, they are tracked on a daily basis.

To launch a cyber-assault generally involves several stages or combination of techniques, including:

IP packet sniffing
Port interrogation
Profiling
Imposters
Packet-hijacking
Cyber-infections
Surveillance
Pirate administration IP Packet Sniffing—

Using radio-monitoring devices, a cybercriminal can gain significant information about a user, their transactions, and their accounts. In packet sniffing, the contents of an IP packet can be obtained or "sniffed" anywhere in the path between two users. For example, when a user sends a file, e.g. a photo or text, in an IP packet from their notebook to the cell phone of their friend, a cyber-pirate can discover the IP packet in any number of places, either by intercepting the sender's last link, the intercepting the sender's local network, monitoring the cloud, intercepting the receiver's local telco, or by intercepting the receiver's last link. The observable data contained in intercepted IP packet includes the Layer-2 MAC addresses of the devices used in the communication, the Layer-3 addresses of the sender of the receiving party, i.e. the packet's destination, including the transport protocol, e.g. UDP, TCP, etc. being used. The IP packet also contains, the Layer-4 port number of the sending and receiving devices potentially defining the type of service being requested, and the data file itself. If the file is unencrypted, the data contained in the file can also be read directly by a cyber pirate.

If the payload is unencrypted, textual information such as account numbers, login sequences, and passwords can be read and, if valuable, stolen and perverted for criminal purposes. If the payload contains video or pictographic information, some added work is required to determine which Layer 6 application-format the content employs, but once identified the content can be viewed, posted publically, or possibly used for blackmailing one or both of the communicating parties. Such cyber-assaults are referred to as a "man in the middle attack" because the cyber-pirate doesn't personally know either communicating party.

As described previously, since IP packet routing in the cloud is unpredictable, monitoring the cloud is more difficult because a cyber-pirate must capture and the IP packet's important information when it first encounters it, because subsequent packets may not follow the same route and the sniffed packet. Intercepting data in the last mile has a greater probability to observe a succession of related packets comprising the same conversation, because local routers normally follow a prescribed routing table, at least until packets reach a POP outside the customer's own carrier. For example, a client of Comcast will likely pass IP packets up the routing chain using an entirely Comcast-owned network till the packet moves geographically beyond Comcast's reach and customer service region.

If a succession of packets between the same two IP addresses occurs for a sufficiently long time, an entire conversation can be recreated piecemeal. For example, if SMS text messages are passed over the same network in the last mile, a cyber-pirate can identify through the IP addresses and port # s that multiple IP packets carrying the text represent a conversation between the same two devices, i.e. a cell phone and notebook. So even if an account number and password were texted in different messages or sent incompletely spread over many packets, the consistency of the packet identifiers still makes it possible for a cyber pirate to reassemble the conversation and steal the account info. Once the account info is stolen, they can either transfer money to an offshore bank or even usurp the account authority by changing the account password and security questions, i.e. using identity theft on a temporary basis.

Even if the payload is encrypted, the rest of IP packet including the IP addresses and port # s are not. After repeatedly sniffing a large number of IP packets, a cyber pirate with access to sufficient computing power can by shear brute force, systematically try every combination until they break the encryption password. Once the key is broken, the packet and all subsequent packets can be decrypted and used by a cyber-pirate. The probability of cracking a login password by "password guessing" greatly improves if the packet sniffing is combined with user and account "profiling" described below. Notice in "man in the middle attacks" the communicating devices are not normally involved because the cyber pirate does not have direct access to them.

Port Interrogation—

Another method to break into a device is to use its IP address to interrogate many Layer-4 ports and see if any requests receive a reply. Once a cyber-pirate identifies from packet sniffing or other means the IP address of a targeted device, the cyber-pirate can launch a sequence of interrogations to ports on the device looking for any unsecure or open port, service and maintenance port, or application backdoor. While a hacker's interrogation program can systematically cycle through every port #, attacks generally focus on notoriously vulnerable ports such as port #7 for ping, port #21 for FTP, port #23 for telnet terminal emulation, port #25 for simple email, and so on. Every time a pirate sends packets, to which the device responds, the pirate learns something more about the operating system of the targeted device.

In the port interrogation process, a cyber pirate doesn't want to expose their real identity so they will use a disguised pseudo-address to receive messages but that is not traceable to them personally. Alternatively, cybercriminals may use a stolen computer and account, so it looks like someone else is trying to hack the targeted device, and if traced, leads investigators back to an innocent person and not to them.

Profiling—

User and account profiling is the process where a cyber pirate performs research using publically available information to learn about a target, their accounts, and their personal history in order to crack passwords, identify accounts, and determine assets. Once a hacker obtains the IP address of a target using sniffing or other means, the traceroute utility can be used to find the DNS server of the device's account. Then by utilizing the "Who is" function on the Internet, the name of the account owner can be discovered. In profiling, a cybercriminal then searches on the Internet to gather all available information on the account owner. Sources of information include public records such as property deeds, car registration, marriages and divorces, tax liens, parking tickets, traffic violations, criminal records, etc. In many cases, web sites from universities and professional societies also include home address, email addresses, phone numbers and an individual's birthdate. By researching social media sites such as Facebook, Linked In, Twitter, and others, a cybercriminal can amass a significant detailed information including family and friends, pets' names, previous home addresses, classmates, major events in someone's life, as well as photographic and video files, including embarrassing events, family secrets, and personal enemies.

The cyber pirate's next step is to use this profile to "guess" a user's passwords based on their profile to hack the target device and other accounts of the same individual. Once a cybercriminal cracks one device's password, the likelihood is great they can break into other accounts because people tend to reuse their passwords for ease of memorizing. At that point, it may be possible to steal a person's identity, transfer money, make them a target of police investigations, and essentially destroy someone's life while stealing all their wealth. For example, as described in the opening section of this disclosure, amassing a long list of passwords from stolen accounts, cybercriminals used the same passwords to illegally purchase millions of dollars of premium tickets to concerts and sporting events using the same passwords and login information.

Imposters—

When a cyber pirate impersonates someone they are not or uses illegally obtained cyber-security credentials to gain access to communication and files under the false pretense of being an authorized agent or device, the cyber-pirate is acting as an "imposter". The imposter type of cyber-assault can occur when a cybercriminal has sufficient information or access to an individual's account to usurp a victim's account, sending messages on their behalf and misrepresenting them as the owner of the hacked account. Recently, for example, a personal friend of one of the inventors had her "Line" personal messenger account hacked. After taking over the account, the cybercriminal sent messages to her friends misrepresenting that "she had a car accident and needed money as an emergency loan", including providing wiring instructions for where to send the money. Not knowing the account had been hacked her friends thought the request was real and rushed to her financial rescue. To avoid suspicion, the request sent to each friend was under $1,000 USD. Fortunately just before wiring money, one of her friends called her to double check the wiring info, and the fraud was uncovered. Without calling, no one would have never known the requests were from an imposter and the Line account owner would never have known the wire had been sent or even requested.

Another form of misrepresentation occurs when a device has granted security privileges and is enabled to exchange information with a server or other network-connected device, and by some means a cyber-pirate device disguises itself as the authorized server, whereby the victim's device willingly surrenders files and information to the pirate server not realizing the server is an imposter. This method was reportedly used to lure celebrities to backup private picture files with iCloud, except that the backup cloud was an imposter.

Another form of imposter occurs when someone with physical access to a person's phone or open browser performs an imposter transaction such as sending an email, answering a phone call, sending a text message from another person's account or device. The receiving party assumes because they are connected to a known device or account, that the person operating that device or account is its owner. The imposter can be a prank such as a friend posting embarrassing comments of Facebook or can be of a more personal nature where someone's spouse answers personal calls or intercepts private text messages of a private nature. The result of the unauthorized access can lead to jealousy, divorce, and vindictive legal proceedings. Leaving a device temporarily unsupervised in an office or café, e.g. to run to the toilet, presents another risk for an imposter to quickly access personal or corporate information, send unauthorized emails, transfer files, or download some form of malware into the device, as described in the following section entitled "infections".

Imposter-based cyber-assault is also significant when a device is stolen. In such events, even though the device is logged out, the thief has plenty of time in which to break the login code. The "find my computer" feature that is supposed to locate the stolen device on the network and wipe a computer's files the first time the cyber pirate logs on to the device, no longer works because tech-savvy criminals today know to activate the device only where there is no cellular or WiFi connection. This risk is especially great in the case of cell phones where the passline security is a simple four-number personal identification number or PIN. It's only a matter of time to break a PIN since there are only 9999 possible combinations.

The key issue to secure any device is to prevent access to imposters. Preventing imposters requires a robust means to authenticate a user's identity at regular intervals and to insure they are only authorized to access the information and privileges they need. Device security is oftentimes the weakest link in the chain. Once a device's security is defeated, the need for robust network security is moot.

Packet Hijacking—

Packet hijacking comprises a cyber-assault where the normal flow of packets through the network is diverted through a hostile device.

If for example, the integrity of a router is compromised by a cyber-assault from a cyber-pirate, IP packets traversing the router can be rewritten into a revised IP packet, diverting the IP package to a different destination address and port # of the cyber-pirate device. The cyber-pirate device then obtains whatever information it needs from the payload of the IP packet and possibly changes the content of the IP packet's payload. The fraudulent payload may be used to commit any number of fraudulent crimes, to gather information, or to download malware into the cell phone, described subsequently herein under the topic "infections".

The hijacked packet, is then retrofitted to appear like the original IP packet's source IP address and source port #, except that the packet travels through a new and different path. Alternatively the hijacked IP packet can be returned to the compromised router and then sent on to the cloud as before. In order to maximize the criminal benefit of packet hijacking, a cyber pirate needs to hide their identity in the packet hijacking, and for that reason they disguise the true routing of the IP packet so even the Layer-3 ICMP function "traceroute" would have difficulty in identifying the true path of the communication. If, however, the hijacking adds noticeable delay in packet routing, the unusual latency may prompt investigation by a network operator.

Cyber-Infections—

One of the most insidious categories of cyber-assault is that of "cyber-infections", installing malware into targeted devices or the network by which to gather information, commit fraud, redirect traffic, infect other devices, impair or shut down systems, or to cause denial of service failures. Cyber infections can be spread through emails, files, web sites, system extensions, application programs, or through networks. One general class of malware, "spyware" gathers all kinds of transactional information and passes it on to a cyber pirate. In the case of "phishing", a wen page or an application shell that appears like a familiar login page asks for account login or personal information then forwards the information to a cyber pirate. Still other malware infections can take control of hardware, e.g. control a router to execute the aforementioned packet hijacking. In these cases, the cyber pirate is attempting to gain information or control beneficially for their own purposes.

Another class of cyber-infections comprising viruses, worms, and Trojan-horses is designed to overwrite critical files, or to execute meaningless functions repeatedly to prevent a device from doing its normal tasks. Basically to deny services, degrade performance, or completely kill a device. These malevolent infections are intrinsically destructive and used for vindictive purposes, to disable a competitor's business from normal operation, or simply motivated for fun by a hacker wanting to see if it's possible.

Surveillance—

Bugging and surveillance goes beyond cybercrime. In such instances a private detective or an acquaintance is hired or coerced to installing a device or program into the target's personal devices to monitor their voice conversations, data exchanges, and location. The risk of being caught is greater because the detective must gain temporary access to the target device without the subject knowing it. For example, SIM cards are commercially available that can copy a phone's network access privileges but concurrently transmit information to a cybercriminal monitoring the target's calls and data traffic.

Other forms of surveillance involve the use of clandestine video cameras to monitor a person's every action and phone call, much as those located in casinos. Through video monitoring, a device's password or PIN can be learned simply by observing a user's keystrokes during their login process. With enough cameras in place, eventually once will record the login process. To access a camera network without raising suspicion, a cyber pirate can hack an existing camera surveillance system on buildings, in stores, or on the streets, and through access to someone's else's network monitor the behavior of unsuspecting victims. Combining video surveillance with packet sniffing provides an even more comprehensive data set for subsequently launching cyber-assaults.

Pirate Administration (Infiltration)—

One other means by which cyber pirates are able to gain information is by hacking and gaining access to system administration rights of a device, server, or network. So rather than gaining unauthorized access to one user's account, by hacking the system administrator's login, significant access and privileges become available to the cyber pirate without the knowledge of those using the system. Since the system administrator acts as a system's police, there is no one to catch their criminal activity—in essence; in a system or network with corrupted administration there is no one able to police the police.

Conclusion—

The ubiquity and interoperability that the Internet, packet-switched networks, and the nearly universal adoption of the seven-layer open source initiative network model, has over the last twenty years enabled global communication to expand on an unparalleled scale, connecting a wide range of devices ranging from smartphone to tablets, computers, smart TVs, cars and even to home appliances and light bulbs. The global adoption of the Internet Protocol or IP as the basis for Ethernet, cellular, WiFi, and cable TV connectivity not only has unified communication, but has greatly simplified the challenge for hackers and cybercriminals attempting to invade as many devices and systems as possible. Given the plethora of software and hardware methods now available to attack today's communication networks, clearly no single security method is sufficient as a sole defense. Instead what is needed is a systematic approach to secure every device, last-link, local telco/network and cloud network to insure their protection against sophisticated cyber-assaults. The methods utilized should deliver intrinsic cybersecurity and cyberprivacy without sacrificing QoS, network latency, video or sound quality. While encryption should remain an important element of developing this next generation in secure communication and data storage, the network's security must not rely solely on encryption methodologies.

SUMMARY OF THE INVENTION

In accordance with this invention, data (which is defined broadly to include text, audio, video, graphical, and all other kinds of digital information or files) is transmitted over a Secure Dynamic Communication Network and Protocol (SDNP) network or "cloud." The SDNP cloud includes a plurality of "nodes," sometimes referred to as "media nodes," that are individually hosted on servers or other types of computers or digital equipment (collectively referred to herein as "servers") located anywhere in the world. It is possible for two or more nodes to be located on a single server. Typically, the data is transmitted between the media nodes by light carried over fiber optic cables, by radio waves in the radio or microwave spectrum, by electrical signals conducted on copper wires or coaxial cable, or by satellite communication, but the invention broadly includes any means by which digital data can be transmitted from one point to another. The SDNP network includes the SDNP cloud as well as the "Last Mile" links between the SDNP cloud and client devices such as cell phones, tablets, notebook and desktop computers, mobile consumer electronic devices, as well as Internet-of-Things devices and appliances, automobiles and other vehicles. Last Mile communication also includes cell phone towers, cable or fiber into the home, and public WiFi routers. Within the Last Mile, the link between the client device and the nearest cell phone tower or other re-transmitter is referred to as the "Last Link."

While in transit between the media nodes in the SDNP cloud, the data is in the form of "packets," discrete strings of digital bits that may be of fixed or variable length, and the data is disguised by employing the following techniques: scrambling, encryption or splitting—or their inverse processes, unscrambling, decryption and mixing. (Note: As used herein, unless the context indicates otherwise, the word "or" is used in its conjunctive (and/or) sense.)

Scrambling entails reordering the data within a data packet; for example, data segments A, B and C which appear in that order in the packet are re-ordered into the sequence C, A and B. The reverse of the scrambling operation is referred to as "unscrambling" and entails rearranging the data within a packet to the order in which it originally appeared—A, B and C in the above example. The combined operation of unscrambling and then scrambling a data packet is referred to as "re-scrambling." In re-scrambling a packet that was previously scrambled, the packet may be scrambled in a manner that is the same as, or different from, the prior scrambling operation.

The second operation, "encryption," is the encoding of the data in a packet into a form, called ciphertext, that can be understood only by the sender and other authorized parties, and who must perform the inverse operation—"decryption"—in order to do so. The combined operation of decrypting a ciphertext data packet and then encrypting it again, typically but not necessarily using a method that is different from the method used in encrypting it previously, is referred to herein as "re-encryption."

The third operation, "splitting," as the name implies, involves splitting up the packet into two or more smaller packets. The inverse operation, "mixing," is defined as recombining two or more packets into a single packet. Splitting a packet that was previously split and then mixed may be done in a manner that is the same as, or different from, the prior splitting operation. The order of operations is reversible, whereby splitting may be undone by mixing and conversely mixing of multiple inputs into one output may be undone by splitting to recover the constituent components. (Note: Since scrambling and unscrambling, encryption and decryption, and splitting and mixing are inverse processes, knowledge of the algorithm or method that was used to perform one is all that is necessary to perform the inverse. Hence, when referring to a particular scrambling, encryption, or splitting algorithm herein, it will be understood that knowledge of that algorithm allows one to perform the inverse process.)

In accordance with the invention, a data packet that passes through an SDNP cloud is scrambled or encrypted, or it is subjected to either or both of these operations in combination with splitting. In addition, "junk" (i.e., meaningless) data may be added to the packet either to make the packet more difficult to decipher or to make the packet conform to a required length. Moreover, the packet may be parsed, i.e., separated into distinct pieces. In the computing vernacular, to parse is to divide a computer language statement, computer instruction, or data file into parts that can be made useful for the computer. Parsing may also be used to obscure the purpose of an instruction or data packet, or to arrange data into data packets having specified data lengths.

Although the format of the data packets follows the Internet Protocol, within the SDNP cloud, the addresses of the media nodes are not standard Internet addresses, i.e. they cannot be identified by any Internet DNS server. Hence, although the media nodes can technically receive data packets over the Internet, the media nodes will not recognize the addresses or respond to inquiries. Moreover, even if Internet users were to contact a media node, they could not access or examine the data inside the media node because the media node can recognize them as imposters lacking the necessary identifying credentials as a SDNP media node. Specifically, unless a media node is registered as a valid SDNP node running on a qualified server in the SDNP name server or its equivalent function, data packets sent from that node to other SDNP media nodes will be ignored and discarded. In a similar manner. only clients registered on an SDNP name server may contact a SDNP media node. Like unregistered servers, data packets received from sources other than registered SDNP clients will be ignored and immediately discarded.

In a relatively simple embodiment, referred to as "single route," the data packet traverses a single path through a series of media nodes in the SDNP cloud, and it is scrambled at the media node where it enters the cloud and unscrambled at the media node where the packet exits the cloud (these two nodes being referred to as "gateway nodes" or "gateway media nodes"). In a slightly more complex embodiment, the packet is re-scrambled at each media node using a scrambling method different from the one that was used at the prior media node. In other embodiments, the packet is also encrypted at the gateway node where it enters the cloud and decrypted at the gateway node where it exits the cloud, and in addition the packet may be re-encrypted at each media node it passes through in the cloud. Since a given node uses the same algorithm each time it scrambles or encrypts a packet, this embodiment is describes as "static" scrambling and encryption.

In a case where the packet is subjected to two or more operations, e.g., it is scrambled and encrypted, the inverse operations are preferably performed in an order opposite to the operations themselves, i.e. in reverse sequence. For example, if the packet is scrambled and then encrypted prior to leaving a media node, it is first decrypted and then unscrambled when it arrives at the following media node. The packet is recreated in its original form only while it is within a media node. While the packet is in transit between media nodes, it is scrambled, split or mixed, or encrypted.

In another embodiment, referred to as "multiroute" data transport, the packet is split at the gateway node, and the resulting multiple packets traverse the cloud in a series of "parallel" paths, with none of the paths sharing a media node with another path except at the gateway nodes. The multiple packets are then mixed to recreate the original packet, normally at the exit gateway mode. Thus, even if a hacker were able to understand the meaning of a single packet, they would have only a part of the entire message. The packet may also be scrambled and encrypted at the gateway node, either before or after it is split, and the multiple packets may be re-scrambled or re-encrypted at each media node they pass through.

In yet another embodiment, the packets do not travel over only a single path or a series of parallel paths in the SDNP cloud, but rather the packets may travel over a wide variety of paths, many of which intersect with each other. Since in this embodiment a picture of the possible paths resembles a mesh, this is referred to as "meshed transport." As with the embodiments described above, the packets may be scrambled, encrypted and split or mixed as they pass through the individual media nodes in the SDNP cloud.

The routes of the packets through the SDNP network are determined by a signaling function, which can be performed either by segments of the media nodes themselves or preferably, in "dual-channel" or "tri-channel" embodiments, by separate signaling nodes running on dedicated signaling servers. The signaling function determines the route of each packet as it leaves the transmitting client device (e.g., a cell phone), based on the condition (e.g., propagation delays) of the network and the priority and urgency of the call, and informs each of the media nodes along the route that it will receive the packet and instructs the node where to send it. Each packet is identified by a tag, and the signaling function instructs each media node what tag to apply to each of the packets it sends. In one embodiment, the data tag is included in a SDNP header or sub-header, a data field attached to each data sub-packet used to identify the sub-packet. Each sub-packet may contain data segments from one or multiple sources stored in specific data "slots" in the packet. Multiple sub-packets may be present within one larger data packet during data transport between any two media nodes.

The routing function is aligned with the splitting and mixing functions, since once a packet is split, the respective routes of each of the sub-packets into which it is split must be determined and the node where the sub-packets are recombined (mixed) must be instructed to mix them. A packet may be split once and then mixed, as in multiroute embodiments, or it may be split and mixed multiple times as it proceeds through the SDNP network to the exit gateway node. The determination of at which node a packet will be split, into how many sub-packets it will be split, the respective routes of the sub-packets, and at what node the sub-packets will be mixed so as to recreate the original packet, are all under the control of the signaling function, whether or not it is performed by separate signaling servers. A splitting algorithm may specify which data segments in a communication are to be included in each of the sub-packets, and the order and positions of the data segments in the sub-packets. A mixing algorithm reverses this process at the node where the sub-packets are mixed so as to recreate the original packet. Of course, if so instructed by the signaling function, that node may also split the packet again in accordance with a different splitting algorithm corresponding to the time or state when the splitting process occurs.

When a media node is instructed by the signaling function to send a plurality of packets to a particular destination media node on the "next hop" through the network, whether these packets are split packets (sub-packets) or whether they pertain to different messages, the media node may combine the packets into a single larger packet especially when multiple sub-packets share a common destination media node for their next hop (analogous to a post office putting a group of letters intended for a single address into a box and sending the box to the address).

In "dynamic" embodiments of the invention, the individual media nodes in the SDNP cloud do not use the same scrambling, encryption or splitting algorithms or methods on successive packets that pass through them. For example, a given media node might scramble, encrypt or split one packet using a particular scrambling, encryption or splitting algorithm, and then scramble, encrypt or split the next packet using a different scrambling, encryption or splitting algorithm. "Dynamic" operation greatly increases the difficulties faced by would-be hackers because they have only a short period of time (e.g., 100 msec) in which to understand the meaning of a packet, and even if they are successful, the usefulness of their knowledge would be short-lived.

In dynamic embodiments each media node is associated with what is known as a "DMZ server," which can be viewed as a part of the node that is isolated from the data transport part, and which has a database containing lists or tables ("selectors") of possible scrambling, encryption, and splitting algorithms that the media node might apply to outgoing packets. The selector is a part of a body of information referred to as "shared secrets," since the information is not known even to the media nodes, and since all DMZ servers have the same selectors at a given point in time.

When a media node receives a packet that has been scrambled, in dynamic embodiments it also receives a "seed" that is used to indicate to the receiving node what algorithm is to be used in unscrambling the packet. The seed is a disguised numerical value that has no meaning by itself but is based on a constantly changing state, such as the time at which the packet was scrambled by the prior media node. When the prior node scrambled the packet its associated DMZ server generated the seed based on the state. Of course, that state was also used by its associated DMZ server in selecting the algorithm to be used in scrambling the packet, which was sent to the sending media node in the form of an instruction as to how to scramble the packet. Thus the sending node received both the instruction on how to scramble the packet and the seed to be transmitted to the next media node. A seed generator operating within the DMZ server generates the seed using an algorithm based on the state at the time the process is executed. Although the seed generator and its algorithms are part of the media node's shared secrets, the generated seed is not secret because without access to the algorithms the numerical seed has no meaning.

Thus the next media note on the packet's route receives the scrambled packet and the seed that is derived from the state associated with the packet (e.g., the time at which it was scrambled). The seed may be included in the packet itself or it may be sent to the receiving node prior to the packet, either along the same route as the packet or via some other route, such as through a signaling server.

Regardless of how it receives the seed, the receiving node sends the seed to its DMZ server. Since that DMZ server has a selector or table of scrambling algorithms that are part of the shared secrets and are therefore the same as the selector in the sending node's DMZ server, it can use the seed to identify the algorithm that was used in scrambling the packet and can instruct the receiving node how to unscramble the packet. The receiving node thus recreates the packet in its unscrambled form, thereby recovering the original data. Typically, the packet will be scrambled again according to a different scrambling algorithm before it is transmitted to the next node. If so, the receiving node works with its DMZ server to obtain a scrambling algorithm and seed, and the process is repeated.

Thus, as the packet makes its way through the SDNP network, it is scrambled according to a different scrambling algorithm by each node, and a new seed is created at each node that enables the next node to unscramble the packet.

In an alternative embodiment of the invention, the actual state (e.g., time) may be transmitted between nodes (i.e., the sending node need not send a seed to the receiving node). The DMZ servers associated with both the sending and receiving media nodes contain hidden number generators (again, part of the shared secrets) that contain identical algorithms at any given point in time. The DMZ server associated with the sending node uses the state to generate a hidden number and the hidden number to determine the scrambling algorithm from a selector or table of possible scrambling algorithms. The sending node transmits the state to the receiving node. Unlike seeds, hidden numbers are never transmitted across the network but remain an exclusively private communication between the media node and its DMZ server. When the receiving media node receives the state for an incoming data packet, the hidden number generator in its associated DMZ server uses the state to generate an identical hidden number, which is then used with the selector or table to identify the algorithm to be used in unscrambling the packet. The state may be included with the packet or may be transmitted from the sending node to the receiving node prior to the packet or via some other route.

The techniques used in dynamic encryption and splitting are similar to that used in dynamic scrambling, but in dynamic encryption "keys" are used in addition to seeds. The shared secrets held by the DMZ servers include selectors or tables of encryption and splitting algorithms and key generators. In the case of symmetric key encryption, the sending node transmits a key to the receiving media node which can be used by the receiving node's DMZ server to identify the algorithm used in encrypting the packet and thereby decrypt the file. In the case of asymmetric key encryption, the media node requesting information, i.e. the receiving node first sends an encryption key to the node containing the data packet to be sent. The sending media node then encrypts the data in accordance with that encryption key. Only the receiving media node generating the encryption key holds the corresponding decryption key and the ability to decrypt the ciphertext created using the encryption key. Importantly, in asymmetric encryption access to the encryption key used for encryption does not provide any information as to how to decrypt the data packet.

In the case of splitting, the media node where the packet was split transmits a seed to the media node where the resulting sub-packets will be mixed, and the DMZ server associated with the mixing node uses that seed to identify the splitting algorithm and hence the algorithm to be used in mixing the sub-packets.

As indicated above, in dual- or tri-channel embodiments, the signaling function is performed by a signaling node operating on separate group of servers known as signaling servers. In such embodiments the seeds and keys may be transmitted through the signaling servers instead of from the sending media node directly to the receiving media node. Thus the sending media node may send a seed or key to a signaling server, and the signaling server may forward the seed or key to the receiving media node. As noted above, the signaling servers are responsible for designing the routes of the packet, so the signaling server knows the next media node to which each packet is directed.

To make things more difficult for would-be hackers, the list or table of possible scrambling, splitting or encryption methods in a selector may be "shuffled" periodically (e.g., hourly or daily) in such a way that the methods corresponding to particular seeds or keys are changed. Thus the encryption algorithm applied by a given media node to a packet created at time $t_1$ on Day 1 might be different from the encryption algorithm it applies to a packet created at the same time $t_1$ on Day 2.

Each of the DMZ servers is typically physically associated with one or more media nodes in the same "server farm." As noted above, a media node may request instructions on what to do with a packet it has received by providing its associated DMZ server with a seed or key (based for example on the time or state that the packet was created), but the media node cannot access the shared secrets or any other data or code within the DMZ server. The DMZ server responds to such requests by using the seed or key to determine what method the media node should use in unscrambling, decrypting or mixing a packet. For example, if the packet has been scrambled and the media node wants to know how to unscramble it, the DMZ server may examine a list (or selector) of scrambling algorithms to find the particular algorithm that corresponds to the seed. The DMZ then instructs the media node to unscramble the packet in accordance with that algorithm. In short, the media node transmits inquiries embodied in seeds or keys to the DMZ server, and the DMZ server responds to those inquiries with instructions.

While the media nodes are accessible through the Internet (although they do not have DNS recognized IP addresses), the DMZ servers are completely isolated from the Internet having only local network connections via wires or optical fiber to the network connected media servers.

In "single-channel" embodiments, the seeds and keys are transmitted between the sending media node and the receiving media node as a part of the data packet itself, or they may be transmitted in a separate packet before the data packet on the same route as the data packet. For example, when encrypting a packet, media node #1 may include in the packet an encryption key based on the time at which the encryption was performed. When the packet arrives at media node #2, media node #2 transmits the key to its associated DMZ server, and the DMZ server may use the key to select a decryption method in its selector and to perform the decryption. Media node #2 may then ask its DMZ server how it should encrypt the packet again, before transmitting it to media node #3. Again, the DMZ server consults the selector, informs media node #2 what method it should use in encrypting the packet, and delivers to media node #2 a key that reflects a state corresponding to the encryption method. Media node #2 performs the encryption and transmits the encrypted packet and the key (either separately or as a part of the packet) to media node #3. The key may then be used in a similar manner by media node #3 to decrypt the packet, and so on. As a result, there is no single, static decryption method that a hacker could use in deciphering the packets.

The use of time or a dynamic "state" condition in the example above as the determinant of the scrambling encryption or splitting method to be embodied in the seed or key is only illustrative. Any changing parameter, e.g., the number of nodes that the packet has passed through, can also be used as the "state" in the seed or key for selecting the particular scrambling, encryption or splitting method to be used.

In "dual-channel" embodiments, the seeds and keys can be transmitted between the media nodes via a second "command and control" channel made up of signaling servers rather than being transported directly between the media nodes. The signaling nodes may also provide the media nodes with routing information and inform the media nodes along the route of a packet how the packet is to be split or mixed with other packets, and they instruct each media node to apply an identification "tag" to each packet transmitted so that the next media node(s) will be able to recognize the packet(s). The signaling servers preferably supply a given media node with only the last and next media node of a packet traversing the network. No individual media node knows the entire route of the packet through the SDNP cloud. In some embodiments the routing function may be split up among two or more signaling servers, with one signaling server determining the route to a particular media node, a second signaling server determining the route from there to another media node, and so on to the exit gateway node. In this manner, no single signaling server knows the complete routing of a data packet either.

In "tri-channel" embodiments, a third group of servers—called "name servers"—are used to identify elements within the SDNP cloud and to store information regarding the identity of devices connected to the SDNP cloud and their corresponding IP or SDNP addresses. In addition, the name servers constantly monitor the media nodes in the SDNP cloud, maintaining, for example, a current list of active media nodes and a table of propagation delays between every combination of media nodes in the cloud. In the first step in placing the call, a client device, such as a tablet, may send an IP packet to a name server, requesting an address and other information for the destination or person to be called. Moreover, a separate dedicated name server is used to operate as a first contact whenever a device first connects, i.e. registers, on the cloud.

As an added security benefit, separate security "zones," having different selectors, seed and key generators and other shared secrets, may be established within a single SDNP cloud. Adjacent zones are connected by bridge media nodes, which hold the shared secrets of both zones and have the ability to translate data formatted in accordance with the rules for one zone into data formatted in accordance with the rules for the other zone, and vice versa.

Similarly, for communication between different SDNP clouds, hosted for example by different service providers, a full-duplex (i.e., two-way) communication link is formed between interface bridge servers in each cloud. Each interface bridge server has access to the relevant shared secrets and other security items for each cloud.

An important advantage of the disclosed invention is that there is no single point of control in the SDNP network and that no node or server in the network has a complete picture as to how a given communication is occurring or how it may be dynamically changing.

For example, signaling nodes running on signaling servers know the route (or in some cases only only part of a route) by which a communication is occurring, but they do not have access to the data content being communicated and do not know who the real callers or clients are. Moreover, the signaling nodes do not have access to the shared secrets in a media node's DMZ servers, so they do not know how the data packets in transit are encrypted, scrambled, split or mixed, The SDNP name servers know the true phone numbers or IP addresses of the callers but do not have access to the data being communicated or the routing of the various packets and sub-packets. Like the signaling nodes, the name servers do not have access to the shared secrets in a media node's DMZ servers, so they do not know how the data packets in transit are encrypted, scrambled, split or mixed.

The SDNP media nodes actually transporting the media content have no idea who the callers communicating are nor do they know the route the various fragmented sub-packets are taking through the SDNP cloud. In fact each media node knows only what data packets to expect to arrive (identified by their tags or headers), and where to send them next, i.e. the "next hop," but the media nodes do not know how the data is encrypted, scrambled, mixed or split, nor do they know how to select an algorithm or decrypt a file using a state, a numeric seed, or a key. The knowhow required to correctly process incoming data packets' data segments is known only by the DMZ server, using its shared secrets, algorithms not accessible over the network or by the media node itself.

Another inventive aspect of the disclosed invention is its ability to reduce network latency and minimize propagation delay to provide superior quality of service (QoS) and eliminate echo or dropped calls by controlling the size of the data packets, i.e. sending more smaller data packets in parallel through the cloud rather than relying on one high bandwidth connection. The SDNP network's dynamic routing uses its knowledge of the network's node-to-node propagation delays to dynamically select the best route for any communication at that moment. In another embodiment, for high-priority clients the network can facilitate race routing, sending duplicate messages in fragmented form across the SDNP cloud selecting only the fastest data to recover the original sound or data content.

Among the many advantages of an SDNP system according to the invention, in parallel and "meshed transport" embodiments the packets may be fragmented as they transit the SDNP cloud, preventing potential hackers from understanding a message even if they are able to decipher an individual sub-packet or group of sub-packets, and in "dynamic" embodiments the scrambling, encryption and splitting methods applied to the packets are constantly changing, denying to a potential hacker any significant benefit from successfully deciphering a packet at a given point in time. Numerous additional advantages of embodiments of the invention will be readily evident to those of skill in the art from a review of the following description.

Similar security techniques may generally be applied in the "last mile" between an SDNP cloud and a client device, such as a cell phone or a tablet. The client device is normally placed in a separate security zone from the cloud, and it may first become an authorized SDNP client, a step that involves installing in the client device a software package specific to the device's security zone, typically via a download from an SDNP administration server. The client device is linked to the SDNP cloud through a gateway media node (sometimes referred to as just a "gateway") in the cloud. The gateway media node has access to the shared secrets pertaining to both the cloud and the client's device's security zone, but the client device does not have access to the shared secrets pertaining to the SDNP cloud.

As an added level of security, the client devices may exchange seeds and keys directly with each other via the signaling servers. Thus a transmitting client device may send a seed and/or key directly to the receiving client device. In such embodiments the packet received by the receiving client device will be in the same scrambled or encrypted form as the packet leaving the sending client device. The receiving client device can therefore use the seed or key that it receives from the sending client device to unscramble or decrypt the packet. The exchange of seeds and keys directly between client devices is in addition to the SDNP network's own dynamic scrambling and encrypting, and it thus represents an added level of security called nested security.

In addition, a client device or the gateway node with which it communicates may mix packets that represent the same kind of data—e.g. voice packets, text message files, documents, pieces of software, or that represent dissimilar types of information, e.g. one voice packet and one text file, one text packet, and one video or photo image—before the packets reach the SDNP network, and the exit gateway node or destination client device may split the mixed packet to recover the original packets. This is in addition to any scrambling, encryption or splitting that occurs in the SDNP network. In such cases, the sending client device may send the receiving client device a seed instructing it how to split the packet so as to recreate the original packets that were mixed in the sending client device or gateway media node. Performing successive mixing and splitting may comprise a linear sequence of operations or alternatively utilize a nested architecture where the clients execute their own security measures and so does the SDNP cloud.

To further confuse would-be hackers, a client device may transmit successive packets (or sub-packets) in a single communication to different gateway nodes, and/or it may transmit them over different physical media links (cellular, WiFi, Ethernet cable, etc.)—a process referred to sometimes herein as "Multi-PHY" transmission. To add to the confusion, it may also include different source addresses in the successive packets, thereby preventing a hacker from identifying the packets as originating from the same client device.

The invention also includes unique advances in the handling of telephone conference calls. In a normal conference call packets are sent to all of the participants in the call. In accordance with this invention, certain designated participants may be "muted," i.e., excluded from the call by preventing a client device or other node from transmitting packets to the participant or participants who are to be muted. In an alternative embodiment data packets are sent in broadcast mode to all participants in the group call but using different encryption methods. In the case of normal conference calls the data packets are sent to all users using an encryption where all participants have a copy of the decryption key. In private mode or mute mode the data packets broadcasted to the users utilize a different encryption where only select users share the decryption key.

The security mechanisms intrinsic to communication using the SDNP network and protocol also render it perfectly suited for secure file and data storage. Since a normal communication over the SDNP network typically involves anonymous fragmented data transport of scrambled, encrypted data from one from one client device to another client device, file and data storage can be realized by, in effect, interrupting a communication in transit and storing it in one or more buffers indefinitely until the originating client device wishes to retrieve it. This distributed file storage is sometimes referred to herein as Disaggregated Data Storage.

BRIEF DESCRIPTION OF THE DRAWINGS

In the drawings listed below, components that are generally similar are given like reference numerals. It is noted, however, that not every component to which a given reference number is assigned is necessarily identical to another component having the same reference number. For example, an encryption operation having a particular reference number is not necessarily identical to another encryption operation with the same reference number. Furthermore, groups of components, e.g., servers in a network that are identified collectively by a single reference number are not necessarily identical to each other.

FIG. 9B is a block diagram illustrating SDNP security operations performed on incoming and outgoing data packets for single route Last Mile communication.

FIG. 9F is a graphical and tabular representation of a SDNP payload.

FIG. 10 is a schematic representation of SDNP cloud.

FIG. 30 illustrates last mile communication comprising an identity-verifiable HyperSecure wireless communication via satellite uplinks and downlinks to various devices including sat phones, airplanes, trains, ships, and home satellite receivers (set top boxes).

FIG. 52A is a table summarizing SDNP Last Mile routing over Ethernet.

FIG. 77C is a schematic representation of a "SDNP group call" using SDNP multi-route cloud transport and SDNP Last Mile communication in the direction from a zone U9 client to other clients on the same zone and in other zones.

FIG. 78 is a schematic representation of a "SDNP group call" using SDNP multi-route cloud transport and Last Mile communication to both SDNP clients and unsecured PSTN devices.

FIG. 79A is a tabular representation of regular call and private call operation in SDNP group calls.

FIG. 79B is a tabular representation of regular call and hyper-private call operation in SDNP group calls.

FIG. 80A is a tabular representation of regular and private push-to-talk operation in SDNP PTT group calls.

FIG. 80B is a tabular representation of regular and hyper-private push-to-talk operation in SDNP PTT group calls.

FIG. 81 is a schematic representation of data transport for a write-operation in HyperSecure file storage of fragmented data.

FIG. 82A is a schematic representation of data flow for a write-operation in HyperSecure file storage of fragmented data.

FIG. 82B is a schematic representation of data flow for a read-operation in HyperSecure file storage of fragmented data.

FIG. 83 is a schematic representation of data transport for a read-operation in HyperSecure file storage of fragmented data.

FIG. 84A illustrates various examples of SDNP cloud connected file storage solutions.

FIG. 84B is a schematic representation of a distributed HyperSecure file storage network comprising local and cloud connected storage servers.

Figure 85A:
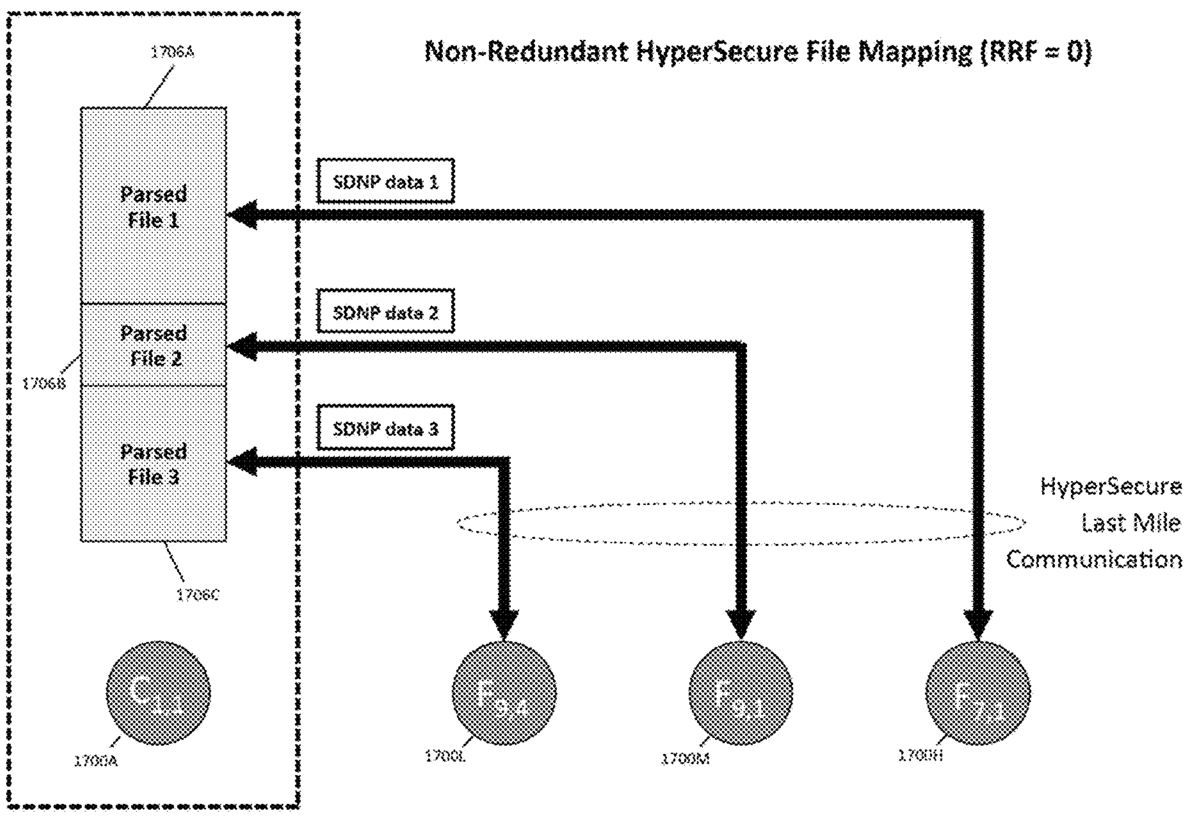

FIG. 85A is a file mapping for non-redundant (RRF=0) HyperSecure file storage.

Figure 85B:
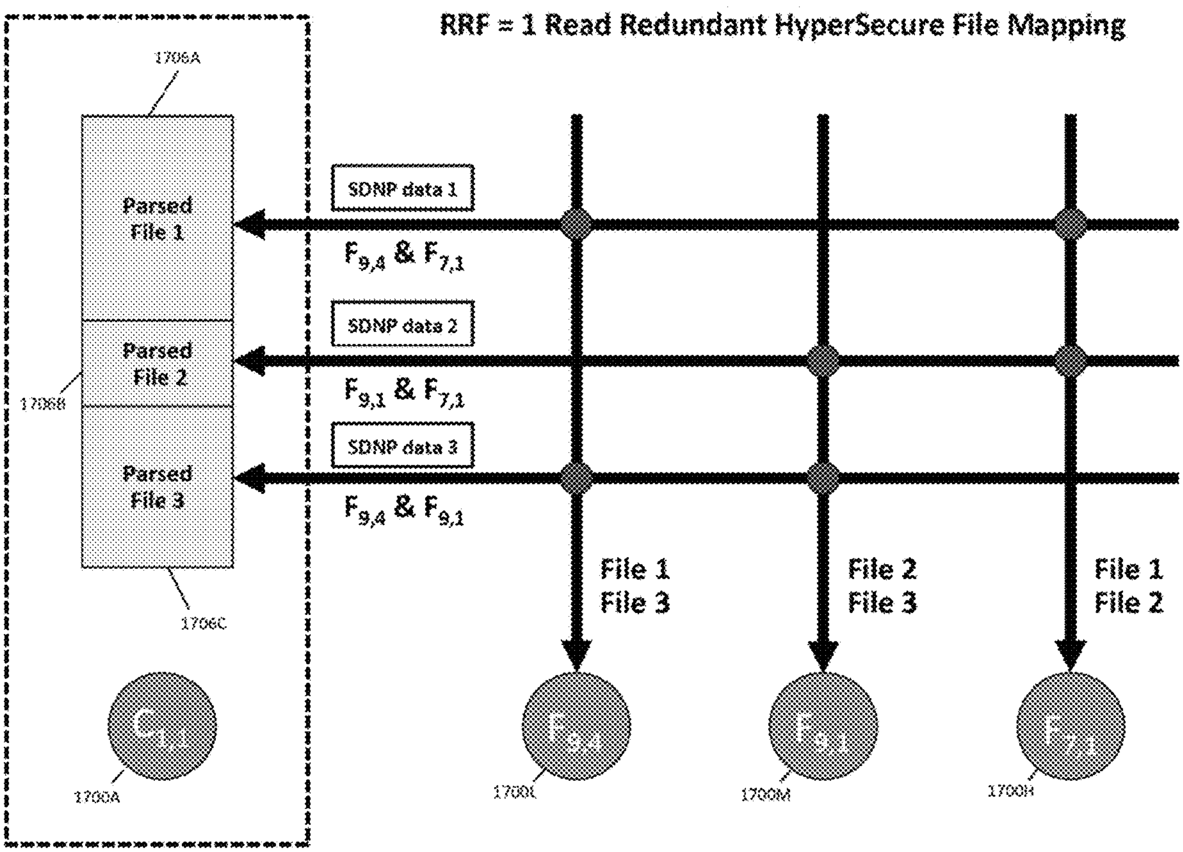

FIG. 85B is a file mapping for RRF=1 read redundant HyperSecure file storage.

Figure 85C:
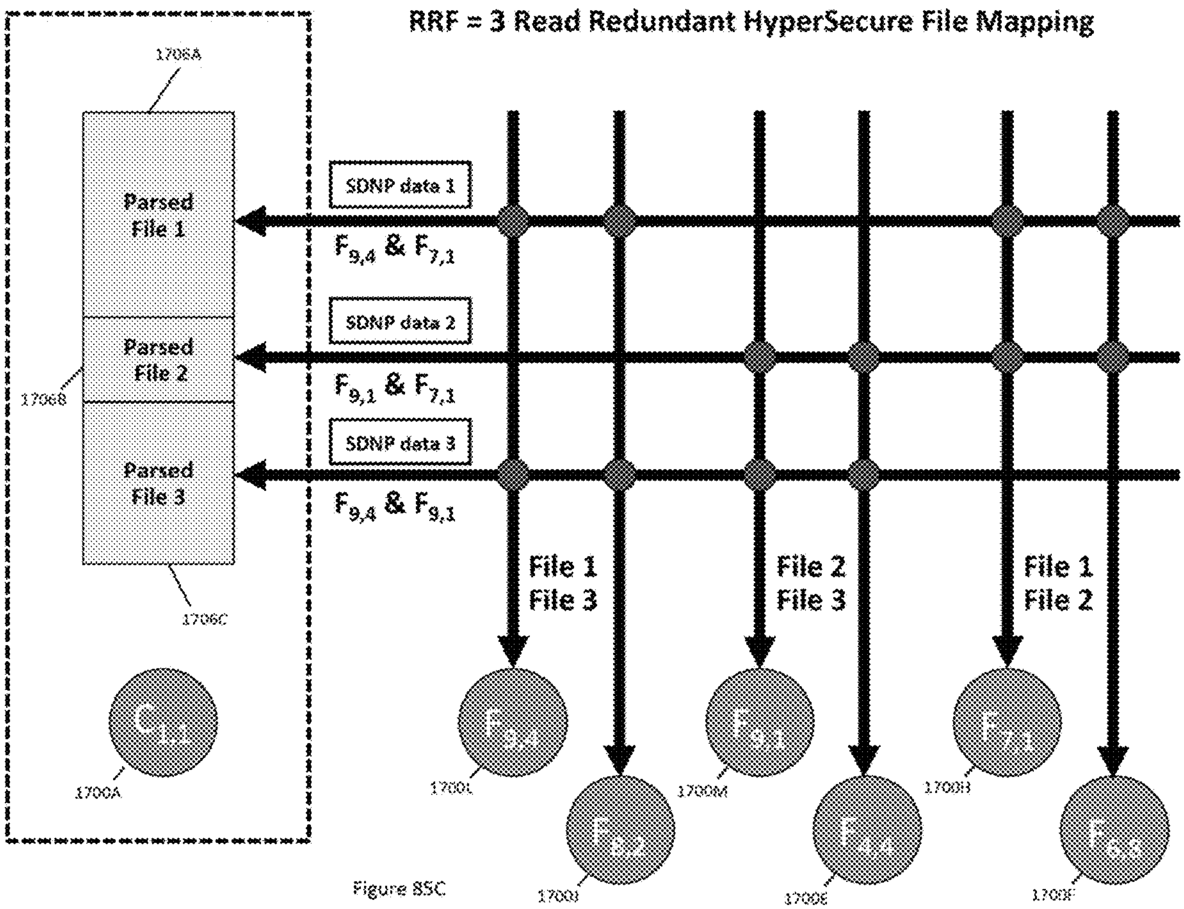

FIG. 85C is a file mapping for RRF=2 read redundant HyperSecure file storage.

Figure 86:
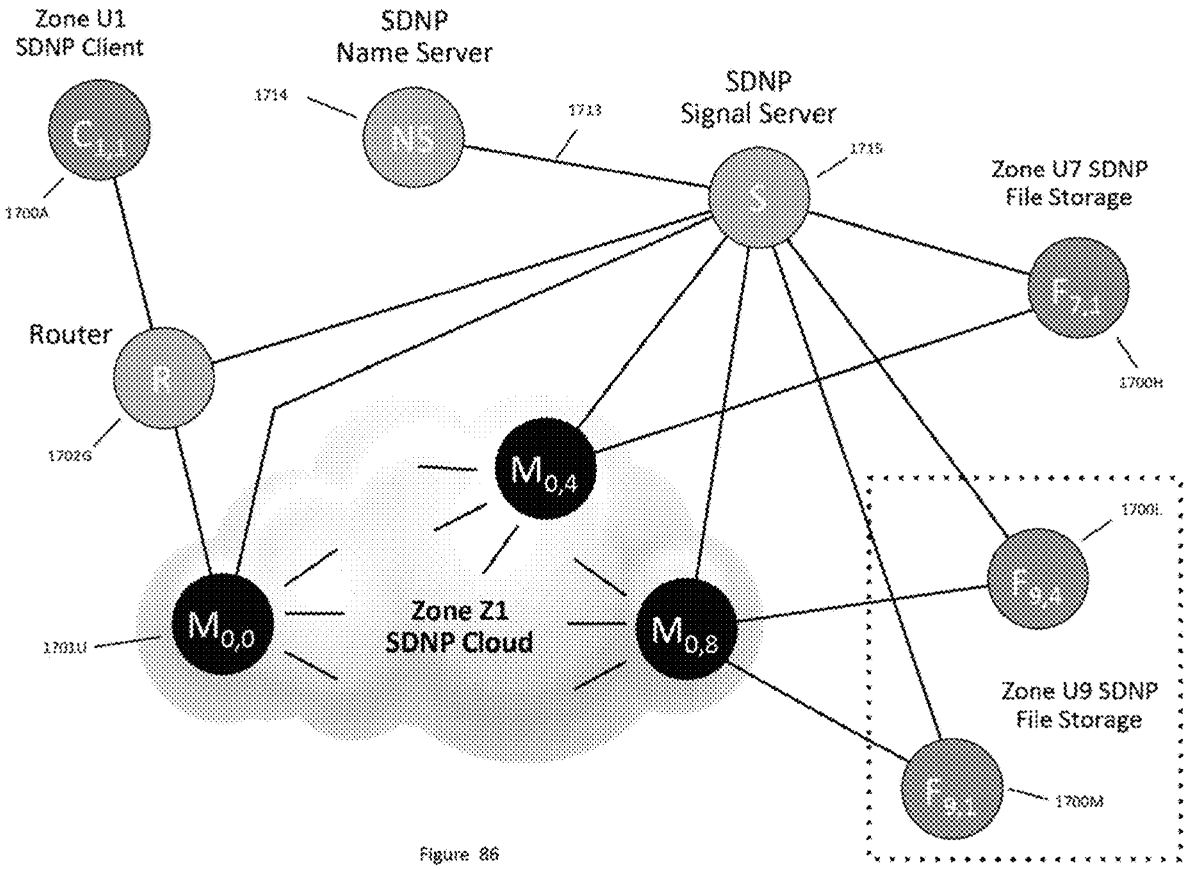

FIG. 86 is a network map for a distributed HyperSecure file storage system using tri-channel network communication.

Figure 87A:
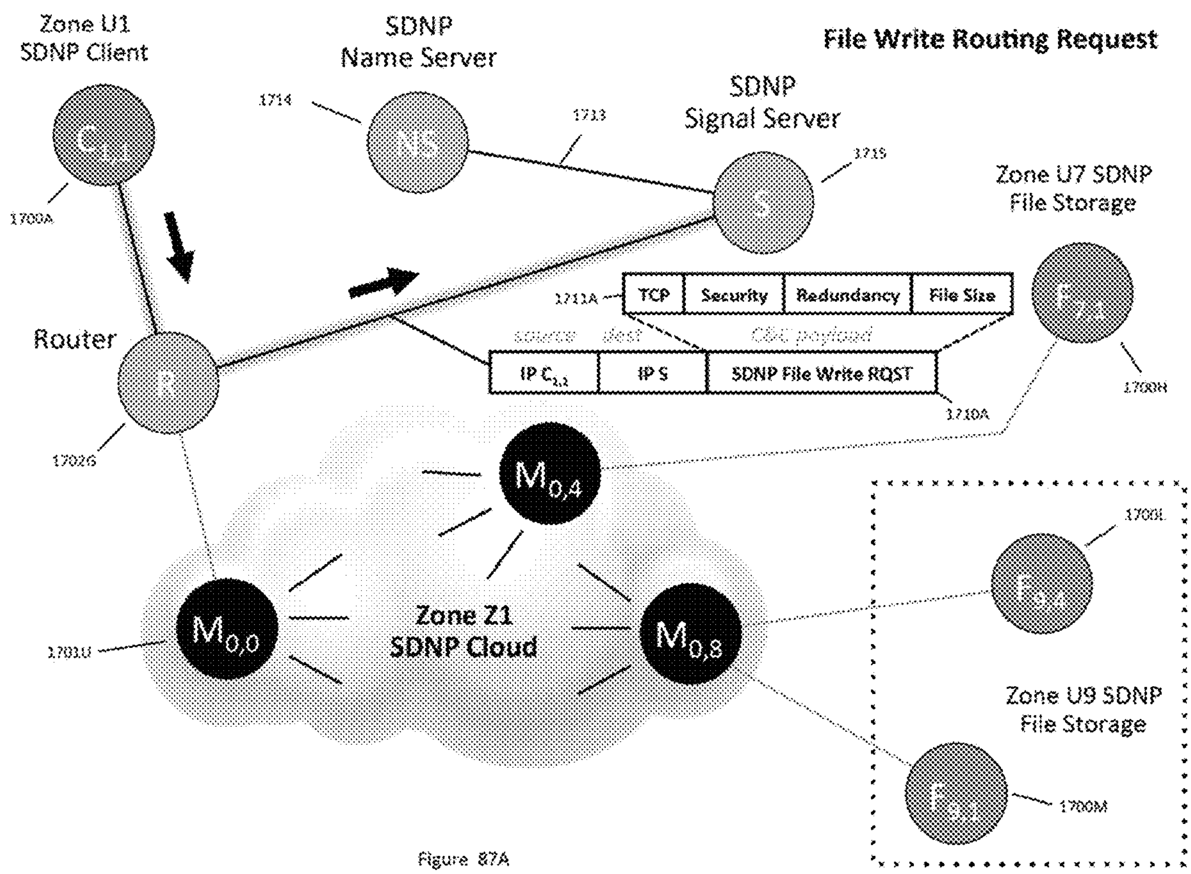

FIG. 87A illustrates the file write request operation in a distributed HyperSecure file storage system.

Figure 87B:
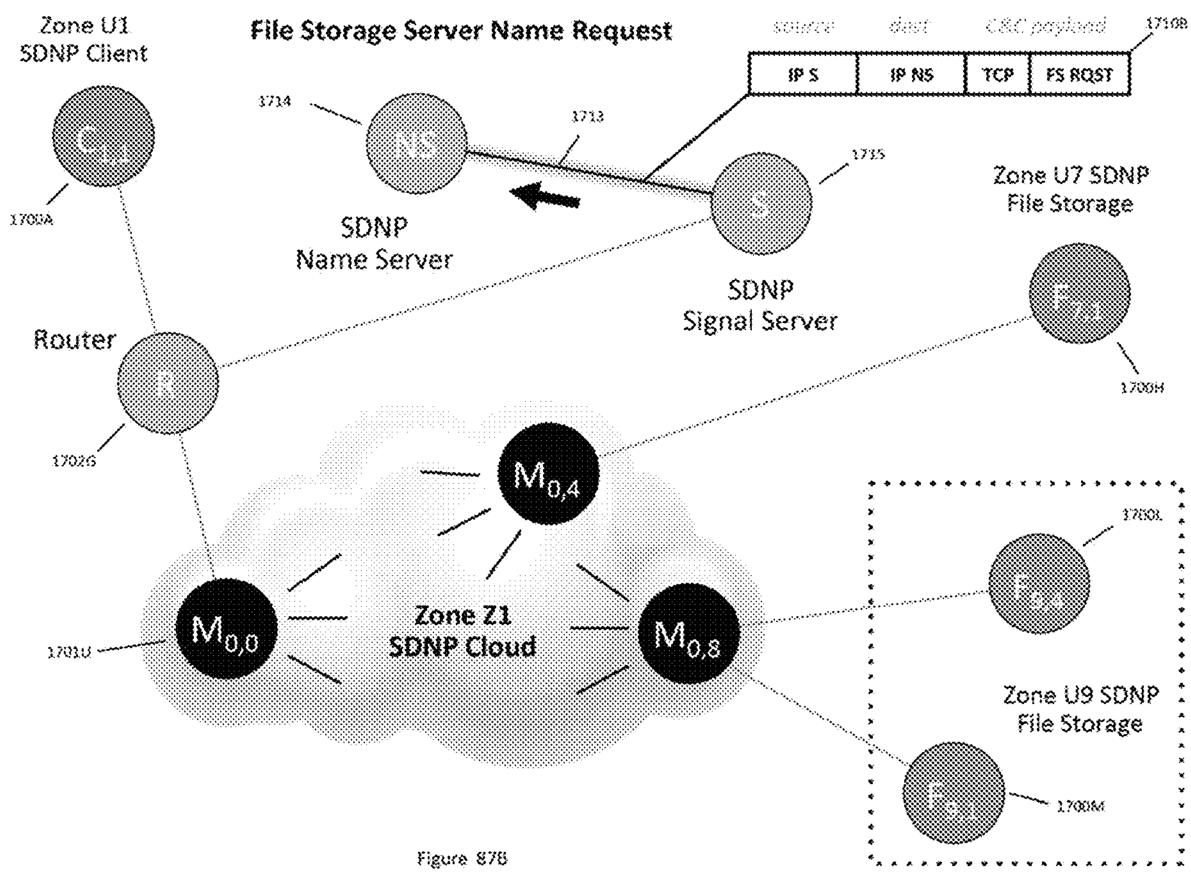

FIG. 87B illustrates the file server name request operation in a distributed HyperSecure file storage system.

Figure 87C:
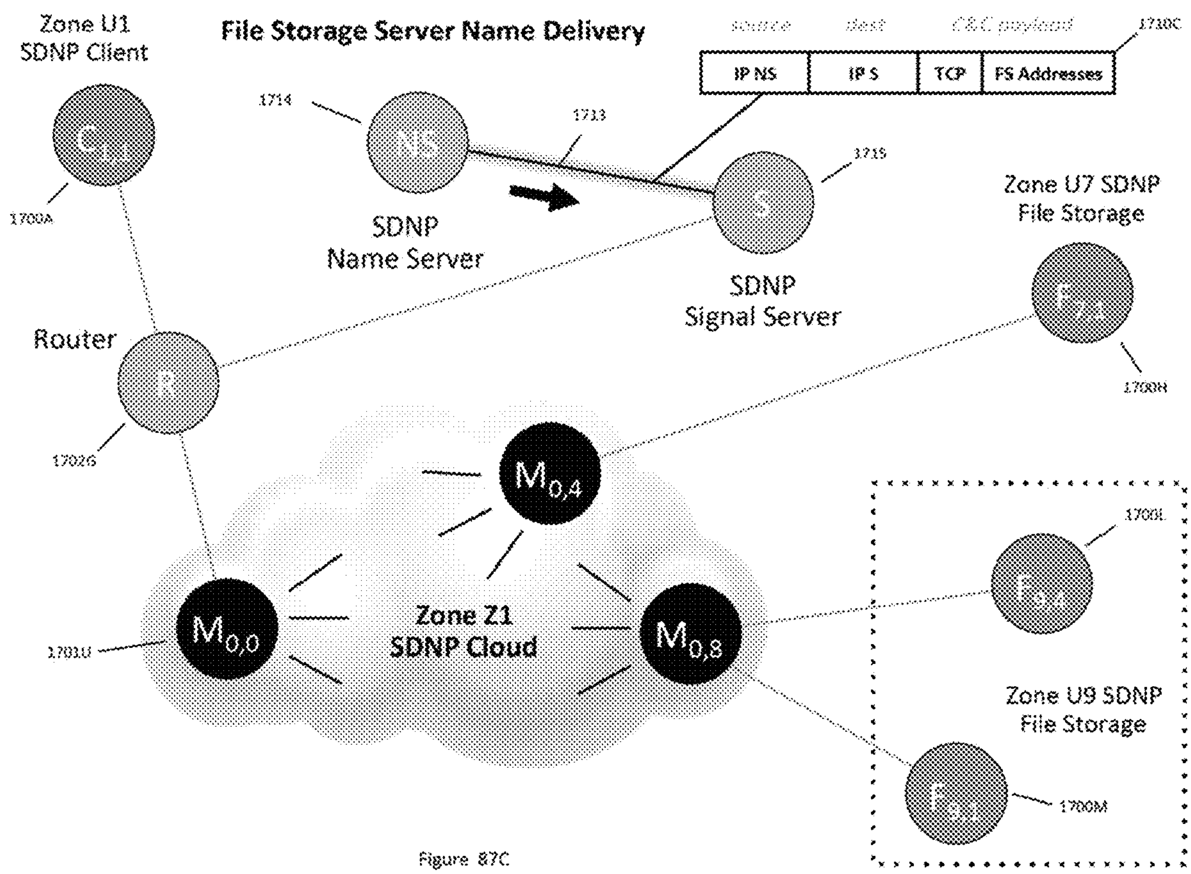

FIG. 87C illustrates the signaling server planning operation in a distributed HyperSecure file storage system.

Figure 87D:
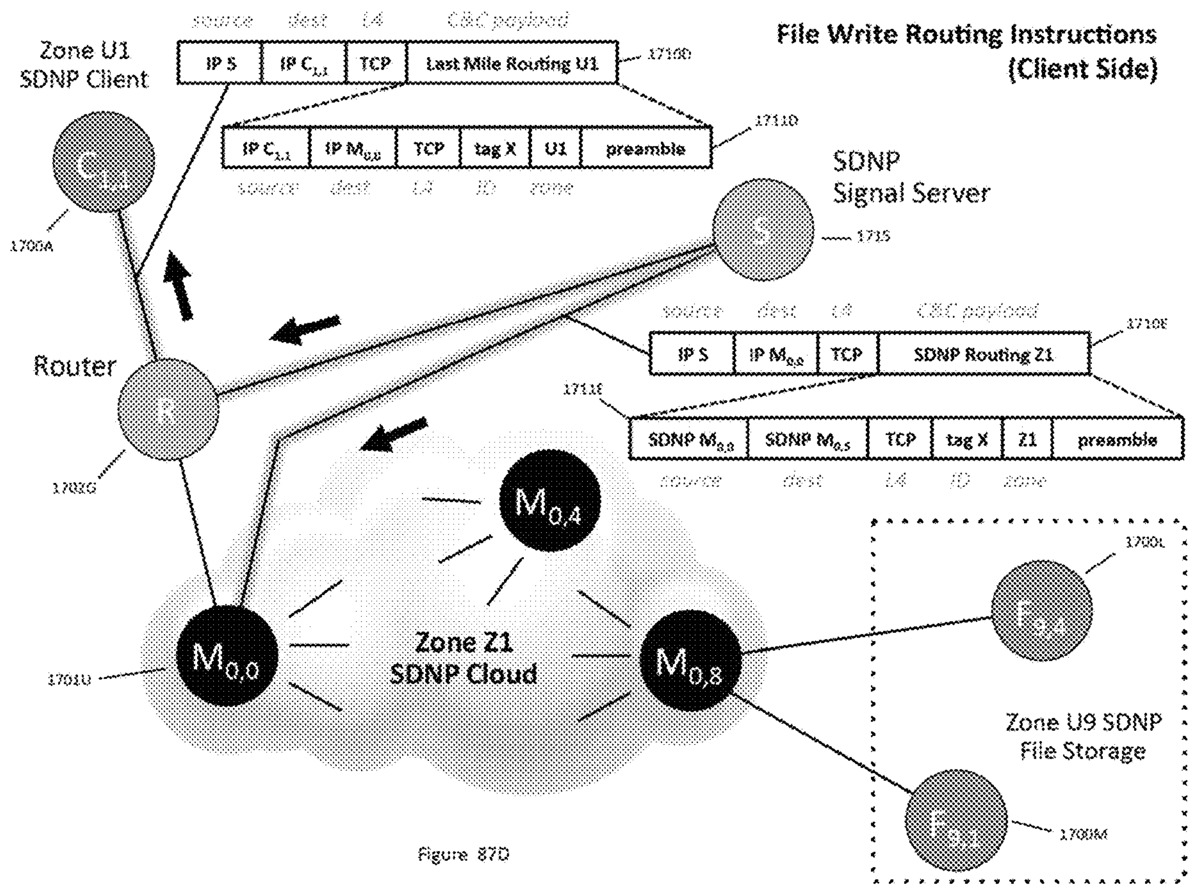

FIG. 87D illustrates the signaling server client-side Last Mile and SDNP cloud write routing instruction in a distributed HyperSecure file storage system.

Figure 87E:
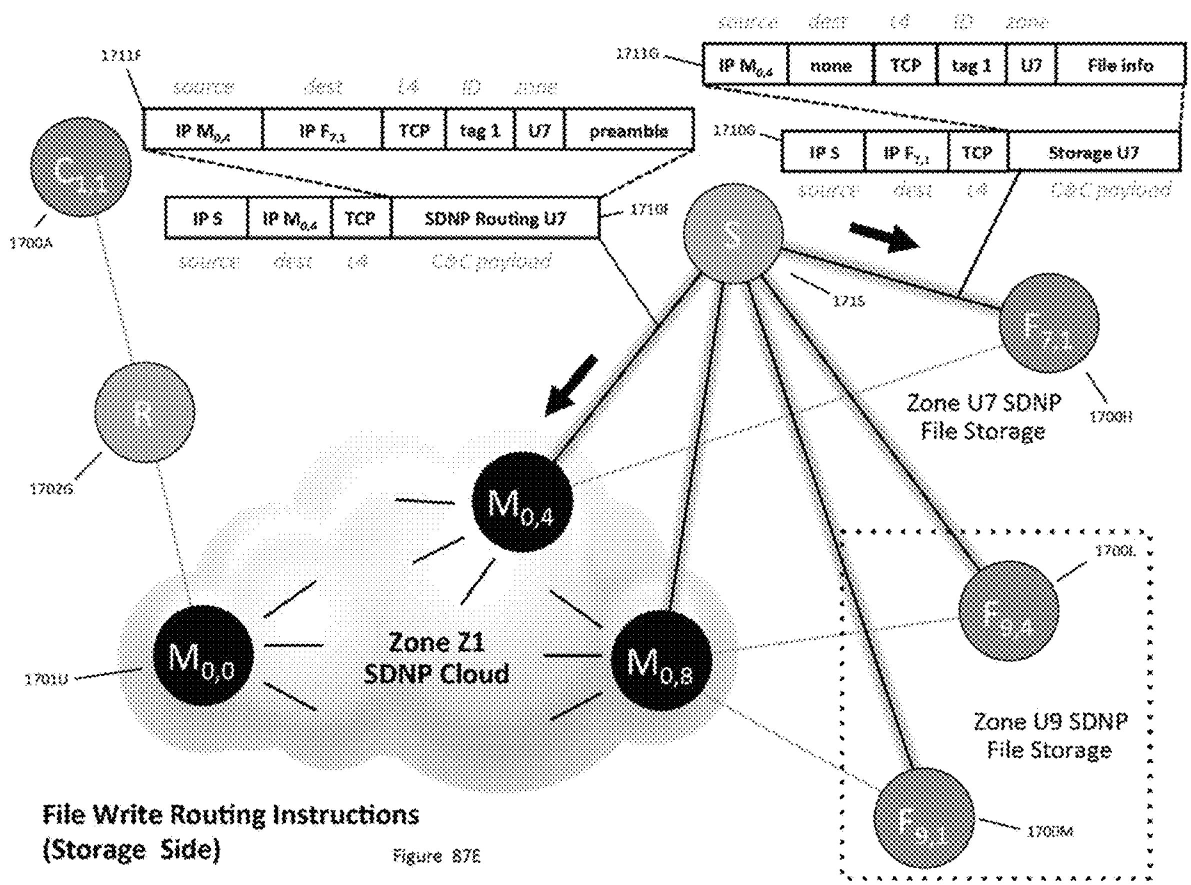

FIG. 87E illustrates the signaling server storage-side Last Mile and SDNP cloud write routing instruction in a distributed HyperSecure file storage system.

Figure 88:
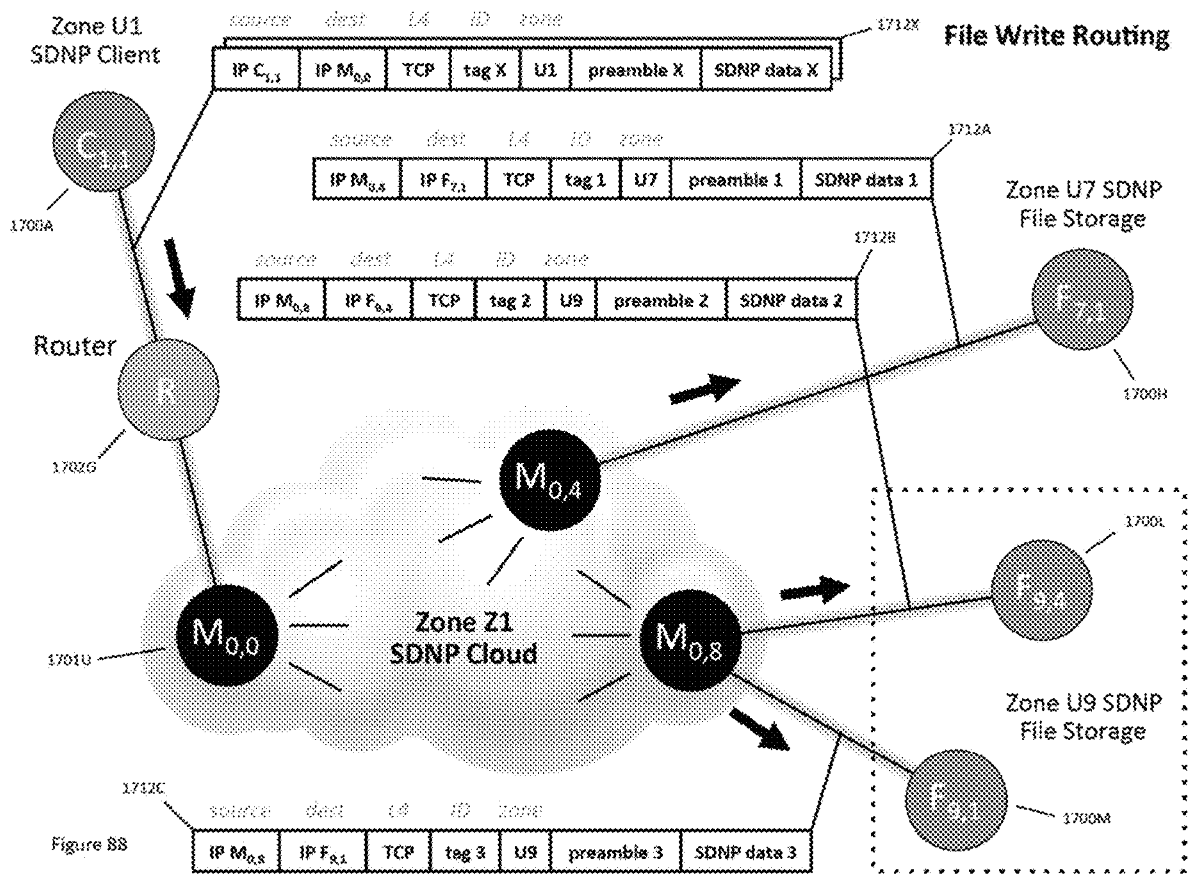

FIG. 88 illustrates file transfer in a distributed HyperSecure file storage system.

Figure 89A:
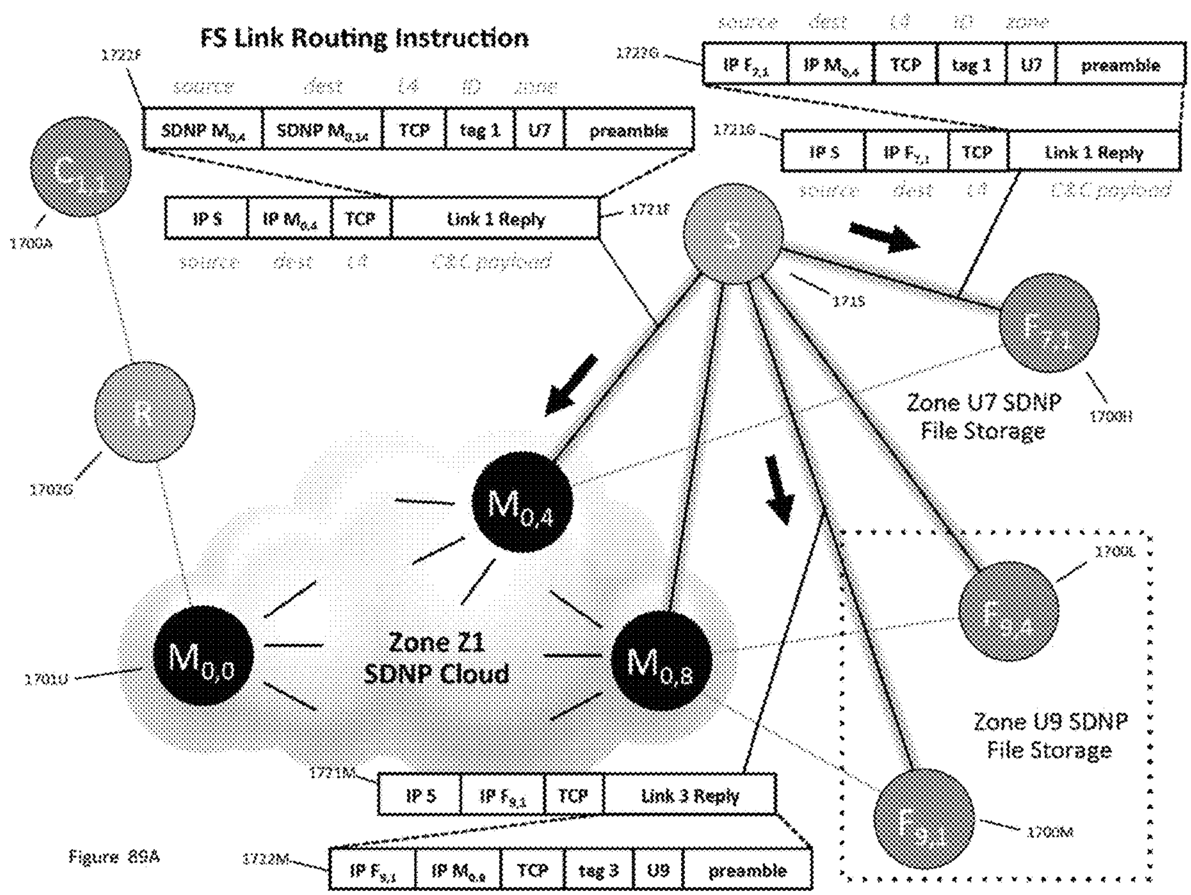

FIG. 89A illustrates link reply confirming file storage and write operation in a distributed HyperSecure file storage system.

Figure 89B:
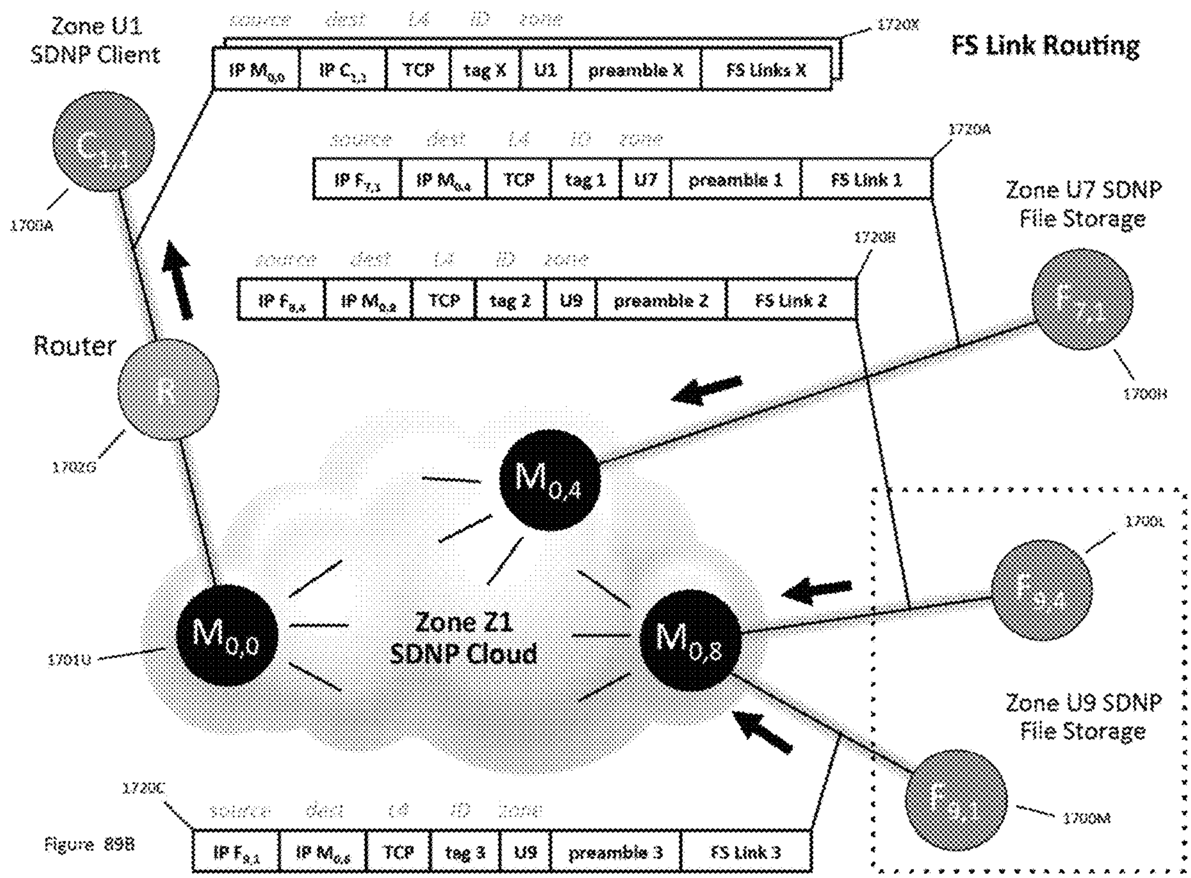

FIG. 89B illustrates file storage server link transfers in a distributed HyperSecure file storage system.

Figure 89C:
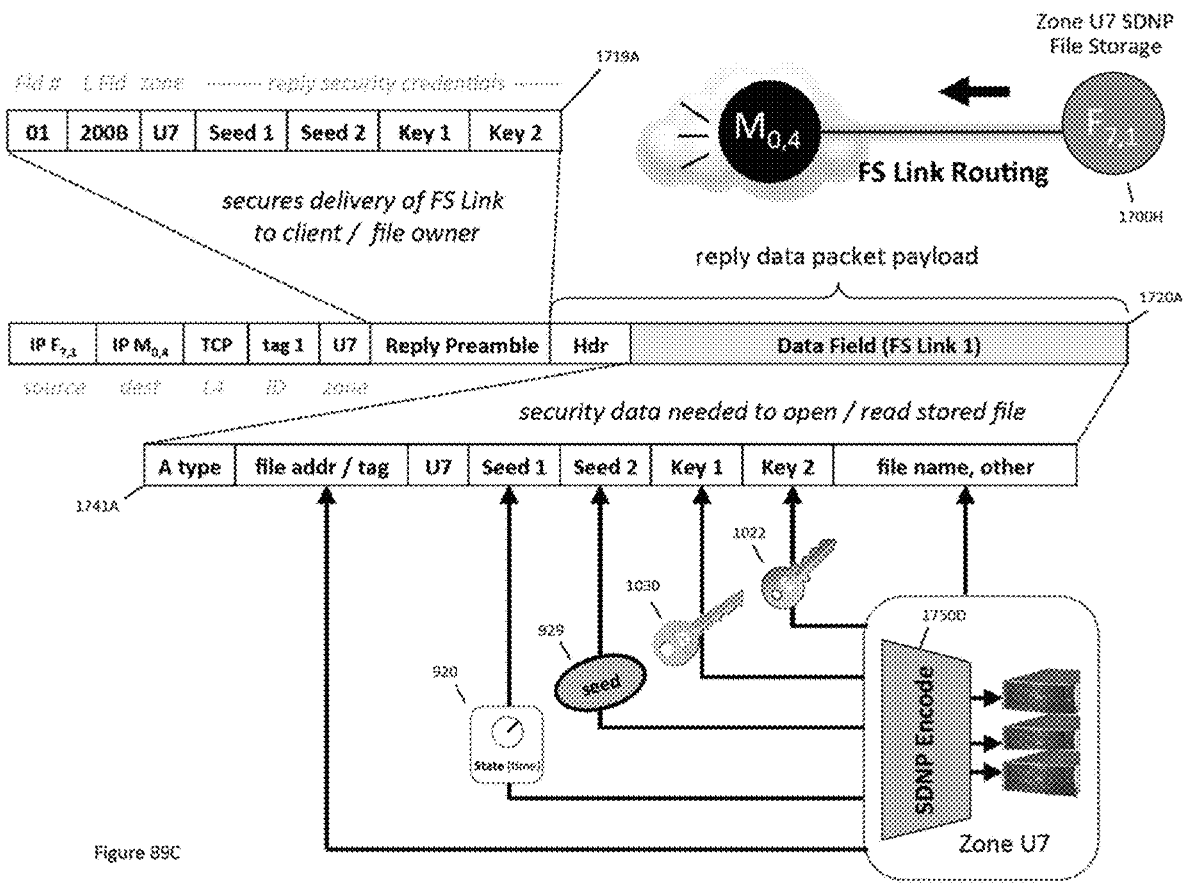

FIG. 89C illustrates file storage server write confirmation data packet containing FS link.

Figure 89D:
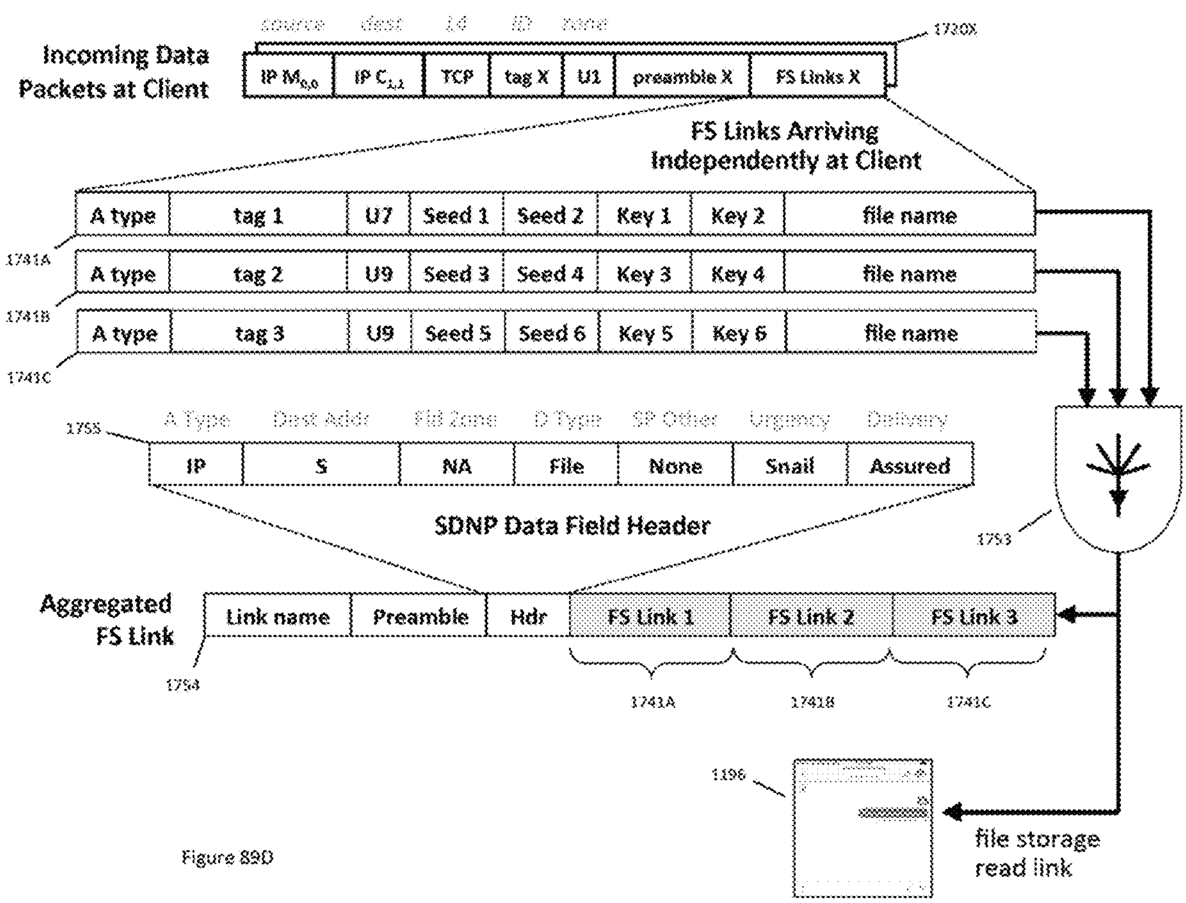
Figure 90A:
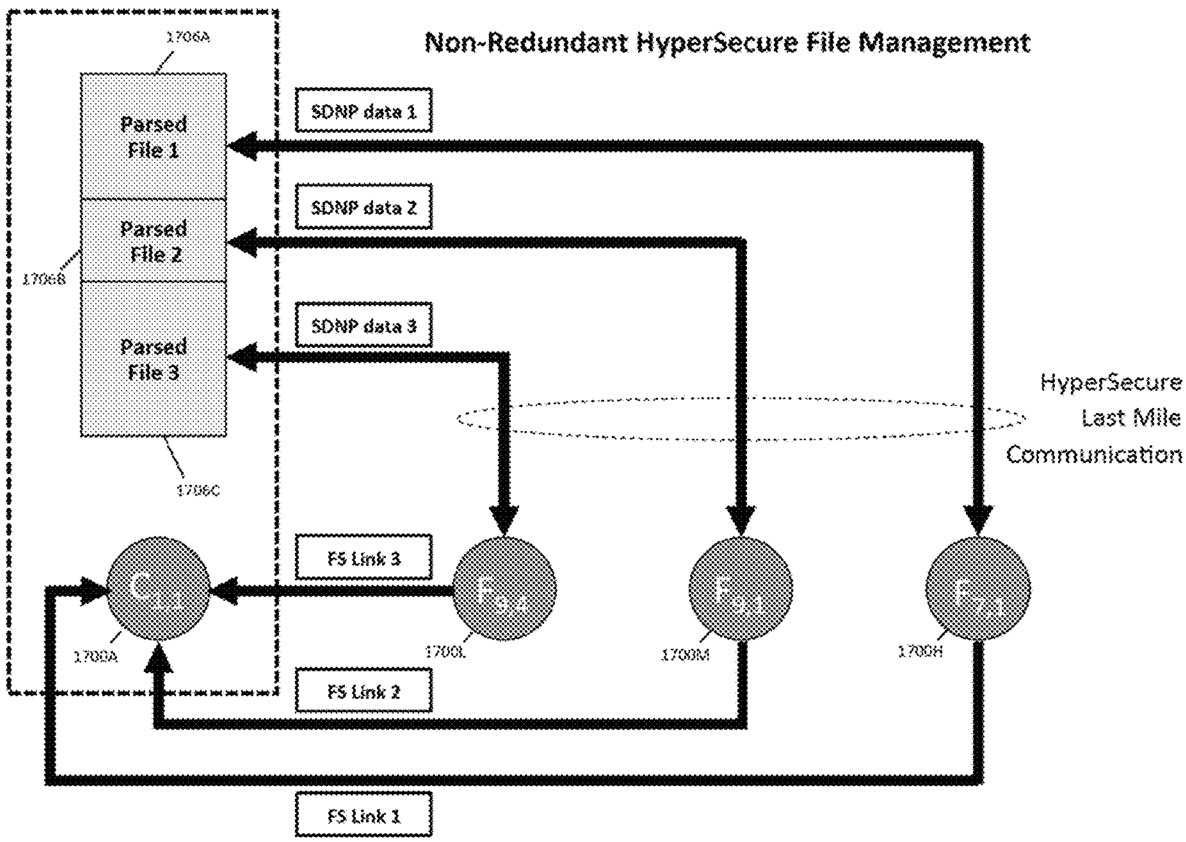

FIG. 89D illustrates synthesis of a file storage read link in a client's SDNP messenger FIG. 90A is a file map of non-redundant RRF=0 HyperSecure file storage with LRF=0 non-redundant FS links.

Figure 90B:
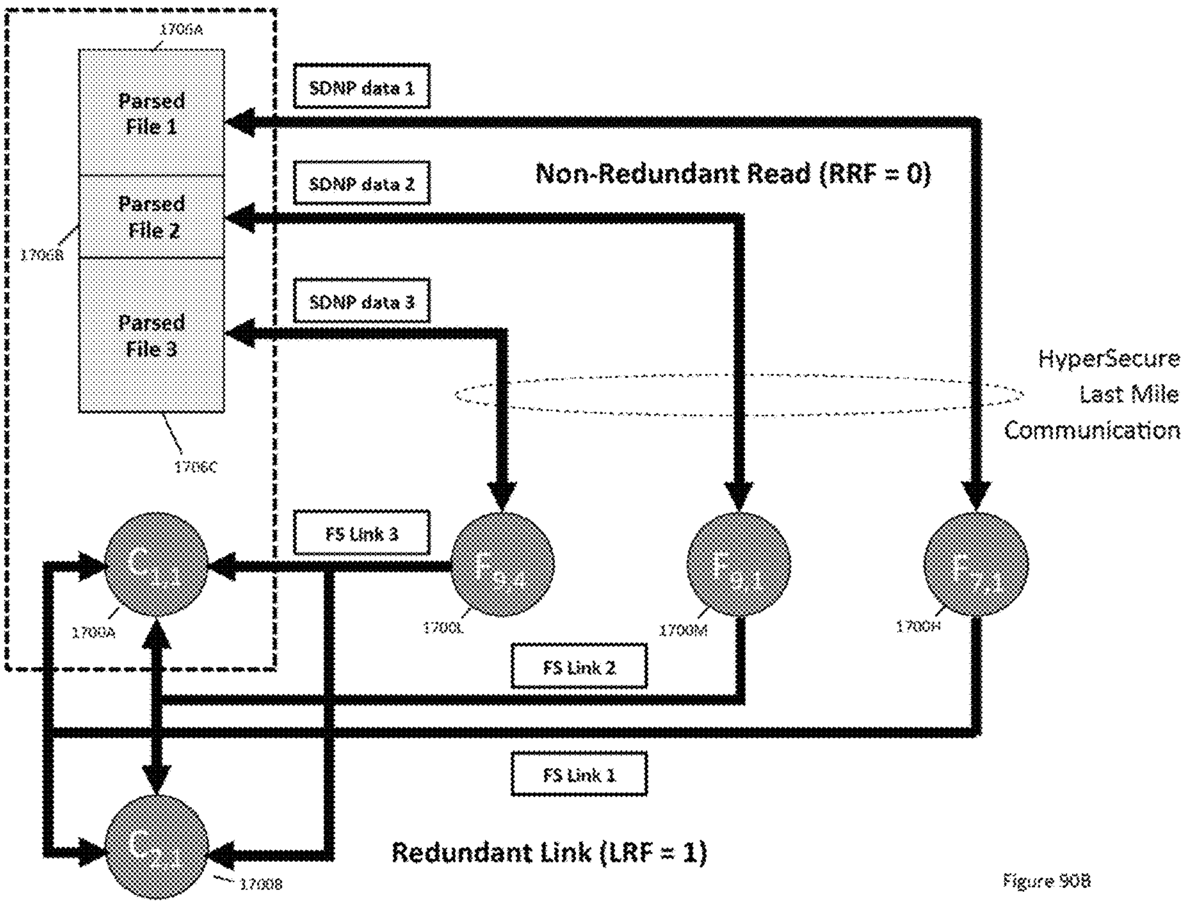

FIG. 90B is a file map of non-redundant RRF=0 HyperSecure file storage with LRF=1 redundant FS links.

Figure 90C:
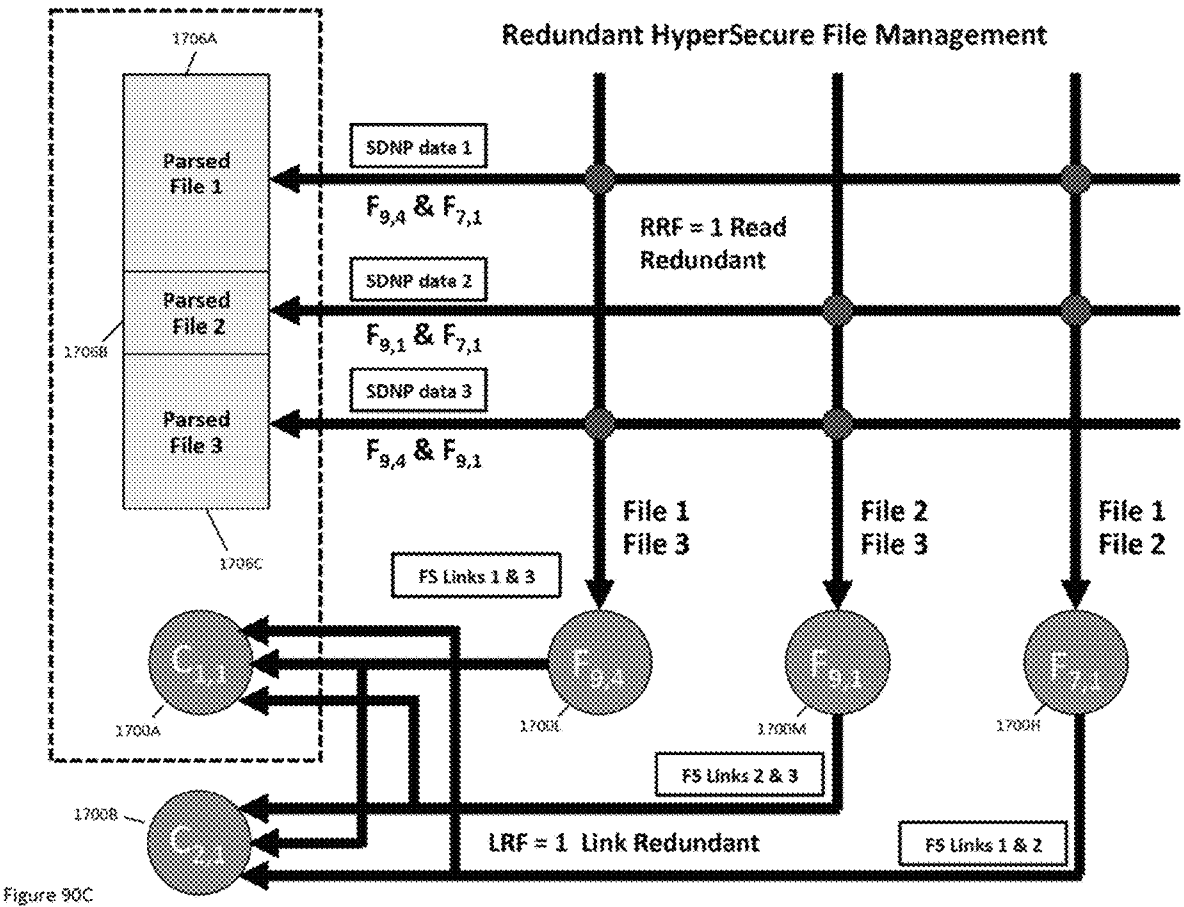

FIG. 90C is a file map of non-redundant RRF=1 HyperSecure file storage with LRF=1 redundant FS links.

Figure 91:
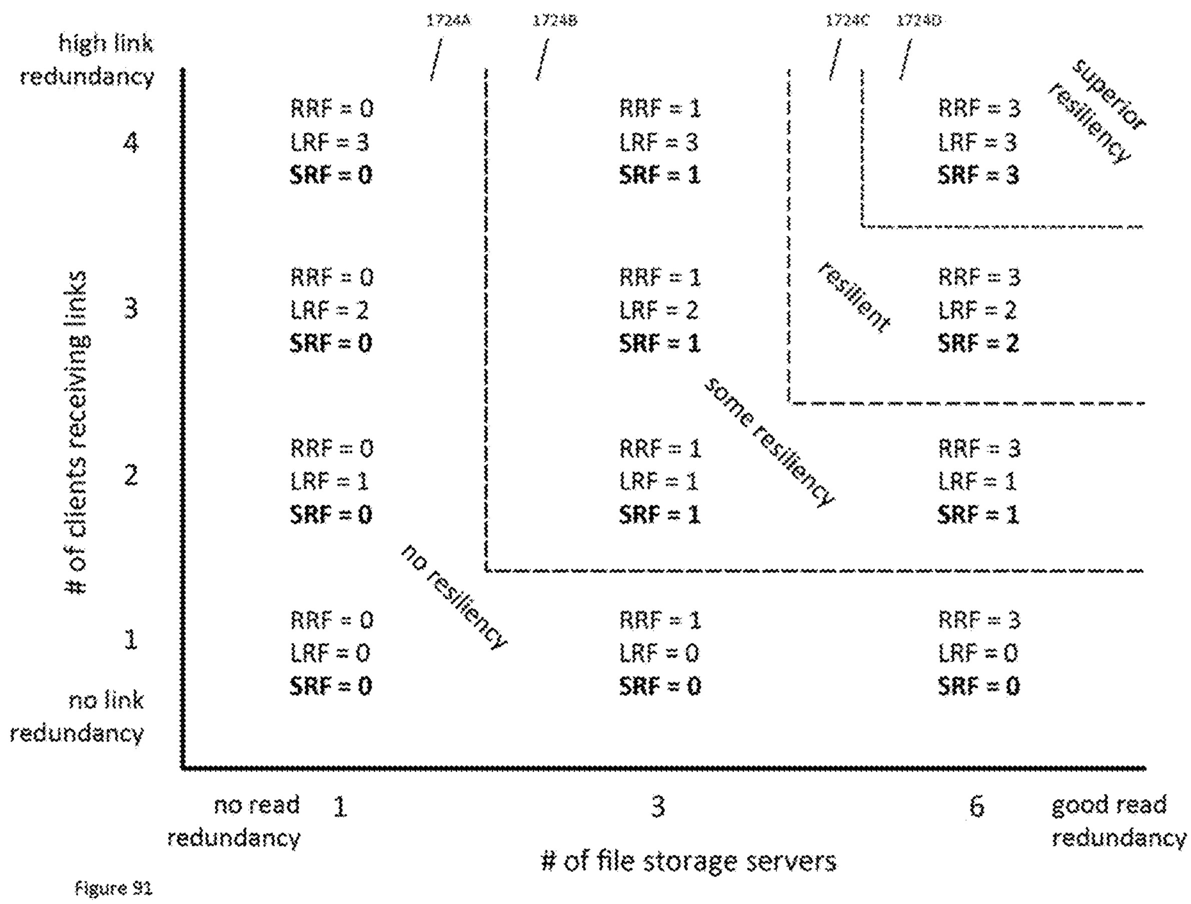

FIG. 91 is a graph representing storage resiliency as a function of the number of file storage servers and client FS links.

Figure 92:
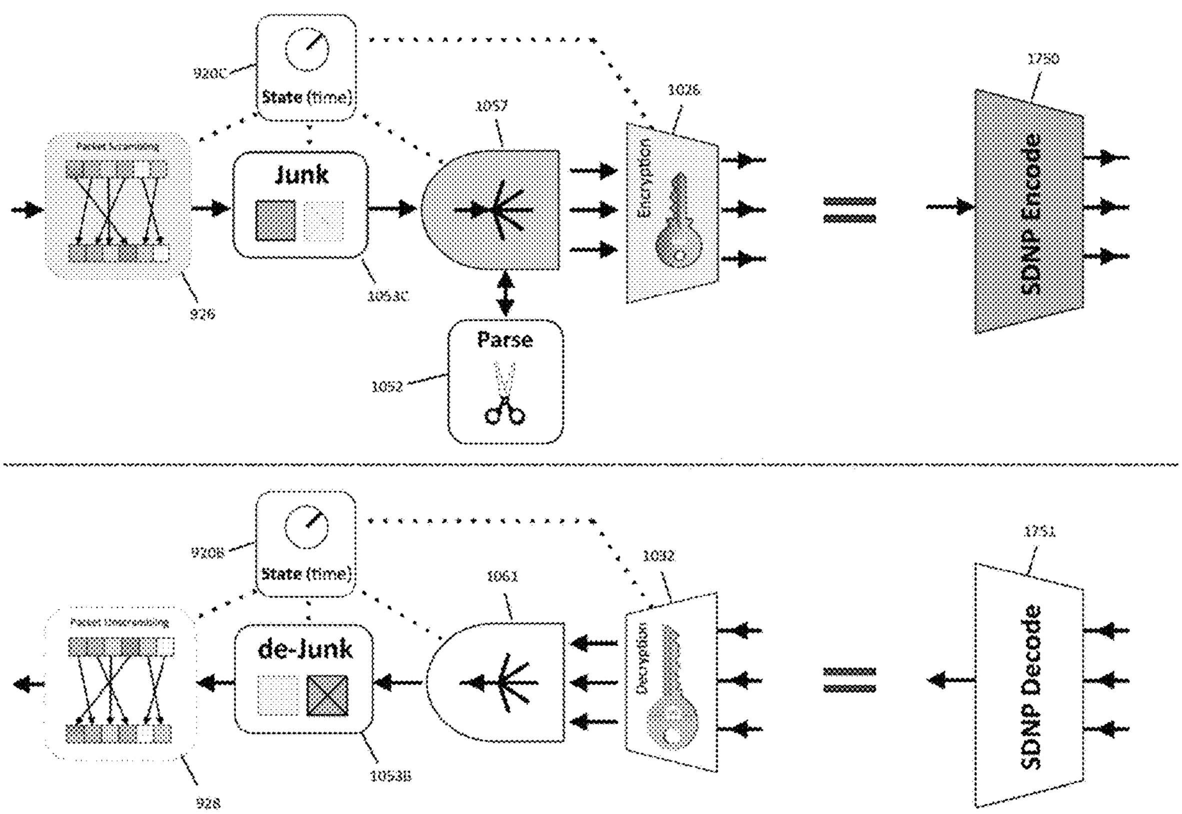

FIG. 92 is a schematic representation of SDNP-encode and SDNP-decode functions.

Figure 93A:
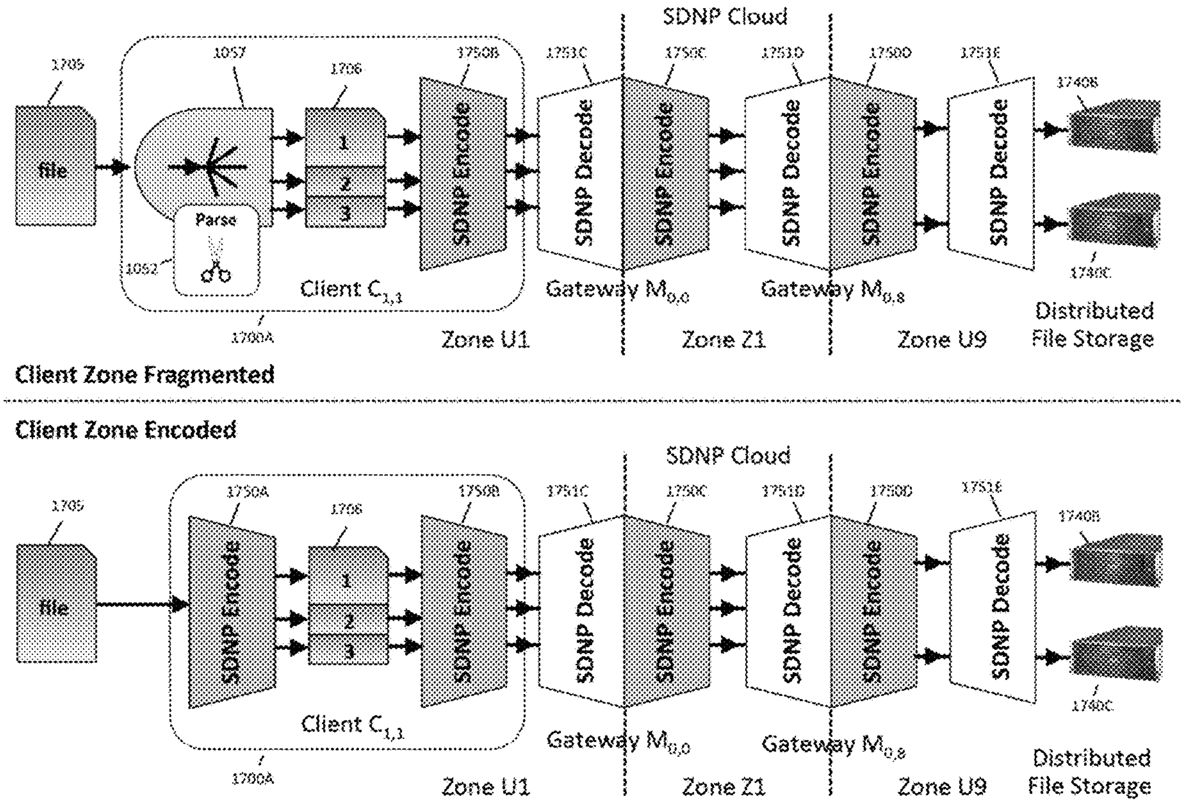

FIG. 93A is a schematic representation of SDNP distributed file storage with client side file security and HyperSecure file transport.

Figure 93B:
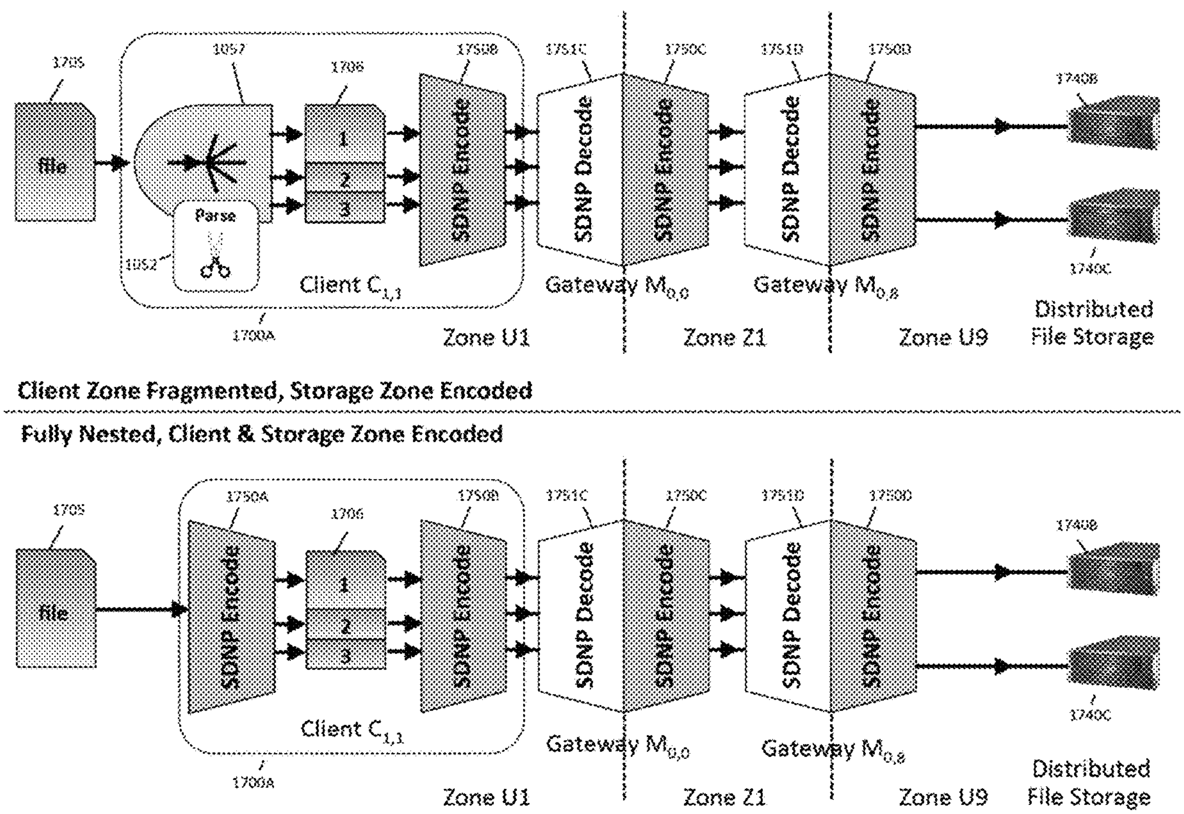

FIG. 93B is a schematic representation of SDNP distributed file storage with nested file security and HyperSecure file transport.

Figure 94:
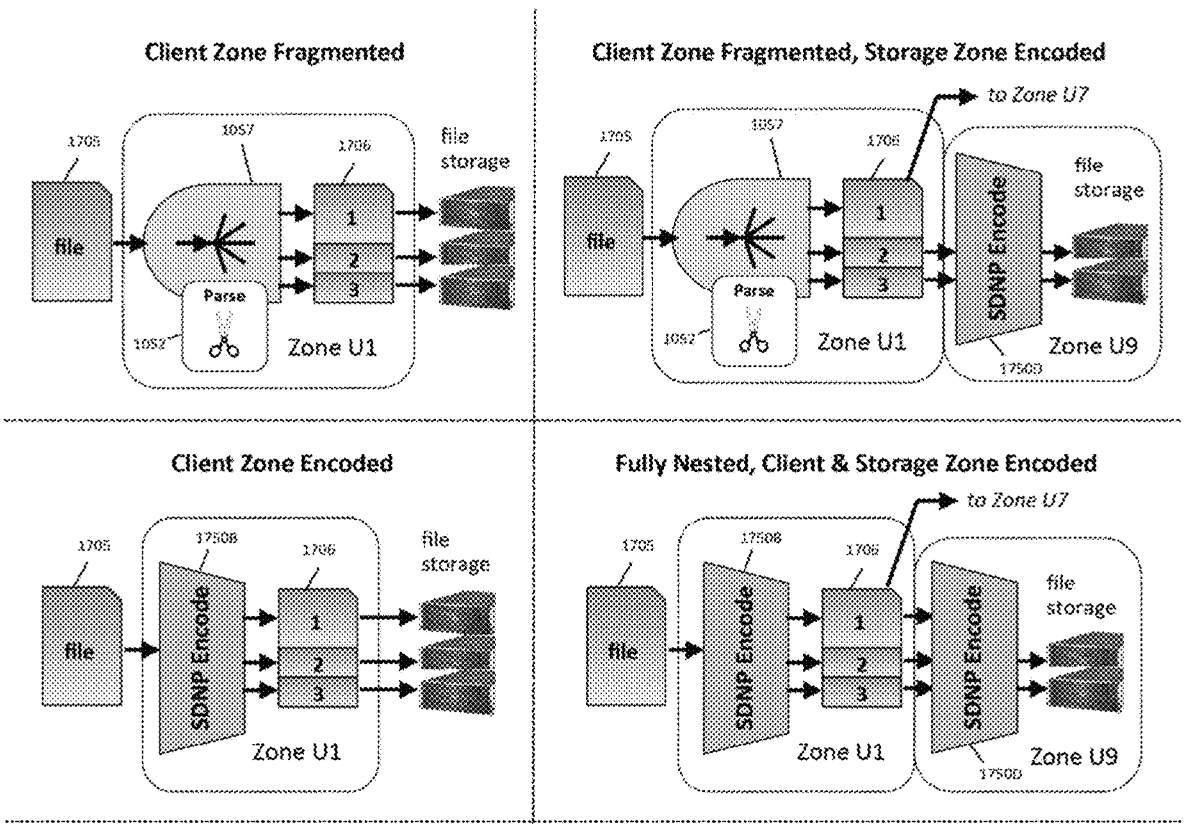

FIG. 94 is a simplified schematic representation of HyperSecure encoding in SDNP distributed file storage write operations.

Figure 95:
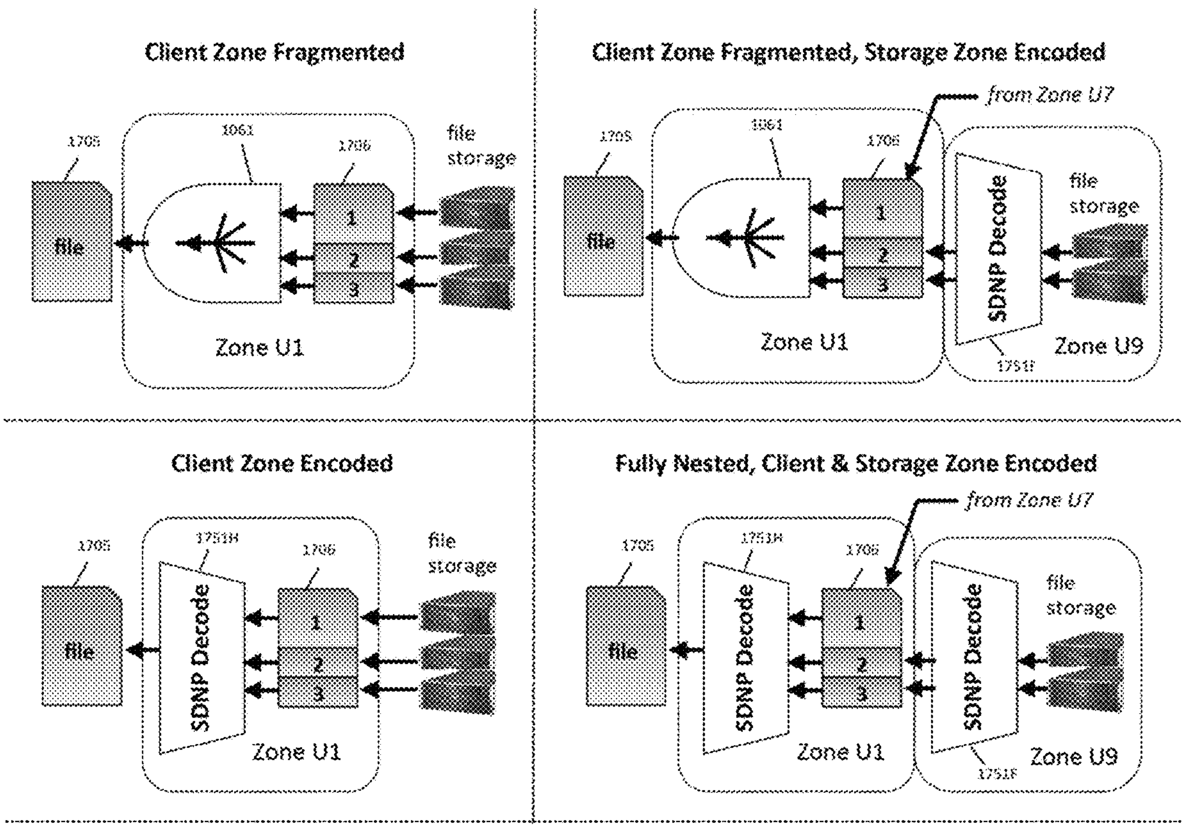

FIG. 95 is a simplified schematic representation of HyperSecure decoding in SDNP distributed file storage read operations.

Figure 96A:
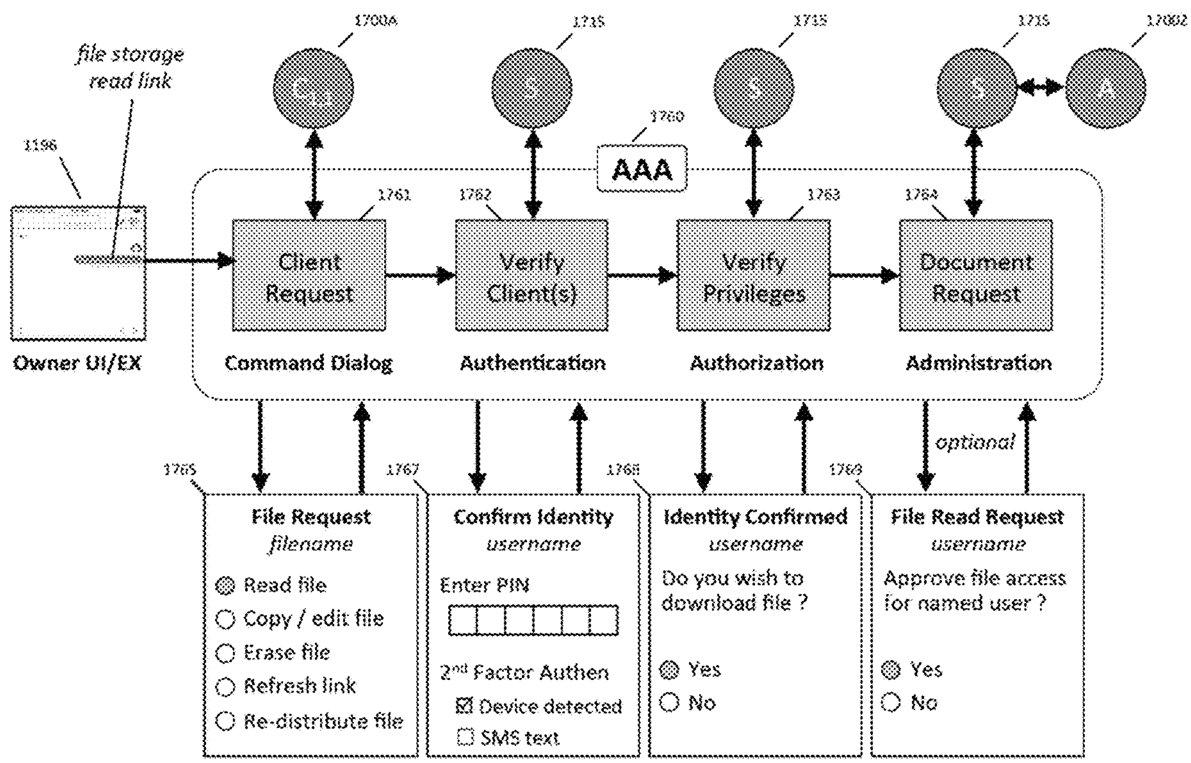

FIG. 96A is a flow chart describing the AAA operations in a HyperSecure file read operation.

Figure 96B:
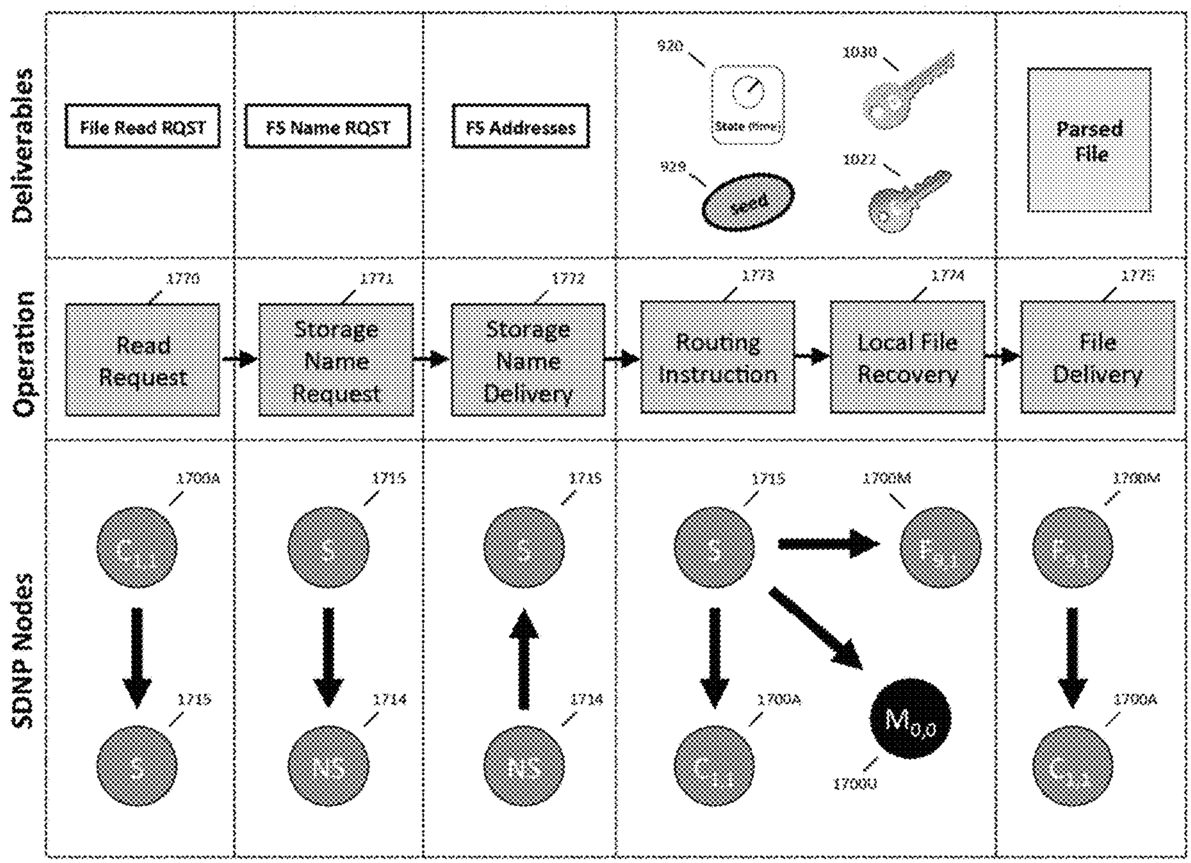

FIG. 96B is a flow chart describing file access and SDNP transport in a HyperSecure file read operation.

Figure 97A:
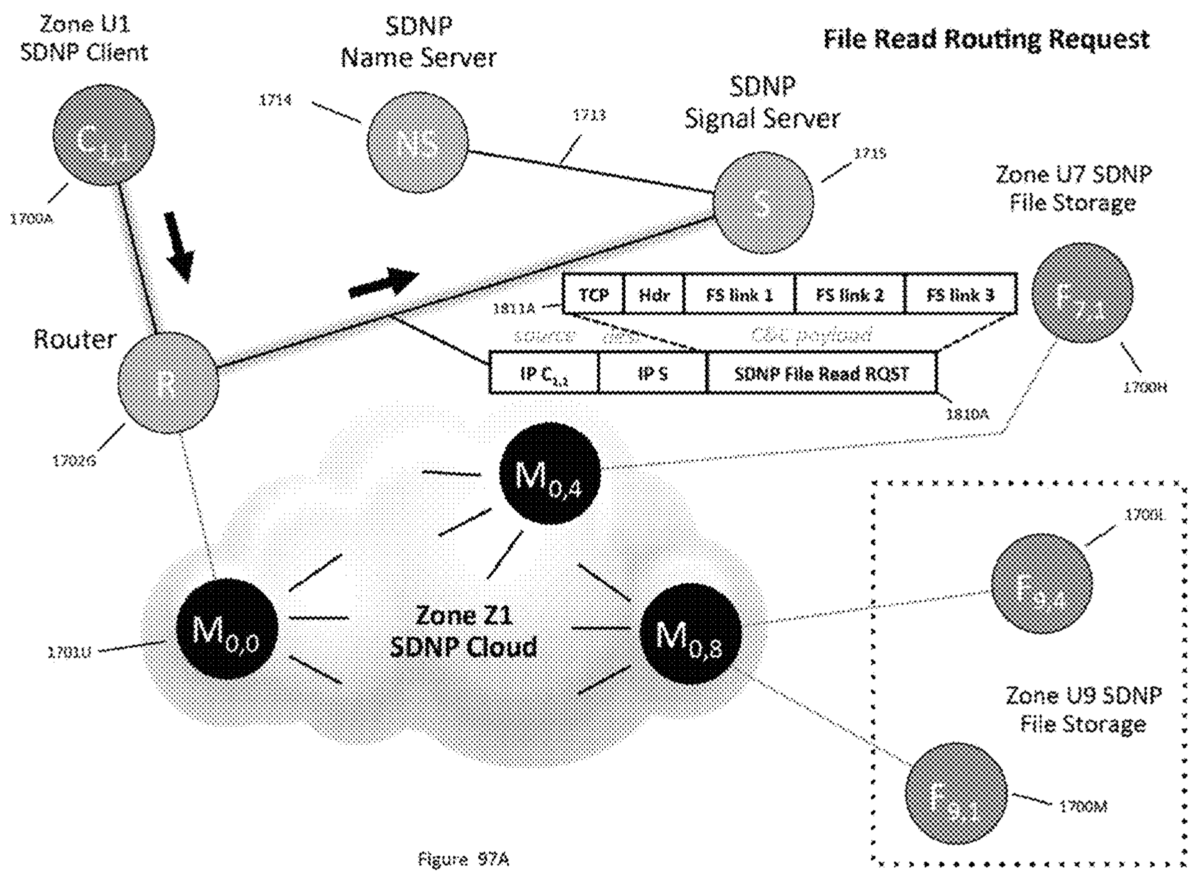

FIG. 97A illustrates the file read request operation in a distributed HyperSecure file storage system.

Figure 97B:
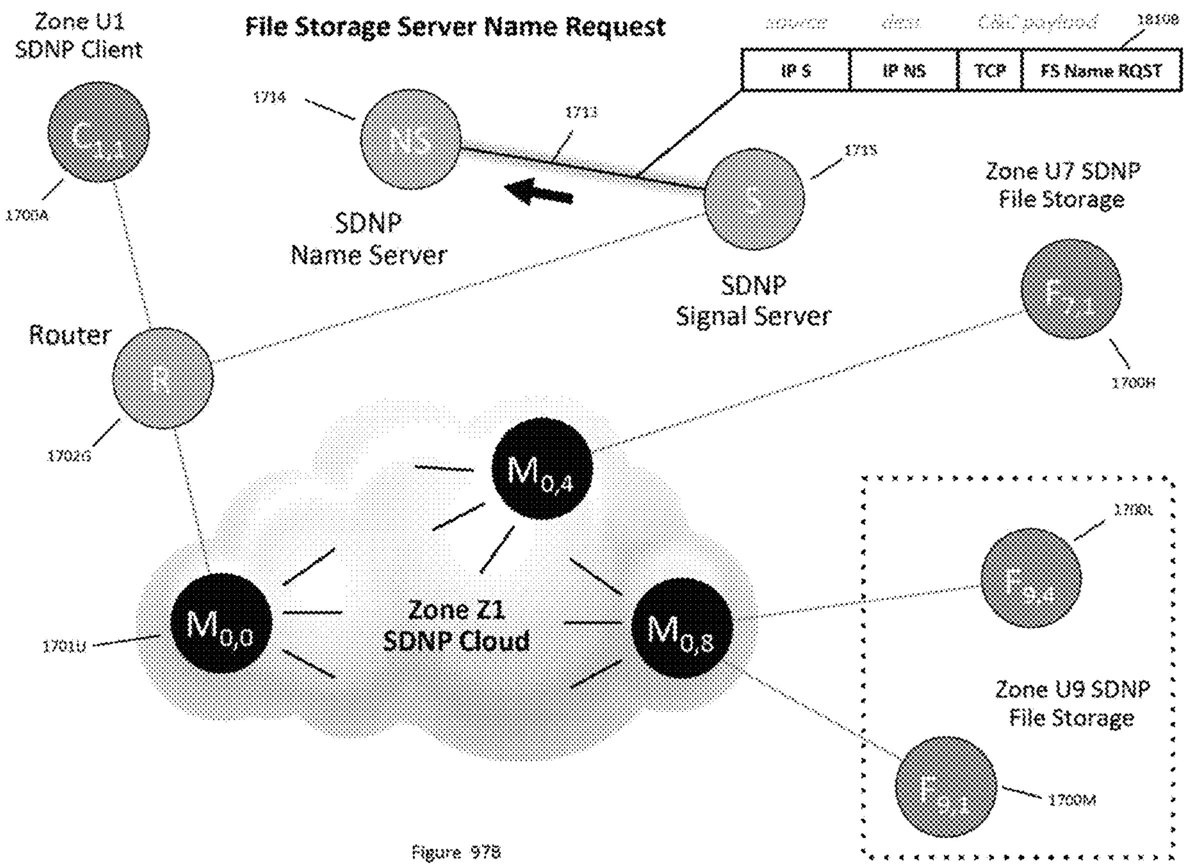

FIG. 97B illustrates the file storage server name request operation in a distributed HyperSecure file storage system.

Figure 97C:
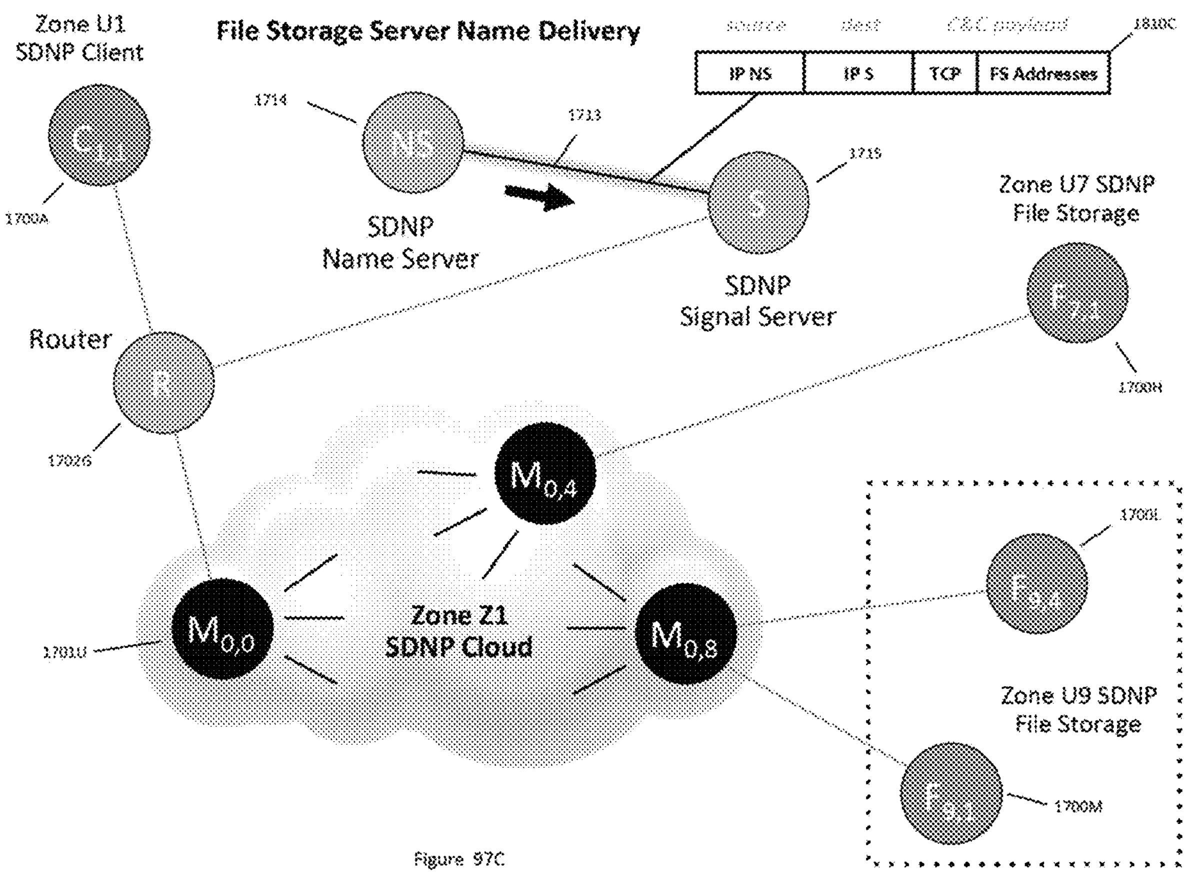

FIG. 97C illustrates the file storage server name delivery and signaling server planning operation in a distributed HyperSecure file storage system.

Figure 97D:
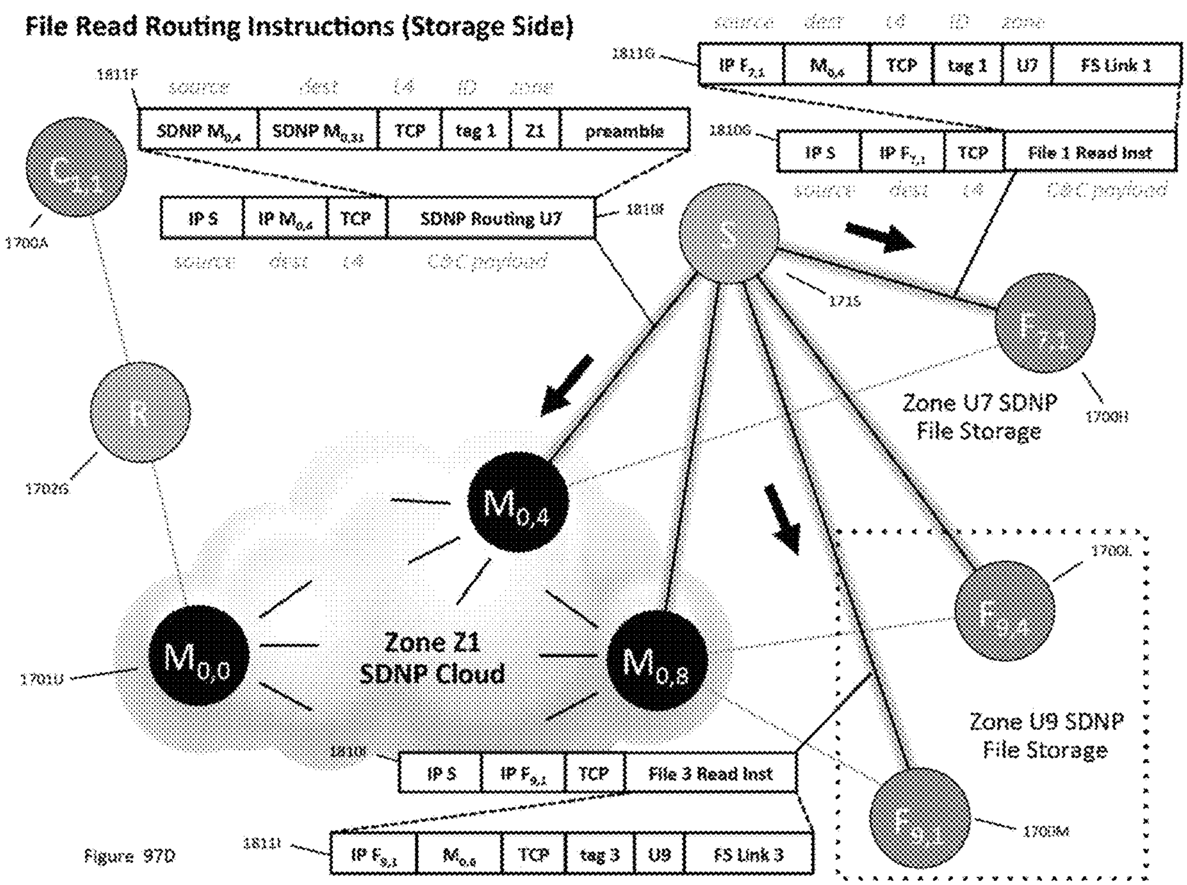

FIG. 97D illustrates the signaling server storage-side Last Mile and SDNP cloud routing read instruction in a distributed HyperSecure file storage system.

Figure 97E:
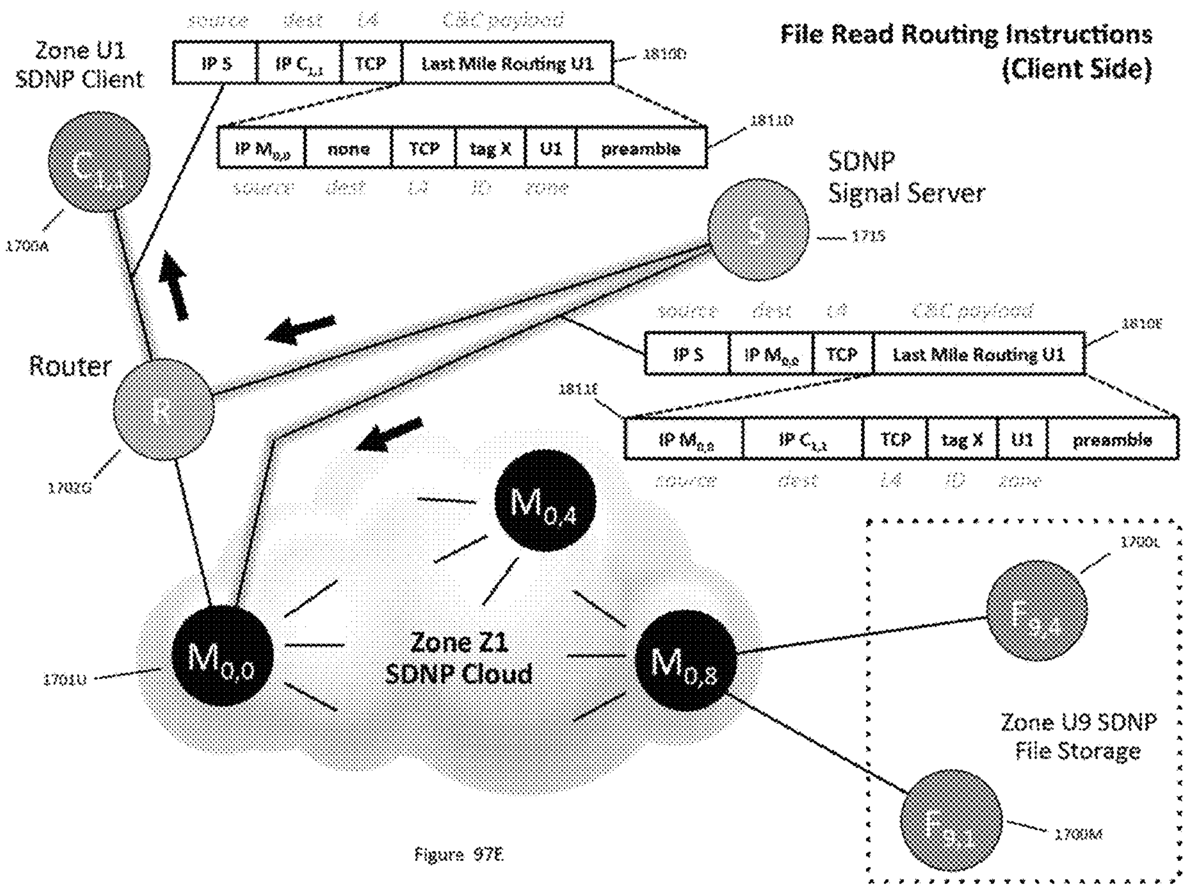
Figure 98:
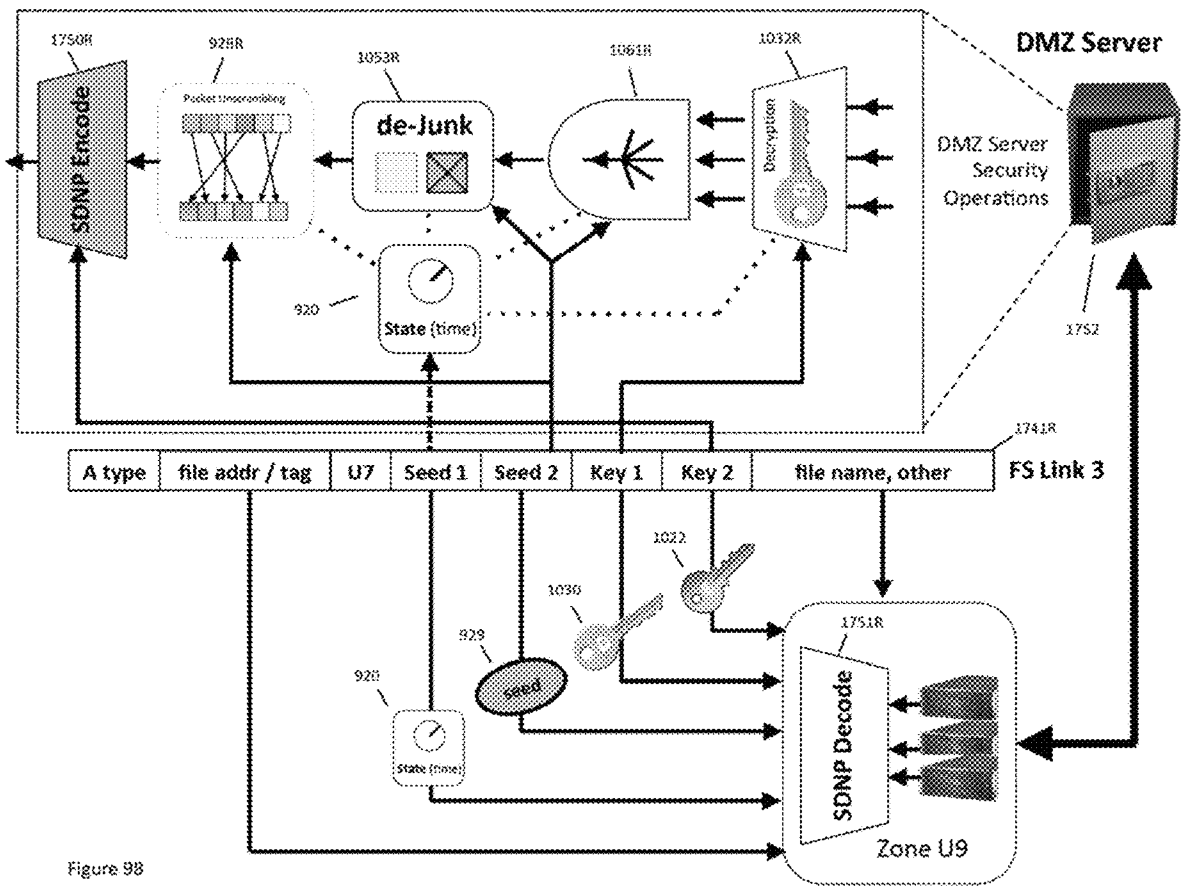

FIG. 97E illustrates the signaling server client-side Last Mile and SDNP cloud read routing instruction in a distributed HyperSecure file storage system.

Figure 98:
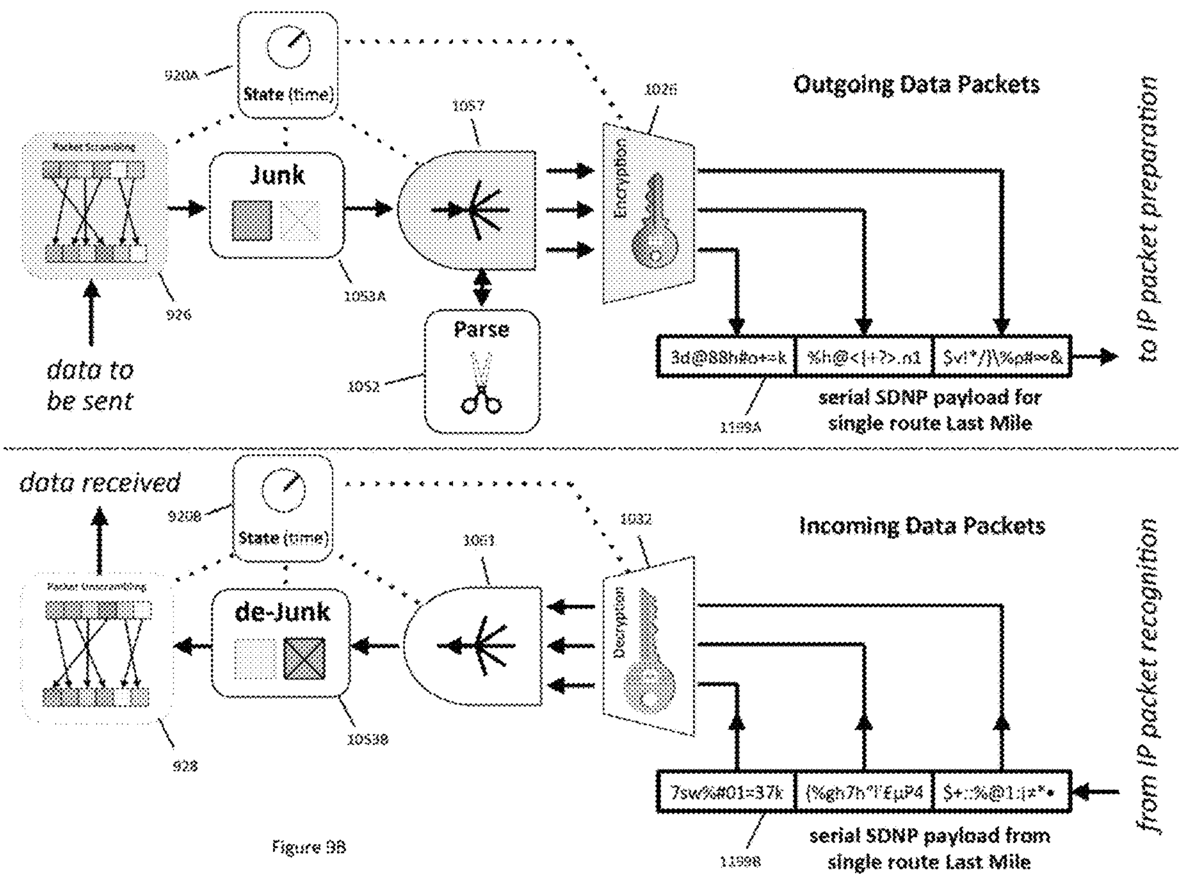

FIG. 98 illustrates storage side file decoding during a read operation in a distributed HyperSecure file storage system.

Figure 99:
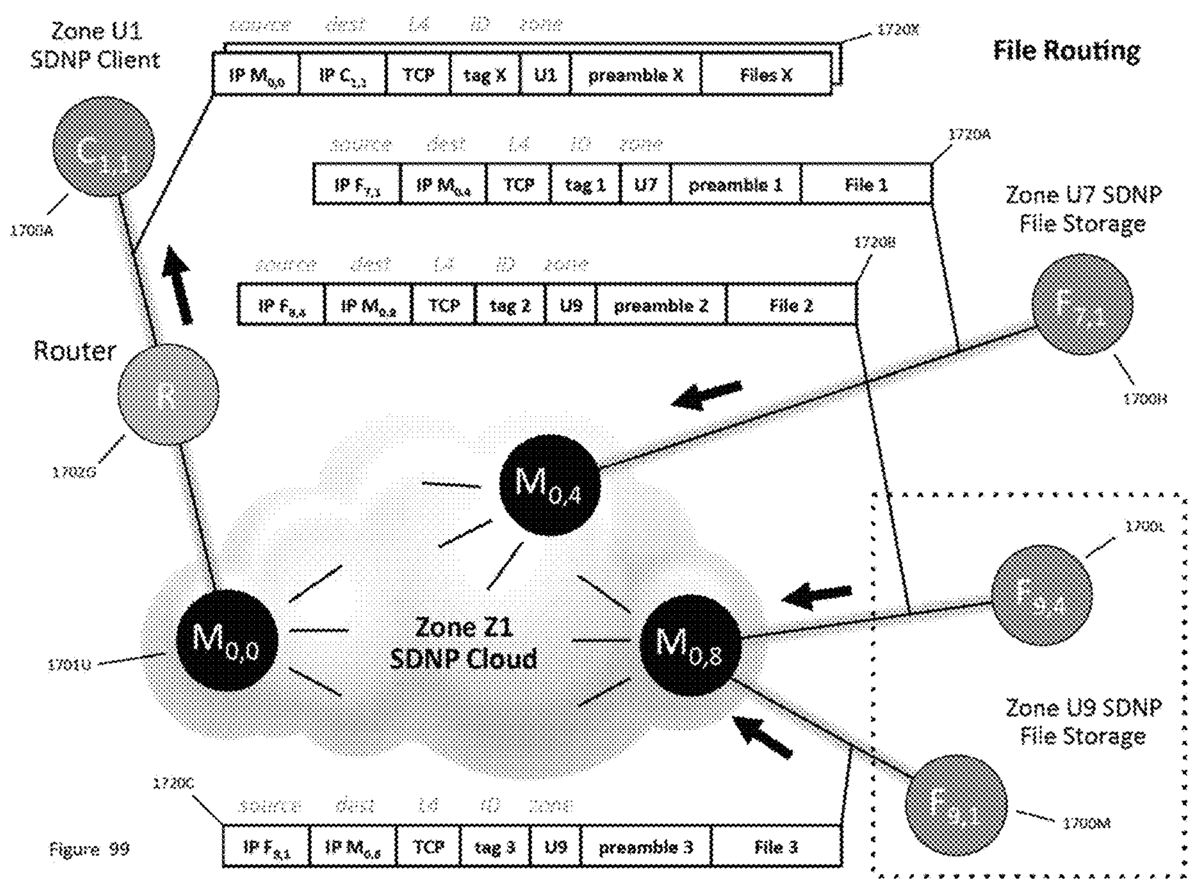

FIG. 99 illustrates file data transfers in a distributed HyperSecure file storage system during a read operation.

Figure 100:
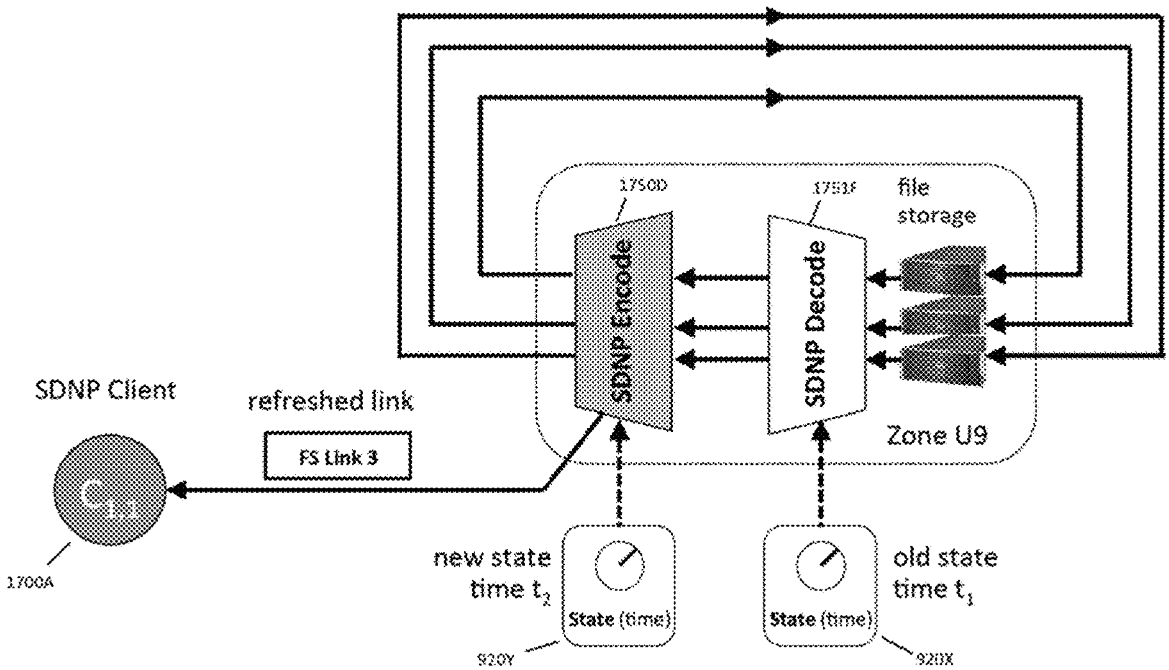

FIG. 100 illustrates file data transfers in a distributed HyperSecure file storage system during a link refresh.

Figure 101:
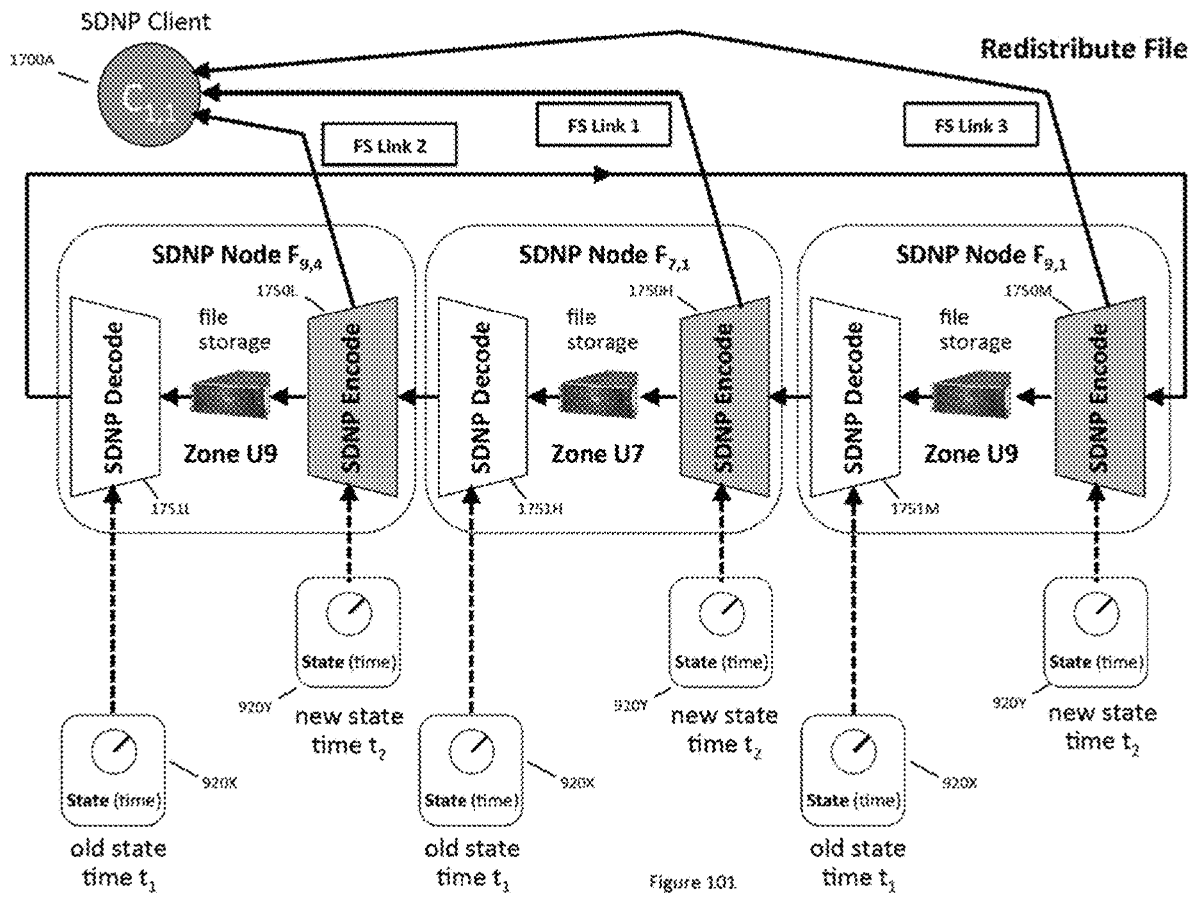

FIG. 101 illustrates file data transfers in a distributed HyperSecure file storage system used to redistribute files.

Figure 102:

FIG. 102 illustrates time stamps in SDNP text messaging.

Figure 103:
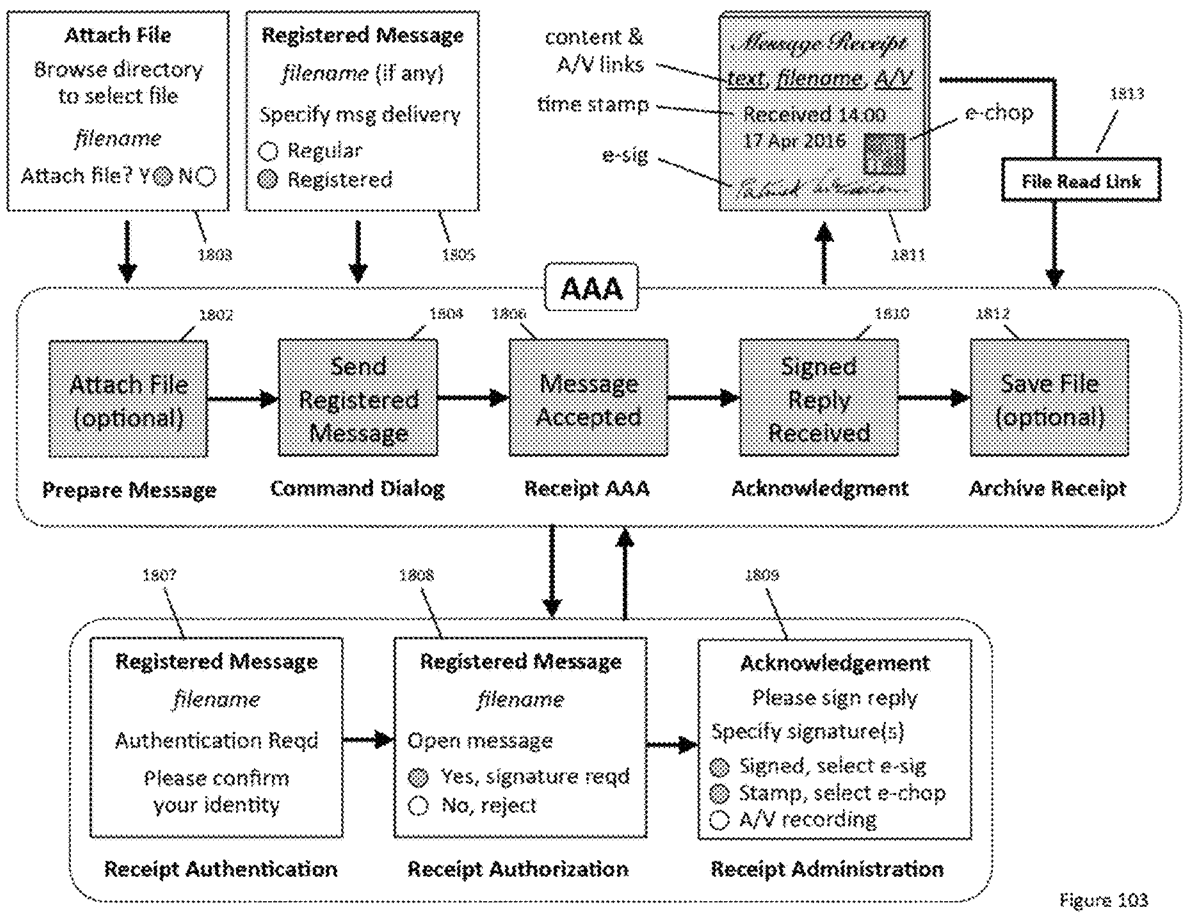

FIG. 103 is a flow chart of SDNP registered communication.

FIG. 104A illustrates end-to-end encryption in Internet OTT communication.

FIG. 104B illustrates end-to-end encryption in HyperSecure communication.

Figure 105A:
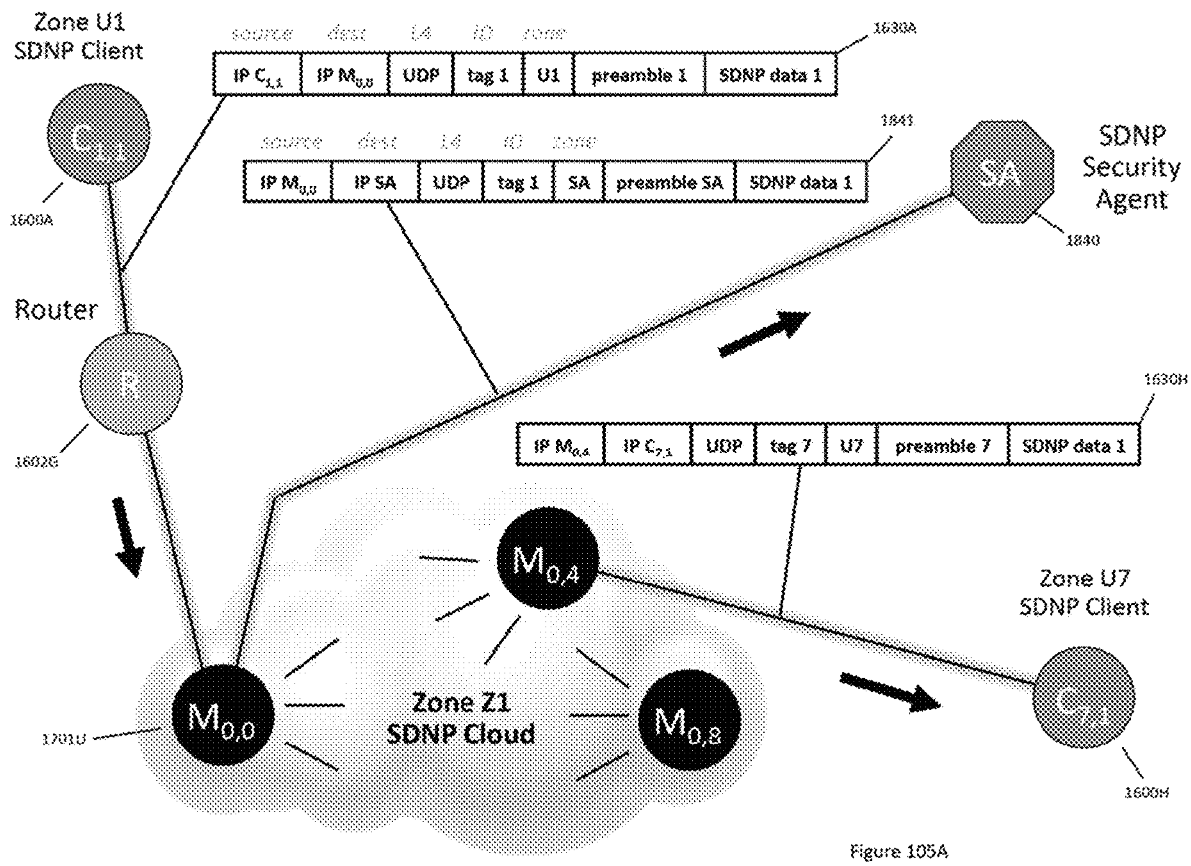

FIG. 105A is a schematic representation of a "SDNP call" operation with a SDNP security agent performing invisible monitoring of an outgoing call.

Figure 105B:
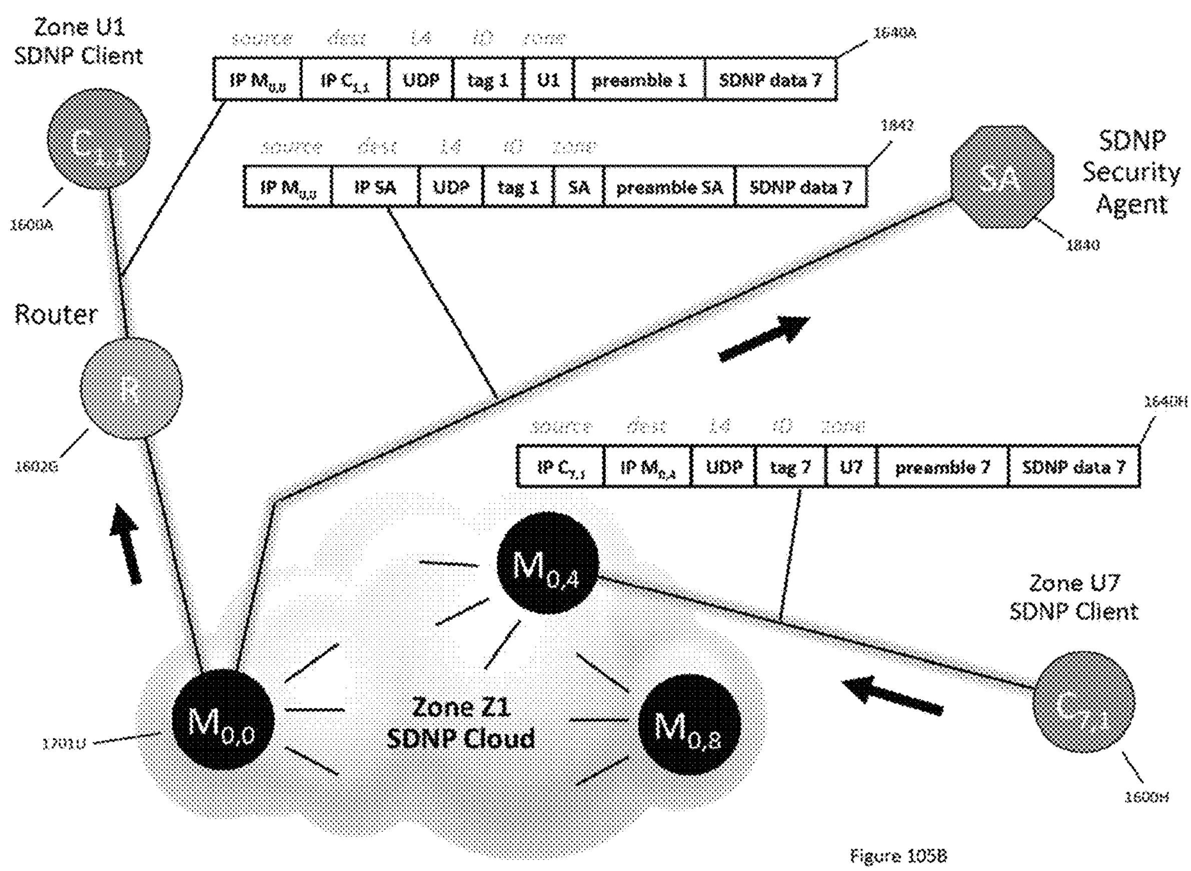

FIG. 105B is a schematic representation of a "SDNP call" operation with a SDNP security agent performing invisible monitoring of an incoming call.

Figure 106:
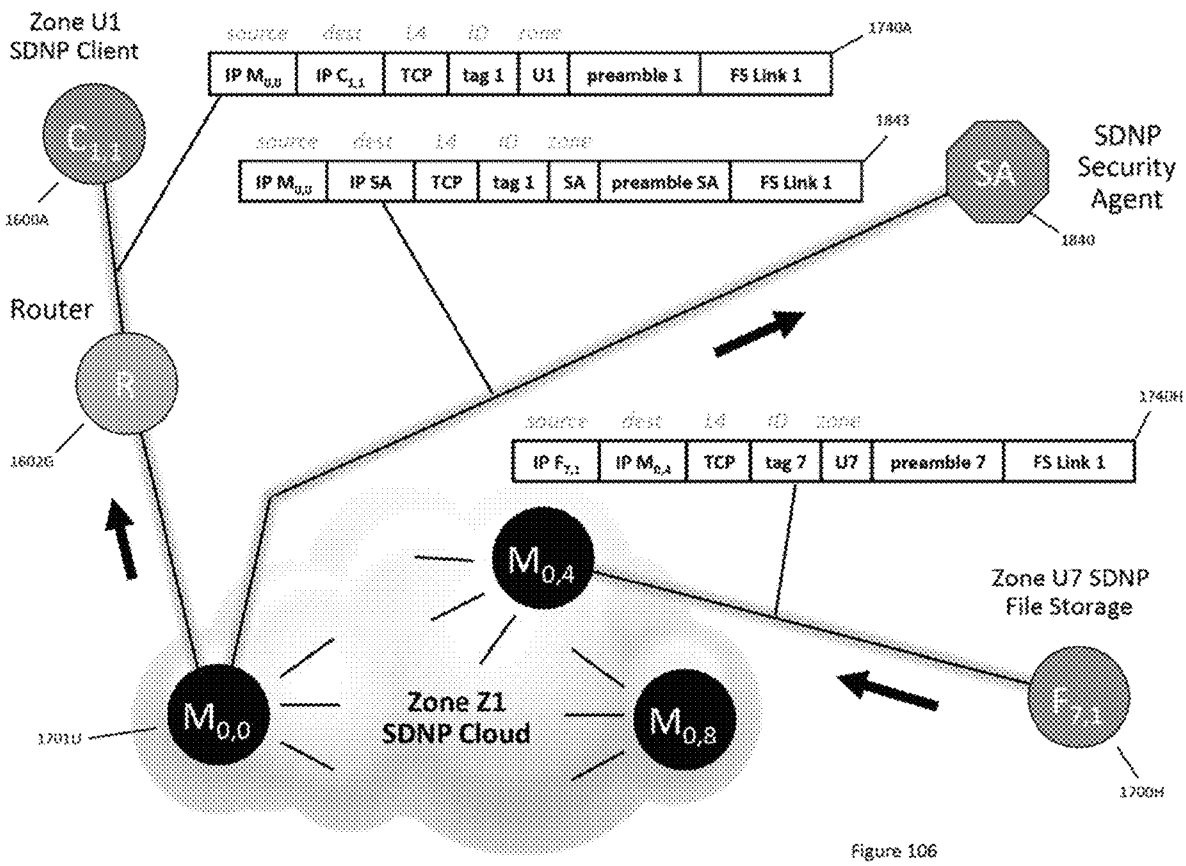

FIG. 106 illustrates file storage server link transfers in a distributed HyperSecure file storage system with a SDNP security agent performing invisible monitoring of the FS link routing.

Figure 107:
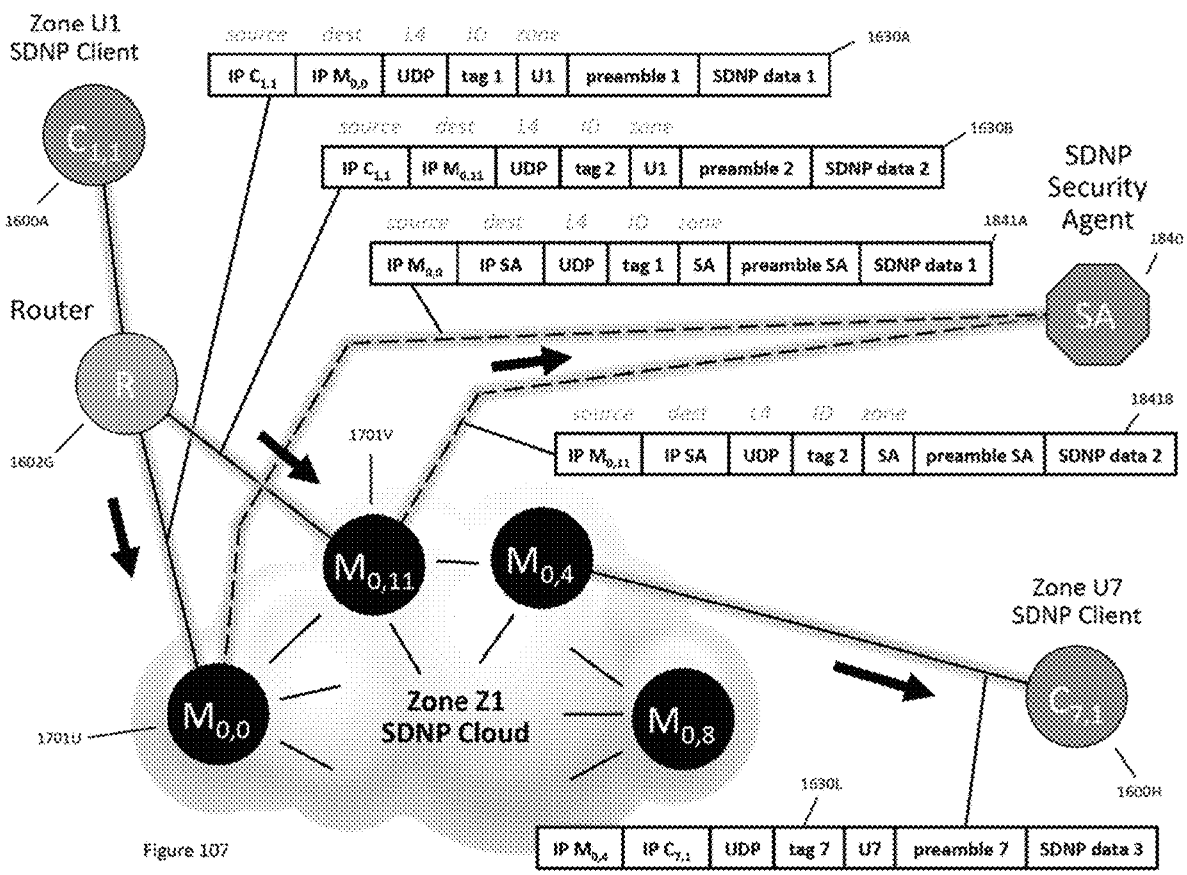

FIG. 107 is a schematic representation of a "SDNP call" operation with a SDNP security agent performing invisible monitoring of an outgoing call employing multi-route Last Mile communication.

Figure 108:
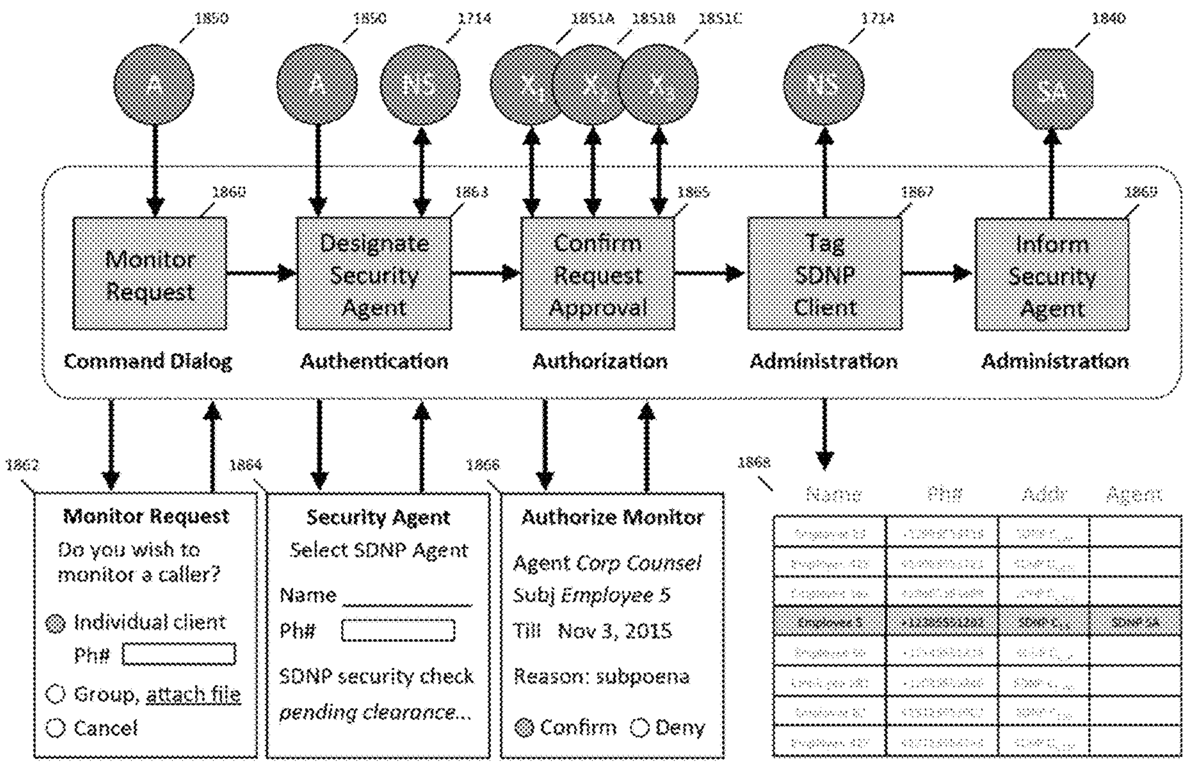
Figure 109:
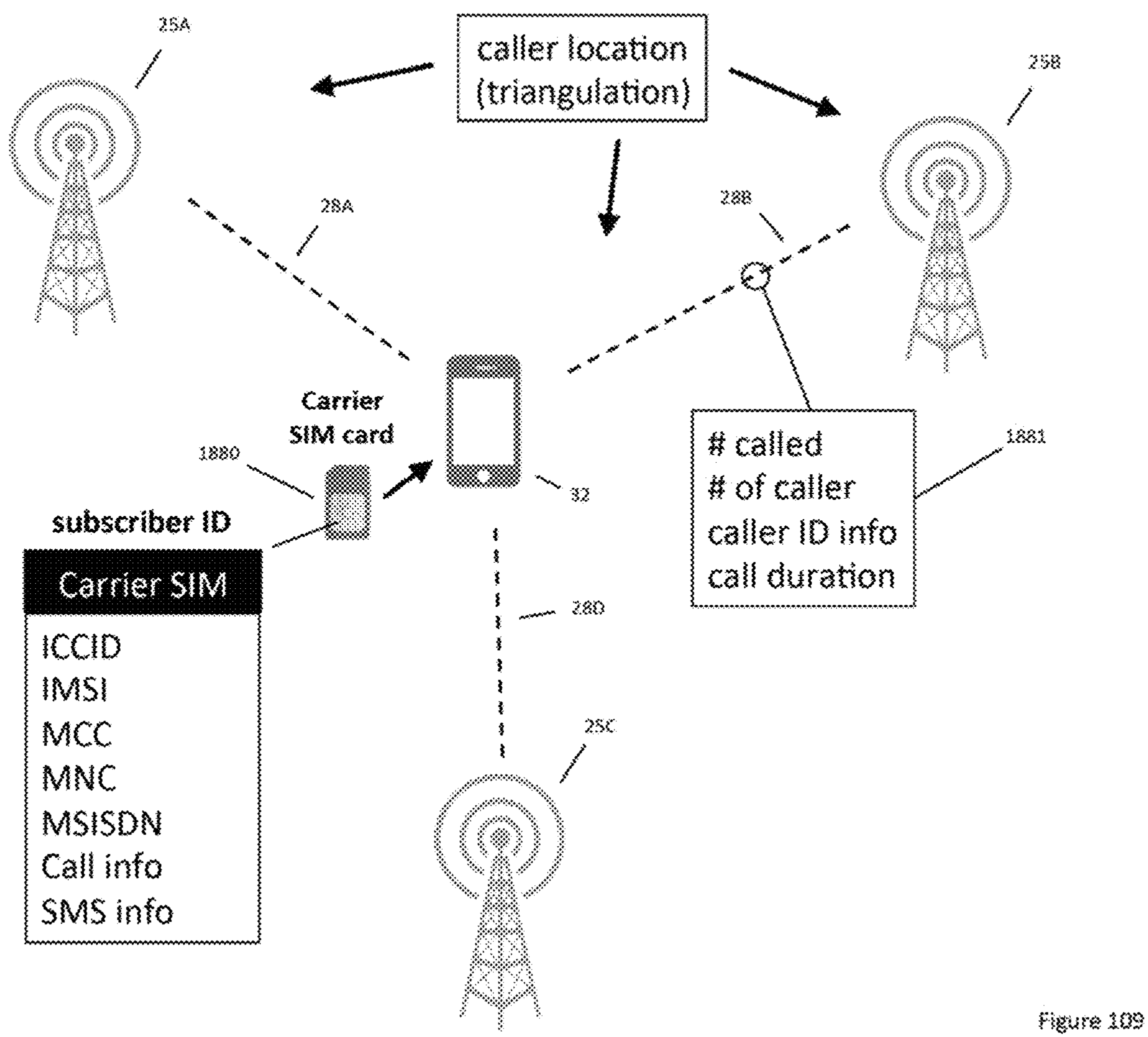

FIG. 108 is a flow chart of the steps to designate and authorize a SDNP security agent FIG. 109 illustrates cell phone to tower communication subject to SS7 vulnerabilities.

Figure 110:
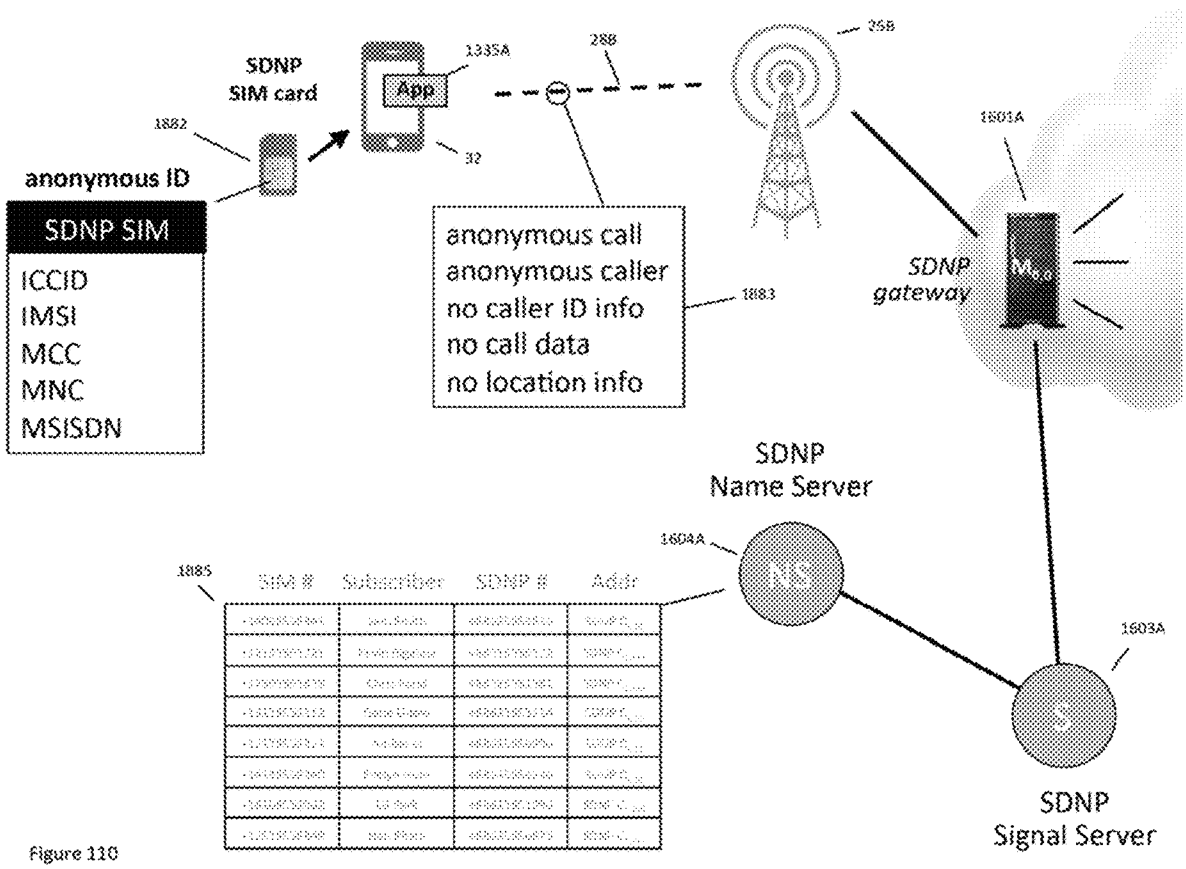

FIG. 110 illustrates SDNP communication using phone number camouflaging to repel SS7 attacks.

Figure 111:
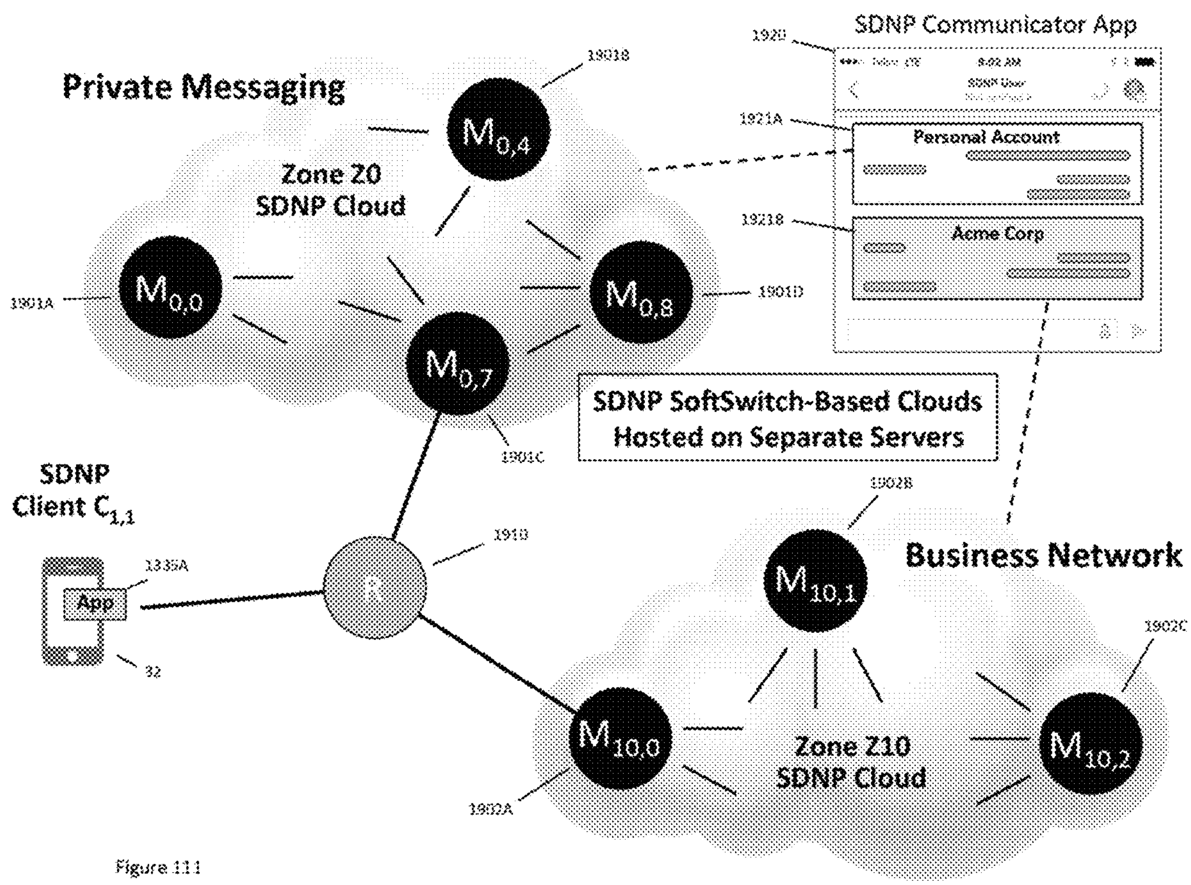

FIG. 111 illustrates connectivity of SDNP SoftSwitch-based clouds hosted on separate servers.

Figure 112:
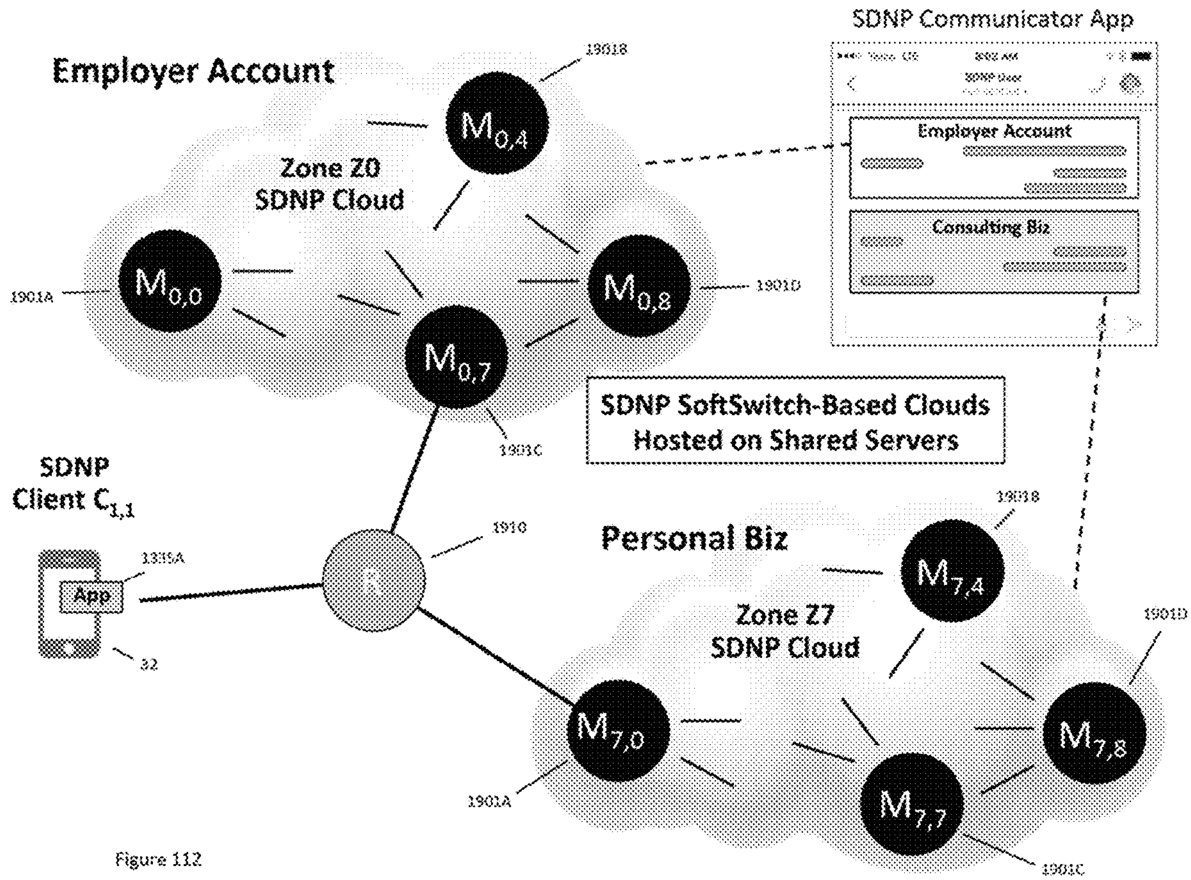

FIG. 112 illustrates connectivity of SDNP SoftSwitch-based clouds hosted on shared servers.

Figure 113:
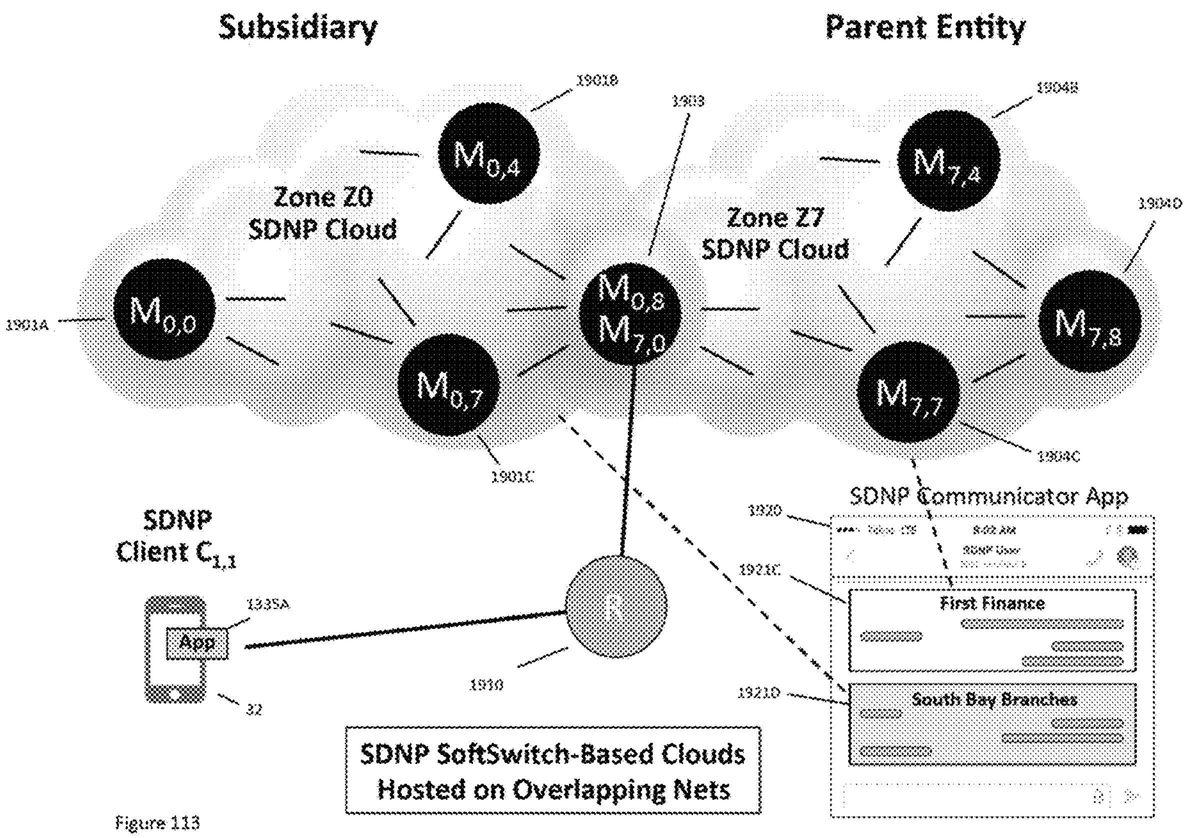

FIG. 113 illustrates connectivity of SDNP SoftSwitch-Based clouds hosted on overlapping networks.

Figure 114:
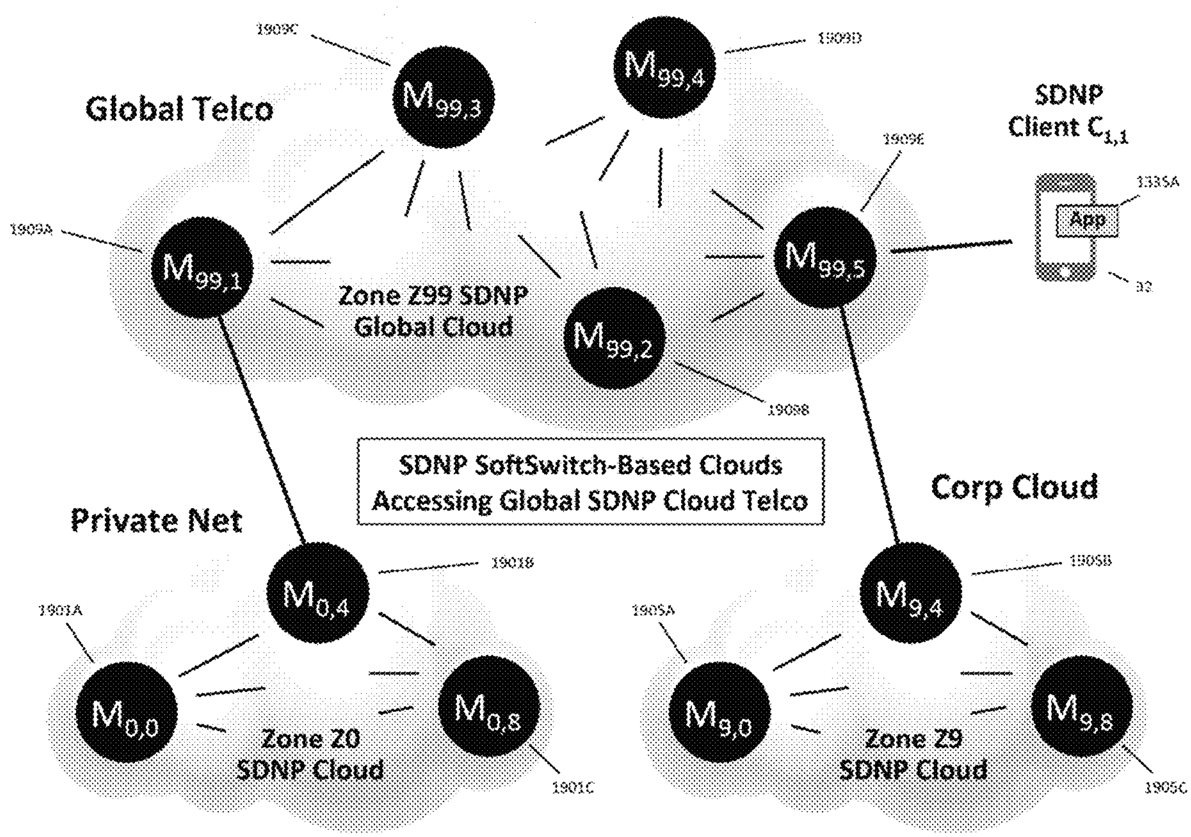

FIG. 114 illustrates connectivity of SDNP SoftSwitch-Based clouds accessing global SDNP cloud telco.

Figure 115:
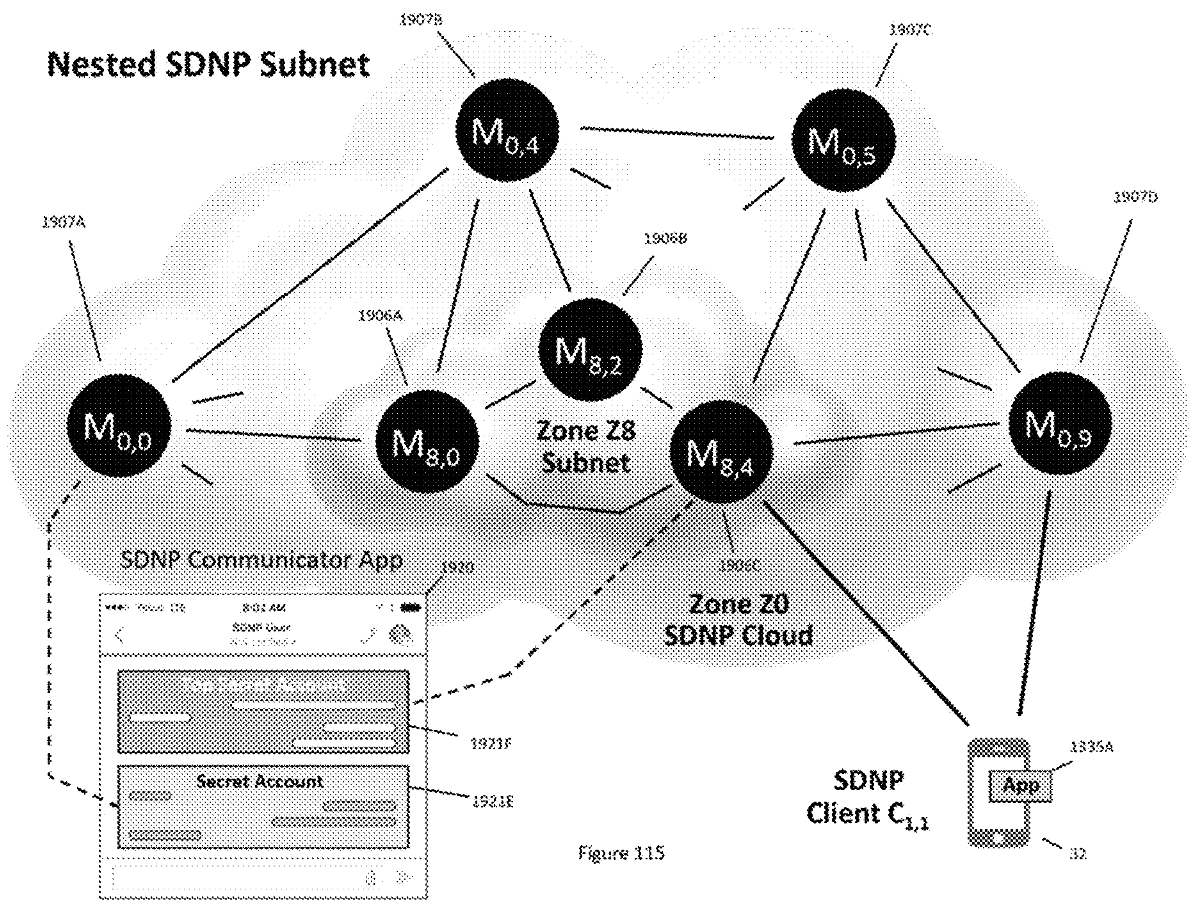

FIG. 115 is an example of a nested SDNP subnet.

DESCRIPTION OF THE INVENTION

After nearly one-and-a-half centuries of circuit-switched telephony, today's communication systems and networks have within only a decade all migrated to packet-switched communication using the Internet Protocol carried by Ethernet, WiFi, 4G/LTE, and DOCSIS3 data over cable and optical fiber. The benefits of comingling voice, text, pictures, video, and data are many, including the use of redundant paths to insure reliable IP packet delivery, i.e. the reason the Internet was created in the first place, along with an unparalleled level of system interoperability and connectivity across the globe. With any innovation, however, the magnitude of challenges new technology creates often match the benefits derived.

Disadvantages of Existing Communication Providers

As detailed throughout the background section of this disclosure, present-day communication suffers from many disadvantages. The highest performance communication systems today, comprising custom digital hardware owned by the world's major long-distance carriers such as AT&T, Verizon, NTT, Vodaphone, etc., generally offer superior voice quality but at a high cost including expensive monthly subscription fees, connection fees, long-distance fees, complex data rate plans, long-distance roaming charges, and numerous service fees. Because these networks are private, the actual data security is not publically known, and security infractions, hacks, and break-ins are generally not reported to the public. Given the number of wire taps and privacy invasions reported in the press today, private carrier communication security remains suspect, if not in their private cloud, in the very least in their last-mile connections.

"Internet service providers" or ISPs form another link in the global chain of communications. As described in the background of this invention, voice carried over the Internet using VoIP, or "voice over Internet protocol" suffers from numerous quality-of-service or QoS problems, including The Internet, a packet-switched network, is not designed to deliver IP packets in a timely manner or to support real-time applications with low latency and high QoS

- The routing of an IP packet takes an unpredictable path resulting in constantly changing delays, bursts of high data-error rates, and unexpected dropped calls
- IP packet routing is made at the discretion of the Internet service provider, which controls the network within which the packet is routed and may adjust routing for balancing its own network's loading or to better serve its VIP clients at the expense at degrading connection quality of general traffic traversing its network.
- Over-the-top or OTT providers such as Line, KakaoTalk, Viber, etc. catching a free ride on the Internet act as Internet hitchhikers and have no control over the network or factors affecting QoS.
- Using heavyweight audio CODECs that fail to provide comprehendible voice quality audio even at moderate data rates
- VoIP based on the TCP transport protocol suffers from high latency and degraded audio caused by delays induced during handshaking and IP packet rebroadcasting. Unaided UDP transport provides no guarantee of payload integrity.

Aside from QoS issues, the security of today's devices and networks is abysmal, representing a level totally unacceptable to support the future needs of global communication. As detailed in the background section of the US patent application entitled Secure Dynamic Communication Network and Protocol, network security is prone to a large array of cyber-assaults on communicating devices, including spyware, Trojan horses, infections, and phishing; on the last link, including spyware, IP packet sniffing, wiretaps, and call interception of cyber pirate "faux" cellphone towers; and in the local network or telco portion of last-mile connectivity, involving spyware, IP packet sniffing, infections such as viruses, and cyber pirate "man in the middle attacks". The cloud itself is subject to unauthorized access by breaking security at any cloud gateway, by infections such as viruses, from cyber pirates launching man-in-the-middle attacks, from denial-of-service attacks, and from unauthorized government surveillance. In summary, today's communication security is compromised by numerous vulnerabilities easily exploited by cyber pirates and useful for committing cybercrime and violations of cyberprivacy, including:

- Revealing the destination of an IP packet, including the destination IP address, the destination port #, and the destination MAC address.
- Revealing the source of an IP packet, including the source IP address, the source port #, and the source MAC address.
- Revealing the type of Layer 4 transport employed and by the port # the type of service requested and application data encapsulated in the IP packet's payload
- In unencrypted files, all application and file data encapsulated in the IP packet's payload, including personal and confidential information, login information, application passwords, financial records, videos, and photographs.

A dialog of communications, enabling a cyber party the repeated opportunity to break encrypted files Numerous opportunities to install malware, including spyware and phishing programs and Trojan horses into communicating devices and routers using FTP, email, and web page based infections Reiterating a key point, the fundamentally intrinsic weakness of packet-switched communication networks using Internet Protocol, is that any hostile party or cyber-pirate intercepting an IP packet can see what devices were involved in creating the data contained with the IP packet, where the IP packet came from, where the IP packet is being sent to, how the data is being transported, i.e. UDP or TCP, and what kind of service is being requested, i.e. what kind of application data is contained within the payload. In this regard, a cyber pirate is able to determine the "context" of a conversation, improving their opportunity to crack encryption, break password security, and gain unauthorized access to files, data, and payload content.

Encryption—

To defend against the diverse range of cyber-assaults as described, present day network managers, IT professionals, and application programs primarily rely on a single defense—encryption. Encryption is a means by which to convert recognizable content also known as "plaintext", whether readable text, executable programs, viewable videos and pictures, or intelligible audio, into an alternate file type known as "ciphertext", that appears as a string of meaningless textual characters.

The encryption process, converting an unprotected file into an encrypted file, involves using a logical or mathematical algorithm, called a cypher, to change the data into equivalent textual elements without revealing any apparent pattern of the encryption's conversion process. The encrypted file is then sent across the communication network or medium until received by the destination device. Upon receiving the file, the receiving device, using a process known as "decryption, subsequently decodes the encoded message to reveal to original content. The study of encryption and decryption, known broadly as "cryptography", blends elements of mathematics, including number theory, set theory and algorithm design, with computer science and electrical engineering.

In simple "single key" or "symmetric key" encryption technologies, a single key word or phrase known a priori by both parties can be used to unlock the process for encrypting and decrypting a file. In World War II, for example, submarines and ocean ships communicated on open radio channels used encrypted messages. Initially, the encryptions were single-key-based. By analyzing the code pattern, Allied cryptologists were sometimes able to reveal the encryption key word or pattern and thereafter were able to read encrypted files without discovery. As encryption methods became more complex, breaking the code manually became more difficult.

Code evolved into mechanical machine-based ciphers, an early form of computing. At the time, the only way to break the code was stealing a cypher machine and using the same tools to decipher a message as those encrypting the files. The challenge was how to steal a cypher machine without the theft being detected. If it were known that a code machine had been compromised, the enemy would simply change their code and update their cypher machines already in operation. This principle is practiced still today—the most effective cyber-assault is one that goes undetected.

With the advent of computing and the Cold War, encryption became more complex but the speed of computers used to crack encryption codes also improved. At each step in the development of secure communications, the technology and knowhow for encrypting information and the ability to crack the encryption code developed nearly at pace. The major next evolutionary step in encryption came in the 1970s with the innovation of dual-key encryption, a principle still in use today. One of the best-known dual key encryption methods is the RSA public key cryptosystem, named after its developers Rivest, Shamir, and Adleman. Despite published recognition for RSA, contemporaneous developers independently conceived of the same principle. RSA employs two cryptographic keys based on two large prime numbers kept secret from the public. One algorithm is used to convert these two prime numbers into an encryption key, herein referred to as an E-key, and a different mathematical algorithm is used to convert the same two secret prime numbers into a secret decryption key, herein referred to also as a D-key. The RSA-user who selected the secret prime numbers, herein referred to as the "key publisher", distributes or "publishes" this algorithmically generated E-key comprising typically between 1024b to 4096b in size, to anyone wishing to encrypt a file. Because this key is possibly distributed to many parties in an unencrypted form, the E-key is known as a "public key".

Parties wishing to communicate with the key publisher then use this public E-key in conjunction with a publically available algorithm, typically offered in the form of commercial software, to encrypt any file to be sent to the particular key publisher. Upon receiving an encrypted file, the key publisher then uses their secret D-key to decrypt the file, returning it to plaintext. The unique feature of the dual-key method in general and RSA algorithm in particular is that the public E-key used to encrypt a file cannot be used for decryption. Only the secret D-key possessed by the key publisher has the capability of file decryption.

The concept of a dual-key, split-key, or multi-key exchange in file encryption and decryption is not limited specifically to RSA or any one algorithmic method, but methodologically specifies a communication method as a sequence of steps. For example, in a dual-key exchange over a switch packet communication network a device, e.g. a notebook wishing to receive a secure file from a cell phone first generates two keys, an E-key for encryption and a D-key for decryption using some algorithm. The notebook then sends the E-key to the cell phone using a public network communication carrying an IP packet. The IP packet in unencrypted form, contains the MAC address, IP source address "NB" and port address of the notebook along with the destination IP address "CP" and corresponding port of the cell phone as well as the transport protocol TCP and an encrypted copy of an E-key as its payload.

Using an agreed upon encryption algorithm or software package, the cell phone then processes a plaintext file using an encryption algorithm and encryption E-key to produce an encrypted file, i.e. ciphertext, carried as a payload of IP packet in a secure communication from the cell phone to the notebook. Upon receiving the IP packet, the algorithm decrypts the file using secret decryption key, i.e. D-key. Since the D-key is made consistent with its corresponding E-key, in essence the algorithm employs knowledge of both keys to decrypt the ciphertext back into unencrypted plaintext 697B. While the payload of IP packet 696 is secured in the form of an encrypted file, i.e. ciphertext, the rest of the IP packet is still unencrypted, sniffable, and readable by any cyber pirate including the source IP address "CP" and port and the destination IP address "NB" and associated port. So even if the payload itself can't be opened, the communication can be monitored.

Virtual Private Networks—

Another security method, also relying on encryption, is that of a "virtual private network" or VPN. In a VPN, a tunnel or secure pipe is formed in a network using encrypted IP packets. Rather than only encrypting the payload, in a VPN the entire IP packet is encrypted and then encapsulated into another unencrypted IP packet acting as a mule or carrier transmitting the encapsulated packet from one VPN gateway to another. Originally, VPNs were used to connect disparate local area networks together over a long distance, e.g. when companies operating private networks in New York, Los Angeles, and Tokyo wished to interconnect their various LANs with the same functionality as if they shared one global private network.

The basic VPN concept can be envisioned as encrypted communication between two devices, for example where a first server, as part of one LAN supporting a number of devices wirelessly through RF and wireline connections is connected by a "virtual private network" or VPN comprising encrypted content traversing the VPN tunnel to a second server having wireline connections to desktops, notebooks, and to other WiFi base station. In addition to these relatively low bandwidth links, first server may also connects to a supercomputer via a high bandwidth connection. The resulting data communications comprises a sequence of data packets comprising an inner VPN packet embedded within an outer IP packet. In operation, an outer IP packet from server A, specifying a source IP address and source port # is sent to server B at destination IP address and destination port #. This outer IP packet established communications between the first and second servers to form an encrypted tunnel to one another for data to pass within. The VPN payload carried by the outer packet contains a last-mile IP packet, providing direct communication between a terminus device, e.g. a desktop with source IP address "DT" and its corresponding ad hoc port #, and another terminus device, e.g. a notebook with source IP address "NB" and its corresponding ad hoc port #. Although any communication session can be initiated, in one example a request for a file transfer is performed through the VPN tunnel.

To establish this transfer securely using a virtual private network, the VPN tunnel is created and the session initiated before the actual communication is sent. In corporate applications, the VPN tunnel may not be carried over the Internet, but instead often is carried by a dedicated ISP or carrier owning their own fiber and hardware network. This carrier oftentimes enters into an annual or long-term contractual agreement with the company requiring VPN services to guarantee a specific amount of bandwidth for a given cost. Ideally, server-to-server communication occurs over a high-speed dedicated link connects directly with no intermediate or "last-mile" connections to disturb the VPN's performance, QoS, or security.

In operation, traditional VPNs require a two-step process—one to create or "login" to the VPN, and a second step to transfer data within the secure pipe or tunnel. The concept of tunneling can be envisioned hierarchically as outer IP packets carried by 7-layer communication stacks (used for carrying the VPN connection) comprising Layers 1 through Layers 4, where Layer 5 is used to create a virtual VP session 723, and where Layer 6, the presentation layer, is used to facilitate encryption required to form a VPN gateway-to-gateway pipe between servers. While the VPN connection employs Internet Protocol to send the IP packets, the VPN's PHY Layer 1 and VPN data link Layer 2 is often supported by a dedicated carrier to minimize unpredictable routing over the Internet. Application Layer 7 data transferred as device-to-device communication between communicating desktops for example, is delivered as tunneled data including all seven OSI layers needed to establish communication as if the VPN were not present. In this manner the VPN may be envisioned as a communication protocol operating within Layer-7 used to carry VPN inner packets.

In operation, outer IP packet once passed from one communication stack to another is opened to reveal encapsulated data, the true message of the packet. In this way, the end-to-end communication occurs ignorant of the details used to create the VPN tunnel, except that the VPN tunnel must be formed in advance of any attempt to communicate and must be closed after the conversation is terminated. Failure to open the VPN tunnel first will result in the unencrypted transmission of an IP packet susceptible to IP packet sniffing, hijacking, infection and more. Failure to close the VPN after a conversation is complete, may provide a cybercriminal the opportunity to hide their illegal activity within someone else's VPN tunnel, and if intercepted, may result in possible criminal charges levied against an innocent person.

While VPNs are common ways for multiple private local area networks to interconnect to one another using private connections with dedicated capacity and bandwidth, the use of VPNs over public Networks and the Internet is problematic for two party communications. One issue with VPNs is the VPN connection must be established in advance, before it can be used, not on a packet-by-packet basis For example, in a VoIP call connected over a packet-switched network, before a cell phone can contact the intended call recipient at a second cell phone, it must first establish a VPN session. To do so, the caller's cell phone must first be loaded with VPN connection application. The caller then must send IP packets to VPN host, typically a service provider. These packets are carried through any available last-mile routing, e.g. radio communication from the cell phone to a nearby WiFi base station, followed by wireline communication to a local router, then by wireline communication to the VPN host. Once the session between the caller's cell phone and VPN host is established, the caller's cell phone must then instruct the VPN host to create a VPN tunnel from the caller's cell phone to the VPN host. This leg of the VPN tunnel is facilitated as a Layer 5 session with the tunnel encrypted by Layer 6.

Once the VPN connection is set up, then the caller's cell phone may then place a call via any VoIP phone app to any other phone. If the phone being called is not connected to the same VPN, the application must establish a "call out" link over the last mile from the VPN host nearest to the destination cell phone, i.e. the person being called. If the VoIP application is unable or unauthorized to do so, the call will fail and immediately terminate. Otherwise, the inner IP packet will establish an application Layer 5 session between calling and destination cell phones confirming the IP test packets are properly decrypted and intelligible.

To place a call the call necessarily comes from a Layer 7 application running on the caller's phone, i.e. a cell phone app using the carrier's data plan, and not from the phone's normal dialup functions, because the telephonic carrier's SIM card in the phone is not compatible with the VPN tunnel. Once the call is initiated, the caller's cell phone transmits a succession of IP packets representing small pieces or "snippets" of sound in accordance with its communication application. These packets are sent from the application in caller's cell phone through the network, e.g. through a WiFi link to a nearby WiFi base station then through a wireline connection to a router, and finally through wireline connection to the VPN host. The data is then sent securely to the VPN host through a VPN tunnel to the terminus device of the VPN network, the destination VPN gateway. In this example the VPN tunnel doesn't extend all the way to the destination cell phone, but instead stops short of device being called. Beyond the VPN's destination gateway, the data is no longer encrypted because the VPN carrier is no longer involved. For data packets leaving the VPN tunnel, VPN host forewords the data onward over the last mile connection of the destination device, e.g. a wireline connection to a nearby router, then by wireline connection to the local cell phone system and tower, transmitting the call as a normal cellular phone call using 2G, 3G or 4G telephony. The process of calling from a cell phone app to a phone not running the same app is called a "call out" feature.

The foregoing example highlights another problem with connecting to a VPN over a public network—the last-mile link from the VPN host to the person being called are not part of the VPN, and therefore do not guarantee security, performance or call QoS. Specifically the caller's last mile comprising connections are all open to sniffing and subject to cyber-assaults. Once the call is completed and the caller's cell phone hangs up, the VPN link must be terminated whereby VPN Layer 5 coordinates closing the VPN session and the caller's cell phone disconnects from VPN host.

The adaptation of the virtual private network, a technology originally created for computer-to-computer data transfers, suffers several major issues.

- Last mile communication from the destination VPN gateway to the destination cell phone is not secure and is at risk for sniffing and surveillance.
- The last mile communication between the caller's cell phone and the VPN gateway is secure only if the caller uses a data communication based app. If the caller connects to the VPN gateway using a telephonic link, i.e. a dial in feature, then last mile communications from a caller's cell phone to the nearest VPN gateway is not secure and is at risk for sniffing and surveillance.
- The call can only be secured end-to-end if both parties employs data communication and not telephony over their respect last mile links and provided that both parties know to join the same VPN prior to initiating the call.

The last bullet point highlights the paradox of secure VPN communication—the person being called needs to know they are being called before they are called in order to join the network. To inform the person they are being to be called, they must first be contacted and instructed to log into the VPN before the call can commence. In essence they must receive an un-secured phone call to connect to a secure phone call. The unsecured phone call is easily hacked, sniffed, and surveiled. Moreover, the metadata of the unsecured call exposes who is calling who is being called, and what time the call occurs. Call metadata is extremely useful in tracking a person's activity or to profile them as a target for criminals.

Even ignoring the security concerns, there is no guarantee that placing a call or sending documents through a VPN may not fail for any number of other reasons including:

- The VPN may not operate with sufficient low latency to support real-time applications, VoIP or video;
- The VPN last-mile connection from the caller to the VPN gateway or from the VPN gateway to the call recipient may not operate with sufficient low latency to support real-time applications, VoIP or video;
- The nearest VPN gateway to the caller or to the intended recipient, i.e. "the last mile" may be very far away, possibly even farther than the distance to the call recipient without the VPN, exposing the connection to excessive latency, network instability, uncontrolled routing through unknown networks, variable QoS, and numerous opportunities for man-in-middle attacks in the unprotected portion of the connection;
- The VPN last-mile connection from the VPN gateway to the call recipient may not support "call out" connections and packet forwarding or support links to local telcos;
- Local carriers or government censors may block calls or connections into or out of known VPN gateways for reasons of national security or regulatory compliance;
- Using corporate VPNs, VoIP calls may limited to and from only company employees and specified authorized users, financial transactions and video streaming may be blocked, private email to public email servers such Yahoo, Google, etc. may be blocked, and numerous web sites such YouTube, chat programs, or Twitter may be blocked as per company policy.
- In cases of unstable networks, a VPN may get stuck open and retain a permanent session connected to a caller's device until manually reset by the VPN operator. This can lead to lost bandwidth for subsequent connections or expensive connection fees.

Comparing Networks—

Comparing communication offered by "over-the top" or OTT providers, to that of communication systems employing public networks to connect to an ad hoc VPN, quickly reveals that aside from the VPN link itself, the majority of both communication systems have nearly identical components and connections. Specifically, the last mile of the caller comprising a cell phone WiFi radio connection, WiFi base station, wireline connections, and router represent the same last-mile connectivity in both implementations. Similarly, on the last mile of the other party, the caller's cell phone, cell phone connection, cell base station and tower, wireline connections, and router are identical for both Internet and VPN versions. The main difference is that in a public network, the VPN tunnel offering secure communication between VPN hosts is replaced by server/routers carrying insecure communication throughout the cloud. Another difference is in OTT communications, the call is instantly available, and where using a VPN extra steps are required to set up the VPN and to terminate the VPN session prior to and following the call.

In both examples, the last-mile connections offer unpredictable call QoS, exposure to packet sniffing, and the risk of cyber-assaults. Because server/routers carrying a call are likely managed by different ISPs in different locales, one can interpret the servers as existing different clouds. For example the publically open networks owned and operated by Google, Yahoo, Amazon, and Microsoft may be considered as different clouds, e.g. the "Amazon cloud" even though they are all interlinked by the Internet.

A competing network but less popular topology, the peer-to-peer network or PPN, comprising a network made of a large number of peers with packet routing managed by the PPN and not by the router or ISP. While peer-to-peer networks existed in hardware for decades, it was Napster who popularized the concept as a means to avoid the control, costs, and regulation of Internet service providers. When sued by the U.S. government regulators for music copyright violations, the progenitors of Napster jumped ship, invading the early OTT carrier Skype. At that time, Skype's network converted from a traditional OTT into a Napster-like PPN.

In PPN operation, every device that makes a login connection to the PPN becomes one more node in the PPN. For example if in one geography, a cell phone with PPN software installed logs into the peer-to-peer network, it like all the other connected devices in the region becomes part of the network. Calls placed by any devices hops around from one device to another to reach is destination, another PPN connected device. For example, if a caller's cell phone uses its PPN connection to call another PPN connected device, e.g. destination cell phone, the call follows a circuitous path through any device(s) physically located in the PPN between the two parties. For example, the call emanating from a caller's cell phone connects by WiFi through a local WiFi base station to a nearby desktop, then to another person's notebook, to a different desktop, onto another desktop, and finally to the destination cell phone through a local cell phone base station and tower. In this manner all routing was controlled by the PPN and the Internet was not involved in managing the routing. Since both parties utilize, the PPN software used to connect to the network also acts as the application for VoIP based voice communication.

In the case where a cell phone attempts to call a non-PPN device cell phone on the opposite side of the world, the routing may necessarily include the Internet on some links, especially to send packets across oceans or mountain ranges. The first part of the routing in the local geography proceeds in a manner similar to the prior example, starting from the caller's cell phone and routed through a WiFi base station, desktop, notebook, more desktops, and so on. At this point, if the nearest notebook is connected to the network, the call will be routed through it, otherwise the call must be routed through a local cell phone base station and tower to the destination cell phone, and then back to cell phone base station and tower before sending it onwards.

If the call is transpacific, then computers and cell phones cannot carry the traffic across the ocean so the call is then necessarily routed up to the Internet to 3$^{rd}$ party server/router in a hosted cloud and onward through connections to 3$^{rd}$ party server/routers in a different cloud. For example, as it approached its destination, the call then leaves the Internet and enters the PPN in the destination geography first through a desktop which in turn connects to WiFi, to a notebook, and to a base station. Since WiFi does not run the PPN app, the actual packet entering WiFi must travel to either a tablet or cell phone in the WiFi subnet and back to WiFi before being sent on to cell phone base station and tower via a wireline connection. Finally, the caller cell phone call connects to the destination cell phone, which is not a PPN enabled device. The connection thereby constitutes a "call out" for the PPN because it exits PPN network. Using this PPN approach, like a VPN, placing a call involves first registering a calling device to the PPN network by completing a PPN login. Thereafter, the call can be placed using the PPN app. The advantage of the PPN approach is little or no hardware is needed to carry a call over a long distance, and that since every device connected to the PPN regularly updates the PPN operator as to its status, loading and latency, the PPN operator can decide a packet's routing to best minimize delay.

The disadvantages of such an approach is that packets traverse a network comprising many unknown nodes representing a potential security threat and having an unpredictable impact on call latency and call QoS. As such, except for Skype, peer-to-peer networks operating at Layer-3 and higher are not commonly employed in packet-switched communication networks.

A comparative summary of ad hoc VPN providers, Internet OTT providers, and PPN peer networks is contrasted below.

| Network | Virtual Private VPN | Internet OTT | Peer-to-Peer PPN |
|---|---|---|---|
| Nodes | Public/Hosted Servers | Public Routers/Servers | PPN Users |
| Node Capability | Known Infrastructure | Known Infrastructure | Mixed, Unknown |
| Cloud Bandwidth | Guaranteed | Unpredictable | Unpredictable |
| Last-Mile Bandwidth | Provider Dependent | Provider Dependent | PPN Dependent |
| Latency | Unmanageable | Unmanageable | Best Effort |
| Network Stability | Unmanageable | Unmanageable, Redundant | Best Effort |
| Call Setup | Complex Login | None Required | Login |
| User Identity | User Name | Phone Number | User Name |
| VoIP QoS | Variable to Good | Variable | Variable |
| Cloud Security | Encrypted Payload Only | Unencrypted | Unencrypted |
| Last-Mile Security | Unencrypted | Unencrypted | Unencrypted |
| Sniffable | Packet Header (Cloud) Entire Packet (Last Mile) | Entire Packet | Entire Packet |

As shown, while VPN and the Internet comprise fixed infrastructure, the nodes of a peer-to-peer network vary depending on who is logged in and what devices are connected to the PPN. The cloud bandwidth, defined in the context of this table as the networks' high-speed long-distance connections, e.g. networks crossing oceans and mountain ranges, is contractually guaranteed only in the case of VPNs, and is otherwise unpredictable. The last-mile bandwidth is local provider dependent for both Internet and VPN providers but for PPN is entirely dependent on who is logged in.

Latency, the propagation delay of successively sent IP packets is unmanageable for OTTs and VPNs because the provider does not control routing in the last mile but instead depends on local telco or network providers, while PPNs have limited ability using best efforts to direct traffic among the nodes that happen to be online at the time in a particular geography. Likewise, for network stability, PPNs have the ability to reroute traffic to keep a network up but depend entirely on who is logged in. The Internet, on the other hand, is intrinsically redundant and almost certain to guarantee delivery but not necessarily in a timely manner. Network stability for an ad hoc VPN depends on the number of nodes authorized to connect to the VPN host. If these nodes go offline, the VPN is crippled.

From a call setup point of view the Internet is always available, PPNs require the extra step of logging into the PPN prior to making a call, and VPNs can involve a complex login procedure. Moreover, most users consider OTT's use of phone numbers rather than separate login IDs used by VPNs and PPNs as a major beneficial feature in ease of use. All three networks listed suffer from variable VoIP QoS, generally lagging far behind commercial telephony carriers.

From a security point of view, all three options are bad with the last mile completely exposed to packet sniffing with readable addresses and payloads. VPNs offer encryption of the cloud connection but still expose the IP addresses of the VPN hosts. As such no network option shown is considered secure. As such, encryption is used by various applications to try to prevent hacking and cyber-assaults, either as a Layer 6 protocol or as an embedded portion of the Layer 7 application itself.

Overreliance on Encryption—

Regardless of whether used for encrypting IP packets or establishing VPNs, today's network security relies almost solely on encryption and represents one weakness in modern packet-switched based communication networks. For example, numerous studies have been performed on methods to attack RSA encryption. While limiting the prime numbers to large sizes greatly reduces the risk of breaking the decryption D-key code using brute force methods, polynomial factor methods have been successfully demonstrated to crack keys based on smaller prime number-based keys. Concerns exist that the evolution of "quantum computing" will ultimately lead to practical methods of breaking RSA-based and other encryption keys in reasonable cyber-assault times.

To combat the ever-present risk of code breaking, new algorithms and "bigger key" encryption methods such as the "advanced encryption standard" or AES cipher adopted by US NIST in 2001 have emerged. Based on the Rijndael cipher, the design principle known as a substitution-permutation network combines both character substitution and permutation using different key and block sizes. In its present incarnation, the algorithm comprises fixed block sizes of 128 bits with keys comprising varying lengths of 128 bits, 192 bits, and 256 bits, with the corresponding number of repetitions used in the input file transformation varying in rounds of 10, 12, and 14 cycles respectively. As a practical matter, AES cipher may be efficiently and rapidly executed in either software or hardware for any size of key. In cryptography vernacular, an AES based encryption using a 256b key is referred to as AES256 encryption. AES512 encryption employing a 512b key is also available.

While each new generation raises the bar in cryptography to make better encryption methods and to more quickly break them, profit-minded cybercriminals often concentrate on their targets rather than simply using computing to break an encrypted file. As described previously, using packet sniffing and port interrogation, a cyber pirate can gain valuable information about a conversation, a corporate server, or even a VPN gateway. By cyber-profiling, it may be easier to launch a cyber-assault on a company's CFO or CEO's personal computers, notebooks, and cell phones rather than attack the network itself. Sending emails to employees that automatically install malware and spyware upon opening an embedded link completely circumvent firewall security because they enter the network from "inside" where employees necessarily must connect and work.

Figure 1:
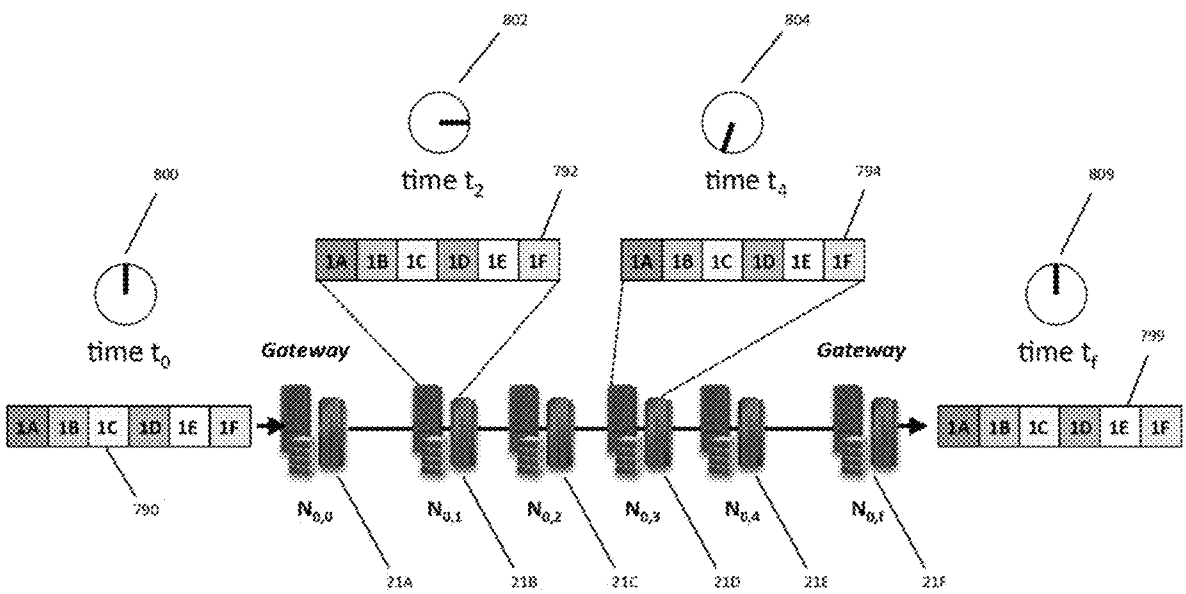
FIG. 1 is a schematic diagram showing conventional packet transport across a network.

The chance of breaking encryption also improves if data moves through a network without changing, i.e. statically. In the network of FIG. 1, for example, the underlying data in packets 790, 792, 794 and 799 remain unchanged as the packets move through the network. Each data packet shown comprises a sequence of data or sound arranged sequentially in time or pages unaltered from its original order when it was created. If the content of a data packet is textual, reading the unencrypted plaintext file in the sequence 1A-1B-1C-1D-1E-1F will result in "legible" text for communiqué number "1". If the content of a data packet is audio, converting, i.e. "playing", the unencrypted plaintext file in the sequence 1A-1B-1C-1D-1E-1F through a corresponding audio CODEC, essentially a software based D/A converter, will result in sound for audio file number "1". In either case, throughout this disclosure, each data slot represented by fixed size boxes comprises a prescribed number of bits, e.g. two bytes (2B) long. The exact number of bits per slot is flexible just so long as every communication node in a network knows what the size of each data slot is. Contained within each data slot is audio, video, or textual data, identified in the drawings as a number followed by a letter. For example, as shown, the first slot of data packet 790 contains the content 1A where the number "1" indicates the specific communication #1 and the letter "A" represents the first piece of the data in communication #1. Similarly, the second slot of data packet 790 contains the content 1B where the number "1" indicates it is part of the same communication #1 and the letter "B" represents the second piece of the data in communication #1, sequentially following 1A.

If, for example, the same data packet hypothetically included content "2A" the data represents the first packet "A" in a different communication, specifically for communication #2, unrelated to communication #1. Data packets containing homogeneous communications, e.g. where all the data is for communication #1 are easier to analyze and read than those mixing different communications. Data arranged sequentially in proper order makes it easy for a cyber-attacker to interpret the nature of the data, whether it is audio, text, graphics, photos, video, executable code, etc.

Moreover, in the example shown, since the packet's source and destination IP addresses remain constant, i.e. where the packets remain unchanged during transport through the network in the same form as the data entering or exiting gateway servers 21A and 21F, because the underlying data doesn't change, a hacker has more chances to intercept the data packets and a better chance to analyze and open the files or listen to the conversation. The simple transport and one-dimensional security, i.e. relying only on encryption for protection, increases the risk of a cyber-attack because the likelihood of success is higher in such overly simplified use of the Internet as a packet-switched network.

Securing Real-Time Networks and Connected Devices

In order to improve the quality of service (QoS) of telephonic, video, and data communication while addressing the plethora of security vulnerabilities plaguing today's packet-switched networks, a new and innovative systemic approach to controlling IP packet routing is required, one that manages a global network comprising disparate technologies and concurrently facilitates end-to-end security. The goals of such an inventive packet-switched network include the following criteria:

1. Insure the security and QoS of a global network or long-distance carrier including dynamically managing real-time voice, video, and data traffic routing throughout a network;
2. Insure the security and QoS of the "local network or telco" in the last mile of the communication network;
3. Insure the security and QoS of the "last link" of the communication network, including providing secure communication over unsecured lines;
4. Insure the security of communicating devices and authenticate users to prevent unauthorized or fraudulent access or use;
5. Facilitate a secure means to store data in a device or online in network or cloud storage to prevent unauthorized access;
6. Provide security and privacy protection of all non-public personal information including all financial, personal, medical, and biometric data and records;

7. Provide security and privacy protection of all financial transactions involving online banking and shopping, credit cards, and e-pay; and
8. Provide security, privacy, and as-required, anonymity, in transactional and information exchange involving machine-to-machine (M2M), vehicle-to-vehicle (V2V), and vehicle-to-infrastructure (V2X) communication.

Of the above stated goals, the inventive matter contained within this disclosure relates to the second topic described in item #2, i.e. to "the security and QoS of the local network or telco in the last mile of the communication network" This topic can be considered as secure last mile connectivity without sacrificing real-time communication performance.

Glossary

Unless the context requires otherwise, the terms used in the description of the Secure Dynamic Communication Network And Protocol have the following meanings:

Anonymous Data Packets: Data packets lacking information as to their original origin or final destination.

Client or Client Device: A device, typically a cell phone, tablet, notebook, desktop, or IoT device connected to an SDNP Cloud over a Last Mile.

Concealment: The encoding process by which the contents of a SDNP packet or portions thereof are rendered unrecognizable using any sequential combination of security operation such as scrambling, splitting, junk data insertions, and encryption. Recovery of concealed data requires execution of the anti-function or decoding processes in reverse order, e.g. decryption, junk data removal, mixing and unscrambling.

Decryption: A mathematical operation used to convert data packets from ciphertext into plaintext.

Disaggregated Data Storage: The process of fragmenting data files and concealing their content before storing the various fragmented files on different data storage nodes.

DMZ Server: A computer server not accessible directly from the SDNP network or the Internet used for storing selectors, seed generators, key generators and other shared secrets. A DMZ may also be referred to as an "air gapped" server, i.e. a computer with no wired network connection or access.

Dynamic Encryption/Decryption: Encryption and decryption relying on keys that change dynamically as a data packet traverses the SDNP network.

Dynamic Mixing: The process of mixing where the mixing algorithms (the inverse of splitting algorithms) change dynamically as a function of a seed based on a state, such as the time, state, and zone when a mixed data packet is created.

Dynamic Scrambling/Unscrambling: Scrambling and unscrambling relying on algorithms that change dynamically as a function of a state, such as the time when a data packet is created or the zone in which it is created.

Dynamic Splitting: The process of splitting where the splitting algorithms change dynamically as a function of a seed based on a state, such as the time, state, and zone when a data packet is split into multiple sub-packets.

Encryption: A mathematical operation used to convert data packets from plaintext into ciphertext.

Fragmented Data Transport: The routing of split and mixed data through the SDNP network.

Junk Data Deletions (or "De-junking"): The removal of junk data from data packets in order to restore the original data or to recover the data packet's original length.

Junk Data Insertions (or "Junking"): The intentional introduction of meaningless data into a data packet, either for purposes of obfuscating the real data content or for managing the length of a data packet.

Key: A disguised digital value that is generated by inputting a state, such as time, into a key generator which uses a secret algorithm to generate the key. A key is used to select an algorithm for encrypting or decrypting the data in a packet from a selector. A key can be used to safely pass information regarding a state over public or unsecure lines.

Key Exchange Server: A computer server, often third party hosted and independent of the SDNP network operator, used to distribute public encryption keys to clients, and optionally to servers using symmetric key encryption, especially for client-administered key management, i.e. client based end-to-end encryption to prevent any possibility of network operator spying.

Last Link: The network connection between a Client's device and the first device in the network with which it communicates, typically a radio tower, a WiFi router, a cable modem, a set top box, or an Ethernet connection. In the case of Ethernet communication, the Last Link comprises a physical "tethered" (i.e. wired) connection to a cable modem or optical fiber modem. For WiFi connectivity (e.g. in a café), the Last Link comprises a WiFi router connected to a DSL, cable, or fiber network. In a cellular network, the Last Link comprises the radio link between the cellular tower and the mobile phone, which may comprise, for example a 3G or 4G/LTE connection.

Last Mile: The network connection between a Client and a gateway media node in an SDNP or other type of network or cloud, including the Last Link. The Last Mile typically comprises communication over networks owned and operated by local telco's and cable companies, e.g. Comcast cable, Verizon cellular, Korean Telecom, British Telecom, etc.

Mixing: The combining of data packets from different sources, which may include different data types, to produce one longer data packet (or a series of smaller sub-packets) having unrecognizable content. In some cases previously split data packets are mixed to recover the original data content. The mixing operation may also include junk data insertions and deletions and parsing.

Multiple PHY or Multi-PHY: Communication involving alternating transport of related sequential data packets over multiple physical mediums, e.g. optical fiber and 4G, different WiFi channels and frequencies, 4G and WiFi, Ethernet WiFi, etc.

Parsing: A numerical operation whereby a data packet is broken into shorter sub-packets for storage or for transmission.

Router: A device that directs the routing of a datagram to the destination address specified in its IP header. For packet routing outside of the SDNP network, the IP address employed may represent a valid Internet IP address (one recognized by a DNS server) or may represent the NAT address assigned by a network address translator operated by the local network provider (e.g. Comcast assigns its own internal IP addresses for communication within the Comcast cable/fiber network).

Scrambling: An operation wherein the order or sequence of data segments in a data packet is changed from its natural order into an unrecognizable form.

Splitting: An operation wherein a data packet (or a sequence of serial data packets) is split into multiple sub-packets, which are routed to multiple destinations. A splitting operation may also include junk data insertions and deletions.

SoftSwitch: Software comprising executable code performing the function of a telecommunication switch and router.

SDNP: An acronym for "Secure Dynamic Communication Network and Protocol" meaning a hyper-secure communications network made in accordance with this invention.

SDNP Address: An address used for routing SDNP packets through the SDNP cloud or over the Last Mile comprising the ad hoc IP address of the next destination device, i.e. only enough information to execute a single hop.

SDNP Administration Server: A computer server used to distribute executable code and shared secrets to SDNP servers globally or in specific zones.

SDNP Bridge Node: A SDNP node connecting one SDNP Zone or Cloud to another SDNP Zone or Cloud having dissimilar security credentials.

SDNP Client or Client Device: A network connected device, typically a cell phone, tablet, notebook, desktop, or IoT device running a SDNP application in order to connect to an SDNP Cloud, generally connecting over a Last Mile.

SDNP Cloud: A network of interconnected SDNP Servers running SoftSwitch executable code to perform SDNP Communications Node operations.

SDNP Gateway Node: A media node connecting an SDNP Cloud to a Client Device via a Last Mile. SDNP Gateway nodes require access to at least two Zones—that of the SDNP Cloud and of the Last Mile.

SDNP Media Node: SoftSwitch executable code that processes incoming data packets with particular identifying tags in accordance with instructions from the signaling server or another computer performing the signaling function, including encryption/decryption, scrambling/unscrambling, mixing/splitting, tagging and SDNP header and sub-header generation. An SDNP Media Node is responsible for identifying incoming data packets having specific tags and for forwarding newly generated data packets to their next destination.

SDNP Media Server: A computer server hosting a SoftSwitch performing the functions of a SDNP Media Node in dual-channel and tri-channel communications and also performing the tasks of a SDNP Signaling Node and a SDNP Name-Server Node in single-channel communications.

SDNP Name Server: A computer server hosting a SoftSwitch performing the functions of a SDNP Name-Server Node in tri-channel communications.

SDNP Name Server Node: SoftSwitch executable code that manages a dynamic list of every SDNP device connected to the SDNP cloud.

SDNP Network: The entire hyper-secure communication network extending from client-to-client including last link and last mile communication, as well as the SDNP cloud.

SDNP Node: A SDNP communication node comprising a software-based "SoftSwitch" running on a computer server or alternatively a hardware device connected to the SDNP network, functioning as an SDNP node, either as Media Node, a Signaling Node, or a Name Server Node.

SDNP Server: A computer server comprising either a SDNP Media Server, a SDNP Signaling Server, or a SDNP Name Server and hosting the applicable SoftSwitch functions to operate as an SDNP node.

SDNP Signaling Node: SoftSwitch executable code that initiates a call or communication between or among parties, determines all or portions of the multiple routes for fragmented data transport based on caller criteria and a dynamic table of node-to-node propagation delays, and instructing the SDNP media how to manage the incoming and outgoing data packets.

SDNP Signaling or Signal Server: A computer server hosting a SoftSwitch performing the functions of a SDNP Signaling Node in dual-channel and tri-channel SDNP communications, and also performing the duties of the SDNP Name-Sever Node in dual-channel communications.

SDNP Tag: A source address, SDNP zip code, or any other code used to identify an incoming data packet or a sub-packet thereof.

Security Operation: The process of modifying a data packet to perform concealment (or to recover the content of a concealed packet) using the state-dependent security credentials related to the zone and state of the where the packet is created.

Security Settings or Security Credentials: Digital values, such as seeds and keys, that are generated by seed generators or key generators using secret algorithms in conjunction with a constantly changing input state, such as network time, and that can therefore be safety transmitted over public or insecure lines.

Seed: A disguised digital value that is generated by inputting a state, such as time, into a seed generator, which uses a secret algorithm to generate the seed. A seed is used to select an algorithm for scrambling, encrypting or splitting the data in a packet from a selector. A seed can be used to safely pass information regarding a state over public or unsecure lines.

Selector: A list or table of possible scrambling, encryption or splitting algorithms that are part of the shared secrets and that are used in conjunction with a seed or key to select a particular algorithm for scrambling, unscrambling, encrypting, decrypting, splitting or mixing a packet or packets.

Shared Secrets: Confidential information regarding SDNP node operation, including tables or selectors of scrambling/unscrambling, encryption/decryption, and mixing/splitting algorithms, as well as the algorithms used by seed generators, key generators, zone information, and algorithm shuffling processes stored locally on DMZ servers not accessible over the SDNP network or the Internet.

Single PHY: Communication of related data packets transported over a single physical medium, e.g. exclusively over optical fiber, or Ethernet, or WiFi, or a cellular network.

State: An input, such as location, zone, or network time that is used to dynamically generate security settings such as seeds or keys or to select algorithms for specific SDNP operations such as mixing, splitting, scrambling, and encryption.

Time: The universal network time used to synchronize communication across the SDNP network Unscrambling: A process used to restore the data segments in a scrambled data packet to their original order or sequence. Unscrambling is the inverse function of scrambling.

Zone: A network of specific interconnected servers sharing common security credentials and shared secrets. Last mile connections comprise separate zones from those in an SDNP Cloud.

Secure Dynamic Communication Network and Protocol (SDNP) Design

To prevent cyber-assaults and hacking of packet-switched communication while minimizing real-time packet latency, insuring stable call connectivity, and delivering the highest integrity of voice communication and video streaming, the disclosed secure dynamic communication network and protocol, or SDNP, is designed based upon a number of guiding principles including:

- Real-time communication should always occur using the lowest latency path.
- Unauthorized inspection or sniffing of a data packet should provide no context as to where the packet came from, where it is going, or what is in it.
- Data packet payloads should be dynamically re-encrypted, i.e., decrypted and then encrypted again using a different encryption algorithm, with no risk of being hacked in any reasonable time.
- Even after they have been decrypted, data packet payloads may still contain incomprehensible payloads comprising a dynamically scrambled mix of multiple conversations and unrelated data mixed with junk packet fillers.

Implementation of the above guidelines involves a variety of unique methods, functions, features and implementations including in various embodiments some or all of the following

- The SDNP employs one or more dedicated clouds comprising telco, i.e. telecommunication system, softswitch functions realized using proprietary command and control software not accessible through the Internet.
- All intra-cloud communication occurs using dedicated SDNP packet routing within proprietary clouds based on SDNP addresses and dynamic ports (i.e. proprietary NAT addresses), not on DNS recognized IP addresses. SDNP addresses are not usable or routable over the Internet or outside the SDNP cloud.
- The SDNP network constantly identifies and dynamically routes all real-time communication through the lowest latency paths available.
- No secure or real-time communication is routed outside the SDNP cloud or over the Internet except in cloud-to-cloud and last-mile communication, and then generally using single-hop routing with invisible addresses.
- Routing data contained within a data packet identifies the routing for a single hop between two adjacent devices, identifying only the last and next server's SDNP or IP addresses
- The phone number or IP addresses of the caller and the call recipient, i.e. the clients' respective source and destination addresses, are not present in the IP packet headers nor are they present in the encrypted payload
- Command and control related shared secrets exist in system software installed in secure DMZ servers not accessible through the Internet.
- SDNP packet communication may occur through three independent channels—a "name server" used to identify elements within the SDNP cloud, "media servers" used for routing content and data, and "signaling servers" used for packet and call command and control.
- Routing information, along with keys and numeric seeds (as needed) may be supplied to all participating media servers through an independent signaling channel prior to the call or communiqué and not with content. The signaling server supplies the media servers with only the last and next destination of a packet traversing the network.
- Media packets contain fragmented data representing only a portion of a call, document, text or file, dynamically mixed and remixed with other packets containing fragmented data from other sources and of different types.
- Special security methods are employed to protect the first- and last-mile communication, including separating signaling server-related communications from media and content-related packets.
- Packet transport is content-type dependent, with voice and real-time video or streaming based on an enhanced UDP, while signaling packets, command-and-control packets, data files, application files, systems files, and other files which are sensitive to packet loss or latency utilize TCP transport.
- Special security and authentication methods are used to confirm that a device is the real client and not a clone, and to authenticate that the person communicating is the true owner of the device and not an imposter.

To ensure secure communication with low latency and high QoS in VoIP and real-time applications, the disclosed "secure dynamic communication network and protocol" or SDNP, utilizes an inventive "dynamic mesh" network comprising

- Dynamic adaptive multipath and meshed routing with minimal latency
- Dynamic packet scrambling
- Dynamic fragmentation using packet splitting, mixing, parsing, and junk bit packet fillers
- Dynamic intra-node payload encryption throughout a network or cloud
- Dynamic network protocol with address disguising and need-to-know routing information
- Multichannel communication separating media and content from signaling, command and control, and network addresses
- Dynamic adaptive real-time transport protocol with data type specific features and contextual routing
- Support of client-encrypted payloads with user-key management
- Lightweight audio CODEC for high QoS in congested networks As described, SDNP communication relies on multi-route and meshed communication to dynamically route data packets. Contrasting single-path packet communication used for Internet OTT and VoIP communications, in SDNP communication in accordance with this invention, the content of data packets is not carried serially by coherent packets containing information from a common source or caller, but in fragmented form, dynamically mixing and remixing content emanating from multiple sources and callers, where said data agglomerates incomplete snippets of data, content, voice, video and files of dissimilar data types with junk data fillers. The advantage of the disclosed realization of data fragmentation and transport is that even unencrypted and unscrambled data packets are nearly impossible to interpret because they represent the combination of unrelated data and data types.

By combining fragmented packet mixing and splitting with packet scrambling and dynamic encryption, these hybridized packets of dynamically encrypted, scrambled, fragmented data comprise meaningless packets of gibberish, completely unintelligible to any party or observer lacking the shared secrets, keys, numeric seeds, and time and state variables used to create, packet, and dynamically re-packet the data.

Moreover, each packet's fragmented content, and the secrets used to create it, remain valid for only a fraction of a second before the packet is reconstituted with new fragments and new security provisions such as revised seeds, keys, algorithms, and secrets. The limited duration in which a cyber-pirate has available to break and open the state-dependent SDNP data packet further enhances SDNP security, requiring tens of thousands of compute years to be processed in one tenth of a second, a challenge twelve orders of magnitudes greater than the time available to break it.

The combination of the aforementioned methods facilitates multi-dimensional security far beyond the security obtainable from static encryption. As such, the disclosed secure dynamic communication network and protocol is referred to herein as a "HyperSecure" network.

Data Packet Scrambling—

Figure 2A:
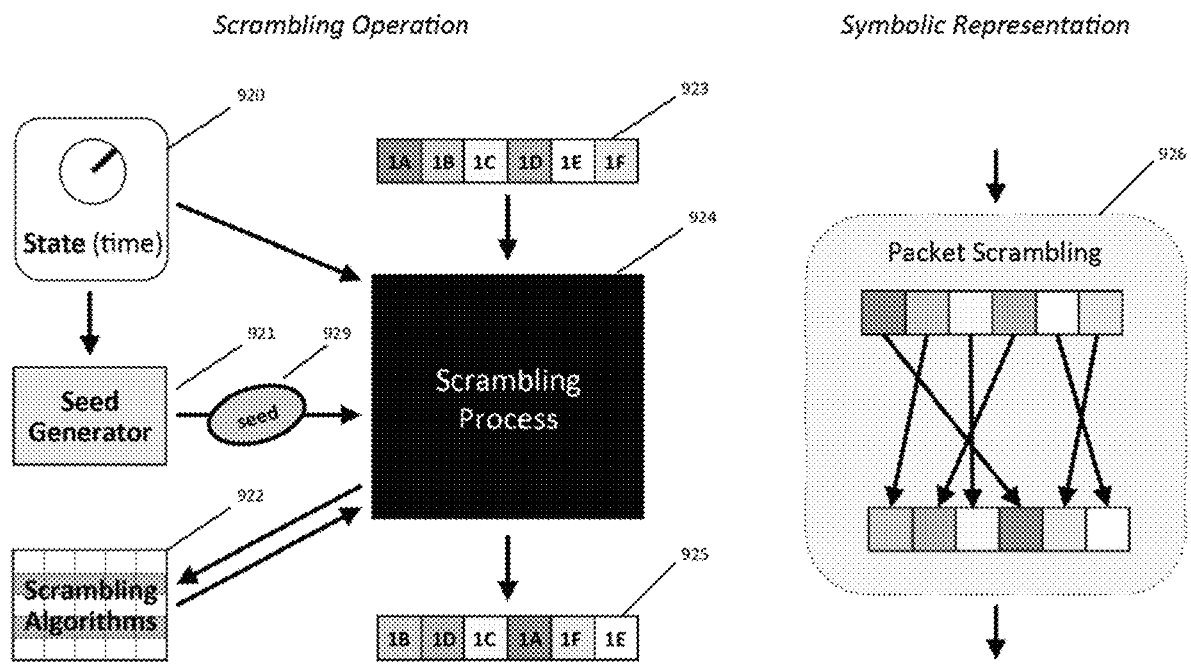
FIG. 2A is a schematic diagram showing the process of packet scrambling.

In accordance with the disclosed invention, secure communication over a packet-switched network relies on several elements to prevent hacking and ensure security, one of which involves SDNP packet scrambling. SDNP packet scrambling involves rearranging the data segments out of sequence, rendering the information incomprehensible and useless. As shown in FIG. 2A, an unscrambled data packet, data packet 923, processed through scrambling operation 924, results in scrambled data packet 925. The scrambling operation can use any algorithm, numerical method, or sequencing method. The algorithm may represent a static equation or include dynamic variables or numerical seeds based on "states," such as time 920 when the scrambling occurred, and a numerical seed 929 generated by seed generator 921, which may generate seed 929 using an algorithm that is also dependent on a state such as time 920 at the time of the scrambling. For example, if each date is converted into a unique number ascending monotonically, then every seed 929 is unique. Time 920 and seed 929 may be used to select a specific algorithm and may also be used to select or calculate a specific scrambling operation 924, chosen from a list of available scrambling methods, i.e. from scrambling algorithms 922. In data flow diagrams, it is convenient to illustrate this packet-scrambling operation and sequence using a schematic or symbolic representation, as depicted herein by symbol 926.

Figure 2B:
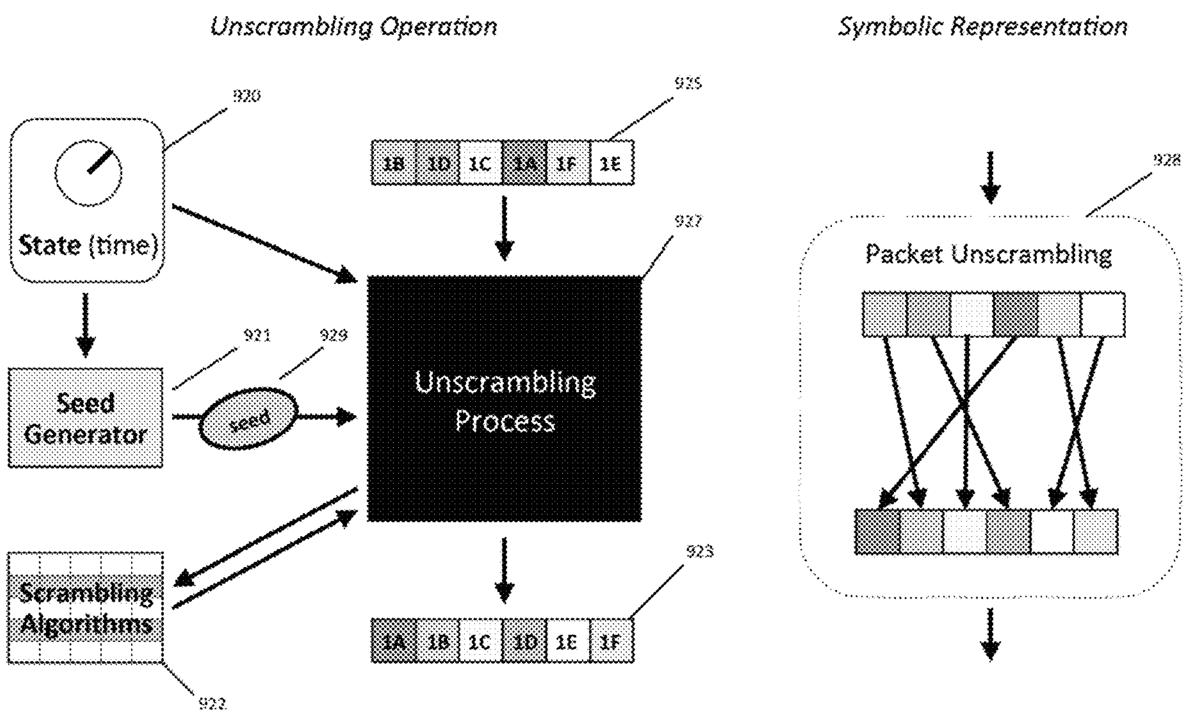
FIG. 2B is a schematic diagram showing the process of packet unscrambling.

The unscrambling operation, shown in FIG. 2B illustrates the inverse function of scrambling operation 924, specifically unscrambling operation 927, where the state or time 920 and corresponding seed 929 used to create scrambled data packet 925 are re-used for undoing the scrambling to produce unscrambled data, specifically unscrambled data packet 923. Using the same state or time 920 employed when the packet scrambling first occurred, the same scrambling method must be used again in the unscrambling operation 927 as selected from scrambling algorithm list 922. Although scrambling algorithm list 922 references the term "scrambling", the same algorithm table is used to identify and select the inverse function needed for performing "unscrambling", i.e. scrambling algorithm list 922 contains the information needed both for scrambling data packets and for unscrambling data packets. Because the two functions involve the same steps performed in reverse order, list 922 could also be renamed as "scrambling/unscrambling" algorithms list 922. For clarity's sake however, the table is labeled only by the function and not by its anti-function.

Should the scrambling algorithm selected for implementing unscrambling operation 927 not match the original algorithm employed in packet scrambling, or should seed 929 or state or time 920 not match the time scrambling occurred, then the unscrambling operation will fail to recover the original unscrambled data packet 923, and the packet data will be lost. In data flow diagrams, it is convenient to illustrate this packet unscrambling process and sequence using a schematic or symbolic representation, as depicted herein by symbol 928.

In accordance with the disclosed invention, numerous algorithms may be used to perform the scrambling operation so long that the process in reversible, meaning repeating the steps in the opposite order as the original process returns each data segment to its original and proper location in a given data packet. Mathematically, acceptable scrambling algorithms are those that are reversible, i.e. where a function F(A) has an anti-function $F^{-1}(A)$ or alternatively a transform has a corresponding anti-function such that $$F^{-1}[F(A)]=A$$

meaning that a data file, sequence, character string, file or vector A processed by a function F will upon subsequent processing using the anti-function $F^{-1}$ return the original input A undamaged in value or sequence.

Figure 2C:
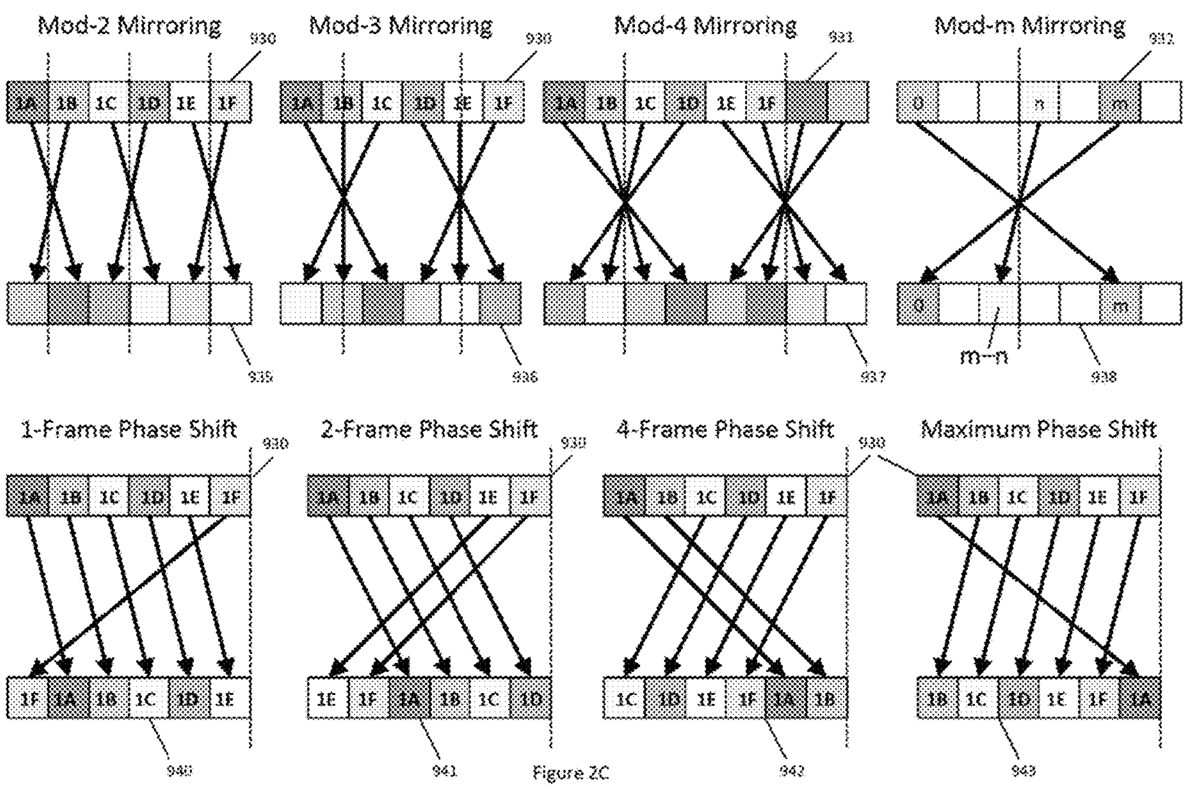
FIG. 2C is a schematic diagram showing various packet scrambling algorithms.

Examples of such reversible functions are illustrated by the static scrambling algorithms shown in FIG. 2C including mirroring and phase-shift algorithms. In mirroring algorithms the data segments are swapped with other data segments as a mirror image around a line of symmetry defined by the modulus or "mod" of the mirroring process. In mod-2 mirroring as shown, every two data segments of original input data packet 930 are swapped, i.e. where 1A and 1B are switched in position, as are 1C and 1D, 1E and 1F and so on, to produce scrambled output data packet 935, with a line of symmetry centered between the first and second data segments, between the third and fourth data segments, and so on, or mathematically as $1.5^{th}$, $3.5^{th}$, $5.5^{th}$, . . . , $(1.5+2n)^{th}$ position.

In mod-3 mirroring, the first and third data segments of every three data segments are swapped while the middle packet of each triplet remains in its original position. Accordingly, data segments 1A and 1C are swapped while 1B remains in the center of the triplet, data segments 1D and 1F are swapped while 1E remains in the center of the triplet, and so on, to produce scrambled data packet output 936. In mod-3 mirroring, the line of symmetry is centered in the $2^{nd}$ $5^{th}$, $8^{th}$, $(2+3n)^{th}$ position.

In mod-4 mirroring, the first and fourth data segments and the second and third of every four data segments are swapped, and so on to produce scrambled output data packet 937 from input data packet 931. Accordingly, data segment 1A is swapped with 1D; data segment 1B is swapped with 1C; and so on. In mod-4 mirroring, the line of symmetry is centered between the second and third data segments of every quadruplet, e.g. between the $2^{nd}$ and $3^{rd}$ data segments, the $6^{th}$ and $7^{th}$ data segments, and so on, or mathematically as 2.5th, 6.5th, . . . , $(2.5+4n)^{th}$ position. In mod-m mirroring, the $m^{th}$ data segment of input data packet 932 is swapped with the first, i.e. the $0^{th}$ data segment; the $0^{th}$ data segment is swapped with the $m^{th}$ element; and similarly the $n^{th}$ element is swapped with the $(m-n)^{th}$ data segment to produce scrambled output data packet 938.

Another scrambling method also shown in FIG. 2C is a frame-shift, where every data segment is shifted left or right by one, two, or more frames. For example, in a single frame phase shift, every data segment is shifted by one frame, where the first data segment is shifted to the second position; the second data segment is shifted to the third frame, and so on to produce scrambled output data packet 940. The last frame of input data packet 930, frame 1F in the example shown, is shifted to the first frame previously occupied by data segment 1A.

In a 2-frame phase shift, the first data segment 1A of input data packet 930 is shifted by two frames into the position previously occupied by data segment 1C, the $4^{th}$ frame 1D is shifted into the last position of scrambled output data packet 941, the next to the last data segment 1E is shifted into the first position and the last position 1F is shifted into the second position. Similarly, in a 4-frame phase shift, the data segments of input data data packet 930 are shifted by four places with first frame 1A replacing the frame previously held by 1E, 1B replacing 1F, 1C replacing 1A, and so on, to produce scrambled output data packet 942. In the case of the maximum phase shift, the first frame replaces the last, the second frame originally held by 1B becomes the first frame of output data packet 943, the second element is shifted into the first position, the third position into the second place, and so on. Phase-shifting one frame beyond the maximum phase shift results in output data unchanged from the input. The examples shown comprise phase-shifts where the data was shifted to the right. The algorithm also works for phase shifts-to the left but with different results.

Figure 2D:
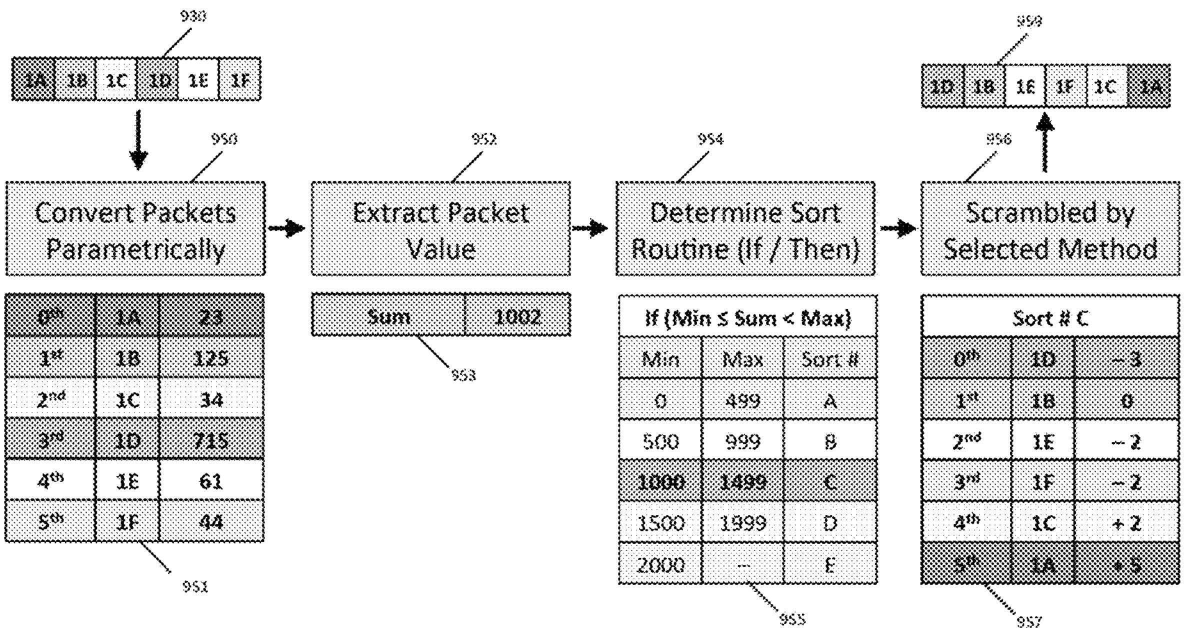
FIG. 2D is a schematic diagram showing static parametric packet scrambling.

The aforementioned algorithms and similar methods as disclosed are referred herein to as static scrambling algorithms because the scrambling operation occurs at a single time, converting an input data set to a unique output. Moreover, the algorithms shown previously do not rely of the value of a data packet to determine how the scrambling shall occur. As illustrated in FIG. 2D, in accordance with the disclosed invention, parametric scrambling means the scrambling method is chosen from a table of possible scrambling algorithms, e.g. sort # A, sort # B, etc., based on a value derived from data contained within the data packet itself. For example, assume each data segment can be converted into a numerical value based on a calculation of the data contained within the data segment. One possible approach to determine the numerical value of a data segment is to employ the decimal or hexadecimal equivalent of the bit data in the data segment. If the data segment contains multiple terms, the numeric equivalent can be found by summing the numbers in the data segment. The data segment data is then combined into a single number or "parameter" and then used to select which scrambling method is employed.

In the example shown, unscrambled data packet 930 is converted parametrically in step 950 into a data table 951, containing a numeric value for each data segment. As shown data segment 1A, the $0^{th}$ frame, has a numeric value of 23, data segment 1B, the $1^{st}$ frame, has a numeric value of 125, and so on. A single data packet value is then extracted in step 952 for the entire data packet 930. In the example shown, sum 953 represents the linear summation of all the data segment values from table 951, parametrically totaling 1002. In step 954 this parametric value, i.e. sum 953, is compared against a condition table, i.e. in software a set of predefined if-then-else statements, to compare sum 953 against a number of non-overlapping numerical ranges in table 955 to determine which sort routine should be employed. In this example, the parametric value of 1002 falls in the range of 1000 to 1499, meaning that sort # C should be employed. Once the sort routine is selected, the parametric value is then no longer required. The unscrambled data input 930 is then scrambled by the selected method in step 956 to produce the scramble data packet output 959. In the example shown, Sort # C, summarized in table 957, comprises a set of relative moves for each data segment. The first data segment of scrambled data packet 959, the $0^{th}$ frame is determined by moving the 1D data segment to the left by three moves, i.e. a 3 shift. The $1^{st}$ frame comprises data segment 1B, unchanged from its original position, i.e. a move of 0 places. The $2^{nd}$ frame comprises 1E, a data segment shifted left by two moves from its original position. The same is true for the $3^{rd}$ frame comprising data segment 1F shifted left by two moves from its original position. The $4^{th}$ frame of scrambled data packet output 959 comprises data segment 1C shifted right, i.e. +2 moves, from its original position. The $5^{th}$ frame comprises data segment 1A, shifted five moves to the right, i.e. +5, from its original position.

In this manner, summarized in table 957 for sort # C, every data segment is moved uniquely to a new position to create a parametrically determined scrambled data packet 959. To unscramble the scrambled data packet, the process is reversed, using the same sort method, sort # C. In order to insure that the same algorithm is selected to perform the unscrambling operation, the parametric value 953 of the data packet cannot be changed as a consequence of the scrambling operation. For example, using a linear summation of the parametric value of every data segment produces the same numerical value regardless of the order of the numbers.

Figure 2E:
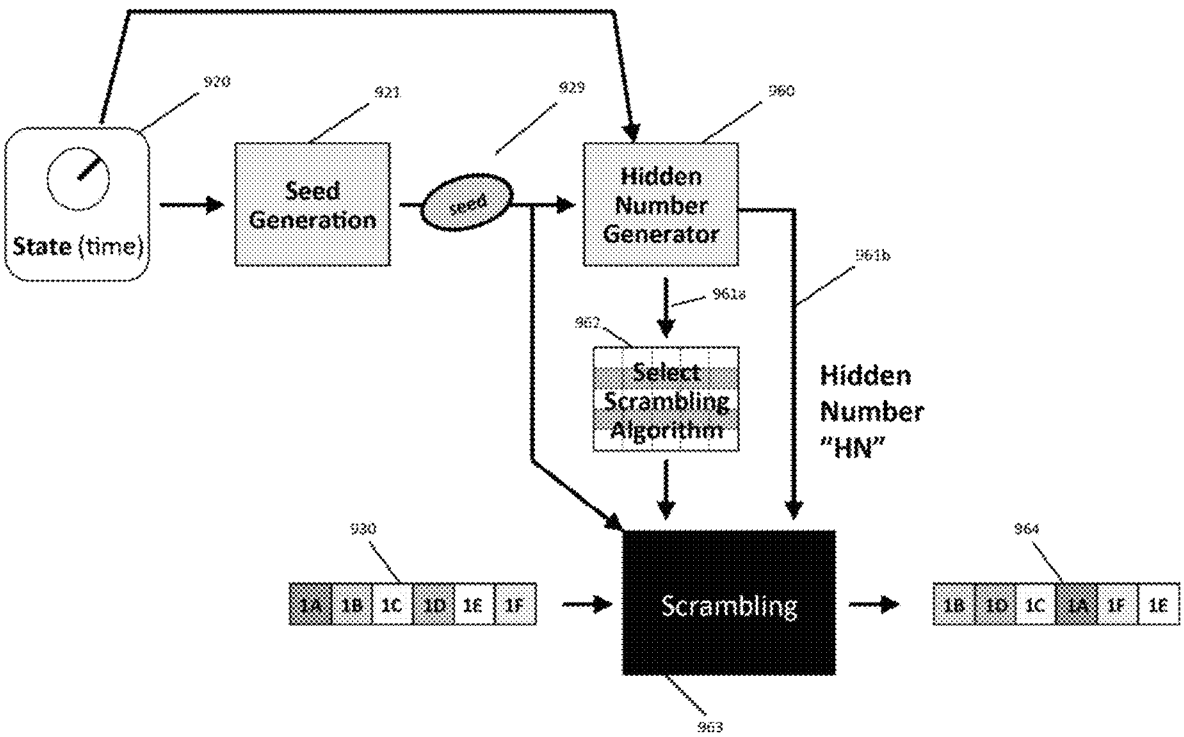
FIG. 2E is a schematic diagram showing dynamic scrambling with a hidden number.

Dynamic scrambling utilizes a system state, e.g. time, to be able to identify the conditions when a data packet was scrambled, enabling the same method to be selected to perform the unscrambling operation. In the system shown in FIG. 2E, the state is used to generate a disguised numerical seed, which is transmitted to the sender or recipient of the package, which then uses the seed to select a scrambling algorithm from a table. Alternatively, the state itself may be transmitted to the sender or recipient, the state may be used by a hidden number generator located in the sender or recipient to generate a hidden number, where the hidden number is used to select a scrambling/unscrambling algorithm. Thus, in FIG. 2E a state, e.g. time 920, is used to generate a hidden number 961, using hidden number generator 960, and the hidden number 861*a* is used to select a scrambling method from scrambling algorithm list 962. Hidden number generator 960 also may input the hidden number HN 961*b* directly to scrambling operation 963, where HN may serve as a variable in executing the scrambling operation. Thereafter, scrambling operation 963 converts unscrambled data packet 930 into scrambled data packet 964. As shown in FIG. 2F, the state 920 may be passed directly to hidden number generator 960 or state 920 may be passed to hidden number generator via seed generator 921.

The benefit of using a hidden number to select a scrambling algorithm instead of just a numeric seed, is it eliminates any possibility of a cybercriminal recreating the scrambling table by analyzing the data stream, i.e. statistically correlating repeated sets of scrambled data to corresponding numeric seeds. Although the seed may be visible in the data stream and therefore subject to spying, the hidden number generator and the hidden number HN it creates is based on a shared secret. The hidden number HN is therefore not present in the data stream or subject to spying or sniffing, meaning it is not transmitted across the network but generated locally from the numeric seed. This mathematical operation of a hidden number generator thereby confers an added layer of security in thwarting hackers because the purpose of the numeric seed is disguised.

Once the algorithm is selected, the numeric seed may also be used as an input variable in the algorithm of scrambling process 963. Dual use of the numeric seed further confounds analysis because the seed does not directly choose the algorithm but works in conjunction with it to determine the final sequence of the scrambled data segments. In a similar manner, to unscramble a dynamically scrambled data packet, seed 929 (or alternatively the state or time 920) must be passed from the communication node, device or software initially performing the scrambling to any node or device wishing to unscramble it.

In accordance with the disclosed invention, the algorithm of seed generation 921, hidden number generator 960, and the list of scrambling algorithms 962 represent "shared secrets," information stored in a DMZ server (as described below) and not known to either the sender or the recipient of a data packet. The shared secret is established in advance and is unrelated to the communication data packets being sent, possibly during installation of the code where a variety of authentication procedures are employed to insure the secret does not leak. As described below, shared secrets may be limited to "zones" so that knowledge of one set of stolen secrets still does not enable a hacker to access the entire communication network or to intercept real-time communiqués.

In addition to any shared secrets, in dynamic scrambling, where the scrambling algorithm varies during data packet transit, a seed based on a "state" is required to scramble or unscramble the data. This state on which the seed is based may comprise any physical parameter such as time, communication node number, network identity, or even GPS location, so long as there is no ambiguity as to the state used in generating the seed and so long as there is some means to inform the next node what state was used to last scramble the data packet. The algorithm used by the seed generator to produce a seed is part of the shared secrets, and hence knowledge of the seed does not allow one to determine the state on which the seed is based. The seed may be passed from one communication node to the next by embedding it within the data packet itself, by sending it through another channel or path, or some combination thereof. For example, the state used in generating a seed may comprise a random number generated by a counter and subsequently incremented by a fixed number each time a data packet traverses a communication node, with each count representing a specific scrambling algorithm.

In one embodiment of dynamic scrambling, during the first instance of scrambling a random number is generated to select the scrambling method used. This random number is embedded in the data packet in a header or portion of the data packet reserved for command and control and not subject to scrambling. When the data packet arrives at the next node, the embedded number is read by the communication node and used by the software to select the proper algorithm to unscramble the incoming data packet. The number, i.e. the "count" is next incremented by one count or some other predetermined integer, the packet is scrambled according to the algorithm associated with this new number, and the new count is stored in the data packet output overwriting the previous number. The next communication node repeats the process.

In an alternative embodiment of the disclosed counter-based method for selecting a scrambling algorithm, a random number is generated to select the initial scrambling algorithm and this number is forwarded to every communication node used to transport the specific data packet as a "shared secret". A count, e.g. starting with 0, is also embedded in the data packet in a header or portion of the data packet reserved for command and control and not subject to scrambling. The data packet is then forwarded to the next communication node. When the packet arrives at the next communication node, the server reads the value of the count, adds the count to the initial random number, identifies the scrambling algorithm used to last scramble the data packet and unscrambles the packet accordingly. The count is then incremented by one or any predetermined integer, and the count is again stored in the data packet's header or any portion of the data packet reserved for command and control and not subject to scrambling, overwriting the prior count. The random number serving as a shared secret is not communicated in the communication data packet. When the data packet arrives at the next communication node, the server then adds the random number shared secret added to the revised counter value extracted from the data packet. This new number uniquely identifies the scrambling algorithm employed by the last communication node to scramble the incoming packet. In this method, only a meaningless count number can be intercepted from the unscrambled portion of a data packet by a cyber-pirate, who has no idea what the data means.

In another alternative method, a hidden number may be employed to communicate the state of the packet and what algorithm was employed to scramble it. A hidden number combines a time-varying state or a seed, with a shared secret generally comprising a numeric algorithm, together used to produce a confidential number, i.e. a "hidden number" that is never communicated between communication nodes and is therefore not sniffable or discoverable to any man-in-the middle attack or cyber-pirate. The hidden number is then used to select the scrambling algorithm employed. Since the state or seed is meaningless without knowing the algorithm used to calculate the hidden number and because the shared-secret algorithm can be stored behind a firewall inaccessible over the network or Internet, then no amount of monitoring of network traffic will reveal a pattern. To further complicate matters, the location of the seed can also represent a shared secret. In one embodiment, a number carried by an unscrambled portion of a data packet and observable to data sniffing, e.g. 27482567822552213, comprises a long number where only a portion of the number represents the seed. If for example, the third through eighth digits represent the seed, then the real seed is not the entire number but only the bolded numbers 27482567822552213, i.e. the seed is 48256. This seed is then combined with a shared secret algorithm to generate a hidden number, and the hidden number is used to select the scrambling algorithm, varying dynamically throughout a network.

The application of scrambling of data packets in a SDNP network is described in U.S. application Ser. No. 14/803,869, filed Jul. 20, 2015, entitled "Secure Dynamic Communication Network and Protocol". The application of data packet scrambling in Last Mile communication will be described in further detail in this disclosure.

As described, the data traversing the network, albeit scrambled, can be referred to as "plaintext" because the actual data is present in the data packets, i.e. the packets have not been encrypted into ciphertext. By contrast, in ciphertext the character string comprising the original data, whether scrambled or not, is translated into a meaningless series of nonsense characters using an encryption key, and cannot be restored to its original plaintext form without a decryption key. The role of encryption in the disclosed SDNP based communication is discussed further in the following section on "Encryption."

Figure 3:
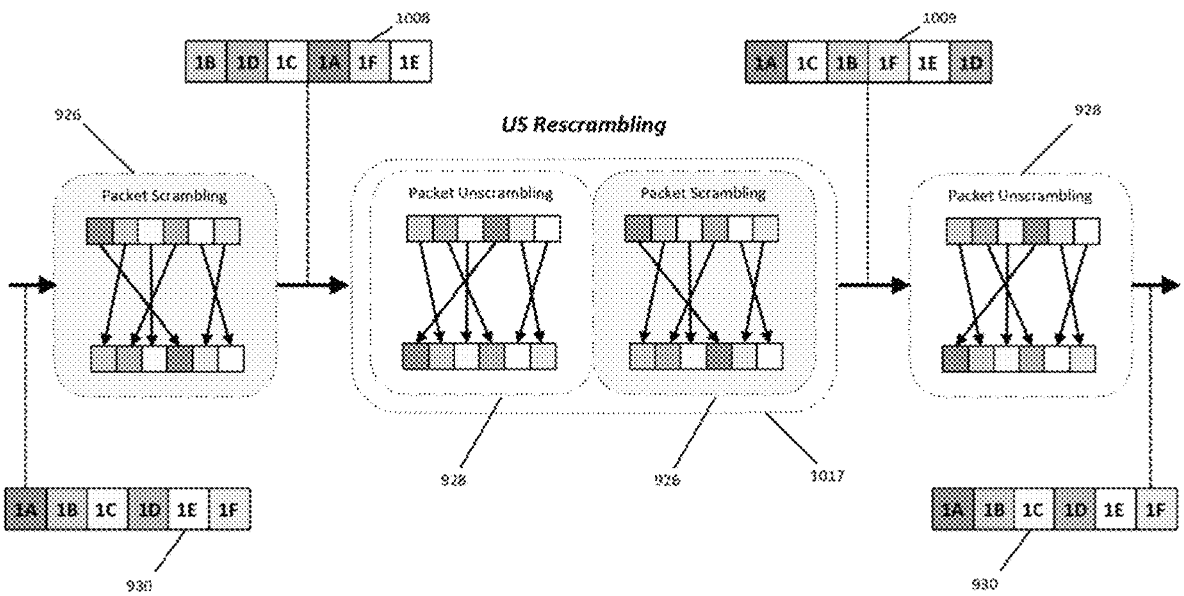
FIG. 3 is a schematic diagram showing the packet re-scrambling process.

In order to change the sequence of data packets during transport through the network, packet "re-scrambling" is required, as shown in FIG. 3. The process of packet re-scrambling returns a scrambled data packet to its unscrambled state before scrambling it again with a new scrambling algorithm. Thus, the term "re-scrambling" as used herein, means unscrambling a data packet and then scrambling it again, typically with a different scrambling algorithm or method. This approach avoids the risk of data corruption that could occur by scrambling a previously scrambled package and losing track of the sequence needed to restore the original data. As shown, once initially scrambled by packet scrambling operation 926, scrambled data packet 1008 is "re-scrambled," first by unscrambling it with unscrambling operation 928, using the inverse operation of the scrambling algorithm used to scramble the data, and then by scrambling the data packet anew with scrambling operation 926, using a different scrambling algorithm than used in the prior scrambling operation 926. The resulting re-scrambled data packet 1009 differs from the prior scrambled data packet 1008. Re-scrambling operation 1017 comprises the successive application of unscrambling followed by scrambling, referred to herein as "US re-scrambling," where "US" is an acronym for "unscrambling-scrambling." To recover the original data packet 930, the final packet unscrambling operation 928 requires using the inverse function of the same algorithm used to last re-scramble the data packet.

In accordance with the disclosed invention, the static and dynamic scrambling of data renders interpretation of the unscrambled data meaningless, reordering sound into unrecognizable noise, reordering text into gibberish, reordering video into video snow, and scrambling code beyond repair. By itself, scrambling provides a great degree of security. In the SDNP method disclosed herein, however, scrambling is only one element utilized to provide and insure secure communication free from hacking, cyber-assaults, cyber-piracy, and man-in-the-middle attacks.

Packet Encryption—

In accordance with the disclosed invention, secure communication over a packet-switched network relies on several elements to prevent hacking and ensure security, one of which involves SDNP encryption. As described previously, encryption from the Greek meaning "to hide, to conceal, to obscure" represents a means to convert normal information or data, commonly called "plaintext", into "ciphertext" comprising an incomprehensible format rendering the data unreadable without secret knowledge. In modern communication, this secret knowledge generally involves sharing one or more "keys" used for encrypting and decrypting the data. The keys generally comprise pseudo-random numbers generated algorithmically. Numerous articles and texts are available today discussing the merits and weaknesses of various encryption techniques such as "Cryptonomicon" by Neal Stephenson© 1999, "The Code Book: The Science of Secrecy from Ancient Egypt to Quantum Cryptography" by Simon Singh© 1999, "Practical Cryptography" by Niels Ferguson© 2013, and "Cryptanalysis: A Study of Ciphers and Their Solution" first published in 1939.

While the concept of encryption or ciphers is ancient and well known to those skilled in the art, the application of cryptography in the disclosed secure dynamic communication network and protocol is unique, facilitating both end-to-end encryption and single-hop node-to-node dynamic encryption to the network architecture itself, independent of any client's own encryption. SDNP communication is architected with the basic precept that given sufficient time, any static encrypted file or message can eventually be broken and its information stolen, no matter how sophisticated the cipher. While this supposition may in fact be incorrect, there is no need to prove or disprove the proposition because the converse, i.e. waiting till a specific encryption method fails, may result in unacceptable and irreversible consequential damage.

Instead, SDNP communication is based on the premise that all encrypted files have a limited "shelf life", metaphorically meaning that encrypted data is good (secure) for only a finite period of time and that the confidential data must be re-encrypted dynamically at regular intervals, ideally far more frequently than the best estimates of the time required to crack its encryption with state-of-the-art computers. For example, if it is estimated by cryptologists that a large server farm of crypto-engines can break a given cipher in one year, then in SDNP communication a data packet will be re-encrypted every second or even every 100 ms, intervals many orders of magnitude shorter than the best technology's capability to crack it. As such, SDNP encryption is necessarily dynamic, i.e. time variant, and may also be spatially variant, i.e. depending on a communication node's location in a packet-switched network or geography. Thus, as used herein, the terms "re-encrypting" or "re-encryption" refer to decrypting a data packet and then encrypting it again, typically with a different encryption algorithm or method.

SDNP encryption therefore involves converting data from unencrypted plaintext into ciphertext repeatedly and frequently, rendering the information incomprehensible and useless. Even if a given packet's data encryption is miraculously broken, by employing SDNP's dynamic encryption methods, the next data packet utilizes a completely different encryption key or cipher and requires a completely new effort to crack its encryption. By limiting the total content of each uniquely encrypted data packet, the potential damage of unauthorized access is mitigated because an exposed data packet contains, by itself, a data file too small to be meaningful or useful by a cyber-pirate. Moreover, by combining dynamic encryption with the aforementioned SDNP scrambling methods, communication security is enhanced tremendously. Even in its unencrypted form, the intercepted data file contains only a small snippet of data, voice, or video scrambled into a meaningless and incomprehensible sequence of data segments.

Figure 4A:
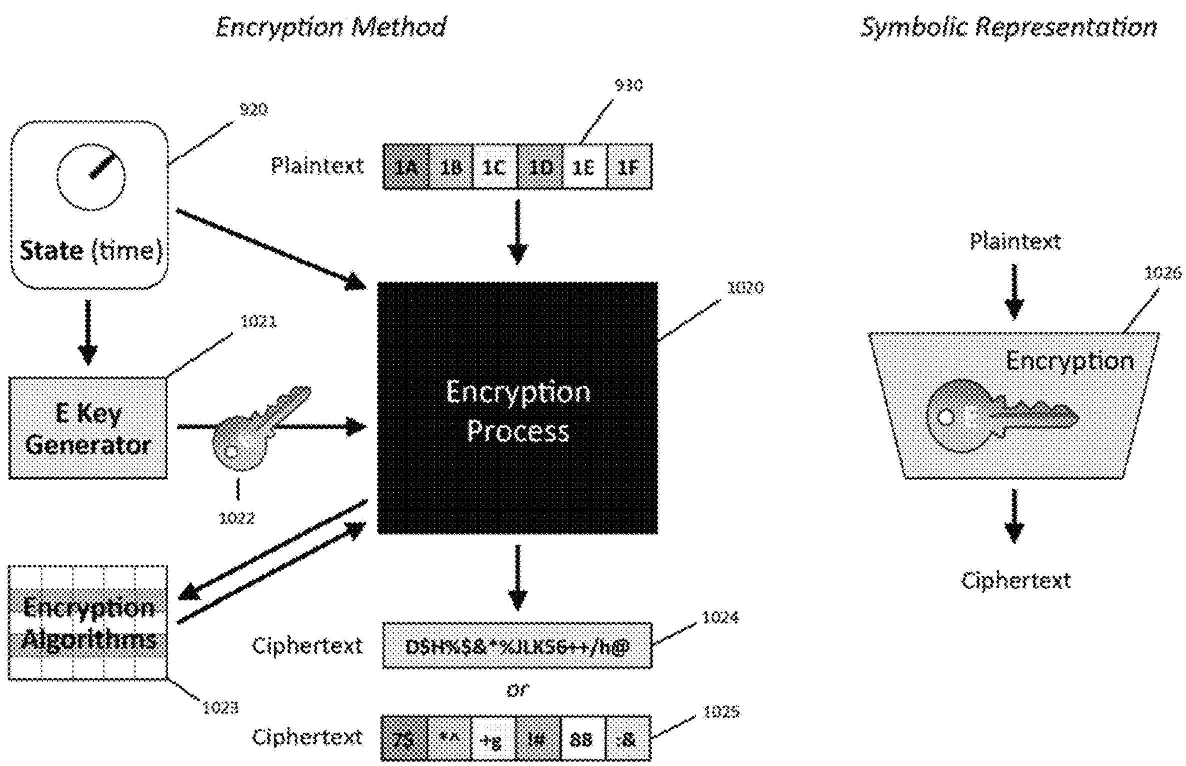
FIG. 4A is a schematic diagram showing the process of packet encryption.

To avoid the shelf life security concerns, SDNP encryption is dynamic and state-dependent. As shown in FIG. 4A, an unencrypted data packet comprising plaintext 930, processed through encryption operation 1020, results in an encrypted data packet comprising ciphertext 1024 or 1025. In the case of ciphertext 1024, the entire data packet of plaintext 930 is encrypted in toto, treating data segments 1A through 1F as a single data file. In the case of ciphertext 1025, each data segment 1A through 1F of plaintext 930 is encrypted separately and distinctly, and is not merged with other data segments. First data segment 1A is encrypted into a corresponding first ciphertext data segment shown for illustration purposes by a string of characters starting with 7$ and comprising a long string of characters or digits not shown. Similarly, second plaintext data segment 1B is encrypted into second ciphertext data segment comprising a long string of characters shown for illustrative purposes starting with *^. The characters 7$ and *^ are meant to illustrate the beginning of meaningless strings of symbols, digits, and alphanumeric characters and not to limit or imply anything about the specific data in the plaintext source or the length of the character strings being encrypted.

Encryption operation 1020 can use any algorithm, cryptographic, or cipher method available. While the algorithm may represent a static equation, in a one embodiment the encryption operation uses dynamic variables or "states" such as time 920 when encryption occurs, and an encryption generator 1021 to produce "E-key" 1022, which also may be dependent on a state such as time 920 at which the encryption was performed. For example, the date and time of encryption may be used as a numeric seed for generating an encryption key that cannot be recreated even if the encryption algorithm were discovered. Time 920 or other "states"

may also be used to select a specific algorithm from an encryption algorithms list 1023, which is a list of available encryption algorithms. In data flow diagrams, it is convenient to illustrate this packet encryption operation and sequence using a schematic or symbolic representation, as depicted herein by the symbol shown for encryption operation 1026. Throughout this invention disclosure, a padlock may also symbolically represent secure and encrypted data. Padlocks with a clock face located atop the padlock specifically indicate a secure delivery mechanism, e.g., encrypted files that, if not received within a specific interval or by a specific time, self-destruct and are lost forever.

Figure 4B:
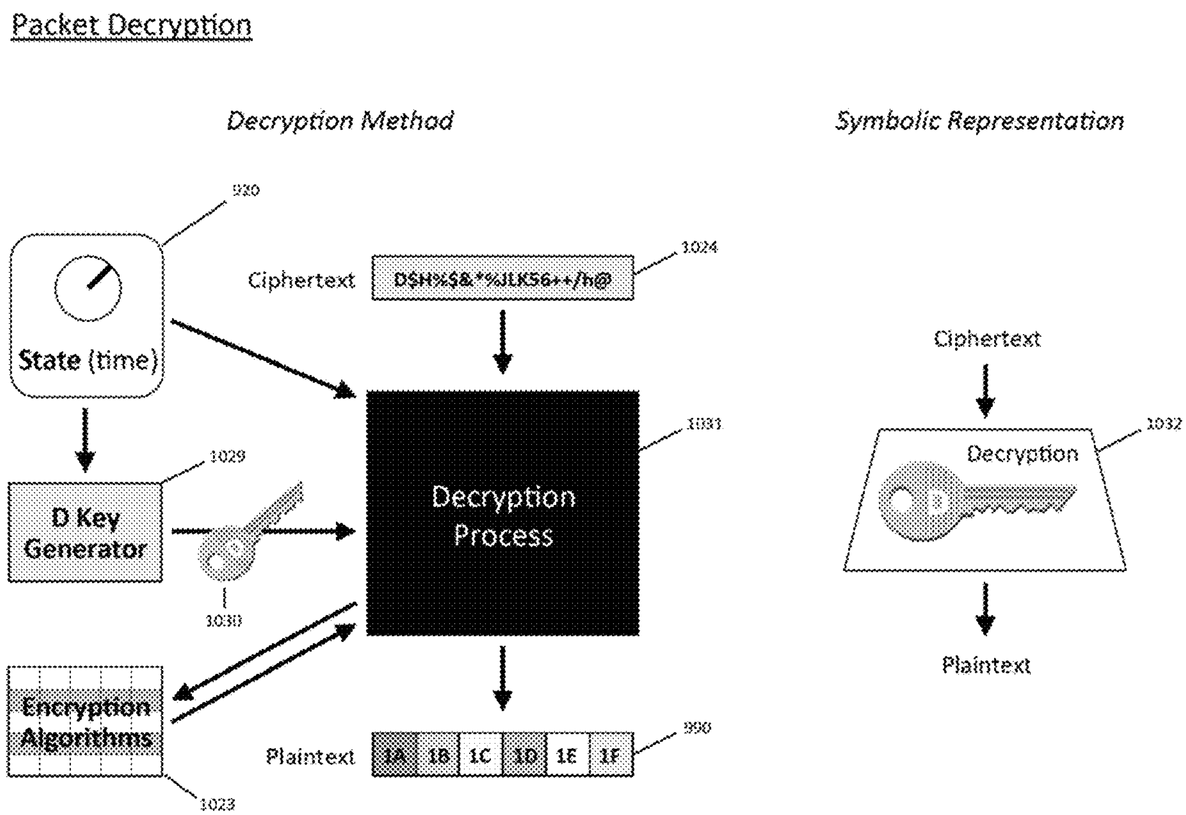
FIG. 4B is a schematic diagram showing the process of packet decryption.

The decryption operation shown in FIG. 4B illustrates the inverse function of encryption operation 1020, specifically decryption operation 1031, where the state or time 920 and other states used to create ciphertext 1024, along with a decryption key or "D-key" 1030 generated by D-key generator 1029 are re-used for undoing the encryption, i.e. decrypting the file, to produce unencrypted data comprising original plaintext data packet 990. Using the same state or time 920 employed when the packet encryption first occurred, the same encryption operation that was selected from encryption algorithm list 1023 may be used again in the decryption operation 1031. Although encryption algorithm list 1023 references the term "encryption", the same algorithm table is used to identify and select the inverse function needed for performing "decryption", i.e. encryption algorithm list 1023 contains the information needed both for encrypting and decrypting data packets. Because the two functions involve the same steps performed in reverse order, table 1023 could also be renamed as "encryption/decryption" algorithms table 1023. For clarity's sake however, the table is labeled only by the function and not by its anti-function.

Should the encryption algorithm selected for implementing decryption operation 1031 not match the inverse of the original algorithm employed in packet encryption operation 1020, should state or time 920 not match the time encryption occurred, or should D-key 1030 not have a predefined numeric relationship to E-key 1022 used during encryption, then the decryption operation 1031 will fail to recover the original unencrypted data 990 and the packet data will be lost. In data flow diagrams, it is convenient to illustrate this packet decryption operation and sequence using a schematic or symbolic representation, as depicted herein by the symbol shown for decryption operation 1032.

As described previously in this disclosure, knowledge regarding the use of encryption and decryption keys in cryptography and of common encryption algorithms, such as symmetric public key encryption, RSA encryption, and AES256 encryption among others, are commonplace and well known to those skilled in the art. The application of such well known cryptographic methods in the disclosed SDNP communication system is, however, not readily susceptible to hacking or decryption because of hidden information, shared secrets, and time-dependent dynamic variables and states unique to the disclosed SDNP communication.

So even in the unlikely case where a cyber-pirate has sufficient computer power to eventually crack a robust encryption method, they lack certain information embedded into the SDNP network as non-public or shared secrets required to perform the decryption operation, and must also crack the encryption in a fraction of a second before the encryption changes. Moreover every data packet traversing the disclosed SDNP network utilizes a different encryption method with unique keys and dynamic states. The combination of missing information, dynamic states, and limited informational content contained within any given packet, renders obtaining meaningful data theft from any given data packet both challenging and unrewarding to a cyber-pirate.

The application of dynamic encryption and decryption of data packets in a SDNP network is described in the above-referenced U.S. application Ser. No. 14/803,869, entitled "Secure Dynamic Communication Network and Protocol". The application of data packet cryptography in Last Mile communication will be described in further detail in this disclosure.

Figure 5:
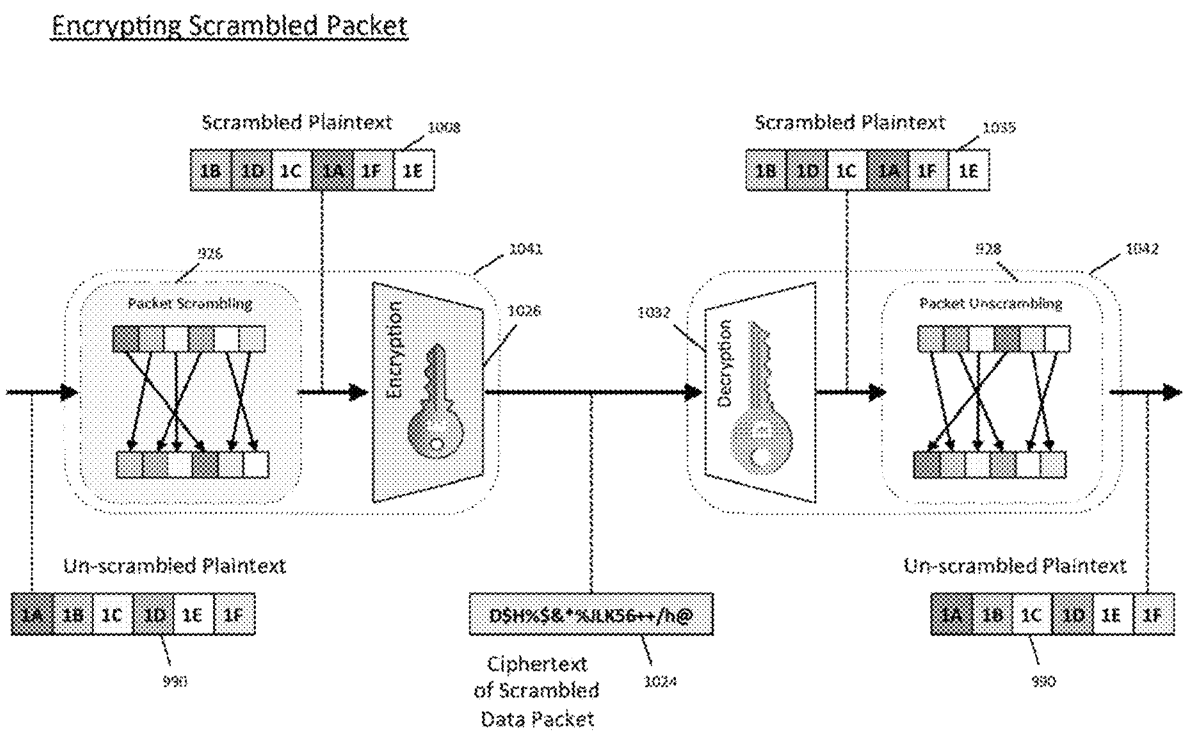
FIG. 5 is a schematic diagram showing the process of encrypted scrambling and its inverse function.

In order to intercept an entire document, video stream, or voice conversation to reconstruct a coherent data sequence, a cyber-assault must successively crack and decrypt not one but thousands of successive SDNP packets. The daunting challenge of continuously hacking a succession of SDNP packets is further exacerbated by combining dynamic encryption with the previously described methods regarding data packet scrambling. As illustrated in FIG. 5, the creation of an encrypted, scrambled data packet 1024 involves the successive combination of scrambling operation 926 and encryption operation 1026 to convert un-scrambled plaintext data packet 990 first into scrambled plaintext data packet 1008 and then into ciphertext 1024 of the scrambled data packet. To undo the encrypted scrambled package, the inverse functions must be applied in reverse sequence first by decryption operation 1032 to recover scrambled plaintext data packet 1035, then by unscrambling operation 928 to recover unscrambled plaintext data packet 990.

As shown, scrambling and encryption represent complementary techniques in achieving secure communication. Unencrypted scrambled data traversing the network, is referred to as "plaintext" because the actual data is present in the data packets, i.e. the packets have not been encrypted into ciphertext. Encrypted data packets, or ciphertext, comprise scrambled or unscrambled character strings translated into a meaningless series of nonsense characters using an encryption key, and cannot be restored to its original plaintext form without a corresponding decryption key. Depending on the algorithm employed, the encryption and decryption keys may comprise the same key or distinct keys mathematically related by a predefined mathematical relationship. As such, scrambling and encryption represent complementary techniques in achieving secure communication in accordance with the disclosed invention for SDNP communication.

The two methods, scrambling and encryption, can be considered independently even when used in combination, except that the sequence used to restore the original data packet from an encrypted scrambled data packet must occur in the inverse sequence to that used to create it. For example, if the data packet 990 was first scrambled using scrambling operation 926 and then encrypted using encryption operation 1026, then to restore the original data packet, the encrypted scrambled data packet 1024 must first be decrypted using decryption operation 1032 and then unscrambled using unscrambling operation 928. Mathematically, if a scrambling operation F scrambles a string of bits or characters into an equivalent scrambled version and an unscrambling operation $F^{-1}$ undoes the scrambling, whereby $$F^{-1}[F(A)]=A$$

and similarly if an encryption operation G encrypts a string of plaintext into equivalent ciphertext and a decryption operation $G^{-1}$ undoes the encryption whereby $$G^{-1}[G(A)]=A$$

then in combination, the successive operation of scrambling and then encrypting followed by decrypting and then unscrambling returns the original argument A, the unscrambled plaintext data packet. Accordingly, $$F^{-1}\{G^{-1}[G(F(A))]\}=A$$

because the sequence occurs in inverse order, specifically decrypting $[G^{-1}]$ encrypted scrambled packet [G(F(A))] restores scrambled plaintext data packet F(A). Subsequent unscrambling operation $F^{-1}$ of scrambled plaintext packet F(A) restore the original data packet A.

Provided linear methods are employed, the sequence is reversible. For example, if the data packet is first encrypted and then scrambled, then to restore the original data packet the scrambled ciphertext must first be unscrambled and then decrypted. Accordingly, $$G^{-1}\{F^{-1}[F(G(A))]\}=A$$

Changing the sequence does not work. Decrypting a data packet that was previously encrypted and then scrambled without first unscrambling it will not recover the original data packet, i.e.

$$F^{-1}\{G^{-1}[F(G(A))]\}\neq A$$

Similarly unscrambling a packet that was scrambled and then encrypted will also fail to restore the original data packet, because $$G^{-1}\{F^{-1}[G(F(A))]\}\neq A$$

To summarize, if the plaintext packet is scrambled before it is encrypted, it must be decrypted before it is unscrambled; if the plaintext packet is encrypted before it is scrambled, it must be unscrambled before it is decrypted.

While it is understood that scrambling and encrypting may be performed in either sequence, in one embodiment of the SDNP methods in accordance with this invention, encryption and decryption occur more frequently during network transport than scrambling and therefore encryption should occur after scrambling and decryption should occur before unscrambling, as illustrated in FIG. 5, rather than the converse. For convenience, we define the combination of packet scrambling operation 926 followed by encryption operation 1026 as encrypting scrambled packet operation 1041, and its converse, the combination of decryption operation 1032 followed by packet unscrambling operation 928 as unscrambling decrypted packet operation 1042. These hybridized operations may be employed in static and dynamic SDNP communication in accordance with this invention.

One means to enhance to enhance security in any implementation using static scrambling encryption is to insure that each data packet sent is subjected to different scrambling and/or encryption methods, including changes in state, seeds, and/or keys at time $t_1$ when each data packet enters the communication network.

However, a more robust alternative involves dynamically changing a data packet's encryption or scrambling, or both, as the packet traverses the network in time. In order to facilitate the required data processing to realize a fully dynamic version of SDNP communication, it is necessary to combine the previously defined processes in order to "re-scramble" (i.e., unscramble and then scramble) and "re-encrypt" (i.e., unencrypt and then encrypt) each packet as it passes through each communication node in a packet-switched communication network. As used herein the term "re-packet" or "re-packeting" will sometimes be used to refer to the combination of "re-scrambling" and "re-encryption," whether the packet is initially decrypted before it is unscrambled or unscrambled before it is decrypted. In either case, the unscrambling and decryption operations at a given node should be performed in an order that is the reverse of the scrambling and encryption operations as the packet left the prior node, i.e., if the packet was scrambled and then encrypted at the prior node, it should first be decrypted and then unscrambled at the current node. Typically, the packet will then be scrambled and then encrypted as it leaves the current node.

Figure 6:
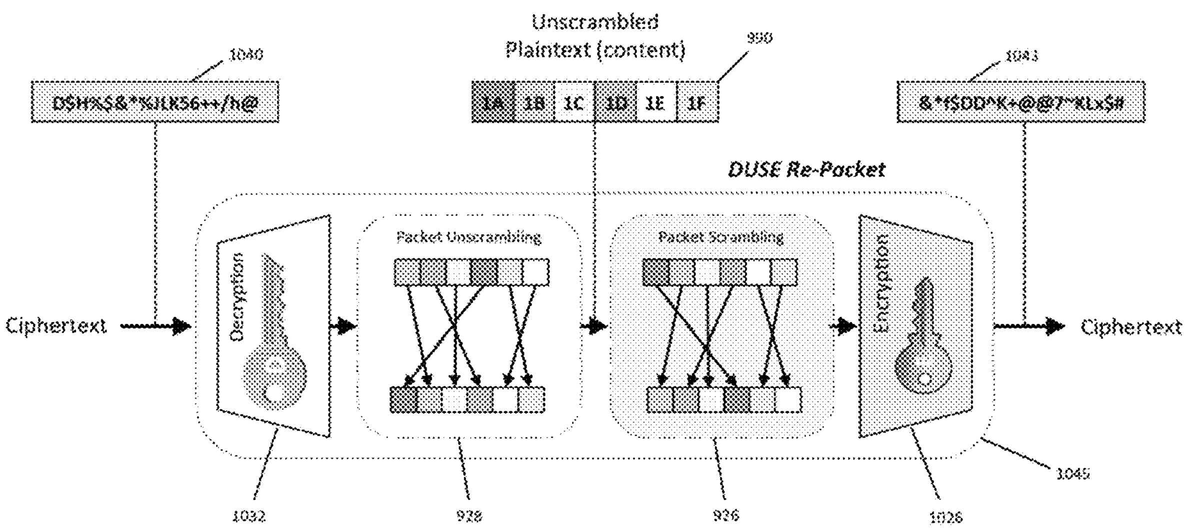
FIG. 6 is a schematic diagram showing the process of DUSE re-packeting comprising re-scrambling and re-encryption.

The "re-packet" operation at a communication node is illustrated in FIG. 6, where an incoming ciphertext data packet 1040 is first decrypted by decryption operation 1032, then unscrambled by unscrambling operation 928 to recover the unscrambled plaintext data packet 990 containing the content of the original packet. If any information within the packet must be inspected, parsed, split, or redirected, the unscrambled plaintext file is the best format in which to perform such operations. The plaintext data packet 990 is then again scrambled using scrambling operation 926 followed by a new encryption performed by encryption operation 1026 to produce a new scrambled ciphertext data packet 1043. Since the re-packet operation of incoming scrambled ciphertext data packet 1040 occurs successively by decryption, unscrambling, scrambling and encryption, the acronym DUSE re-packet operation 1045 is used herein to denote the disclosed technique in accordance with this invention. In a dynamic secure network, the state or time, the decryption key, and any seeds used for performing decryption operation 1032 and unscrambling operation 928 are preferably different than the state or time, seeds or encryption keys used for executing scrambling operation 926 and encryption operation 1026.

The application of re-packeting of data packets in a SDNP network is described in the above-referenced U.S. application Ser. No. 14/803,869, entitled "Secure Dynamic Communication Network and Protocol". The application of data packet re-packeting in Last Mile communication will be described in further detail in this disclosure.

Packet Mixing and Splitting—

Figure 7A:
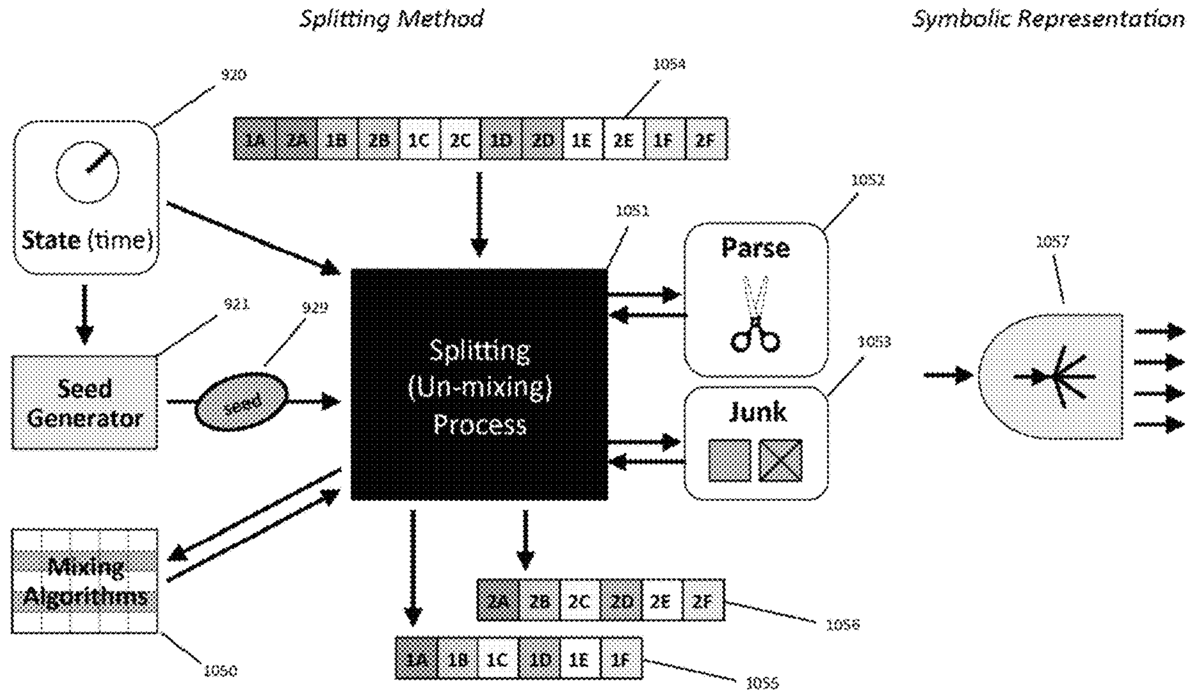
FIG. 7A is a schematic diagram showing the process of fixed-length packet splitting.

Another key element of the secure dynamic communication network and protocol disclosed herein is its ability to split data packets into sub-packets, to direct those sub-packets into multiple routes, and to mix and recombine the sub-packets to reconstruct a complete data packet. The process of packet splitting is illustrated in FIG. 7A, where data packet 1054 is split, using splitting operation 1051 combined with algorithmic parse operation 1052 and with junk operation 1053, which has the ability to insert or remove non-data "junk" data segments. Analogous to junk DNA present in the human genome, junk data segments are inserted by junk operation 1053, to extend or control the length of a data packet, or as needed to remove them. Junk operation 1053 is especially important when there is an inadequate amount of data to fill a packet. The presence of junk data segments inserted into a data packet also makes it difficult for cyber-pirates to distinguish real data from noise. As used herein, a "junk" packet or data segment is a packet or data segment that consists entirely of meaningless data (bits). These junk bits can be introduced into a stream of data packets obfuscating real data in a sea of meaningless bits.

The purpose of parse operation 1052 is to break data packet 1054 into smaller data packets, e.g. data sub-packets 1055 and 1056, for processing of each of the constituent components. Breaking data packet 1054 into smaller pieces offers unique advantages such as supporting multipath transport, i.e. transmitting the data packets over multiple and different paths, and facilitating unique encryption of constituent sub-packets using different encryption methods.

The splitting operation can use any algorithm, numerical method, or parsing method. The algorithm may represent a static equation or include dynamic variables or numerical seeds or "states" such as time 920 when the incoming data packet 1054 was first formed by a number of sub-packets, and a numerical seed 929 generated by seed generator 921, which also may be dependent on a state such as time 920 at the time of the data packet's creation. For example, if each date is converted into a unique number ascending monotonically, then every seed 929 is unique. Time 920 and seed 929 may be used to identify a specific algorithm chosen from a list of available methods, i.e. from algorithm 1050. Packet splitting, or un-mixing, comprises the inverse procedure of mixing, using the same algorithm executed in the precise reverse sequence used previously to create the specific packet. Ultimately everything that is done is undone but not necessarily all in one step. For example, a scrambled encrypted data packet might be decrypted but remain scrambled. Processed by splitting operation 1051, un-split incoming data packet 1054 is converted into multiple data packets, e.g. split fixed-length packets 1055 and 1056 using parse operation 1052 to algorithmically perform the operation. In data flow diagrams, it is convenient to illustrate this packet splitting operation 1051 including parsing 1052 and junk operation 1053 using a schematic or symbolic representation, as depicted herein by the symbol shown for splitting operation 1057.

Thus, as used herein, the term "splitting" may include parsing, which refers to the separation of a packet into two or more packets or sub-packets, and it may also include the insertion of junk packets or sub-packets into the resulting "parsed" packets or sub-packets or the deletion of junk packets or sub-packets from the resulting "parsed" packets or sub-packets.

Figure 7B:
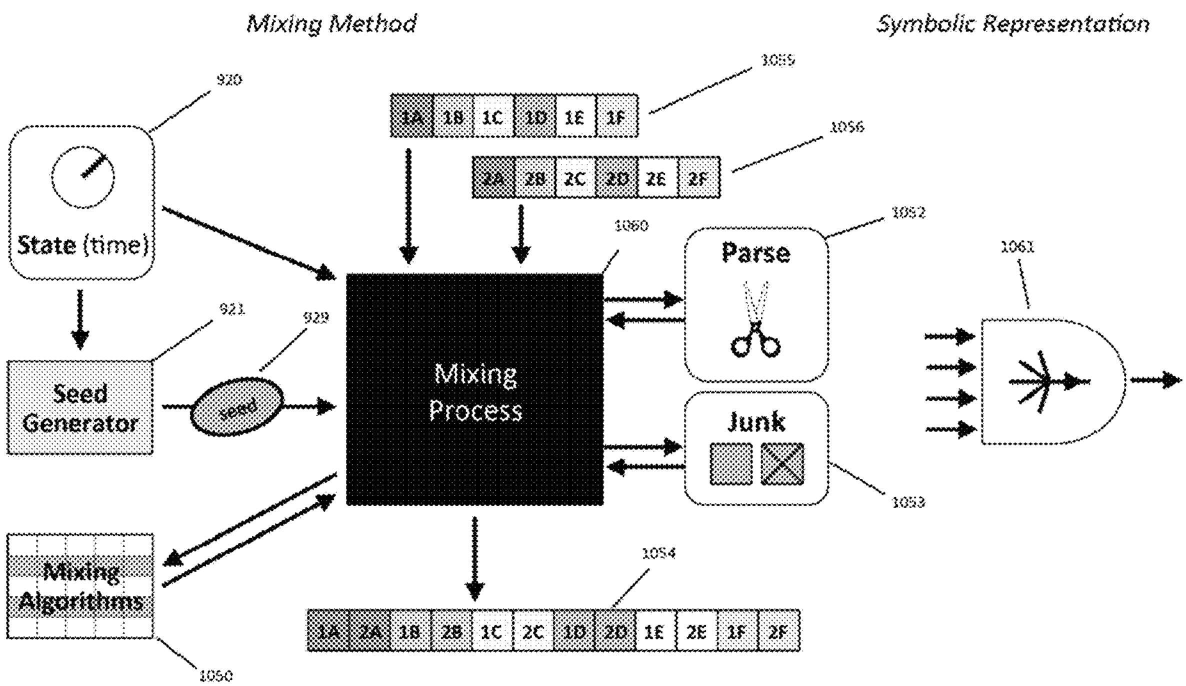
FIG. 7B is a schematic diagram showing the process of fixed-length packet mixing.

The inverse function, packet-mixing operation 1060 shown in FIG. 7B, combines multiple packets 1055 and 1056 together to form mixed packet 1054. Like packet splitting, the packet mixing operation can use any algorithm, numerical method, or mixing method. The algorithm may represent a static equation or include dynamic variables or numerical seeds or "states" such as time 920 used to specify the conditions when incoming data packets 1055 and 1056 are mixed. The mixing operation used to create the data packet may utilize numerical seed 929 generated by seed generator 921, which also may be dependent on a state such as time 920. Time 920 and seed 929 may be used to identify a specific mixing algorithm chosen from a list of available mixing methods, i.e. from mixing algorithms 1050. In data flow diagrams, it is convenient to illustrate this packet mixing operation using a schematic or symbolic representation, as depicted herein by the symbol shown for mixing operation 1061.

Figure 8:
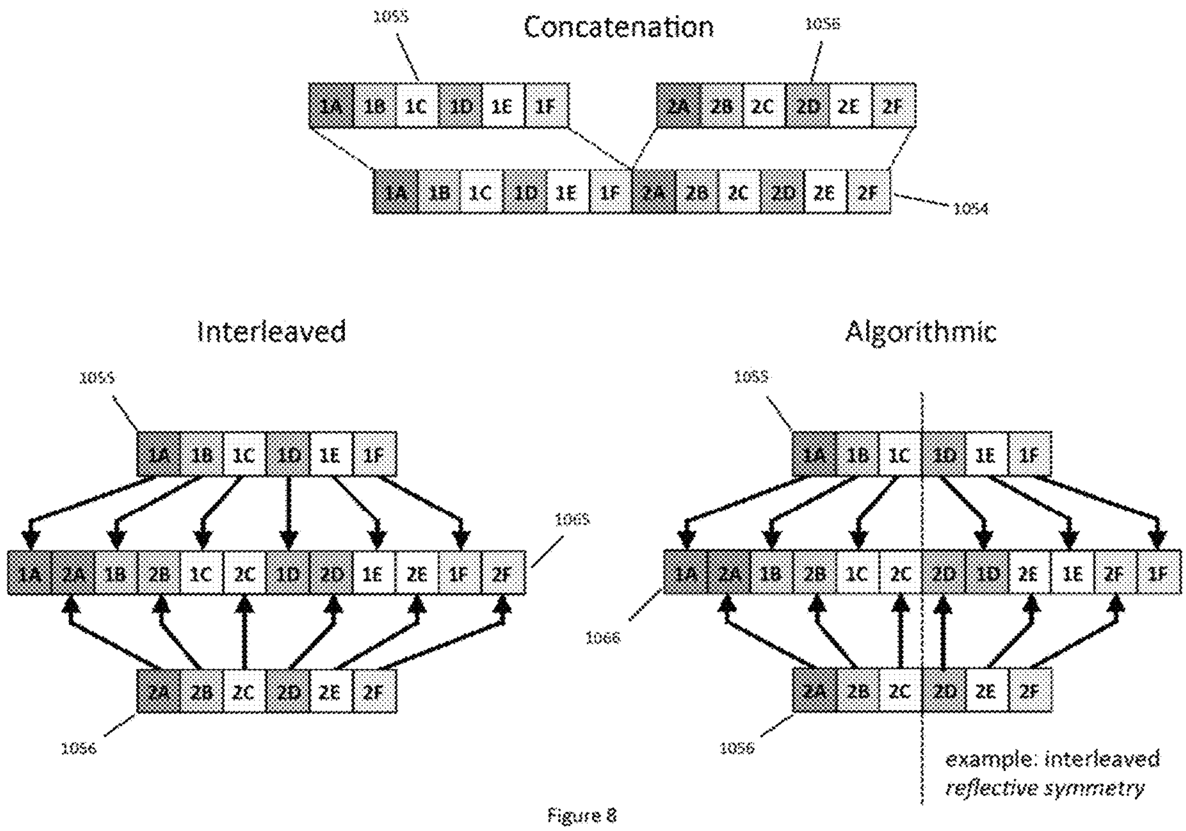
FIG. 8 is a schematic diagram showing various packet-mixing methods.

In accordance with this invention, packet mixing and splitting may utilize any of a large number of possible algorithms. FIG. 8 illustrates three of many possible mixing techniques comprising concatenation, interleaving, or algorithmic methods. In concatenation, the data segment sequence of data packet 1056 is appended onto the end of data packet 1055 to create mixed packet 1054. In interleaving, the data segments of data packets 1055 and 1056 are intermixed in alternating fashion, i.e. as 1A, 2A, 1B, 2B, etc. to form mixed data packet 1065. Other methods used for packet mixing involve an algorithm. In the example shown, an algorithm comprising interleaved reflective symmetry alternates the data segments in the order of 1A, 2A, 1B, 2B, 1C, 2C in the first half of the mixed packet 1066, and in the opposite order for the second half, i.e. 2D, 1D, 2E, 1E, 2F, 1F.

Figure 9A:
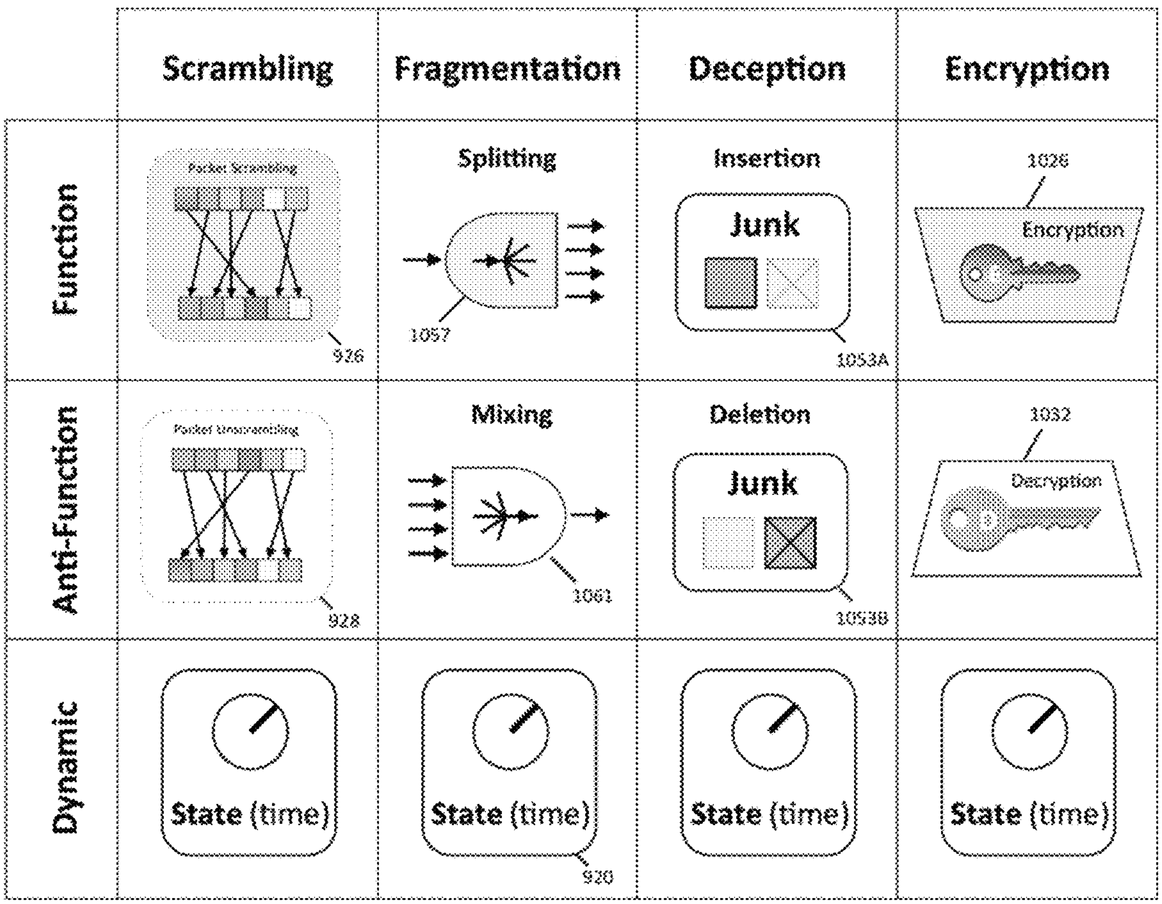
FIG. 9A is a table summarizing SDNP security functions and anti-functions.

The application of data packet mixing and splitting in a SDNP network is described in the above-referenced U.S. application Ser. No. 14/803,869, entitled "Secure Dynamic Communication Network and Protocol". FIG. 9A summarizes SDNP functional elements including functions and their corresponding inverse operation, i.e. anti-functions, as well as dynamic components of the corresponding functions, i.e. the state or time of each function when executed on a data packet. SDNP function including scrambling operations comprising packet scrambling 926 and its anti-function packet unscrambling 928; fragmentation operations comprising splitting 1057 and its anti-function mixing 1061, deception operations comprising junk insertion 1053A and junk deletion 1053B, along with encryption operations comprising encryption 1026 and decryption 1032. All these functions occur uniquely in accordance with time or state variables 920.

The application of data packet mixing and splitting, along with scrambling, unscrambling, encryption, decryption, and deception in Last Mile communication collectively comprise the SDNP Last Mile security operation. This SDNP Last Mile security operation is "directional" meaning the operation performed for and on all outgoing data packets is different than the operations performed on incoming data packets.

The SDNP Last Mile security operation is also symmetric and reversible over the Last Mile, meaning that using local security credentials such as keys, seeds, shared secrets specific to the particular Last Mile, the operations performed on an outbound data packet in a client's device are undone in the SDNP gateway, generally by performing the anti-function, i.e. the mathematical inverse, or every functional operation originally executed by the client's device but in reverse sequence. As such, the SDNP gateway is enabled to recover the original content in preparation for routing through the SDNP cloud. Similarly, for incoming data packets into a client's device using zone-specific security credentials for the Last Mile, the SDNP Last Mile security operation executed in the client device undoes each security operation performed by the SDNP gateway by executing the anti-function in reverse sequence. In this manner, the client device can recover the original data on all incoming data packets.

The SDNP Last Mile security operation is dynamic and localized, i.e. zone specific, using state dependent conditions, e.g. location, time, etc. to determine which parameters were used at the time the data packet was prepared and for what region, geography, or locale specific for a particular Last Mile. By being localized, data packet preparation performed in different regions and over different Last Mile connections never have the same coding or use identical security credentials. Furthermore, these Last Mile security credentials always differ from those used in the SDNP cloud. Moreover, being dynamic, the state used for creating the data packets changes constantly, further obfuscating the actual security process performed on each data packet and rendering no two data packets alike.

By the unique combinational application of directional symmetric reversible dynamic localized security operations specific to each Last Mile communication, the algorithmic application of dynamic scrambling, dynamic fragmentation, dynamic deception, and dynamic encryption made in accordance with this invention insures HyperSecure communication not achievable from the use of simple static encryption methods. The pervasive application of dynamic methods valid for durations of only tens of milliseconds not only makes interpretation nearly impossible, but gives a hacker no time in which to decipher or interpret the data packet before another arrives. In practice, SDNP Last Mile security operations may be executed using software, firmware, hardware, dedicated security ICs, or any combination thereof.

Although a myriad of combinational sequences are possible, one example of SDNP Last Mile security operation is illustrated in FIG. 9B specifically for serial SDNP payloads used in single-route Last Mile communication, i.e. where a client's device communicates to a single SDNP gateway. The process involves two directional operational sequences, one for outgoing data packets, the other for incoming data packets. In the case of outgoing data packets, shown in the upper half of the illustration, "data to be sent" is first scrambled using packet-scrambling operation 926, then deception is performed by the insertion of junk data 1053A. In some cases an entire packet may comprise entirely junk data, further confusing data mining attempts by hackers.

These packets are then split into multiple pieces by splitting operation 1057 using parsing operation 1052 and sent separately to encryption operation 1026. Each piece is then encrypted using common or distinct encryption keys and the resulting ciphertext is arranged into a serial SDNP payload shown as data packet 1199A. The packet is then formatted into IP data packets, i.e. "IP packet preparation", in preparation for communication onto the Last Link and Last Mile. All operations performed are dynamic, occurring at a particular time or with a specific state 920A during the security process execution.

In the case of incoming data packets shown in the lower half of the illustration, incoming data from the Last Link comprising a serial SDNP payload 1199B, i.e. from "IP packet recognition" is first decrypted in pieces or as a whole by decryption operation 1032 followed by mixing operation 1061 to recover the true data stream. The data packets are then de-junked, i.e. the junk data is removed from the data packets using de-junk operation 1053B, followed by packet unscrambling operation 928 to recover the "data received". All operations performed on incoming data packets must use the state 920B used when the SDNP gateway created the data packet, i.e. containing information of a particular time or with a specific state 920B at the packet's birth. This state information may be sent through a different communication by a signaling server or may be carried in the incoming data packet as plaintext or alternatively as static ciphertext, i.e. with a decryption key already known by the SDNP Last Mile security operation. Details of state 920B, cannot however, be encrypted using a key requiring the state information contained within state 920B, or otherwise the code will be unable to open and use its own security credentials.

Figure 9C:
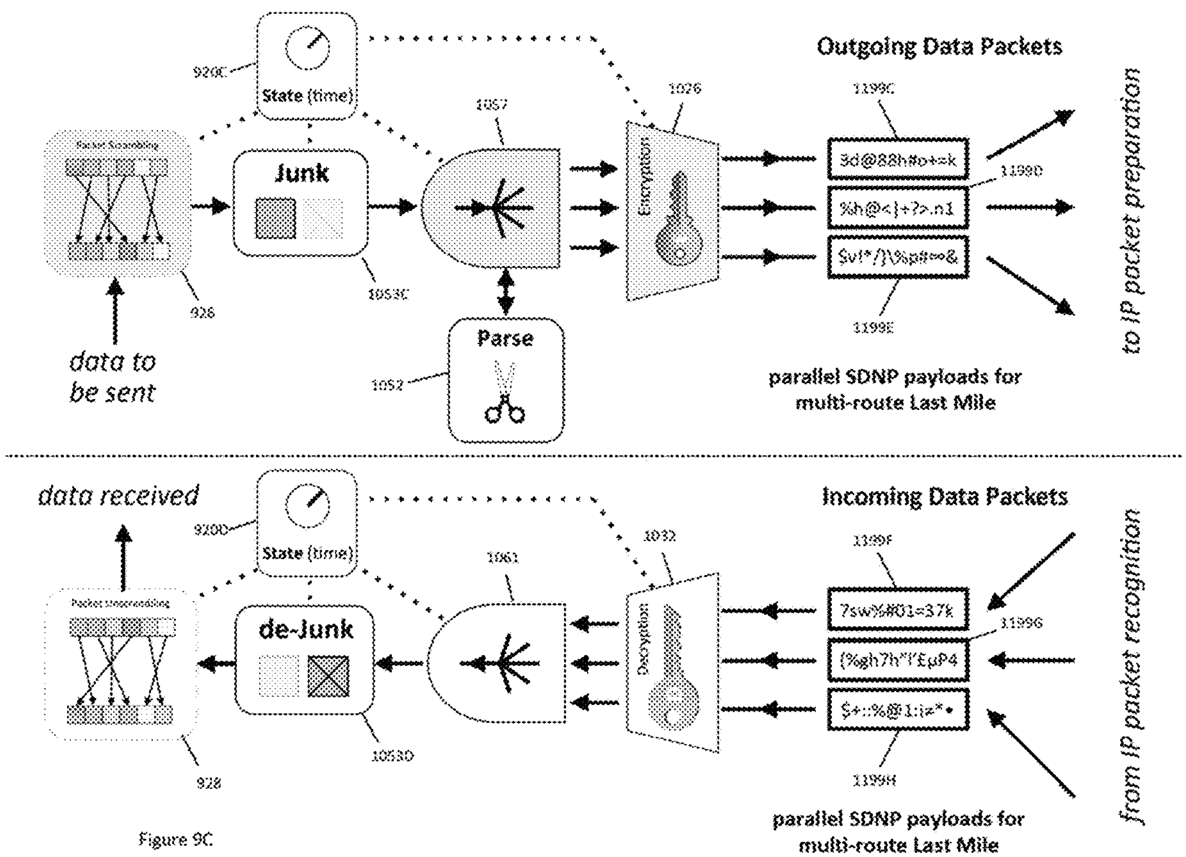
FIG. 9C is a block diagram illustrating SDNP security operations performed on incoming and outgoing data packets for multi-route Last Mile communication.

Another example of SDNP Last Mile security operation is illustrated in FIG. 9C specifically for parallel SDNP payloads used in multi-route Last Mile communication, i.e. where a client's device communicates to multiple SDNP gateways. Like its single route counterpart described previously, the process involves two directional operational sequences, one for outgoing data packets, the other for incoming data packets. In the case of outgoing data packets, shown in the upper half of the illustration, "data to be sent" is first scrambled using packet-scrambling operation 926, then deception is performed by the insertion of junk data 1053C. In some cases an entire packet may comprise entirely junk data, further confusing data mining attempts by hackers.

These packets are then split into multiple sub-packets by splitting operation 1057, using parsing operation 1052, and sent separately to encryption operation 1026. Each piece is then encrypted using common or distinct encryption keys and the resulting ciphertext is arranged into multiple SDNP payloads shown as data packets 1199C, 1199D, and 1199E. The packets are then formatted into separate and distinct IP data packets, i.e. "IP packet preparation", in preparation for communication onto the Last Link and Last Mile. All operations performed are dynamic, occurring at a particular time or with a specific state 920C during the security process execution.

In the case of incoming data packets shown in the lower half of the illustration, incoming data from the Last Link comprising parallel SDNP payloads 1199F, 1199G, and 1199H, i.e. from "IP packet recognition" are first decrypted piecewise by decryption operation 1032 followed by mixing operation 1061 to recover the true data stream. The data packets are then de-junked, i.e. the junk data is removed from the data packets using de-junk operation 1053D, followed by packet unscrambling operation 928 to recover the "data received". All operations performed on incoming data packets must use the state 920D used when the SDNP gateway created the data packet, i.e. containing information of a particular time or with a specific state 920D at the packet's birth. This state information may be sent through a different communication by a signaling server or may be carried in the incoming data packet as plaintext or alternatively as static ciphertext, i.e. with a decryption key already known by the SDNP Last Mile security operation.

Figure 9D:
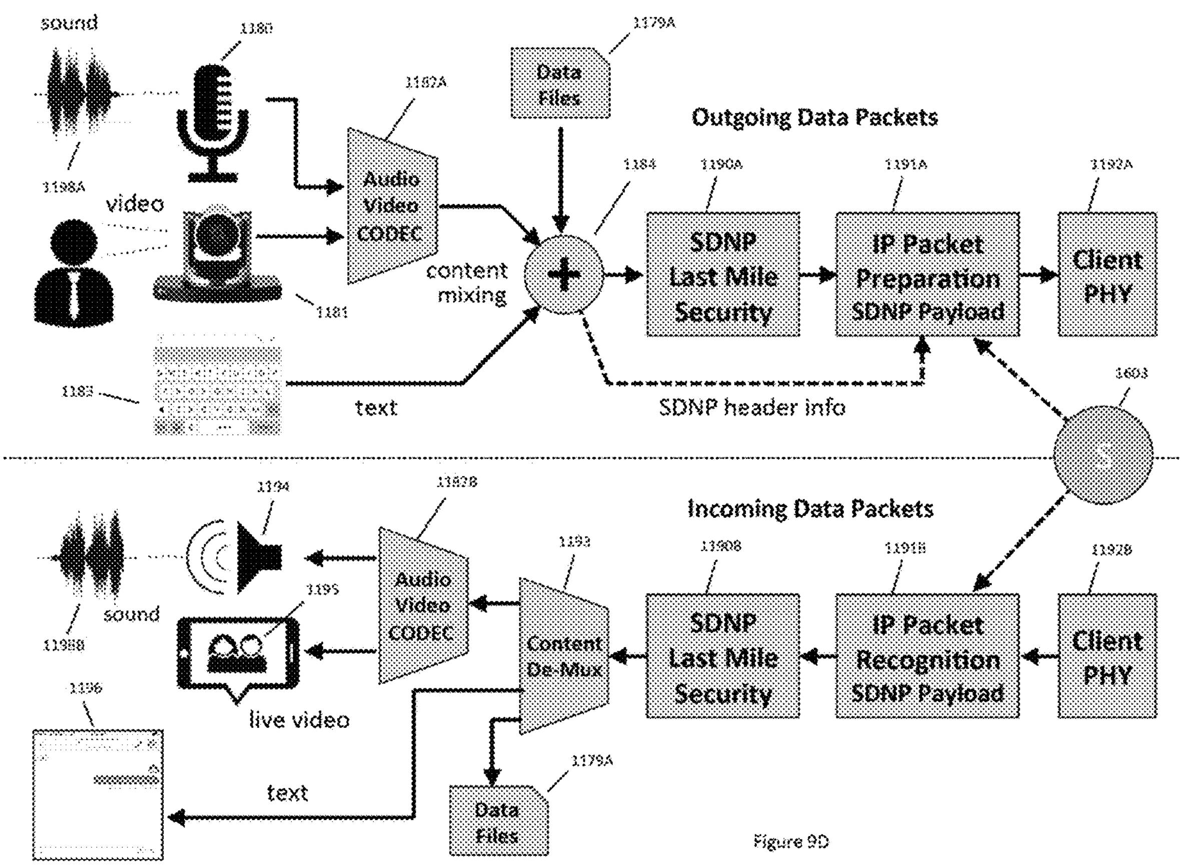
FIG. 9D is a block diagram illustrating audio, video, textual, and file content creation, data packet preparation, data packet recognition, and content reproduction in a SDNP client device.

The SDNP Last Mile Security operation need not use the same algorithms or methods for both incoming data and outgoing data packets. As exemplified in FIG. 9D, outgoing data packets use SDNP Last Mile Security operation 1190A while incoming data packets use SDNP Last Mile Security operation 1190B. Referring to the upper half of the illustration, outgoing data packets may carry data representing any combination of real time data sources from transducers or sensors, or may contain files made prior to communication. For example, sound 1198A converted into electrical signals by microphone 1180 and video signals from camera 1181 are converted into an equivalent digital format by audio video CODEC 1182A. The formats created generally involve standards such png, pic, mpeg, mov, etc. interpretable and interoperable with standard devices in accordance with OSI Layer 6, the presentation layer. Using standard audio video formats avoids the need to transmit proprietary code for opening a file between source and destination addresses.

The digital output of audio video CODEC 1182A is then mixed with textual data from virtual keyboard 1183 (a keypad realized on a touch screen) and with data files 1179A using content mixer 1184. This mixer, in turn, sends data files to SDNP Last Mile security operation 1190A, and provides SDNP header information to IP packet preparation operation 1191A in order to identify and label real time data packets from static files. SDNP Last Mile security operation 1190A then passes the secure data packets to IP packet preparation operation 1191A, which thereafter embeds the SDNP payloads into IP data packets in accordance with routing instructions received by the SDNP signaling server 1603. The data packets my be distributed into multiple IP packets for multi-route Last Mile communication or may be concatenated into a serial data string and embedded and fit into one or more serial data packets for singe route Last Mile communication. These packets are then passed in to the client PHY operation 1192A to add Layer 1 and Layer 2 data to complete the IP data packet.

In the reverse operation shown in the lower half of the illustration, incoming data from the Last Link received by client PHY 1192B is passed to IP packet recognition operation 1191B, which identifies the incoming data as a valid message or as an unknown and possibly malicious data packet. Valid messages are identified using SDNP tags, seeds, keys, and other identifiers communicated beforehand to the client device and to IP packet recognition operation 1191B by signaling server 1603. Anthropomorphically, IP packet recognition operation 1191B expects and even anticipates valid incoming data packets. Unexpected data packets lacking proper identification are discarded and never opened or processed further. In this manner, a hacker cannot disguise themselves and send valid data to any SDNP node without first registering their identity to the SDNP cloud.

IP packet recognition operation 1191B passes the valid data packets to SDNP Last Mile security operation 1190B, which in turn performs all necessary operations to reconstruct the true content of the data packet—data comprising a serially arranged amalgamate of video, audio, text, and data files. Content de-mux 1193, a de-multiplexer that undoes the mixing operation used in data packet creation, e.g. it un-mixes the serial data file created by mixer operation 1184 performed in the other caller's phone, is then used to separate the various file types. Outputs of content de-mux 1193 include text shown displayed in messenger window 1196, data files 1179A, and real time data sent to audio video CODEC 1182B. Audio video CODEC 1182B converts the digital presentation layer data into live video images 1195 or via speaker 1194 into sound 1198B.

Figure 9E:
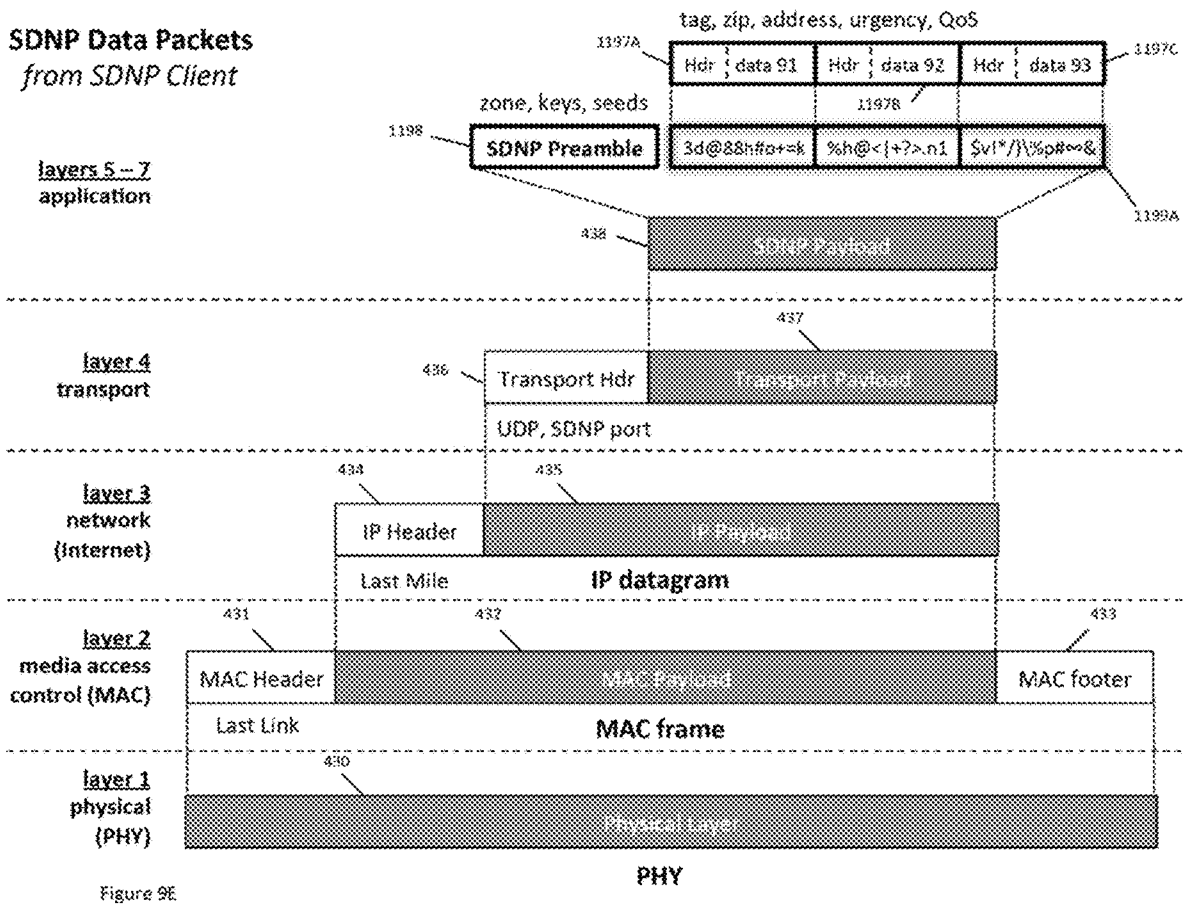
FIG. 9E is a graphical representation of a SDNP data packet using the 7-Layer OSI model to illustrate hierarchical data encapsulation.

For Last Mile data transport, data must be embedded or wrapped in a multi-tiered arrangement shown in FIG. 9E similar to the aforementioned Babushka Russian nesting doll model. Accordingly, SDNP payload 438 represents the transport payload 437, which together with transport header 436 comprises IP payload 435. The combination of IP payload 435 with IP header 434 represents an IP datagram, equivalent to MAC payload 432. Wrapping MAC payload 432 within MAC header 431 and MAC footer 433 results in the MAC "frame", the frame being equivalent to physical layer 490, also known as the PHY Layer 1 content, comprising a physical media such as electrical signals, light, radio waves, or microwaves.

In SDNP routing, MAC header 431 in Layer 2 describes the MAC connection for the Last Link, i.e. the connection between the client device and the first device in the Last Mile link. By using source and destination addresses of the client device and the SDNP gateway, header 434 in Layer 3 specifies the end points of routing over the Last Mile. Because the Last Mile is not part of the SDNP cloud however, the precise route data packets take over the Last Mile is not explicitly stated or controllable. In SDNP Last Mile communication, transport header 436 in Layer 4 specifies UDP is used for SDNP real time payloads, and also specifies the ad hoc assigned SDNP port address used in each packet—an address changing dynamically to thwart port interrogation cyber-attack strategies.

SDNP payload 438, the payload of the Last Mile IP packet, contains SDNP preamble 1198 containing zone information, keys, and seeds, and SDNP data field 1199A, a serial string of multiple segments of independently encrypted ciphertext. The decrypted form of the ciphertext comprises plaintext files 1197A, 1997B, and 1197C, each containing their own unique SDNP header, and corresponding data files data 91, data 92, and data 93 respectively. The individual sub-headers include information involving tag, zips, addresses, urgency, and QoS data as applicable.

The roles of SDNP preamble and headers vary depending on the command and control methods employed. In tri-party Last Mile communication, a signaling server instructs the client device and the SDNP gateway or gateways how to communicate with one another to make a call, send a file, or open a session. As such, the instructions are communicated to both devices using a command and control data packet with TCP transport prior to sending any media data packets. As such, the minimum data required in the Last Mile communication between the client and the SDNP gateway is a tag or address used to identify the incoming packet. In some cases, for example, if a signaling server cannot be reached, then in an alternative embodiment, the SDNP data packet can carry additional data in its preamble and packet headers.

The data packet and accompanying table 1177 shown in FIG. 9F illustrates one exemplary format used to carry SDNP information within SDNP payload 438. The data packet comprises SDNP preamble 1198 and one to eight data field headers 1178X with their corresponding data fields "Data X Field". Each data field such as "data 1 field", "data 2 field" etc. is preceded by its own corresponding header Hdr 1, Hdr 2, etc. and carries the content of a communiqué including voice, text, video, pictures, movies, files, etc. The number of data fields can vary from one to eight as determined by the 4b long field #, i.e. from binary 0001 to binary 1111. The length of SDNP preamble 1198 and SDNP payload 438 is affected by the Field # specification. If only one field is selected, i.e. where Field #=0001 binary, SDNP preamble 1198 will contain only L Fld 1 (L Fld 2 thru L Fld 8 will be eliminated) and SDNP payload 438 will include only Hdr 1 and the data 1 field. If the maximum of eight fields is selected, i.e. where Field #=1111 binary, then SDNP preamble 1198 will contain eight length specifications L Field 1 to L Field 8 and SDNP payload 438 will include eight data fields and headers in sequence as Hdr 1, data 1 field, Hdr 2, data 2 field, . . . Hdr 8, data 8 field. As shown, SDNP preamble 1198 contains the field length specifications L Fld 1, L Fld 2 and L Fld 8. The small gap between L Fld 2 and L Fld 8 is meant to represent the sequence continue and does not represent a gap in the data.

The length of each data field specified by L Fld X can vary from zero or 0B (a null data field), to a maximum hexadecimal length of FFFF or 65,535B. For practical reasons of compatibility with Ethernet, the maximum data packet length for any one field is preferably limited to 1500B or hexadecimal 05DC, and the aggregate length of all data fields should not exceed the jumbo packet size of 9000B or hexadecimal 2328. The specified length of each data field can vary independently. A zero field length, e.g. where L Fld 8=0000 hexadecimal, results in elimination of the corresponding data 8 field but does not eliminate the corresponding header Hdr 8. Headers are only eliminated by Field # specification.

In accordance with this SDNP protocol, the apportionment of content across the various data fields is extremely flexible. Data directed to single destination may be contained within a single data field, or for purposes of deception may be split into multiple data fields and merged with junk data. The size of the data fields may vary independently. Data fields may also be included containing purely junk data or alternatively entire data packets may be generated containing only junk data. For efficient packet routing however, data targeted for different destinations should be partitioned into separate data fields each with their own unique headers.

The SDNP packet format is applicable for end-to-end transport throughout the entire SDNP network including across multiple clouds and zones such as the SDNP cloud or in Last Mile communication. Although the contents of the SDNP data packets change as they traverses the network, the SDNP packet format remains unchanged. Since this format includes minimal data overhead, the SDNP data packet format is equally applicable for large payloads or for time critical real-time communication. The packet format is applicable for bidirectional data flow, i.e. for data flow from the Last Mile into an SDNP gateway and across the SDNP cloud, or conversely for delivery of data packets emanating from the cloud, exiting a SDNP gateway for transport across the last mile to the destination client device.

In operation, the direction of SDNP data routing is determined by the Network Layer-3 source and destination addresses described within IP header 434 of FIG. 9E. Each packet is loaded with its source and destination addresses at the time the media node prepares the packet for transmission to the next media node on its route. In tri-channel communication the SDNP or IP address of a packet's destination is delivered from a signaling server to the media nodes as a command and control (C&C) packet prior to outgoing packet preparation. In general, the signaling server is able to send C&C instructions to every node in a communication path including both sending (caller) and destination (callee) devices. In the event that only single channel communication is available, e.g. in a link with long propagation delays, then the signaling server is unable to pre-warn a media node of an incoming packet or what to do with it. In such an event, the routing addresses are carried within the incoming data packet in SDNP payload 438. In such cases, the media server follows default instructions on how to process the incoming packet using data fields contained within the incoming SDNP packet including routing and state information as well as security credentials.

Payload 438 is made of two portions, a readable portion comprising preamble 1198, and an unreadable portion 1199*a* containing data in a "concealed form". The content of this packet may employ any number of concealment techniques to obscure its content such as encryption, scrambling, and possibly containing junk data. The concealment method must be undone to extract usable content 1197*a*, 1997*b* and 1197*c*. These packets contain the destination addresses of the future outgoing packets. The addresses exist only in an unconcealed or decrypted form for only a brief moment before the next packets can be prepared and encrypted.

As described, SDNP preamble 1198 comprises information relevant to the entire packet. Aside from the data field specifications, FIG. 9F illustrates SDNP preamble 1198 also includes the SDNP zone where the SDNP packet was created, e.g. zone U1, two numeric seeds, and two keys. These keys and seeds may be used as zone specific security credentials in the scrambling/unscrambling, junk insertion/deletion, mixing/splitting, and encryption/decryption process. The seeds and keys can be used as the exclusive means for the delivery of security credentials needed in opening and reading the data fields, or may be used in conjunction with command and control packets sent to the client's device and to the SDNP gateway from the signaling server, a network of command and control computers not involved in carrying communiqué content in media packets.

Seeds and keys can be delivered securely in public, i.e. in non-encrypted form, because the data lacks the information needed to use them—they comprise only part of the security credential. The other portions of security credentials, the missing pieces, may be sent previously in another data packet, or may comprise shared secrets of algorithms, look-up tables, and codes not delivered over the network and not part of the message. Encryption keys may be symmetric keys, where both the sender and the recipient hold the key, or public keys, where the public, including the sender, has access to the encryption key but only the recipient, i.e., the party generating the encryption key, holds the decryption key. Moreover, all the security credentials are limited to a specific security zone, e.g. U1, and are dynamic, limited to a specific time or state that expires if unused within a specified time. If the seed and key data fields are not used as security credentials, e.g. because the signaling server independently instructs the SDNP devices regarding security operations, then these fields can be filled with numeric values falsely appearing as encryption keys, misdirecting a cyber-attacker into wasting time analyzing a decoy security key.

In Last Mile communication, the intermediate routers between the client's device and the SDNP gateway do not process, interpret or open the transported data packets because they are not part of the SDNP network and lack the ability to query or interpret the SDNP packet data contained within. Instead, all security operations are exclusively executed at the two end points, the SDNP client and the SDNP gateway because only these devices operate as SDNP communication nodes. Since each end point executes SDNP protocols dynamically, the Last Mile communication is HyperSecure over the entire Last Mile. If the other calling party also runs SDNP software, then the second party's Last Mile is also secured by the aforementioned SDNP methods and HyperSecure communication is guaranteed "end to end"—from one caller to the other.

In the event, however, that the end device is not a SDNP client, then the router nearest the caller, i.e. the Last Link router, can be enabled with SDNP firmware, and the Last Link can be reasonably secured from special functions performed by the SDNP enabled router even though it is not SDNP enabled. This alternative Last Link security method is described in greater detail in subsequent sections of this disclosure and will not be elaborated upon in this section. The described method, while applicable for securing Last Link communication, is not sufficient for protecting other portions of the Last Mile.

Referring again to FIG. 9F, each and every SDNP data field is accompanied by a SDNP data field header 1178X containing information uniquely applicable to its associated data field but not useful for other data fields. Specifically, in the disclosed embodiment, each header contains a data type field describing what kind of data is contained within the associated data field, a destination address field used for identifying the specific data field and its destination, a field zone used to carry forward zone information from one zone to another, as well as urgency and delivery information. As shown each SDNP data payload 438 contains one SDNP preamble 1198, and one or more SDNP data field headers 1178*x* and corresponding data x fields, where x describes the number of separate payloads which may range from 5 to 50 depending on the size and urgency of the payloads.

Although the signaling server may supply most of the described information to the SDNP client and SDNP gateway, one fundamental component necessarily carried by the Last Mile data packet is an "address field" or tag needed to identify the data packet. The field, referred to as the SDNP payload's destination address (abbreviated in the illustration as "Dest Addr"), may comprise any unique identifier sufficient to distinguish the identity of one data field from another. Its purpose is similar to the function of bar codes used to tag and track luggage in an airport or boxes shipped by a courier. Address types may for example comprise a numeric tag, a SDNP zip, an IPv4 or IPv6 address, a NAT address, or even a POTS regular phone number, so long that the identifier is unique to prevent conflict in identifying the data packet. The size of the destination address field varies with the type of address type selected.

Figure 9G:
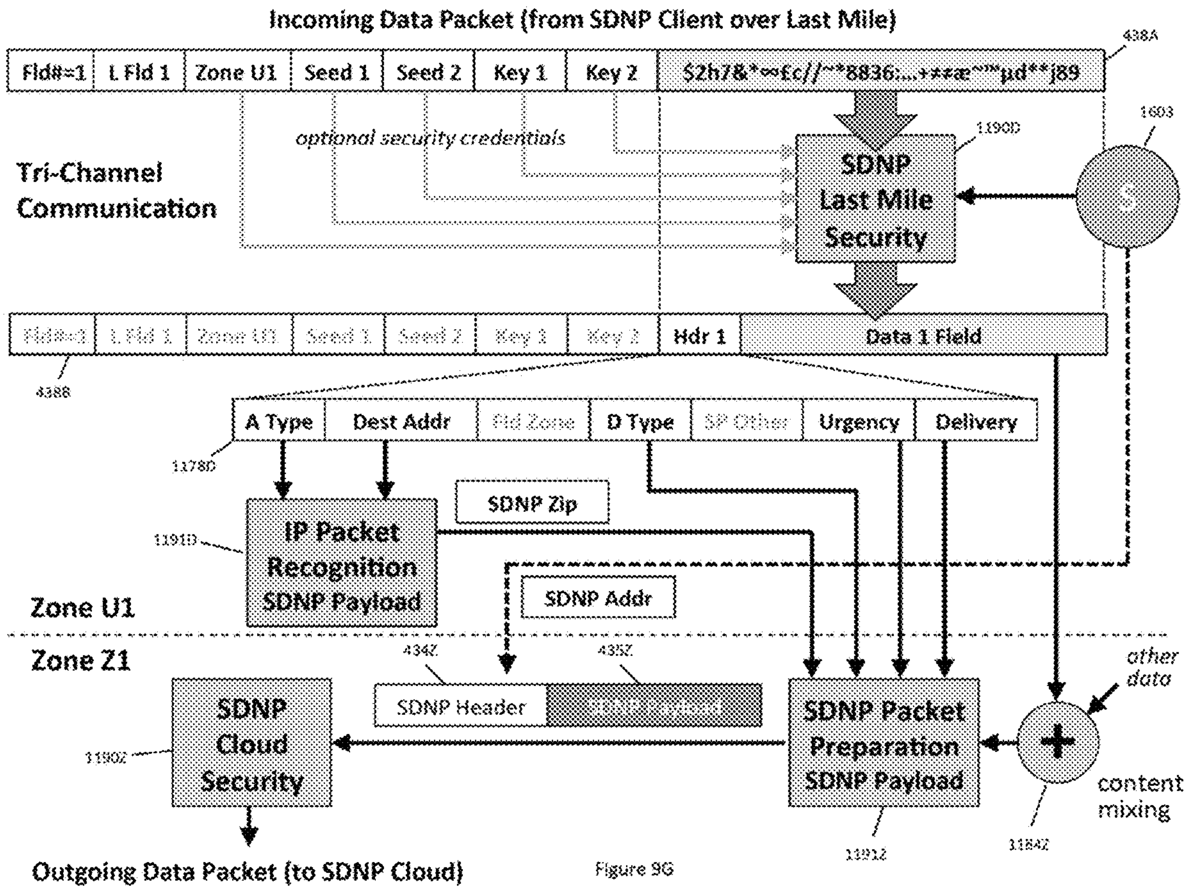
FIG. 9G is a block diagram illustrating inbound Last Mile data packet processing in SDNP gateway using tri-channel communication.

To maintain packet anonymity during routing, it is preferable to employ confidential codes such as a SDNP Zip code as the SDNP destination address rather than using true phone numbers or IP addresses. In operation, whenever a data packet from an SDNP client arrives at a SDNP gateway, the SDNP payload is decrypted and then each data field header is inspected for the identifying destination addresses. Before the data header can be inspected, the data packet must be decrypted or processed to undo the concealment methods used in the packet's creation. In the case of dual-channel or tri-channel communication, as shown in FIG. 9G, the signaling server 1603 has previously informed the SDNP gateway about the planned arrival of the data packet and its corresponding identification marking and security credentials. As such, when the SDNP gateway receives data packet 438A comprising Last Mile communication sent from a SDNP client, the gateway performs SDNP last mile security operation 1190D in order to convert the SDNP payload from ciphertext into plain text data packet 438B. A security operation describes the processing of modifying an outgoing data packet to conceal its content and the process to modify an incoming data packet to reveal its content. Specifically, the security operation performed on an incoming data packet is used to recover its content by undoing concealment operations performed on it before its transport, including using decryption to undo encryption, unscrambling to undo scrambling, dejunking to remove junk insertions, and mixing to undo splitting. These processes are performed in accordance with the state and zone of the data packet when it was created. For outgoing data packets, a security operation involves concealing the contents of a data packet prior to transport by performing encryption, scrambling, junk insertions, and packet splitting in accordance with the state and zone when the data packet is created. The unencrypted seed and key data fields in the data packet 438A can be neglected or optionally used in conjunction with signaling server information to decrypt the ciphertext. The resulting operation reveals data field 1 and its associated data field header 117D labeled as Hdr 1 containing the data field's destination address, data type, urgency and delivery information. In such cases, the destination address is not a routing address but only a SDNP Zip, i.e. a tag used to identify the packet is part of a particular conversation.

Once a specific data field is found to contain the identified destination address, e.g. a SDNP Zip code, matching instructions from signaling server 1603, the data field is extracted, optionally mixed with other related content by mixer 1184Z and rewrapped into a new IP or SDNP datagram by SDNP packet preparation operation 1191Z for delivery to its next destination. The new data packet headed into the cloud includes an SDNP header 434Z containing the destination of the new packet and the data content, SDNP payload 435Z. The destination supplied by the signaling server 1603 to the gateway media node as an IP address or SDNP address may comprise another SDNP server operating as a SDNP cloud node or may involve Last Mile communication to another SDNP client. In such tri-channel communication cases, the destination address is not really an address but a means to identify the packet, where its next destination is already known by the SDNP gateway. In the case where the destination of the packet is for SDNP cloud routing the data packet is then processed by SDNP cloud security operation 1190Z in accordance with Z1 security credentials for the cloud, not U1 credentials used in the Last Mile.

Figure 9H:
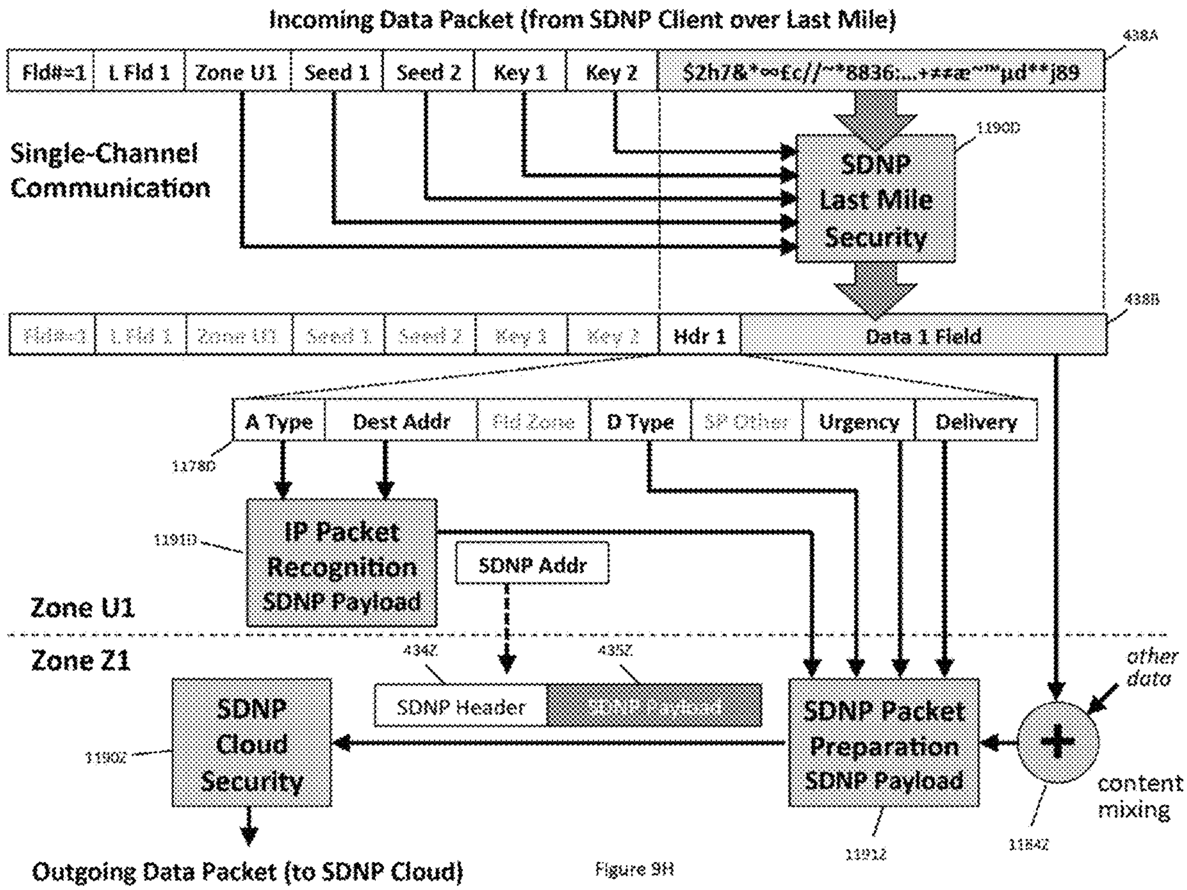
FIG. 9H is a block diagram illustrating inbound Last Mile data packet processing in SDNP gateway using single-channel communication.

In single channel communication, as shown in FIG. 9H, a signaling server is unable to advise the SDNP gateway in advance of the imminent arrival of a data packet and its data fields, either because (i) there is no signaling server operating in the local network, (ii) the signaling servers are temporarily offline, or (iii) the signaling server is too busy and unable to preemptively route the packets in time. In such cases, the data packet 438A from the SDNP client must carry the necessary security credentials Zone U1, Seed 1, Seed 2, Key 1 and Key 2 to decrypt the data packet using SDNP Last Mile security operation 1190D converting ciphertext data packet 438A into plaintext data packet 438B. The standard SDNP data packet format reserves these data fields even if the contents of the field is not required by a particular media node. For example if a specific concealment process used to create a data packet does not use the Key 2 field, the data in that field is meaningless and is not used by the destination node. Nonetheless, the data packet reserves the same number of bytes for the field used or not, so that all SDNP data packets are homogeneous in format. Once it has decrypted the ciphertext in data packet 438A, the SDNP gateway extracts the content of the data packet data 1 field and its associated Hdr 1 field header 1178D from plaintext data packet 438B. From this data packet, IP packet recognition process 1191D combines the data fields for A Type and Destination Address from Hdr 1 field header 1178D for two reasons—firstly in tri-channel communications to confirm the incoming packet is expected, and secondly to produce a new SDNP address. This new SDNP address is combined with D Type, Urgency and Delivery fields and processed by SDNP packet preparation operation 1191Z to create SDNP header 434Z in the outgoing data packet. The content of Data 1 Field is also extracted from incoming plaintext data packet 438B, and its content is optionally mixed 1184Z with other outgoing content to create outgoing SDNP payload 435Z. The packet is then processed by SDNP cloud security 1190Z in preparation for forwarding. In this way, the address field performs multiple functions, both to identify an incoming data packet and to provide a forwarding address when needed.

If a media node receives a data packet without first receiving instructions from a signaling server, the media node will revert to default instructions as to how to process the incoming data packet, and how to prepare outgoing data packets. Should the media node not hold any instructions on how to handle unannounced incoming packets, the data packet will be discarded. If the media node is enabled with instructions on how to process unidentified packets, the media node will first confirm in accordance with security credentials that the packet is a valid SDNP packet, and process it accordingly. If the sender cannot, however, be identified, e.g. if an encryption code, seed, or source address is invalid, then the packet will be discarded as a fraud.

Returning to FIG. 9F, the packet field labeled "Field Zone" describes the zone where a specific field was created, i.e. whether a past encryption or scrambling was performed with, for example, U1 or U2 zone settings. In cases of nested security protocols or other nested concealment methods, unscrambling, decrypting, or undoing concealment of a data packet requires additional information, e.g. a key, seed, time or state, in which case the packet field labeled "Field Other" may be used to carry the field-specific information. In general these fields are not employed except in nested security protocols, e.g. where an encrypted data field is then scrambled or encrypted a second time. Care must be taken when employing nested security methods to perform the recovery of data in precisely the reverse order of the data packet's preparation, or the content will be lost forever.

The packet field labeled "Data Type", if used, facilitates context-specific routing, distinguishing data, pre-recorded video, text and computer files not requiring real time communication from data packets containing time sensitive information such as voice and live video, i.e. to distinguish real-time routing from non-real-time data. Data types include voice, text, real-time video, data, software, etc.

The packet fields labeled "Urgency" and "Delivery" are used together to determine best how to route the data in a specific data field. Urgency includes snail, normal, priority, and urgent categories. Delivery includes various QoS markers for normal, redundant, special, and VIP categories. In one embodiment of this invention, the binary size of the various data fields as shown in table 1177 is chosen to minimize the required communication bandwidth. For example, data fields as shown may range from 0 to 200B whereby eight data fields of 200B per data field means that a SDNP packet can carry 1,600B of data.

Both FIG. 9G and FIG. 9H illustrate the case where a client device sends data packets in zone U1 over the Last Mile to a gateway node. The gateway node then processes the incoming data packets to undo the Last Mile security and concealment methods employed using zone U1 security credentials. The gateway nod may then mix the content of the packet with the content of other packets in mixing process 1184Z to create a new packet (or packets) bound for transport through the SDNP cloud using the security credentials of Zone Z1.

Figure 9I:
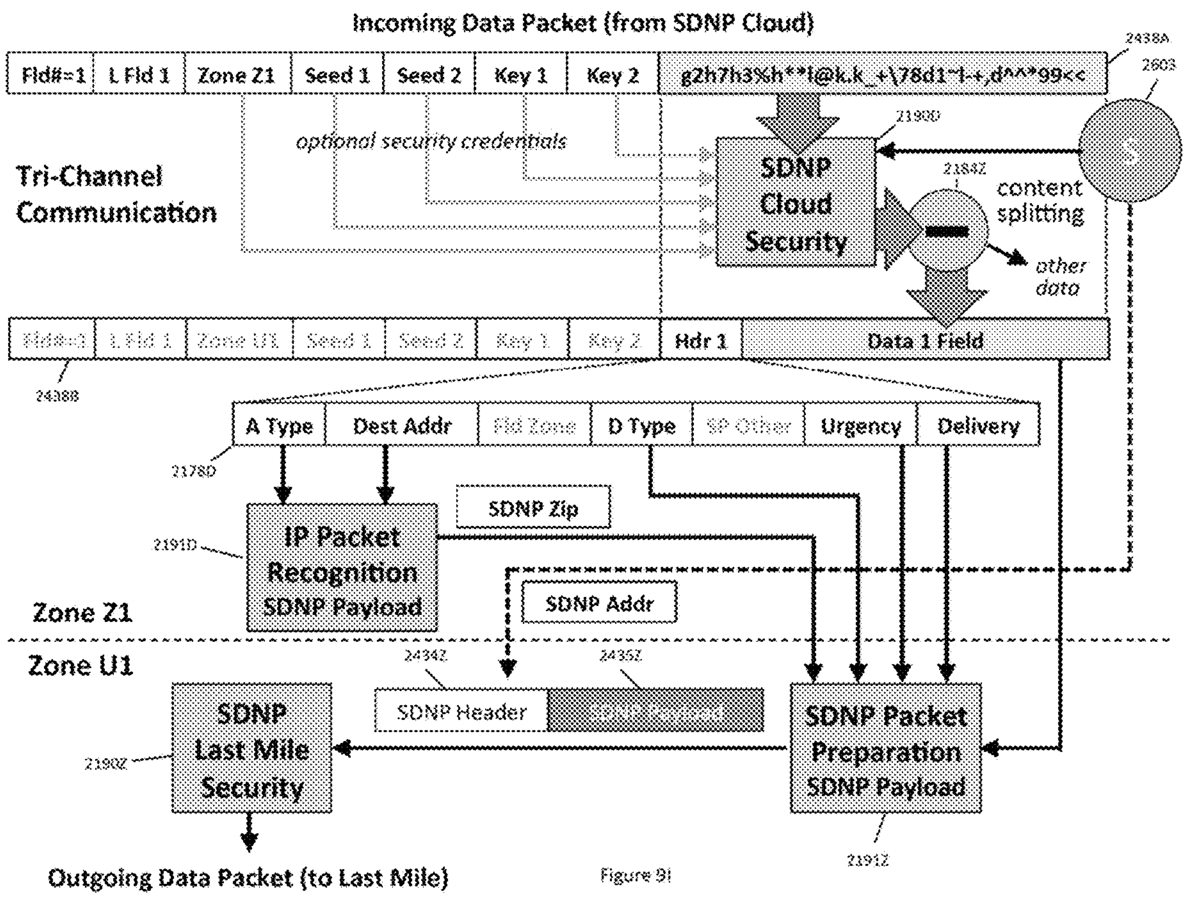
FIG. 9I is a block diagram illustrating outbound Last Mile data packet processing in SDNP gateway using tri-channel communication.
Figure 1O:
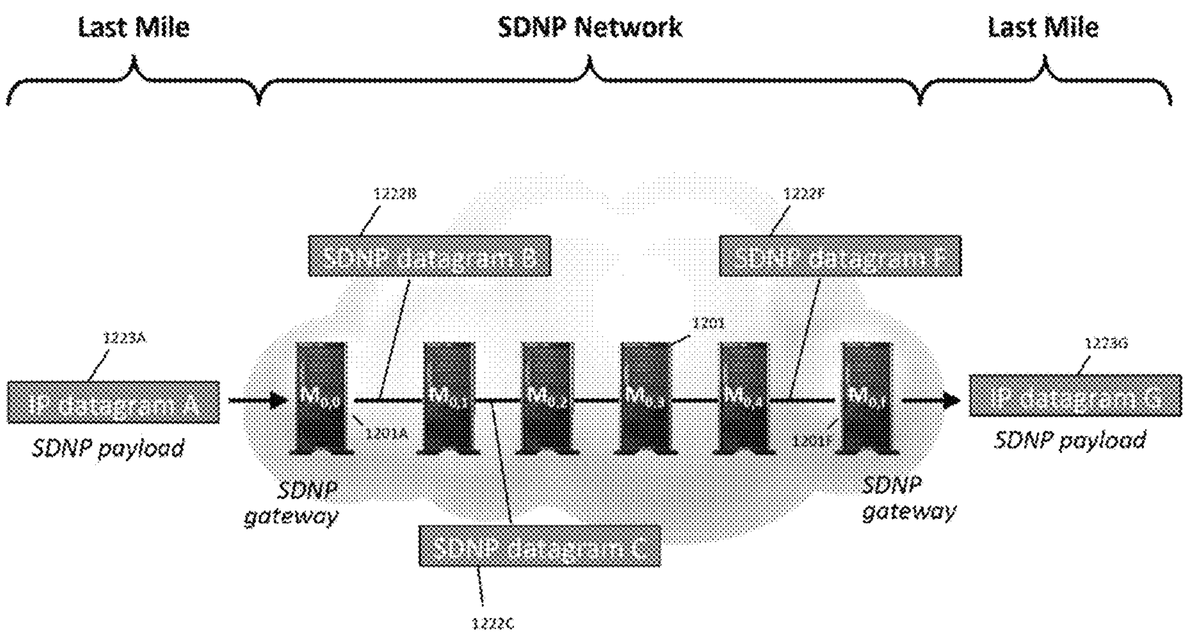

A similar process is employed when the SDNP gateway receives a data packet from the cloud (including another gateway) and sends the data packet to a client device, e.g. from the SDNP cloud to the client's phone (the callee). As shown in FIG. 9I, in dual-channel or tri-channel communication signaling server 2603 has previously informed the SDNP gateway about the planned arrival of the data packet and its corresponding identification marking and security credentials coming from the cloud. As such, when the SDNP gateway receives data packet 2438A from the SDNP cloud, the gateway performs SDNP cloud security operation 2190D in order to convert the SDNP payload from ciphertext into plain text data packet 2438B. The unencrypted seed and key data fields in the data packet 2438A can be neglected or optionally used in conjunction with signaling server information to decrypt the ciphertext. The use of the data fields depends on the algorithms employed in concealing the packet's payload. For example, if encryption is not used then the fields containing encryption keys are neglected.

The resulting operation extracts a number of data fields. A subsequent operation splits these data fields in content-splitting operation 2184Z to extract specific content comprising data field 1 and its associated data field header 2117D labeled as Hdr 1 using recognition operation 2191D. Header Hdr 1 contains the data field's destination address, data type, urgency, and delivery information. The extracted data field is then rewrapped into a new IP or SDNP datagram by SDNP packet preparation operation 1191Z for delivery to its next destination. The new data packet headed into the cloud includes an SDNP header 2434Z containing the destination of the new packet (the IP address corresponding to the person's phone number) and the data content, SDNP payload 2435Z. The outgoing packet then processed by SDNP Last Mile security operation 2190Z in accordance with U1 security credentials for the Last Mile, not Z1 credentials used in the cloud.

If a signaling server is not available, i.e. in single-channel communication, then the media node must process an incoming data packet using instructions previously delivered it as a default instruction. In such instances, the incoming data packet is checked against criteria needed to confirm the sender is a valid SDNP client (such as a SDNP zip code or an authentication code delivered previously as a predetermined shared secret). If the packet is determined to be valid, the packet is processed in accordance with the default instructions. If not, the packet is discarded.

The aforementioned methods are exemplary and not intended to limit the processing and routing of data packets to a particular data packet format.

Security and Privacy in Communication

An important consideration in Last Mile communication is a network's ability to support both secure communication and private communication. Although privacy and security are often associated, they are not the same thing. Security as the term is used in communication is considered the "discipline to prevent unauthorized access to communication data in recognizable form". Security does not however, cover cases where an individual or agency has the right to access or monitor a communication. Privacy is defined as "the state or condition of being free from being observed or disturbed by other people and in being free of public attention". In legal terms privacy is defined to be a person's right to control access to his or her personal information.

In communication, the privacy rights of an individual in their voice calls, video, text, emails, personal messaging, etc. vary dramatically by country. The role in complying with applicable governmental regulations to provide legally valid access to communication is discussed in a subsequent section. That aside, an ideal network and communication system should be able to prevent hacking of communication, i.e. it should be absolutely secure, and it should be capable of insuring all communications are limited to those with the right to know, i.e. it should be private.

When assessing the privacy and security capabilities of a network, the network's Last Mile and its connected devices must be considered carefully. Depending on the security credentials used to establish information access privileges, the Last Mile and its connected devices frequently determine a network's security and privacy, i.e. the Last Mile represents the weakest link. Four possible combinations of communication networks must be considered:

Secure and private networks. From an individual's perspective, this case represents ideal network performance, one that insures both security of the information and privacy for the individual. In its extreme, a truly secure private network means any individual, government, agency or corporation can not intercept meaningful communication nor obtain private data about a person's behavior, actions, their contacts and associates, their personal preferences and activities, etc. Although privacy rights advocates consider an idealized secure private network as the gold standard in confidential communication, governments, security organizations, and corporations view absolute autonomy in communication as problematic, allowing individuals to engage in criminal activities and terrorism with absolute secrecy and impunity.

Unsecure networks lacking privacy. A network that is not secure and has no privacy provisions (such as Internet OTT carriers today) represents a severe risk to any individual, group, club, company, or government using the communication channel. Because a cyber-hacker can easily access calls and data, any malevolent party can use this information for any purpose they choose. For practical jokers and spammers, unsecure communication channels can be commandeered to invoke chaos, flood networks with spam, initiate denial of service attacks, and create damaging mischief. For ideologues, political activists, and religious cults, unsecure communication can be used to leak sensitive information to precipitate political change, discredit government officials, stimulate riots, or even topple governments (see the historical fiction movie "The Fifth Estate" (DreamWorks© 2013) as an example chronicling WikiLeaks release of hundreds of thousand of sensitive government documents precipitating a firestorm of international repercussions). For economically motivated cyber-criminals such as those associated with organized crime and mafia, attacks focus on money crimes, for example, theft, diversion of funds, fraud, identity theft, money laundering, extortion, blackmail, and other felonies. For those involved in fear and intimidation such as drug cartels, gangs, and terrorists, unsecure communication can be monitored to track the location, movements, and actions of their competitors, enemies, and targeted victims for purposes of planning and implementing violent crimes such as assaults, kidnapping, murder, bombings, or acts of terrorism. Finally in the case of personal cyber-attacks, unsecure communications can be used to illegally hack databases containing individuals' private information including social security numbers, passports, banking information, credit card information, medical records, and other personal confidential information.

Secure networks lacking privacy. Examples of secure networks lacking privacy commonly include corporate accounts where the IT (information technology) manager or security department have the right and authority to monitor all corporate communications to insure no inappropriate or illegal communication is occurring over the company's network. Even though the network is secure from hackers and cyber-criminals, the communications on such a network are not private and may be monitored by authorized agents to detect wrongdoing including unauthorized personal use of company communication infrastructure, corporate espionage, violation of confidentiality agreements, unauthorized disclosure of intellectual priority (IP leaks), sexual harassment, violations of the fair disclosure regulation (reg. FD), insider trading, violation of FCPA (foreign corrupt practices act), graft, bribery, fraud, financial reporting violations, securities violations, and more. In corporate communication, an individual is informed upon joining the company that their corporate communications are not private and may be monitored including company phone calls, email, text, personal messaging and SMS, and other communiqué. In the case of court proceedings, whether civil or criminal, these communiqués may also be subpoenaed and entered into evidence in court even if personal information is comingled with corporate information. In essence if an employee of a company utilizes company communication, devices, and networks for personal use, then (except in the case of attorney-client privilege) all the information is fair game and should not be considered private. For this reason and others, the mixed use of personal messengers such as Line and KakaoTalk for business and personal use is especially problematic because an employee cannot invoke privacy rights to prevent inspection of their text chats, pictures, and files.

Quasi-private, unsecure networks. A quasi-private unsecure network is one where the network carrying the data can be hacked, e.g. wire tapped, but private transactions can be confidentially performed despite the lack of security provided certain conditions are met. In this manner privacy is established by confirming the identity of a caller (or callers) by various means using shared secrets, undiscoverable even by a hacker intercepting the call. A common example of a private unsecure communication is a voice banking transaction. The caller confirms their identity by answering a series of ever-changing questions to which an imposter would be unlikely to know the answers, e.g. "we see you ate dinner last night and paid with our credit card. Could you tell me what city did you eat dinner in?" Or, "you receive a regular billing from a winery. What winery is it?" Another example question is "could you tell me the last name of your favorite grade school teacher?" For these methods of identity verification to work, the bank must either have access to non-public information (such as credit card statements) or the bank and its clients must establish a set of shared secrets when the account was first set up, generally in person and not electronically. After the identity if the caller is confirmed, the client can instruct the institution to perform certain actions that would not benefit a cyber-criminal. For example, "please move $10,000 from my savings to my checking account." If the money transfer is wired to another bank, however, even a more rigorous verification must occur to insure the client's privacy. In any case, privacy depends on meeting the condition that the communication cannot reveal shared secrets either electronically or aurally, otherwise all privacy is lost and accounts may be at risk. As such authenticated communication on an unsecure line is referred to as quasi-private meaning conditional privacy. Another example or quasi-private communication over a unsecure network can be performed by utilizing a security token, a device issued by the bank that only the client possesses. The pseudo-random number generated by the device is told to the bank's operator who confirms the number is consistent with the bank's authorized numbers. Since the number is 8 or more digits the chance of guessing the right code the first time is miniscule. If the wrong token number is reported, the call is terminated, the account is frozen, and the fraud department is alerted to investigate. In any such case, the importance of insuring privacy over an unsecure network depends on being able to communicate without verbally revealing any confidential details such account numbers, PINs, credit card information, etc., i.e. the communication is only quasi-private.

Identity Verification and AAA—

The concepts of security and privacy rely on accurate and reliable identity verification i.e. that a caller is who they say they are. Identity verification, also known as "authentication", is important to enable valid use of data and communication, and to prevent illegal or unapproved access. Reliable identity verification is important in national security, law enforcement, IP ownership, business enterprise, and in individual rights. Example of the importance of identity verification include the following:

To a country's national security, caller identity verification is important in tracing the identity of criminals, spies, terrorists, drug traffickers, and anyone divulging national secrets or threatening national security. It is equally important to be able to identify individuals who are authorized to access, read, or send confidential, secret, or top secret communiqué s, data, and files.

For law enforcement, caller identity verification is important in identifying individuals or organizations involved in criminal activities such as robberies, arson, drug trafficking, smuggling, prostitution and human trafficking, extortion, blackmail, and other felonies. It is equally important to be able to identify individuals who are authorized law enforcement agents including police, fire, paramedic, park ranger, air marshal, TSA and airport security, port authority, customs, and coast guard services.

For IP owners such as movie studios, identity identification is important in identifying individuals, organizations, and entities engaged in piracy and the unauthorized distribution of copyrighted material such as music, movies, books, videos, etc. It is equally important in confirming the valid and legal distribution of IP and copyrighted material.

To business enterprises, identity verification of its employees is important to track the intentional or accidental release of material non-public information, to identify those engaged in commercial espionage, to identify individuals engaged in the illegal disclosure of intellectual property, and those committing other crimes such as fraud or personal use of company communication. It is equally important in confirming the identity of those to which company confidential information is available, and specifically to authorize which specific types of data they have access. For example, the engineering department of a company should not have access to the personnel records of the marketing department in order to compare how much the marketing staff is being paid.

To individuals, identity verification is important to insure a caller's "privacy" by confirming the person or persons with whom you are communicating are not imposters.

So the role of identity verification is to confirm a person's identity, i.e. to authenticate they are who they claim to be, and to identify, block, and ultimately apprehend those misrepresenting their identity. Authentication is the first "A" of the triple-A security model, or AAA standing for "authentication, authorization, and administration". Numerous methods such as a PIN code, passwords, fingerprints, tokens, and query response methods may be used to verify a person's identity and to authenticate they have an account on the system.

Once authenticated, a valid user's identity is then used to determine the access rights and privileges to communiqué s, data, files, system operation, etc. These privileges and access rights collectively are referred to as a user's "authorization" as granted by the system. i.e. an authenticated user can only access the communications, data, files and system features for which they are authorized. Authorization is therefore synonymous with "privileges" or "access".

The third "A" in AAA stands for administration. Administration is the bookkeeping of recording authorized access to the network and files, e.g. for the purpose of pay-per-use billing administration, and to monitor and report attempts for unauthorized access to the network, files, and system operation. Administration is also important is tracking changes in security credentials, PINs, passwords, etc. needed in the authentication operation.

A network's ability to perform AAA procedures is paramount to insure privacy and to prevent corruption of the network from unauthorized users or network operators. Any network unable to insure the identity of its users can be corrupted for illegal purposes. Network corruption by unauthorized users is unavoidably problematic in OTT communication because no means exist is to validate caller identity. Unauthorized access and network communication by unidentified users, i.e. anonymity, is a significant risk in modern communication.

Anonymity—

The principle of anonymity in communication is the practice of intentionally hiding a caller's identity in order to communicate without traceability. A nearly symbolic example of anonymous communication is a payphone. In a payphone call, payment is by, untraceable cash, the payphone number is public, and anyone can use the phone, meaning the identity of the caller is not known and there is no certain means to determine if a caller is who he or she claims to be. Because the phone number is unlisted, no individual owns the number and (except through sophisticated voice recognition software) there is no way to identify the caller's identity. In the case of a registered device such as cell phone, the identity of the device's owner can be traced through the phone number, but the identity of the caller may still remain unknown. For example, the phone may be stolen, or a pay-per-use SIM card may be used to obscure the caller's true identity. Alternatively, a notebook, tablet, or cell phone can be connected through WiFi in a public café, offering similar anonymity as any public payphone or phone booth.

Some OTT carriers have chosen to operate a VoIP phone service as a payphone, with no identity verification of its subscribers. For example in a recent online report (http://money.cnn.com/2015/11/17/technology/isis-telegram/) CNN Money revealed "An app called Telegram is the 'hot new thing among jihadists". Research confirms the Telegram application was instrumental in ISIS terrorists secretly planning its attack on Paris. In the article "Telegram founder knew Isis was using the app to communicate before Paris attacks," (http://www.independent.co.uk/life-style/gadgets-and-tech/news/telegram-knew-isis-communicate-paris-pavel-durov-a6742126.html), Telegram founder Pavel Durov said: 'The right for privacy is more important than our fear of bad things happening, like terrorism'.

Another example of privacy and anonymity being used to commit crimes reported in the press is that of BitTorrent—an application and data network often used to illegally download or share copyrighted material. In the news story by CNN Money Tech (http://money.cnn.com/2011/06/10/technology/bittorrent_lawsuits/) entitled "50,000 BitTorrent users sued for alleged illegal downloads" users were reportedly sued under new anti-piracy laws for illegally downloading the move "The Hurt Locker" and other copyrighted material. The network operator BitTorrent has taken the payphone position that they are not responsible for what people do using their network for their private activities. Freedom of speech advocates support this position while law enforcement and governments, national security, and IP rights advocates abhor this attitude as reckless and irresponsible. Regardless of the politics of the matter, as long as communication systems are incapable of performing caller verification, the discussion to stop anonymous calling is purely academic.

Caller verification and authentication is especially important for corporations and business enterprises to control access to company confidential data including intellectual property, engineering developments, product evaluations, manufacturing knowhow, confidential financial reports and projections, business status, sales forecasts, inventory and WIP, quality audits, business and IP contracts, customer lists, employee records, and other trade secrets. When accessing company communications, the access privileges granted any employee, contractor, or officer depends on confirming their identity. In conference calls including investor calls, identity verification is important to confirm who is present on the call and to insure that no one is listening without their need-to-know.

Ironically, while caller verification can be used to thwart criminals and deter corporate espionage, the same identity verification is beneficially useful to insure a caller's privacy. If both parties in a call or text chat confirm their identity through some prescribed authentication procedure, imposters have no access to a call or its data, protecting the call from criminal attacks.

Lastly, a distinction must be made to distinguish anonymous callers from anonymous calls. An anonymous caller is an individual who disguises their true identity from the network on which they are communicating. An anonymous call, however, does not require the caller has anonymity from the network, just that their true identity during communication is obfuscated in the call data packets. A registered account holder on the SDNP network can, in accordance with this disclosure, place a call or send data using anonymous data transport even though the network knows their identity and phone number. In this way, law-abiding citizens can communicate anonymously without the need to hide their identity from the SDNP network operator. If a caller is engaged in normal private calls, entertainment, or business, their SDNP call remains private and secure even though the network knows their identity as stored in the SDNP name server database.

Examples of the need for legal anonymous communication includes global gaming where it is important to protect a gamer's identity, especially that of children. Another case potentially benefitting from anonymity is in vehicle-to-vehicle (V2V) communication to prevent drivers with road rage from exacting revenge by identifying the personal data of other drivers aggravating their driving. In contrast, if a caller is engaged in criminality or other nefarious activity in their communication, law officials can (in accordance with applicable law) gain access to their calls and data transmissions. In this manner the network operator can satisfy the requirements of court orders and subpoenas without exposing the identity or opening the calls of law abiding citizens.

In summary, using the disclosed SDNP communication methods, only identifiable SDNP subscribers can place anonymous calls. Unidentified callers have no access to the SDNP network or ability to place anonymous calls.

National Security and Privacy—

The nature of secure and private communication is further confounded when the roles and laws of governments are considered. Every country asserts their sovereign right to control communications within their borders. With the advent of the Internet and dynamically routed packet switched data networks, however, network surveillance and monitoring faces a plethora of technical and legal challenges. One concern is the issue of monitoring server-to-server network "through" traffic—data packets crossing through a country without ever stopping. Since Internet traffic is dynamically routed, a network operator has no idea what data packets its network of servers is carrying. Any nation can, of course, attempt to intercept and decode this high-volume bulk data, but because of encryption, access without knowing the encryption keys is challenging, especially for real time monitoring. And because the callers may not reside within the country, a particular nation has no jurisdiction to subpoena or demand the encryption keys used to place the call. Such network through-data is analogous to radio wave traffic traversing the earth's atmosphere. Even though the radio waves may pass overhead, there is no practical way to stop them. Similarly, except by totally isolating a country's infrastructure from the Internet, there is no realistic way to stop network through-data traffic.

A more pragmatic solution to governing communications is to focus monitoring on Last Mile communications, i.e. to intercept and monitor calls and call data where the source and/or destination of a call occurs within a country's borders. This approach has several advantages over intercepting bulk through-data traffic including (i) the magnitude of the data is smaller, i.e. more manageable to analyze, (ii) the last mile communication carrier or network operator is subject to the laws of the country in which it resides (iii) the last mile carrier or network operator may be subpoenaed to surrender any available encryption keys, (iv) the device of the caller must electronically "register" itself to connect to the last mile network and in so doing relinquish information about the caller, and (v) the location of any network connected device can be determined using network addresses, GPS data, or radio signal triangulation.

Unlike the legal and technical challenges of enforcing network through-data regulation, the laws governing Last Mile communication and call termination are wholly the right of the nation in which the Last Mile network operator resides. Depending on the privacy laws of a nation, a nation's government can insist on the level of access it requires in Last Mile communications, including combinations of the following:

- No right to monitor any data or calls without a court issuing a subpoena based on probable cause. With a court order, the right to secretly monitor any call or data communication.
- The right to monitor metadata of any call without a court order.
- The right to monitor all calls and data communications without a court order.
- The right to intercept, monitor, and as needed, block any and all communications.

For example, various governments such as the United States have taken the position they reserve the right to monitor "metadata" of calls without a court order. Metadata includes data packet information regarding who is calling who, how long the call lasted, where the callers were located at the time of the call, etc. without actually accessing the call data itself. In essence, metadata comprises the data header of an IP packet but not its payload. In contrast, the monitoring of calls and data communication involves access to the payload itself, not just the header data. In such cases where the payload may be encrypted, the government may insist on the network operator supplying it with master encryption keys, should they exist. One issue raised by privacy advocates, is government abuse of power. Specifically should a network rely on a single set of master encryption keys, then relinquishing these keys in response to a court order to enable government surveillance of a specific individual in fact allows the government to monitor everyone's calls, even if the court order was limited to an individual or group. This issue is sometimes referred to as the quandary "who should police the police?"

Another consideration concerns the privacy rights of individuals placing an international call. In such cases, the callers should be aware that the relevant laws for government access depends on the location of both callers, i.e. where the two last-mile networks occur. A call from the United States to the China would be subject to US law for the caller in the United States and to Chinese law for the other caller in China. In such situations, call access by one government may be greater than the other. As such, a caller in the country with greater privacy rights may consider their privacy violated by the other country's government, but since they called that country they have no legal grounds for complaint.

In the case of communication using the previously disclosed secure dynamic communication network and protocol, interception of through-data in HyperSecure cloud communication of fragmented scrambled dynamically encrypted data packets transported anonymously across the SDNP network is virtually impossible. As such, the privacy and security of a Hyper-Secure call are determined by the device and by Last Mile communication. By adapting disclosed SDNP methods for Last Mile communication, a Last Mile capable of HyperSecure communications and high-integrity privacy can be realized as disclosed herein.

Furthermore, mechanisms adjusting the SDNP network's security and privacy settings to accommodate the local law governing Last Mile communication for each nation are disclosed. These methods include safeguards enabling an authorized security authority to monitor communication pursuant to law and court actions without exposing the call data to hackers and cyber-criminals. As such, in HyperSecure Last Mile communication disclosed herein, the use of "back doors" vulnerable to cyber-attacks is not employed.

HyperSecure Last Mile Communication Methods & Apparatus

To ensure end-to-end HyperSecurity, the application of the methods disclosed previously for encrypted scrambled anonymous fragmented data packet routing within a SDNP cloud must similarly be adapted for communication within the Last Mile. Securing Last Mile communication is particularly problematic because the data may be carried on networks not hosted by the SDNP operator, packet routing may involve conventional IP packet routing, and the last mile network's intrinsic security may be unknowingly compromised by a cybercriminal, possibly complicitous with a last mile network operator.

In accordance with this invention, Last Mile communication necessarily involves the transport of IP datagrams outside of the data cloud network using a packet format different from data packets within the SDNP cloud. As illustrated in FIG. 10, the SDNP cloud comprising servers 1201 (represented schematically by soft-switch enabled SDNP nodes $M_{0,0}$ through $M_{0,f}$) transports VoIP, video, text, and data using SDNP datagrams shown in exemplary data packets 1222B, 1222C, and 1222F. An SDNP datagram contains SDNP Layer 3 source and destination addresses, not Internet IP addresses. SDNP addresses differ from IP addresses in that they are recognizable only by SDNP name servers or other servers performing the function of SDNP name servers, and not the Internet's DNS name servers.

As described in the above-referenced U.S. application Ser. No. 14/803,869, SDNP packets change dynamically as they move through the network, with updated routing addresses and constantly changing payloads performed in accordance with shared secrets and dynamic "states" (such as time). For example, data packet 1222B sent by node $M_{0,0}$ comprises Layer 3 SDNP datagram B with unique SDNP addresses and uniquely encrypted payload. Downstream, data packet 1222C output from node $M_{0,1}$ comprises Layer 3 SDNP datagram C with different SDNP addresses and a re-encrypted payload. Several tens of milliseconds later, the same payload reaches node $M_{0,f}$ which processes the data and forwards data packet 1223G comprising IP datagram G over the Last Mile.

Since the changes are performed in accordance with defined states, the original packet data can be recovered by performing a series of anti-function operations executed in the inverse order to which they were performed. For example, the SDNP functional sequence comprising the steps of scrambling, junk insertion (deception), and encryption can be undone by the inverse sequence decryption, junk deletion, and unscrambling, provided the same state used to execute the function is invoked to perform the corresponding anti-function. State data for a packet may be carried as a time, a seed, or a key either embedded in the packet's payload or sent in advance of the packet. Data transport and processing within the SDNP cloud operate using SDNP cloud specific shared secrets and security credentials. The media nodes sharing a common set of shared secrets and security credentials may be referred to as a security "zone". The zone used for security credentials operating within the SDNP cloud cannot be revealed to any user's communication outside the SDNP cloud. As such, all Last Mile communication must comprise a different SDNP security zone than the SDNP cloud.

In the example shown, server 1201A and server 1201F hosting corresponding nodes $M_{0,0}$ and $M_{0,f}$ operate as SDNP gateways, i.e. they communicate with devices outside of the SDNP cloud as well as with other intra-cloud SDNP nodes. Communication from these gateways to communication devices outside the cloud represents "Last Mile" communication. Accordingly, the gateway nodes must understand the zone security credentials of both the SDNP cloud and the Last Mile network to which they connect, acting as a translator during packet routing. Semantically, the term Last Mile is an abstraction meaning communication outside the SDNP cloud and does not specifically refer to a distance of one mile. Instead the term Last Mile covers any communication between a client device and the SDNP cloud of any distance, regardless of whether the client device is operating as an SDNP client, i.e. running SDNP application software or firmware, or not.

The term Last Mile also applies to both the client device initiating the call and the client device being called. While literally speaking, the caller's data represents the "first mile" of the call rather than the last—the distinction between first and last miles is arbitrary. Specifically, in any duplex conversion or in any IP communication "session", the device receiving the call necessarily responds to the call or session request by sending a reply to the caller. In any two-way communication, the first mile connection is therefore invariably functioning as the last mile in the reply data path. In essence the first mile for the caller is concurrently the last mile for the response. As such the defined term Last Mile is used to throughout this application to mean both the first mile and last mile, regardless of which device initiated the call or communication session.

Communication outside of the SDNP cloud to any device other than an SDNP Client necessarily occurs using IP datagrams and not by SDNP datagrams. For example, referring again to FIG. 10, data packet 1223A comprises "IP datagram A" constructed using an SDNP payload with an IP address, not a SDNP address. Similarly, IP datagram G comprises a data packet 1223G containing a SDNP payload routed using an IP address. The IP source and destination addresses represent any IPv4 or IPv6 address recognizable by the network on which it is routed. The IP addresses may comprise Internet addresses recognized by the Internet's DNS servers or alternatively may comprise NAT addresses used for routing across local networks defined by a local network service provider.

Since the hardware and firmware used in Last Mile communication may vary significantly and may include phone lines, fiber communication, cable TV networks, 3G and 4G radio networks, microwave communication towers, and satellites, analysis of Last Mile communication must be considered for a variety of Layer 1 physical networks and their corresponding Layer 2 data link formats employed. Formats may, for example, include analog (POTS), Ethernet, WiFi, 3G, 4G/LTE, and DOCSIS3. The corresponding security and privacy capability of each Last Mile implementation is considered on a case-by-case basis in the following section on SDNP "call out" communication.

SDNP Call Out Over Unsecured Lines—

As a term of art, any call leaving a defined network to be transported across a separate (and generally dissimilar) network is commonly referred to as a "call out", a term meaning data or voice leaves one network to be transported on another. For example, communication within between clients running Skype applications is commonly referred to as a Skype call, but placing a call from a Skype client to a regular or cell phone number is referred to as a Skype call out feature, or "Skype out" call. In general, call outs to regular phones involve some additional cost, either as a subscription or as a pay-per-use fee.

Figure 11:
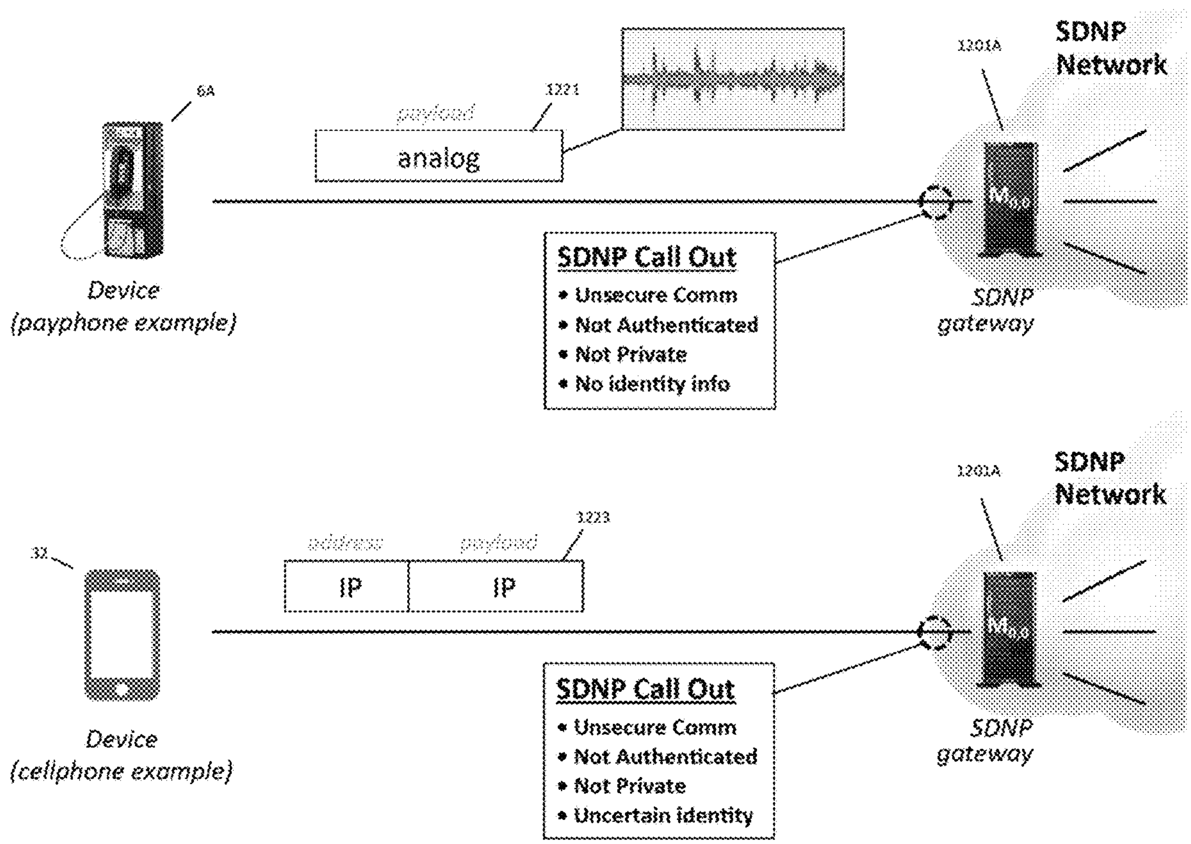
FIG. 11 schematically represents examples of unsecure last mile communication without identity verification.

In the context of this disclosure, communication from the SDNP cloud over an unsecured Last Mile connection to any device other than an SDNP Client is herein referred to the defined term "SDNP Call Out". FIG. 11 schematically represents two examples of SDNP Call Out routing onto an unsecure Last Mile. In the upper example communication occurs using analog signals to an analog device such as a telephone or payphone 6A. In such cases the SDNP gateway has to include a digital-to-analog converter. Otherwise, a modem or conversion device may be added at the gateway. The information is carried by an analog signal 1221, not a data packet. Analog phone signals, while efficient for carrying voice, are not well equipped for high-speed data communications.

In the lower case, the SDNP Call Out occurs across a digital network to any digital device (such as cell phone 32) not enabled as an SDNP client, i.e. not enabled with SDNP software or firmware. In such cases, data packet 1223 carries the call or data, generally using in accordance with Internet protocol, i.e. IP packet format consistent with the 7-layer OSI model. The IP datagram includes IP or NAT addresses in its source and destination address fields, and IP or VoIP data as its payload. The digital path may involve various forms of digital data such as Ethernet, WiFi, or 4G/LTE that vary along the Last Mile connection.

In either of the exemplary schematics, because the Last Mile communication data is carried outside of the SDNP network over an unsecured communication channel or network, then the call is not secure and is subject to hacking, spying, wire tapping, and other cyber assaults. As described in the background section of this application, unsecured lines and connections for the Last Mile, whether twisted-pair copper wires, coax cable, fiber, Ethernet, WiFi, cellular, or satellite, are intrinsically not secure unless special security methods such as encryption are inserted in the end-to-end data path. The security of the most secure data cloud or VPN is therefore compromised by its weakest link—in this example, the Last Mile. Even encryption does not guarantee security, especially on a single well-defined electrical, microwave, or radio wave connection. In addition to lacking security, the schematic examples do not include any mechanism for identity verification. Incapable of authentication, the Last Mile has no guarantee of privacy. The exemplary schematics therefore represent unsecure Last Mile networks lacking caller privacy.

Figure 12:
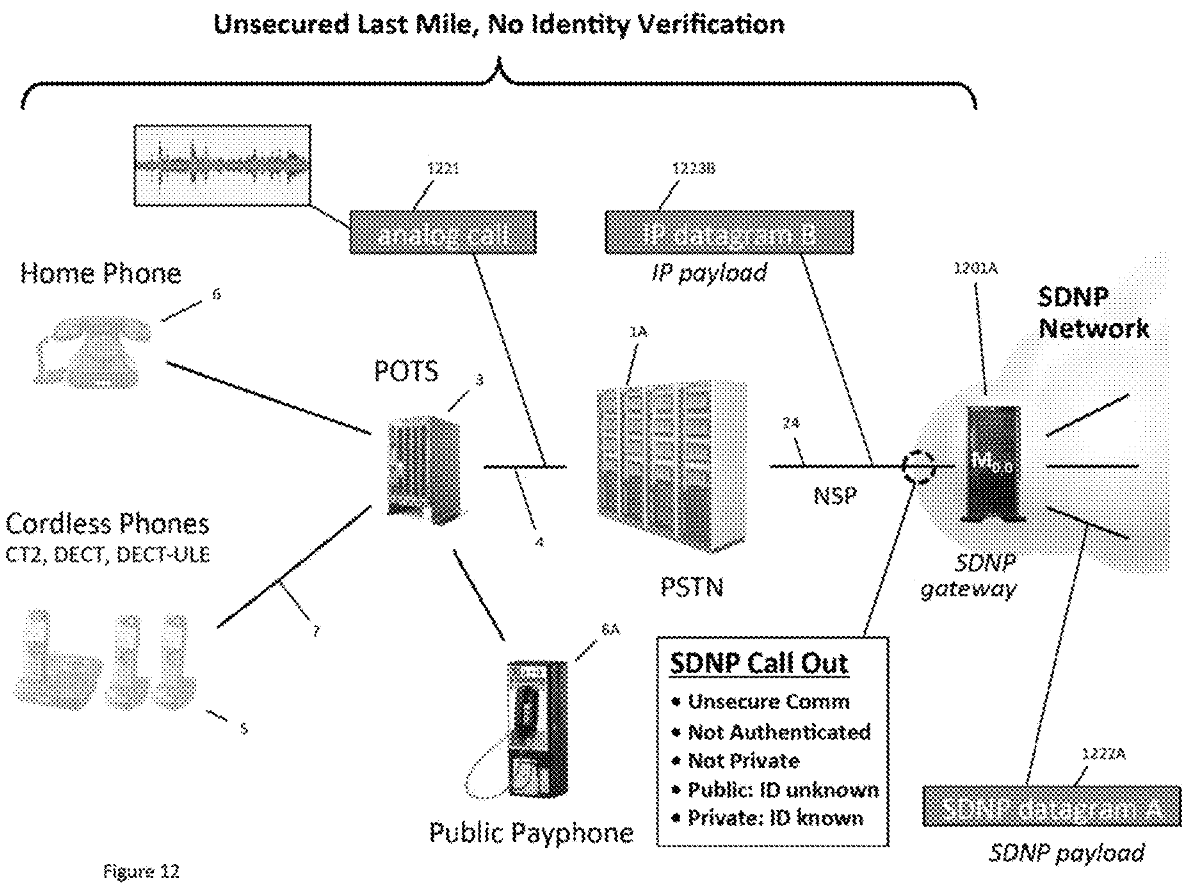
FIG. 12 illustrates unsecure last mile communication over a plain old telephone system (POTS) lacking identity verification of callers.

FIG. 12 illustrates a SDNP gateway 1201A executing a SDNP call-out to an unsecured Last Mile lacking privacy, connecting to a public switched telephone network or PSTN gateway 1A over digital network service provider NSP hosted wired or fiber link 24. The PSTN gateway 1A then is routed to a plain old telephone system POTS switch 3 over an analog communication connection 4. POTS switch 3 then places conventional phone calls over twisted copper pair wire 7 to home phone 6, to cordless phone system 5, or to payphone 6A. The entire Last Mile is neither private nor secure. Although communication of data packet 1222A containing SDNP datagram-A uses SDNP addressing and SDNP payloads within the SDNP network, once the data enters the Last Mile the HyperSecurity benefits are lost. For example, data packet 1223B comprising IP datagram B carried by NSP network hosted wired or fiber link 24 employs conventional IP addressing recognizable by Internet DNS servers and contains a conventional IP payload sniffable in by any cyber-pirate. Analog lines 4 and 7 are equally vulnerable as they carry simple analog audio signals as analog call data 1221. Although the SDNP gateway can support unsecured non-private call outs, it is ill-advised to connect SDNP secured calls to unsecure Last Mile networks lacking privacy provisions.

Figure 13:
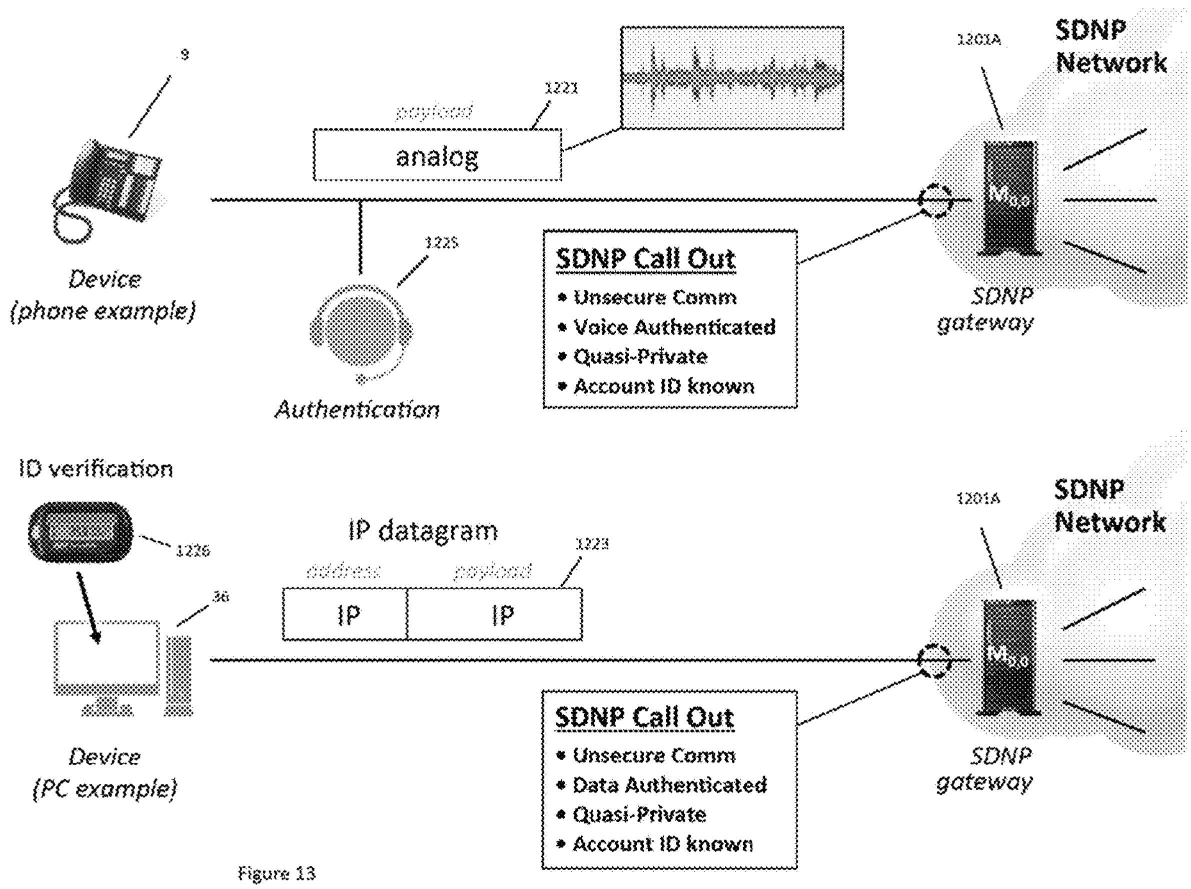
FIG. 13 schematically represents examples of unsecure last mile communication with identity verification.

A slight improvement to the aforementioned unsecured Last Mile implementation can be achieved using identity validation. FIG. 13 schematically illustrates examples of SDNP Call Out routing onto an unsecure Last Mile but with two different types authentication. The upper example illustrates a SDNP Call Out from SDNP gateway 1220A over an analog or POTS line to a business office desktop phone 9. As shown, operator 1225 performs authentication manually to confirm the account holder's identity and to confirm their account ID. Although authenticated, the call carried by analog sound 1221 is unsecure, and remains private only if no secrets or account information is revealed aurally in the conversation, i.e. if no secrets are revealed the information is private but if information is revealed then the communication is no longer private. As such, the term quasi-private is used herein to refer to authenticated communication over unsecure lines, i.e. conditionally private communication.

The lower schematic illustrates an SDNP call-out from SDNP gateway 1220A onto an unsecured digital Last Mile. Data carried by IP datagram 1223 to an electronic device such as desktop PC 36, while unsecured, can be authentication using an electronic ID verification method such as token 1226 to which a cyber-attacker does not have access. Because the line is unsecure and sniffable, care must be taken in the digital dialogue not to reveal account numbers or confidential data.

Figure 14:
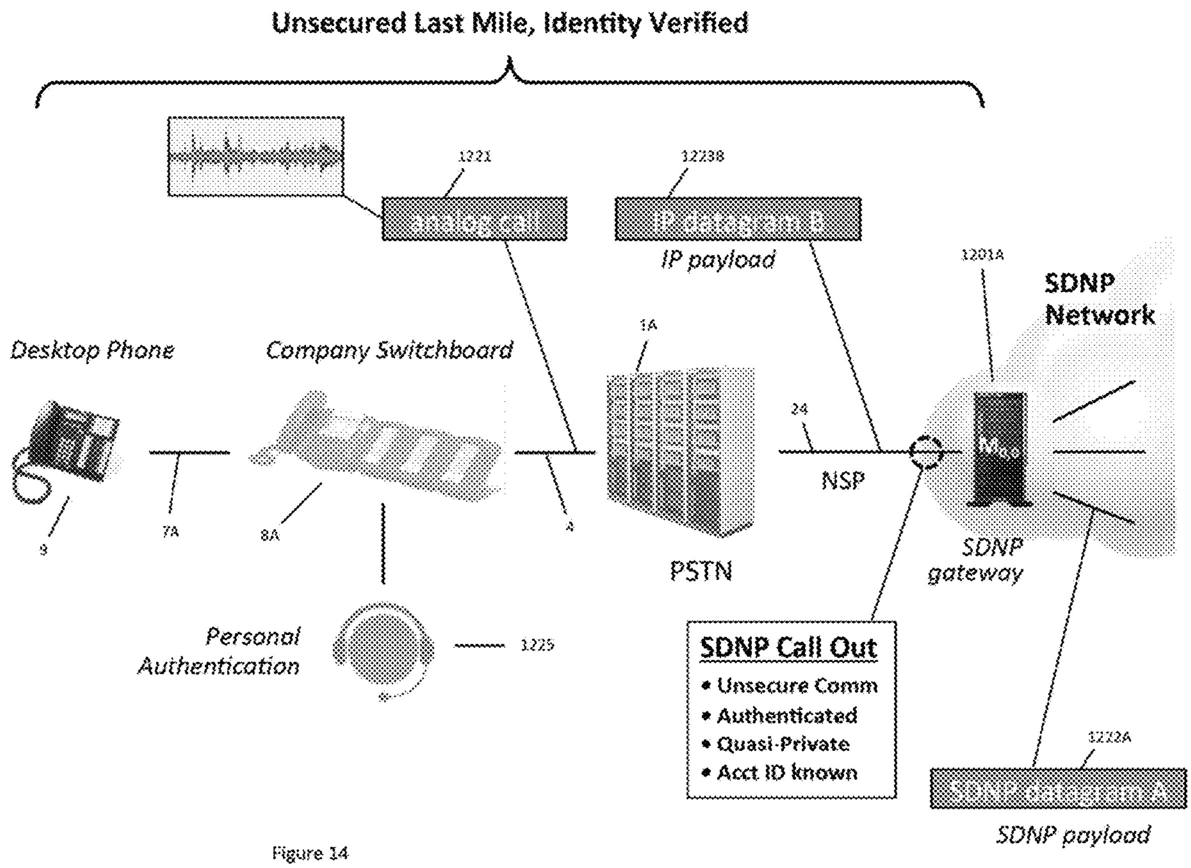
FIG. 14 illustrates unsecure last mile communication over an analog public service telephone network (PSTN) with operator-based identity verification.

Specific examples of quasi-private unsecured calls are shown in several examples to follow. In FIG. 14, identity verified unsecured Last Mile communication is illustrated between the SDNP network and an office desktop phone 9, for example a private banker's phone. The account holder's call, if placed internationally for example, would be routed across the globe using HyperSecure communication in the SDNP network and finally connected to the Last Mile as an SDNP call out through SDNP gateway 1201A. The long distance portion of the call occurs using dynamically changing SDNP datagrams such as data packet 1222A containing SDNP datagram A with a SDNP payload. Data packet 1222A is then converted by SDNP gateway 1201A from SDNP datagram A into IP datagram B shown by data packet 1223B. Unlike SDNP datagram A, IP datagram B contains a sniffable IP payload. Data packet 1223B is transported by network service provider (NSP) operated wired or fiber link 24 to public switched telephone network or PSTN gateway 1A. This gateway in turn is connected to company switchboard 8A over POTS line 4 carrying analog call 1221. Company switchboard 8A connects to desktop phone 9 over analog private branch exchange or PBX line 7A to desktop phone 9 and also to personal authentication operator 1225. During the call, the account holder contacts the private banker on desktop phone 9 but before they can commence engaging in any transactions, personal authentication operator 1225 joins the call to confirm the identity of the caller, and thereafter leaves the call so that the caller's privacy is maintained. Because the call is not secure however, care must be taken by both the private banker and the account holder not to verbally reveal confidential information such as account numbers, passwords, or PINs. As such the call is quasi-private, i.e. conditionally private.

Figure 15:
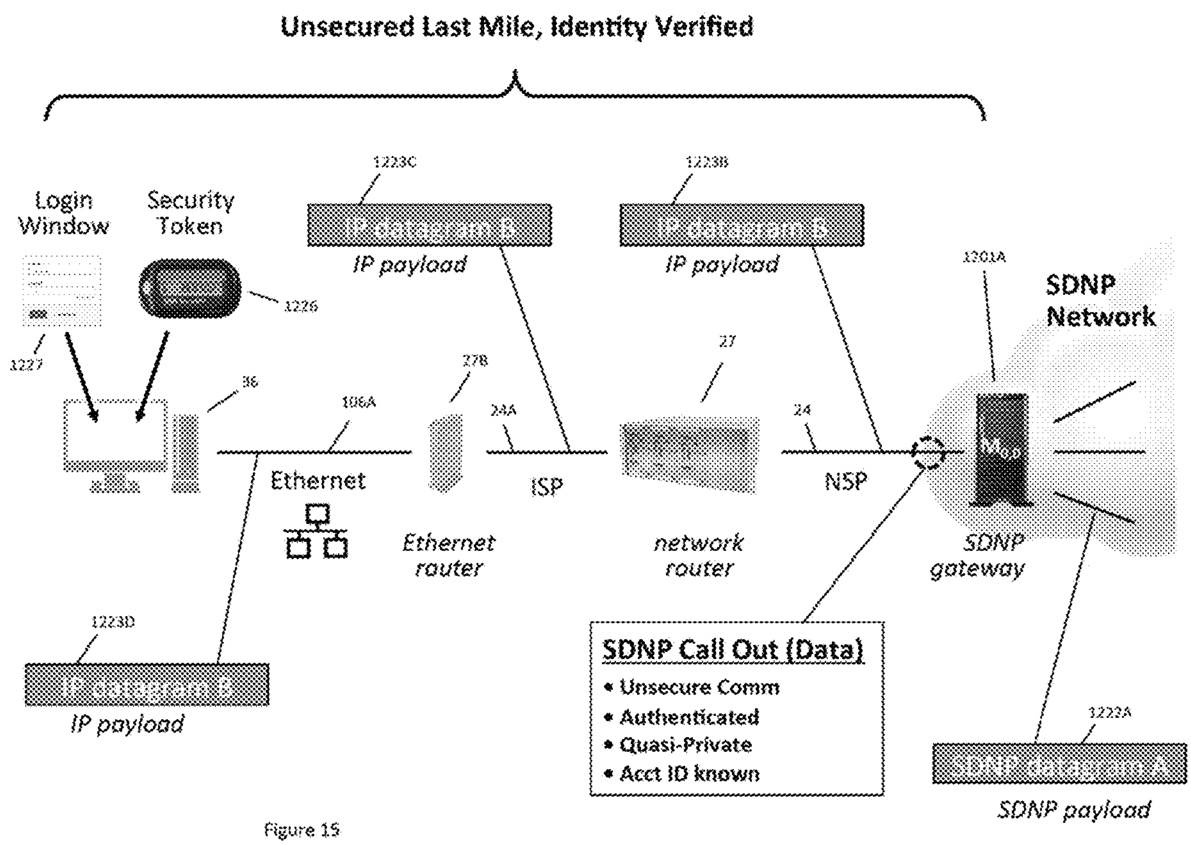
FIG. 15 illustrates unsecure last mile communication over a wireline digital network with login- or token-based identity verification.

In FIG. 15, identity verified unsecured Last Mile communication is illustrated between the SDNP network and desktop computer 36. In a digital communication session, desktop computer 36 communicates to SDNP gateway 1201A using IP datagram B carried over several digital mediums. In the first leg, Ethernet 106A carries data packet 1223D comprising IP datagram B from desktop computer 36 to Ethernet based local router 27B. The Ethernet local router in turn communicates to network router 27 over Internet service provider (ISP) wired or fiber link 24A using data packet 1223C comprising IP datagram B. Network service provider line NSP operated wired or fiber link 24 carries data packet 1223B comprising IP datagram-B on the final leg of the Last Mile between network router 27 and SDNP gateway 1201A. Because IP datagrams are employed, the Last Mile is unsecure. Digital methods for ID verification such as login window 1227 and security token 1228 can be used for authentication to insure communications remain quasi-private. These digital authentications must be limited to single use to prevent use by imposters. For example, once a token generates a number and it is used to gain access, the combination is no longer valid for use so if a hacker intercepts the token, it's useless because it expired and is no longer valid.

Figure 16:
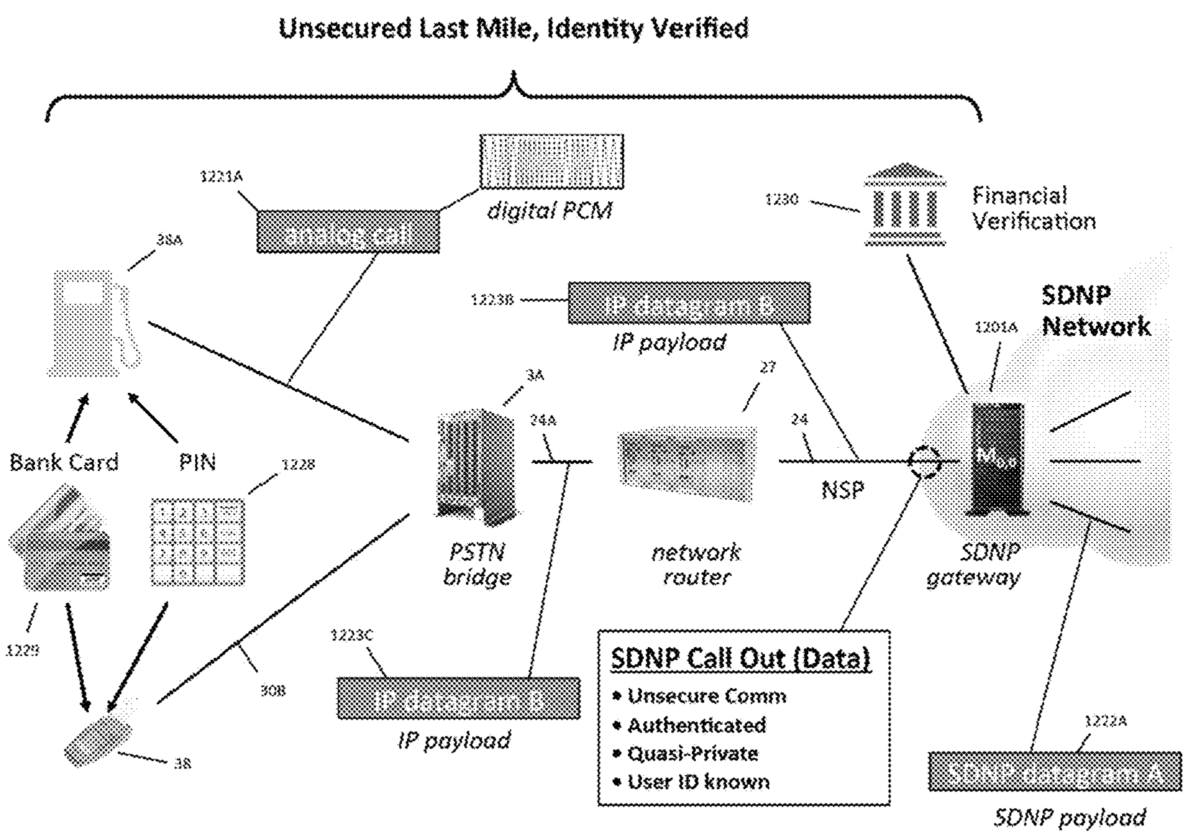
FIG. 16 illustrates unsecure last mile communication over a wireline analog network with PIN- or credit-card based identity verification.

Other examples of identity-verified unsecured Last Mile communication are illustrated in FIG. 16, where SDNP gateway 1201A communicates as a SDNP call out with point of sale (POS) terminal 38 and gas pump POS terminal 38A. Last Mile communication as shown is an amalgamate of digital and analog connections including NSP wired or fiber link 24 carrying data packet 1223B comprising IP datagram B to network router 27, followed by wired or fiber link 24A carrying IP datagram B within data packet 1223C to PSTN bridge 3A, and POTS or analog lines 30B carrying digital PCM (pulse code modulated) data as analog calls 1221A connected to point of sale (POS) terminal 38 and gas pump POS terminal 38A. Authentication in financial transactions is based on bankcard data 1229 which may include smartcard integrated circuit based electronic validation and by dynamic PIN 1228. Authentication involves confirmation with financial institution 1230 connected to the SDNP network either through SDNP gateway 1201A or through a different Last Mile.

HyperSecure Last Mile Communication—

Figure 17:
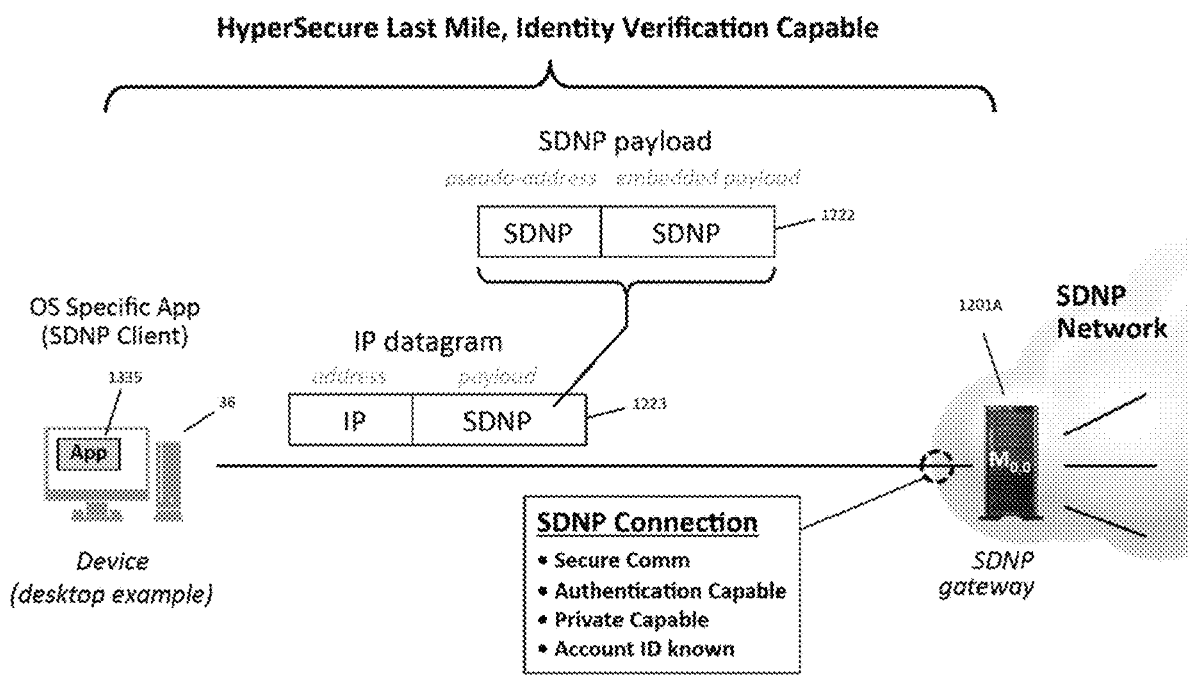
FIG. 17 schematically represents examples of HyperSecure last mile communication capable of supporting identity verification.

By adapting techniques of the secure dynamic communication network and protocol, HyperSecure communication can be achieved over the Last Mile. To facilitate HyperSecurity, the connected device must execute SDNP code as a "SDNP client". The SDNP client comprises operating instructions, shared secrets, and SDNP connectivity information, hosted on the connected communication device. The SDNP client may comprise software running on an operating system, firmware running on a microcontroller or programmable IC, or in a dedicated hardware or integrated circuit. FIG. 17 schematically represents an example HyperSecure communication over the Last Mile using a "SDNP connection". As shown, SDNP gateway 1201A connects to a device running a SDNP client, in this example SDNP app 1335 running on desktop computer 36. The SDNP client is hardware and operating system specific. For mobile devices separate apps are required for different mobile device platforms using Android, iOS, and Windows Mobile. Similarly, distinct OS-specific applications are required for notebooks, desktop PCs, and servers including Windows 10, MacOS, Unix and Linux, etc. Hardware hosting of SDNP clients in devices lacking higher-level operating systems such as POS terminals, hotspots, IoT, etc. must be adapted to the programmable device executing the code. Programmable integrated circuits frequently require programming in a chip-specific development environment unique to the IC's vendor, e.g. Qualcomm, Broadcom, Intel, AMD, NVidia, Microchip, etc.

Because the SDNP gateway 1201A and the SDNP app 1335 communicate using a SDNP payload 1222, caller identities and call payloads are incomprehensible to packet sniffing, specifically the SDNP payload 1222 contains source and destination SDNP pseudo-addresses unrecognized by DNS servers and the payload comprises SDNP data that may be scrambled, fragmented, mixed with junk data insertions, and dynamically encrypted. SDNP payload 1222 is embedded in IP datagram 1223, which directs routing over the Last Mile using IP addresses or NAT addresses of the cellular, cable, or ISP carrier's network used for Last Mile connectivity rather than an SDNP address.

Another aspect of SDNP based HyperSecure Last communication, is that any SDNP client is intrinsically capable of authentication and identity verification. Privacy features, therefore are not based on the network's ability to achieve privacy to support AAA, but whether not the client software or firmware are designed to facilitate the verification process. Because any HyperSecure Last Mile is identity verification capable, it should be understood that the following HyperSecure Last Mile examples apply both to private and non-private secure communication. So unlike unsecure last mile networks with quasi-privacy features, private communication over a HyperSecure Last Mile is determined by the SDNP client, not the network, and capable of supporting any degree of single-factor or multi-factor authentication procedure desired by the client.

Figure 18:
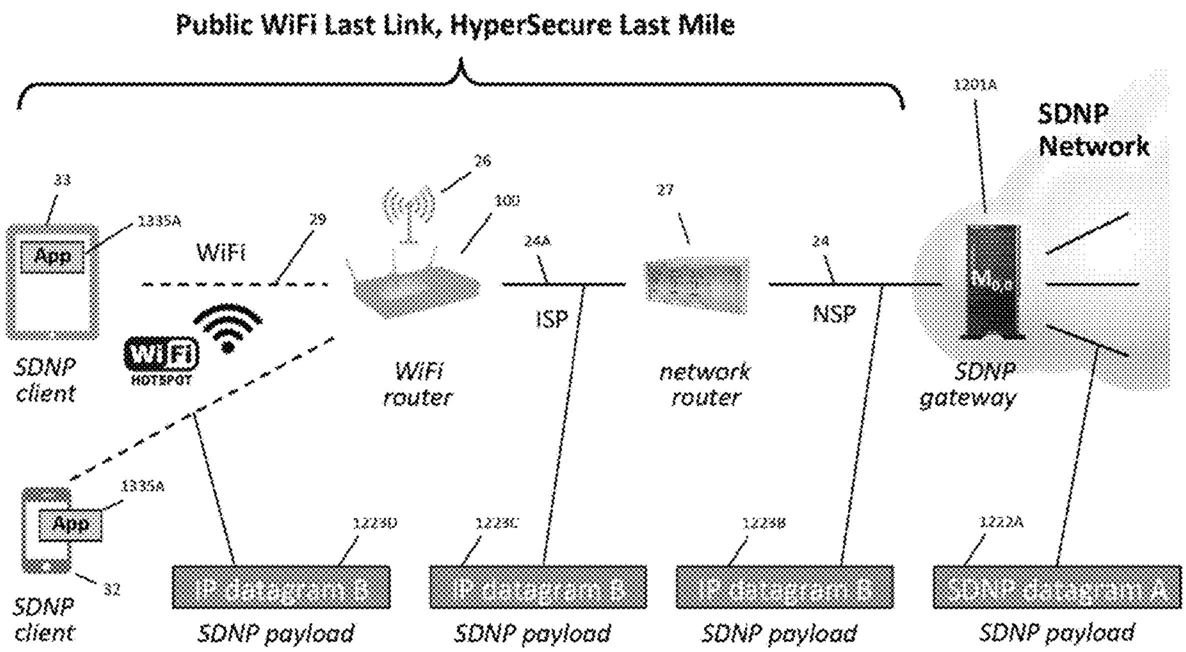
FIG. 18 illustrates identity-verifiable HyperSecure last mile communication over a WiFi wireless network.

Specific examples of HyperSecure calls are shown in several examples to follow. In FIG. 18, HyperSecure Last Mile communication is illustrated between the SDNP network and various cellular mobile devices with a WiFi Last Link. As shown, data packet 1222A comprising SDNP datagram A and containing a SDNP payload is converted by SDNP gateway 1201A for Last Mile communication into data packet 1223B comprising IP datagram B also containing a SDNP payload. Since the HyperSecure Last Mile utilizes different shared secrets, numeric seeds, encryption keys, and other zone-specific security credentials than the SDNP cloud employs, the SDNP payload in IP datagram B is different than the SDNP payload in SDNP datagram A. In other words, SDNP gateway 1201A translates the SDNP datagrams into IP datagrams by changing the payload from one security zone to another, and by embedding SDNP routing information as source and address SDNP addresses not recognizable by DNS servers.

This zone-specific SDNP payload is next wrapped in an IP datagram packet with an IP header containing last mile network specific IP addresses, either NAT or Internet addresses, to facilitate packet routing between SDNP gateway 1201A and the communicating devices, i.e. tablet 33 and cell phone 32 acting as SDNP clients. Because the intermediate devices in Last Mile routing are not SDNP clients, the construction of the SDNP payload within IP datagram B remains fixed as it travels across the Last Mile. In other words, data packets 1223B, 1223C, and 1223D are identically constructed datagrams, all comprising SDNP datagram B with identical SDNP payloads—payloads that do not change as the packets hops from device to device along the Last Mile. Simply summarized, only an SDNP network node or an SDNP client can reconstruct an SDNP payload embedded in a Level 3 datagram, whether an IP datagram or a SDNP datagram.

As shown, data packet 1223B comprising IP datagram B is carried by NSP operated wired or fiber link 24 to network router 27, followed by data packet 1223C also comprising IP datagram B carried by ISP operated wired or fiber link 24A to WiFi router 26. WiFi router 26 then facilitates Last Link communication using data packet 1223D comprising IP datagram B over WiFi link 29 with mobile devices such as cell phone 32 and tablet 33, both running SDNP app 1335A. As such, these devices function as a SDNP client capable of interpreting the data contained within data packet 1223D comprising IP datagram B, including decrypting, de-junking, unscrambling and mixing the payload's content with data fragments from other data packets to recreate the original message or sound.

Figure 19:
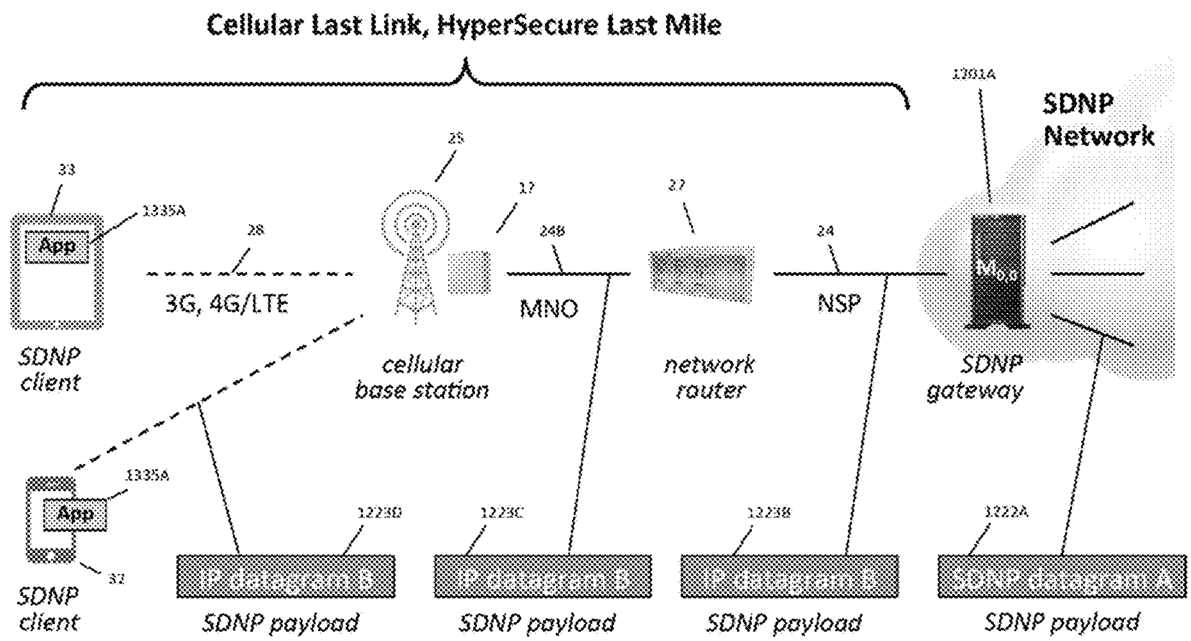
FIG. 19 illustrates identity-verifiable HyperSecure last mile communication over a cellular wireless network.

In FIG. 19, HyperSecure Last Mile communication is illustrated between the SDNP network and various cellular mobile devices with a cellular radio Last Link. As shown, data packet 1223B comprising IP datagram B is carried by NSP operated wired or fiber link 24 to network router 27, followed by data packet 1223C also comprising IP datagram B carried by mobile network operator (MNO) wired or fiber link 24B to cellular base station 17 to create cellular network 25. Cellular base station 17 then facilitates Last Link communication using data packet 1223D comprising IP datagram B over 3G, 4G/LTE cellular link 28 with mobile devices such as cell phone 32 and tablet 33, both running SDNP app 1335A.

As in the previous example, because the intermediate devices in Last Mile routing are not SDNP clients, the construction of the SDNP payload within IP datagram B remains fixed as it travels across the Last Mile. In other words, data packets 1223B, 1223C, and 1223D are identically constructed datagrams, all comprising SDNP datagram B with identical SDNP payloads—payloads that do not change as the packets hops from device to device along the Last Mile.

Figure 20:
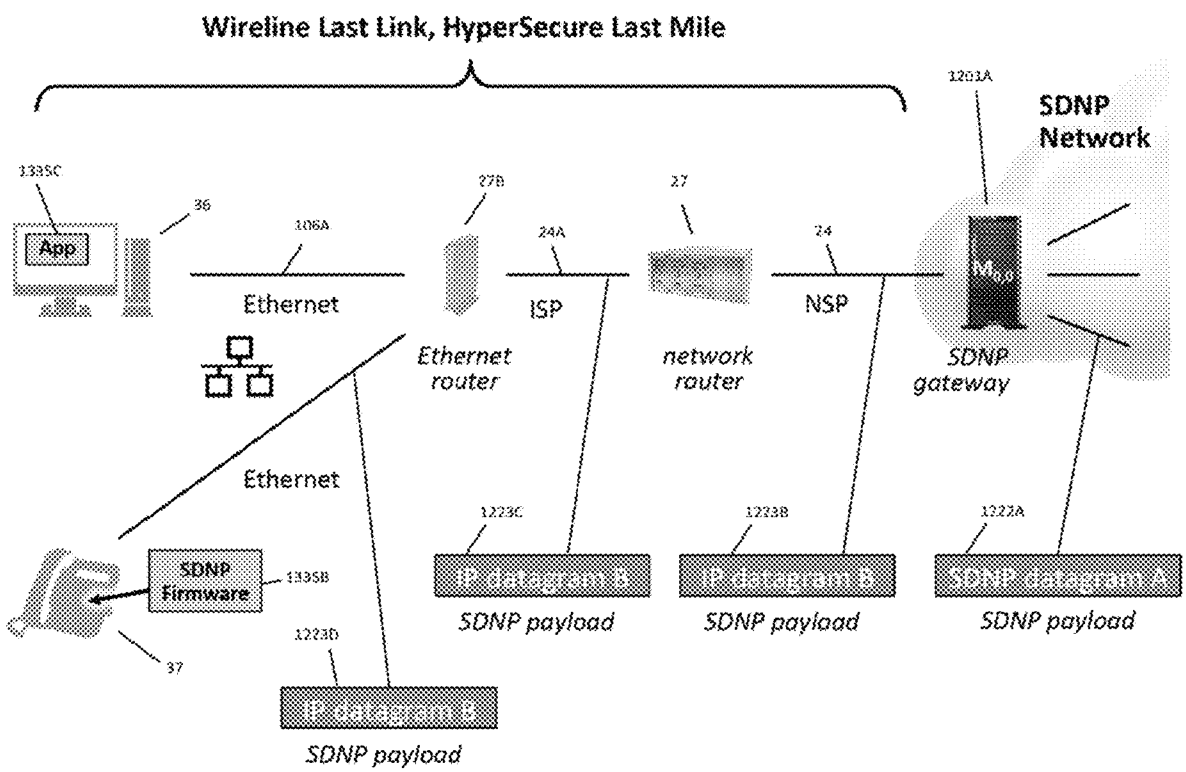
FIG. 20 illustrates identity-verifiable HyperSecure last mile communication over an Ethernet wireline network.

In FIG. 20, HyperSecure Last Mile communication is illustrated between the SDNP network and various tethered (non-mobile) devices with Ethernet Last Link. As shown, data packet 1223B comprising IP datagram B is carried by NSP operated wired or fiber link 24 to network router 27, followed by data packet 1223C also comprising IP datagram B carried by Internet service provider ISP wired or fiber link 24A to Ethernet router 103A. Ethernet router 103A then facilitates Last Link communication using data packet 1223D comprising IP datagram B over Ethernet 106A with tethered devices such as desktop computer 36 running SDNP app 1335C and desktop phone 37 running SDNP firmware 1335B. Absent SDNP network nodes or SDNP clients in the Last Mile, data packets 1223B, 1223C, and 1223D are identically constructed datagrams, all comprising SDNP datagram B with identical SDNP payloads—payloads that do not change as the packets hops from device to device along the Last Mile.

Figure 21:
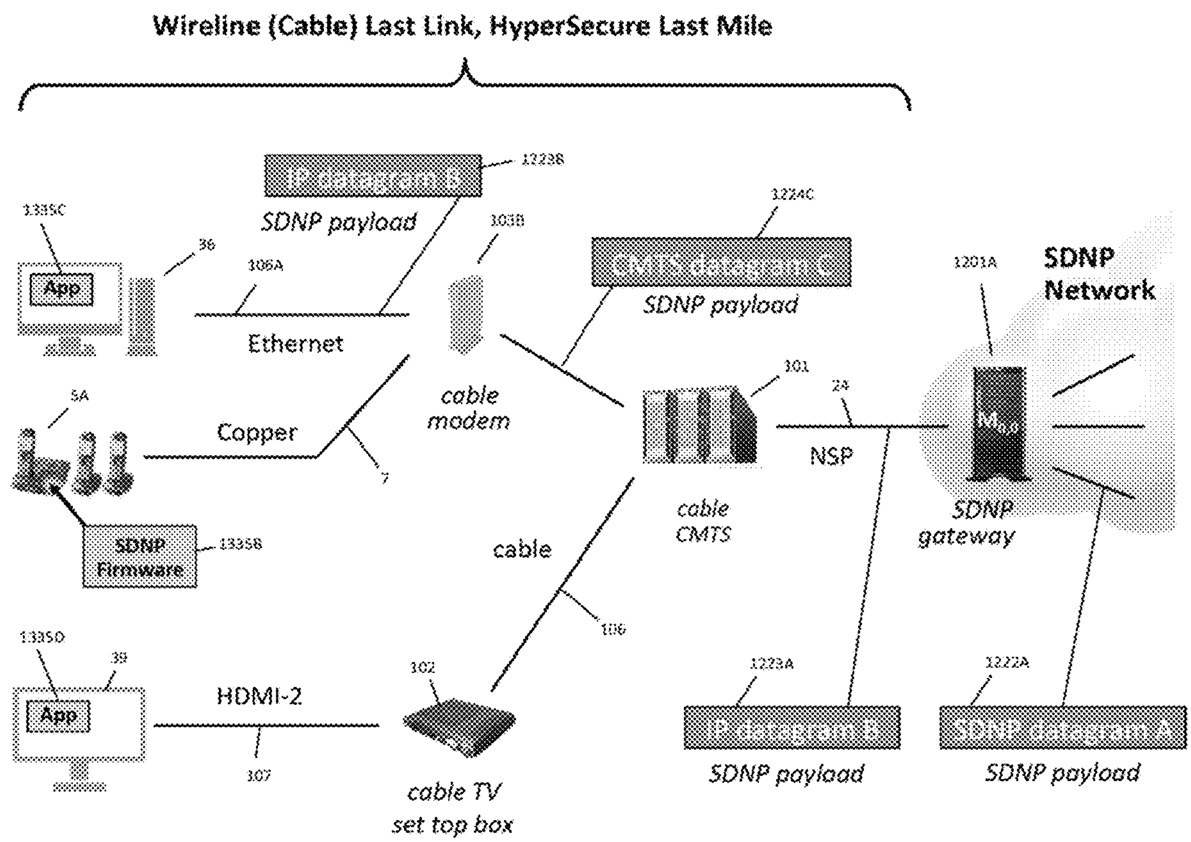
FIG. 21 illustrates identity-verifiable HyperSecure last mile communication over a cable wireline network.

In FIG. 21, HyperSecure Last Mile communication is illustrated between the SDNP network and cable service clients. As shown, data packet 1223A comprising IP datagram B is carried by NSP wired or fiber link 24 to cable CMTS 101, the command, communication and content distribution center of a cable operator. Such cable operators provide broad services such as cable TV, pay-per-view, phone services, Internet connectivity, business services, and more. The CMTS 101 head unit then connects to clients via cable 106 using fiber or coax modulated in accordance with DOCSIS3 and trellis formatting (described in the background section of this disclosure) to optimize bandwidth and real time services. Transparent to clients, the cable operator may maintain the datagram format or alternatively package the IP datagrams into a proprietary datagram format. These data packets, herein referred to as CMTS datagram C, use cable specific NAT addressing, and encapsulate the SDNP payload as n nested payload within the data packet 1224C for delivery on cable 106.

As shown, cable CMTS 101 routes CMTS datagram C to cable modem 103, which in turn extracts the payload data packet 1223B comprising IP datagram B with the unaltered SDNP payload for Last Link delivery. The Last Link to SDNP client enabled devices may occur in several formats including over Ethernet 106A to desktop computer 36 running SDNP client app 1335C, or over copper twisted pair 7 to cordless phone 5A running SDNP client firmware 1335B. Cable CMTS 101 also routes CMTS datagram C to cable modem 103, which in turn extracts the original IP datagram, e.g. IP datagram B, and sends it and other video content to cable TV set top box over cable 106. Cable set top box then forwards IP datagram B and content via HDMI-2 107 to UHD interactive TV 39, running SDNP app 1335D. Alternatively SDNP firmware can be hosted by cable TV set top box 102.

Figure 22:
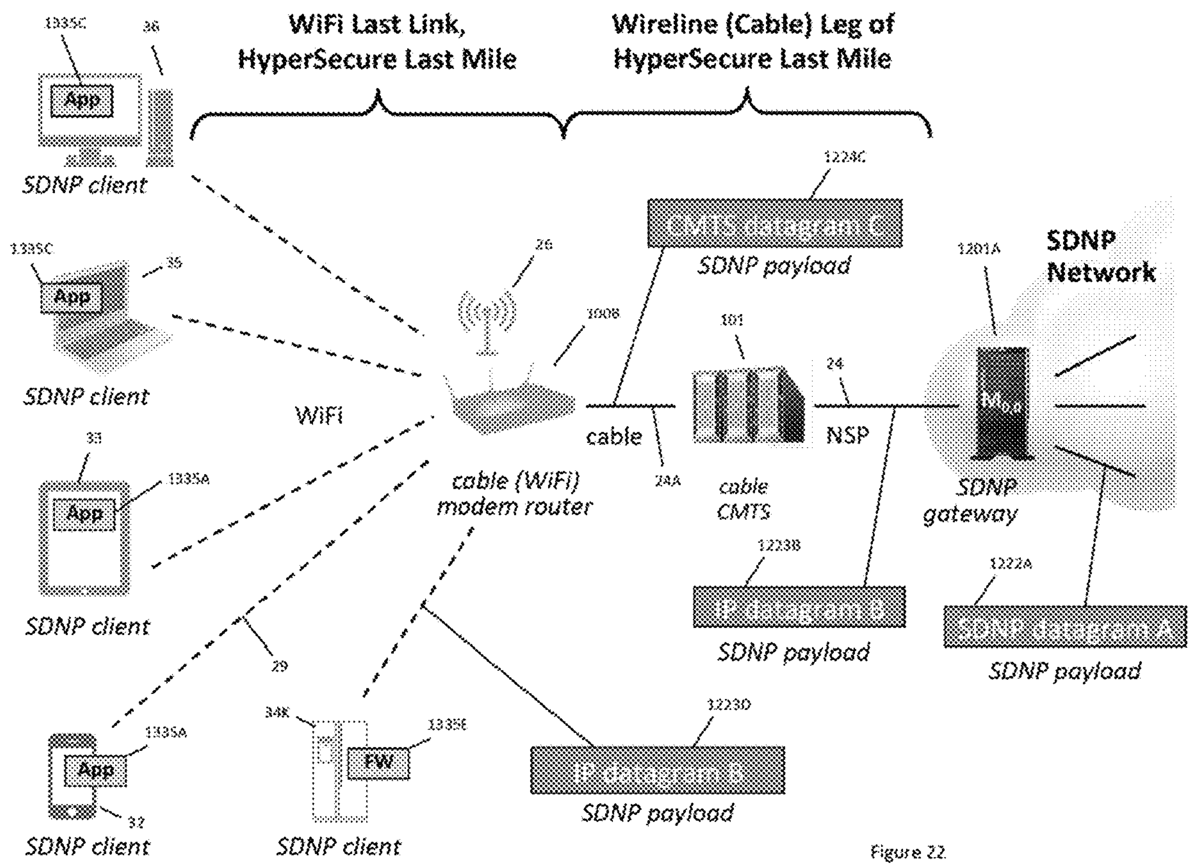
FIG. 22 illustrates identity-verifiable HyperSecure last mile communication over combined cable wireline and home WiFi wireless networks.

In FIG. 22, HyperSecure Last Mile communication is illustrated between the SDNP network and a WiFi home network connected via a cable service provider. As shown, data packet 1223B comprising IP datagram B is carried by NSP wired or fiber link 24A to cable CMTS 101, the command, communication and content distribution center of a cable operator. The CMTS 101 head unit then connects using wired or fiber link 24A over coax or fiber to a specific client's cable (WiFi) modem router 100B to create WiFi access point 26. The routing a data packet 1224C may comprise an IP datagram with Internet addresses or contain a proprietary CMTS datagram C with NAT addressing. The routing between SDNP gateway 1201A and the cable (WiFi) modem router 26 represents the wireline leg of the HyperSecure Last Mile.

The Last Leg in a home network comprises WiFi link 29 connecting cable (WiFi) modem router 26 to various home devices by data packet 1223D comprising IP datagram B wirelessly. To facilitate end-to-end HyperSecurity such devices must operate as an SDNP client either using software or firmware loaded onto the device. For example notebook 35 and desktop computer 36 operate as SDNP clients using computer app 1335C, cell phone 32 and tablet 33 operate as SDNP clients using mobile app 1335A. IoT devices, in this case refrigerator 34K are able to operate as an SDNP client if their control system is loaded with SDNP firmware 1335E. If however, such devices do not or cannot embed the SDNP client's software, end-to-end security must be achieved by other means.

Identity-Paired Last Link Security—

Figure 23:
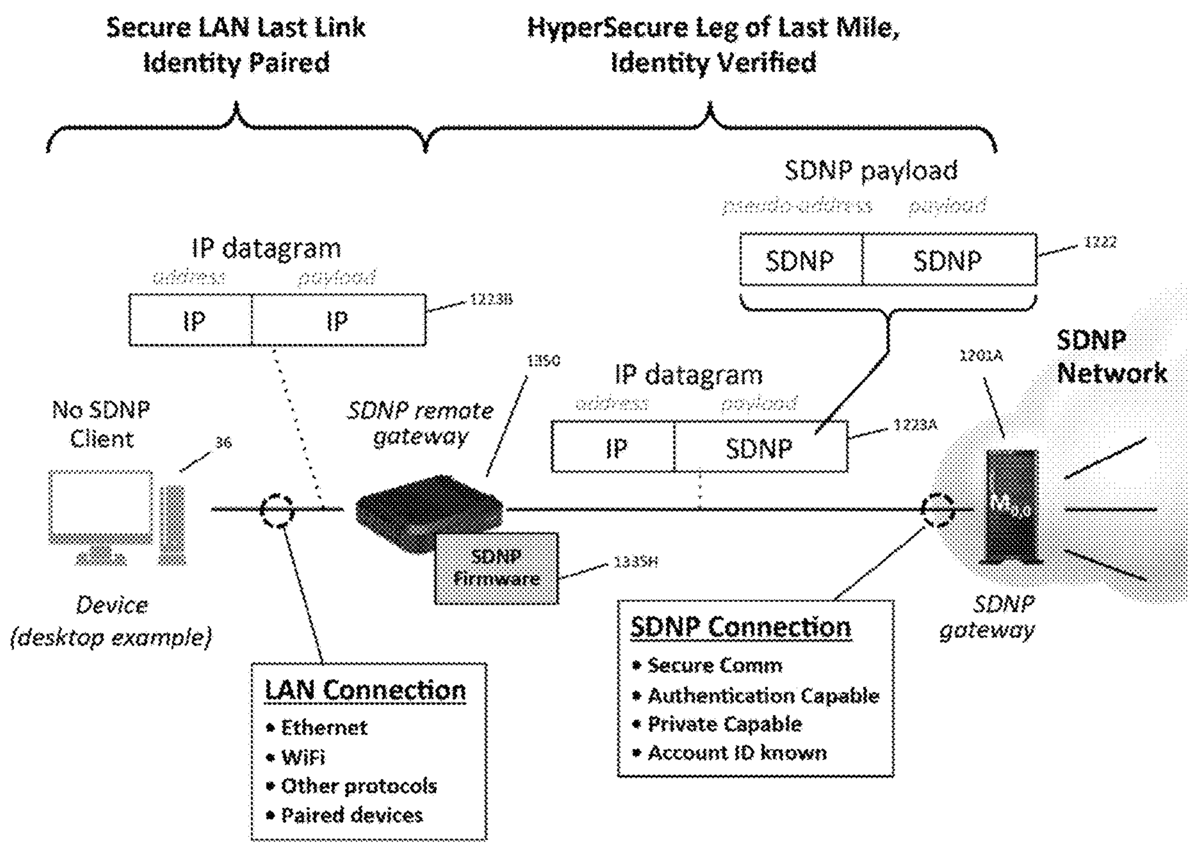
FIG. 23 schematically represents an example of last mile communication comprising an identity-verifiable HyperSecure communication leg connected to an identity-paired secure LAN last link.

In cases when a connected device cannot act as an SDNP client, HyperSecurity cannot be guaranteed end-to-end. In such case, the use of a SDNP remote gateway can extend HyperSecure communication to cover the Last Mile of communication except for the Last Link. If the Last Link, the portion of the Last Mile connecting directly to a communication device, is not enabled as a SDNP host, then Last Link security must be insured through the local area network (LAN) used to facilitate Last Link communication. FIG. 23 schematically represents the use of SDNP remote gateway 1350 in Last Mile communication. SDNP remote gateway 1350 comprises any communication device enabled by SDNP firmware 1335H to function as a remote gateway. As such, a SDNP connection between SDNP gateway 1201A and SDNP remote gateway 1350 comprises IP datagram 1223A including IP or NAT source and destination addresses and SDNP payload 1222. The SDNP payload 1222 includes a SDNP address not recognizable by DNS servers and a nested SDNP payload using Last Mile zone specific security credentials. This SDNP connection is HyperSecure capable of supporting identity verification and caller privacy.

Between SDNP remote gateway 1350 and any connected device other than a SDNP client (such as desktop computer 36), communication is performed by a local area network or LAN connection such as Ethernet, WiFi or other protocols. Security is facilitated by LAN security protocols and device pairing between the communication device and the SDNP remote gateway. Device pairing is the process whereby an authentication sequence between two communicating devices establishes the identity of the two devices, preventing unauthorized access.

Figure 24:
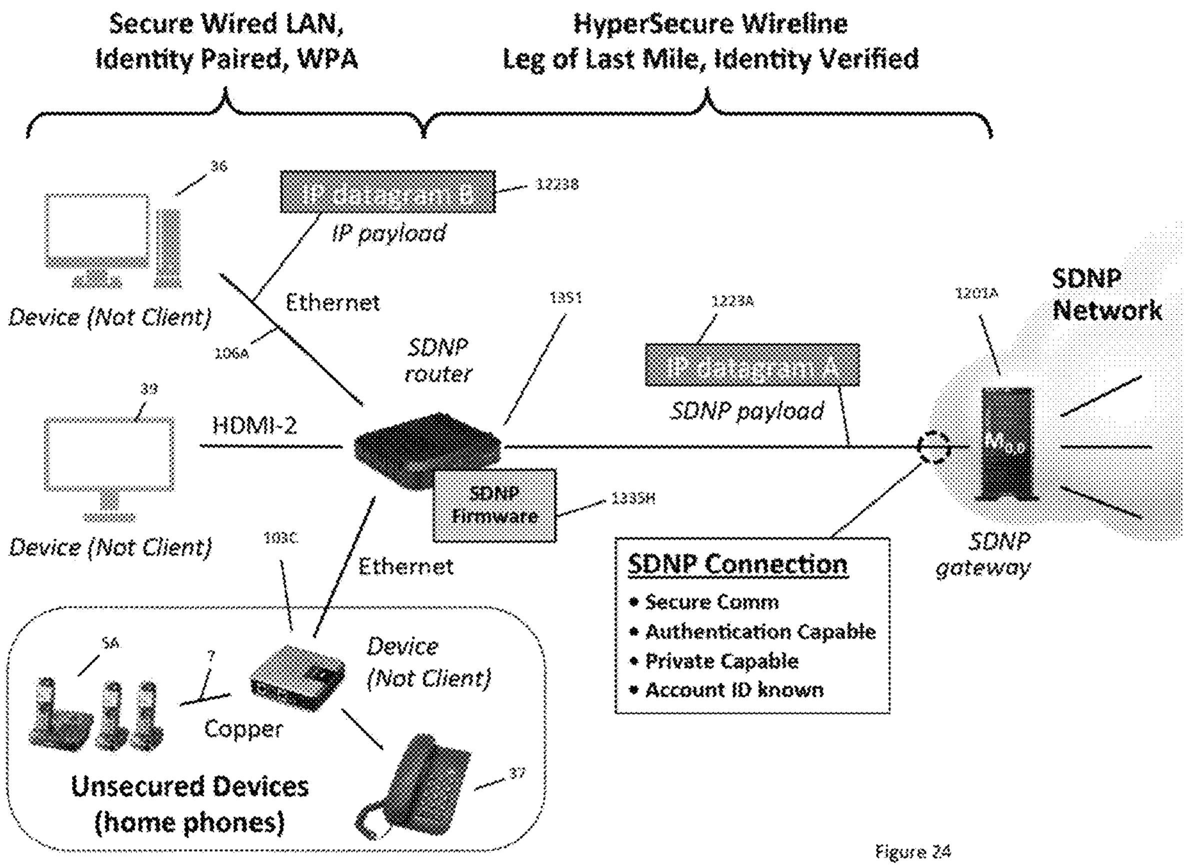
FIG. 24 illustrates last mile communication comprising an identity-verifiable HyperSecure wireline communication leg connected by wireline to identity-paired secure devices and to unidentified unsecure devices.

In FIG. 24, the use of an SDNP enabled router 1351, i.e. a router running SDNP firmware 1335H performs the function of a remote SDNP gateway. This gateway converts data packet 1223A comprising IP datagram A into data packet 1223B comprising IP datagram B. Although SDNP firmware 1335H can interpret SDNP payload contained in IP datagram A, the connected devices are not SDNP clients. Instead SDNP router 1351 converts SDNP payload into a conventional IP payload. Unless additional security methods are introduced in a device this Last Link is unsecure. For home use, this unsecure device connection is often not a concern because the Last Link occurs inside the home. Unless a hacker physically invades a house to connect a wiretap, such wireline connections are not sniffable. Examples of wired in-home Last Links to non-SDNP devices include Ethernet 106A, shown by example connected to desktop computer 36 and to modem 103C or HDMI-2 connected to a TV 39.

Since the SDNP connection and HyperSecure communication extends only to SDNP router 1351, the Last Link must rely on authentication and encryption to achieve security on wireline connections. For Ethernet such security can utilize any number of security methods (http://www.computerweekly.com/feature/iSCSI-security-Networking-and-security-options-available) including iSCSI operating on Layers 1 through Layer 3, such as virtual local area network operation or VLAN utilizing encryption among authenticated devices. Alternatively security can be achieved using Layer 4 to Layer 6 methods using the "IP Security" or IPSec framework. Originally developed for data storage and promoted by Cisco as an industry standard, IPSec offers two security modes. In the "Authentication Header" mode, the receiving device is able to authenticate the sender of data. In this mode, the data field is encrypted but the header uses a recognizable IP address. Encapsulating Security Payload (ESP), also known as tunnel mode, the entire IP packet, including the IP header is encrypted, and nested in a new unencrypted IP packet so that routing can function properly and the packet can reach its correct network destination.

In either case, security relies on authenticating devices to allow them to connect to the network. In home networks, e.g. personal networks connecting to computers, shared storage drives, IoT and other device connections, network-connected hardware does not change frequently. In such cases, authentication essentially involves a registration process of a device gaining access to a network or router. Rather than identifying a specific user's identity, this type of authentication is between devices, i.e. device-to-device, generally using some device tag, name, or ID number to identify and recognize the devices approved for connection. Establishing a network connection involves a setup phase when the devices are first introduced to one another and approved by the user for connection, followed by an automated authentication sequence each time a wireline device is physically connected to the other or for WiFi whenever the two devices come within range of one another. The setup phase, referred to herein as identity pairing, may also be referred to as device registration, device bonding, device pairing, pairing, or pair bonding. A similar process is used with devices to connect a Bluetooth headphone to a cell phone or to pair bond a Bluetooth cell phone to a car's hands free audio system. Protocols include challenge handshake authentication protocol or CHAP, Kerberos V5, Simple Public-Key Generic Security Services Application Programming Interface (GSSAPI), Secure Remote Password (SRP), and Remote Authentication Dial-In User Service (RADIUS). Some methods such as RADIUS rely on encryption methods that have been broken, but still are used in combination with other techniques.

While Ethernet communication protects identity-paired devices such as Ethernet modem 103C, the output of the modem, comprising analog telephone signals conducted over copper twisted pair conductors 7 to cordless phone 5A and to desktop phone 37, the Last Link is not secure. Moreover, the communication format of cordless phone 5A is not secure and subject to interception and monitoring. For this reason, the use of home phones in secure communication is ill advised.

The distribution of video content is another subject of interest in security. For example in the communication of SDNP router 1351 to HDTV 39, a video communication format such as High Definition Multimedia Interface (HDMI), DisplayPort (DP), Digital Visual Interface (DVI), and less popular Gigabit Video Interface (GVIF), or Unified Digital Interface (UDI) commonly comprises the physical connection to the HDTV or display monitor. Originally the security of this connection and its data was the concern of movie studios and content providers, with a focus on preventing the illegal copying and distribution of copyrighted material. One security protocol developed by Intel Corp. for maintaining security of the video link is High-bandwidth Digital Content Protection or HDCP (https://en.wikipedia.org/wiki/High-bandwidth_Digital_Content_Protection). Originally the system was intended to prevent HDCP-encrypted content from being played on unauthorized devices. The system checks for authorization of the TV receiver or display before sending the content. DHCP therefore uses authentication to prevent non-licensed from receiving data, it encrypts data to prevent eavesdropping of information, and key revocation of compromised devices.

With HDCP content flow from a modem to the TV can be secured by authentication, i.e. using identity pairing. With advent of smart TVs, however data flow is bidirectional. As a means to facilitate upstream data flow, i.e. from the TV to the modem or set top box, starting at revision 1.4, HDMI now embeds a high-speed bidirectional data channel known as HEC or HDMI Ethernet Channel. This data channel means HDMI connected devices can send and receive data via 100 MC/sec Ethernet, making them ready for IP-base application such as IP-TV. The HDMI Ethernet Channel allows Internet-enabled HDMI devices to share an Internet connection via the HDMI link, with no need for a separate Ethernet cable. As such secure communication can be facilitated over HDMI using the same security protocols and identity pairing available in Ethernet.

Figure 25:
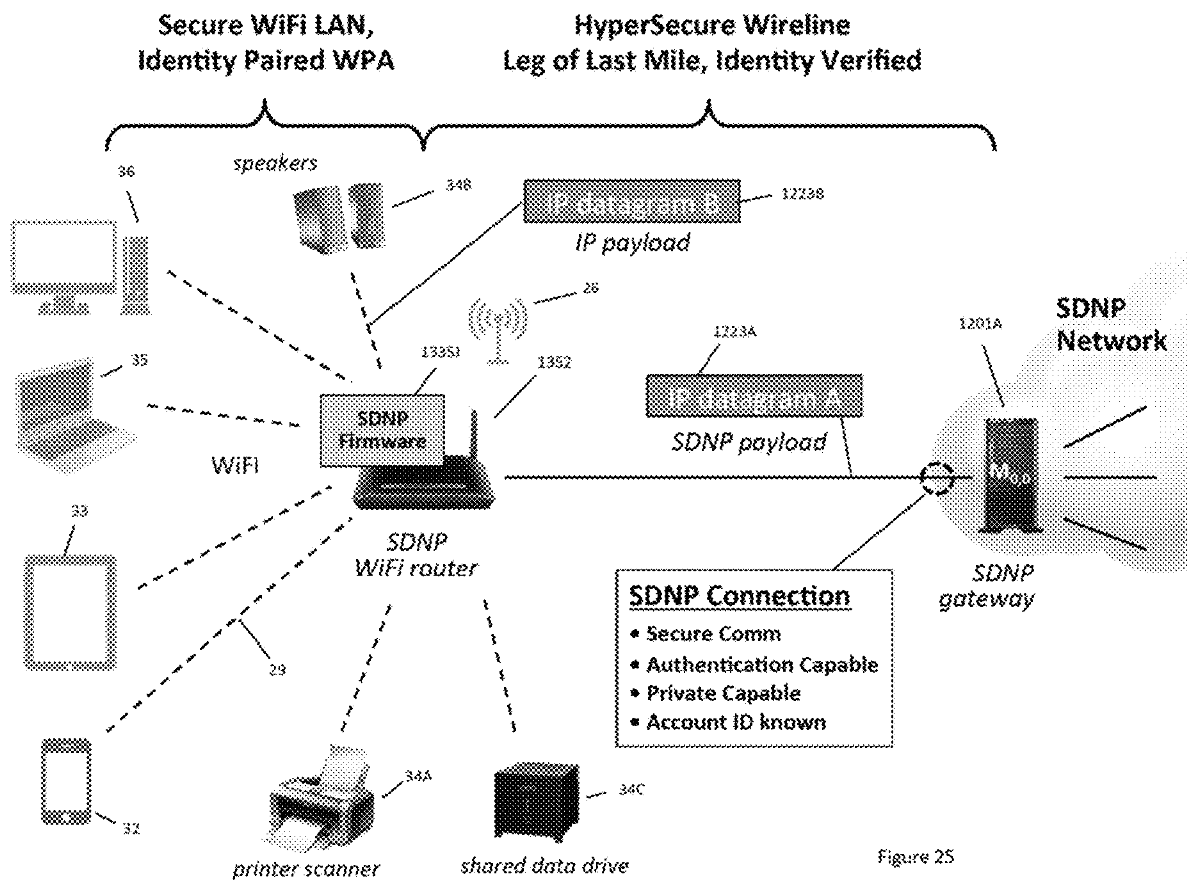
FIG. 25 illustrates last mile communication comprising an identity-verifiable HyperSecure wireline communication leg connected by WiFi LAN to identity-paired WPA-secured computing and communication devices for home and work.

In FIG. 25, the use of an SDNP enabled WiFi router 1352, i.e. a WiFi router running SDNP firmware 1335J performs the function of a remote SDNP gateway. This gateway converts data packet 1223A comprising IP datagram A into data packet 1223B comprising IP datagram B. Although SDNP firmware 1335J can interpret SDNP payload contained in IP datagram A, the connected devices are not SDNP clients. Instead SDNP WiFi router 1352 converts SDNP payload into a conventional IP payload and wirelessly communicates with the connected devices using WiFi access point 26 to facilitate communication over WiFi link 29. Unless additional security methods are introduced in a device this Last Link is unsecure. In the case of WiFi communications in the home or office, security is a concern because the data packets can be sniffed from a distance. Examples of WiFi connected home and office devices include desktop computer 36, notebook 35, tablet 33, cell phone 32, speakers 34B, printer/scanner 34A, and shared data drive 34C.

Security between the SDNP gateway, i.e. SDNP WiFi router 1352, and the connected device is achieved using any number of industry standard protocols such as WiFi Protected Access WPA-II or WPA2 (IEEE 802.11i-2004) a replacement for the older WPA and its unsecure predecessor WPE. WPA2 communication is protected using CCMP, an acronym for Counter Mode Cipher Block Chaining Message Authentication Code Protocol based on AES processing with a 128-bit key and a 128-bit block size. CCMP provides data confidentiality, requires authentication, and sets access control. Authentication involves identity pairing at setup. Re-pairing must be performed manually. CCMP security, while good, is not HyperSecure, lacking anonymous data packets and dynamic nature of the SDNP communication provided from a SDNP client.

Figure 26:
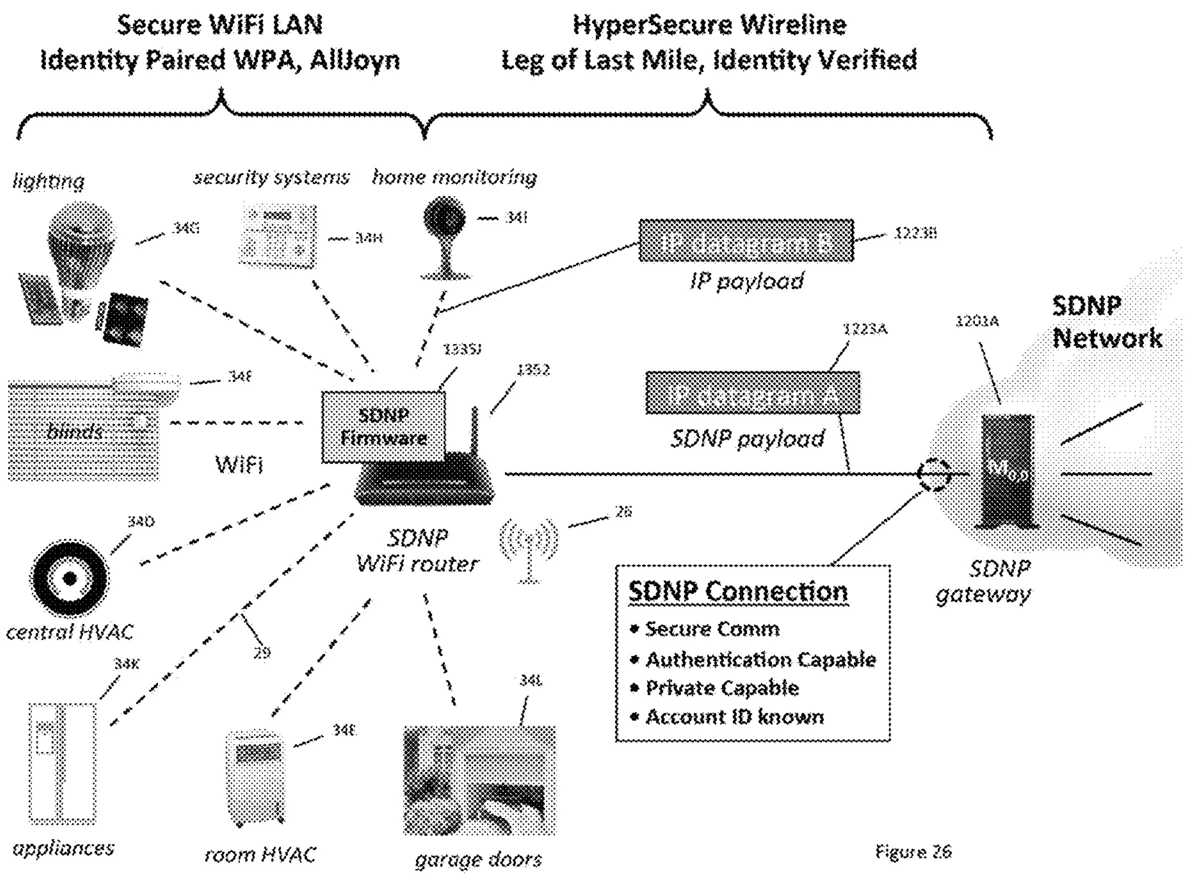
FIG. 26 illustrates last mile communication comprising an identity-verifiable HyperSecure wireline communication leg connected by WiFi LAN to identity-paired WPA-secured home IoT devices.

In the FIG. 26 example of IoT connected devices in a home network, the use of an SDNP enabled WiFi router 1352, i.e. a WiFi router running SDNP firmware 1335J performs the function of a remote SDNP gateway. This gateway converts data packet 1223A comprising IP datagram A into data packet 1223B comprising IP datagram B. Although SDNP firmware 1335J can interpret SDNP payload contained in IP datagram A, the connected IoT devices are not SDNP clients. Instead SDNP WiFi router 1352 converts SDNP payload into a conventional IP payload and wirelessly communicates with the connected devices using WiFi link 29 from WiFi access point 26. Unless additional security methods are implemented, this Last Link is insecure—especially since WiFi data packets can be sniffed from a distance. Examples of WiFi connected IoT devices in the home include central heating and air conditioning 34D, lighting 34G, blinds 34F, large appliances 34K, portable and room HVAC 34E, garage doors 34L, home monitoring 34J, and home central security system 34H.

Security between the SDNP gateway, i.e. SDNP WiFi router 1352, and the connected device is achieved using any number of industry standard protocols such as the aforementioned WiFi Protected Access protocol WPA2 using CCMP facilitating data confidentiality, requires authentication, and sets access control. WPA2 achieves security using identity pairing, device verification implemented as a Layer 2 protocol. The method is cumbersome involving manual authentication methods.

An alternative protocol used for local area networks recently introduced for IoT communications—a proximal network called the AllJoyn framework. The framework discovers devices, creates sessions, and facilitates secure communication. The framework is designed to support IoT device connectivity using numerous Layer 2 transport layers, including WiFi, Ethernet, serial bus communication, and power line PLC. Applications may be based on C, C++, Obj. C, and Java operating on numerous platforms including Linux, Windows, MacOS, Android, iOS, RTOS real time operating system, and open source development environment Arduino.

AllJoyn compliant applications authenticate one other and exchange encrypted data to enable end-to-end application level security. Authentication and data encryption are executed on application Layer 7. Transport layer 2, also referred to as the router layer, transmits security-related messages between application endpoints but does not implement any security logic itself. A callback function known as "Auth Listener", also implemented on application Layer 7, facilitates authentication using PINs, passwords, or authentication certificates. Security is achieved using AES128 peer-to-peer encryption. Like WPA, AllJoyn employs identity pairing in an authentication process in advance of executing command and control sequences. Supported authentication methods include a pre-shared key or PSK, secure remote password (SRP) key exchange or logon with username and password. The protocol also supports ephemeral (elliptic curve Diffe-Hellman) key exchange (i) with no authentication, (ii) authenticated with a pre-exchanged key, and (iii) authenticated with an X.509 ECDSA certificate.

Figure 27:
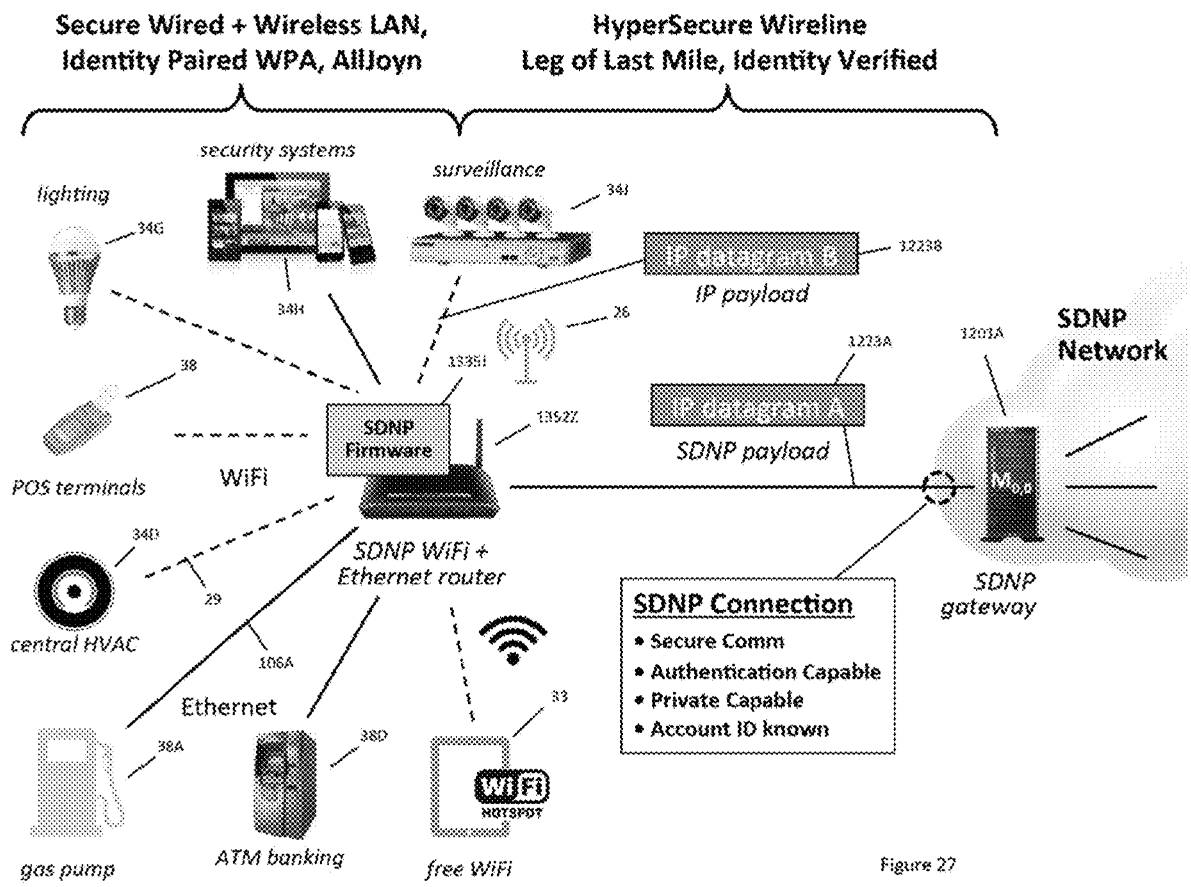
FIG. 27 illustrates last mile communication comprising an identity-verifiable HyperSecure wireline communication leg connected by Ethernet or by WiFi LAN to identity-paired WPA-secured devices for business.

The same technology can be applied to business enterprises. In the FIG. 27 example of IoT connected devices in a home network, the use of an SDNP enabled WiFi and Ethernet router 1352Z, i.e. a Ethernet and WiFi router running SDNP firmware 1335J performs the function of a remote SDNP gateway. This gateway converts data packet 1223A comprising IP datagram A into data packet 1223B comprising IP datagram B. Although SDNP firmware 1335J can interpret SDNP payload contained in IP datagram A, the connected IoT devices are not SDNP clients. Instead SDNP and Ethernet WiFi router 1352Z converts SDNP payload into a conventional IP payload communicates with the connected devices using both WiFi link 29 and Ethernet 106A.

Unless additional security methods are implemented, this Last Link is insecure—especially for WiFi data packets that can be sniffed from a distance. Examples of WiFi connected IoT business devices include central heating and air conditioning 34D, lighting 34G, surveillance systems 34J, security systems 34H, POS terminals 38, and WiFi Hotspot connected devices such as tablet 33. Business enterprise wireline connected devices depend on the nature of the business. In banking, devices include Ethernet connected ATM machine 38D. In gas stations, devices include by example Ethernet connected gas pump 38A.

In summary, Last Link can be secured with non-SDNP clients communicating with a SDNP remote gateway. In this manner the majority of the Last Mile is HyperSecure while the Last Link employs identity paired encrypted security.

SDNP Bridge Communication—

As described above, Last Mile data transport outside the SDNP cloud necessarily employs IP datagrams, i.e. data packets using Internet source and destination addresses, or alternatively using NAT addresses of the network operator. In case of private networks, e.g. those operating within office buildings, or in cooperation with local network service providers willing to host SDNP soft-switches on their servers, it is also possible to utilize SDNP datagrams to achieve HyperSecure communications on portions of Last Mile.

As described previously, HyperSecure communication relies on servers to host SDNP soft-switch software or firmware and to communicate using SDNP datagrams and anonymous addresses, not with IP datagrams Within the SDNP cloud, these SDNP soft-switch enabled servers are referred to as SDNP nodes, as designated by the SDNP node notation $M_{0,0}$, $M_{0,1}$, $M_{1,0}$, $M_{1,1}$, etc. The above-referenced U.S. application Ser. No. 14/803,869 also disclosed communication between multiple independent SDNP clouds connected by SDNP bridges—SDNP gateways routing IP datagrams to other SDNP clouds.

The concept of an SDNP bridge can similarly be adapted for portions of Last Mile communication. To create a SDNP sub-network or mini-cloud within the Last Mile, two or more servers must be enabled by SDNP bridge software or firmware. Unlike SDNP client software or firmware operating in an end device, i.e. in a calling device, SDNP bridge operation is used for routing data, not to operate as the final connection. As such, two or more adjacent SDNP bridges can operate as a standalone SDNP bridge network, SDNP mini-cloud or SDNP ad hoc network. The SDNP bridge function, as disclosed, represents a Layer 3 construct analogous to Layer 2 description of bridge mode operation of a WiFi router. Within the SDNP-bridge or SDNP bridge network, communication occurs using SDNP datagrams. Communication to the SDNP-bridge from outside the SDNP-bridge or SDNP bridge network uses IP datagrams with SDNP payloads.

Figure 28:
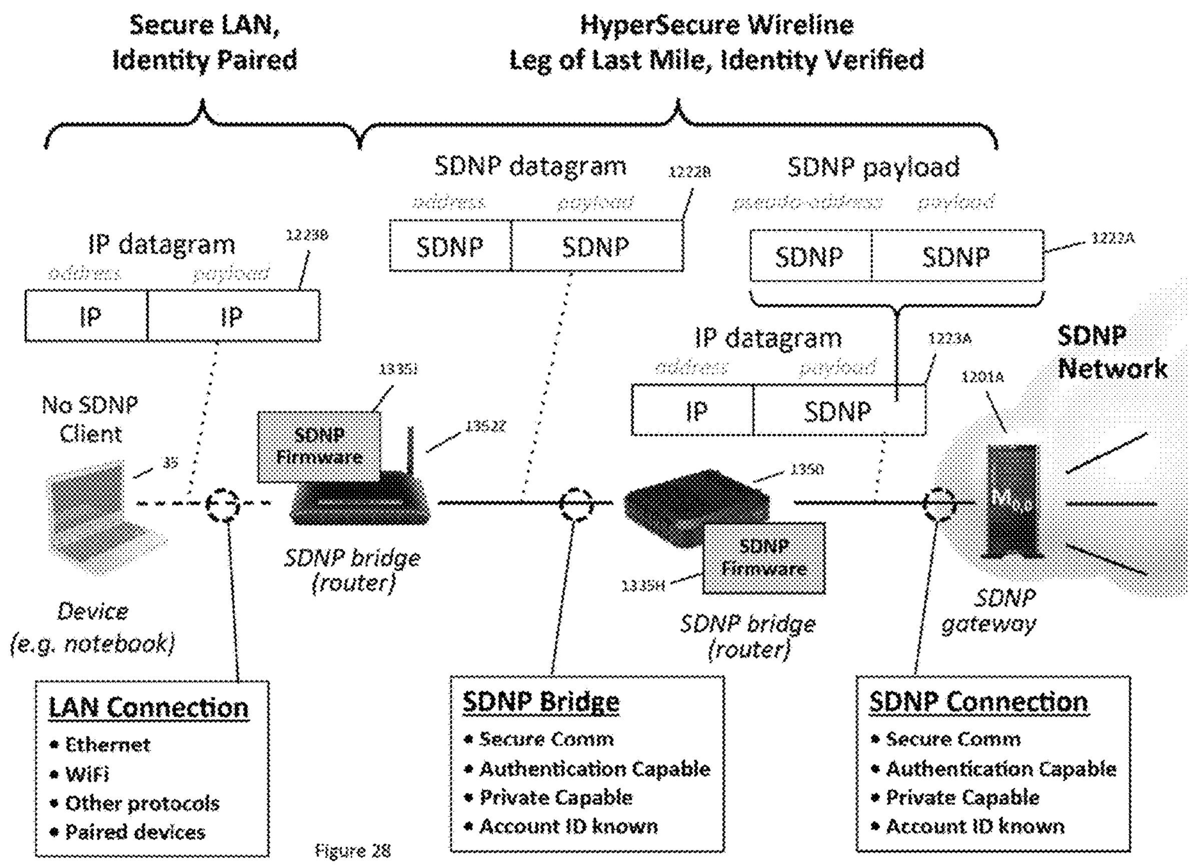
FIG. 28 schematically represents an example of last mile communication comprising identity-verifiable HyperSecure communication legs connected to identity-paired secure wired or secure wireless LAN last links.

Operation of a SDNP bridge within Last Mile communication is exemplified in the schematic representation shown in FIG. 28 comprising an SDNP network with SDNP gateway 1201A, a SDNP bridge comprising SDNP bridge routers 1350 and 1352Z running SDNP firmware 1335H and 1335J respectively, and a connected client device that is not an SDNP client, shown here as notebook 35. As shown, communication between SDNP gateway 1201A and SDNP-bridge 1350 comprises a secure connection utilizing IP datagram 1223A with IP address and SDNP payload. SDNP payload 1222A in turn contains SDNP routing information and secure SDNP payload encoded using zone specific security credentials. HyperSecurity is thereby achieved using the SDNP payload even though IP address routing is employed.

Within the SDNP-bridge connection, i.e. between SDNP bridge router 1350 and WiFi-enabled SDNP bridge router 1352Z, HyperSecure communication occurs using SDNP datagram 1222B. SDNP routing information is extracted from the SDNP addressing contained within SDNP payload 1222A. Together, the SDNP-bridge and SDNP connection comprise a HyperSecure wireline leg of Last Mile communication, capable of supporting identity and account verification and supporting privacy.

The connection from SDNP-bridge router 1352Z to the non-SDNP client device, i.e. notebook 35, utilizes IP datagram 1223B with an IP address and IP payload over a local area network, either WiFi or Ethernet. Security of this Last Link, albeit not HyperSecure, is secured by any of the aforementioned Ethernet and WiFi security protocols such as iSCSI, IPSec, WPA, AllJoyn, and others.

Figure 29A:
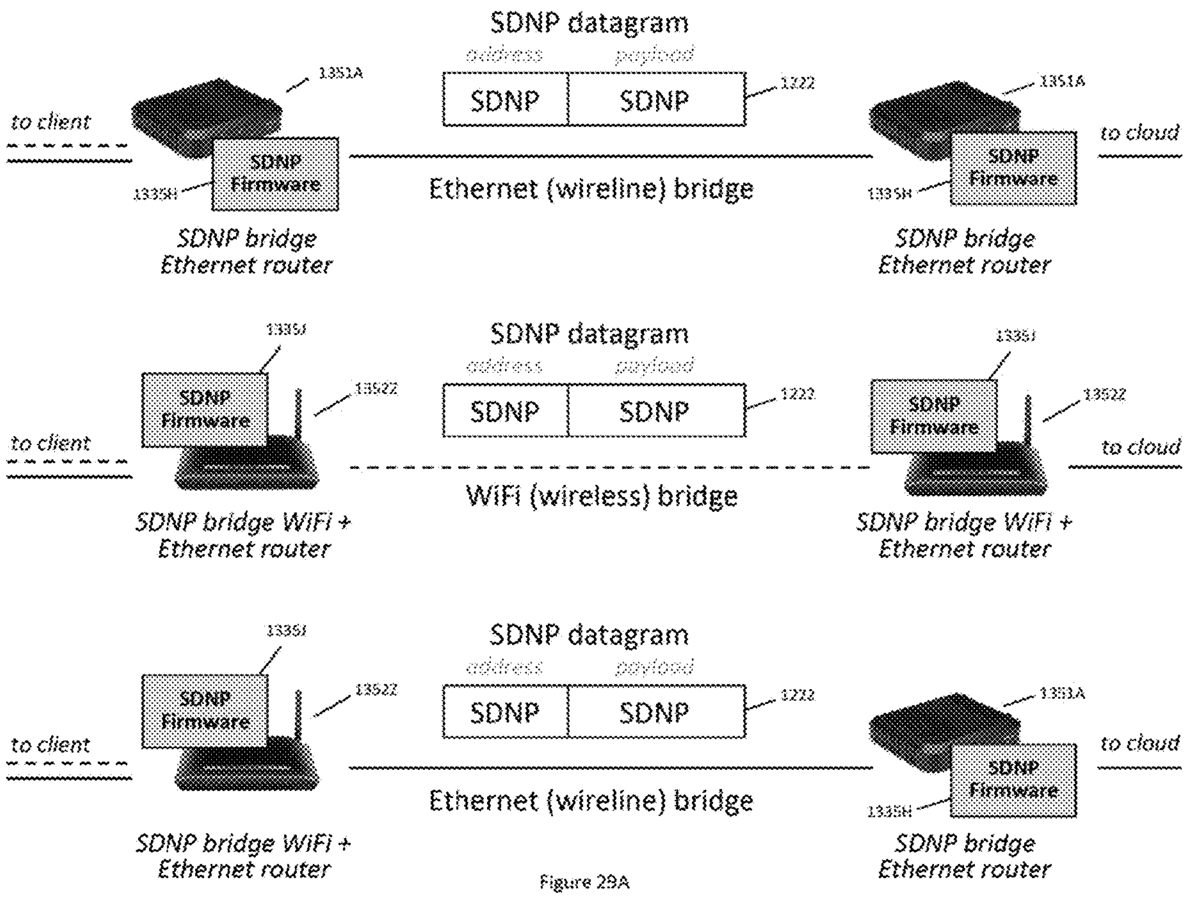
FIG. 29A schematically represents wireline and wireless HyperSecure bridges comprising Ethernet and WiFi applicable in last mile communication.

Implementation of the SDNP bridge can occur between any two SDNP enabled devices carried by any number of physical media, meaning SDNP bridging is a Layer 3 protocol operating agnostically from Layer 1 PHY and Layer 2 Transport layer realizations. For example, in the topmost schematic shown in FIG. 29A, two SDNP bridge Ethernet routers 1351A each running SDNP firmware 1335H communicate over an Ethernet (wireline) bridge using SDNP datagram 1222. In the center schematic, two SDNP-bridge routers 1352Z, each capable of Ethernet and WiFi communication and running SDNP firmware 1335J, communicate over an WiFi (wireless) bridge using SDNP datagram 1222. In the bottommost schematic, on SDNP-bridge Ethernet router 1351A running SDNP firmware 1335H communicates over an Ethernet (wireline) bridge using SDNP datagram 1222 with SDNP-bridge router 1352Z, capable of Ethernet and WiFi communication running SDNP firmware 1335J. In this manner the SDNP bridge comprising two or more SDNP enabled routers can route or distribute SDNP datagrams throughout a building or across a private network even though they operate outside the SDNP cloud in the Last Mile.

Figure 29B:
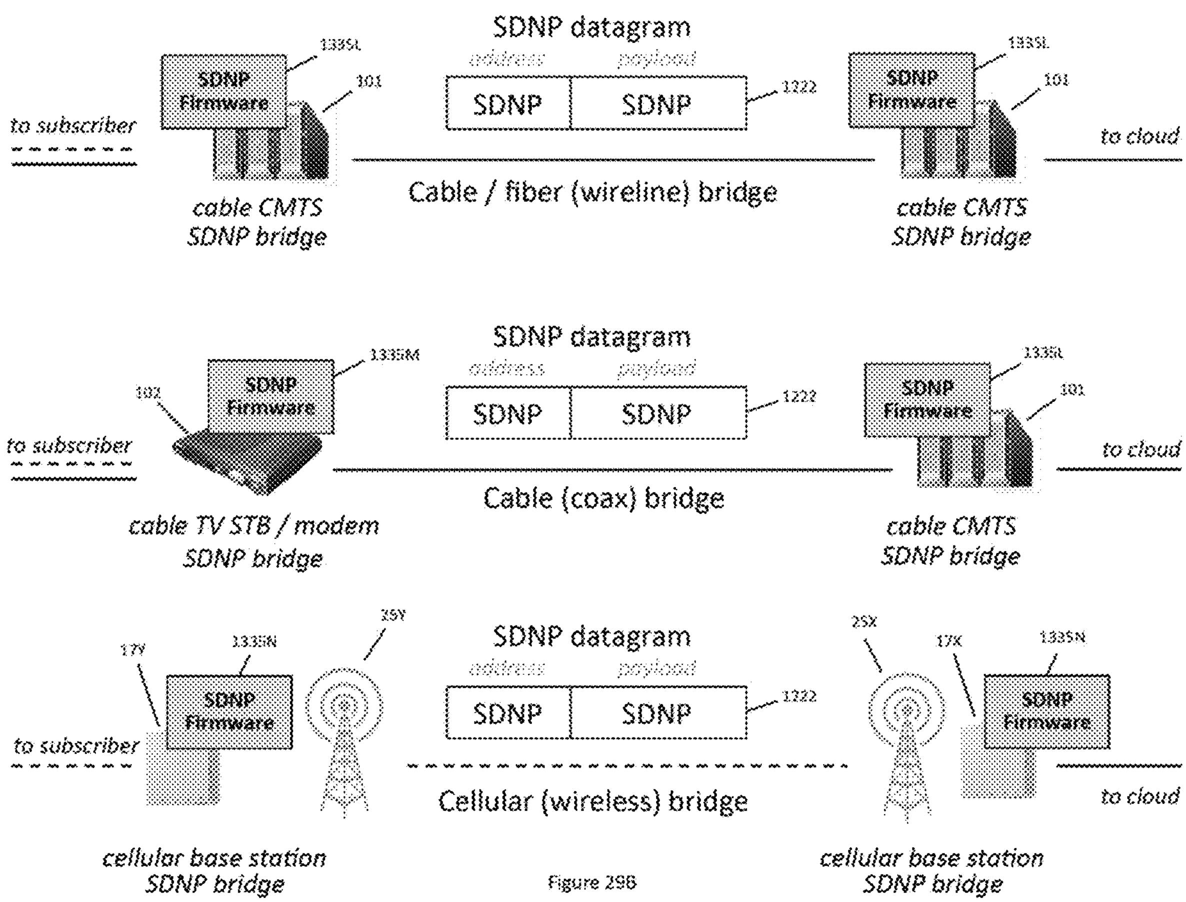
FIG. 29B schematically represents wireline and wireless HyperSecure bridges utilizing satellite and automotive networks applicable in last mile communication.

The SDNP-bridge can be extended to systems utilizing proprietary hardware, such as cable TV systems. For example the topmost schematic shown in FIG. 29B, two cable CMTS "head" servers are modified to run SDNP firmware or software 1335L to operate as cable CMTS SDNP bridges 101 and communicate over an a cable or fiber (wireline) bridge using SDNP datagram 1222. The SDNP-bridge can extend from the CMTS head into the subscriber's home. As shown in the center schematic, cable CMTS SDNP bridge 101 running SDNP firmware or software 1335L communicates using SDNP datagram 1222 over cable (coax) bridge to cable TV set-top-box or cable modem 102 running SDNP firmware 1335M. In this manner the SDNP bridge extends HyperSecure communication into the home or office.

Figure 29C:
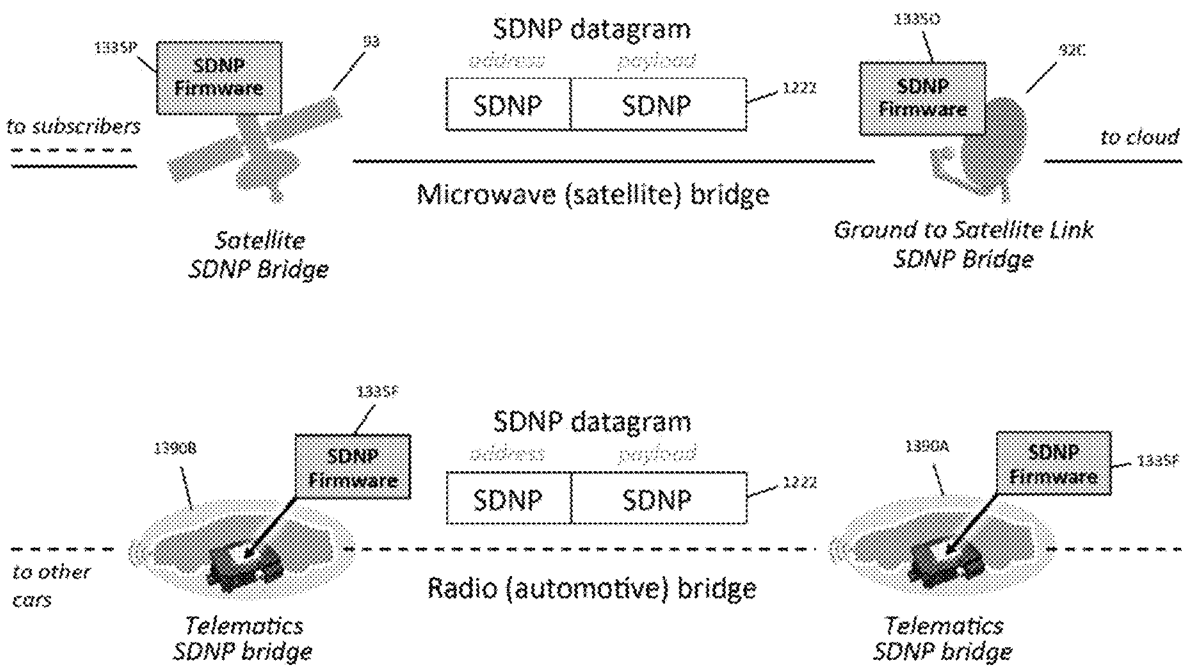
FIG. 29C schematically represents wireline and wireless HyperSecure bridges utilizing cable and cellular networks applicable in last mile communication
Figure 3D:
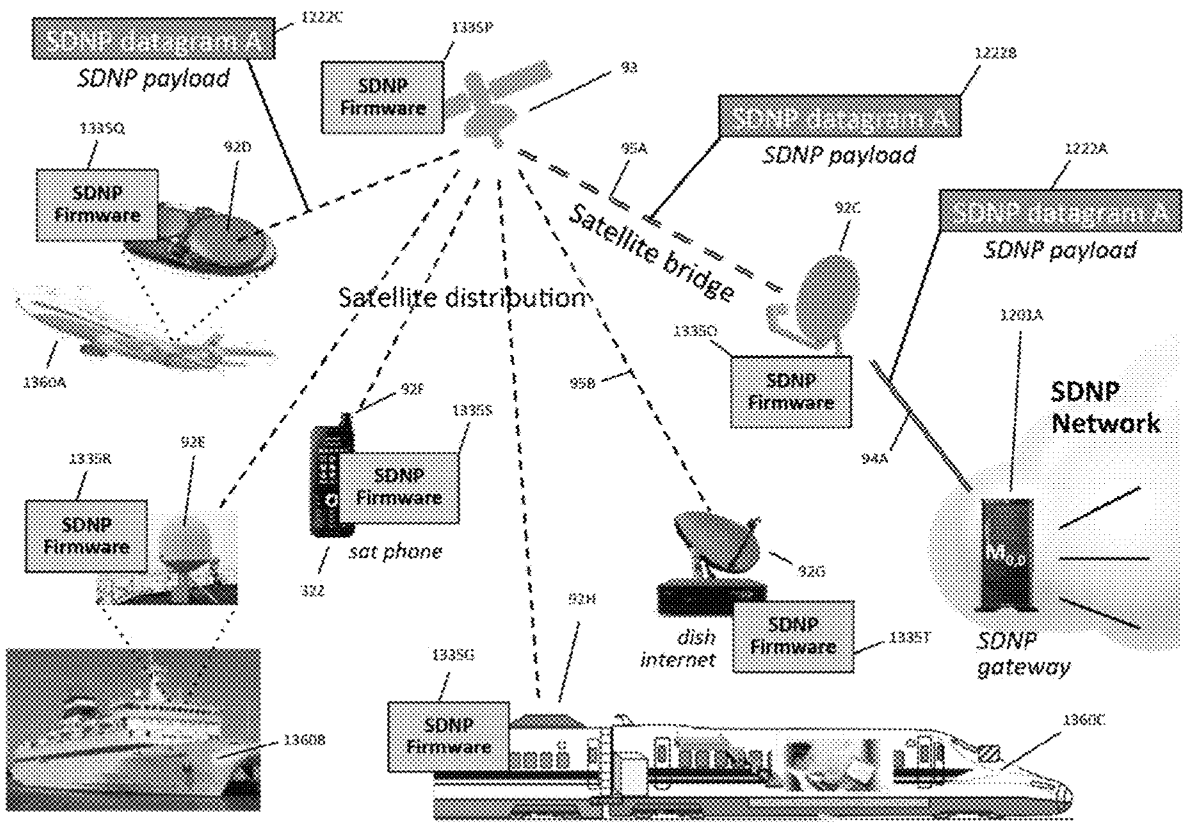

The SDNP-bridge methods disclosed can also be used to transport data over radio networks. In the bottommost schematic of FIG. 29B, two cellular base stations and radio towers running SDNP firmware or software 1335N function as cellular base station SDNP bridges 17X and 17Y to communicate wirelessly over cellular network comprising cellular bridges 25X and 25Y using SDNP datagrams 1222. In the upper schematic of FIG. 29C, a terrestrial microwave base station running SDNP firmware or software 1335O functions as a ground-to-satellite link SDNP bridge 92C to communicate as a microwave satellite bridge using SDNP datagrams 1222 to an orbiting satellite running SDNP firmware or software 1335P, i.e. to satellite SDNP bridge 93. The satellite then in turn communicates with subscribers or with other satellites.

SDNP bridge communication can be adapted to automotive applications employing automobiles as a peer-to-peer ad hoc communication network. In the lower schematic of FIG. 29C, the telematics module in car 1390A running SDNP firmware 1335F communicates over an automotive radio bridge using SDNP datagram 1222 with a nearby car 1390B also running SDNP firmware 1335F. Each car enabled with SDNP firmware forms another communication node in a dynamic telematics SDNP bridge network. This communication does not represent information being sent to a particular car or driver but instead forms a communication network able to pass information along a highway even where no cell tower is present locally.

The concept of SDNP bridge networks is especially beneficial for communication over large geographies and in transportation and shipping involving cars, trucks, emergency vehicles, trains, airplanes, boats and ocean ships. In particular, to achieve wide area coverage for communication, satellite networks are required. The system typically involves network connectivity with the satellite operator referred to as a satellite bridge or backhaul, and the satellites link to its clients and subscribers also known as satellite distribution. FIG. 30 schematically represents a variety of satellite connections adapted for SDNP HyperSecure communication. As shown SDNP gateway 1201A communicates with terrestrial satellite antenna dish 92C running SDNP firmware or software 1335O using wireline connection 94A carrying data packet 1222A comprising SDNP datagram A and SDNP payload which in turn relays the same SDNP datagram A as data packet 1222B over satellite bridge 95A to satellite 93 running SDNP firmware or software 1335P.

Distribution of HyperSecure communication data packets to various clients from SDNP enabled satellite 93 comprises data packet 1222C and SDNP data packet-A containing a SDNP payload. Satellite communication is bidirectional, with the downlink from satellite 93 to terrestrial clients capable of a higher signal strength and faster data rate than the uplink connection. In other words, a satellite can transmit higher data rates and with stronger signal intensity to an earthly client than the client's response. Examples of satellite 93 links to subscribers include satellite link 95B to dish Internet subscriber 92G running SDNP firmware 1335T, to sat phone 92F running SDNP firmware 1335S, to satellite antenna array 92H sitting atop high speed train 1360C running SDNP firmware 1335G, to satellite antenna array 92E sitting atop ocean vessel 1360B running SDNP firmware 1335R, and to satellite antenna array 92D sitting atop aircraft 1360A running SDNP firmware 1335Q.

Figure 31A:
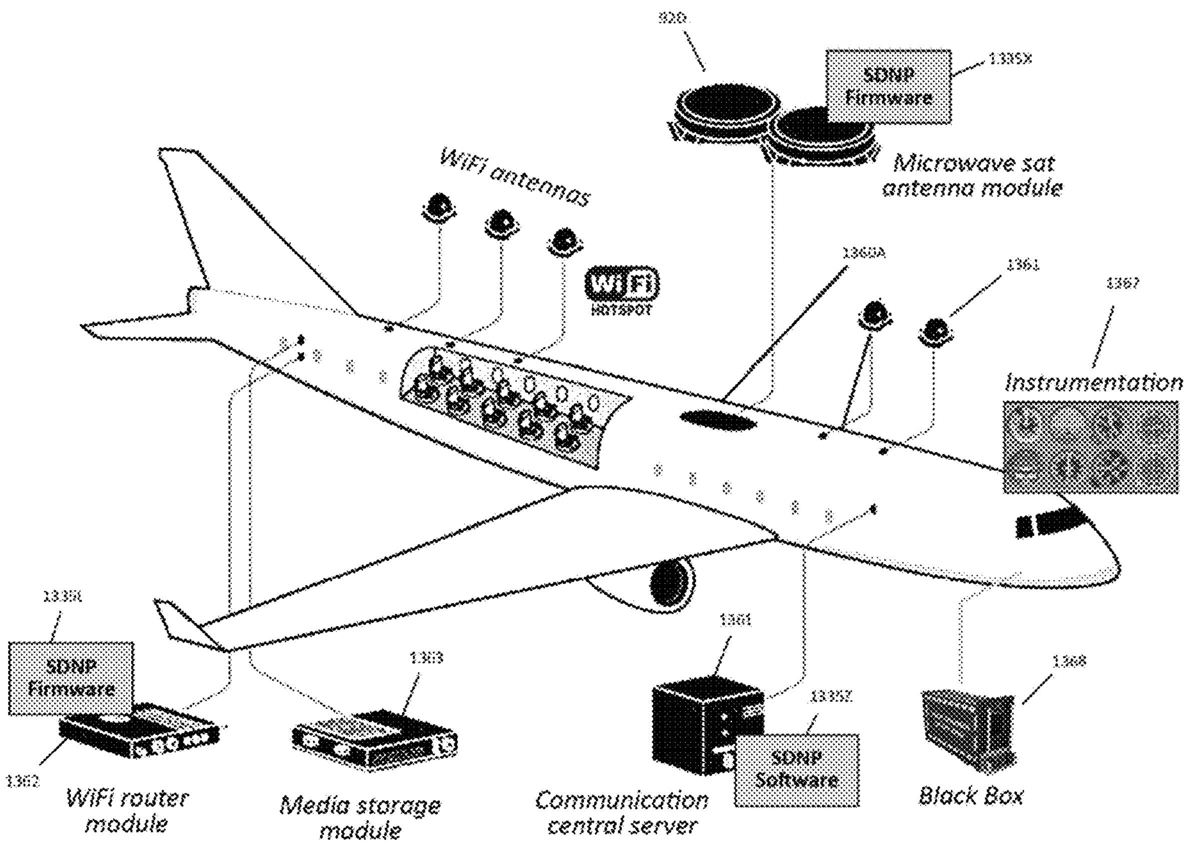
FIG. 31A is an example of last link HyperSecure communication among devices in an onboard airplane communication network with satellite connectivity.
Figure 31B:
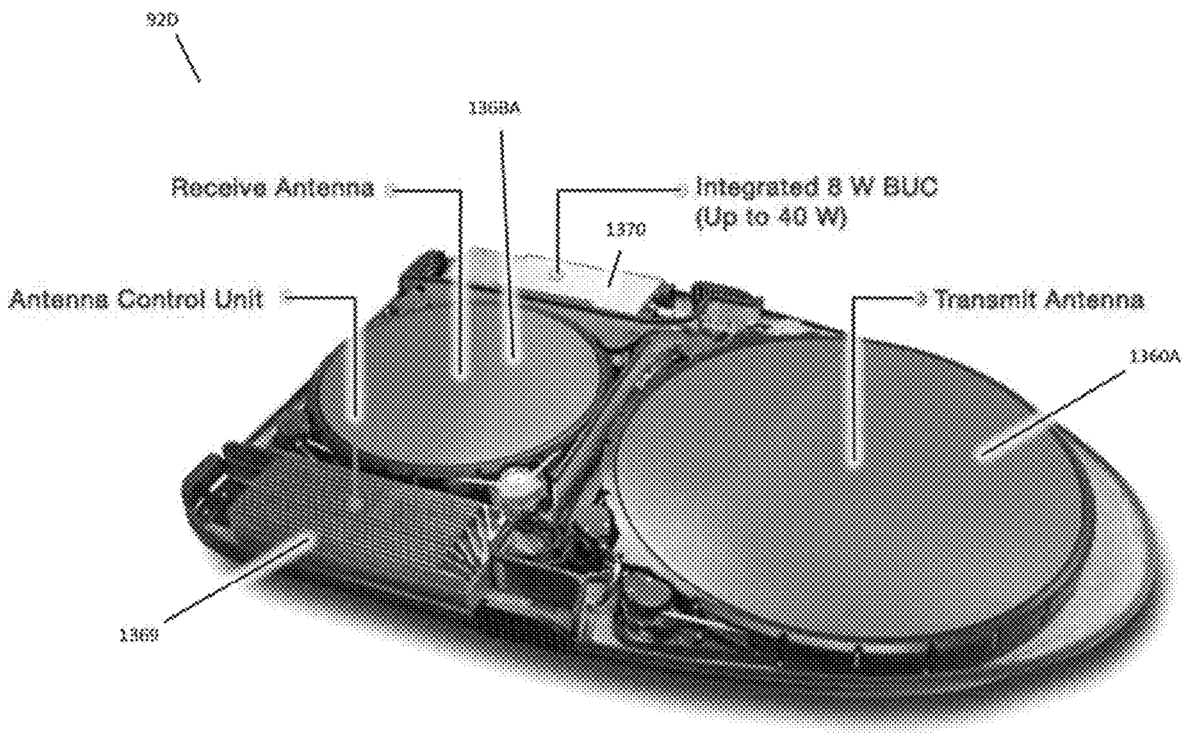
FIG. 31B is an example of an airplane satellite communication and antenna module.

In the case of large vehicles such as ships, aircraft, and trains, each system connects this HyperSecure satellite communication link to its own internal communication system or local area network. FIG. 31A for example, illustrates a commercial aircraft where satellite antenna module 92D running SDNP firmware 1335X mounted atop the fuselage of aircraft 1360A connects to communication central server 1361 running SDNP software 1335Z. Communication central server 1361 links to a variety of systems including instrumentation 1367, data recorder and black box 1368, media storage module 1363, and WiFi router module 1362, optionally running SDNP firmware 1335L. WiFi router module 1362 connects to an array of WiFi antennas 1361 located throughout the airplane to support WiFi Hotspot communications. All communications except for radio based flight control occurs through a common satellite communication link using antenna module 92D shown by example in FIG. 31B. The antenna module includes satellite transmit antenna 1360A, satellite receive antenna 1368A, antenna control unit 1369, and 40 W voltage regulator 1370. Satellite receive antenna 1368A is smaller than satellite transmit antenna 1360A because the satellite broadcast power and signal strength is greater than the antenna's broadcast strength and uplink capability.

Figure 32:
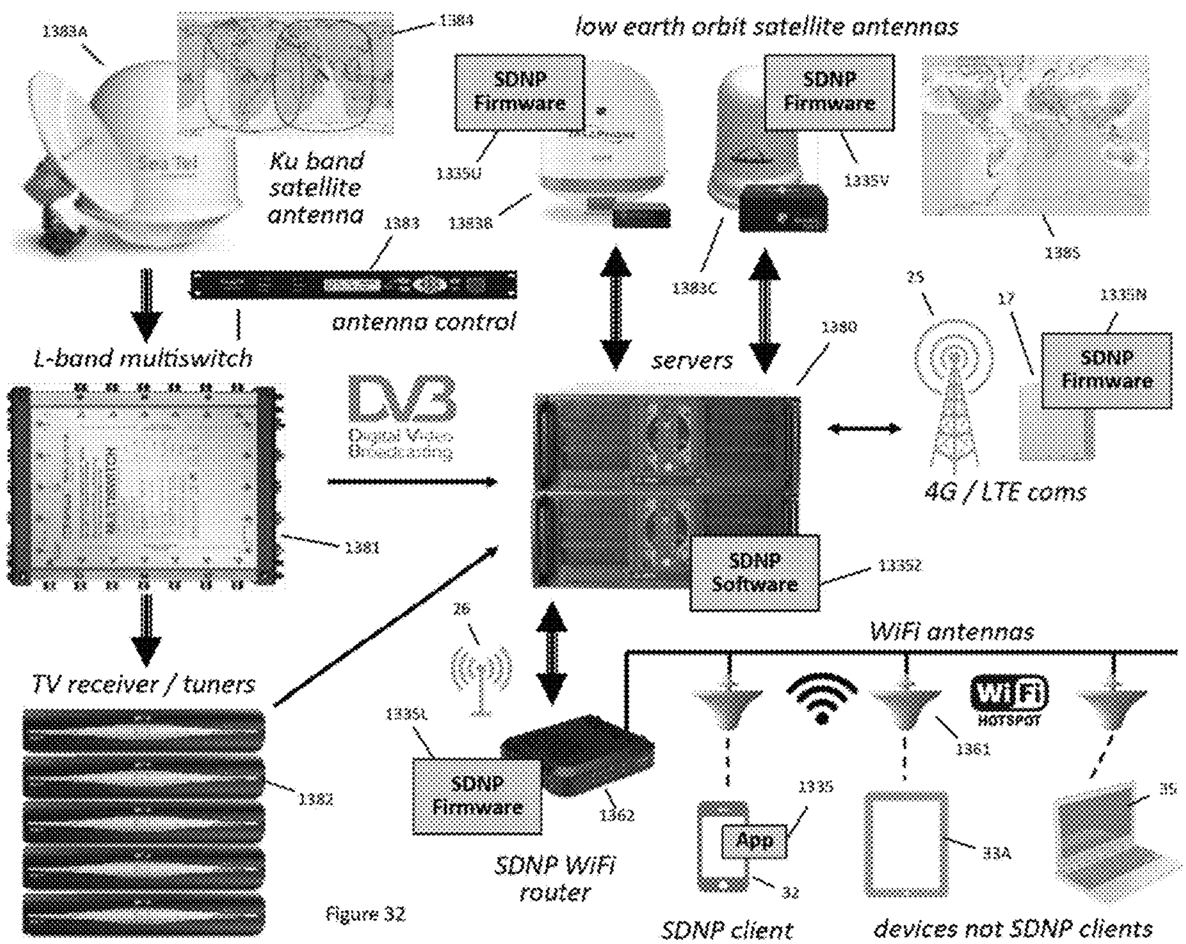
FIG. 32 is an example of last link HyperSecure communication among devices in an onboard ocean cruise ship communication network with multiple channels of satellite connectivity.

Ocean vessel satellite ship communication utilizes multiple bands of satellite communications including high altitude and near earth orbit satellites. FIG. 32 for example, illustrates the use of multiple band communication including Ku band satellite antenna 1383A, and low-earth-orbit satellite antennas 1383B and 1383C. High altitude satellites offer no or limited uplink capability but are able to cover wide areas from great altitudes including geosynchronous orbits. Because of their high altitude, area coverage of each satellite is substantial as shown in map 1384. As shown in map 1385, low earth orbit satellites cover smaller areas, requiring more satellites and therefore a higher cost to cover a broadcast area. Depending on a ship's course, access to low earth orbit satellites may be intermittent based on the satellites' orbital positioning.

Since Ku band satellite antenna 1383A is primarily used for distribution of TV and movie content, SDNP security is not generally required. Tracking and positioning is performed by antenna control 1383. Multi-channel data from satellite antenna 1383A is fed into L-band multiswitch 1381 separating signals into fixed video broadcast data routed to TV receivers and tuners 1382 and digital video broadcasting DVB data. Video content is fed into central communication servers 1380. If, however, secure communication is required, Ku band satellite antenna 1383A can be adapted to execute SDNP software.

Data from low-earth-orbit satellite antennas 1383B and 1383C running corresponding SDNP firmware 1335U and 1335V relays information from the satellite antennas to central communication servers 1380 running SDNP software 1335Z. Within range of land, the communication system is also capable of communication using 4G/LTE cellular network 25 hosted by cellular base station 17 running SDNP firmware 1335N. Communications through servers 1380 are distributed throughout the ship using SDNP WiFi router 1362 running SDNP firmware 1335L. WiFi Hotspot communication of WiFi access point 26 is distributed throughout the ship using WiFi antennas 1361. Communication to SDNP clients such as cell phone 32 running SDNP app 1335 facilitates end-to-end HyperSecure communication. Devices not enabled as SDNP clients, must rely on identity pairing using WAP, AllJoyn, or other security protocols.

Figure 33:
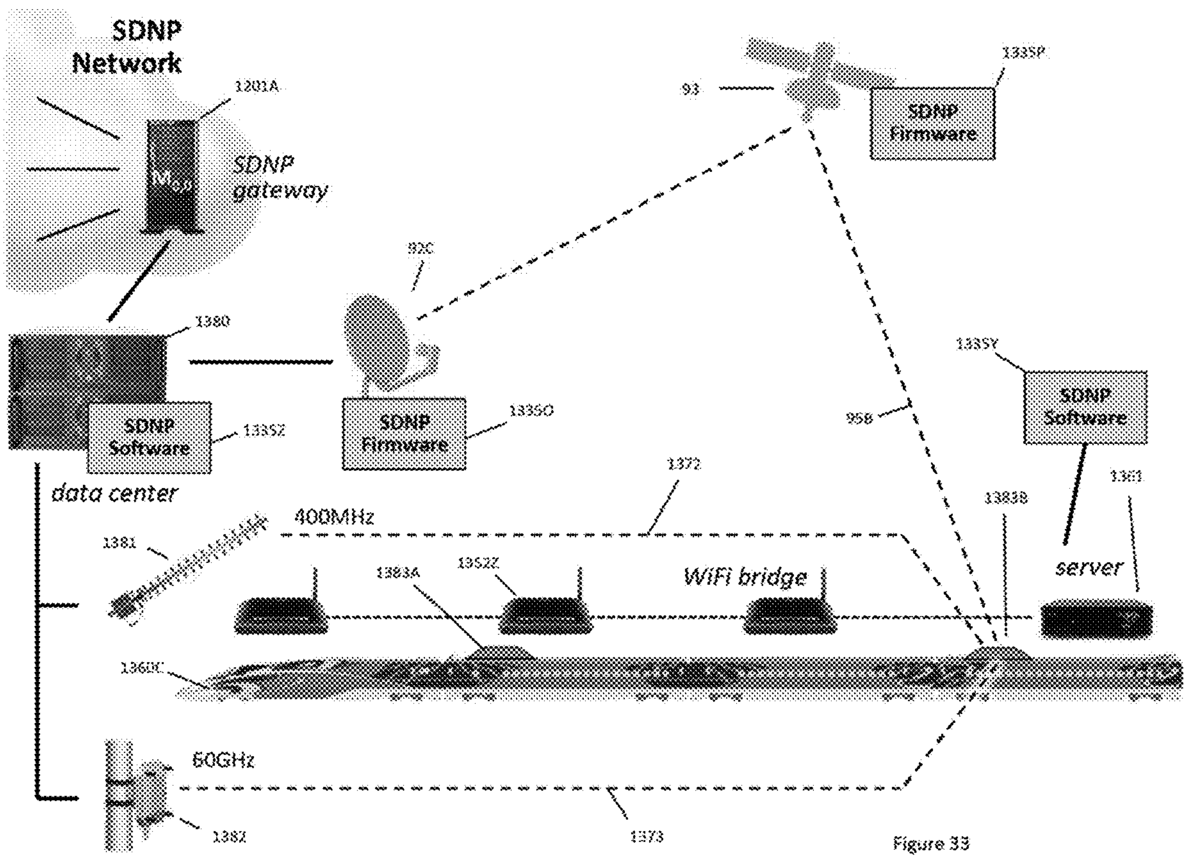
FIG. 33 is an example of last mile HyperSecure communication among devices in an onboard train communication network with radio and satellite connectivity.

FIG. 33 illustrates the application of multi-band communication applied to high-speed trains. As shown, train data center server 1380 running SDNP software 1335Z connected to SDNP gateway 1201A communicates to high speed train 1360C through multiple PHY connections including satellite microwave 95B, 400 MHz radio 1372, and 60 Ghz microwave 1373. During SDNP communication, SDNP data center 1380 relays data through satellite antenna 92C running SDNP firmware 1335D to satellite 93 running SDNP firmware 1335P. The satellite communicates with train antenna array 1383V connected to server 1361 running SDNP software 1335Y. Alternative communication occurs from SDNP data center 1380 through 400 MHz antenna 1381 or 60 GHz antenna 1382 positioned at regular intervals alongside the train tracks. These satellites also communicate with antenna array 1383B connected to train communication SDNP server 1361 running SDNP software 1335Y. Communication received by SDNP server 1361 is then distributed throughout the train by WiFi bridges 1335Z, and to clients as WiFi Hotspots.

The function of communication in automotive and in professional trucking is multifaceted involving Voice communication Navigation, maps, road information, alerts Entertainment, Hotspot services, infotainment Wireless payments, tolls Emergency services, roadside assistance Collision avoidance Dispatcher scheduling (professional, ridesharing)

Additional functions are also required for autonomous vehicles, i.e. self-driving cars. Based primarily on older cellular networks such as a CDMA (2.5G) controlled central unit referred to as a "telematics" module, existing automotive systems have been shown to be extremely subject to hacking, cyber-assaults, and privacy attacks. To eliminate this vulnerability the entire network must be secured without significant expense, i.e. installing new network is not fiscally an option. Instead, the security infrastructure must be overlaid atop the hardware network as security methods deployed in Layer 3 through Layer 7. This strategy is compatible with the SDNP Last Mile implementations disclosed herein.

Figure 34:
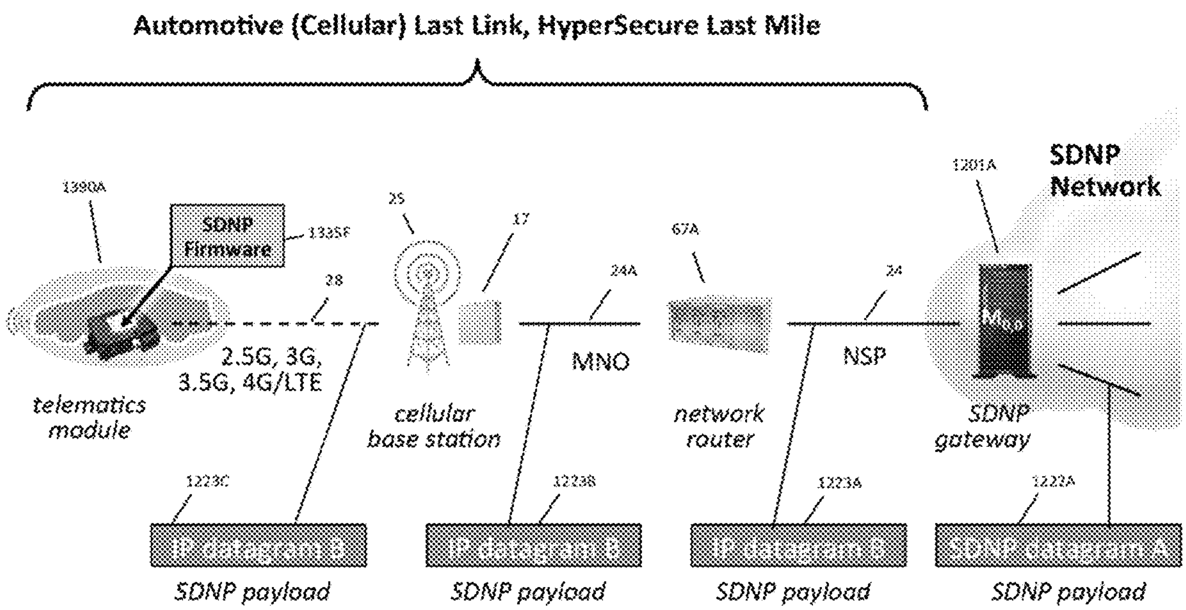
FIG. 34 illustrates HyperSecure last mile communication to an automotive telematics module including cellular last link connectivity.

FIG. 34 illustrates an exemplary HyperSecure Last Mile connection between a vehicle and the SDNP cloud. As in previous Last Mile connections, the particular data carriers involved transporting packets across the Last Mile may vary dramatically by location. As such, the example is shown to represent HyperSecure communication regardless of the data carriers involved. As shown, SDNP gateway 1201A connects to a network router 67A over a network service provider (NSP) managed wired or fiber link 24, converting data packet 1222A comprising SDNP datagram A into data packet 1223A comprising IP datagram B containing a SDNP payload. Network router 67A then routes IP datagram B as data packet 1223B to a cellular base station 17 over a wired or fiber link 24A owned or operated by a mobile network operator (MNO). IP data packet B is then wirelessly communicated over cellular network 25 as data packet 1223C comprising SDNP datagram B containing SDNP payload to the telematics module within automobile 1390A using cellular link 28, either using 2.5G, 3G, 3.5G, or 4G/LTE depending on the mobile network operator in the region. SDNP firmware 1335F operating within the telematics module then interprets the SDNP payload embedded within incoming data packet 1223C to complete the HyperSecure communication link. As such, an automotive cellular Last Link functions as part of HyperSecure Last Mile communication.

Figure 35:
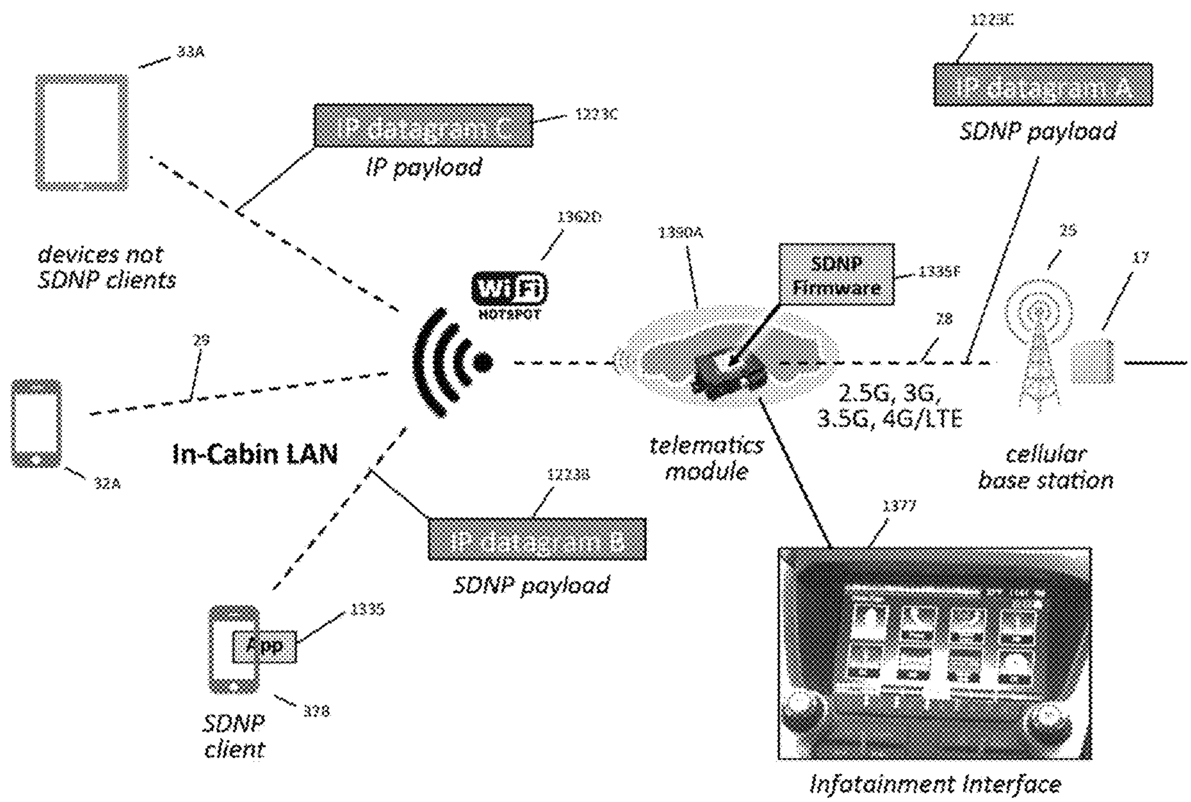
FIG. 35 is an example of last link communication between the telematics modules in an automotive communication network with cellular connectivity and in-cabin WiFi connected devices.

As shown in FIG. 35 the telematics module in automobile 1390A then utilizes the secure information for a variety of functions controlled by infotainment interface 1377. Internal WiFi Hotspot 1362D also distributes data packets 1223B and 1223C containing IP datagram B and IP datagram C, respectively. IP datagram B contains a SDNP payload that facilitates end-to-end HyperSecure communication to any SDNP client such as cell phone 32B running SDNP app 1335. IP datagram C using only a conventional IP payload is less secure, but works devices not operating as SDNP clients such as cell phone 32A and tablet 33A. Identity pairing can be used to improve Last Link security for non-SDNP devices using WPA, AllJoyn or other protocols.

Figure 36:
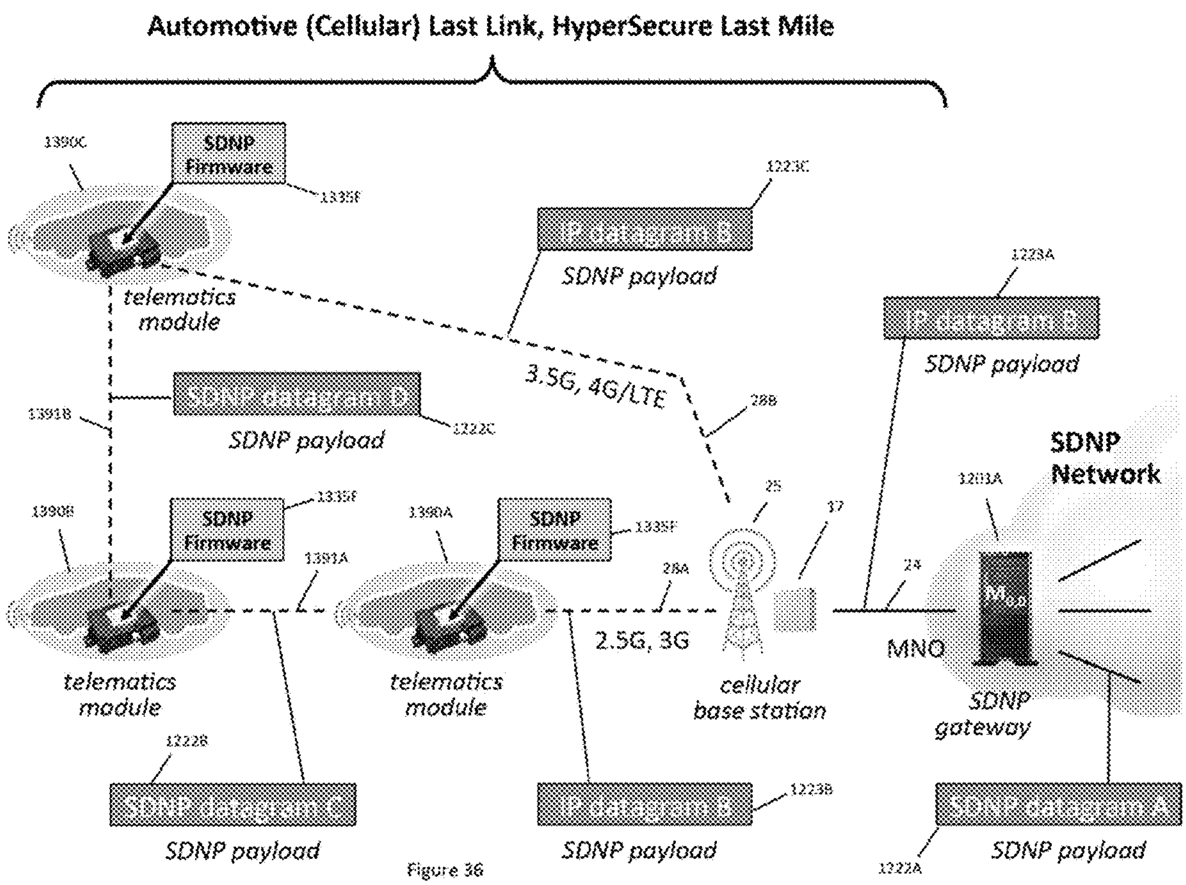
FIG. 36 is an example of HyperSecure inter-vehicular communication with cellular connectivity.

Another important function in automotive communication is that of vehicle-to-vehicle communication also referred to as V2V communication. The purpose of V2V communication is primarily for collision avoidance. But in accordance with the disclosed SDNP methods herein, V2V communications can also function as a HyperSecure ad hoc peer-to-peer network. Such inter-vehicle SDNP communication is illustrated in FIG. 36 where automobiles 1390A, 1390B, and 1390C running SDNP firmware 1335F form a peer-to-peer network with one another and with cellular base station 17 connected to SDNP gateway 1201A. Communication among the vehicles can be performed using either IP datagrams or SDNP datagrams.

In the case where a SNP client or gateway communicates with a non-SDNP device, communication occurs using IP datagrams. For example SDNP gateway 1201A converts SDNP datagram A with a SDNP payload into data packet 1223A comprising IP datagram B with an embedded SDNP payload. As shown, cellular base station 17 communicates to automobile 1390A over a 2.5G or 3G cellular link 28A using data packet 1223B containing IP datagram B with an embedded SDNP payload but is able to communicate to automobile 1390C over a 3.5G or 4G/LTE cellular link 28B using data packet 1223C also containing IP datagram B with an embedded SDNP payload. In this manner the SDNP payload is distributed independent of the network used to carry the data packets.

Automobiles enabled with SDNP firmware 1335F may also form an ad hoc peer-to-peer SDNP bridge or bridge network. For example, automobile 1390A communicates with automobile 1390B over a V2V radio link 1391A using data packet 1222B containing SDNP datagram C rather than an IP datagram. Similarly, automobile 1390B communicates with automobile 1390C over a V2V radio link 1391B using data packet 1222C containing SDNP datagram D, and does not rely on IP datagrams. Regardless of the type of datagram employed, the embedded content remains HyperSecure using SDNP payloads.

Another feature of the SDNP ad hoc V2V network is its ability to perform tunneling functions, i.e. passing data through one vehicle to another without the intervening car being able to monitor or interpret the data it is passing through. In the case where cellular link 28B fails because automobile 1390C is out of range, as an alternative path, cellular base station 17 can utilize the SDNP bridge network to reach the same caller, in the example shown through cellular link 28A, V2V radio link 1391A, and finally through V2V radio link 1391B. During data transport, data packets 1223B, 1222B and 1222C, change from IP datagram B to SDNP datagram C and finally to SDNP datagram D. Since the SDNP payload intended for automobile 1390C is uniquely created for the destination automobile, automobile 1390B and its occupants cannot hack or monitor the contents of SDNP datagram C even though are relaying data packet 1222B through the ad hoc network.

Figure 37:
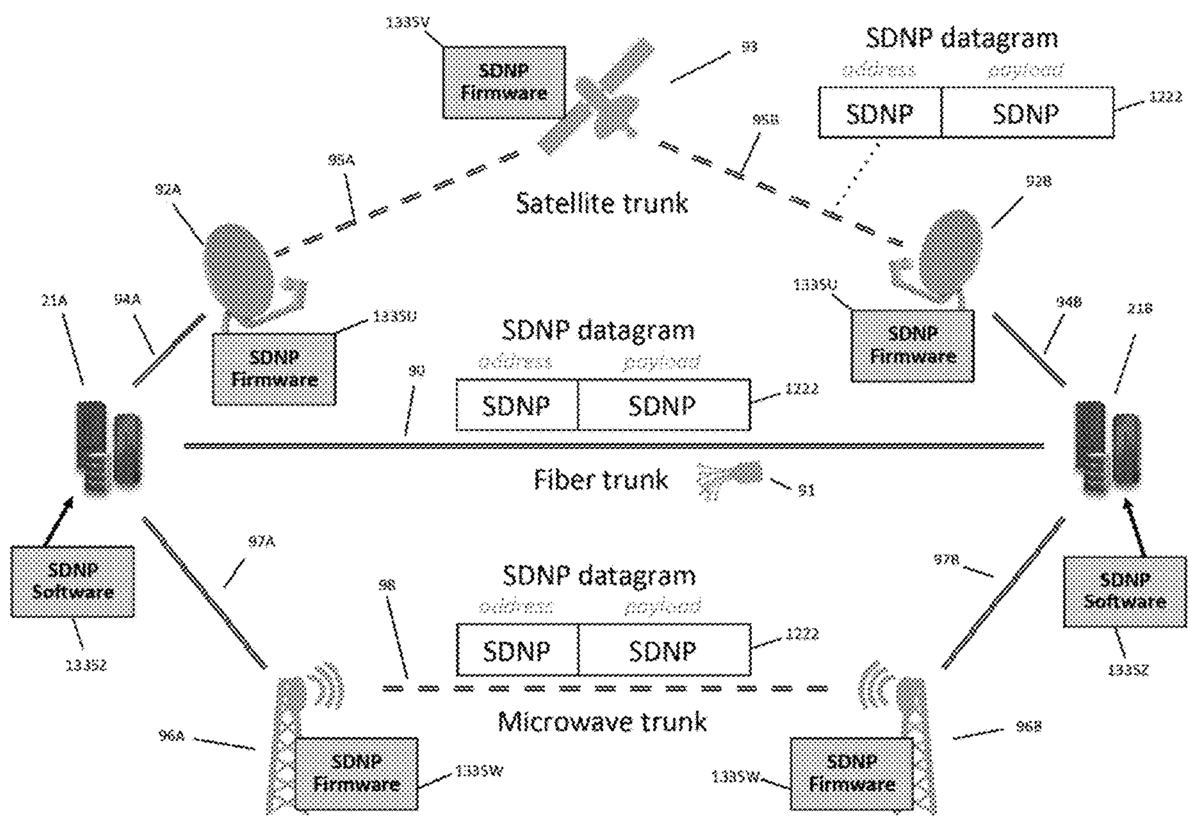
FIG. 37 illustrates HyperSecure trunk line communication over microwave, satellite, and fiber networks.

Aside from conventional Last Mile communication, the same SDNP bridge technology can be used to send large amounts of data using HyperSecurity over long distances, i.e. digital trunk communication. Three such example are shown in FIG. 37, namely microwave trunk 98, fiber trunk 90, and satellite trunks 95A and 95B. While this function may be considered as part of a SDNP cloud, the single data route is similar to that of Last Mile communication, and therefore employs similar methods to insure HyperSecurity. For example, servers 21A and 21B operating SDNP software 1335Z may communicate over microwave trunk 98 via microwave towers 96A and 96B running SDNP firmware 1335W using data packet 1222 comprising SDNP datagrams, or alternatively servers 21A and 21B may communicate directly over fiber trunk 98 also using data packet 1222 comprising SDNP datagrams. In global communication, for example in a transpacific data link, servers 21A and 21B may communicate with satellite 93 running SDNP firmware 1335V by means of microwave satellite trunks 95A and 95B, using earth based satellite antennae 92A and 92B, both running SDNP firmware 1335U. As in the fiber and microwave tower examples, satellite trunk communication utilizes data packet 1222 comprising SDNP datagrams.

Figure 38:
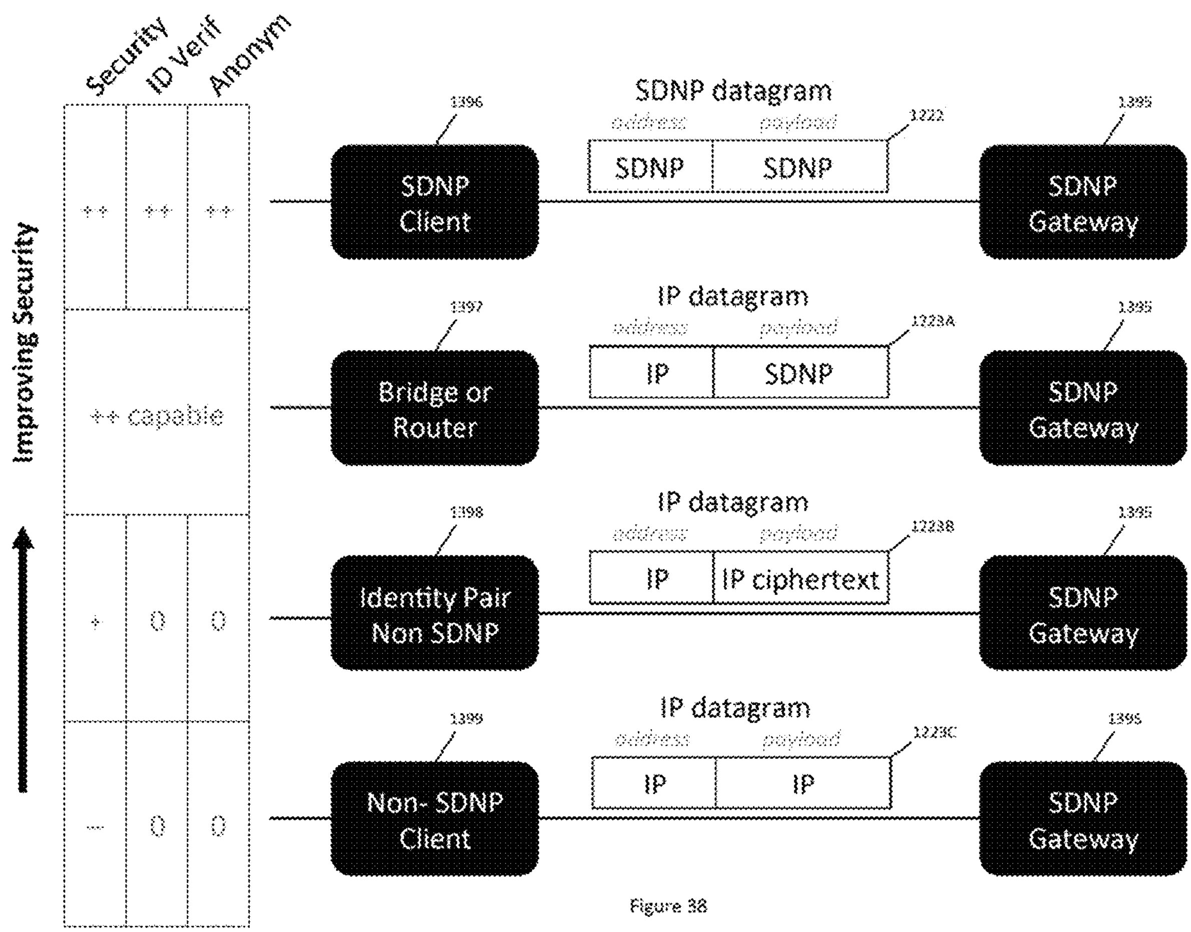
FIG. 38 illustrates a comparison of security, identity verification, and caller anonymity features for HyperSecure, secure, and unsecure communication networks.

In conclusion, the security and privacy features offered in Last Mile communication depend on the two communicating devices. FIG. 38 contrasts four different combinations representing, in order from bottom to top, increasing security and privacy. In each case, three factors are considered, (i) security, the ability to prevent unauthorized access to the communiqué s, (ii) ID verification, the ability to authenticate the user and adjust access and privileges based on their identity, and (iii) anonymity, the ability to disguise the identity of callers from surveillance.

In the bottom example SDNP gateway 1395 communicates openly with a non-SDNP client lacking any security provisions using data packet 1223C comprising an IP datagram with a sniffable IP address and an IP payload. As such the Last Mile connection is not secure and not private. In the example second from the bottom, SDNP gateway 1395 communicates with a non-SDNP client offering features of device authorization and identity pairing. Communication is by means of data packet 1223B comprising an IP datagram with a sniffable IP address but using an encrypted payload comprising ciphertext where only the identity-paired device can perform decryption. While the communication is not private or anonymous, it does offer enhanced security, at least for limited durations.

The example next to the top illustrates that SDNP gateway 1395 can route communications through any bridge or router 1397 and still achieve HyperSecurity, provided that data packet 1223A comprises a SDNP payload within the IP datagram. The level of security achieved, depends only on the end device, not on the router. In the top example, communication between a SDNP gateway 1395 and a SDNP Client 1396 using data packets 1222 comprising SDNP datagrams with SDNP addressing, i.e. using source and destination addresses not recognizable by Internet DNS name servers, and using SDNP secured payloads, is HyperSecure, offering superior security, full privacy provisions, and anonymous packet routing.

HyperSecure Last Mile Packet Routing—

Independent of the Layer 1 physical hardware and Layer 2 data link algorithms and methods employed, routing of packets between an SDNP client or SDNP-bridge and the SDNP gateway relies on IP datagrams to carry and route the data packets across the Last Mile. Unlike data routing within the SDNP cloud directed by SDNP signaling servers, the SDNP cloud or its signaling servers do not control IP datagrams traversing the Last Mile. As such, some variability in Last Mile propagation delays is to be expected. Fortunately because the distances of Last Mile communication and the number of possible routes are limited, this uncertainty is small compared to the total end-to-end propagation delay of a global communication. Variation in total propagation delays because of Last Mile variability is estimated to be less than 10% of the aggregate delay.

Figure 39:
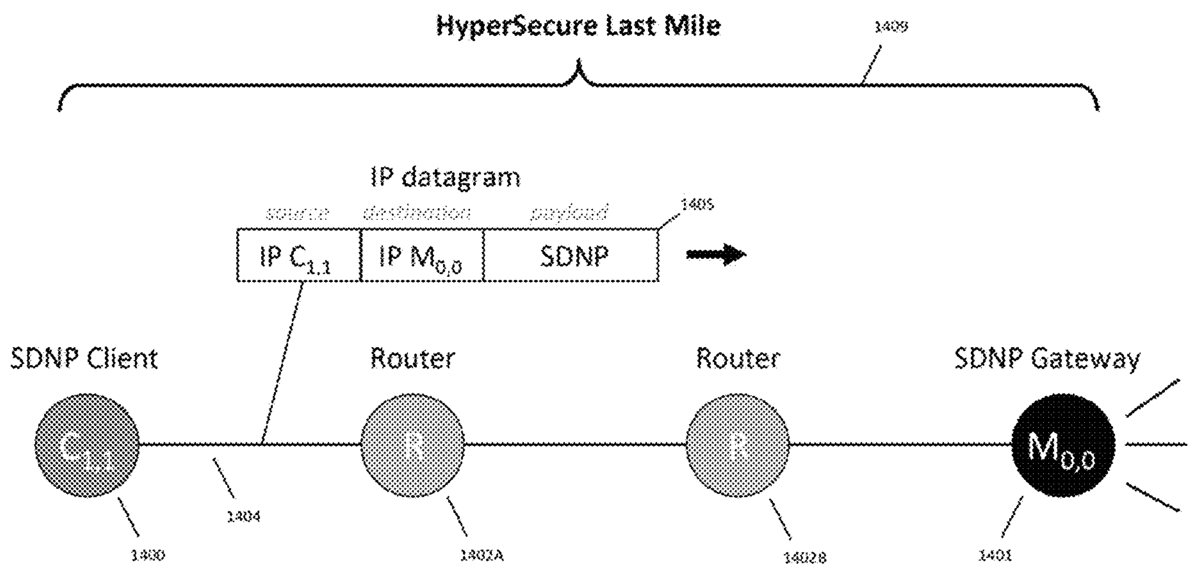
FIG. 39 is a schematic representation of single-route last mile HyperSecure communication with static IP addresses.

FIG. 39 illustrates single route Last Mile communication between SDNP client 1400 and SDNP gateway 1401 using fixed IP addresses. IP datagram 1405 includes the IP destination address of $M_{0,0}$ (the SDNP gateway), and the IP address of the data packet's source $C_{1,1}$, the SDNP client. Last Link communication occurs through a single route 1404 to router 1402A. The data is routed through any number of routers R, e.g. router 1402B, to the SDNP gateway $M_{0,0}$.

Figure 40A:
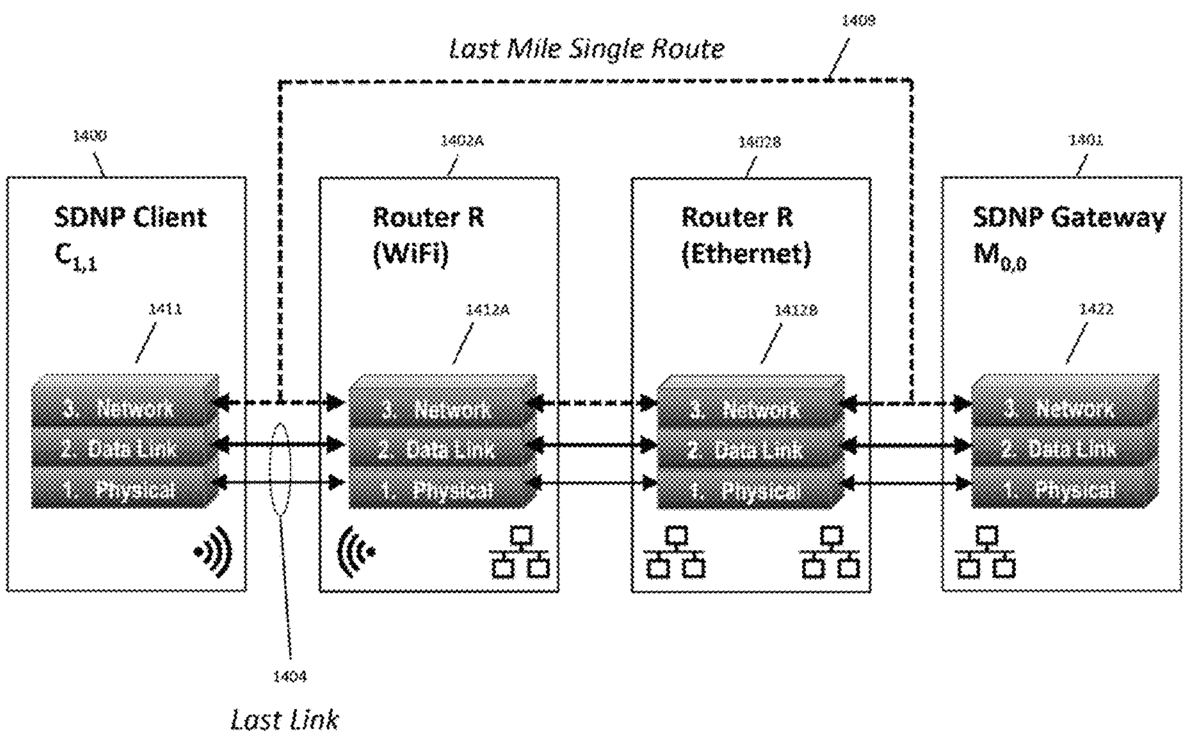
FIG. 40A is a schematic IP stack depiction of single-route last mile HyperSecure communication using static IP addresses.
Figure 40B:
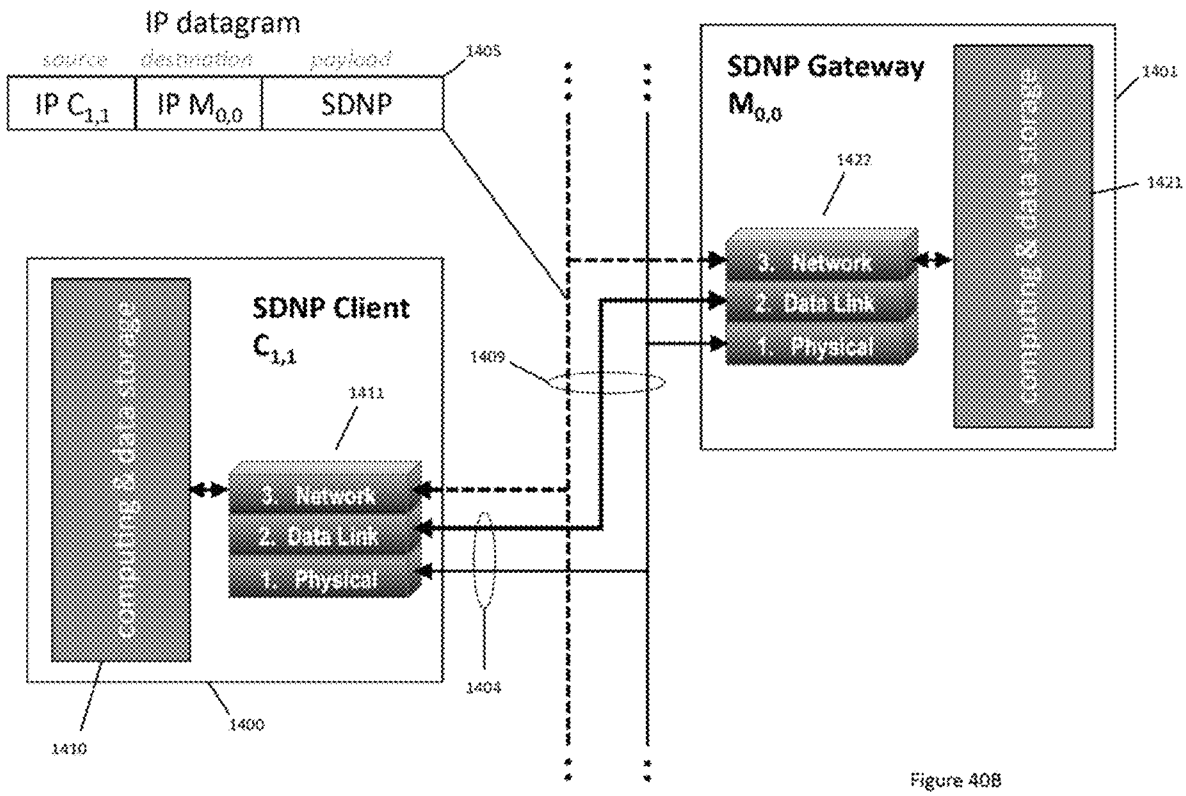
FIG. 40B is a simplified representation of single-route last mile HyperSecure communication using static IP addresses.

An alternative representation of the Last Mile network connection depicts each communication device as an IP stack representing the PHY, data link, and network connections as OSI Layers 1, 2, and 3. For example, FIG. 40A is an IP stack depiction of single-route last mile HyperSecure communication using static IP addresses. As such, client device comprising SDNP client $C_{1,1}$ establishes a single route Last Mile connection 1409 with SDNP gateway 1401 comprising SDNP gateway $M_{0,0}$ through routers 1402A and 1402B where router 1402A comprises a WiFi router and router 1402B is an Ethernet router. Client device 1400 connects to router 1402A through Last Link 1404 where the PHY Layer 1 physical connection and the corresponding data link Layer 2 of client IP stack 1411 connects to corresponding Layer 1 and Layer 2 in router IP stack 1412A. In turn, router 1402A connects to router 1402B using Ethernet where the PHY Layer 1 physical connection and the corresponding data link Layer 2 of the WiFi router's IP stack 1412A connects to corresponding Layer 1 and Layer 2 in Ethernet router IP stack 1412B. Finally, router 1402B connects to SDNP gateway server 1401 using Ethernet where the PHY Layer 1 physical connection and the corresponding data link Layer 2 of the Ethernet router's IP stack 1412B connects to corresponding Layer 1 and Layer 2 in the gateway's IP stack 1422. In operation, routers carry data undisturbed, so that network Layer 3 IP datagrams, flow from one IP stack to another transparently, specifically from Layer 3 in IP stack 1411 to 1412A, 1412B and finally to 1422. In this manner, the network carries the IP datagrams as single route data across a virtual Last Mile connection 1409 even if the data physically passes through multiple devices In other words, Layer 3 network data flows through the Last Mile independent of the physical connections used to carry the IP datagrams, i.e. Layer 3 Last Mile communication operates agnostically to the underlying Layer 1 and Layer 2 implementations used for data transfer. This principle can by represented in simplified form by removing the intermediate nodes from the schematic as shown in FIG. 40B, where client device 1400 and SDNP gateway server 1401 including communication IP stacks 1411 and 1422 transporting data to and from corresponding computing and data storage functions 1410 and 1421. IP datagram 1405 flows over Last Mile connection 1409 regardless of the media or the number of routers used in the data packet delivery process. The Last Mile may be therefore be considered as a "data construct", i.e. an abstraction to mean any and all physical means be which the IP datagram is transported between and among devices. The Last Link, however, has more of a physical meaning because the connected device of the caller must be able to connect to the upstream router of the communication link cannot be established. For example, if a caller has a tablet computer with only a WiFi connection and is sitting in a café with WiFi, but the caller does not have the WPA password to the WiFi network, then the Last Link cannot be established, and the caller cannot connect to the Last Mile, to the SDNP cloud, or place a call.

Another consideration of Last Mile communication is that the payload of IP datagram 1405 contains all the information for upper OSI layers, including the transport Layer 4 data, session Layer 5 data, presentation Layer 6 data, and application Layer 7 data. Aside from Layer 4 data needed to select UDP or TCP transport protocols, the remaining data in the IP datagram's payload is specific to the disclosed SDNP communication and cannot be interpreted by routers operating along the last mile unless they themselves run SDNP software or firmware. Accordingly, only the end devices, i.e.

the caller or SDNP client and the SDNP gateway, can interpret Last Mile communication even though the Last Mile network itself may comprise an amalgamate of different devices, carriers, and network operators.

Although the SDNP payload is secured by numerous secrets including scrambling, fragmentation, junk data insertions and deletions, state dependent formatting, and dynamic encryption, the IP addresses of an IP datagram passing over a Last Mile network, necessarily reveal the source and destination addresses of the client's device 1400 and of the SDNP gateway server 1401. In order to provide a degree of anonymity over the Last Mile, address deception is beneficial, i.e. misdirecting cyber-attackers by dynamically changing the source and destination addresses in the IP datagram. IP deception can be accomplished by dynamically changing the IP address of the caller's connected device, herein referred to as "dynamic client addressing", or by communicating with multiple SDNP gateways, i.e. multi-route Last Mile communication.

Figure 41:
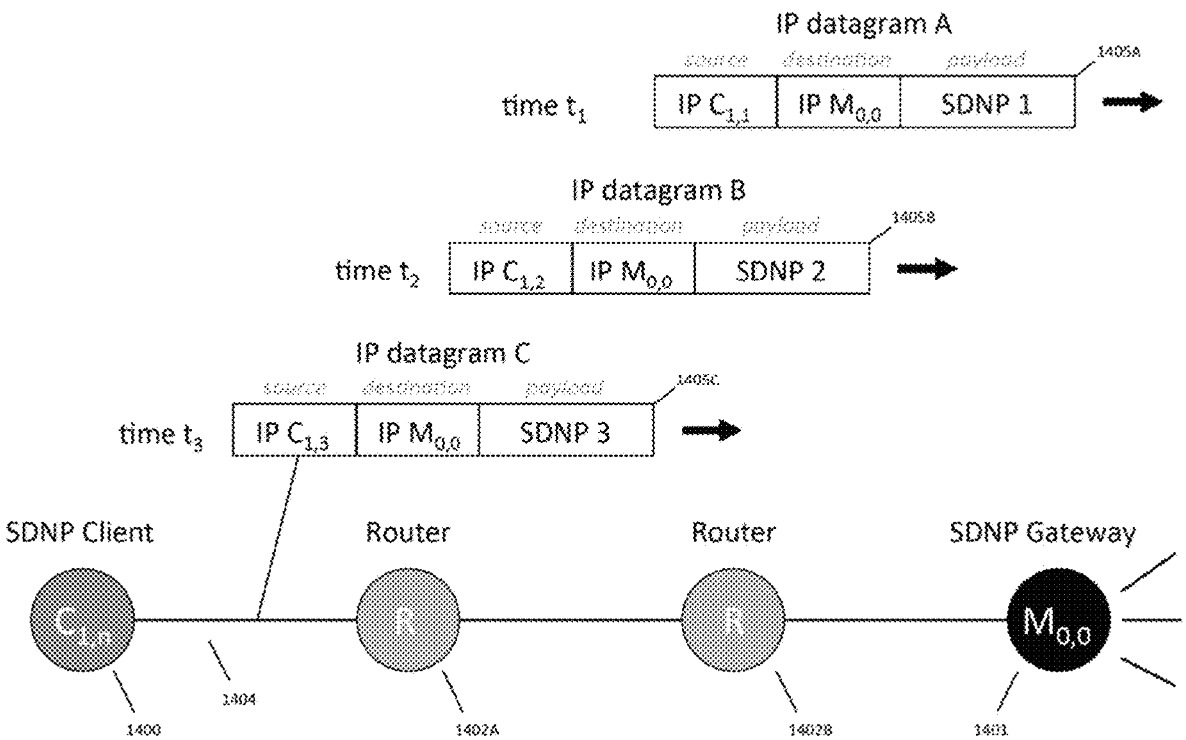
FIG. 41 is a schematic representation of single-route last mile HyperSecure communication with dynamic client IP addresses.

The first method of IP address deception described involves dynamically altering the source address of sequential data packets. As shown in FIG. 41, IP datagrams A, B, and C sent successively comprise three different source addresses. Specifically, IP datagram A 1405A includes IP source address $C_{1,1}$, IP datagram B 1405B includes IP source address $C_{1,2}$, and IP datagram C 1405C includes IP source address $C_{1,3}$. So although the packets entering router 1402A all emanate from SDNP client 1400, the clients source address $C_{1,n}$ changes dynamically obfuscating the true IP address and appearing to be more than one communicating device. To complete the charade, the MAC address of the communicating device should also change correspondingly with the dynamic source address.

Figure 42A:
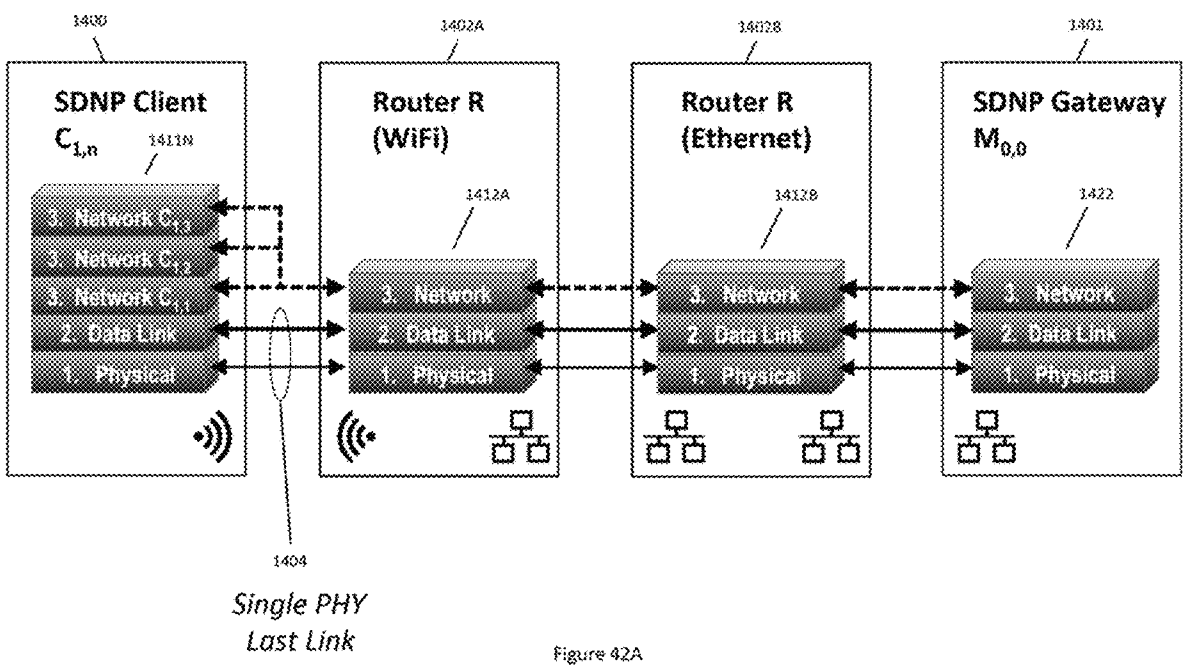
FIG. 42A is an IP stack depiction of single-route last mile HyperSecure communication using dynamic client IP addresses.
Figure 42B:
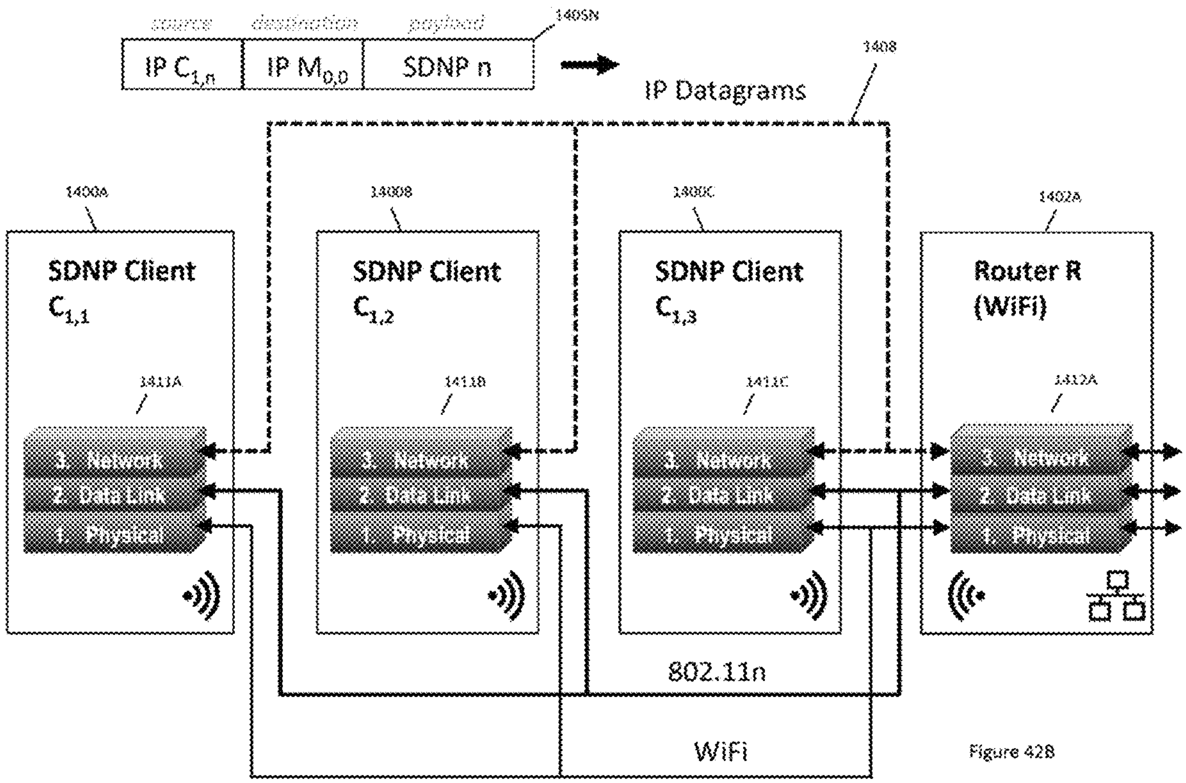
FIG. 42B is an alternate IP stack representation of single-route last mile HyperSecure communication employing dynamic client IP addresses.

This method is illustrated using IP stacks in FIG. 42A where devices 1400, 1402A, 1402B, 1401 communicate through corresponding IP stacks 1411N, 1412A, 1412B, and 1422 using WiFi and Ethernet but where the SDNP client's network Layer 3 identity comprises multiple IP addresses $C_{1,1}$, $C_{1,2}$, and $C_{1,3}$. The result is that the sequential data packets entering router 1402A appear to be sent from three different client devices, not one as depicted in the schematic representation of the Last Link shown in FIG. 42B. The shared PHY layer comprises WiFi standard frequencies and the data link layer connecting the devices follows established standards such as 802.11ac or 802.11n.

The IP datagrams 1405N sent to router device 1402A along network connection 1408 comprise a fixed destination IP address IP $M_{0,0}$ and sequential source addresses IP $C_{1,1}$, IP $C_{1,2}$, IP $C_{1,3}$, etc., represented in mathematical notation as IP $C_{1,n}$ where n=1, 2, 3, . . . uniquely identifying each sequential packet. Each sequential IP packet also includes a corresponding payload SDNP 1, SDNP 2, SDNP 3, and so on. Note that although this description refers to each IP address using mathematical shorthand notation IP $C_{1,n}$, it is understood that the IP addresses comprise real IP addresses made in accordance with IPv4 or IPv6 international standards and exclude any reserved IP addresses.

Figure 43:
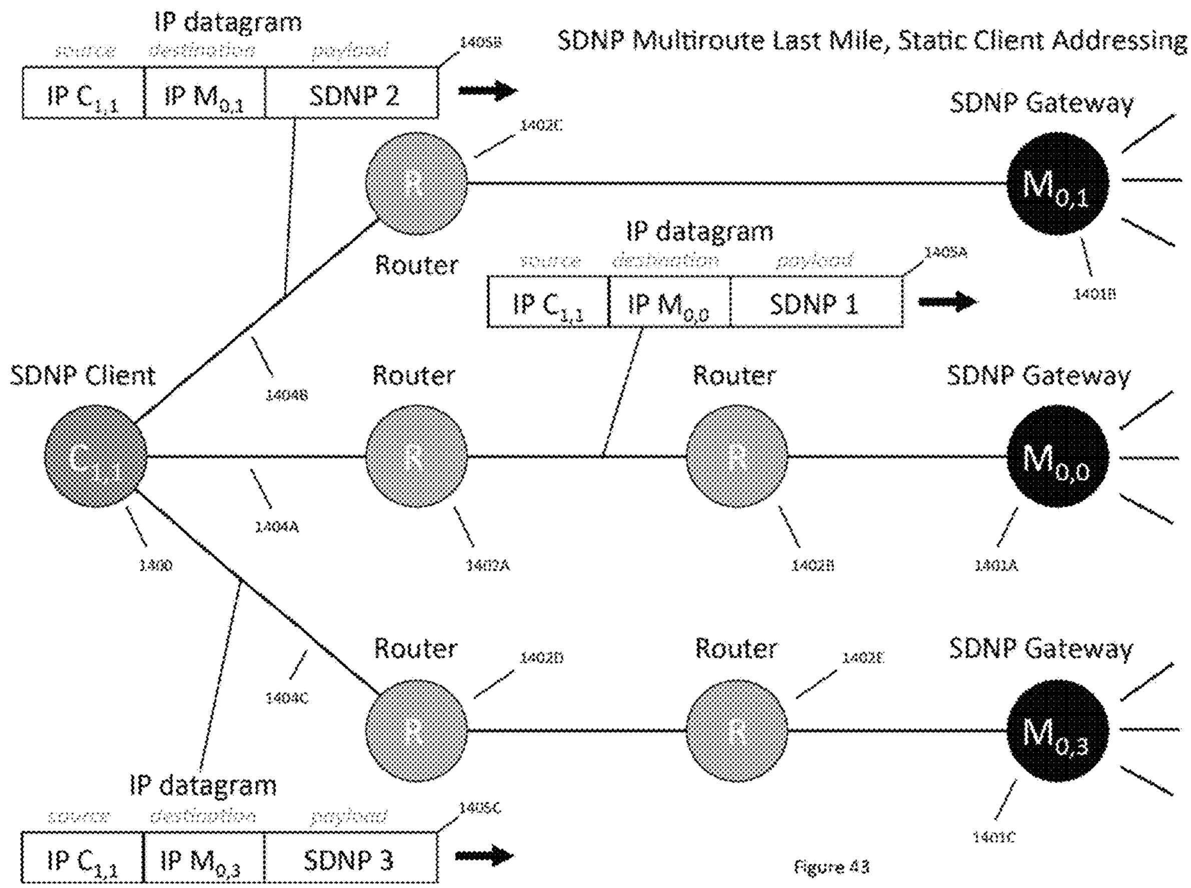
FIG. 43 is a schematic representation of multi-route last mile HyperSecure communication with static IP addresses.

Another option to enhance security is to employ multiroute packet transport in the Last Mile. In a manner similar to data transport within the SDNP cloud, in multiroute Last Mile communication, audio and sequential data is parsed and fragmented, then divided into separate packets and addressed to different SDNP gateways. An example of multiroute data transport using static IP addresses is shown in FIG. 43 where SDNP client 1400 communicates with multiple gateways 1401A, 1401B, and 1401C. As shown, first data packet 1405A comprises payload SDNP 1 with IP source address $C_{1,1}$ and destination address $M_{0,0}$. Data packet 1405A is then routed over Last Link 1404A through routers 1402A and 1402B to SDNP gateway 1401A. In a similar manner a second data packet 1405B comprises payload SDNP 2 with IP source address $C_{1,1}$ and destination address $M_{0,1}$. Data packet 1405B is then routed over Last Link 1404B through router 1402C to SDNP gateway 1401B. A third data packet 1405C comprises payload SDNP 3 with IP source address $C_{1,1}$ and destination address $M_{0,3}$. Data packet 1405C is then routed over Last Link 1404C through router 1402D and 1402E to SDNP gateway 1401C.

In the path between the client device 1400 and one of the three gateways 1401A, 1401B or 1401C shown, the IP datagrams are routed through multiple Last Links 1404A, 1404B, and 1404C to multiple routers 1402A, 1402B, and 1402C. These routers may comprise (i) completely independent routers employing identical physical mediums such as WiFi or Ethernet, (ii) multiple router channels in a common hardware device, e.g. multiple trellis channels in a DOCSIS3 cable modem or (iii) different physical mediums for communication, e.g. one routed through WiFi, another through 3G, etc.

Figure 44A:
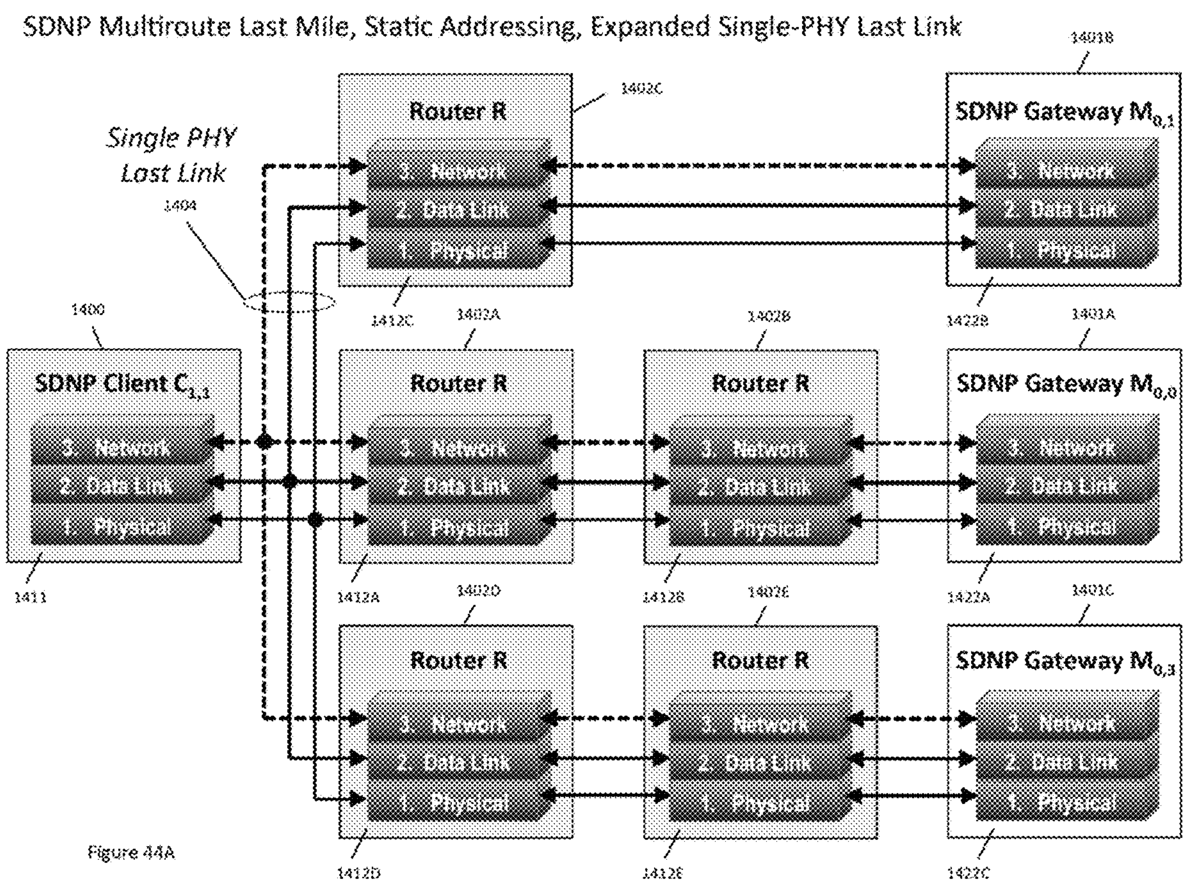
FIG. 44A is an IP stack depiction of multi-route last mile HyperSecure communication with static IP addresses using a single PHY last link.

For example, FIG. 44A illustrates an IP stack depiction of the aforementioned multi-route last mile HyperSecure communication over a common PHY Last Link 1404 using static IP addresses. In operation, SDNP client $C_{1,1}$ communicates with routers 1401A, 1402B, and 1402C as a single device connection using common PHY, data link, and network layers. Address deception is performed using successive IP datagrams comprising a static client address IP $C_{1,1}$ but with changing SDNP gateway addresses IP $M_{0,0}$, IP $M_{0,1}$, and IP $M_{0,3}$. Packet misdirection may occur algorithmically or randomly. For example, if every $10^{th}$ datagram sent from client device 1400 is directed to SDNP server 1401C, then the $10^{th}$ outgoing datagram from client device 1400 will include a destination address IP $M_{0,3}$ and a source IP address IP $C_{1,1}$. Replies from SDNP gateway server 1401C return to client device 1400 in the reverse path, i.e. with a source IP address IP $M_{0,3}$ and destination address IP $C_{1,1}$.

As shown, the PHY and data link between the client device 1400 and the routers 1402A, 1402D, and 1402C comprises a single medium, e.g. WiFi. Although the Last Link connections are represented as single lines splitting into three it should be understood that the physical connections are all made point-to-point and not by electrical Y connectors used to create parallel wires. Instead the depiction means the connections are to indicate the effect of the connection, i.e. the PHY layer of client IP stack 1411 expands one PHY connections into three, i.e. connecting to the PHY layer of IP stacks 1412A, 1412C, and 1412D. Functionally, this Last Link operates as a single output to three input expander where one client connects to three router functions, regardless of whether the router functions are contained into one common electronic apparatus or carved into distinct and separate routers. Note that, as shown, Last Link 1404 constitutes a single type of communication media—either cable, fiber, WiFi, Ethernet, or cellular.

Figure 44B:
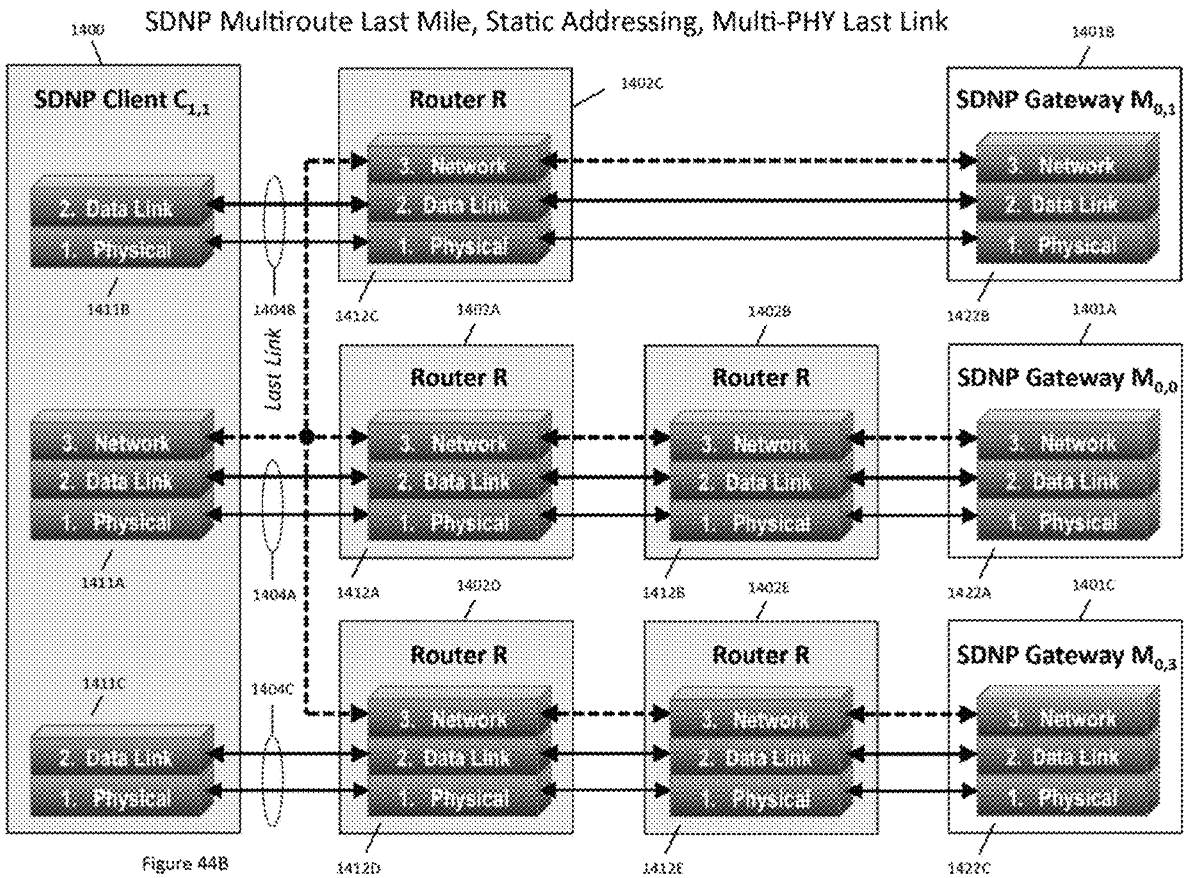
FIG. 44B is an IP stack depiction of multi-route last mile HyperSecure communication with static IP addresses using multiple PHY last links.

The remaining portions of the Last Mile however may comprise any media, not necessarily the same as the Last Link. An alternative Last Link involves multiple dissimilar PHY layers connecting to independent routers. Such an implementation, an IP stack executing multi-route last mile HyperSecure communication using static IP addresses over multiple PHY last links is illustrated in FIG. 44B. Specifically client device 1400 operates using a common network Layer 3 interface with a static client address IP $C_{1,1}$ but using separate and distinct Layer 1 and Layer 2 interfaces represented by IP stacks 1411A, 1411B, and 1411C. In operation, IP stack 1411A connects to router 1402A over Last Link 1404A directing IP datagram comprising source address IP $C_{1,1}$ and destination address IP $M_{0,0}$ traversing router 1402B. Similarly, IP stack 1411B connects to router 1402C over Last Link 1404B directing IP datagrams comprising source address IP $C_{1,1}$ and destination address IP $M_{0,1}$. IP stack 1411C connects to router 1402D over Last Link 1404C directing IP datagrams comprising source address IP $C_{1,1}$ and destination address IP $M_{0,3}$ traversing router 1402E.

Figure 45:
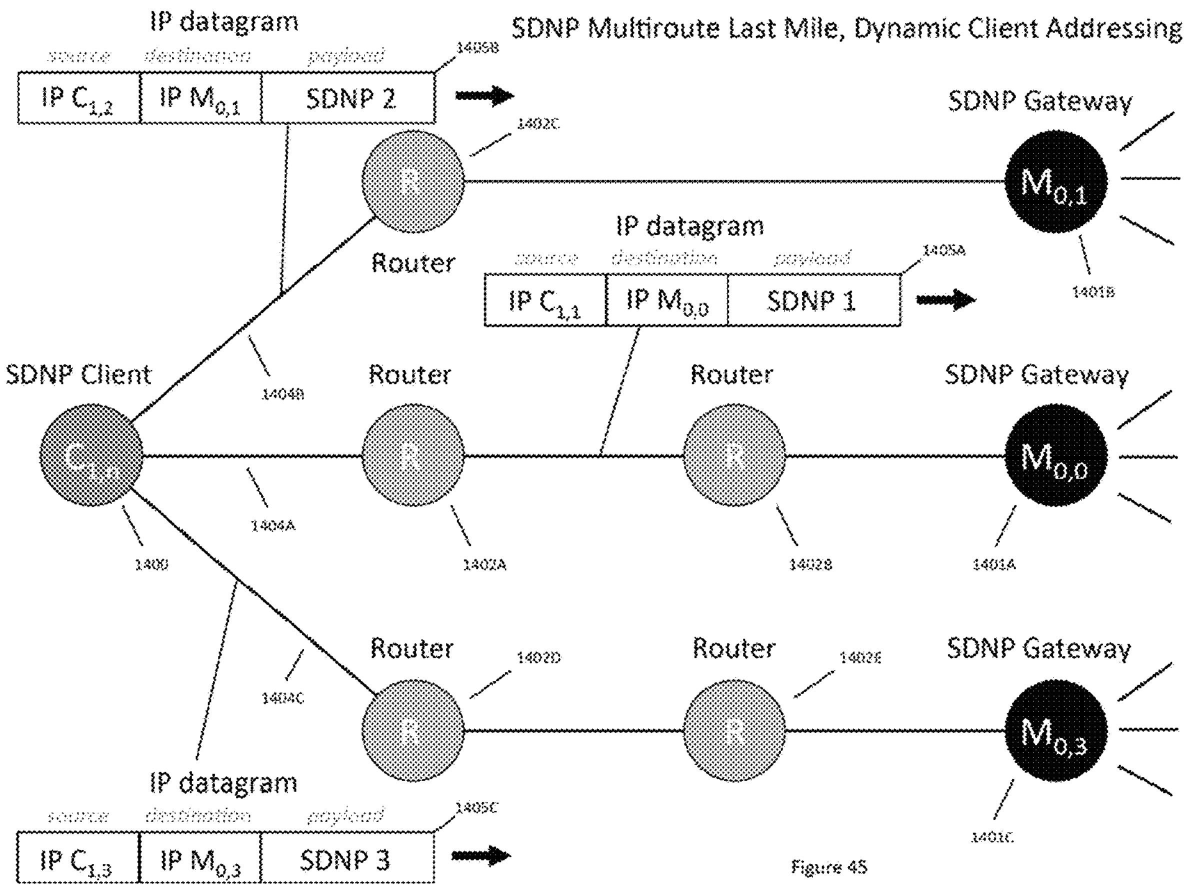
FIG. 45 is a schematic representation of multi-route last mile HyperSecure communication with dynamic client IP addresses.

The combination of dynamic source addressing and multiroute data transport is illustrated in FIG. 45, where SDNP client 1400 communicates with multiple gateways 1401A, 1401B, and 1401C using dynamic source addresses. In this method, first data packet 1405A comprises payload SDNP 1 with dynamic IP source address $C_{1,1}$ and destination address $M_{0,0}$. Data packet 1405A is then routed over Last Link 1404A through routers 1402A and 1402B to SDNP gateway 1401A. In a similar manner a second data packet 1405B comprises payload SDNP 2 with dynamic IP source address $C_{1,2}$ and destination address $M_{0,1}$. Data packet 1405B is then routed over Last Link 1404B through router 1402C to SDNP gateway 1401B. A third data packet 1405C comprises payload SDNP 3 with dynamic IP source address $C_{1,3}$ and destination address $M_{0,3}$. Data packet 1405C is then routed over Last Link 1404C through routers 1402D and 1402E to SDNP gateway 1401C.

Figure 46A:
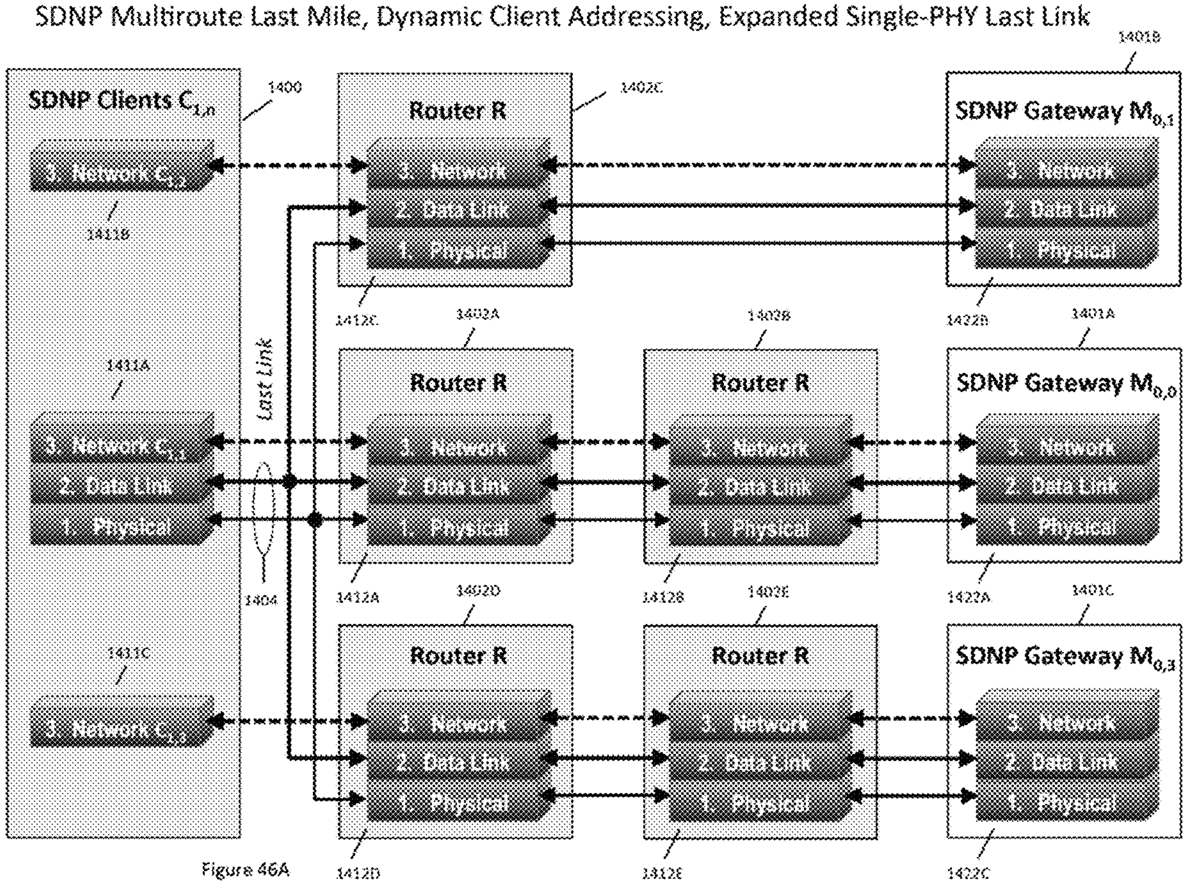
FIG. 46A is an IP stack depiction of multi-route last mile HyperSecure communication with dynamic client IP addresses using a single PHY last link.

As such, each successive data packet contains changing SDNP payloads, employs dynamically changing source addresses, routed through different Last Links to unique SDNP gateways. In order to transport data over multiple Last Links, namely Last Links 1404A, 1404B, and 1404C, either a single router with multiple IP inputs such as a DOCSIS3 cable modem with trellis encoding, or over multiple forms of media, e.g. multiple bands of WiFi, combinations of radio and WiFi, or other combinations of wireline and wireless communication are used. In one example, FIG. 46A depicts an IP stack of multi-route last mile HyperSecure communication using dynamic client IP addresses over a single PHY last link 1404. Client device 1400, illustrates a shared physical interface comprising Layer 1 and Layer 2 communication shown in IP stack 1411A. On network Layer 3, IP stack 1411A generates client address $C_{1,1}$ directed to SDMP gateway $M_{0,0}$, IP stack 1411B generates client address $C_{1,2}$ directed to SDMP gateway $M_{0,1}$, and IP stack 1411C generates client address $C_{1,3}$ directed to SDMP gateway $M_{0,3}$.

Figure 46B:
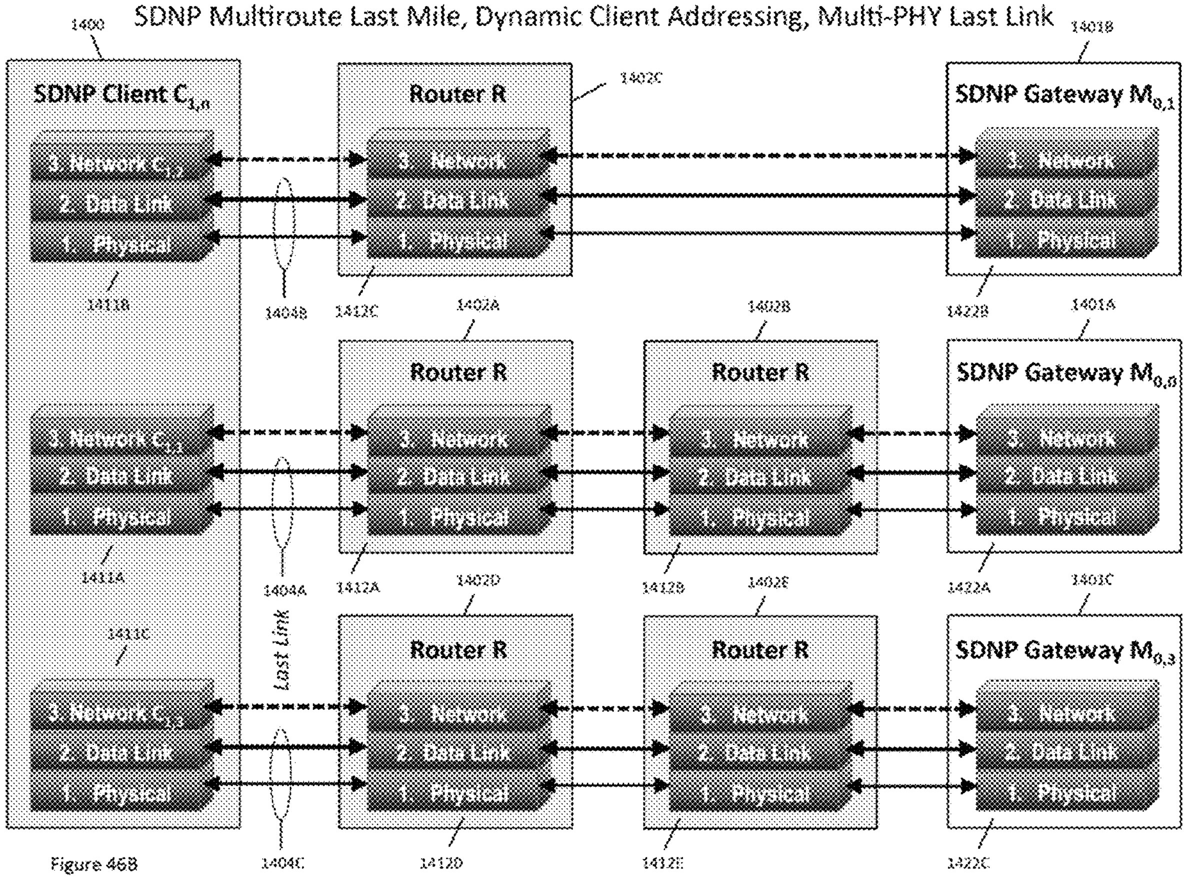
FIG. 46B is an IP stack depiction of multi-route last mile HyperSecure communication with dynamic client IP addresses using multiple PHY last links.

The same multi-route approach can be combined with dynamic client addressing and multiple PHY last layers as shown in the IP stack depiction of FIG. 46B. As shown, client device 1400 contains three IP stacks 1411A, 1411B, and 1411C transporting IP datagrams with corresponding IP addresses IP $C_{1,1}$, IP $C_{1,2}$, and IP $C_{1,3}$ over corresponding Last Links 1404A, 1404B, and 1404C to SDNP gateway having IP addresses IP $M_{0,0}$, IP $M_{0,1}$, and IP $M_{0,3}$.

Figure 47:
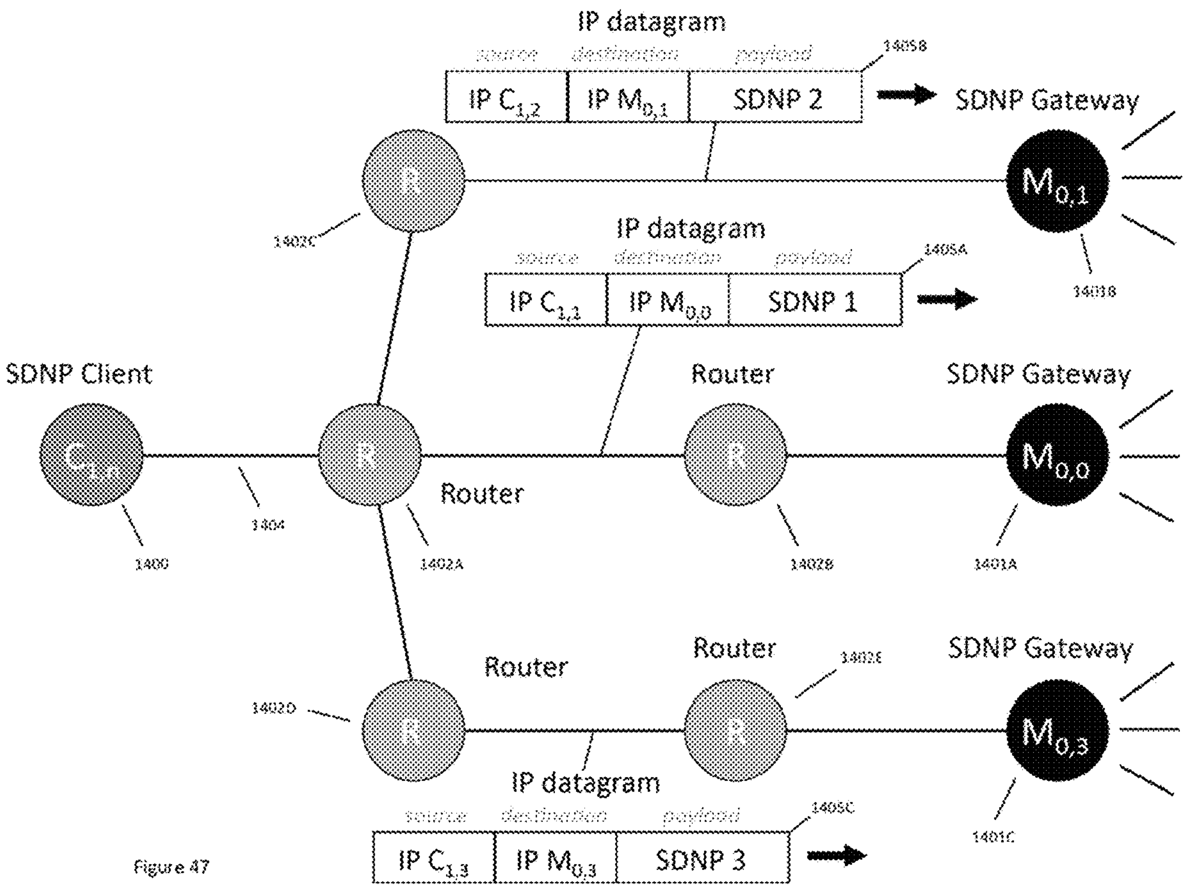
FIG. 47 is a schematic representation of an alternate version of multi-route last mile HyperSecure communication with dynamic client IP addresses.

In many cases, the Last Link comprises a single route, where beyond the first router multiroute data transport is employed. In FIG. 47, SDNP client 1400 communicates with a single router 1402A over Last Link 1404. Beyond router 1402A, the data packets are directed to multiple gateways 1401A, 1401B, and 1401C using dynamic source addresses. In this implementation, first data packet 1405A comprises payload SDNP 1 with dynamic IP source address $C_{1,1}$ and destination address $M_{0,0}$. Data packet 1405A is routed over Last Link 1404 and through routers 1402A and 1402B to SDNP gateway 1401A.

In a similar manner, a second data packet 1405B comprises payload SDNP 2 with dynamic IP source address $C_{1,2}$ and destination address $M_{0,1}$. Data packet 1405B is routed over Last Link 1404 and through routers 1402A and 1402C to SDNP gateway 1401B. A third data packet 1405C comprises payload SDNP 3 with dynamic IP source address $C_{1,3}$ and destination address $M_{0,3}$. Data packet 1405C is successively routed over Last Link 1401 and through routers 1402A, 1402D and 1402E to SDNP gateway 1401C. As such, each successive data packet contains changing SDNP payloads, employs dynamically changing source addresses, routed through a common Last Links to unique SDNP gateways.

Figure 48:
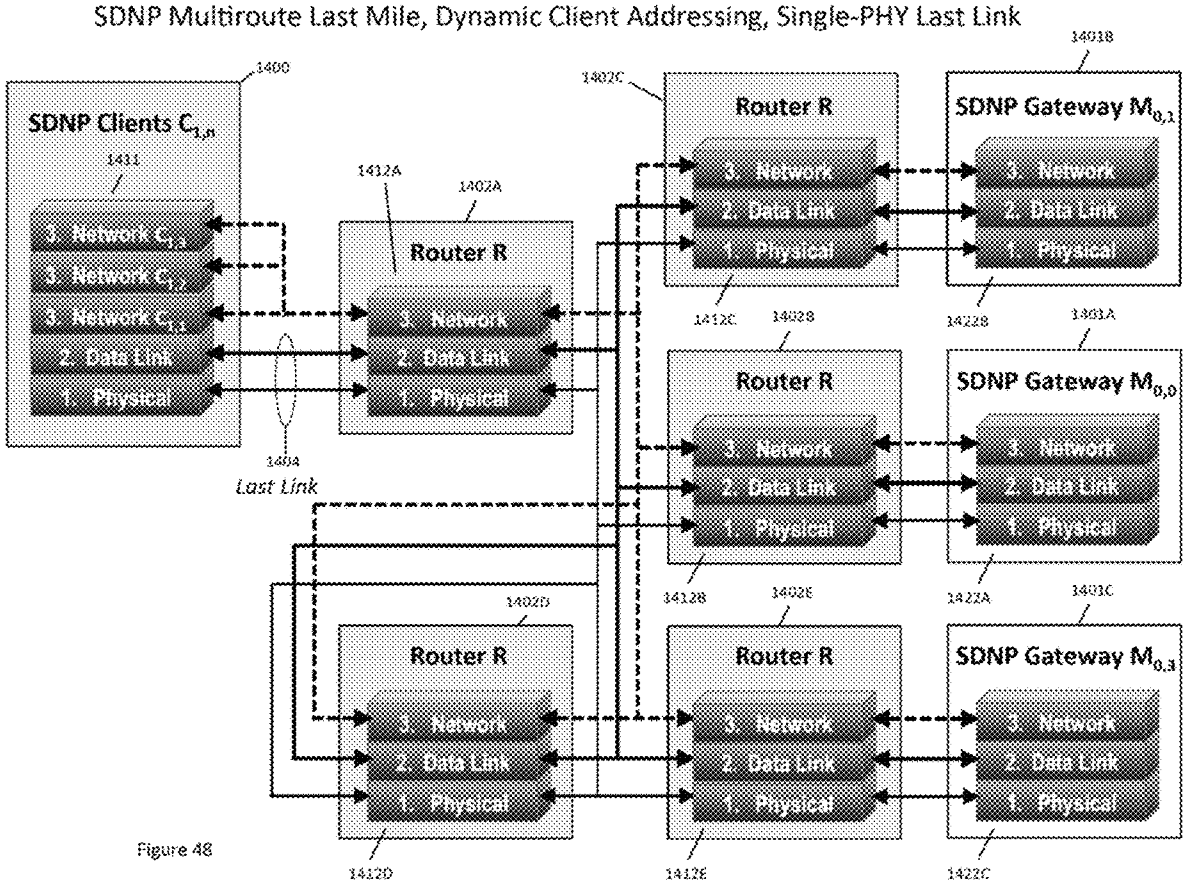
FIG. 48 is an IP stack depiction of an alternate version of multi-route last mile HyperSecure communication with dynamic client IP addresses.

This Last Mile connection is illustrated using IP stacks in FIG. 48 where IP stack 1411 in SDNP client device 1400 with a Last Link 1404 exclusively with router 1402A sends data packets on network Layer 3 to stack 1412A comprising three different network addresses, specifically IP $C_{1,1}$, IP $C_{1,2}$, and IP $C_{1,3}$. As such client device 1400 appears to router 1402A as three separate clients even though it actually comprises a single client. Once the IP datagrams reach router 1402A, they split and take different routes to different destination gateways. Packets with source address IP $C_{1,1}$, may for example, be routed through router 1402B to destination IP $M_{0,0}$, packets with source address IP $C_{1,2}$, may routed through router 1402C to destination IP $M_{0,1}$, and packets with source address IP $C_{1,3}$, may be routed through routers 1402D and 1402E to destination IP $M_{0,3}$. The routing table for directing a data packet with a given dynamic client address $C_{1,n}$ to a specific SDNP gateway is not pre-fixed and can be varied dynamically. IP addresses can be assigned on a packet-by-packet basis, further obfuscating the fact that the apparently unrelated data packets are all part of a single fragmented communication between two callers.

Physical Realization of Last Mile Routing—

Physical realization of the Last Mile may comprise communication over a variety of media, including Ethernet, WiFi, cellular, or DOCSIS3 enabled cable and fiber links. Regardless of the medium used, routing of data packets over the Last Mile is primarily controlled by three variables, namely, The media access control (MAC) addresses of communicating devices, The source IP address of the IP datagram, The destination IP address of the IP datagram.

As such, MAC addresses control the physical media used to perform each hop in the Last Mile communication, i.e. Layer 1 and Layer 2 information, while the IP addresses identity the client device and the SDNP gateway, i.e. the devices at the two ends of the Last Mile. Although the payload used in HyperSecure communication follows the protocols defined in accordance with the secure dynamic communication network and protocol, intermediate devices in the Last Mile, i.e., routers and other devices on the route of a packet between the client device and the gateway, are generally not enabled to execute SDNP functions because of the lack of SDNP executable code in such devices. Therefore, the SDNP payload has no bearing on the routing of Last Mile HyperSecure data packets.

Figure 49:
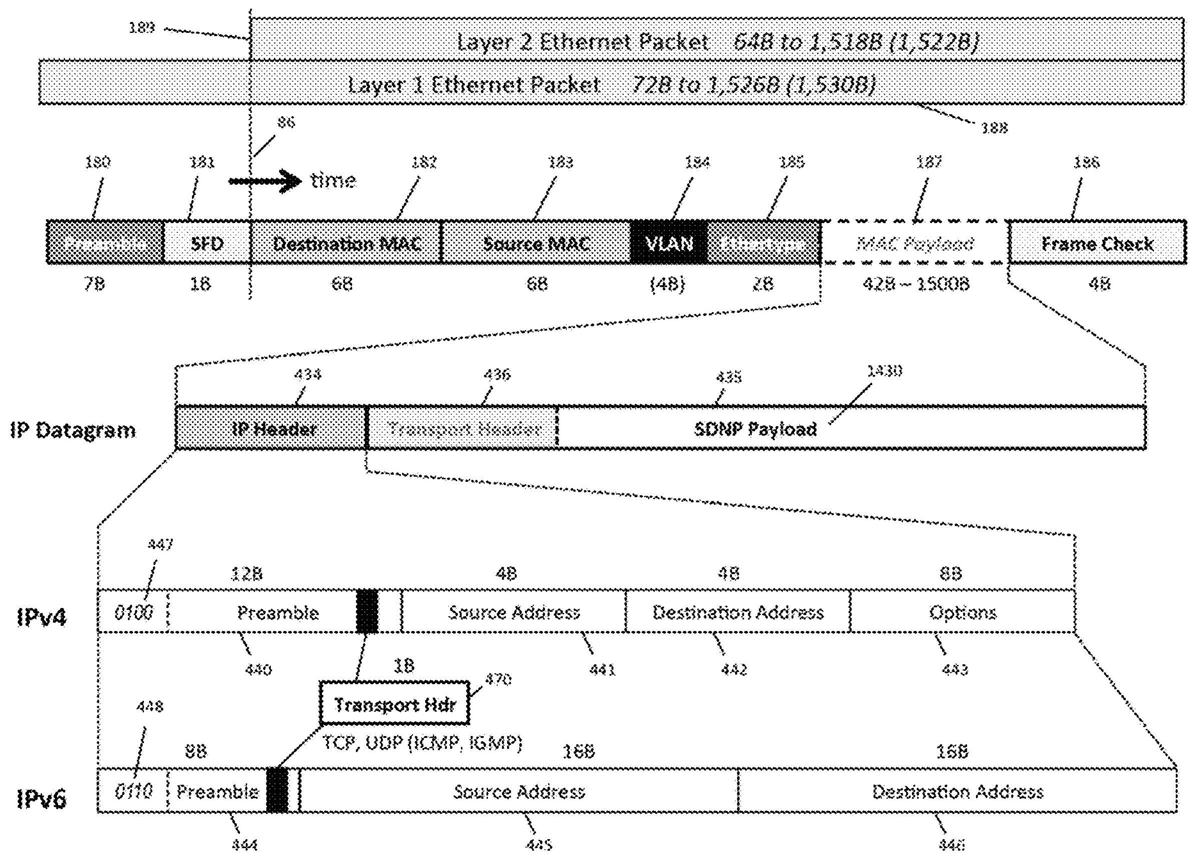
FIG. 49 is a graphical representation of IPv4 and IPv6 datagrams for Ethernet communication carrying a SDNP payload.

One example is the use of Ethernet for Last Mile communication. Adapting the Ethernet data packet described previously in FIG. 9E for SDNP Last Mile communications, FIG. 49 is a graphical representation of IPv4 and IPv6 datagrams for Ethernet communication carrying a SDNP payload. As shown, Layer 1 Ethernet packet 188 comprises data frame header, i.e. preamble 180, start frame delimiter SFD 181, and Layer 2 Ethernet packet 189. Ethernet packet 189 includes destination and source MAC addresses 182 and 183, an optional 802.1Q tag 184 for VLAN implementation, Ethertype field 185 used to specify the type of data link employed (either Ethernet II or the length specification according to IEEE802.3), and frame check 186 comprising a 32-bit CRC checksum of the entire data link packet. Ethernet packet 189 also contains variable length MAC payload 187 used to encapsulate the IP datagram's SDNP content 1430. Specifically, MAC payload 187 contains an IP header 434 and an IP payload 435 comprising transport-header 436 and SDNP payload 1430.

IP header 434 varies depending on whether the IP datagram follows the IPv4 or IPv6 protocol as determined by protocol field 447 comprising binary 4 or protocol field 448 comprising binary 6. Preambles 440 and 444 both contain a transport header flag 470 used to determine the Layer 4 transport method employed, e.g. TCP, UDP or the maintenance functions ICMP and IGMP. Specifically, in accordance with the secure dynamic communication network and protocol, TCP transport is employed for software and data files, while UDP is employed for real time data such as VoIP and video. The length and format of the transport header 436 varies in accordance with transport header 470. IP header 434 contains IPv4 source and destination addresses 441 and 442 or IPv6 source and destination addresses 445 and 446.

Last Mile routing of Ethernet packets depends both on the IP addresses and the MAC addresses, represented by exemplary names of the devices to which the IP or MAC address refer to, e.g. MAC $C_{1,1}$ or IP $M_{0,0}$. The symbolic names, representing a numeric address made in accordance with the Ethernet formatted Internet protocol, are used in lieu of numerical addresses for the sake of clarity. Note that IP address IP $C_{1,1}$ follows different formats and employs a different number of bytes for IPv4 and IPv6 names. Moreover the format for the MAC address varies with the Layer 2 data link protocol employed. As such, the MAC address MAC $C_{1,1}$ for cellular radio is not the same as the MAC address for the same device communicating using WiFi or Ethernet. MAC addresses have no relationship to IP addresses, i.e. the IP address and MAC address for the same client have no relationship.

Sequential Last Mile routing of Ethernet packets is shown in the examples of FIG. 50A through FIG. 50D. Each illustration contains two Ethernet packets—a top one comprising an IPv4 datagram and a lower one comprising an IPv6 datagram. Because IPv4 and IPv6 use different formats with varying field lengths, the two Ethernet packets shown are generally not of the same length even when carrying identical payloads. In the first step of the communication sequence, SDNP payload-A travels from SDNP client 1400 to router 1402A over Last Link 1404 and then across gateway link 1414 to the SDNP gateway 1401. A response from the SDNP gateway to the client involves SDNP payload G traveling from SDNP gateway 1401 over gateway link 1414 to router 1402A, then across Last Link 1404 to client 1400. SDNP client 1400 has numeric MAC and IP addresses MAC $C_{1,1}$ and IP $C_{1,1}$, router 1402A has numeric MAC address MAC R, and SDNP gateway has numeric MAC and IP addresses MAC $M_{0,0}$ and IP $M_{0,0}$. The IP address of router 1402A is not used in the data packets.

Figure 50A:
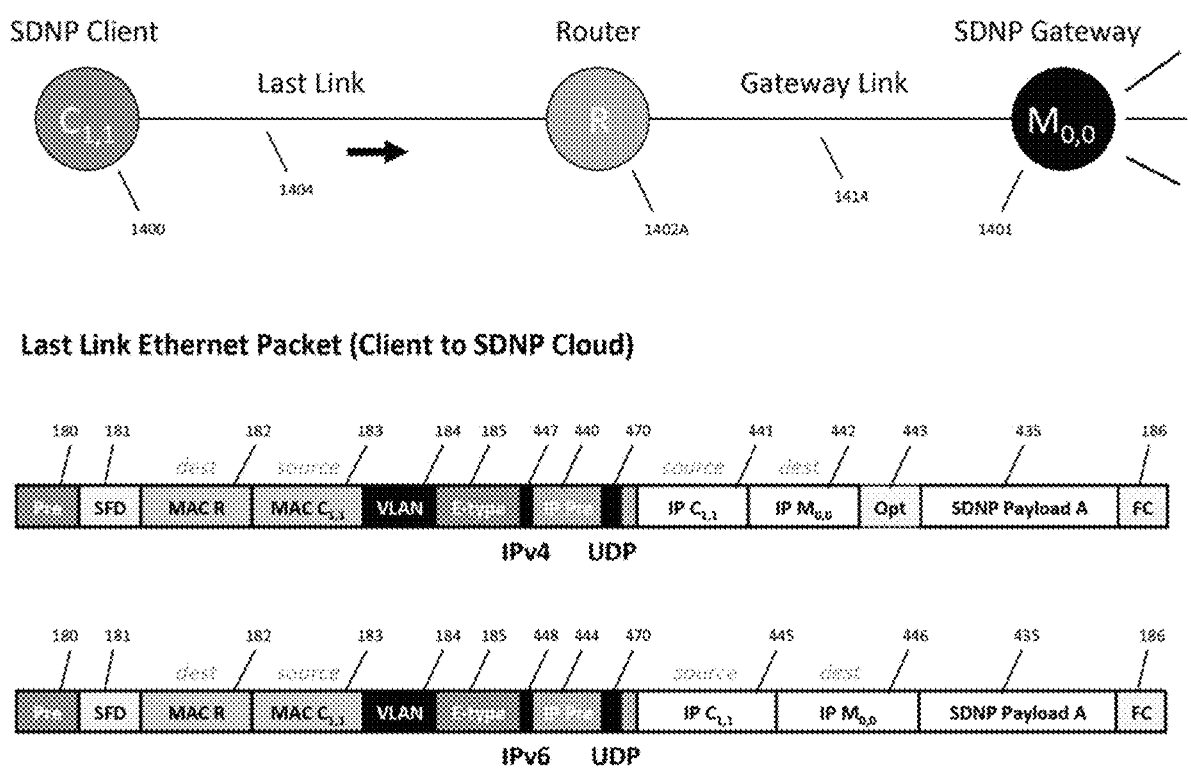
FIG. 50A is a graphical representation of IPv4 and IPv6 Last Link Ethernet packets used in client to SDNP-cloud communication.
Figure 50B:
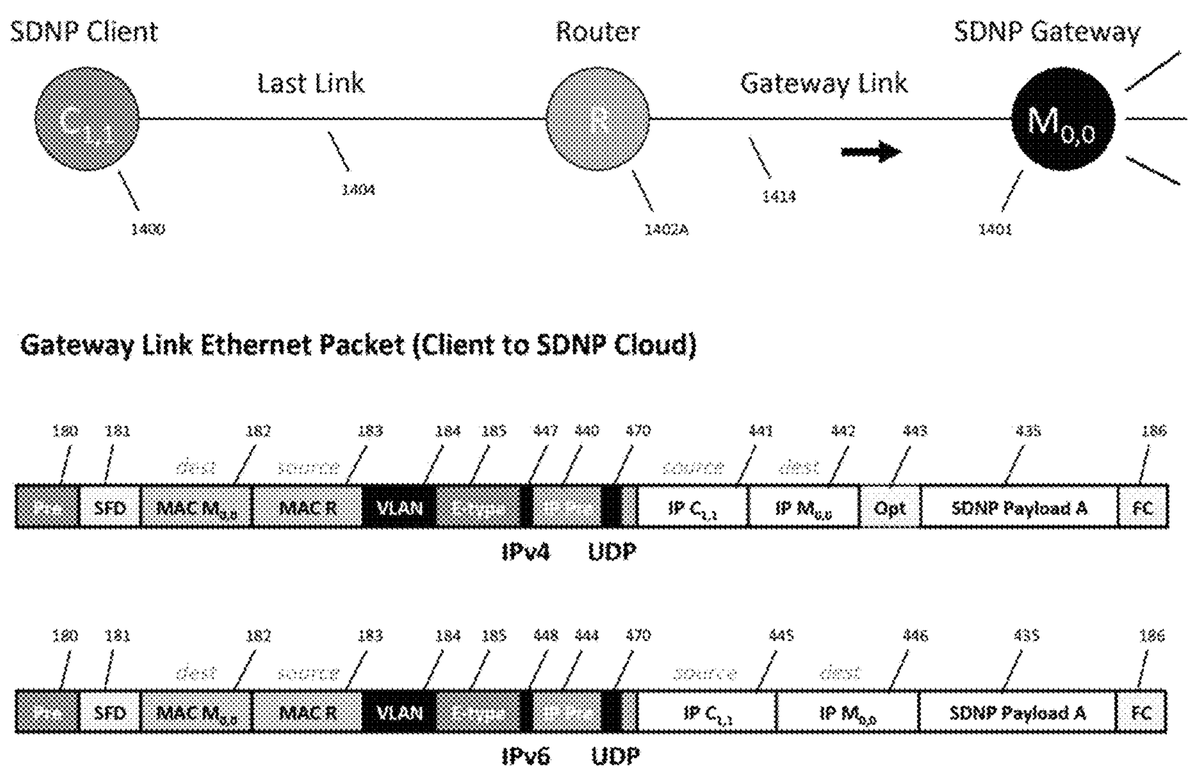
FIG. 50B is a graphical representation of IPv4 and IPv6 Gateway Link Ethernet packets used in client to SDNP-cloud communication.

Unlike in the SDNP cloud where packet routing of SDNP datagrams is completely controlled by the SDNP network, in Last Mile communication using IP datagrams, the SDNP payload cannot be interpreted or affect routing, meaning each communication transported across the Last Mile contains fixed source and destination IP addresses. The physical media or channels used to direct the Ethernet packets is governed by the MAC addresses connecting each communication node in the Last Mile. For example, FIG. 50A illustrates IPv4 and IPv6 Last Link Ethernet packets used for single-PHY routing to router 1402A comprising source MAC address MAC $C_{1,1}$, destination MAC address MAC R, source IP address IP $C_{1,1}$, destination address IP $M_{0,0}$, and a SDNP payload. FIG. 50B illustrates the corresponding Ethernet packets transporting SDNP payload A over gateway link 1414. As described, the source and destination IP addresses remain unchanged at IP $C_{1,1}$ and IP $M_{0,0}$ while the MAC source and destination addresses change from their original values to MAC R and MAC $M_{0,0}$.

Figure 50C:
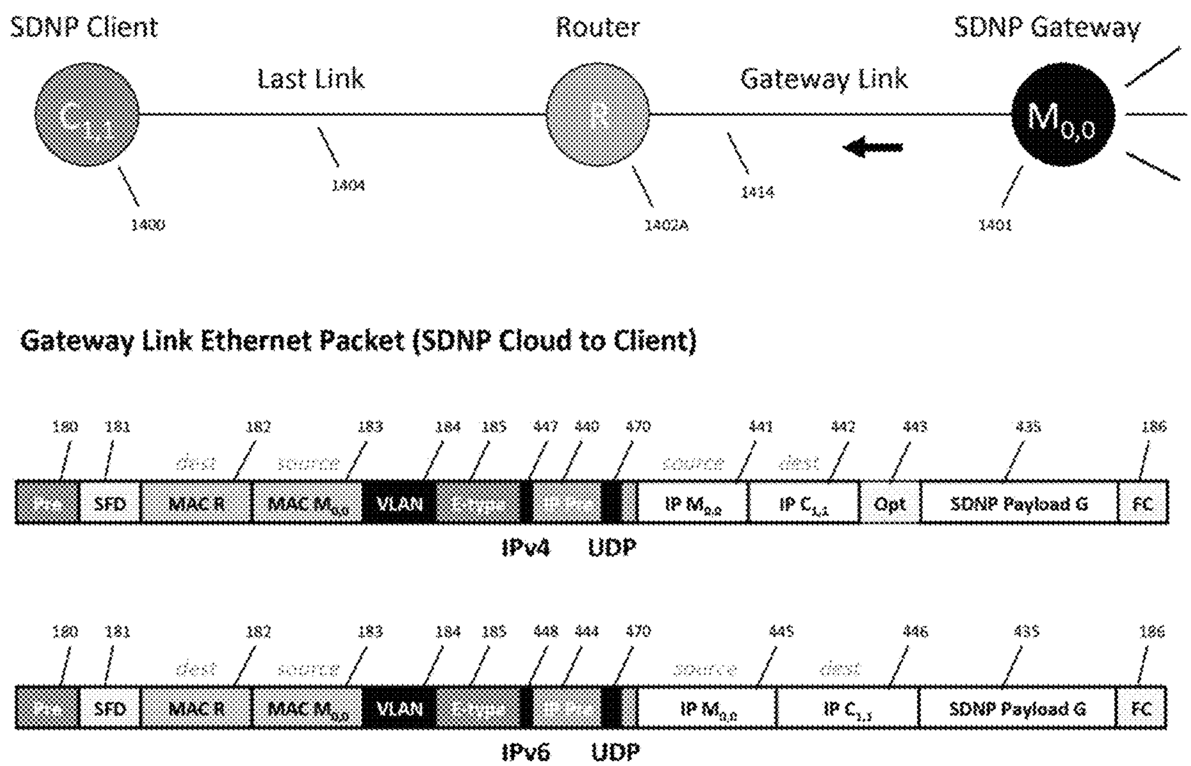
FIG. 50C is a graphical representation of IPv4 and IPv6 Gateway Link Ethernet packets used in SDNP-cloud to client communication.
Figure 50D:
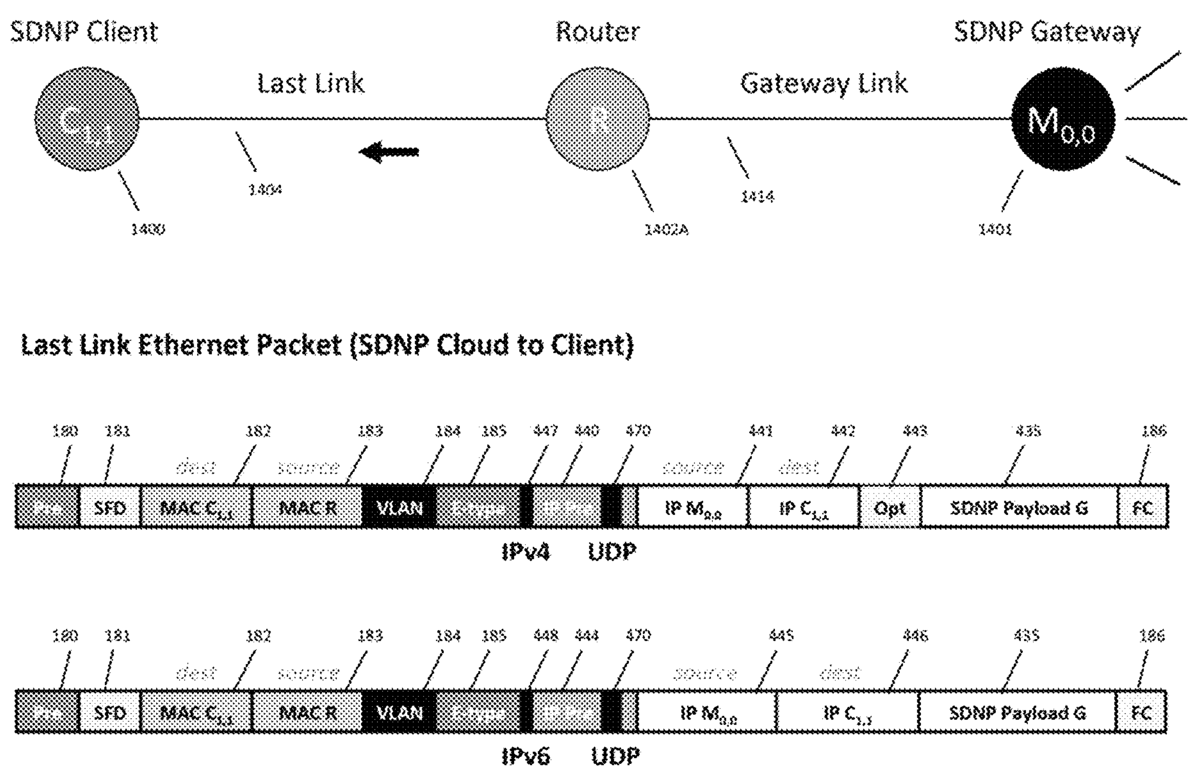
FIG. 50D is a graphical representation of IPv4 and IPv6 Last Link Ethernet packets used in SDNP-cloud to client communication.

In the reply communication from SDNP gateway 1401 to client 1400, SDNP payload G traverses the same network in reverse sequence, i.e. where the source and destination addresses are swapped. As shown in FIG. 50C, the source and destination IP addresses comprise IP $M_{0,0}$ and IP $C_{1,1}$ respectively while the MAC addresses include source address MAC $M_{0,0}$ and destination MAC R. In the Last Link communication shown in FIG. 50D, MAC addresses change to source address MAC R and destination MAC $C_{1,1}$ while the source and destination IP addresses remain unchanged to IP $M_{0,0}$ and IP $C_{1,1}$.

One convenient means to represent Last Mile communication from an SDNP client is by utilizing "abridged" data packets containing data fields containing source and destination MAC addresses, source and destination IP addresses, and the SDNP payload. The abbreviated form is convenient for illustrating data flow in any communication "session", i.e. the constructing of successive data packets transmitted across the Last Mile to the SDNP gateway, and the responses thereto. For example, successive Ethernet packets (shown in abridged form) sent from a SDNP client to the SDNP gateway is illustrated in the top portion of FIG. 51A. Each row represents successive data packets containing SDNP payloads, A, B, and C. The leftmost column illustrates the data packets in the Last Link while the right column illustrates data packets carrying the same payloads over the gateway link. As shown, all packets specify IP $C_{1,1}$ as the source IP address and IP $M_{0,0}$ as the destination IP address. Since only one pair of IP addresses are employed the Last Mile is referred to herein as a SDNP single route Last Mile communication. Furthermore, since the source IP address used by SDNP client 1400 to transport successive data packets is unchanging, the Last Link employs "static client addressing".

To facilitate Layer 2 interconnection among each communication node to its neighbors, the MAC addresses in different segments of the Last Mile necessarily change. As shown, all successive packets traveling across the Last Link from the client to the router employ source and destination MAC addresses MAC $C_{1,1}$ and MAC R. Since a single MAC address is used for the client in successive data packets, the Last Link comprises a single physical medium, i.e. a single-PHY Last Link. Transport over the gateway link employs source and destination MAC addresses MAC R and MAC $M_{0,0}$ respectively.

So although the data packet shown encloses a SDNP payload, routing over the Last Mile necessarily uses sniffable MAC and IP addresses—addresses that can be interpreted by monitored by unauthorized listeners. By tracking packets with identical source and destination IP addresses an unauthorized listener can deduce that the data packets are likely part of the same conversation or session and even though they cannot open the SDNP payload, they can still gather metadata such as call times, files sizes, data rates, etc. to develop a profile of the caller. Moreover, by following the MAC and IP addresses, metaphorically like a trail of breadcrumbs, a hacker can potentially trace a call's origin to the end device, i.e. the client device, and thereafter personally identify the caller.

As disclosed herein, a superior way to prevent client device tracing, obfuscate related call packets, and inhibit the gathering of metadata is to dynamically change MAC and IP addresses in Last Mile and Last Link communication. These inventive methods of deception include:

- Sending data packets over changing communication mediums by dynamically changing the Last Link MAC addresses, referred to herein as "multi-PHY Last Link" communication,
- Disguising the caller by dynamically changing the identity of the client device's IP address, referred to as "dynamic client addressing",
- Changing the communication path of successive data packets over the Last Mile by dynamically changing the IP address of communication to and from different SDNP gateway IP addresses, referred to herein as "multi-route Last Mile" communication.

The combination of multi-PHY, dynamic client addressing, and multi-route Last Mile communication renders tracking and tracing of Last Mile and Last Link Communication extremely challenging because only the SDNP caller and the SDNP gateway know which packets are part of the same call or session. These methods can be used separately or in combination.

Figure 51A:
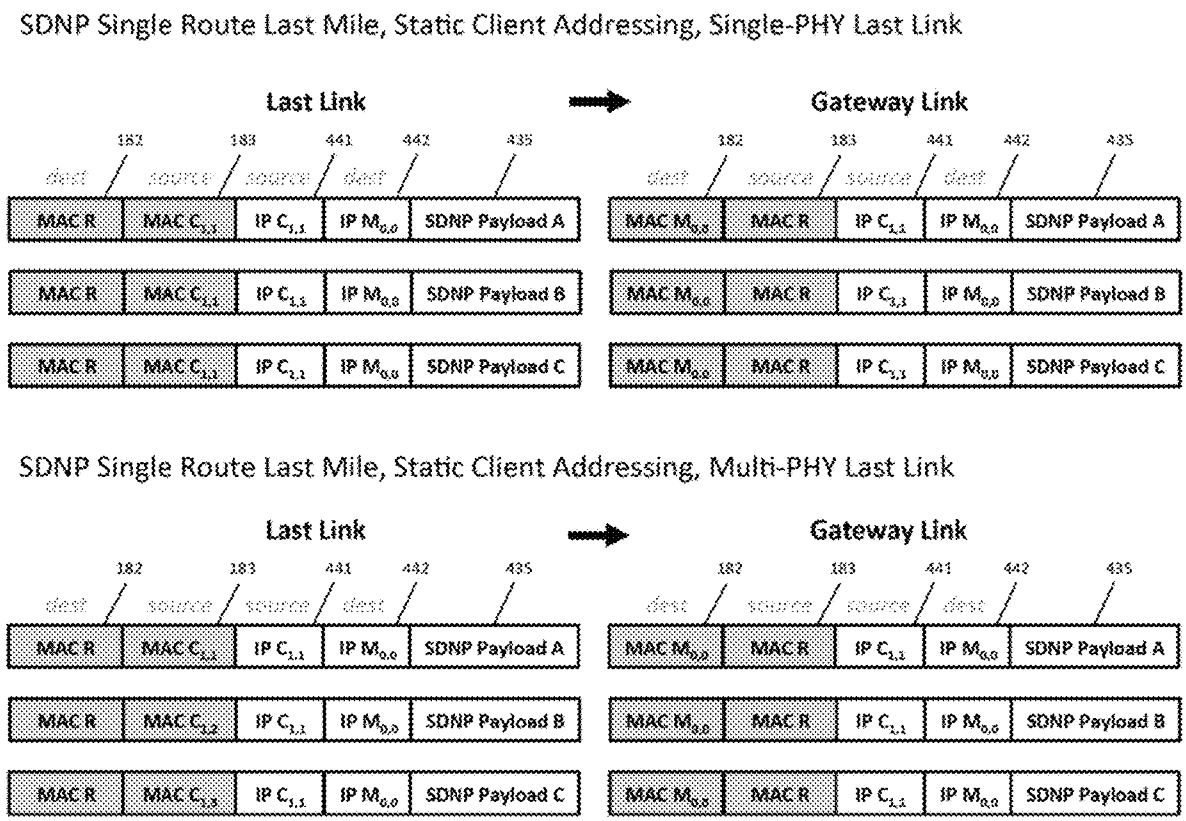
FIG. 51A illustrates successive Ethernet data packets (abridged) used in single route Last Mile communication with static client addressing.

For example, the lower half of FIG. 51A illustrates the use of multi-PHY Last Link communication in a single route Last Mile communication with static client addressing. As shown, each row comprises a pair of data packets using in a communication from an SDNP client to the SDNP gateway—the left side representing the Last Link data packet, the right side describing the gateway link data package. The three rows represent three successive messages, the top row containing the first data set "SDNP payload A", the middle row containing SDNP payload B, and the bottom row describing the third successive data packet containing SDNP payload C. For single route Last Mile communication with static client addressing all successive data packets use a static client address IP $C_{1,1}$ and fixed destination IP address IP $M_{0,0}$.

In order to execute multi-PHY Last Link communication, i.e. to route data in the Last Link over multiple physical mediums, the MAC address of the SDNP client must be dynamically changed in sequential data packets. Each MAC address corresponds to a specific PHY layer, e.g. Ethernet 100BASE-T and 1000BASE-T connections. In the case of three physical mediums, the client's MAC address is dynamically changed successively packets from MAC $C_{1,1}$ to MAC $C_{1,2}$, then to MAC $C_{1,3}$. If only two mediums are available, the MAC addresses can be varied in a random pattern to avoid pattern recognition, such as MAC $C_{1,1}$, MAC $C_{1,2}$, MAC $C_{1,2}$, MAC $C_{1,1}$, MAC $C_{1,2}$, MAC $C_{1,1}$, MAC $C_{1,2}$, MAC $C_{1,1}$, . . . While the source MAC address is varied, the MAC destination for the Last Link may remains constant, i.e. as MAC R. Since all of the Last Link's multi-PHY paths terminate in the same router, the data path through the remainder of the Last Mile remains fixed as a single route communication. In other words, even though the Last Link utilizes a multi-PHY connection, the Last Mile enters the SDNP cloud through a single gateway and the Last Mile comprises single-route communication.

Figure 51B:
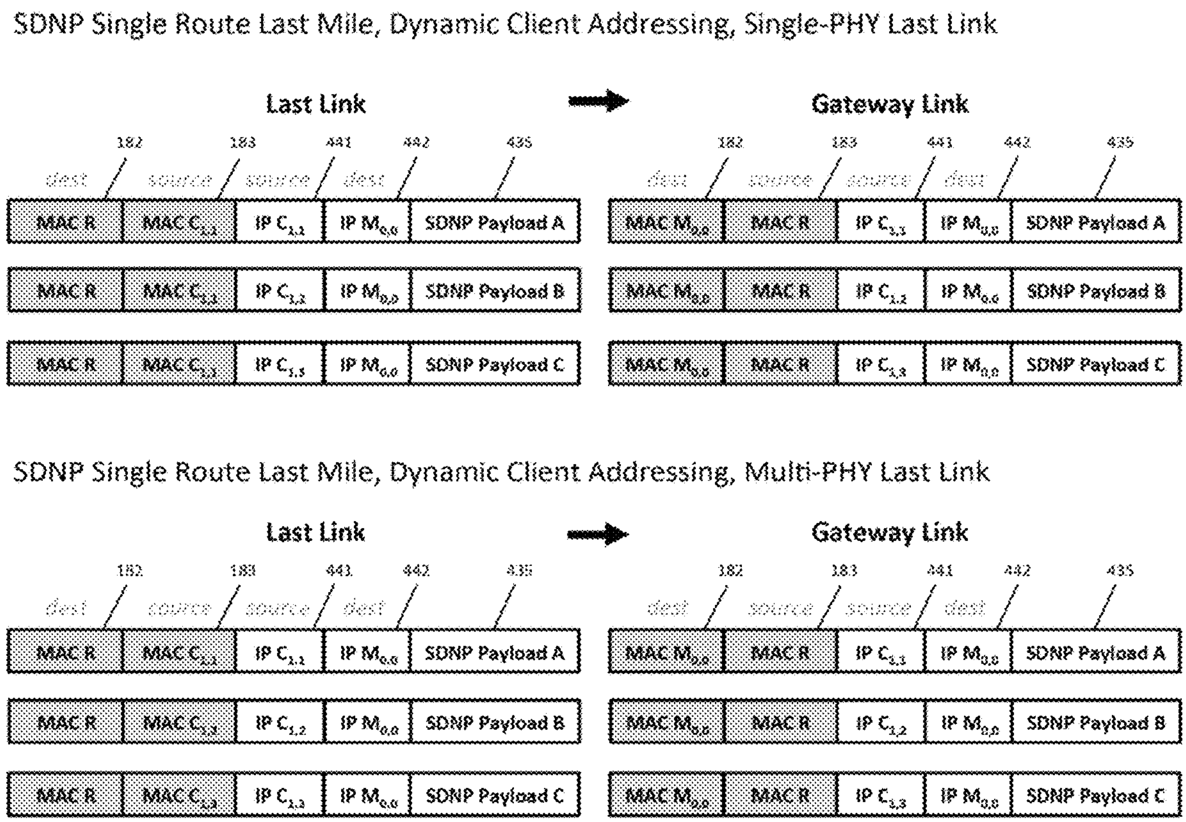
FIG. 51B illustrates successive Ethernet data packets (abridged) used in single route Last Mile communication with dynamic client addressing.

Although the multi-PHY approach provides a degree of deception, packet sniffing data packets from the specific call can still be identified because they share a common client IP address. This method of detection is thwarted using dynamic client addressing—an operation where the client changes its IP address with each packet it sends. As an example, FIG. 51B illustrates the use of client dynamic IP addressing in single route Last Mile communication. The top set of data packets illustrate a single PHY Last Link connection while the lower set of data packets describe a multi-PHY implementation. In SDNP single route Last Mile communication, the destination IP address 442 of the SDNP gateway remains fixed with a numeric value IP $M_{0,0}$ in all data packets regardless of whether single PHY or multi-PHY methods are used.

As shown, in dynamic client addressing data packets carrying SDNP payload A employ a dynamically selected source IP address 441 comprising IP $C_{1,1}$, while data packets carrying SDNP payload B employ a dynamically selected source IP address comprising IP $C_{1,2}$, data packets carrying SDNP payload C use a dynamically selected source IP address comprising IP $C_{1,3}$ and so on. The number of dynamically selected addresses is nearly unlimited, especially in IPv6. Moreover, IP addresses may be reused so long that some time, e.g. 1 second, transpires before the address is recycled. In the case of dynamic client addresses with a single-PHY Last Link, the value of the source MAC address 183 remains constant, in this example at MAC $C_{1,1}$, even though the IP source address changes. In the case of dynamic client addresses with a multi-PHY Last Link, the value of the source MAC address 183 varies successively, changing from MAC $C_{1,1}$ to MAC $C_{1,2}$ and then to MAC $C_{1,3}$. There is no particular mathematical correspondence between the client's changing MAC address and its dynamic IP address.

Figure 51C:
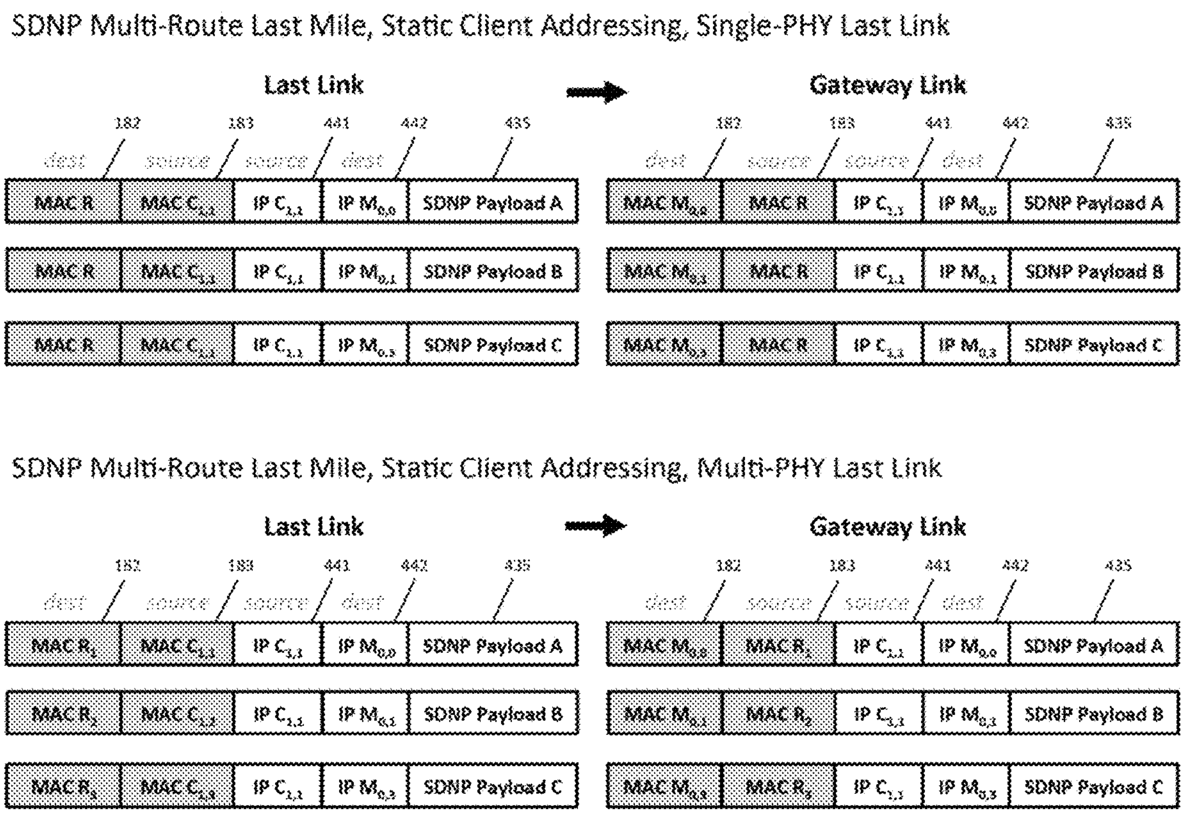
FIG. 51C illustrates successive Ethernet data packets (abridged) used in multi-route Last Mile communication with static client addressing.

Although dynamic client addressing appears to comprise messages sent from different users, the data packets still traverse most of the Last Mile (other than the Last Link in multi-PHY implementations) over a single route. A more advanced method to confound packing sniffing of Last Mile communication is to employ "multi-route" communication. In multi-route communication more than one SDNP gateway IP address is employed to connect the client to the SDNP cloud. Because SDNP network routing is prescribed by signaling servers and uses identifying SDNP tags on each packet, the SDNP cloud is able to route packets to a destination regardless of whether the data enters the SDNP cloud through a single gateway or through multiple gateways. FIG. 51C illustrates the use of multi-route Last Mile communication with static client addressing. In every data packet shown in the last link, the client's source IP address 441 remains static with a numeric value IP $C_{1,1}$ while successive data packets containing SDNP payloads A, B, and C dynamically vary the destination IP address 442 from IP $M_{0,0}$, to IP $M_{0,1}$ to IP $M_{0,3}$. The IP addresses of the SDNP gateways are not randomly selected, but "chosen" by the SDNP signaling servers to represent gateways temporally close to the caller, i.e. those gateways with a minimal statistical propagation delay between the SDNP client and the specific SDNP gateway. In this example, the dynamic destination addresses change irrespective of the PHY connections. For example, the top set of data packets illustrate a single PHY Last Link connection with a client source MAC address 183 for the Last Link having a numeric value MAC $C_{1,1}$ while the lower set of data packets describe a multi-PHY implementation varying the MAC source address across different mediums, e.g. MAC $C_{1,1}$, MAC $C_{1,2}$, and MAC $C_{1,3}$. There is no corresponding pattern or mathematical relationship between the changing MAC addresses of the client and the destination IP addresses of the SDNP gateways.

Figure 51D:
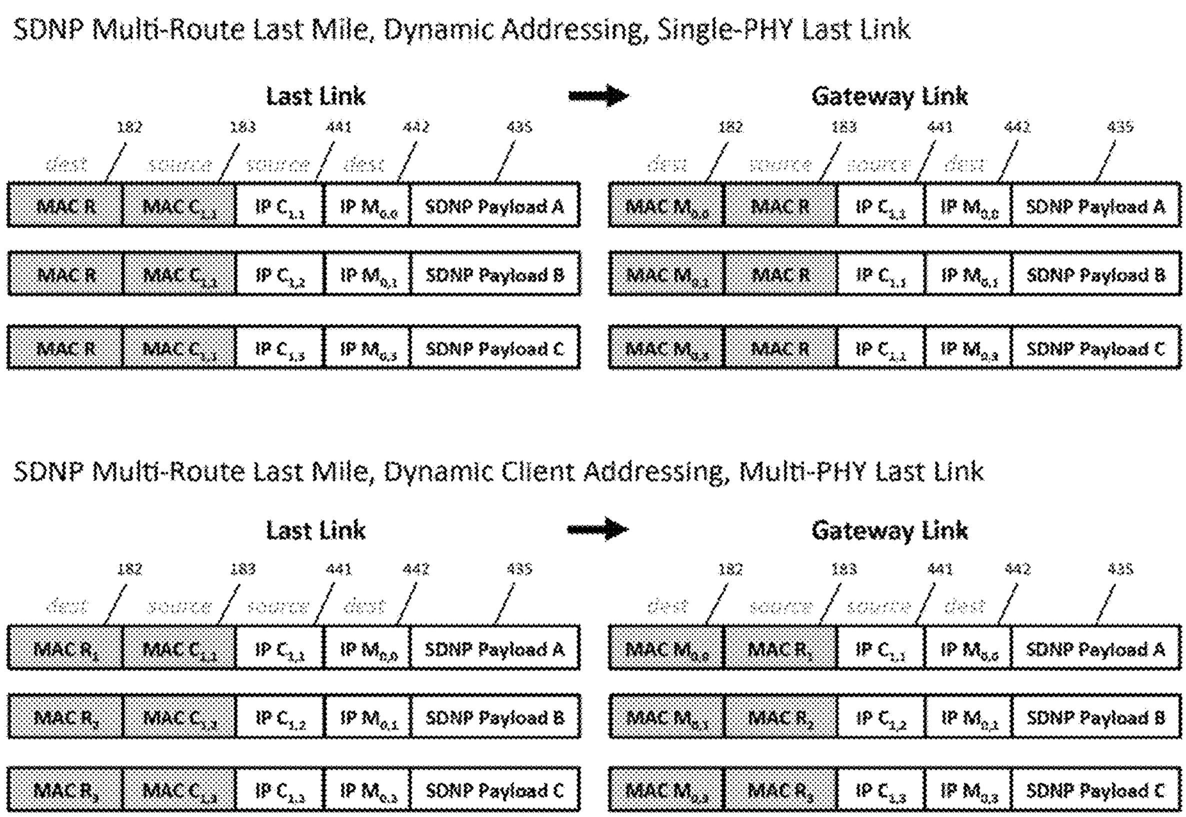
FIG. 51D illustrates successive Ethernet data packets (abridged) used in multi-route Last Mile communication with dynamic client addressing.

The most effective degree of deception is to combine dynamic client addressing with multi-route Last Mile communication. This novel combination of security features is shown in FIG. 51D both for single-PHY Last Link implementation (shown in the top half of the illustration), and for a multi-PHY Last Link version shown in the lower half. In this fully dynamic version shown in the lower half, the source IP address 441 dynamically and randomly changes from IP $C_{1,1}$, to IP $C_{1,2}$, and to IP $C_{1,3}$ while independently the destination IP address 442 of the SDNP gateway changes from IP $M_{0,0}$, to IP $M_{0,1}$ to IP $M_{0,3}$. The SDNP gateway address is selected by the SDNP signaling servers to minimize propagation delay while the dynamic client address changes in an unrelated manner. As in the previous examples, the top set of data packets illustrate a single PHY Last Link connection with a client source MAC address 183 for the Last Link having a numeric value MAC $C_{1,1}$ while the lower set of data packets describe a multi-PHY implementation varying the MAC source address across different mediums, e.g. MAC $C_{1,1}$, MAC $C_{1,2}$, and MAC $C_{1,3}$. There is no corresponding pattern or mathematical relationship between the changing MAC addresses of the client and the changing IP addresses of the client or SDNP gateway. However, in multi-route Last Mile communication, a multi-PHY Last Link may advantageously connect to three distinct routers $R_1$, $R_2$, and $R_3$ rather than funnel all the data into a single router R.

Last Mile deception as described previously represents ten different cases as summarized in the table of FIG. 52A, ranging from the least secure implementation (shown at the bottom of table as row #10) comprising a single route Last Mile with a static client address and a single-PHY Last Link to the superior deception offered by a multi-PHY Last Link with dynamic source addressing and multi-route Last Mile communication at the top row #1. The intermediate combinations are ranked in order of security. The notations $C_{1,n}$, $M_{0,n}$, and $R_n$ refer to dynamically changing addresses for SDNP clients, SDNP gateways, and the Last Link router. The dynamic addresses are uncorrelated. Rows 7 to 10 describe single route Last Mile communication, i.e. employing a single gateway $M_{0,0}$, while rows 1 to 6 describe multi-route Last Mile communication with multiple gateways. Except for shaded rows 1 and 4, Last Link communication connects to a single router with MAC address R. In contrast, in multi-route communication, shaded rows 1 and 4 describe multi-PHY Last Link communication to multiple routers with dynamic MAC addresses $R_n$.

Figure 52B:
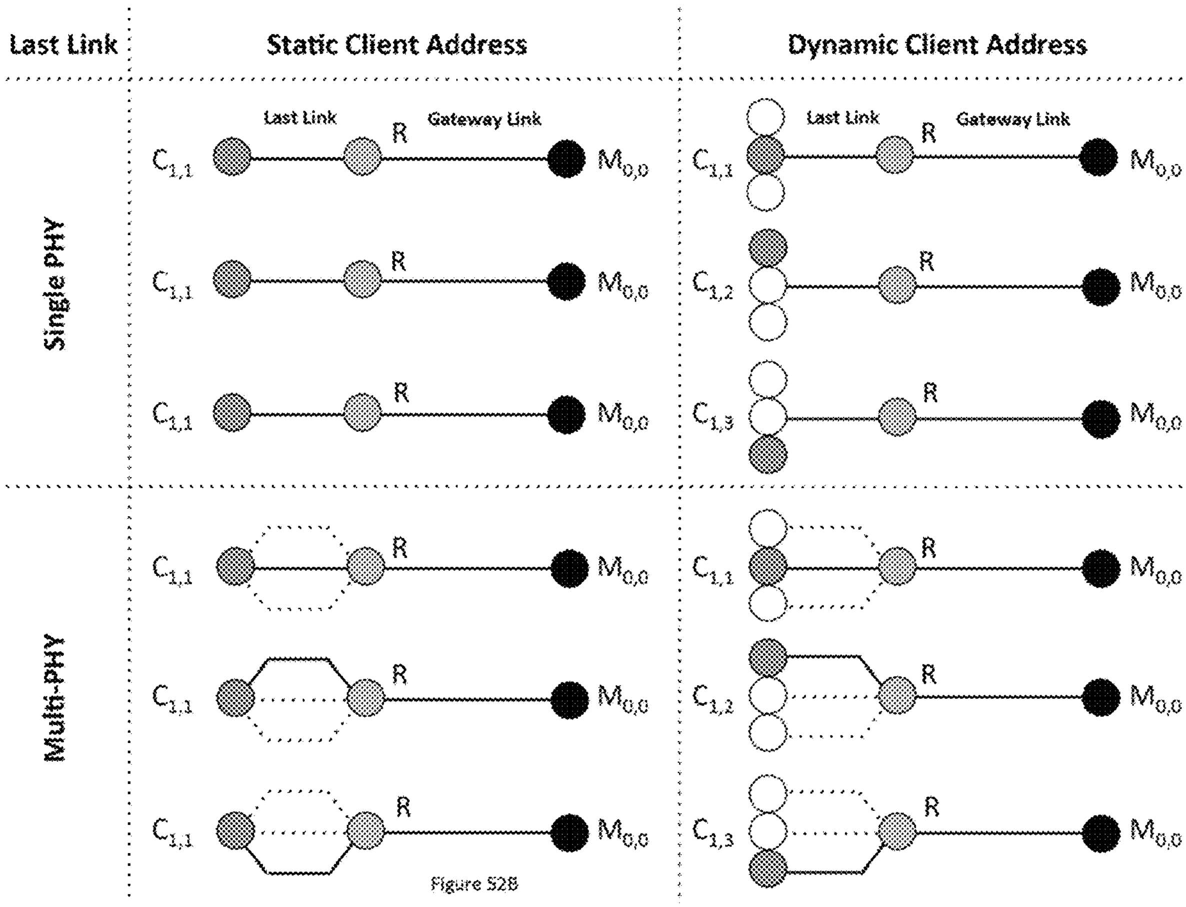
FIG. 52B are topological descriptions of single route Last Mile communication over Ethernet.

The operation of the single-route Last Mile communication is shown topologically in FIG. 52B in four combinations—static client addressing with single-PHY Last Link, static-client addressing with multi-PHY Last Link, dynamic client addressing with single-PHY Last Link, and dynamic client addressing with multi-PHY Last Link. Each box illustrates three successive data packet communications showing the data path employed. Solid lines represent data packet flow while dotted lines illustrate possible paths not being utilized. Shaded circles illustrate communication nodes employed in the Last Mile communication, while empty circles illustrate unused communication nodes. As shown, all examples terminate the Last Mile data routing through a single connection between router R and SDNP gateway $M_{0,0}$.

In the case of the static client addressing over a single-PHY Last link shown in the upper left corner, each successive packet takes the same path over the entire Last Mile using unchanging IP addresses. In the case of the static client addressing over a multi-PHY Last link shown in the lower left corner, each successive packet takes a different path over the Last Link as prescribed by dynamically changing MAC addresses. The remainder of the Last Mile comprises a single route as specified by unchanging IP addresses. Despite the single route transport, changing the physical media of the Last Link makes caller tracing more difficult. In the case of the dynamic client addressing over a single-PHY Last link, shown in the upper right corner, each successive packet takes the same path over the entire Last Mile using an unchanging destination IP address and a constant client MAC address for the Last Link. Deception is instead achieved by changing the identity of the client by means of changes in the dynamic source IP address. In the case of single route communication with both dynamic client addressing and a multi-PHY Last Link, shown in the lower right corner, the client's MAC address and source IP address change dynamically and randomly even though all packets are routed to a single SDNP gateway.

Dynamic client addressing is the process whereby a client device employs one or more temporary ad hoc IP addresses. The process involves two stages. In the first stage, when a device first logs on to a network it registers its presence on the local subnet by contacting the nearest router. The router then redirects the connection to the nearest DHCP server on the same subnet. DHCP, an acronym for dynamic host configuration protocol (DHCP) is a network management protocol used to dynamically assign IP addresses. In the registration process, the client device downloads one or more IP addresses and stores the addresses in its communication data register. Until such time that the assigned IP addresses are renewed by the local DHCP server, either by starting a new session or requesting new addresses, whenever the client device communicates it uses these IP addresses. Because the addresses are dynamically issued within a specific subnet, the client device's IP addresses are not Internet addresses.

In the second stage when the client device either places a call or logs onto the SDNP network, the device automatically contacts the SDNP signaling server based on a static IP address of the SDNP server. The SDNP server upon receiving the incoming message uploads the ad hoc IP address or addresses to the SDNP name server. The SDNP name server then assigns SDNP addresses as pseudo-code for each of the temporary IP addresses. In operation, just before routing the packet's SDNP source address is substituted by its local ad hoc IP address. In the case of SDNP dynamic addressing, the identity of the client device is camouflaged, by repeatedly sending packets with changing source addresses. In this manner, dynamic deception obscures the true identity of the client device.

Upon reaching a SDNP gateway, the source addresses for outgoing packets discard the client IP addresses and substitute the SDNP address of the gateway server instead. Each outgoing SDNP packet then swaps the local IP address of the device with its local ad hoc IP address just prior to transport. Unlike Internet packet transport where the source and destination IP addresses remain constant and are required for replies, in SDNP transport each hop uses new IP addresses. So when a SDNP message finally reaches its destination, the source address of the client device is not included in the data packet. Instead the signaling server informs the destination device about the return path for replies.

Figure 52C:
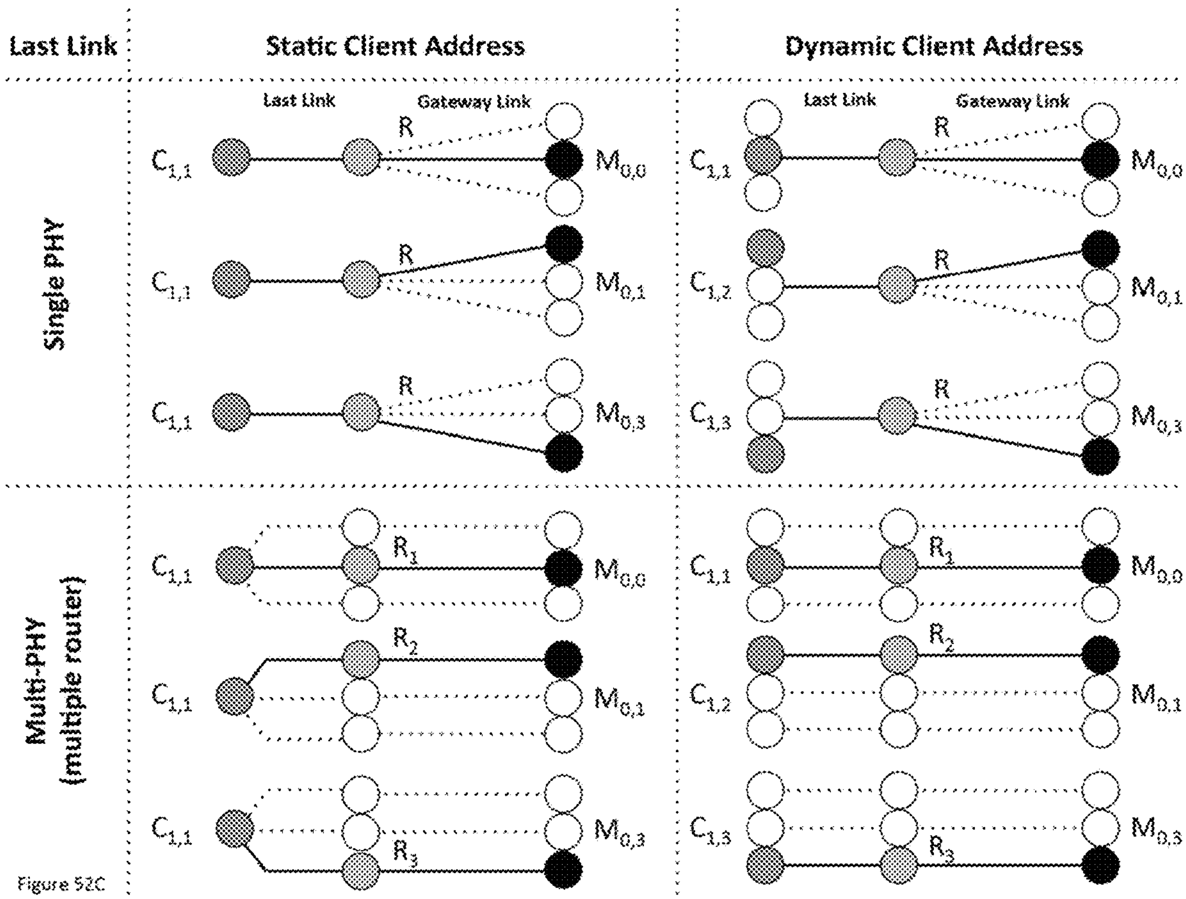
FIG. 52C are topological descriptions of multi-route Last Mile communication over Ethernet.

The operation of "multi-route" Last Mile communication is shown topologically in FIG. 52C in four combinations of static and dynamic client addressing as well as single-PHY and multi-PHY last links. In each multi-route communication, the destination IP address, i.e. the SDNP gateway, constantly changes, meaning that the Last Mile route connects to different inputs to the SDNP cloud. In the left column the client addresses remain static, meaning the identity of the caller is unchanged. The upper left corner example uses a single-PHY connection for the Last Link, meaning the MAC address for the client also remains static. Even though the communication occurs to different destination gateways, the unchanging Last Link physical medium and unchanging client IP address makes the Last Mile susceptible to call tracing. This weakness can be remedied either by changing the Last Link medium used to transport the data packets or by disguising the true identity of the caller's IP address.

The lower left corner example uses a multi-PHY connection for the Last Link, meaning the MAC address for the client changes dynamically. Such an approach compensates for the fact that the identity of the client maintains a static IP address. As part of end-to-end multi-route Last Mile communication, each unique Last Link connects to separate routers on successive packets' journeys to distinct SDNP gateways. As such, a first packet is routed from a client with static address IP $C_{1,1}$ to the router with MAC address MAC $R_1$ over a unique PHY medium before finally being routed to SDNP gateway with IP address IP $M_{0,0}$. A second packet the identical client address IP $C_{1,1}$ is routed to a different router with media address MAC $R_2$ over a unique PHY medium before finally being routed to SDNP gateway with IP address IP $M_{0,1}$. Similarly a third packet also with static client IP address $C_{1,1}$ is routed to a router with a media address MAC $R_3$ over a unique PHY medium where it is subsequently routed to SDNP gateway $M_{0,3}$. The use of multiple routers opportunistically uses the multiple PHY Last Link to deliver Last Mile packet in entirely separate trajectories despite utilizing a client with a singular source IP address.

In another embodiment shown in the upper right corner, the identity of the client changes dynamically even though only a single MAC address and PHY connection is used. The IP address of the client shown dynamically changes from IP $C_{1,1}$ to IP $C_{1,2}$ to IP $C_{1,3}$ while the physical medium remains constant with a source media address MAC $C_{1,1}$ and a destination address MAC R. The data is then routed onward to gateways $M_{0,0}$, $M_{0,1}$, and $M_{0,3}$ in random order as determined by the SDNP signaling servers.

Superior security is achieved by combining all three methods of Last Mile deception, namely multiple route communication using a multi-PHY Last Link and dynamic client addressing. This case is illustrated in the lower right hand corner of FIG. 52C where data packets sent using a multi-PHY Last Link and multiple routers are delivered from a client with dynamic IP addresses to multiple SDNP gateways over multiple routes. As shown, a first packet from a client with dynamic source network address IP $C_{1,1}$ is sent over multiple routes to a destination IP $M_{0,0}$ using a multi-PHY Last Link defined by source and destination media addresses MAC $C_{1,1}$ and MAC $R_1$. A second data packet from a client having a dynamically selected source network address IP $C_{1,2}$ is sent over multiple routes to a destination IP $M_{0,1}$ using a multi-PHY Last Link defined by source and destination media addresses MAC $C_{1,2}$ and MAC $R_2$. Lastly a third data packet from a client having a dynamically selected source network address IP $C_{1,3}$ is sent over multiple routes to a destination IP $M_{0,3}$ using a multi-PHY Last Link defined by source and destination media addresses MAC $C_{1,3}$ and MAC $R_3$. In this way the combination of Client IP address, SDNP gateway IP address, the client's MAC address and the router's MAC address all change dynamically in random fashion, rendering call tracing and the collection of meta data nearly impossible.

Camouflaging of the client device IP address and obfuscation of last mile routing by dynamic IP addressing, multi-PHY transport and multi-route transport to multiple gateways can be determined either by the client device or by the signaling server. The misdirection process can be achieved using random number generation or other pseudo-random algorithms. A key principle is that the routing and transport changes are unpredictable.

Figure 52D:
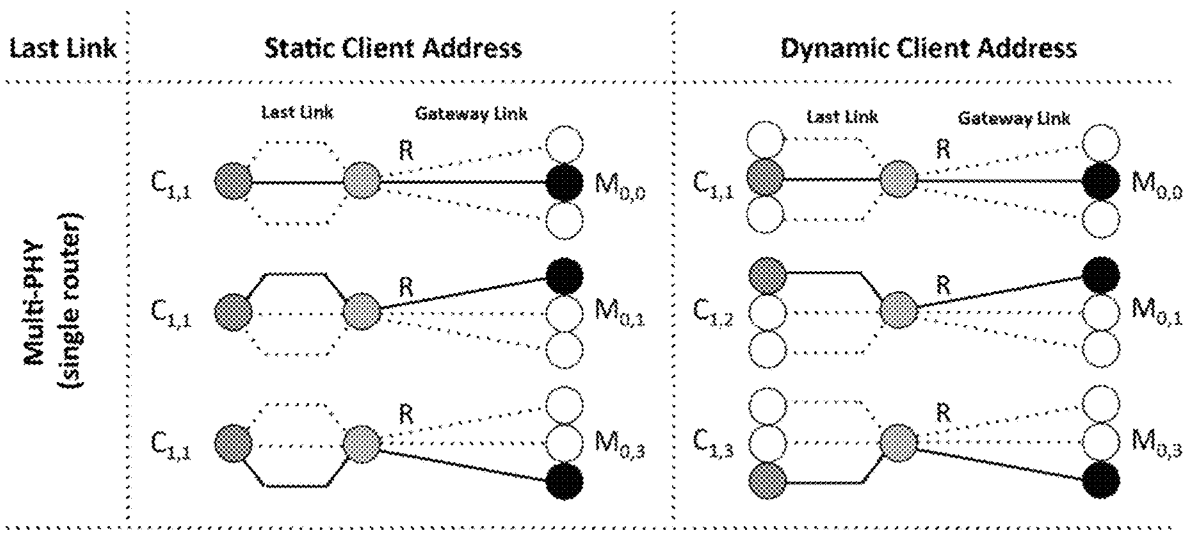
FIG. 52D are additional topological descriptions of multi-route Last Mile communication over Ethernet.

Two slightly less robust versions of Last Mile data transport of Ethernet packets over multiple routes are shown in FIG. 52D where the left side illustration employs static client addressing and multi-PHY Last Link connectivity while the right side graphics represents dynamic client addressing, also with multi-PHY Last Link connectivity. The difference between these implementations and the multi-PHY versions shown in FIG. 52C previously is that these versions employ a single router R rather than spreading data transport across multiple routers. In short, in multi-route transport using a single router for Last Link connectivity, sequential data from the client is spread across multiple physical mediums, i.e. a multi-PHY Last Link, then recollected by a single router R and sent over the remainder of the Last Mile including multiple gateway links and any other parallel sections of the Last Mile (not shown) from this common router to multiple SDNP gateways defined by distinct destination IP addresses.

Figure 53:
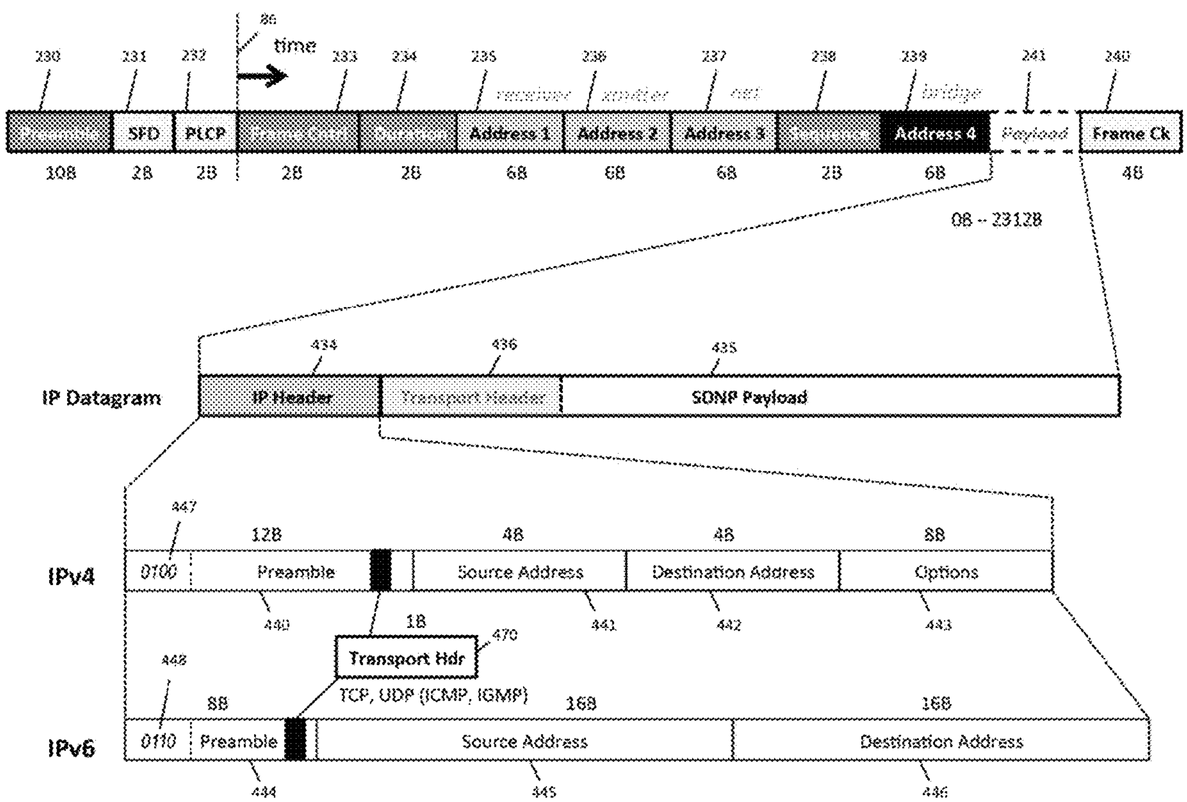
FIG. 53 is a graphical representation of IPv4 and IPv6 datagrams for WiFi communication carrying a SDNP payload.

As an adjunct to Ethernet, WiFi wireless communication also can be employed for Last Mile communication between a SDNP client and a SDNP gateway. WiFi communication requires a data packet with three or four MAC addresses, two for the radio link, one or two for the wired network connection, specifically using Ethernet data packets. FIG. 53 illustrates the same WiFi packet format adapted for SDNP Last Mile and Last Link communication. As an access point applicable for Last Link communication, only three 6B-long MAC addresses are required, specifically MAC address 1 field 235 for the receiving radio base station or "receiver", MAC address 2 field 236 for the transmitting radio base station or "xmitter", and MAC address 3 field 237 comprising the MAC address of the wired network connection to the WiFi router, i.e. Ethernet or "net". In operation, the numerical values of the MAC addresses loaded into the receiver and xmitter data fields depend on the To DS/From DS directional setting to determine (i) is the data packet being received on the radio and forwarded onto Ethernet or (ii) is incoming data on Ethernet being converted into radio communication. MAC address 4 data field 239 is optional, used only when the WiFi device is being employed as a radio bridge in "wireless distribution mode". While such a mode may be used in Last Mile communication over long distances as an alternative to cellular or microwave networks, e.g. in the desert, in general the use of a WiFi communication in SDNP Last Mile is generally focused on the Last Link connection to the SDNP client. As such, the following discussion will focus on the access point mode for WiFi routers with the understanding that the SDNP techniques herein are equally applicable in wireless distribution mode routing.

Similar to Ethernet data packets, preamble 230 and start frame delimiter SFD 232 contain Layer 1 data for synchronizing the data and device. Physical layer convergence procedure PLCP 232 comprises a mix of Layer 1 and Layer 2 information (related packet length, data rates, error checking on the header, etc.). In accordance with IEEE 802.11 standards, the remaining data fields comprise Layer 2 data link information including Frame Control 233 specifying the WiFi version packet type as management, control, reserved, or "data", the type used in delivering SDNP payloads.

Duration & ID 234 contains the NAV duration unless the WiFi device is in power savings mode, in which case the field includes the station ID. NAV or network allocation vector is a virtual carrier-sensing mechanism used for power saving in wireless communication systems. The NAV duration can be considered as a counter, counting down to zero at a uniform rate, whereupon it senses the medium to determine if the radio is idle or still communicating. In idle mode, the counter counts the NAV duration repeatedly, checking to determine if any radio communication activity demanding attention is detected. Sequence control or "Sequence" field 238 describes the packet sequence and fragment number defining the Layer 2 packet frame. Frame check 240 contains a 32-bit CRC checksum of the entire data packet, i.e. a error check data link trailer.

WiFi payload 241 is a 0B to 2,312B long data field used to carry the WiFi payload. In SDNP Last Mile communication, this field contains the IP datagram used in Last Mile communication including IP header 434, transport-header 436 and SDNP payload 435

IP header 434 varies depending on whether the IP datagram follows the IPv4 or IPv6 protocol as determined by protocol field 447 comprising binary 4 or protocol field 448 comprising binary 6. Preambles 440 and 444 both contain a transport header flag 470 used to determine the Layer 4 transport method employed, e.g. TCP, UDP or the maintenance functions ICMP and IGMP. Specifically, in accordance with the secure dynamic communication network and protocol, TCP transport is employed for software and data files, while UDP is employed for real time data such as VoIP and video. The length and format of the transport header 436 varies in accordance with transport header flag 470. IP header 434 contains IPv4 source and destination addresses 441 and 442 or IPv6 source and destination addresses 445 and 446.

Similar to Ethernet data packets, Last Mile routing of WiFi packets depends both on the IP addresses and the MAC addresses, represented symbolically by the names of the devices to which the IP or MAC address refer to. Sequential Last Mile routing of WiFi packets is shown in the examples of FIG. 54A through FIG. 54D. Each illustration contains two WiFi packets—a top one comprising an IPv4 datagram and a lower one comprising an IPv4 datagram. Because IPv4 and IPv6 use different formats with varying field lengths, the two WiFi packets shown are generally not of the same length even when carrying identical payloads.

In the first step of the communication sequence, SDNP payload-A travels from SDNP client 1400 to WiFi base station/router 1402W over Last Link 1404 as WiFi radio medium, and by wireline onto router 1402X over BS link 1415. Router 1402X then delivers the data packet across gateway link 1414 to the SDNP gateway 1401. A response from the SDNP gateway to the client involves SDNP payload G traveling from SDNP gateway 1401 by wireline over gateway link 1414 to router 1402X, across BL link 1415 to WiFi router 1402W, and across Last Link 1404 to client 1400 using WiFi radio as the communication medium. SDNP client has numeric MAC and IP addresses MAC $C_{1,1}$ and IP $C_{1,1}$, WiFi router 1402W has numeric MAC address MAC W, router 1402A has numeric MAC addresses MAC R, and SDNP gateway has numeric MAC and IP addresses MAC $M_{0,0}$ and IP $M_{0,0}$. The IP addresses of WiFi router 1402W and wireline router 1402X are not required in the Last Mile communication shown.

In contrast to the SDNP cloud, where packet routing of SDNP datagrams is completely controlled by the SDNP network, in Last Mile communication using IP datagrams, the SDNP payload cannot be interpreted or affect routing, meaning each communication transported across the Last Mile contains fixed source and destination IP addresses. The physical media or channels used to direct WiFi packets in radio communication and to direct Ethernet packets in wireline communication is governed by the MAC addresses connecting each communication node in the Last Mile.

Figure 54A:
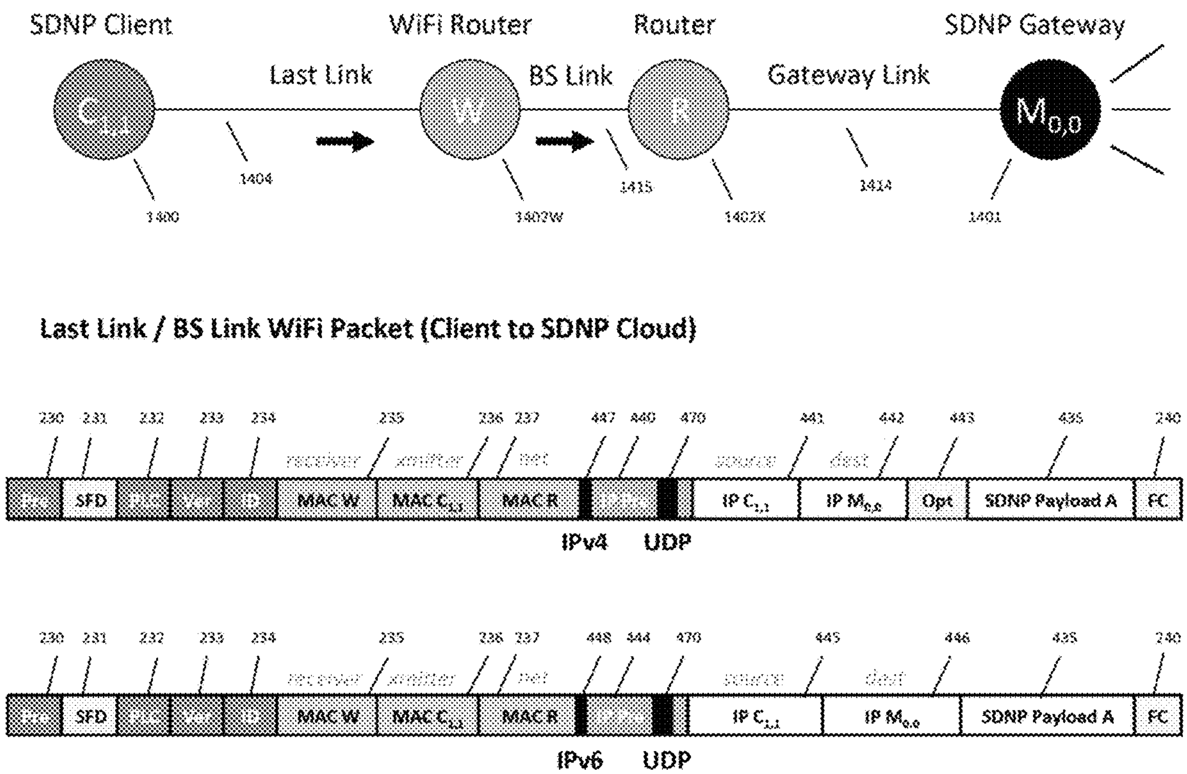
FIG. 54A is a graphical representation of IPv4 and IPv6 Last Link WiFi packets used in client to SDNP-cloud communication.
Figure 54B:
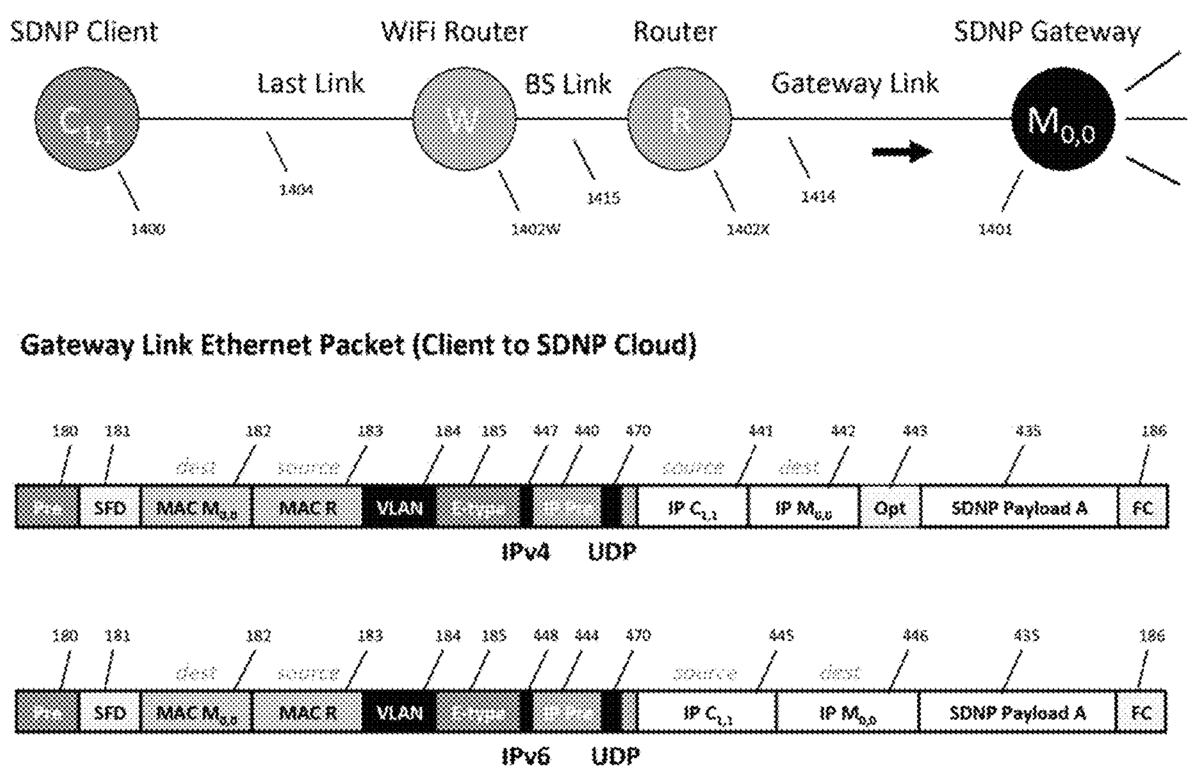
FIG. 54B is a graphical representation of IPv4 and IPv6 Gateway Link WiFi packets used in client to SDNP-cloud communication.

For example, FIG. 54A illustrates IPv4 and IPv6 Last Link WiFi packets used for single-PHY radio routing to WiFi router 1402W over Last Link 1404, comprising xmitter MAC address MAC $C_{1,1}$, and receiver MAC address MAC W. WiFi router 1402W also provides BS link wireline 1415 routing to Ethernet router 1402X with a "net" MAC destination address MAC R. Layer 3 network routing comprises only the end devices, i.e. SDNP client 1400 having source IP address IP $C_{1,1}$, and SDNP gateway 1401 having destination address IP $M_{0,0}$. Unlike an Ethernet data packet, a WiFi packet contains three addresses—a xmitter or source-radio MAC address MAC $C_{1,1}$, a receiver or radio-destination MAC address MAC W, and an Ethernet "net" address MAC R. In this direction of data transmission, the wireline router 1402X acts as the network destination of the WiFi router device. As such, the WiFi data packet specifies two mediums, WiFi radio Last Link 1404, and Ethernet wireline BS link 1415. FIG. 54B illustrates the corresponding Ethernet packets transporting SDNP payload A over gateway link 1414. As described, the source and destination IP addresses remain unchanged as IP $C_{1,1}$ and IP $M_{0,0}$ while the MAC source and destination addresses change from their original values to MAC R and MAC $M_{0,0}$.

Figure 54C:
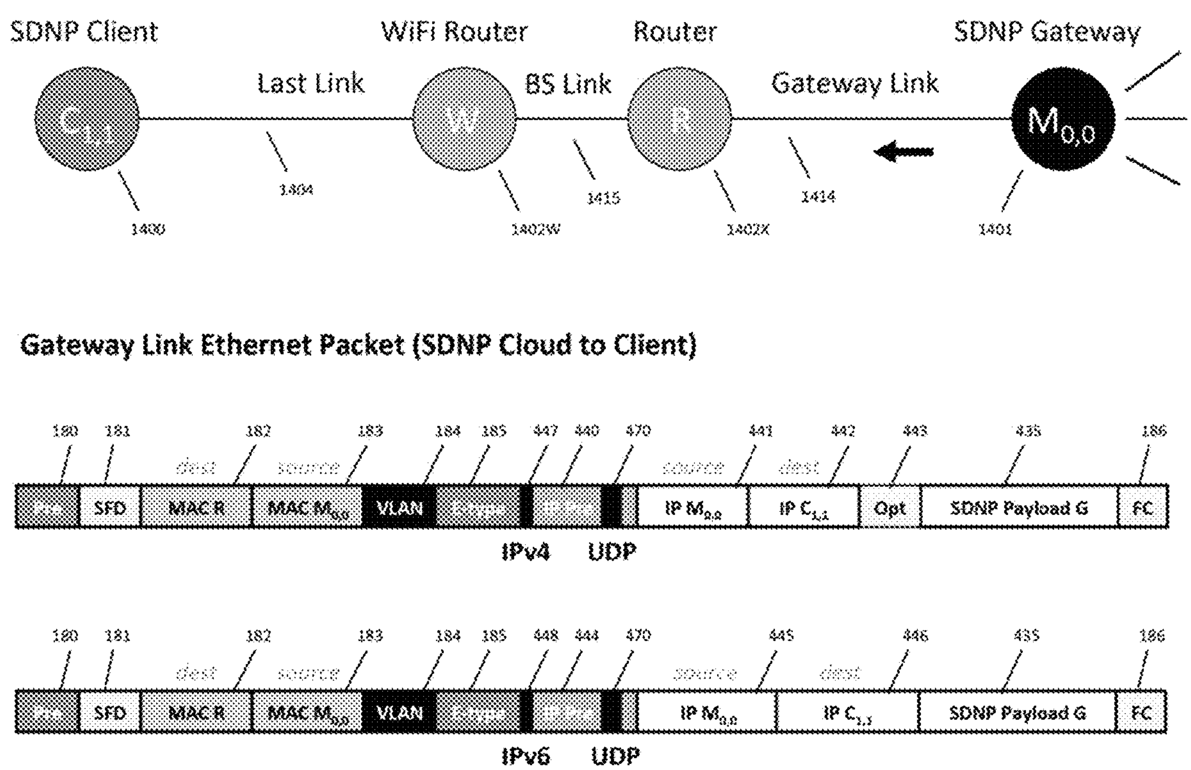
FIG. 54C is a graphical representation of IPv4 and IPv6 Gateway Link WiFi packets used in SDNP-cloud to client communication.

Reply communication involves swapping destination and source IP addresses and adjusting the MAC addresses accordingly. FIG. 54C illustrates IPv4 and IPv6 Ethernet packets for data transport from SDNP gateway 1401 to wireline based router 1402X over gateway link 1414. For the Layer 3 datagram information, IP source address 441 contains the network address of the SDNP gateway 1401, i.e. IP $M_{0,0}$ and IP destination address contains the value IP $C_{1,1}$, the client's address. The MAC addresses for the gateway link Ethernet packet are MAC $M_{0,0}$ for the source address 183 and MAC R for the destination MAC address 182.

Figure 54D:
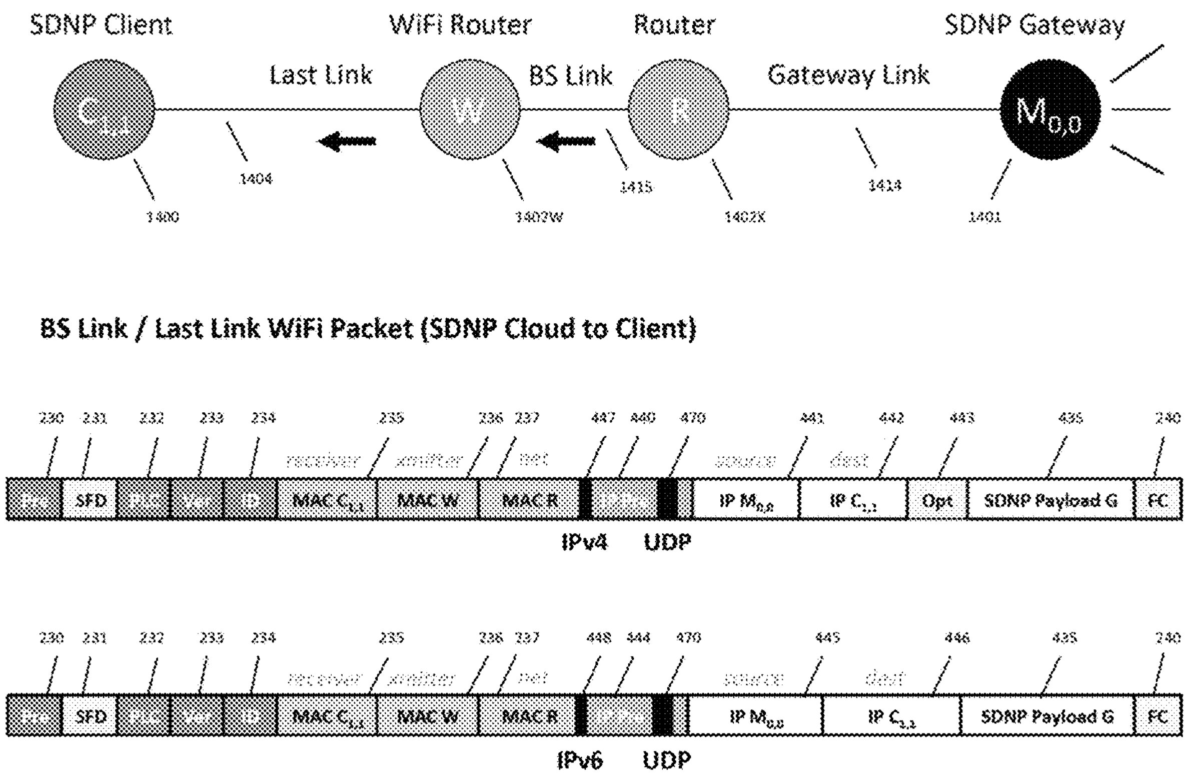
FIG. 54D is a graphical representation of IPv4 and IPv6 Last Link WiFi packets used in SDNP-cloud to client communication.

FIG. 54D illustrates IPv4 and IPv6 WiFi packets for wireline BS Link 1415 and WiFi radio based Last Link 1404. Network Layer 3 routing comprises SDNP gateway 1401 address IP $M_{0,0}$ and SDNP client address IP $C_{1,1}$ as source and destination addresses 445 and 446. The function of MAC address field 237 labeled "net" changes in accordance with the radio mode. In the transmit mode shown here, this field contains the Ethernet MAC address of the wireline source of the radio's incoming data, i.e. the numerical value MAC R of router 1402X sending data packets to the WiFi access point. In the receiver mode, shown previously in FIG. 54A, this field defines the Ethernet destination of data received as radio packets and converted into Ethernet packets. In the example shown, "net" field 237 contains the same MAC address of router 1402X, i.e. MAC R, for both transmit and receive modes, meaning the WiFi access point uses a single Ethernet router for Last Mile connectivity.

Optionally, in multiroute communication over the Last Mile, the wireline router used for routing data packets received by the WiFi access point, i.e. in receive mode, may be different than the one used for routing data packets to be transmitted by the WiFi access point, i.e. in transmit mode. For example, the network MAC address 237 for radio packets in receiver mode may have a numeric MAC address MAC $R_1$ while in transmit mode, the data may be changed to a different router connection MAC $R_2$, meaning the BS link may optionally comprise a directionally dependent multi-PHY implementation. In transmit mode, Last Link WiFi packets used for single-PHY radio 1404 Last Link routing from WiFi router 1402W to SDNP client 1400 contain xmitter MAC address 236 with a numeric value MAC W and receiver MAC address 235 containing numeric value MAC $C_{1,1}$. In this direction of data transmission, the wireline router 1402A acts as the source of data to be transmitted by the WiFi router device. As such, the WiFi data packet species two mediums, WiFi radio Last Link 1404, and Ethernet wireline BS link 1415.

Cellular networks represent another form of wireless communication adaptable for SDNP Last Mile communication. Cellular networks re-partition incoming Ethernet packets into radio-specific media access control (MAC) packets. Data may be transmitted and received by multiplexing time (TDMA) in, by code division (CDMA), or by spreading the content across multiple sub-channel frequencies (OFDM). In the case of 4G/LTE communication based on OFDM or orthogonal frequency division multiplexing, the Layer 2 data packets are stacked across three different levels of embedded service data units or SDUs all within Layer 2; specifically the lowest level comprises the PHY PDU 299 containing the single frame MAC SDU 304 along with MAC header 303 and padding 305 spread across 20 time slots 300 comprising the PHY Layer 1 data. MAC SDU 304 in turn contains radio link control or RLC SDU 308.

Radio link control (RLC) is a layer 2 protocol used in 3G (UMTS) and 4G/LTE (OFDM) based telephony. The function of radio link control is to react to upper layer requests in one of three modes, i.e. acknowledged mode, unacknowledged mode, and transparent mode, as well as to provide error detection, error correction, duplicate detection, and packetizing of data in accordance with specified formats. Packetizing of the data includes concatenation, segmentation, and reassembly of RLC SDUs along with reordering and re-segmentation of RLC data PDUs. For example, after allocating time for performing radio overhead functions, single frame RLC SDU 308 is unavoidably limited in the duration and data file size available for carrying a payload. Single frame RLC SDU 308 must therefore be split into segments and mapped into a different RLC Layer 2 format—multi-frame RLC SDUs 319.

Figure 55:
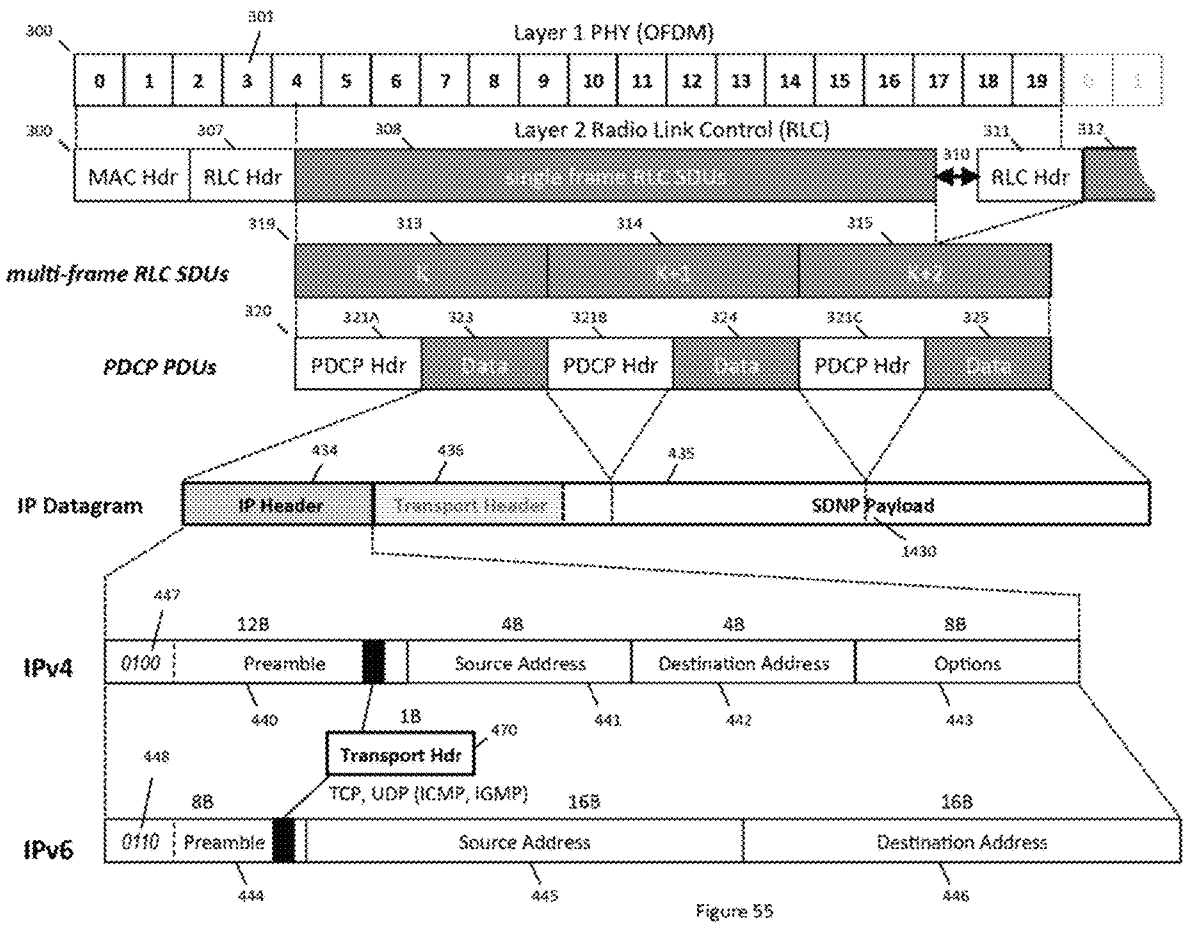
FIG. 55 is a graphical representation of IPv4 and IPv6 datagrams for 4G cellular communications carrying a SDNP payload.

As illustrated in FIG. 55, the mapping of single-frame RLC SDU 308 into the various K, K+1, K+2 segments 313, 314, 315, etc. of multi-frame RLC SDUs 319 does not occur on a one-to-one basis. As shown for example, mapping single-frame RLC SDU 308 ends in the middle of the K+2 segment 315. The un-transmitted portion of K+1 segment remaining is instead transmitted in a new single-frame RLC SDU 312, but only after allowing padding time 310 needed for radio clock synchronization and after processing RLC header 311. In this method, transmission of data encapsulated in the K+2 slot resumes precisely where it left off as though the data flow was never interrupted. Operationally, 4G is analogous to pausing the playback of a DVD encoded movie in the middle of a DVD chapter, waiting a moment to perform some other functions, and then resuming playback precisely where it was paused. As such, no data content is lost and the RF data delivery rate of the cellular system is maximized with no wasted radio bandwidth other than packet overhead (such as PDU headers), and minimal data-rate degradation resulting from clock synchronization padding time 310.

The multi-frame RLC SDUs 319 encapsulate PDCP PDUs 320 in a one-to-one correspondence with each K segment. For example, the $K^{th}$ segment 313 carries PDCP header 321A and an IP payload comprising data 323, the $(K+1)^{th}$ segment 314 carries PDCP header 321B and an IP payload comprising data 324, the $(K+2)^{th}$ segment 315 carries PDCP header 321C and an IP payload comprising data 325, and so on. The term PDCP is an acronym for Packet Data Convergence Protocol as specified in 3G and 4G/LTE communication protocol, performing functions such as compression, encryption, integrity assurance, as well as user and control data transfer. PDCP headers vary with the type of data being transported, e.g. user data, control data, etc.

Since data transport in 4G data packets carry a continuously concatenated stream of data, payload size is not quantized into defined length blocks as they are in Ethernet and WiFi data packets. Instead data fields 323, 324, 325 . . . carried by corresponding Layer 2 data segments 313, 314, 315 . . . can incrementally support any size payload, as shown comprising IP header 434 and IP payload 435 containing transport-header 436 and SDNP payload 1430. Moreover, in OFDM-based communication each time slot concurrently carries data on multiple frequency subcarriers, meaning that the total data throughput is not simply determined by time duration over a single channel as it is in TDMA. For convenience, however, it is often convenient to maintain IP datagram size to match that of Ethernet or WiFi standards.

As shown, IP header 434 varies depending on whether the IP datagram follows the IPv4 or IPv6 protocol as determined by protocol field 447 comprising binary 4 or protocol field 448 comprising binary 6. Preambles 440 and 444 both contain a transport header flag 470 used to determine the Layer 4 transport method employed, e.g. TCP, UDP or the maintenance functions ICMP and IGMP. Specifically, in accordance with the secure dynamic communication network and protocol, TCP transport is employed for software and data files, while UDP is employed for real time data such as VoIP and video. The length and format of the transport header 436 varies in accordance with transport header bit 470. IP header 434 contains IPv4 source and destination addresses 441 and 442 or IPv6 source and destination addresses 445 and 446.

Figure 56A:
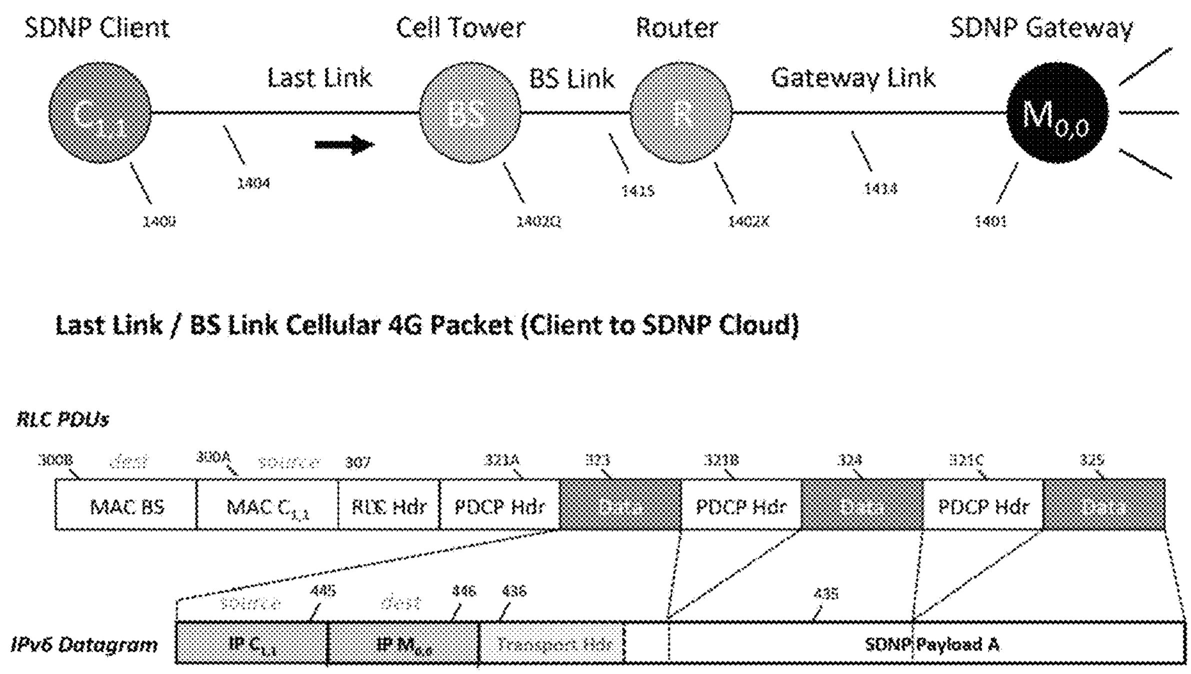
FIG. 56A is a graphical representation of IPv4 and IPv6 Last Link 4G cellular data packets used in client to SDNP-cloud communication.

As an example of 4G communication using IPv6 datagrams, FIG. 56A illustrates cellular radio 1404 Last Link routing to cell tower and base station 1402Q. Specifically, in MAC source field 300A, the RLC PDU defines cellular source media address as MAC $C_{1,1}$, the client's device. Similarly MAC destination field 300B specifies cellular receiver media address as MAC BS describing the cell tower and base station. Layer 3 network routing comprises only the Last Mile end devices, i.e. SDNP client 1400 having source IP address IP $C_{1,1}$, shown in source data field and SDNP gateway 1401 having destination address IP $M_{0,0}$. As described previously, data fields 323, 324, and 325 do not necessarily correspond to specific sections of the IPv6 datagram data payload, where data field 323 includes IP source address 445, IP destination address 446 and a portion of SDNP payload A 435 including transport header 436. Data fields 324 and 325 carry the un-transmitted remaining portion of SDNP payload 435.

Figure 56B:
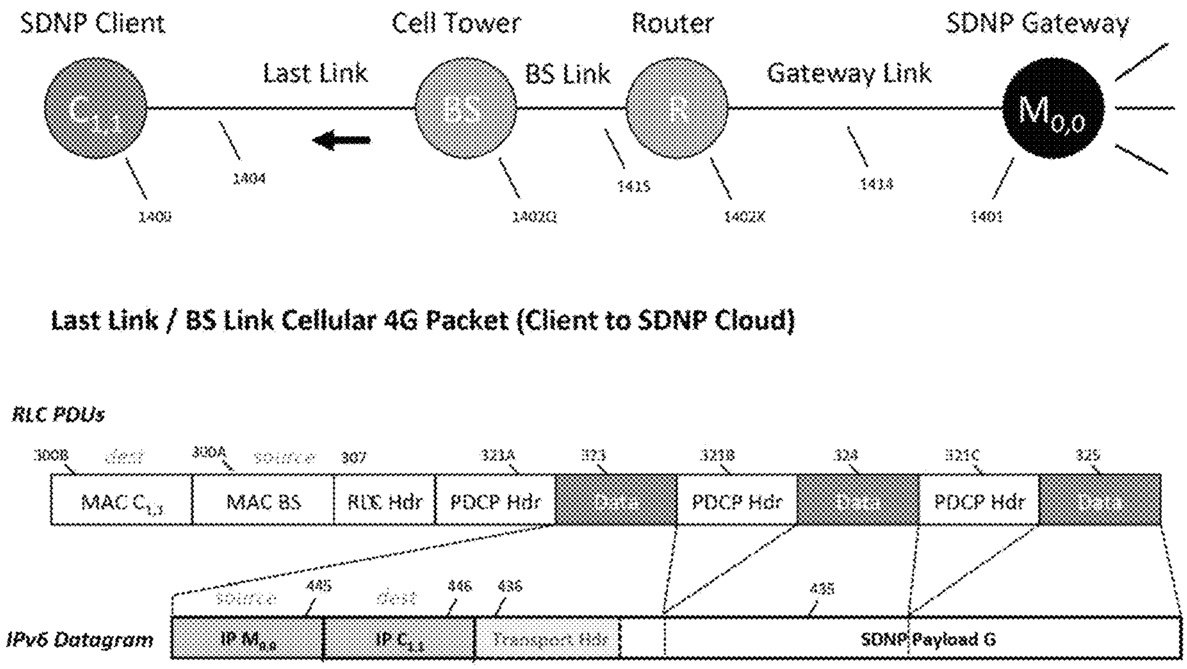
FIG. 56B is a graphical representation of IPv4 and IPv6 Last Link 4G cellular packets used in SDNP-cloud to client communication.

FIG. 56B illustrates the data packets for the reply message SDNP payload G over cellular last link 1404 from cell tower and base station 1402Q to a mobile client device 1400 whereby source and destination addresses from the prior data packets have been swapped, namely cellular source media address 300A is loaded with the media address MAC BS, cellular destination media address 300B is set to MAC $C_{1,1}$, the client's MAC address, IP source field 445 in the IPV6 datagram is set to IP $M_{0,0}$ and IP destination field 445 is set to IP $C_{1,1}$. Routing between the network router 1402X and cellular tower and base station 1402Q over BS link 1415 uses Ethernet data packets consistent with prior examples.

Multi-PHY communication over the Last Link may comprise any of the aforementioned media used in various combinations. Multi-PHY implementations may comprise multiple wireline connections carrying data at the identical or dissimilar data rates and employing common or distinct Layer 2 protocols such as USB, Ethernet 10BASE-T, 100BASE-T, 1000BASE-T, or DOCSIS3. Wireline physical media may comprise Ethernet or USB compliant network cables, coaxial cables, optical fiber, or even twisted-pair copper connections for DSL, albeit at a degraded level of performance.

Wireless multi-PHY communication may include combinations of WiFi, cellular, satellite, or proprietary radio formats running in the radio frequency and microwave bands. Wireless Last Link communication may also include short-range technologies such as Bluetooth or micro-cellular networks such as PHS in Japan. Wireless protocols may include cellular formats for 2G, 2.5G, 3G, and 4G/LTE including for example analog, TDMA, GSM, CDMA, UMTS, and OFDM, WiFi protocols such 802.11a, 802.11b, 802.11g, 802.11n, and 802.11ac, as well as proprietary formats for satellite communication or custom radio links. Since Layer 2 protocols vary in accordance with Layer 1 physical mediums, the term multi-PHY communication as used in the context of this disclosure shall mean the combination of both OSI physical and data link layers, i.e. Layer 1 and Layer 2 together, and should not be construed as limiting claims to mean Layer 1 physical media exclusively.

Figure 57A:
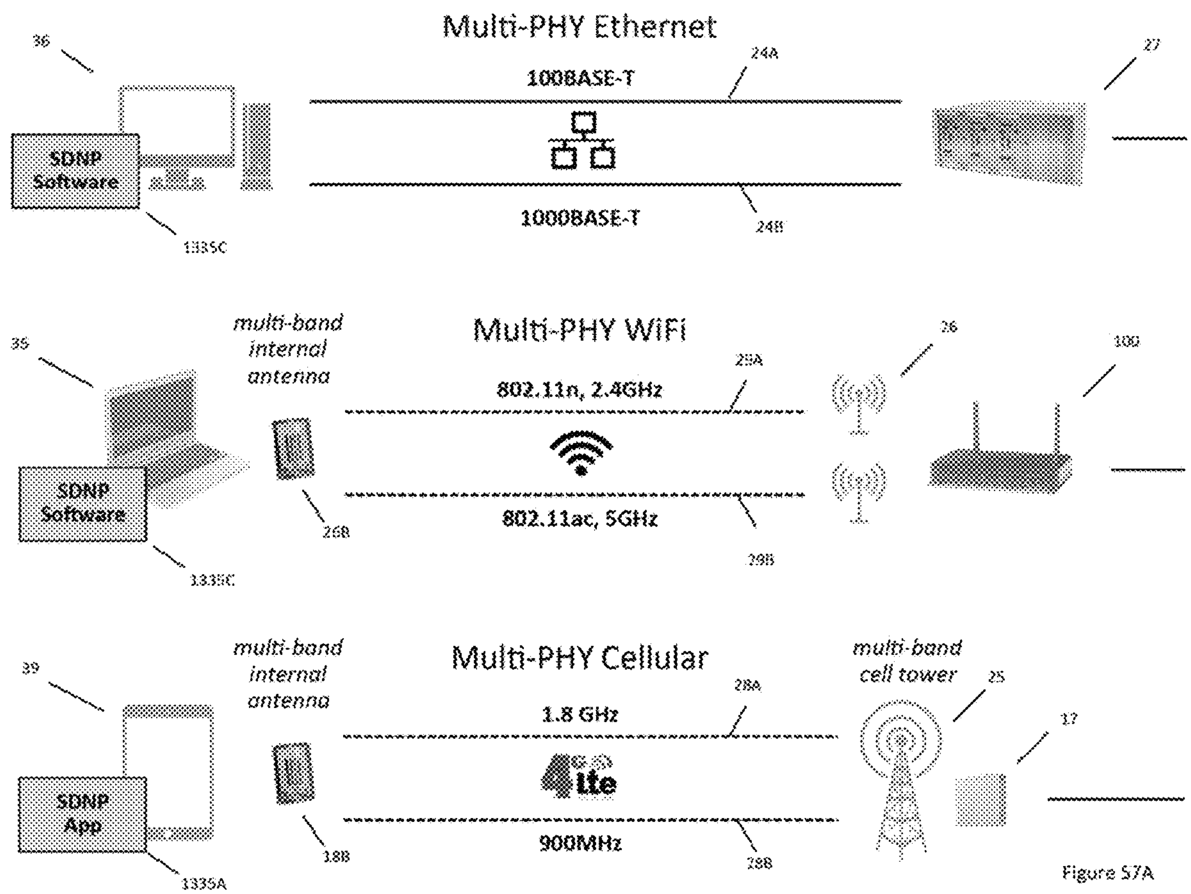
FIG. 57A is a graphical representation of single-media multi-PHY Last Link communication.

Examples of multi-PHY communication using a common Layer 2 protocol are shown in FIG. 57A including Ethernet, WiFi, and cellular implementations. In the topmost example of multi-PHY Ethernet, router 27 communicates to desktop computer 36 using two Ethernet cables comprising wired or fiber links 24A and 24B running 100BASE-T and 1000BASE-T respectively. To facilitate HyperSecure communication over the Last Mile, desktop 36 is shown running SDNP software 1335C.

In the center example of multi-PHY WiFi, WiFi router 100 communicates to notebook 35 over two WiFi channels shown as WiFi links 29A and 29B, the former running 801.11n protocol over 2.4 GHz, and the latter using 802.11ac to communicate over a 5 GHz channel. In order to operate in multi-PHY mode, notebook 35 must be enabled to concurrently send and receive signals at multiple frequencies using a multi-band antenna 26B internal to the notebook. Similarly WiFi router must be capable of sending and receiving signals at multiple frequencies concurrently using multi-band antennas 26. To facilitate HyperSecure communication over the Last Mile, notebook 35 is shown running SDNP software 1335C.

In the lower example showing multi-PHY cellular communication, cellular base station 17 communicates concurrently over multi-band cellular tower 18A to tablet 39 using two different radio channels comprising cellular links 28A and 28B with corresponding frequencies 1.8 GHz and 900 MHz. In the example shown, the cellular link comprises a 4G/LTE network. As shown, tablet 39 must be enabled to concurrently send and receive signals at multiple frequencies using an internal multi-band antenna 18B. To facilitate HyperSecure communication over the Last Mile, tablet 39 is shown running SDNP app 1335A.

Such multi-PHY communication using a common Layer 2 protocol confounds cyber attacks because the hacker must gain physical access two different Layer 2 data links each of which may include their own security. Furthermore, provided the client is running SDNP software 1335C, SDNP app 1335A, or SDNP firmware 1335B (not shown), the routing of the SDNP payloads across the multi-PHY connections utilizes unique dynamic security credentials rendering real time SDNP packet interception and interpretation too demanding for real-time hacking.

Figure 57B:
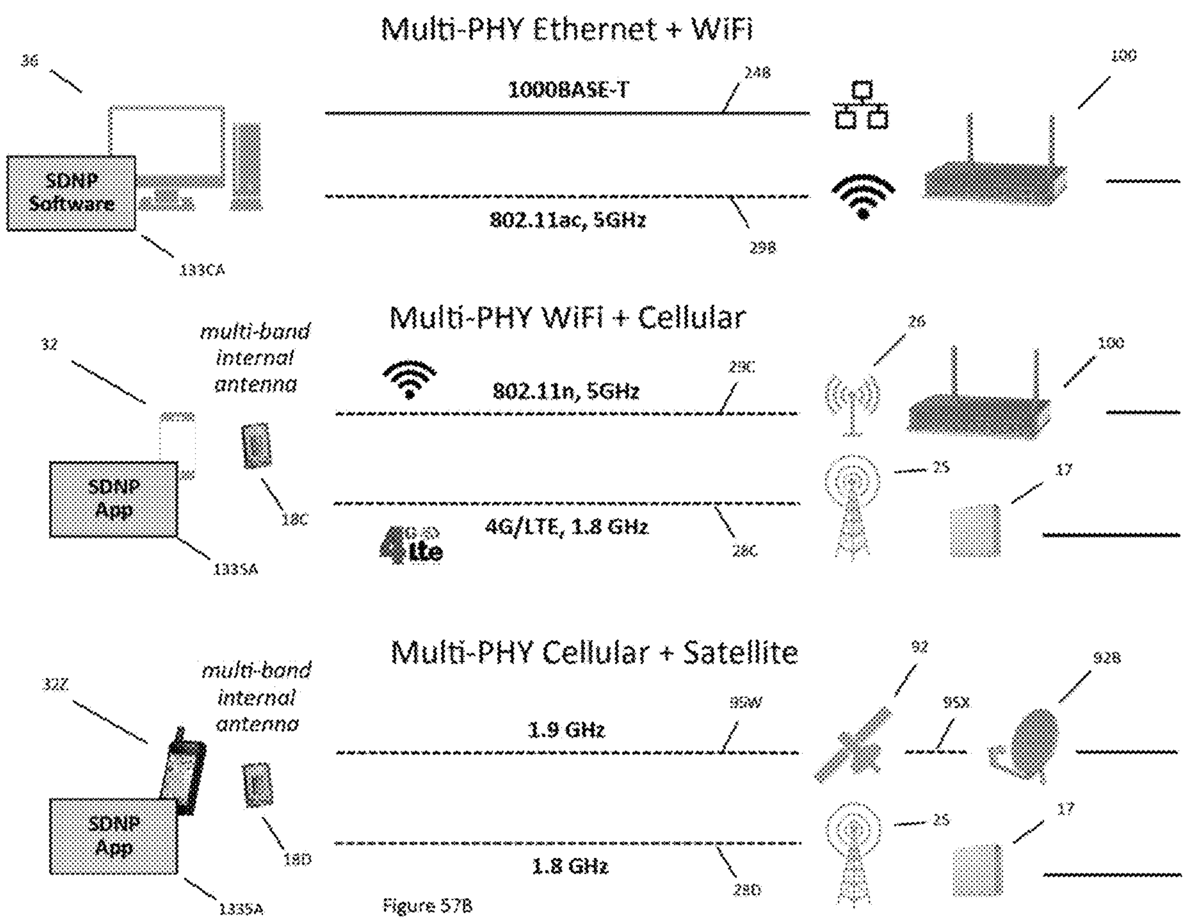
FIG. 57B is a graphical representation of mixed-media multi-PHY Last Link communication.

Examples of multi-PHY communication using mixed Layer 1 media and Layer 2 protocols are shown in FIG. 57B. In these examples, Last Link data is carried using combinations of cellular, WiFi, and satellite systems. In the top example of mixed medium multi-PHY communication, WiFi router 100 communicates with desktop computer 36 using a combination of 100BASE-T Ethernet wired or fiber link 24B and 802.11ac WiFi link 29B operating at 5 GHz. To guarantee HyperSecure communication over the Last Mile, desktop 36 is shown running SDNP software 1335C. Such an example represents the combination of wireline and wireless communication, where wireless packet sniffing is unable to intercept or observe the wireline data. This mixed Ethernet+WiFi multi-PHY Last Link distribution method is particularly well-suited for deploying corporate office networks comprising secure desktop computers within a building or campus communicating to private servers locked in access restricted server rooms.

In the middle schematic of a mixed-medium multi-PHY communication shown in FIG. 57B, cell phone 32 with internal multi-band antenna 18C communicates using two dissimilar wireless techniques. One PHY connection, WiFi link 29C communicates to WiFi router 100 and antenna 26 using, by example a 802.11n protocol at 5 GHz. The second PHY connection, cellular link 28C employs a 1.8 GHz carrier running on a 4G/LTE protocol to facilitate Last Link connectivity to cellular tower 25 and to base station 17. Since cell cellular tower 25 and WiFi antenna 26 operate on unrelated systems, this multi-PHY approach completely obscures any relationship between the data packets carried by the multiple physical mediums in the Last Link. To guarantee HyperSecure communication over the Last Mile, cell phone 32 is shown running SDNP app 1335A.

A similar method to achieve multi-PHY Last Link communication combining cellular and satellite is shown in the bottom illustration of FIG. 57B where satellite/cellular phone 32Z running SDNP app 1335A communicates over two long-distance radio networks—cellular link 28D to cell cellular tower 25 and base station 17 at 1.8 GHz, and satellite link 95W to communication satellite 92 at, for example, 1.9 GHz. Satellite 92 in turn communicates to terrestrial satellite antenna and base station 92B through wide bandwidth link 95X, not necessarily at the same frequency as client communication.

Figure 57C:
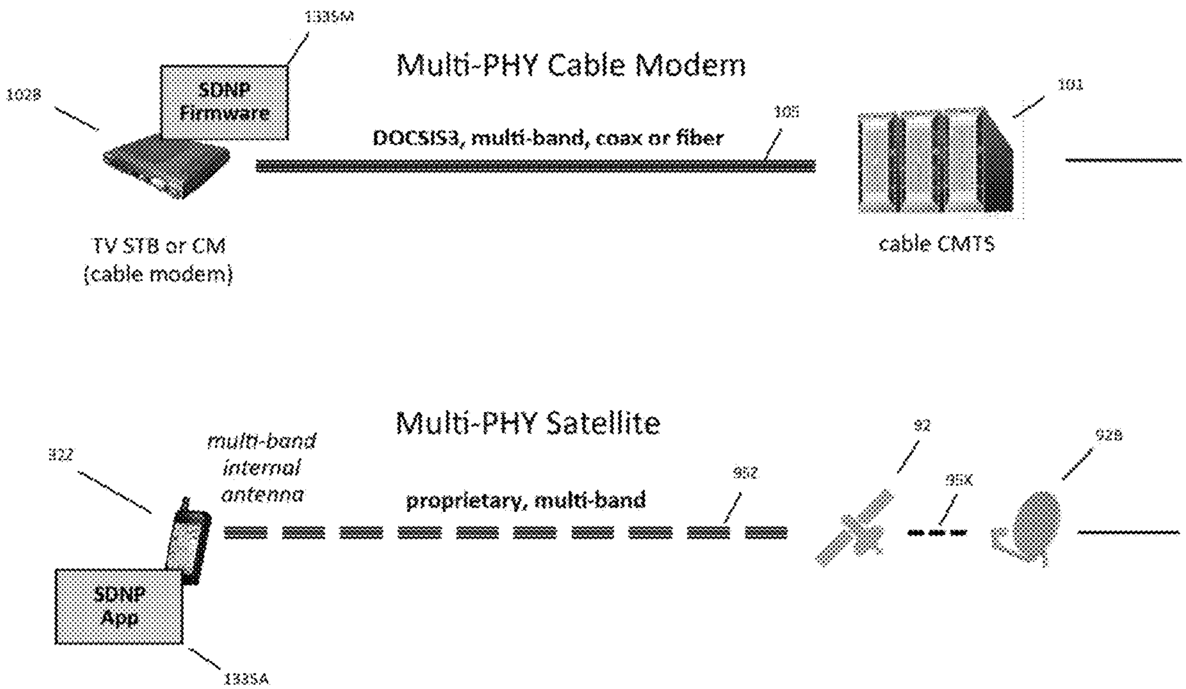
FIG. 57C is a graphical representation of alternative implementations of multi-PHY Last Link communication.

FIG. 57C illustrates another variety of multi-PHY communication—multiple physical mediums sharing common protocols but capable of multiple concurrent communication channels using frequency division. Such a system demands a high bandwidth medium in order to operate without severe loading effects, i.e. where the performance degrades as more users occupy the medium's bandwidth and throughput capability. Only three such mediums are readily available with so much bandwidth, namely (i) DOCSIS3 cable systems using coax cable (ii) DOCSIS 3 cable systems using optical fiber, and (iii) multi-GHz satellite communication systems at low earth orbits. Specifically the topmost illustration of a multi-PHY cable system shows set top box or cable modem 102B running SDNP firmware 1335M communicating to cable CMTS 101 using multiple bands over coax or fiber 105 running DOCSIS3 protocol.

The bottom illustration represents a multi-PHY satellite network where satellite enabled cellular phone 32Z running SDNP app 1335A communicates to communication satellite 92 using multiple carrier bands 95Z formatted with a proprietary communication protocol. Communication between satellite 92 and terrestrial satellite antenna and base station 92B uses a trunk line protocol 95X mixing thousands of calls, making identification and interception of a specific call problematic for a hacker while use of multi-PHY communication over multiple bands in the client link 95Z insures HyperSecure communication for the client.

Figure 58:
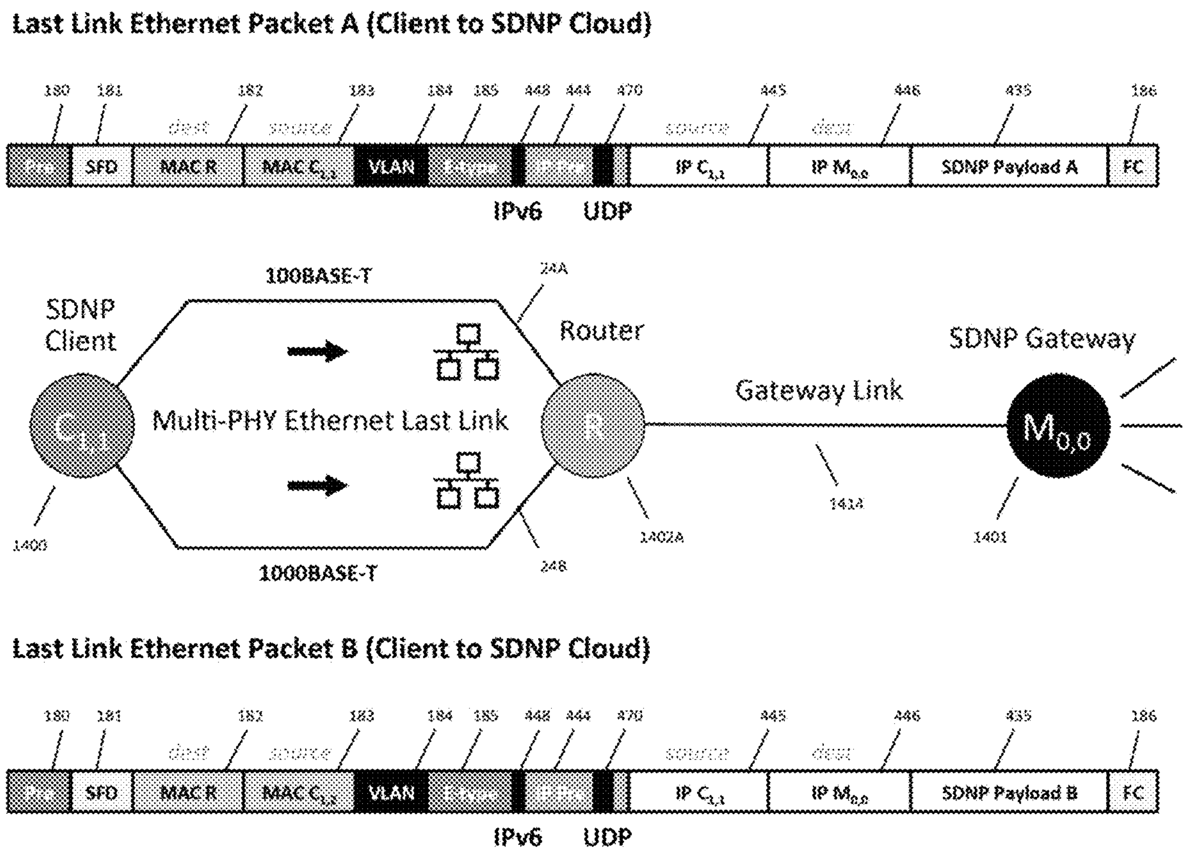
FIG. 58 is a graphical representation of successive client to SDNP-cloud Last Link communications using IPv6 datagrams delivered over multi-PHY Ethernet.

Another example of the data packets used in multi-PHY Last Link routing is shown in FIG. 58 where SDNP client 1400 communicates with router 1402A over two separate PHY connections comprising Ethernet wired or fiber links 24A and 24B running, for example protocols 100BASE-T and 1000BASE-T respectively. Router 1402A in turn connects to SDNP gateway 1401 over gateway link 1414. Both Ethernet packets define the source IP address 445, i.e. the client device, as IP $C_{1,1}$ and the destination IP address 446 of the SDNP gateway as IP $M_{0,0}$. Ethernet packet A, routed over a PHY realized by wired or fiber link 24A, includes a MAC destination address 182 comprising MAC R and a MAC source address 183 comprising MAC $C_{1,1}$. Ethernet packet B, routed over a PHY realized by wired or fiber link 24B, includes a MAC destination address 182 comprising MAC R and a different MAC source address 183 comprising MAC $C_{1,2}$ defining the alternate PHY connection.

The change in the source media address from MAC $C_{1,1}$ to MAC $C_{1,2}$ redirects Ethernet communication from the 2.6 GHz 100BASE-T connection to the 1000BASE-T connection. In operation, data packets from SDNP client device 1400 are fragmented and are then apportioned into SDNP payload A and SDNP payload B in accordance with SDNP algorithms and shared secrets. Fragmented data transport across the multi-PHY Last Link occurs with SDNP payload A carried by Ethernet packet A across wired or fiber link 24A and SDNP payload B carried by Ethernet packet B on wired or fiber link 24B.

Figure 59:
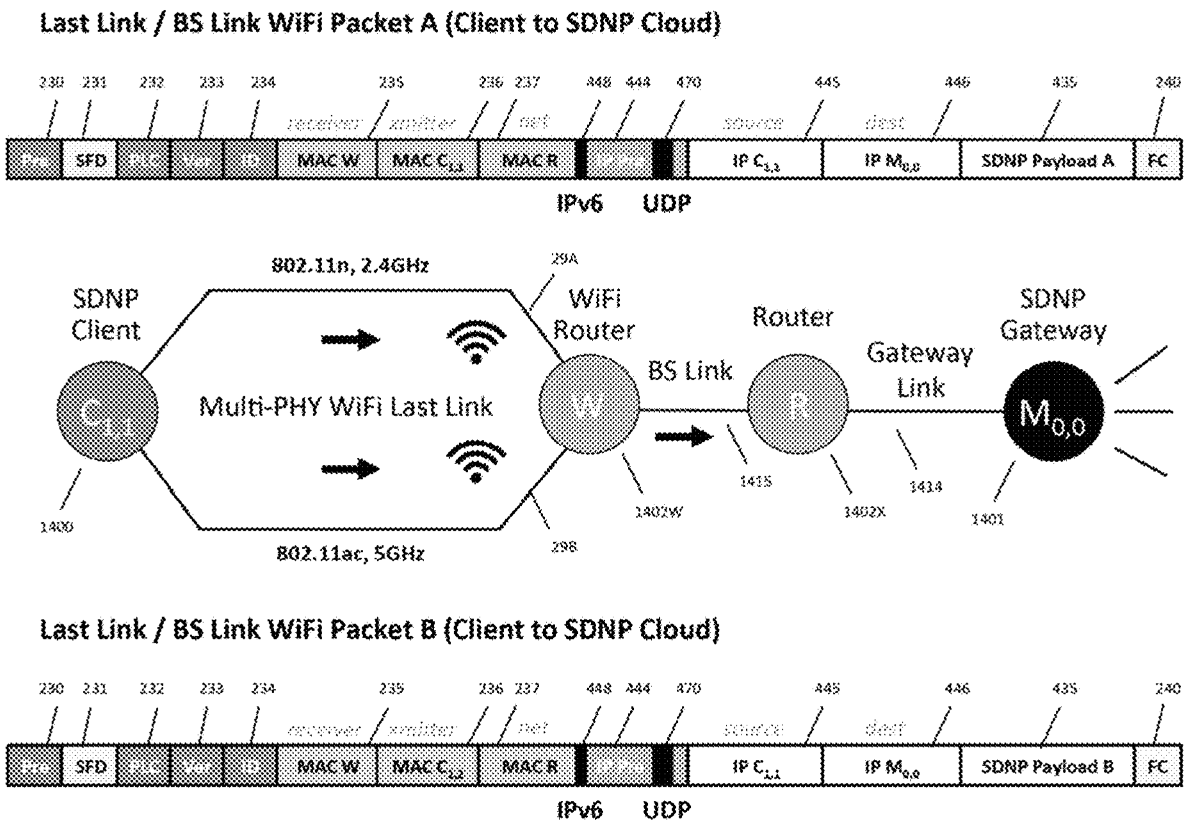
FIG. 59 is a graphical representation of successive client to SDNP-cloud Last Link communications using IPv6 datagrams delivered over multi-PHY WiFi.

Another example of the data packets used in multi-PHY Last Link routing is shown in FIG. 59 where SDNP client 1400 communicates with WiFi router 1402W over two separate PHY connections comprising WiFi links 29A and 29B using, for example, protocols 802.11n at 2.4 GHz and 802.11ac at 5 GHz, respectively. Router 1402W in turn connects to router 1402X over BS link 1415 and router 1402X connects to SDNP gateway 1401 over gateway link 1414. Both WiFi packets define the source IP address 445, i.e. the client device, as IP $C_{1,1}$ and the destination IP address 446 of the SDNP gateway as IP $M_{0,0}$. WiFi packet A, routed over a PHY realized by WiFi link 29A, includes xmitter MAC radio source address 236 comprising MAC $C_{1,1}$, MAC radio receiver destination address 235 comprising MAC W, and MAC network destination 237 comprising MAC R. WiFi packet B, routed over PHY realized by WiFi link 29B includes xmitter MAC radio source address 236 comprising MAC $C_{1,2}$, MAC radio receiver destination address 235 comprising MAC W, and MAC network destination 237 comprising MAC R.

The change in the source media address from MAC $C_{1,1}$ to MAC $C_{1,2}$ redirects the transmission from the 2.6 GHz WiFi radio to the 5 GHz transceiver. In operation, data packets from SDNP client device 1400 are fragmented and then apportioned into SDNP payload A and SDNP payload B in accordance with SDNP algorithms and shared secrets. Fragmented data transport across the multi-PHY Last Link occurs with SDNP payload A carried by WiFi packet A across WiFi link 29A and SDNP payload B carried by WiFi packet B on WiFi link 29B.

Figure 60:
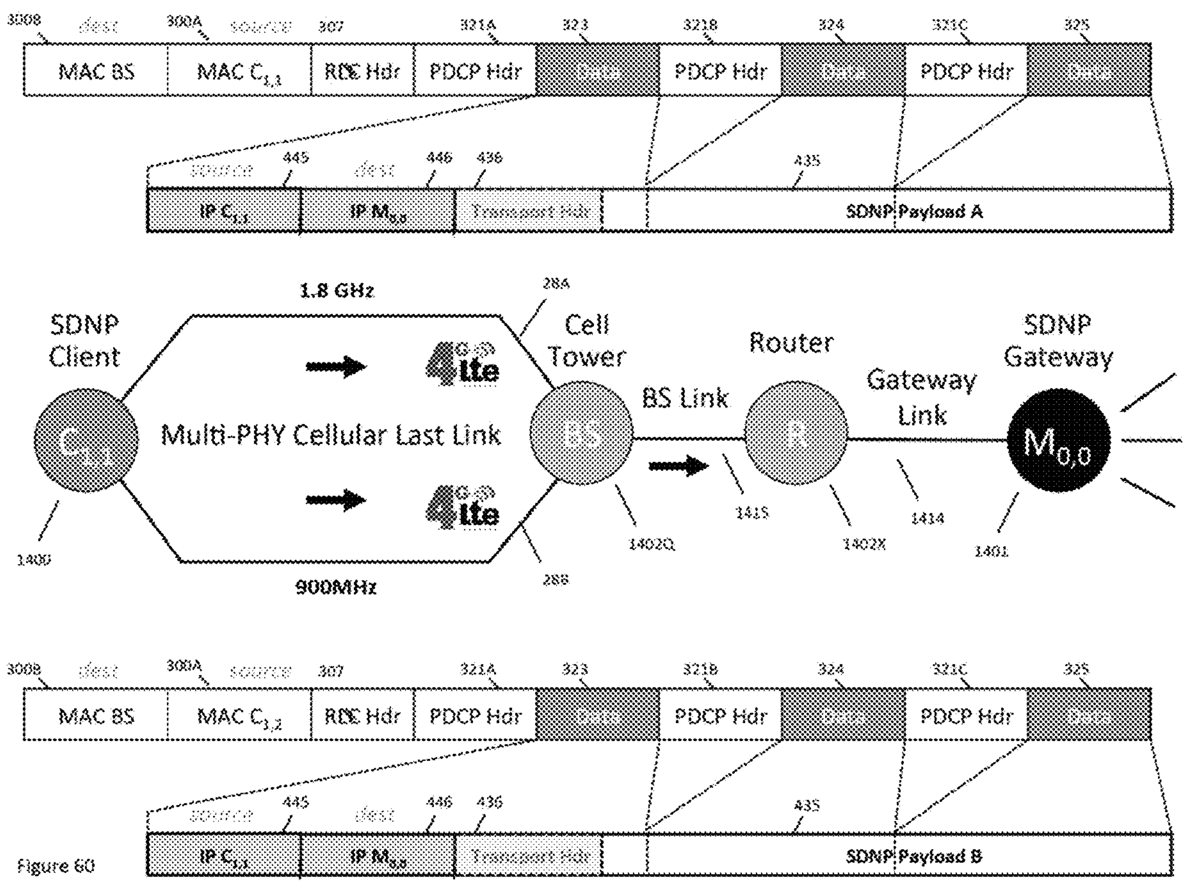
FIG. 60 is a graphical representation of successive client to SDNP-cloud Last Link communications using IPv6 datagrams delivered over multi-PHY 4G cellular networks.

Yet another example of the data packets used in multi-PHY Last Link routing is shown in FIG. 60 where SDNP client 1400 communicates with cell tower 1402Q over two separate PHY connections comprising cellular links 28A and 28B using, for example, protocols 4G/LTE at 1.8 GHz and 4G/LTE at 900 MHz, respectively. Router 1402Q in turn connects to router 1402X over BS link 1415 and router 1402X connects to SDNP gateway 1401 over gateway link 1414. Both cellular radio packets define the source IP address 445, i.e. the client device, as IP $C_{1,1}$ and the destination IP address 446 of the SDNP gateway as IP $M_{0,0}$. Cellular packet A routed over PHY realized by cellular link 28A includes xmitter MAC radio source address 300A comprising MAC $C_{1,1}$, and MAC cell tower destination 300B comprising MAC BS. Cellular packet B routed over PHY realized as cellular link 28B includes xmitter MAC radio source address 300A comprising MAC $C_{1,2}$, and MAC cell tower destination 300B comprising MAC BS.

The change in the source media address from MAC $C_{1,1}$ to MAC $C_{1,2}$ redirects the transmission from the 1.8 GHz 4G/LTE cellular radio to 900 MHz. In operation, data packets from SDNP client device 1400 are fragmented then apportioned into SDNP payload A and SDNP payload B in accordance with SDNP algorithms and shared secrets. Fragmented data transport across the multi-PHY Last Link occurs with SDNP payload A carried by cellular packet A across WiFi link 28A and SDNP payload B carried by cellular packet B on WiFi link 28B.

Figure 61:
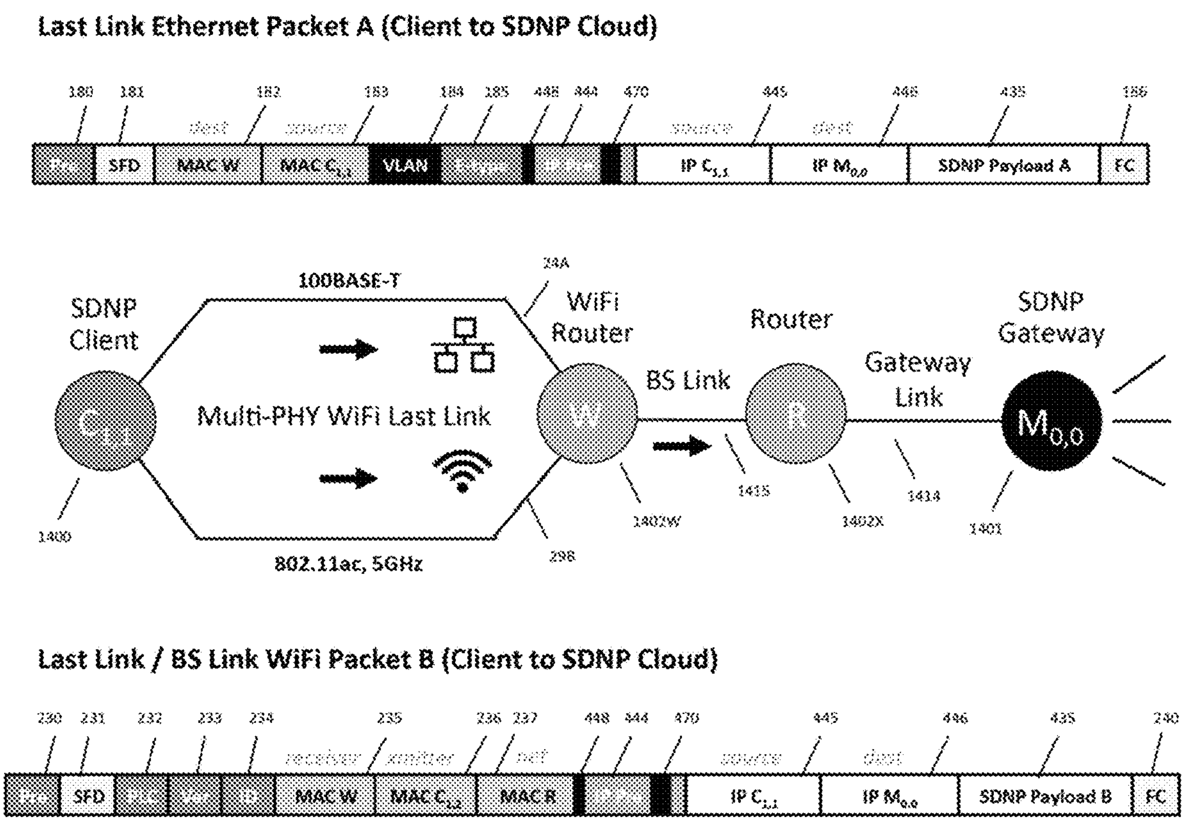
FIG. 61 is a graphical representation of successive client to SDNP-cloud Last Link communications using IPv6 datagrams using multi-PHY delivery over Ethernet and WiFi.

As described previously, multi-PHY communication can also comprise dissimilar media. In such cases, the data packet for each connection must be formatted in accordance with the Layer 2 protocols for the corresponding physical media. For example, FIG. 61 illustrates hybrid Last Link communication comprising Ethernet and WiFi where SDNP client 1400 communicates with WiFi router 1402W over two separate PHY connections comprising Ethernet wired or fiber link 24A and WiFi link 29B using, for example, 100BASE-T and 802.11ac at 5 GHz, respectively. Router 1402W in turn connects to router 1402X over BS link 1415 and router 1402X connects to SDNP gateway 1401 over gateway link 1414. Both WiFi packets define the source IP address 445, i.e. the client device, as IP $C_{1,1}$ and the destination IP address 446 of the SDNP gateway as IP $M_{0,0}$. Ethernet A routed over PHY realized by wired or fiber link 24A includes MAC source address 183 comprising MAC $C_{1,1}$, and MAC destination address 182 comprising MAC W. WiFi packet B routed over PHY realized by WiFi link 29B includes xmitter MAC radio source address 236 comprising MAC $C_{1,2}$, MAC radio receiver destination address 235 comprising MAC W, and MAC network destination 237 comprising MAC R.

The change in the source media address from MAC $C_{1,1}$ to MAC $C_{1,2}$ redirects the transmission from the Ethernet to WiFi. In operation, data packets from SDNP client device 1400 are fragmented then apportioned into SDNP payload A and SDNP payload B in accordance with SDNP algorithms and shared secrets. Fragmented data transport across the multi-PHY Last Link occurs with SDNP payload A carried by Ethernet packet A across wired or fiber link 24A and SDNP payload B carried by WiFi packet B on WiFi link 29B.

Figure 62:
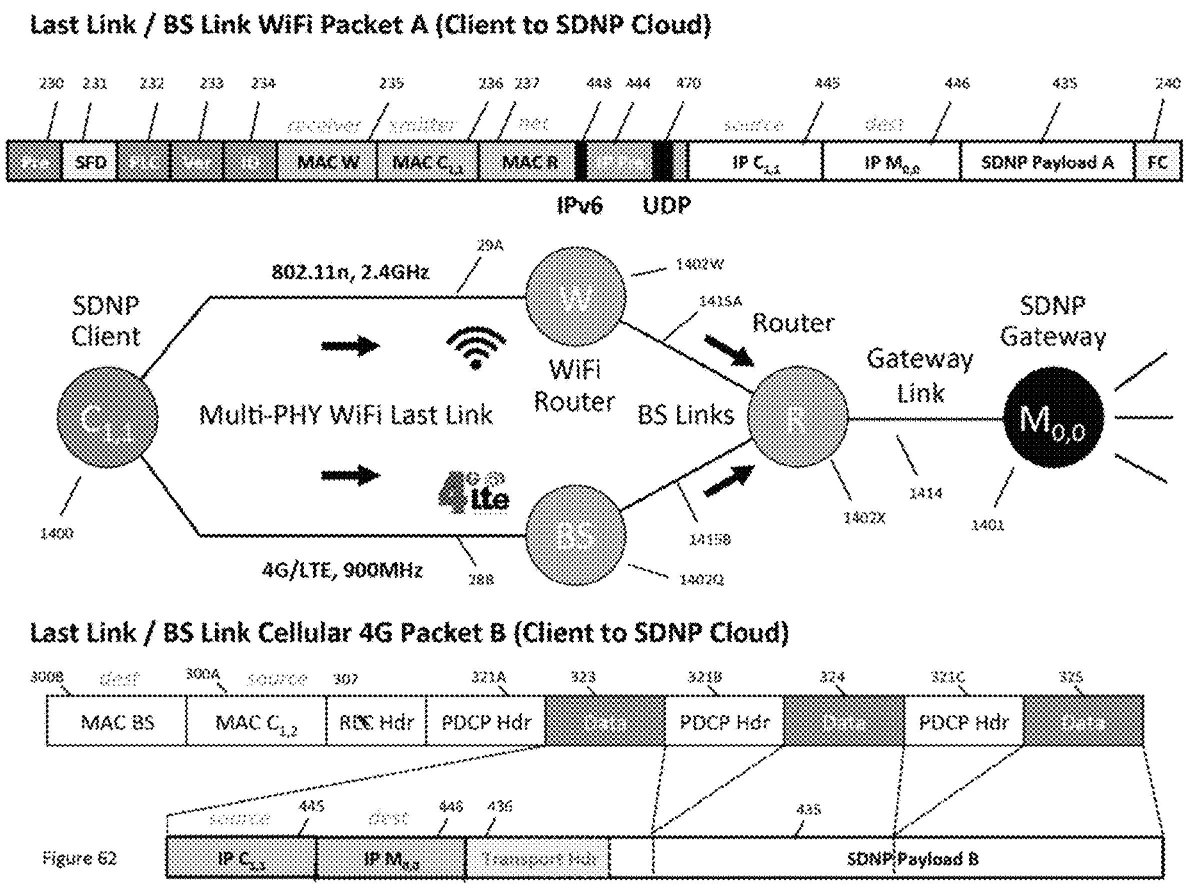
FIG. 62 is a graphical representation of successive client to SDNP-cloud Last Link communications using IPv6 datagrams using multi-PHY delivery over and WiFi and 4G cellular networks.

FIG. 62 illustrates hybrid Last Link communication comprising WiFi and cellular communication where SDNP client 1400 communicates with over two separate PHY connections to two different wireless base stations, specifically WiFi link 29A to WiFi router 1402W operating 802.11n at 2.4 GHz and cellular link 28B to cellular base station 1402Q operating 4G/LTE over a 900 MHz carrier frequency. Routers 1402W and 1402Q in turn connect to router 1402X over BS links 1415A and 1415B, respectively, and router 1402X connects to SDNP gateway 1401 over gateway link 1414. Both WiFi and 4G cellular packets define the source IP address 445, i.e. the client device, as IP $C_{1,1}$ and the destination IP address 446 of the SDNP gateway as IP $M_{0,0}$. WiFi packet A, routed at the PHY layer over a connection comprising WiFi link 29A, includes xmitter MAC radio source address 236 comprising MAC $C_{1,1}$, MAC radio receiver destination address 235 comprising MAC W, and MAC network destination 237 comprising MAC R. Cellular B, routed as the PHY layer connection realized by WiFi link 29B, includes MAC source address 300B comprising MAC $C_{1,2}$, and MAC destination 330B comprising MAC BS.

The change in the source media address from MAC $C_{1,1}$ to MAC $C_{1,2}$ redirects the transmission from the WiFi LAN to a cellular network. In operation, data packets from SDNP client device 1400 are fragmented then apportioned into SDNP payload A and SDNP payload B in accordance with SDNP algorithms and shared secrets. Fragmented data transport across the multi-PHY Last Link occurs with SDNP payload A carried by WiFi packet A across WiFi link 29A and SDNP payload B carried by cellular packet B on cellular link 28B.

Figure 63:
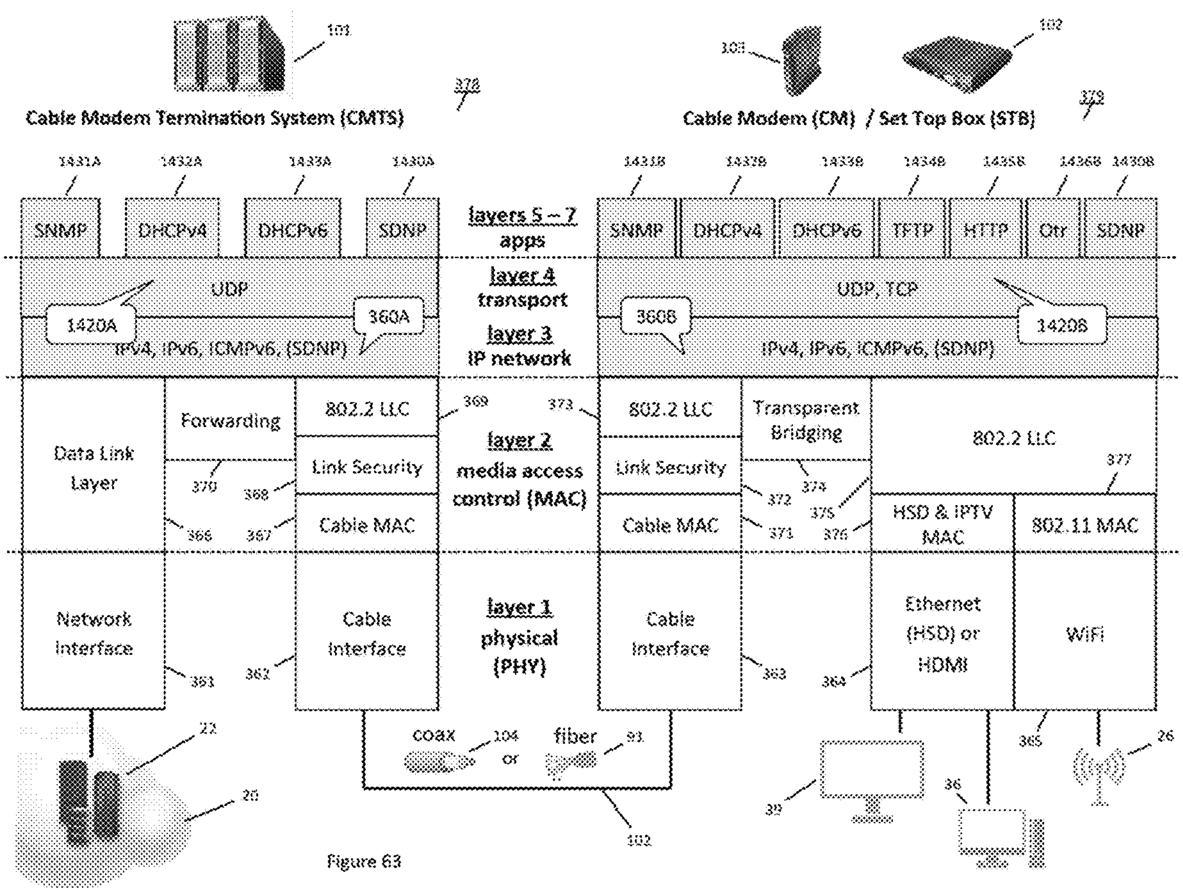
FIG. 63 is a schematic representation of an OSI layer stack construct of a DOCSIS cable modem communication network illustrating Layer 1 through Layer 7 functionality.

Another form of multi-PHY communication involves physical mediums capable of supporting many channels at different frequencies and using distinct protocols for different data packets. Such an implementation can be facilitated using a DOCSIS3-based cable distribution system executing SDNP software. The OSI communication stack for a SDNP enabled DOCSIS3 cable distribution system is illustrated in FIG. 63 including Layer 1 PHY connectivity, the Layer 2 data link, and an overlying Layer 3 network for both the cable modem termination device CMTS 101 as well as examples of cable-connected devices, e.g. cable modem CM 103 or set top box STB 102. Specifically, cable modem termination system device CMTS 101 and its associated stack 378 contains a Layer 1 PHY network interface 361 connected to cloud servers 22 and Internet 20, or alternatively to a video headend, IPTV system, or VoIP system (not shown). The combination of network interface 361 and data link layer 366 are included in the device interface communication stack 378 of CMTS 101. On data link Layer 2, data is passed from the network interface communication stack to the cable network interface communication stack through forwarding function 370, specifically into link level control LLC 369. Link level control 802.2 LLC 369 comprises a hardware-independent protocol defined in accordance with IEEE specification 802.2. The packet data is then modified by link security 368 to provide rudimentary packet security, primarily to prevent unauthorized viewing of content such as pay-per-view unicast broadcasts.

The Layer 1 PHY cable interface 362 then sends the data frames over distribution network 102 comprising either coaxial cable 104 or optical fiber 91 to the corresponding Layer 1 PHY cable interface 363 within cable modem CM 103 or set top box STB 102. Cable interface 363 represents the PHY layer of the cable network interface shown as OSI communication stack 379 of cable modem CM 103 or set top box STB 102. Upon receiving a data packet, cable MAC interface 371 then interprets the cable MAC addresses, passing its payload to link security 372 for decryption and ultimately to hardware independent link layer control 802.2 LLC 373 for interpretation. The input data to the CM or STB cable network communication stack is then passed through transparent bridging 374 to the CM or STB device interface communication stack, specifically to device independent link layer control 802.2 LLC 375 in accordance with the specification for IEEE 802.2. The packet is then passed to either HSD & IPTV MAC block 376 or to WiFi 802.11 MAC block 377 to update the packet's MAC addresses. In the case of WiFi communication, the data packet is then passed from 802.11 MAC block 377 to WiFi PHY Layer 1 radio interface 365 for transmission on WiFi antenna 26. In the case of wireline connections, the data packet is then passed from HSD & IPTV MAC block 376 to Ethernet or HDMI interface block 364 for connecting to TV 39 or desktop 36.

The PHY and data link layer as described establish connections from a CMTS to any number of cable modems (CMs). Within CMTS communication stack 378 and within CM communication stack 379, data packets are prepared within OSI Layer 3 layers 360A and 360B, respectively, as IP datagrams IPv4, IPv6 or ICMPv6 using IP addresses recognized by the cable network or by the Internet's DNS name servers. In Last Mile communication SDNP datagrams using IPv4 or IPv6 data packets with SDNP source and destination IP address are generally not used because connected devices not enabled by SDNP software or firmware have no ability to interpret the SDNP datagram routing addresses.

Transport Layer 4 operation within the cable modem network varies by device. In the case of CMTS 101, Layer 4 transport layer 1420 of OSI communication stack 378 exclusively employs UDP because its operation necessitates real time communication, e.g. the streaming of video data. From this perspective, cable communication 102 is more like the SDNP real time network than the Internet is. Because the cable modem has interoperability with both the Internet and the cable network as a client, i.e. end communication device, Layer 4 transport layer 1420B in OSI communication stack 379 of CM 103 or STB 102 uses UDP for real time operations and employs TCP for Internet data. Such use is problematic for OTT carriers using VoIP over the Internet, as the cable network will interpret the IP datagrams as data, automatically employing TCP and the transport protocol and degrading real time communication QoS, latency, and propagation delay. This issue does not arise in SDNP enabled cable modems—in cases where the CM or STB is operating SDNP firmware or software, the SDNP software contextually decides when the use of TCP is warranted (for software and files) and when it is not, i.e. for real time data.

The application layers, namely OSI Layer 5 through Layer 7, sit atop Layer transport operations 1420A in CMTS 101 and atop transport layer 1420B in CM 103 or STB 102. In CMTS 101 these applications typically involve communication tasks such as SNMP 1431A, Internet-standard protocol for collecting and organizing information connected devices on IP networks. Other functions include DHCPv4 1432A and DHCPv6 1433A. DHCP, an acronym for dynamic host configuration protocol is a protocol for both clients and servers to automatically supply an IP host with necessary routing information including dynamically generated (non static) IP address, default gateway and subnet mask. Although Internet generation specific, i.e. for IPv4 or IPv6, the function of dynamic IP address generation, like a NAT gateway or SNMP, is generic and equally applicable in DOCSIS3 cable systems for both CMTS 101 and CM 103 or STB 102.

The application layer implementation of the secure dynamic communication network and protocol disclosed herein, when realized as SDNP firmware 1430A running atop the CMTS 101 operating system can perform any number of unique tasks including:

- Operating as a pass-through without interpreting the SDNP payload 1430 in which case CM 103 must be enabled to open and read the SDNP payload, i.e. CM 103 must be a SDNP client.
- Operating as a Last Mile remote SDNP gateway, i.e. interpreting the contents of a SDNP payload and converting the contents to a DOCSIS3 specific message (including link security) for forwarding to CM 103. In such cases CM 103 need not be running SDNP client software or firmware.
- Operating as a Last Mile SDNP bridge, converting IP datagrams to SDNP datagrams, and communicating the SDNP datagrams to CM 103. In such cases, CM 103 must be running SDNP client software or firmware to connect to the SDNP-bridge, i.e. forming an ad hoc SDNP "floating" network.

As shown, OSI communication stack 379 for CM 103 and STB 102 includes numerous applications classified as OSI Layer 5 through Layer 7 including the aforementioned communication related apps SNMP 1431B, DHCPv4 1432B, and DHCPv6 1433B. Another function, the utility TFTP 1434B or "trivial file transfer protocol" is primarily used in DOCSIS3 as a means to download software and software updates from the CMTS to cable modems and set top boxes throughout the cable network. In cable networks, the HTTP 1435B or hypertext transfer protocol is primarily for painting dynamic menus useful in smart TVs. Other applications (labeled by the shorthand notation "Otr" 1436B) include gaming apps, diagnostics, IPTV apps, video recording functions, and more. SDNP firmware 1430B running on CM 103 or STB 102 extends, HyperSecure Last Mile communication all the way to the user and Last Link regardless whether CMTS 101 is running SDNP software or not.

Figure 64:
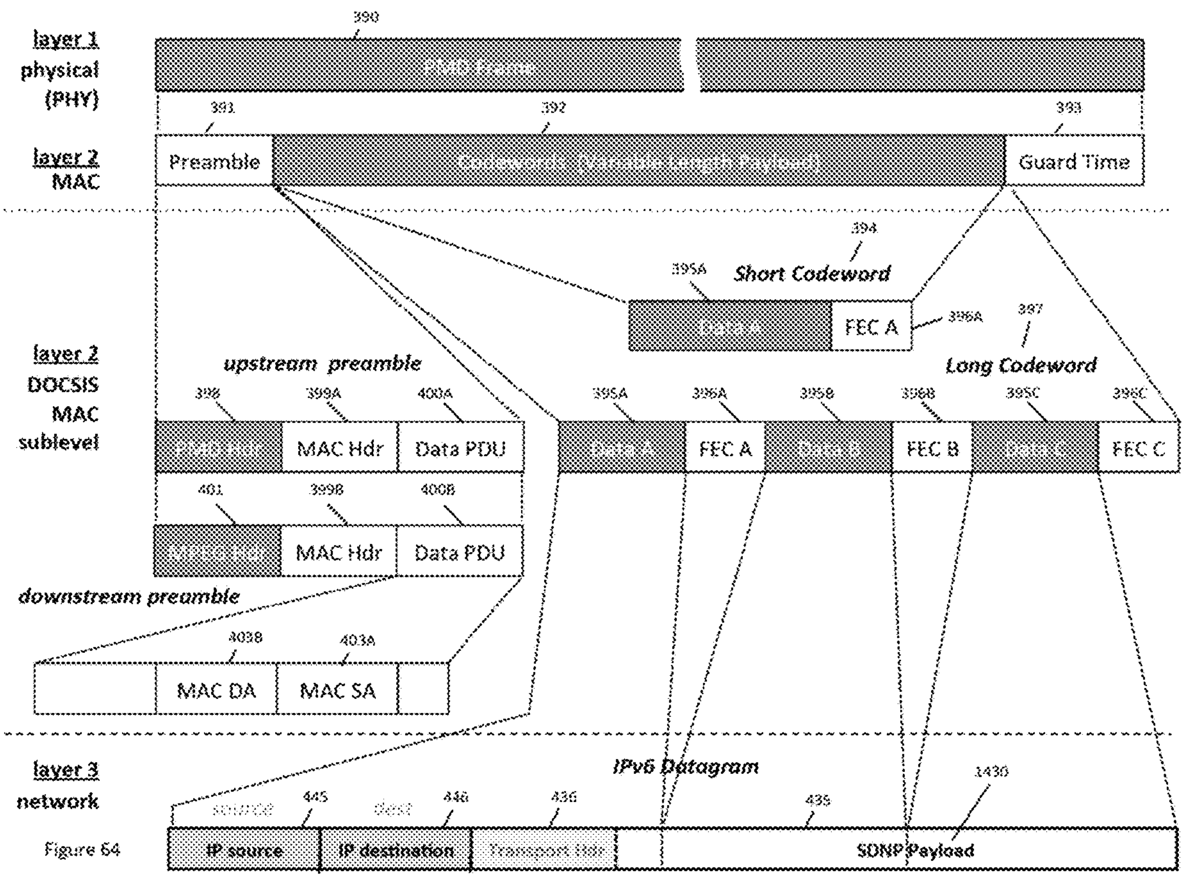
FIG. 64 is a graphical representation of DOCSIS3 base communication packets made for cable systems carrying a SDNP payload.

FIG. 64 illustrates construction of a DOCSIS3 data packet adapted for delivering SDNP payload 1430. As shown PHY Layer 1 comprises physical media device frame 390 of variable length and duration, containing data link Layer 2 MAC data comprising preamble 391, variable length payload or codewords 392 and guardtime 393. Preamble 391 contains either an upstream preamble or a downstream preamble, depending on the direction of communication. In the case of an upstream preamble, preamble 391 contains physical media device PMD header 398, MAC header 399A and data PDU 400A. In the case of the downstream preamble, preamble 391 contains MPEG header 401, MAC header 399B and data PDU 400B. Both data PDU 400A in the upstream preamble and data PDU 400B in the downstream preamble contain MAC destination address (DA) 403B and MAC source address (SA) 403A. The content of variable length payload 392 may comprise a short codeword 394 or a long codeword 397.

Short codeword 394 contains payload 395A comprising data A and error correction 396A containing FEC A. In the event of long codeword 397, the payload is divided into multiple payload blocks 395A, 395B, and 395C carrying data A, data B, and data C, respectively, with each payload containing its own error checking blocks 396A, 396B, and 396C including corresponding data FEC A, FEC B, and FEC C. After error checking, the delivered data from DOCSIS3 comprises data blocks 395A, 395B and 395C in the case of a long codeword and only data block 395A in the case of a short codeword. The combination of data A, data B, and data C merge into a contiguous IP datagram, in this example an IPv6 datagram, containing IP source address 445, IP destination address 446 and data field 435 containing SDNP payload 1430 and transport header 436 containing Layer 4 data. In this manner DOCSIS3 flexibly delivers data over a cable network using packet-switched data protocol.

Figure 65A:
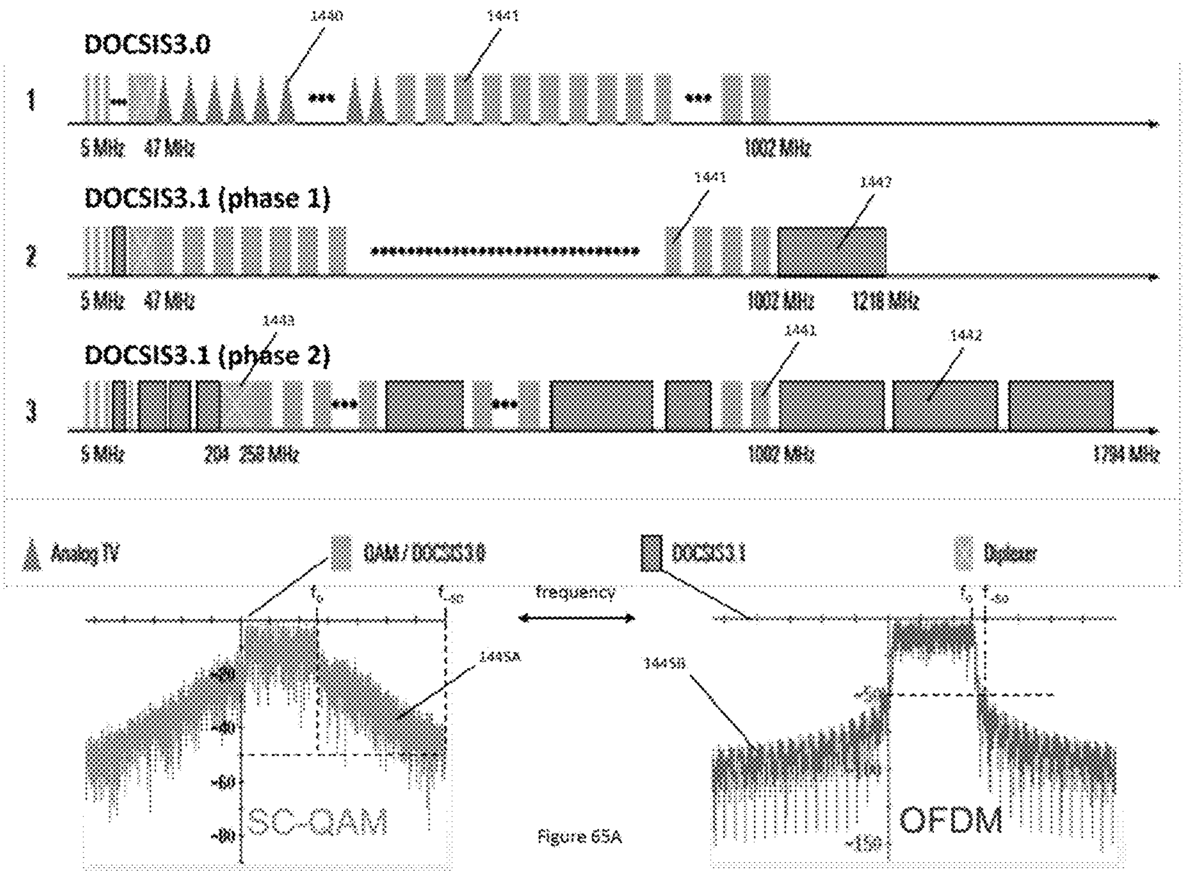
FIG. 65A is a graphical representation of spectrum allocation and carrier modulation methods for various DOCSIS3 protocols.

As shown in FIG. 65A the data packets are carried in multiple channels over a hybrid cable-fiber network, i.e. at different frequencies. In DOCSIS 3.0, data channels range from 5 MHz to 1,002 MHz including analog TV signals 1440 (triangles), QAM data 1441, and "diplexer" control channel 1443. In phase 1 of DOCSIS 3.1, the frequency range is extended to 1,218 MHz and DOCSIS3.1 data channels 1442 are added to facilitate OFDM modulation, primarily in a frequency band above the existing channels assigned for QAM.

OFDM is preferred to QAM modulation methods because the channels can be more tightly spaced. Comparing modulation schemes, QAM frequency distribution 1445A exhibits a wider tail in spectral content than OFDM frequency distribution 1445B. Specifically, the spectral sideband width from $f_0$ to $f_{-50}$, i.e. the width from the carrier edge to the frequency where the signal drops by −50 dB, is 4.3 normalized frequency units wide in QAM frequency distribution 1445A, but only 0.4 normalized frequency units wide in the case of OFDM frequency distribution 1445B. Because the spectral width is narrower, more communication channels can be packed into the same spectrum increasing the overall bandwidth and the maximum total data rate of the network. In phase 2 deployment of DOCSIS 3.1, the frequency range is extended to 1,794 MHz. Many of the bands originally assigned for QAM data 1441 are replaced by new channels assigned explicitly for OFDM data 1442.

Figure 65B:
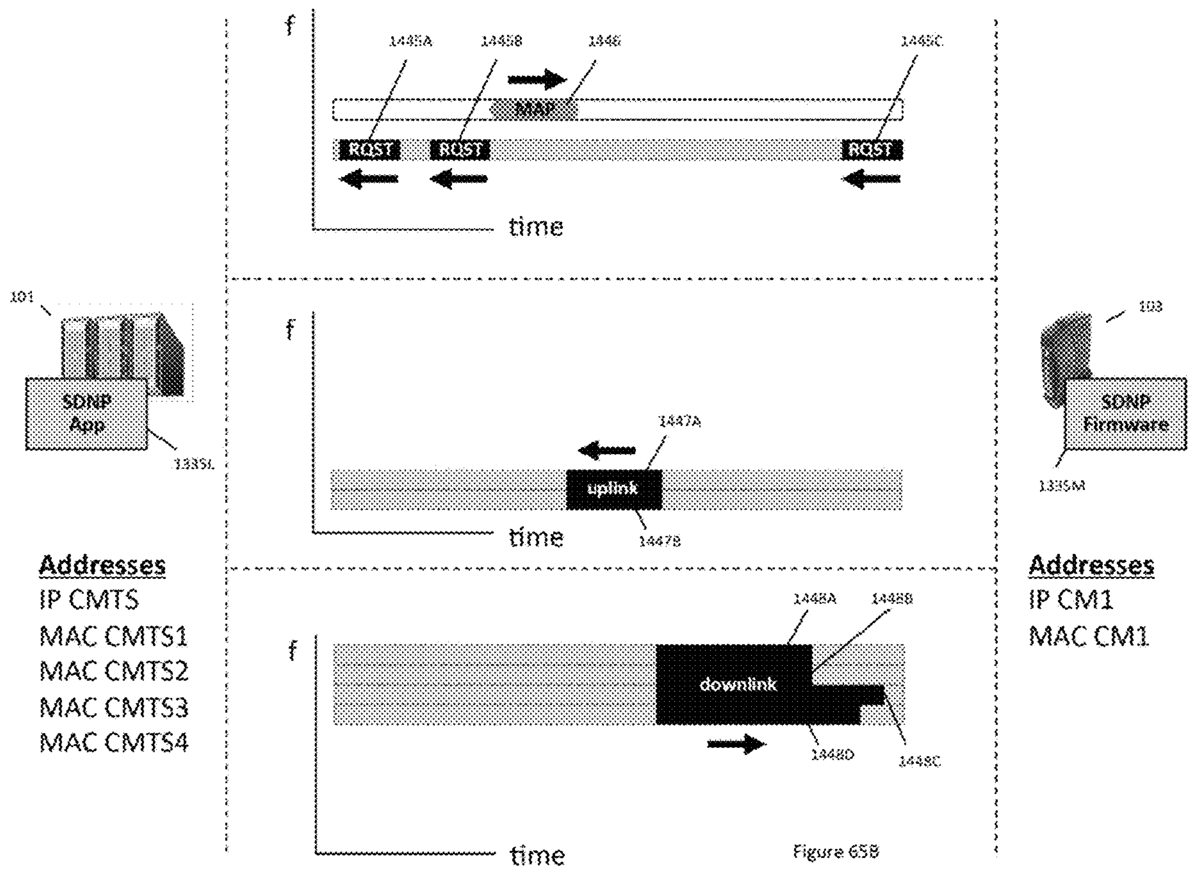
FIG. 65B is a graphical representation of a DOCSIS3.1 communication sequence between CTMS and CM.

In a DOCSIS-enabled cable network, one CMTS unit supports many CMs managing the available channels. Although the CMTS can allocate downstream communication and channel selection dynamically as needed, upstream communication requires contention management to facilitate the case where multiple CMs attempt to send data concurrently. As such, each modem must request an uplink channel from the CMTS before sending data. This process is shown in FIG. 65B comprising a sequence of communication operations between CMTS 101 running SDNP app 1335L and CM 103 operating SDNP firmware 1335M. Routing of IP datagrams in multi-PHY communication utilize IP addresses "IP CMTS" and "IP CM1" and multiple MAC addresses, by example "MAC CM1" for CM 103 and "MAC CMTS1", "MAC CMTS2", "MAC CMTS3", and "MAC CMTS4" for CMTS 101. In the topmost illustration showing a graph of frequency versus time, CM 103 sends a request to transmit RQST 1445A on a dedicated channel.

After receiving no response, a second RQST 1445B is sent resulting in a reply from CMTS 101 on a different channel, in the form of MAP data packet 1446. The contents of MAP data packet 1446 instruct CM 103 when to transmit and what channels it can use for its upstream communication. After receiving the MAP data packet 1446, CM 103 sends its upstream data concurrently spread over two channels in uplink data packets 1447A and 1447B. The splitting of data sent concurrently over two channels shown in the center illustration is referred to a channel bonding. Channel bonding is a means by which communication bandwidth and data rate between the CMTS and CM can be increased. It is also a dynamic method to insure no available bandwidth goes unused. In the bottom illustration, CMTS 101 replies by channel bonding four channels, namely 1448A, 1448B, 1448C, and 1448D and sending data concurrently but of differing durations.

Figure 65C:
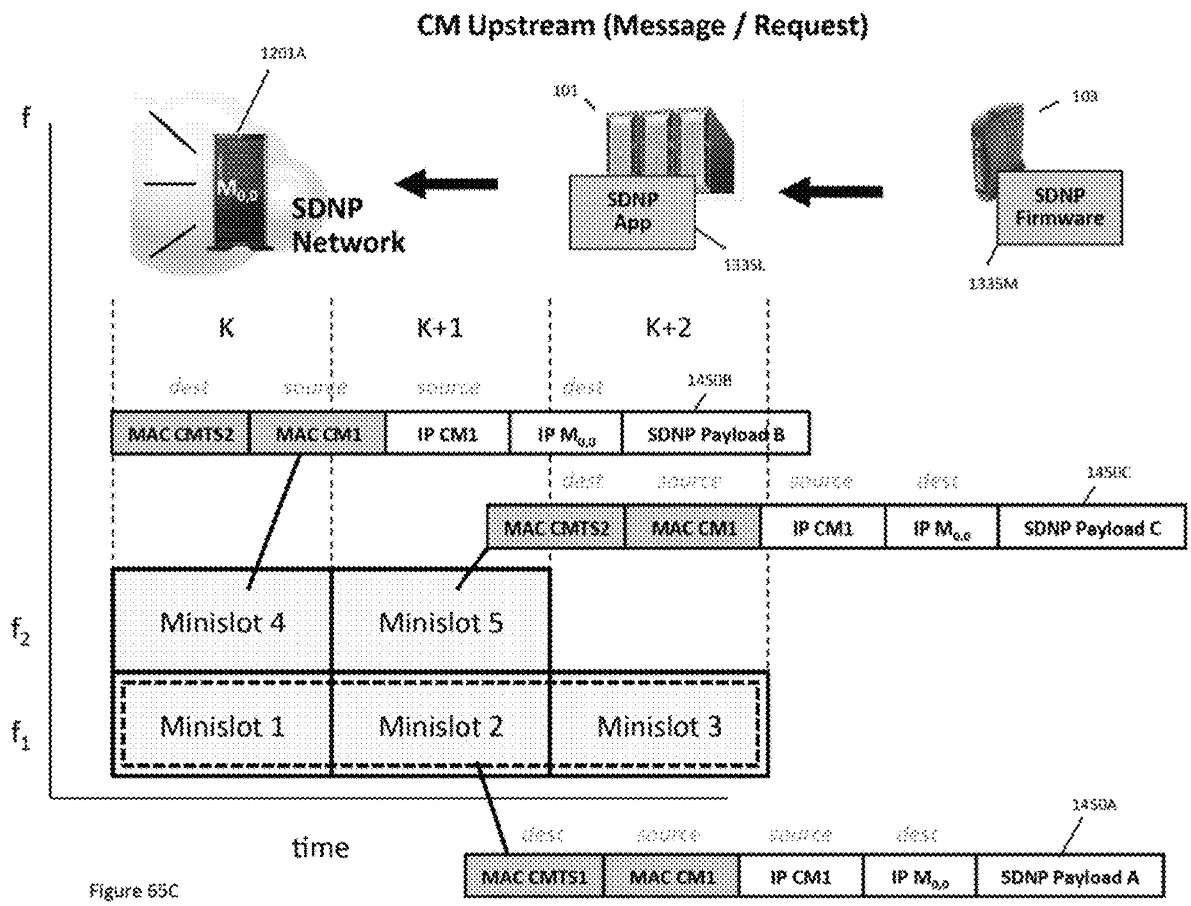
FIG. 65C is a graphical representation of DOCSIS3.1 upstream communication.

In both upstream and downstream communication across the hybrid fiber-cable network, bandwidth is allocated dynamically among multiple channels, divided into small time segments referred to as "minislots". FIG. 65C illustrates upstream communication from CM 103 to CMTS 101. Such upstream communications generally comprise a message or a request to transmit. In this example, data is sent over frequencies $f_1$ and $f_2$ comprising five time minislots in total. As shown, minislots 1, 2, and 3 are sent at frequency $f_1$ during intervals K, (K+1), and (K+2) while minislots 4 and 5 are sent at frequency $f_2$ during intervals K and (K+1), but not during interval (K+2). Upstream data packet 1450A, shown in abridged form, specifies the IP source address "IP CM1" and the IP destination address of the Last Mile communication, i.e. "IP $M_{0,0}$", the gateway node of the SDNP network hosted by server 1201A.

For Last Link communication, upstream data packet 1450A specifies "MAC CM1" as the cable modem's source MAC address and specifies the PHY medium, in this case the channel on frequency $f_1$ as the MAC destination "MAC CMTS1". Data packet 1450A containing SDNP payload A occupies three minislots in total, namely minislots 1, 2, and 3 even though together they carry a single data packet and payload. In contrast, minislot-4 and minislot-5 each contain only a single data packet each, i.e. 1450B and 1450C with corresponding data SDNP payload B and SDNP payload C. Like data packet 1450A, both packets 1450B and 1450C specify a destination IP address of the SDNP cloud, specifically SDNP gateway node $M_{0,0}$.

For the MAC destination address, however, rather than specifying the same MAC address and physical media as the first packet, both packets 1450B and 1450C stipulate a MAC destination address of "MAC CMTS2". This address can be used to specify that the data packets 1450B and 1450C should be carried on a different frequency than data packet 1450A—in this case frequency $f_2$, not frequency $f_1$. The actual values of the frequencies are dynamically mapped by CMTS 101 and not specifically identified. A DOCSIS3 enabled system thereby represents a multi-PHY solution whereby a single CMTS unit can communicate concurrently to a cable modem or set top box over multiple frequencies and using multiple protocols such as 256 QAM or OFDM.

Rather than allowing the CM and CMTS to determine which data packets use a common carrier channel or frequency as is the normal case for DOCSIS3 systems, in accordance with the disclosed secure dynamic communication network and protocol for Last Mile communication, the SDNP client CM 103 specifies different MAC destination addresses to force communication over multiple frequencies and channels, i.e. to force multi-PHY operation. Because CM 103 data packets 1450A and 1450B/C stipulate different destination MAC addresses, namely MAC CMTS1 and MAC CMTS2 respectively, the data packets automatically invoke multi-PHY operation over the Last Link. Alternatively if the CMTS facilitates another means by which to request unique channel allocation, e.g. using a command and control request, then the use of the MAC address to invoke multi-PHY communication may be substituted by the alternate means.

Figure 65D:
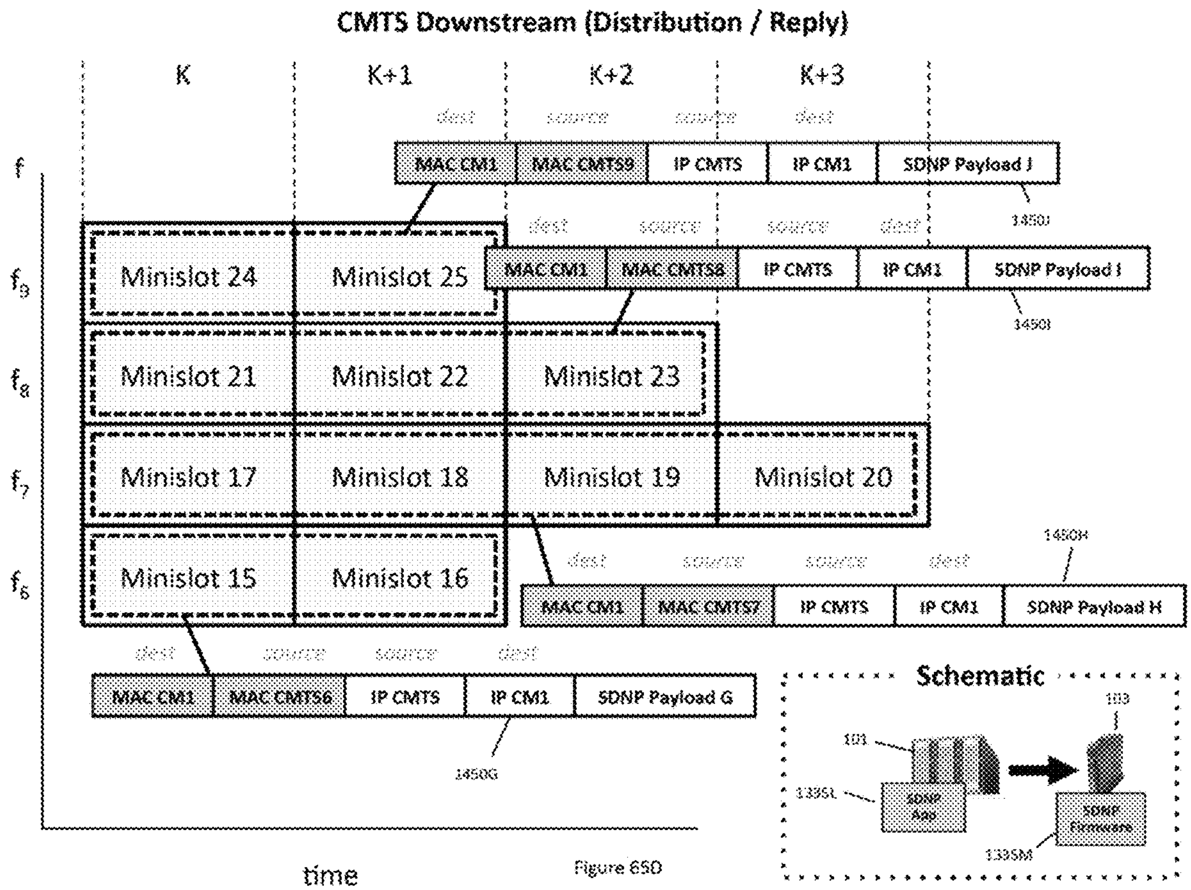
FIG. 65D is a graphical representation of DOCSIS3.1 downstream communication.

FIG. 65D illustrates downstream data flow from CMTS 101 to CM 103 illustrating the use of bonding to achieve high data rates in multi-PHY downstream communication. As shown, all data packets specify a source IP address of "IP CMTS", a destination IP address of "IP CM1" and a MAC destination address of "MAC CM1". Multi-PHY communication is controlled by specification of the MAC source address of CMTS 101. As shown, data packet 1450G containing SDNP payload G specifies MAC source address "MAC CMTS6" corresponding to communication at frequency $f_6$ carrying data in minislots 15 and 16. Data packet 1450H contains SDNP payload H and specifies MAC source address "MAC CMTS7" corresponding to communication at frequency $f_7$ carrying data in minislots 17 through 20. Data packet 1450I containing SDNP payload I specifies MAC source address "MAC CMTS8" corresponding to communication at frequency $f_8$ carrying data in minislots 21, 22, and 23. Finally, data packet 1450I containing SDNP payload J specifies MAC source address "MAC CMTS9" corresponding to communication at frequency $f_9$ carrying data in minislot numbers 24 and 25. In this manner related and unrelated data packets can be concurrently sent from CMTS 101 to CM 103 using multi-PHY methods without channel contention or data collisions with concurrent upstream data.

HyperSecure Call Routing—

HyperSecure call routing made in accordance with the disclosed secure dynamic communication network and protocol may be performed using one of three methods for command and control

- Tri-channel communication, where routing of a call or communiqué is controlled using three sets of servers, namely the SDNP media servers for carrying audio, video, or data files; the SDNP signaling servers for selecting the routing of a call, and a SDNP name server for storing the dynamic mapping of phone numbers to their corresponding SDNP addresses,
- Dual-channel communication, where routing control of a call or communiqué uses two sets of servers, namely the SDNP media servers for carrying audio, video, or data files; and the SDNP signaling servers for routing the call, and for performing the function of a SDNP name server mapping of phone numbers to their corresponding SDNP addresses,
- Single-channel communication, where the data transport, the route planning, and the SDNP address map are all executed by a single set of servers.

In general, tri-channel communications offers greater immunity to cyber-assaults because no one set of servers contains all the information about a call. In every case however, the SDNP network utilizes distributed processing to limit the information contained within any given server. Furthermore, during data transport in single-, dual- or tri-channel communication, the SDNP media servers connect to a fourth type of server—DMZ servers. DMZ servers are used for housing SDNP shared secrets needed for processing the SDNP data payloads, including scrambling, splitting, mixing, junk data insertions and removals, and encryption. In operation, incoming data packets received by a media server are delivered to the DMZ server where the data packets are modified and passed back to the media server. The media server is unaware how the data packets have been modified or what logic or algorithm was used to process the data. The executable code and tables stored in a DMZ server are encrypted to prevent analysis of the code. Furthermore, DMZ servers operate offline with no connection to the network or Internet.

The following graphics illustrate one exemplary implementation of tri-channel SDNP communications and the sequence used to initiate a call or send a file over the network. Operation of dual-channel communication can be considered as a minor modification to tri-channel communication where the SDNP name server functions are merged into the signaling servers. Single-channel communication comprises the integration of all three operations into a network of multifunction servers operating as SDNP communication nodes.

Although fragmented data transport within the SDNP cloud is generally performed using dynamic meshed routing, Last Mile communications offers fewer routing options, specifically where successive data packets may be either (i) routed to a single SDNP gateway, i.e. as single-route Last Mile communication, or alternatively (ii) routed to multiple SDNP gateways, i.e. as multi-route Last Mile communication. Other Last Mile routing choices include dynamic source addressing and multi-PHY Last Link connectivity. These delivery options are specified within the IP data packets generated in the signaling servers. Despite the fact that these SDNP data packets specify their source and destination IP and MAC addresses, the precise path that a particular data packet takes in the Last Mile is not known. Instead the intermediate path is determined by operation of the routers, devices owned by local network operators, mobile network operators, and network service providers serving the Last Mile, and not by the SDNP signaling servers. Last Mile communication is therefore analogous to a jump rope where the two ends are fixed but where a myriad of uniquely shaped paths connect them.

Reiterated for clarity's sake, the term single-route, multi-route, and meshed-route communication refers to the path of media packets, i.e. the path "content" traverses between callers, while the terms tri-channel, dual-channel, and single-channel communication refers to the command and control system used to govern transport over the network of SDNP nodes. Given the foregoing, the following set of illustrations depict the sequence of steps, i.e. the "process", used in making a call or initiating a communiqué in accordance with the disclosed secure dynamic communication network and protocol.

Figure 66:
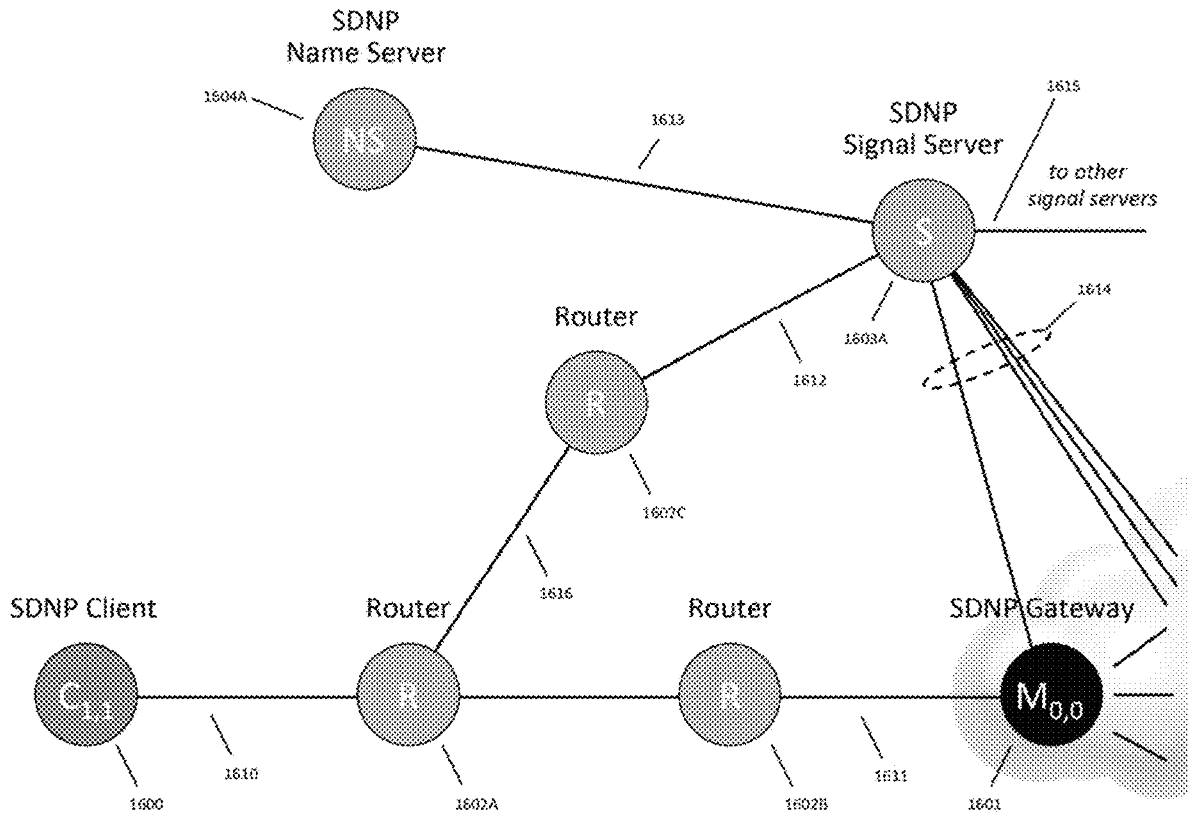
FIG. 66 is a schematic representation of a tri-route SDNP network for Last Mile communication.

FIG. 66 illustrates an abstract representation of a single-route Last Mile network for tri-channel communication comprising a SDNP client 1600, IP routers 1602A, 1602B, and 1602C, signaling server 1603A, SDNP name server 1604A and SDNP gateway 1601. These computer servers host SDNP communication nodes used for facilitating network communication with network node names and IP addresses as shown comprising SDNP client $C_{1,1}$, routers R, SDNP signaling server node S, SDNP name server node NS, and SDNP gateway node $M_{0,0}$. Network connection 1610 facilitates a Last Link between client $C_{1,1}$ and its nearest router 1602A; network connection 1611 facilitates a gateway link between SDNP gateway $M_{0,0}$ and its nearest router 1602B; network connection 1612 facilitates a gateway link between SDNP signaling server 1603A and its nearest router 1602C; and network connection 1616 interconnects to topologically adjacent routers 1602A and 1602C. Since the IP addresses of the routers are not used in IP datagrams either as a source or destination address, the nominative "R" is shared by all routers on Layer 3. In the case of Layer 1 and Layer 2 descriptions, each router has a unique identity, but this aspect is not germane to describing IP network Layer 3 call routing. SDNP signaling server 1603A (node S) connects to SDNP name server 1604A (node NS) over network connection 1613 and to SDNP cloud nodes $M_{0,0}$ over a number of network connections 1614. Signaling server 1603A also connects to other signaling servers (not shown) over network connection 1615.

Using the SDNP network, placing a call, i.e. establishing a "session", involves the following sequence of steps initiated from the SDNP client making the call, i.e. the "caller"

1. SDNP call (or call out) request
2. SDNP address request
3. SDNP address delivery
4. SDNP routing instructions
5. Commence SDNP call (or call out)

Figure 67:
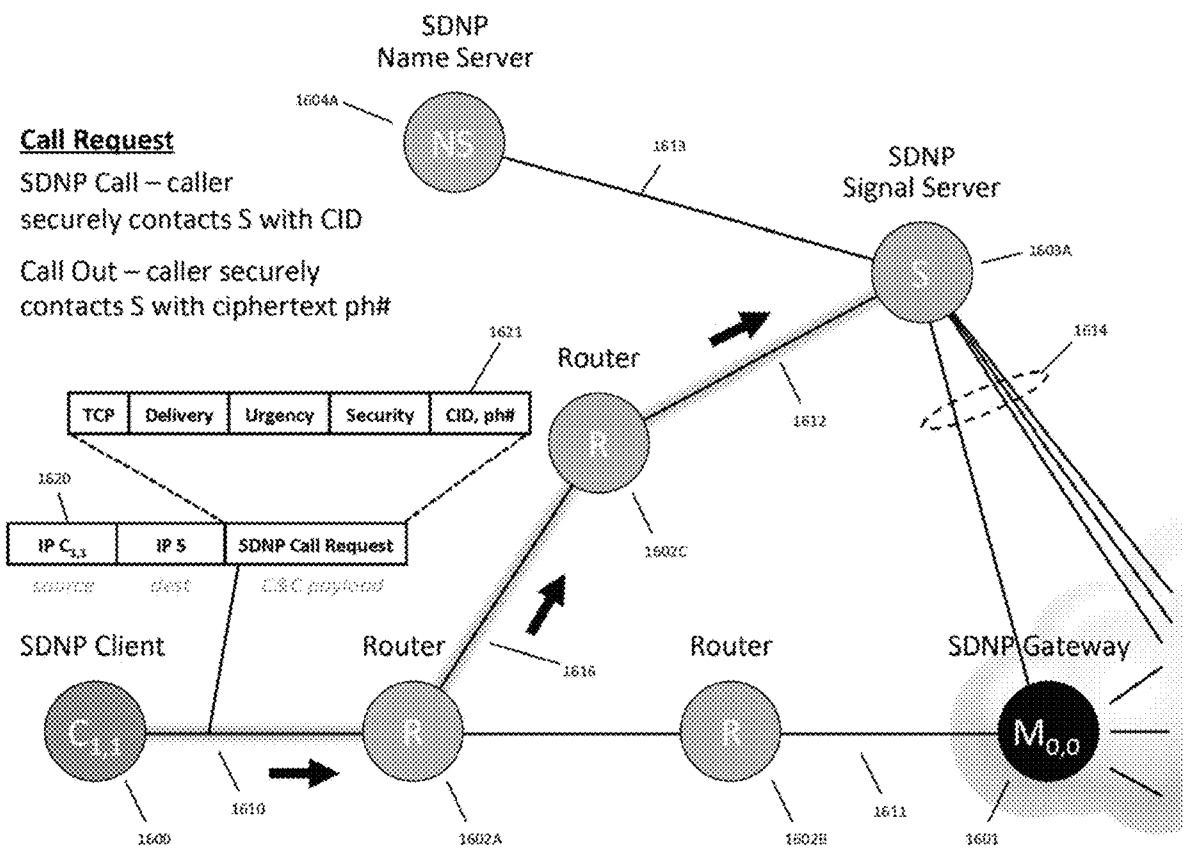
FIG. 67 is a schematic representation of a "call request" operation in tri-channel SDNP Last Mile communication.

The first step, the "call request" is illustrated graphically in FIG. 67 where the caller, client 1600 with address "IP $C_{1,1}$," contacts signaling server 1603A at address "IP S" over the paths 1610, 1616, and 1612 with IP datagram 1620. The datagram's command and control payload 621 contains Layer 4 data transport using TCP to insure data accuracy, and specifies a number of requested call parameters including delivery, urgency, security credentials, and the contact information of the "callee", the party being called. In the case of a call to another SDNP client, i.e. a "SDNP call", this contact information comprises a confidential identification (CID) of the client being called, data present in the client's SDNP phone directory. In the case of a "call out", a call to a party who is not an SDNP client, the contact information comprises a phone number. While the CID of a SDNP client is intrinsically anonymous and known only to the SDNP name server, the phone number is not disguised. To protect the privacy of the party being called, the phone number in the C&C payload is encrypted. Alternatively the entire C&C payload 1621 can be encrypted. While C&C payload 1621 can be in the form of ciphertext, the IP addresses of IP datagram 1620 cannot be encrypted, otherwise routers 1602A and 1602C cannot route the datagram.

Figure 68:
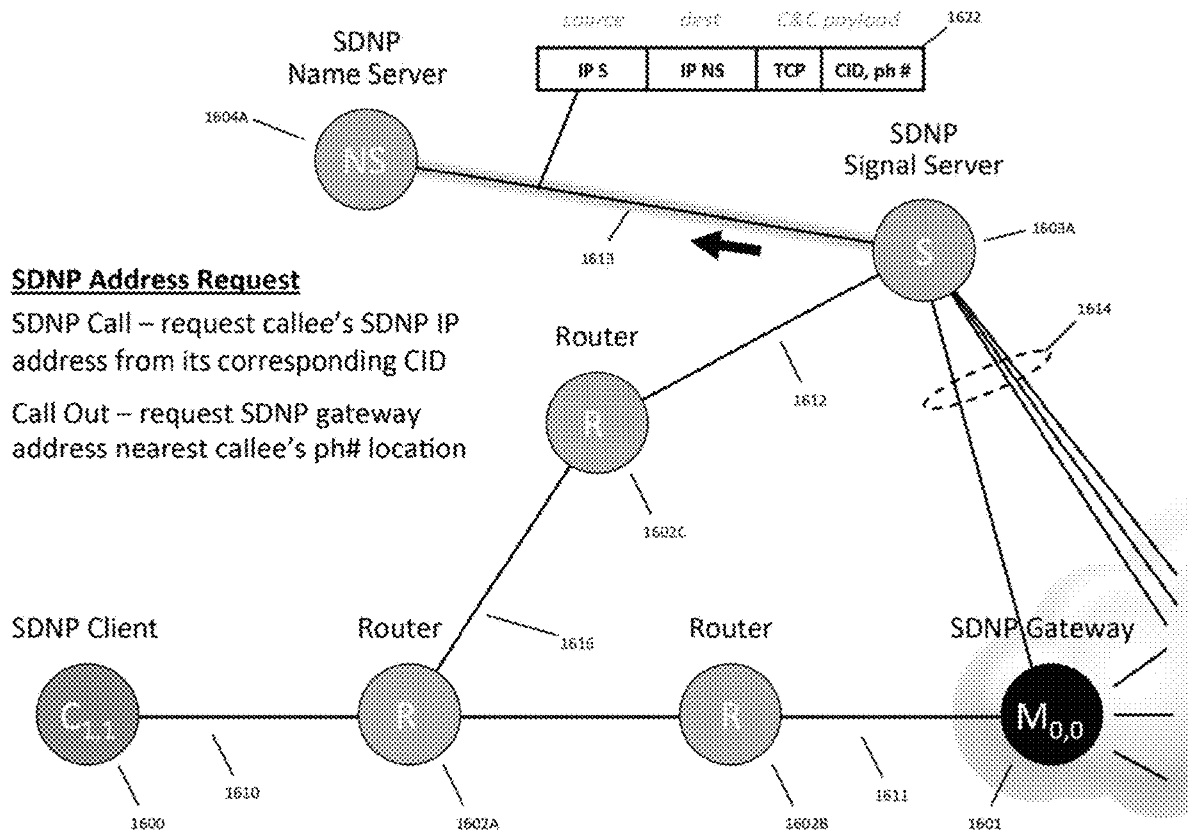
FIG. 68 is a schematic representation of an "address request" operation in tri-channel SDNP Last Mile communication.
Figure 69:
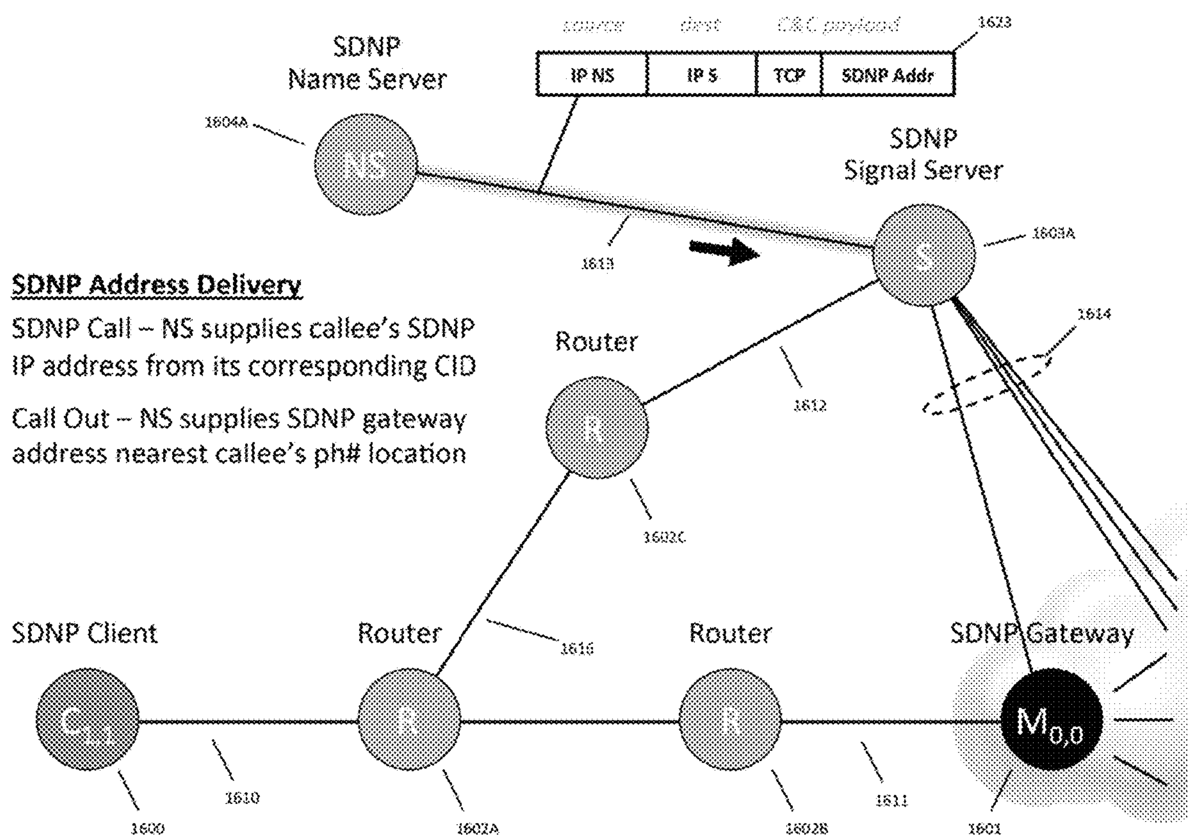
FIG. 69 is a schematic representation of an "address delivery" operation in tri-channel SDNP Last Mile communication.

The second step, the "SDNP address request" is illustrated in FIG. 68 where the SDNP signaling server with address "IP S" contacts SDNP name server at address "IP NS" over the path 1613 with IP datagram 1622. The datagram's command and control payload defines Layer 4 data transport as TCP and contains either the CID or encrypted phone number of the party being called. In the case of a SDNP call, name server 1604A converts the CID into a SDNP address of the client being called. In the case of a call out, name server 1604A decrypts and converts the phone number of the party being called into the SDNP address of the SDNP gateway closest to the location of the callee. As shown in FIG. 69, name server 1604A then passes the SDNP address of the client or gateway in IP datagram 1623 from source address "IP NS" to signaling server 1603A at address "IP S".

Figure 70:
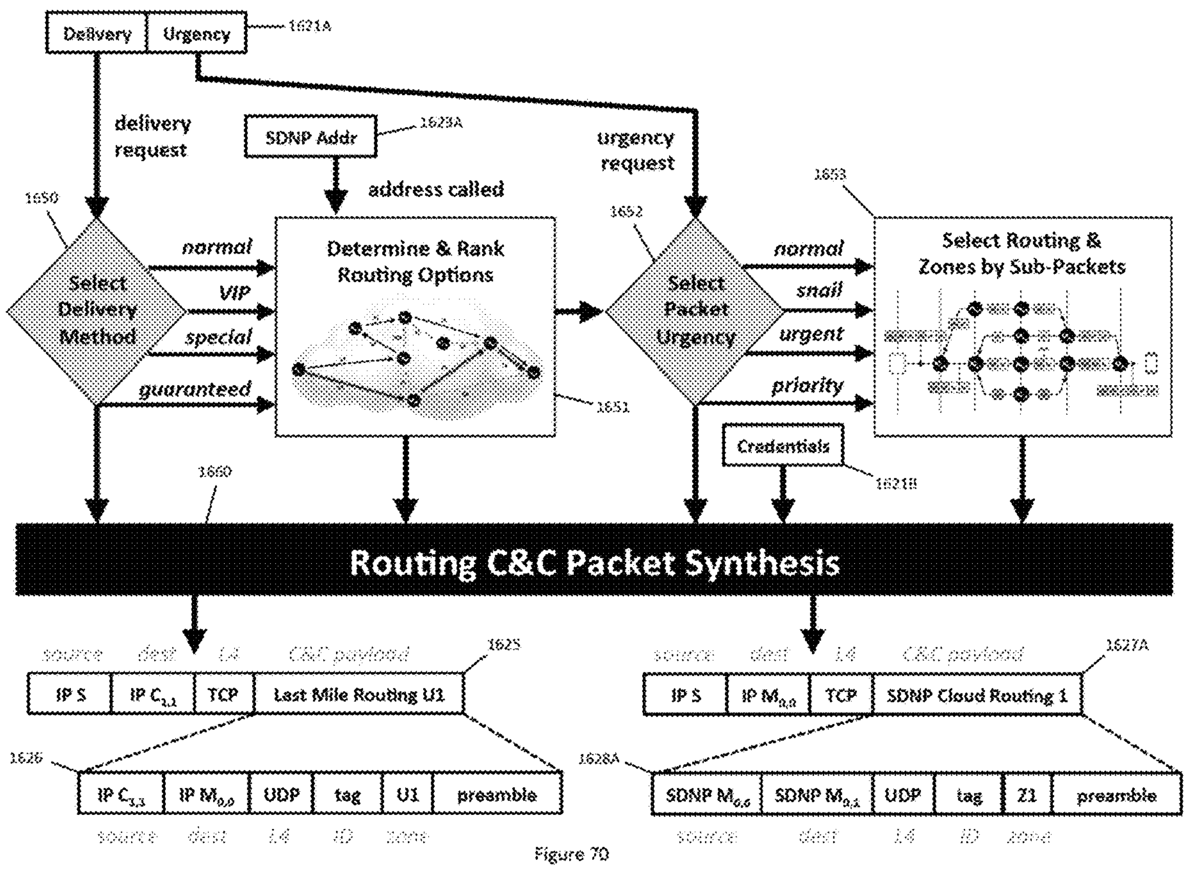
FIG. 70 is a flow chart illustrating SDNP command and control packet synthesis.

Signaling server 1603A then utilizes the SDNP addresses of the caller and the callee to route a call between them, either as a HyperSecure connection if the callee is an SDNP client, or to the nearest SDNP gateway if the callee is not an SDNP client. The process used to prepare routing instructions and distribute them to every media node required to complete the caller's connection is shown in FIG. 70. As shown, the caller's delivery request contained in the delivery and urgency fields of the C&C payload 1621A, once validated against account information, is used to select the delivery method of the datagram, as shown by operation 1650. Delivery methods comprising either normal, VIP, guaranteed, or special delivery, affect the routing of packets or sub-packets (if the packets are split or fragmented). In VIP delivery, for example, the fastest routes are used for data transport, while loading of the same routes by other clients is minimized. In guaranteed delivery, duplicate data packet fragments are sent across the network, i.e. using redundancy, to insure timely delivery of the fastest packets and ignoring late arrivals. Combined with the SDNP address data from C&C payload 1623A, operation 1651 then maps the optimal routes from the caller to the SDNP address of the callee or to the closest gateway if the callee is not an SDNP client. Urgency request data contained within C&C payload 1621A is used to select package urgency operation 1652, including in order of decreasing propagation delays—snail delivery (no need to hurry), normal delivery, priority delivery, and urgent delivery.

Figure 71:
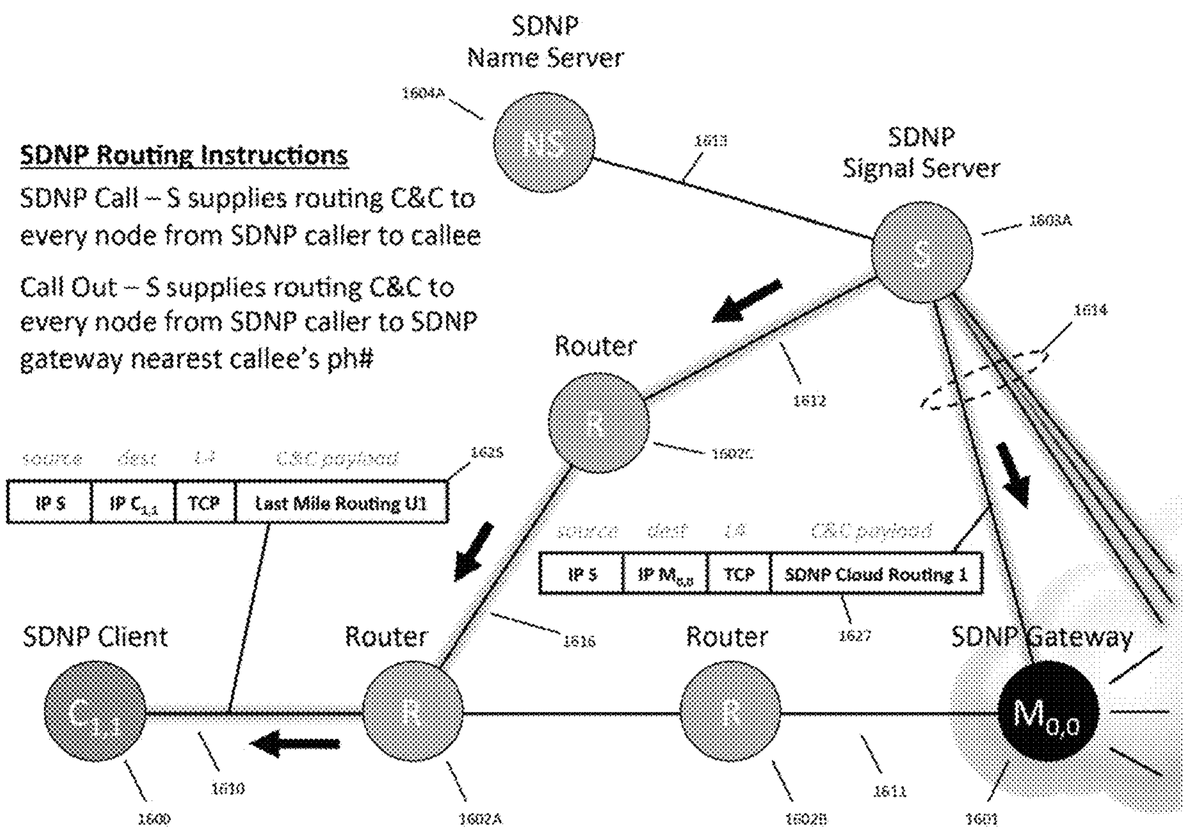
FIG. 71 is a schematic representation of a "routing instructions" operation in single-route tri-channel SDNP Last Mile communication.

The urgency request information is then used to select routing and zones for sub-packet routing by operation 1653. These parameters, along with any applicable security credentials 1621B, are combined to synthesize the routing command and control packets through operation 1660. These C&C data packets are delivered to the Last Mile's participating communication nodes using TCP specified Layer 4 transport, but contain routing information that when used in delivering real time data employ UDP as its Layer 4 transport protocol. For example, Last Mile routing made in accordance with zone U1 security credentials is generated as IP datagram 1625 containing C&C payload 1626 used for routing data from client node $C_{1,1}$ to SDNP gateway node $M_{0,0}$. IP datagram 1625 is delivered to the SDNP client using TCP data transport, but the C&C payload 1626 entitled "Last Mile routing U1" contains data used by to route packets in real time, necessitating the use of UDP as its Layer 4 transport mechanism. SDNP C&C packet synthesis operation 1660 also generates numerous other C&C messages delivered as TCP data packets to nodes within the SDNP cloud. One example of a cloud instruction data packet is IP datagram 1627A containing C&C payload 1628A used for routing data from SDNP $M_{0,0}$ to SDNP $M_{0,1}$. As shown in FIG. 71, these SDNP routing instruction packets are distributed to the media nodes including client node $C_{1,1}$, over the serial connections 1612, 1616, and 1610 and to SDNP gateway node $M_{0,0}$ and to other nodes within the SDNP cloud over connections 1614.

Figure 72:
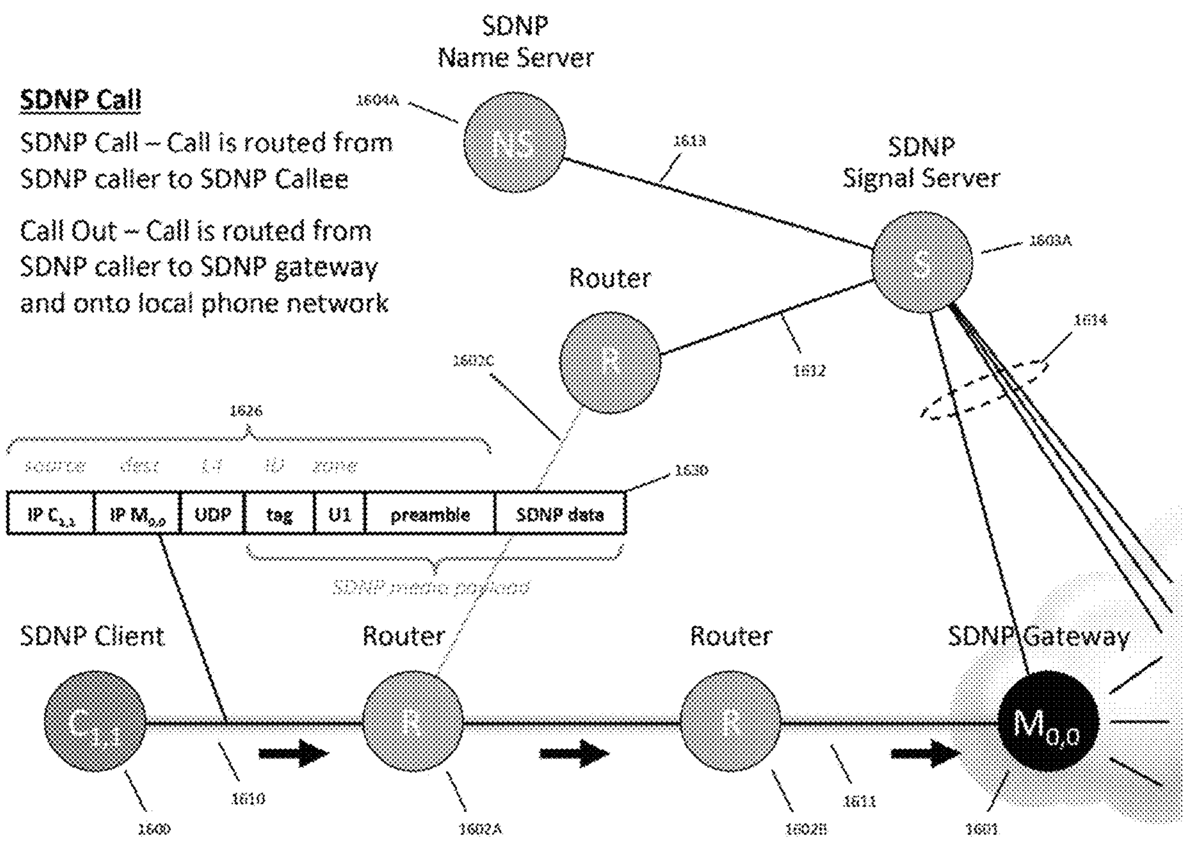
FIG. 72 is a schematic representation of a "SDNP call" operation in single-route tri-channel SDNP Last Mile communication from a SDNP client to the SDNP cloud.

Commencement of the call is shown in FIG. 72, where media SDNP datagram 1630 containing SDNP data, e.g. sound, video, text, etc. is appended onto an IP header comprising C&C data packet 1626, and routed from IP $C_{1,1}$ to IP $M_{0,0}$ from SDNP client 1600 across Last Link network connection 1601 to routers 1602A and 1602B and finally to SDNP gateway 1601 across gateway link 1611. Together the identifying tag, security zone, preamble, and SDNP data fields constitute the payload of a SDNP media packet contained within media SDNP datagram 1630.

Figure 73A:
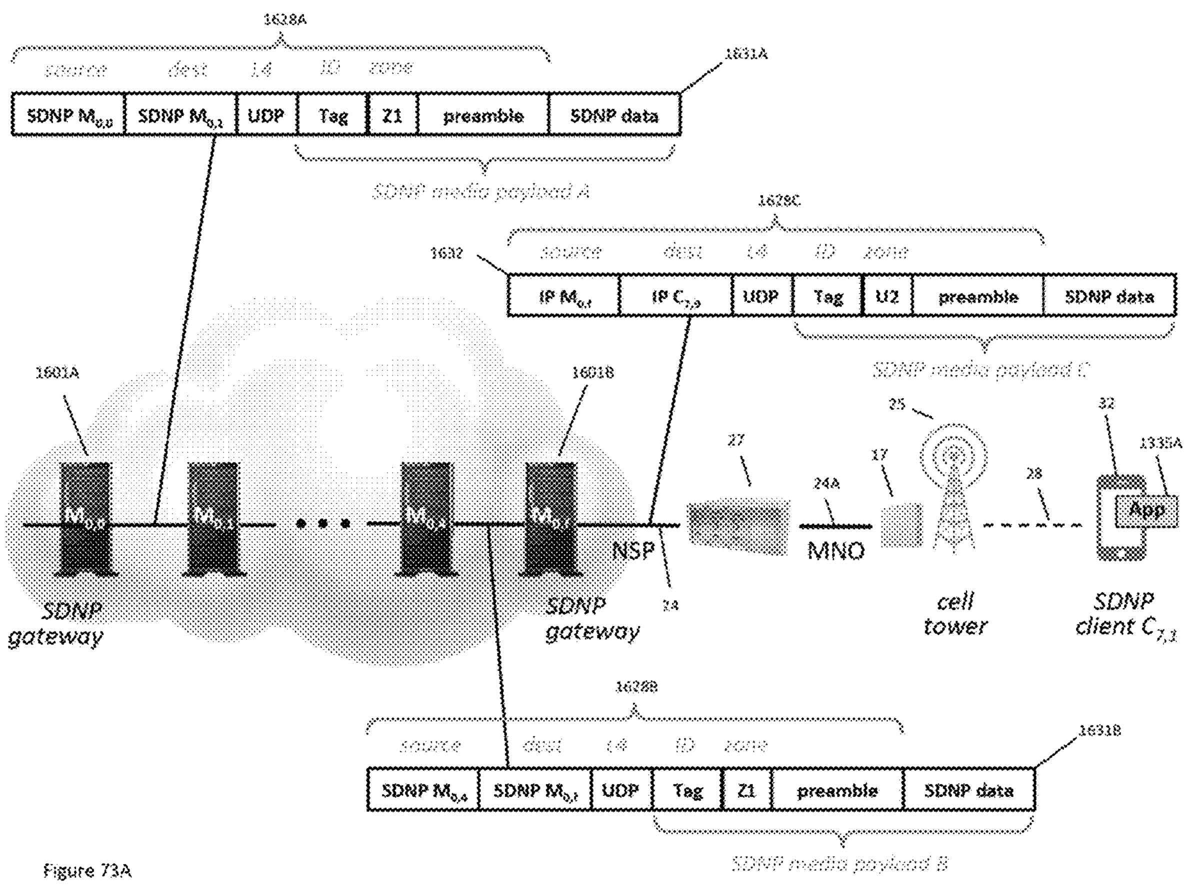
FIG. 73A is a schematic representation of SDNP cloud and Last Mile tri-route communication to an SDNP client in a SDNP call.

Routing of the aforementioned SDNP call, i.e. a HyperSecure call from SDNP gateway $M_{0,0}$ to a SDNP client $C_{7,1}$ comprising cell phone 32 running SDNP app 1335A is shown in the simplified network diagram of FIG. 73A. SDNP datagram 1631A containing media SDNP payload A and header 1628A is routed between media nodes with SDNP addresses $M_{0,0}$ and $M_{0,1}$. Note that SDNP gateway 1601A has two addresses—IP address "IP $M_{0,0}$" for Last Mile communication, and SDNP address "SDNP $M_{0,0}$" for communication within the SDNP cloud. The content of each SDNP datagram changes as the packet traverses the SDNP cloud so that the content—sound, video and text contained within SDNP media payload A, B, and C are distinctly different and may include content from twenty different conversations or communiqués. The mechanisms of data routing and packet security within the SDNP cloud are disclosed in the above-referenced U.S. application Ser. No. 14/803,869, titled "Secure Dynamic Communication Network and Protocol" which describes how the content and encryption of the data packets moving anonymously through the SDNP cloud change dynamically and continuously, only converging in the client's device.

Accordingly, SDNP datagram 1631B containing media SDNP payload B and header 1628B is routed between media nodes with IP addresses IP $M_{0,4}$ and $M_{0,f}$. Data exiting the SDNP cloud through SDNP gateway 1601B is converted from a SDNP datagram into IP datagram 1632. The IP datagram 1632 with header 1628C and SDNP media payload C utilizes security credentials for zone U2, which is the zone comprising the Last Mile. IP datagram 1632 is then routed over the Last Mile over wired or fiber link 24 to network router 27, and thereafter routed over cellular network 25 and cellular link 28 to cell phone 32. Because cell phone 32 is a SDNP client, communications over the Last Mile remain HyperSecure. In this simplified example, all data packets exiting the cloud onto the Last Mile are routed from a single SDNP gateway 1601B. In reality, more than one SDNP gateway may be employed in Last Mile data routing.

Figure 73B:
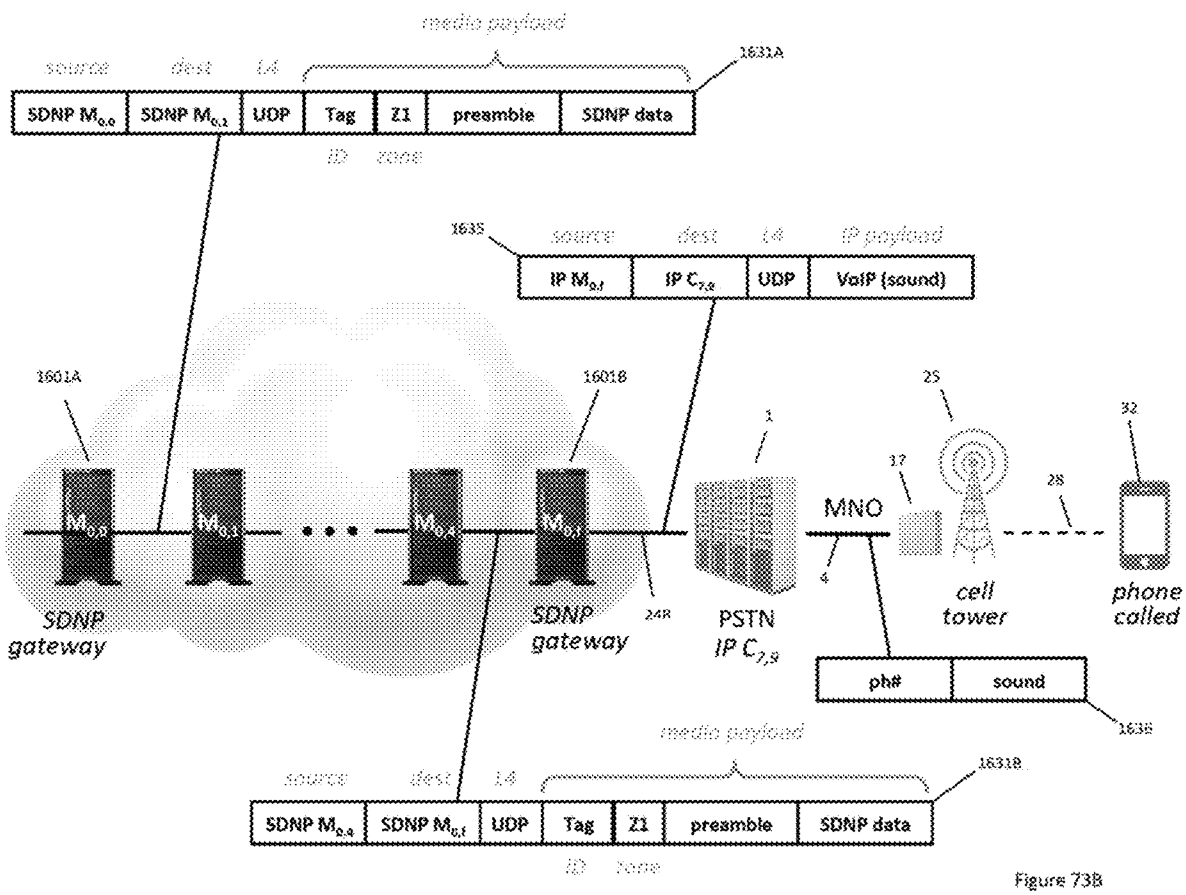
FIG. 73B is a schematic representation of SDNP cloud and Last Mile tri-route communication implemented as a "call out" to a non-SDNP client.

Last Mile communication for a "call out" is shown in FIG. 73B. Although routing through the SDNP cloud employs the same SDNP datagrams 1631A and 1631B as used in a call to an SDNP client, SDNP gateway 1601B is the last server running SDNP software. Last Mile communication in a call out therefore uses IP datagrams with non-SDNP payloads, i.e. IP datagram 1635 is routed from gateway IP $M_{0,0}$ to PSTN at IP address IP $C_{7,9}$ carrying sound in the form of VoIP. PSTN then converts the VoIP call format into a conventional phone call using a phone # and analog sound in sound packet 1636. In such cases, the Last Mile does not constitute HyperSecure communication.

Figure 74:
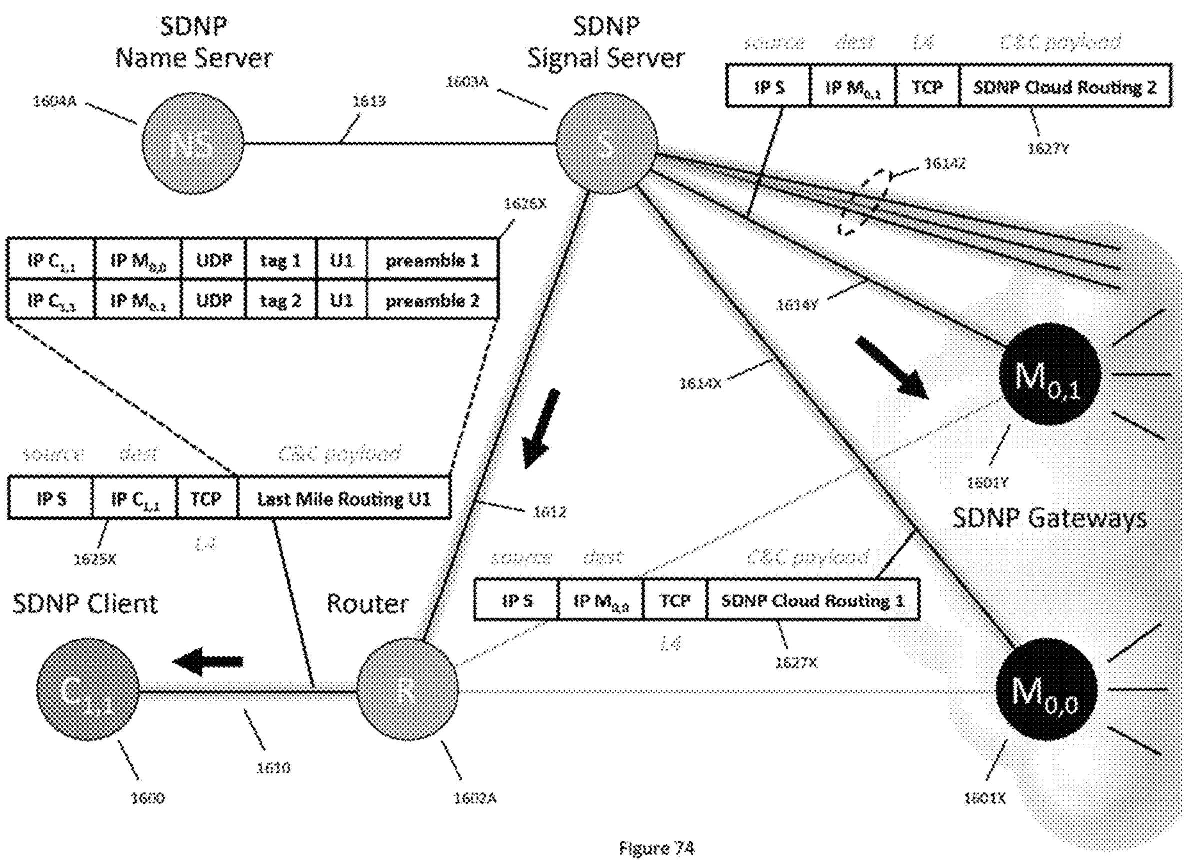
FIG. 74 is a schematic representation of a "routing instructions" operation in multi-route tri-channel SDNP Last Mile communication.

In multiroute Last Mile communication, shown in FIG. 74, command and control data packets distributed by SDNP signaling server 1603A include C&C data packet 1625X sent to client 1600 over data links 1612 and 1610, C&C data packet 1627X sent to SDNP gateway 1601X over data link 1614X, and C&C data packet 1627Y sent to SDNP gateway 1601Y over data link 1614Y. Other C&C data packets (not shown) are sent over data links 1614X to other servers hosting media nodes. C&C data packet 1625X sent from an address "IP S" to address "IP $C_{1,1}$" containing a C&C payload comprising Last Mile routing U1. Last Mile routing U1 includes two different routing instructions—one from "IP $C_{1,1}$" to "IP $M_{0,0}$" with tag 1 and preamble 1, and another from "IP $C_{1,1}$" to "IP $M_{0,1}$" with tag 2 and preamble 2. Shown by example, C&C data packets sent to communication nodes within the SDNP cloud, include those sent from "IP S" to "IP $M_{0,0}$" containing instructions SDNP Cloud Routing 1, and those sent to "IP $M_{0,1}$" containing SDNP Cloud Routing 2.

SDNP Group Calls—

Figure 75A:
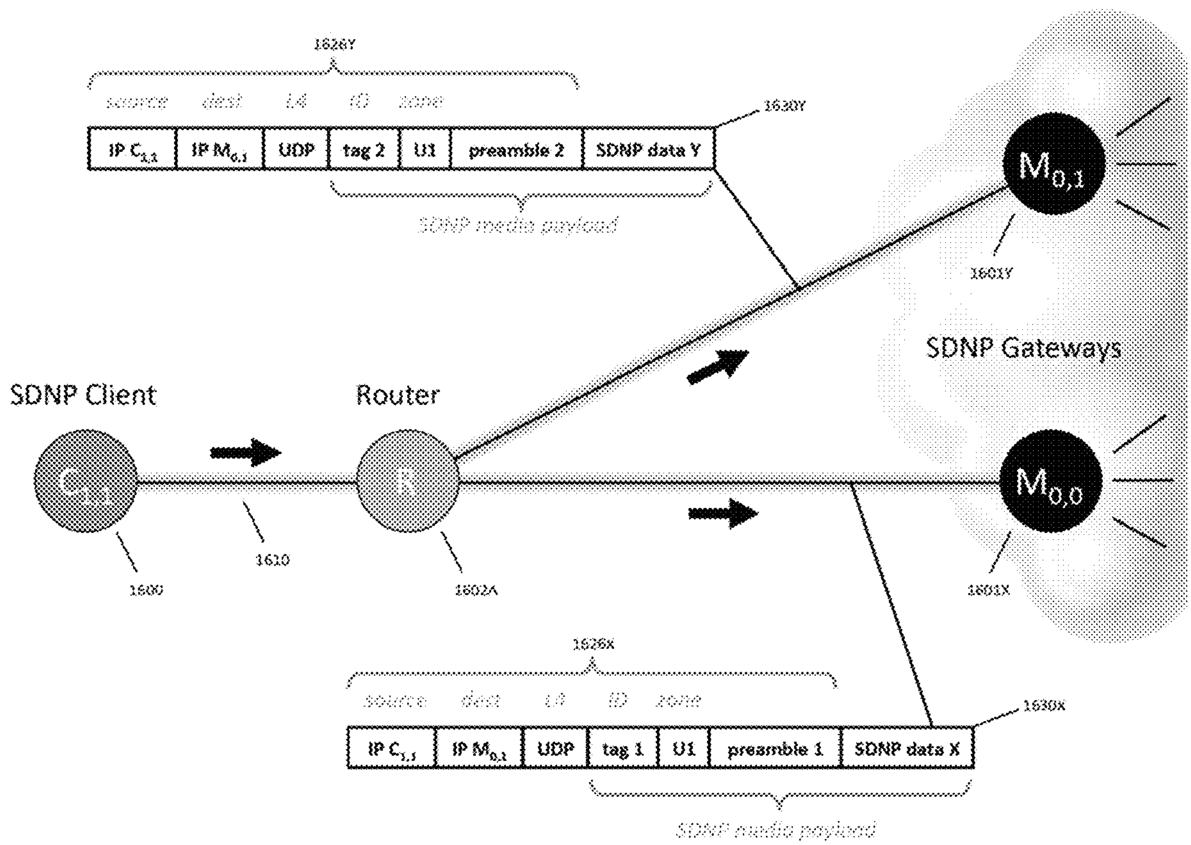
FIG. 75A is a schematic representation of a "SDNP call" operation in multi-route tri-channel SDNP Last Mile communication in the direction of from a SDNP client to the SDNP cloud.

Last Mile media packet routing from SDNP client 1600 to multiple SDNP gateways, shown in FIG. 75A, includes two data packets 1630X and 1630Y comprising respective headers 1626X and 1626Y and SDNP media payloads SDNP data X and SDNP data Y. Data header 1626X with tag 1 and preamble 1 is routed from address "IP $C_{1,1}$" to address "IP $M_{0,0}$" while data header 1626Y with tag 2 and preamble 2 is routed from address "IP $C_{1,1}$" to address "IP $M_{0,1}$".

Figure 75B:
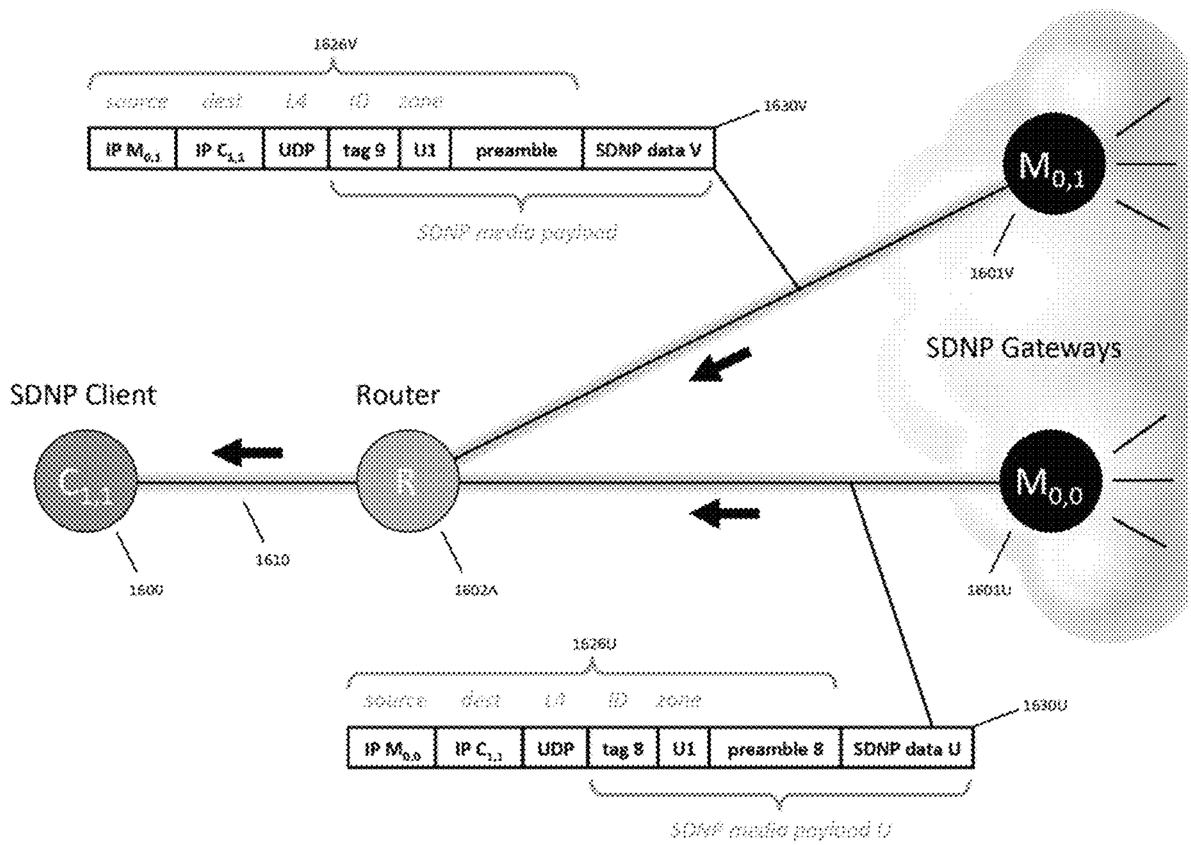
FIG. 75B is a schematic representation of a "SDNP call" operation in multi-route tri-channel SDNP Last Mile communication in the direction from the SDNP cloud to the SDNP client.

Data flowing in the reverse direction from the SDNP cloud to the client using multi-route communication, as illustrated in FIG. 75B, includes data packet 1630U containing header 1626U, tag 8, preamble 8, SDNP data U, source address SDNP gateway address $M_{0,0}$ and destination address "IP $C_{0,0}$". Concurrently, the data also includes data packet 1630V containing header 1626V, tag 9, preamble 9, SDNP data V, source address SDNP gateway address $M_{0,1}$, and destination address "IP $C_{0,0}$". The SDNP application program running in SDNP client 1600 then combines the incoming data packets SDNP data U, SDNP data V, and others to recreate the message text or voice (sound).

Figure 76:
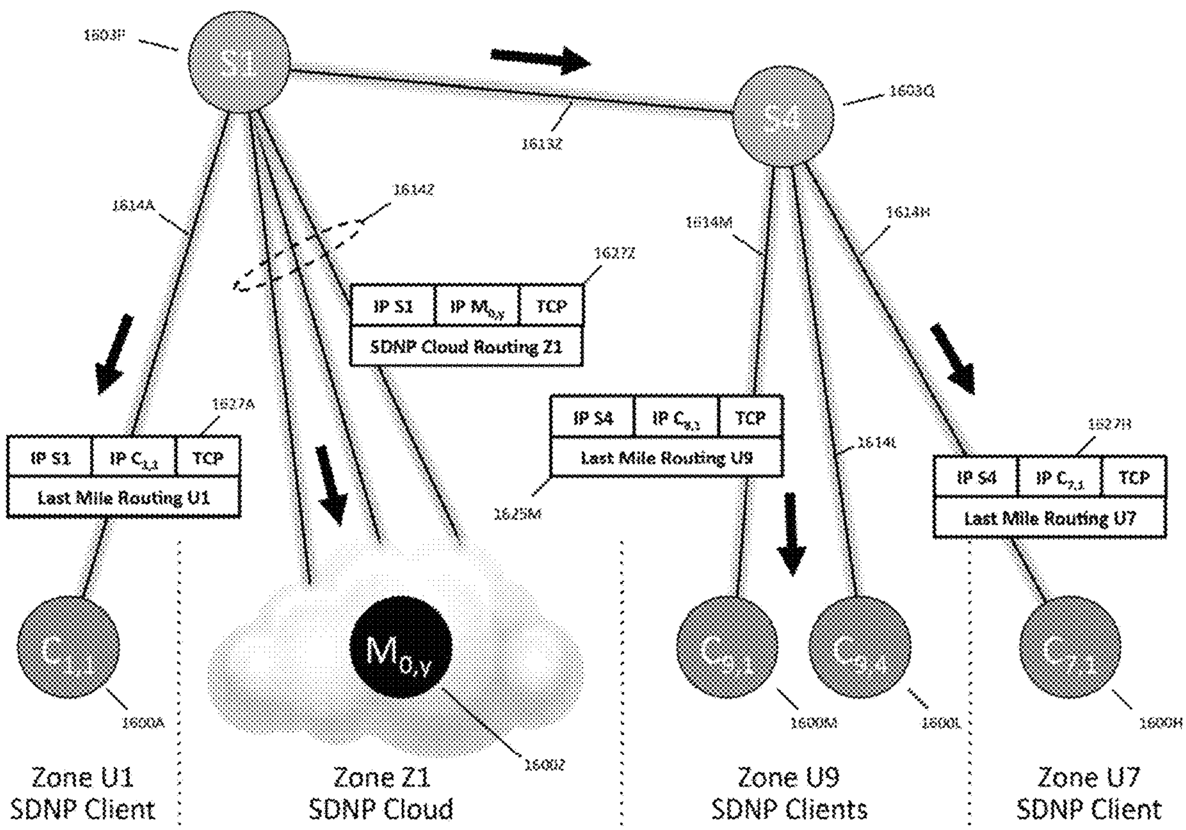
FIG. 76 is a schematic representation of group-call "routing instructions" operation in single-route tri-channel SDNP Last Mile communication.

The C&C data packet delivery of routing instructions can be extended to initiate three-way or group calls, group messaging, and other multi-client communications. In such group communiqués or "conference calls", a client message is sent to multiple recipients concurrently. This group function is invoked by the caller whose request for a group call first defines the group of clients to be contacted, then by the signaling server that instructs the required media nodes how to handle routing of data packets associated with the specific group call. An example of group call routing instructions is shown in FIG. 76 where signaling server 1603P communicates routing instructions over data link 1614A to SDNP client 1600A and over data links 1614Z to numerous media servers 1600Z within the SDNP cloud.

As such, TCP data packet 1627A containing Last Mile routing U1 is delivered from signaling server 1603P at address "IP S1" to SDNP client at address "IP $C_{1,1}$" to "set up" the group call with the caller. C&C data packets represented by exemplary TCP data packet 1627Z are concurrently distributed throughout the SDNP cloud for zone Z1 over data links 1614Z from signaling server address "IP S1" to various destination addresses "IP $M_{0,y}$" where y represents a integer variable. Collectively, the SDNP cloud routing instructions establish packet routing from the caller's gateway throughout the SDNP cloud to two or more other SDNP gateways located nearest the SDNP clients being called.

As shown by example, the other SDNP clients may be located in different geographic regions and may be within separate security zones, for example zones U7 and U9. In some cases, these clients may be sufficiently far from signaling server 1603P that another signaling server 1603Q may be used to plan packet routing for these SDNP clients. Signaling server 1603Q communicates routing instructions in zone U9 to SDNP client 1600M over data link 1614M and to SDNP client 1600L over data link 1614L. C&C data packet 1625M, for example, communicates Last Mile routing instructions U9 from signaling server at "IP S4" to SDNP client 1600M at its address "IP $C_{9,1}$". Another C&C data packet (not shown) is similarly sent to the SDNP client at address "IP $C_{9,4}$". Data packet 1627H, containing instructions for Last Mile Routing U7, is sent over data link 1614H from signaling server 1603Q at "IP S4" to client 1600H at address "IP $C_{7,1}$".

Figure 77A:
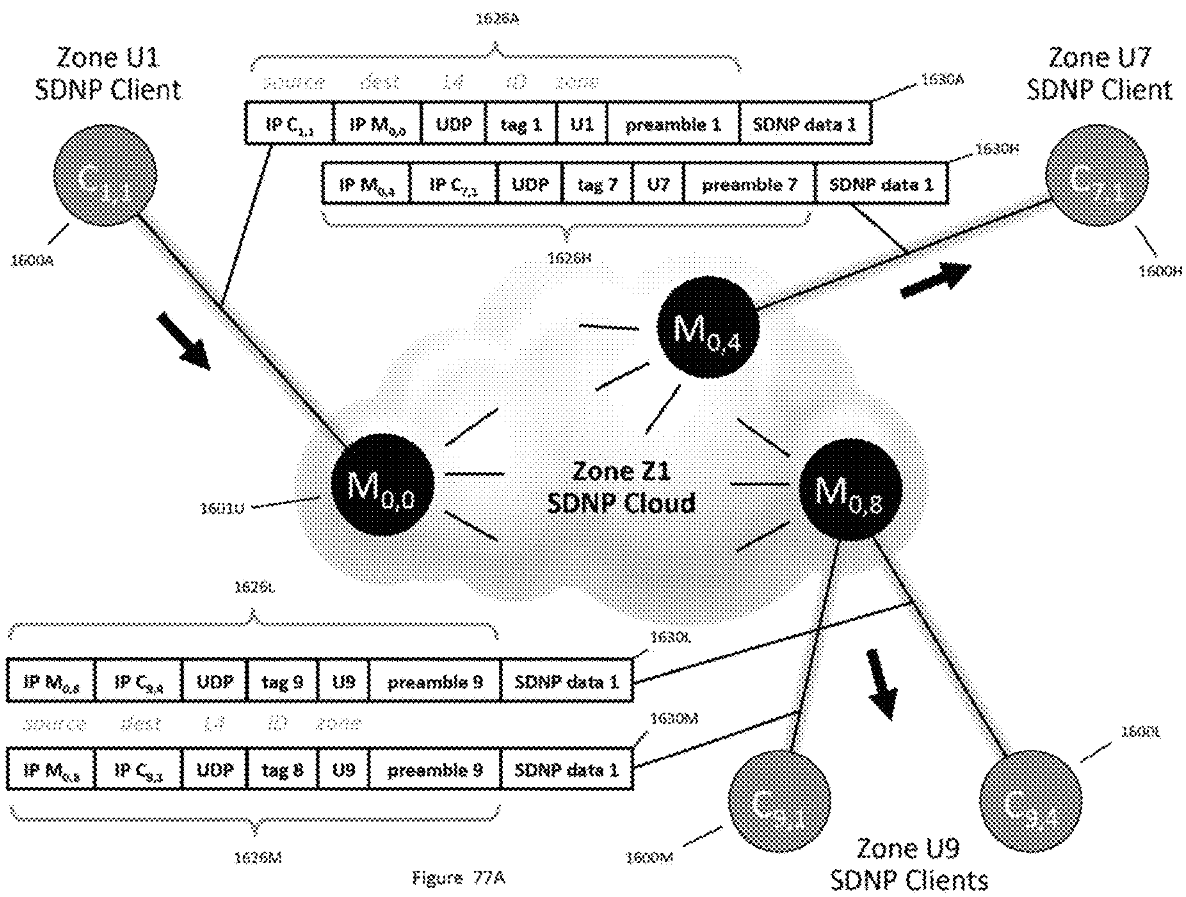
FIG. 77A is a schematic representation of a "SDNP group call" using SDNP multi-route cloud transport and SDNP Last Mile communication in the direction from a zone U1 client to clients in other zones.

Signaling servers 1603P and 1603Q at nodes S1 and S4 also exchange information as C&C data packets over data link 1613Z. This information is used to establish which portions of the routing is to be performed by signaling server 1603P and which portions will be performed by signaling server 1603Q, essentially dividing the routing task across multiple signaling servers. In the example shown, signaling server node S1 manages the Last Mile routing for zone U1 and for the SDNP cloud while signaling server node S4 manages Last Mile communication in zones U7 and U9. Data routing during a call or communiqué is shown in FIG. 77A where voice carried by SDNP data 1 in data packet 1630A is routed by header 1626A from the caller with IP address "IP $C_{1,1}$" to the nearest SDNP gateway media node $M_{0,0}$. The data packet is re-packeted for SDNP cloud transport and sent to gateway media nodes $M_{0,4}$ and $M_{0,8}$. The path packet routing takes within the SDNP cloud is unknown to any of the conference call participants, lacking any central control and varying dynamically with network conditions. In this example, all SDNP data packets within the SDNP cloud utilize fragmented meshed data transport with anonymous addressing and dynamic encryption, as well as using dynamic scrambling, mixing, splitting, with junk data insertions and deletions. In the example shown, the cloud transport directs incoming communication at SDNP gateway node $M_{0,0}$ to other gateways, in this case SDNP gateway nodes $M_{0,4}$, and $M_{0,8}$.

Data packet 1630H carrying the caller's voice, i.e. SDNP data 1, exits gateway node $M_{0,4}$ and is routed using header 1626H from media node at "IP $M_{0,4}$" to client 1600H at "IP $C_{7,1}$" using zone U7 security credentials. Header 1626H was supplied to the client 1600A within C&C data packet 1627A prior to preparing the media data packet, as described in FIG. 76. In this manner, every media packet carrying real time data can be prepared without delay when the content is ready for data transport. In real time networks, high QoS depends on timely routing of dynamic data. Otherwise unacceptably long propagation delays may result.

Once routed through the SDNP cloud, SDNP data 1 payload is delivered to zone U9 conference call participants, namely SDNP-clients 1600M and 1600L, from gateway media node $M_{0,8}$ to client IP addresses "IP $C_{9,1}$" and "IP $C_{9,4}$". These Last Mile data packets 1630M and 1630L contain headers 1626M and 1626L specifying the identifying packet tags tag 8 and tag 9 used to recognize content associated with the same conversation, preamble 9 information used for carrying SDNP embedded instructions, keys, seeds, etc. and a "L4" data field used for stipulating Layer 4 transport as UDP. Although data routing instructions delivered by the signaling server utilize a TCP transport protocol to insure accuracy, media packet content represents real-time data, and therefore beneficially utilizes UDP Layer 4 protocols instead of TCP.

Figure 77B:
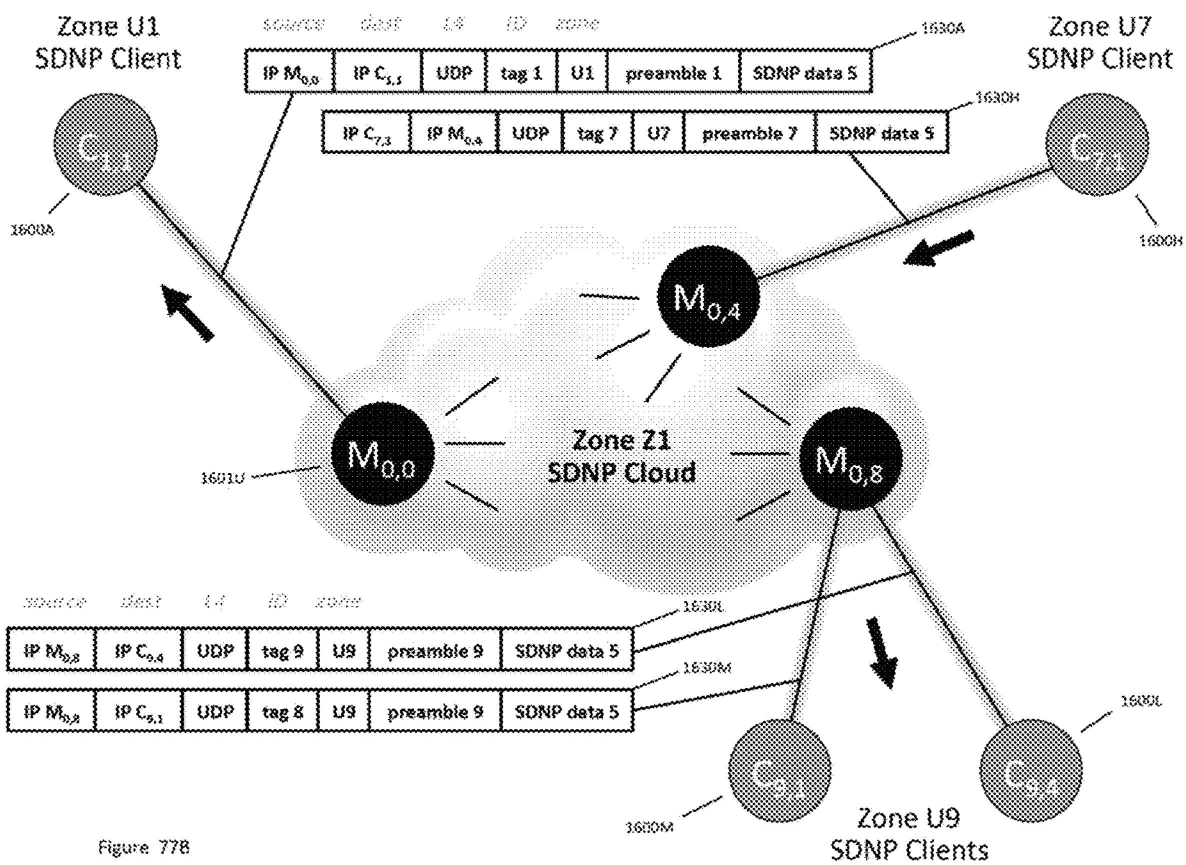
FIG. 77B is a schematic representation of a "SDNP group call" using SDNP multi-route cloud transport and SDNP Last Mile communication in the direction from a zone U7 client to clients in other zones.

FIG. 77B illustrates the same conversation where content from zone U7 client 1600H occurs—that is when client $C_{7,1}$ begins speaking. To contrast this data to voice content from client $C_{1,1}$, the payload is identified within all the data packets as "SDNP data 5". Aside from a unique payload, the only change from the prior schematic is that the Last Mile source and destination IP addresses for data packets 1630H and 1630A are swapped. Specifically, for the zone U7 SDNP user the source IP address for data packet 1630H changes to IP $C_{7,1}$ and its destination becomes the SDNP gateway address IP $M_{0,4}$. For zone U1 the callee destination IP address for data packet 1630A changes to IP $C_{1,1}$ and its source address becomes the SDNP gateway address IP $M_{0,0}$. It should be understood that several conference call participants may be speaking simultaneously and that data packets from SDNP client node $C_{1,1}$ sent to the other call participants including client node $C_{7,1}$ may occur concurrently to client node $C_{7,1}$ replying to client node $C_{1,1}$.

Figure 77C:
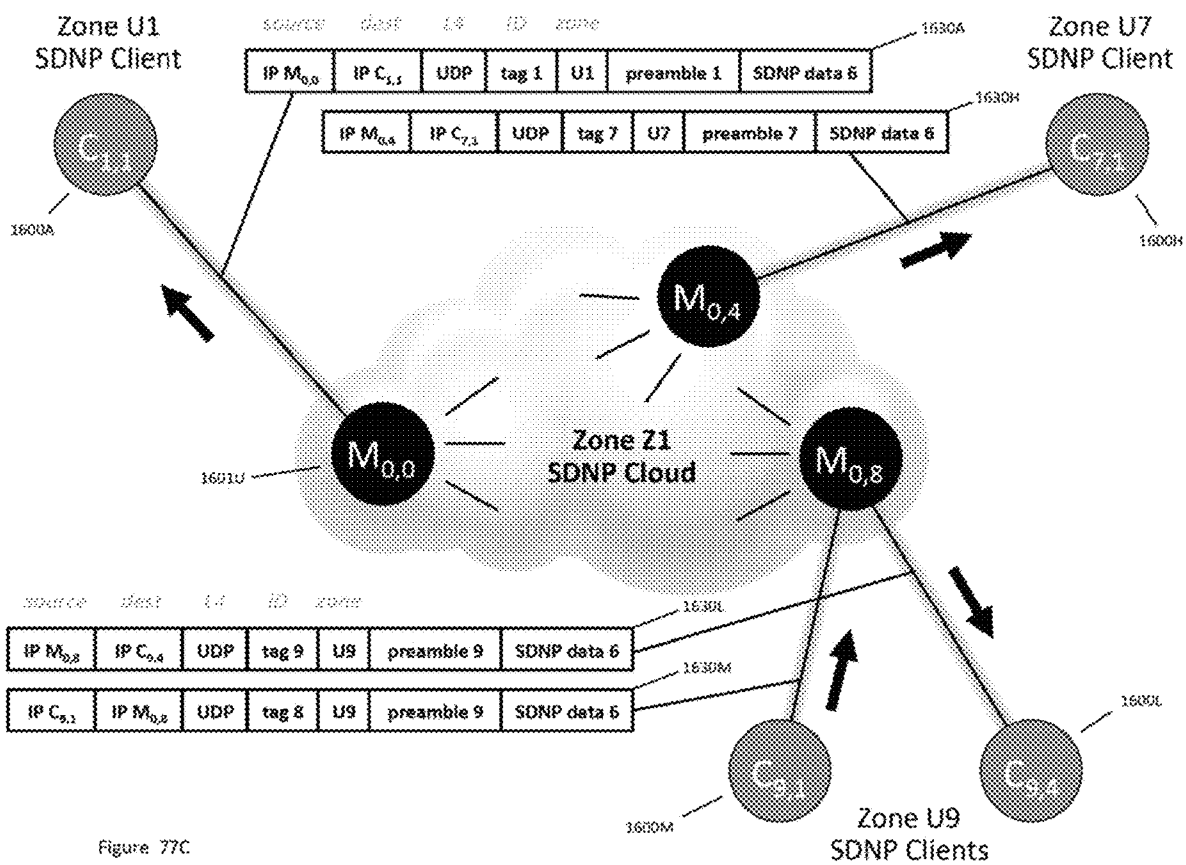

At the network level 3 of Last Mile communication, no data collisions of opposing direction traffic occur. At the physical and data link layers 1 and 2, however, Last Mile communication may involve time multiplexing to avoid contention for the same communication link. This mediation occurs, however, with such rapidity that the communication likely appears to be full duplex with no delay in voice packets. Note that in both FIG. 77A and FIG. 77B, the direction of data flow shown for zone U9 clients remains unchanged, i.e. data flows from the cloud to the client. In FIG. 77C however, zone U9 client node $C_{9,1}$ begins speaking. In this case client nodes $C_{9,4}$, $C_{1,1}$ and $C_{7,1}$ all become recipients of the voice, i.e. SDNP voice data 6.

Figure 78:
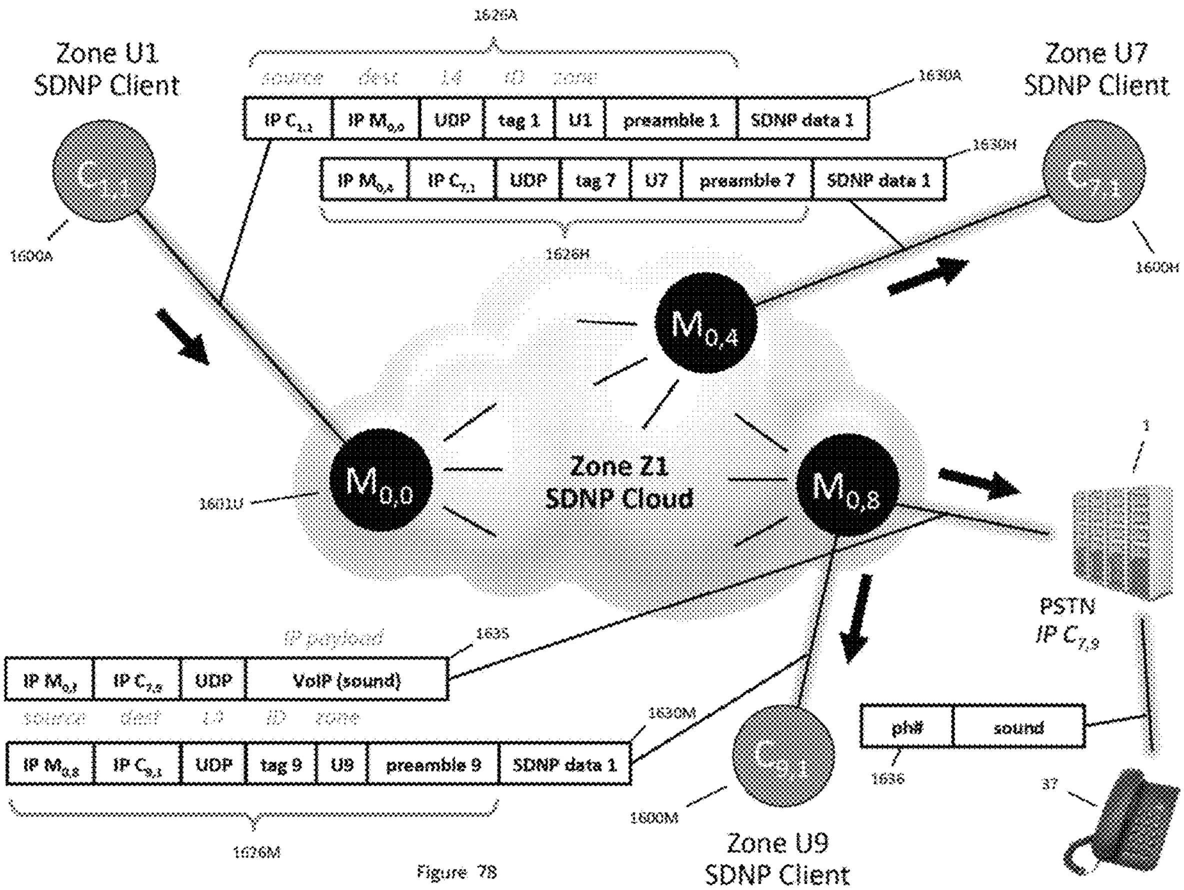

In an alternative embodiment shown in FIG. 78, a group call may comprise a mix of SDNP calls to SDNP clients and of "call out" calls to regular phone numbers. In a manner similar to the call or communiqué shown in FIG. 77A, voice carried by SDNP data 1 in data packet 1630A is routed by header 1626A from the caller with IP address "IP $C_{1,1}$" to the nearest SDNP gateway comprising media node $M_{0,0}$. The data packet is re-packeted for SDNP cloud transport and sent to gateway media nodes $M_{0,4}$ and $M_{0,8}$. In the example shown the cloud transport directs incoming communication at SDNP gateway node $M_{0,0}$ to other gateways, in this case SDNP gateway nodes $M_{0,4}$, and $M_{0,8}$. Data packet 1630H carrying the caller's voice, i.e. SDNP data 1, exits gateway node $M_{0,4}$ and is routed using header 1626H from media node at "IP $M_{0,4}$" to client 1600H at "IP $C_{7,1}$" using zone U7 security credentials. SDNP data 1 payload is also delivered to conference call participants through gateway media node $M_{0,8}$. Last Mile communication from this SDNP gateway comprise two different types of connections, specifically a HyperSecure connection to SDNP-client 1600M and an unsecured "call out" connection to PSTN 1 comprising a conventional phone system not employing VoIP or packet protocols. Last Mile data packet 1630M delivered to zone U9 SDNP client at address "IP $C_{9,1}$ contains header 1626M specifying the identifying packet identifier "tag 9" used to recognize content associated with the same conversation, preamble 9 information used for carrying SDNP embedded instructions, keys, seeds, etc. and a "L4" data field used for stipulating Layer 4 transport as UDP.

Gateway node $W_{0,8}$ also sends an IP packet 1635 to PSTN 1 at the address IP $C_{7,9}$. Rather than carrying the payload comprising SDNP data 1, in this case the IP payload has been converted into a VoIP sound package, one that could be intercepted by packet sniffing. The phone switch system, PSTN 1 then converts this unsecured IP packet into an analog POTS phone connection to phone 37 shown by POTS data 1636 comprising the phone number being called followed by a continuous analog circuit connection between phone 37 and PSTN 1. Because this and any other call out connections are not HyperSecure, the content carried by the call out Last Link is at risk for hacking, wiretaps, and other surveillance techniques. Unless some hierarchical structure defining access privileges of the clients is implemented, the security of the entire call is compromised by the weakest link, meaning everyone on a group call can hear everything.

This point is exemplified in the table shown in FIG. 79A, where a group call comprises HyperSecure participants on SDNP network client nodes $C_{1,1}$, $C_{7,1}$, $C_{9,1}$, and $C_{9,4}$, along with call out participants at phone numbers "Ph #1" and "Ph #2". As shown, SDNP client $C_{1,1}$ is the group host, SDNP clients $C_{7,1}$, $C_{9,1}$ are participants, meaning they can listen and talk, and SDNP client $C_{9,4}$ is a "listener" meaning they can listen to the call but cannot talk or be heard by the participants. The participant at call out phone number "Ph #1" is also a participant able to listen and talk, while the caller at "Ph #2" is authorized only as a call out "listener", not enabled to talk on the group call. The group host prescribes these listen talk privileges, i.e. the user authorization, at the time the call is setup.

Referring again to the table in the column entitled regular call, please note that everyone on the group call, i.e. callers approved by the host, has the ability to listen to the call. Callers attempting to hack into the call and not approved by the host have no means to connect or force their way onto the call or even the ability to determine a call is transpiring.

The same methods are applicable to group chats where participants can read and write messages, but view only members can only read the comments but cannot interject their own text onto the chat.

Using authentication and identity verification for controlling network access made in accordance with this disclosure, the SDNP system offers privacy features not available in conventional group chats and group calls. This feature is invoked by selecting private mode, e.g. example by clicking a lock symbol or other privacy icon before texting or speaking. In such cases, the communication is sent only to SDNP clients who are authenticated and not to SDNP clients who have not yet confirmed their identities through authentication and not to any call out listeners or participants on unsecured devices. This point is clarified in the aforementioned table where, in a private call under the column labeled "Unauthenticated SDNP Client," all group call clients have both their microphone and speaker muted while in the column labeled "Authenticated SDNP Client," all SDNP clients can listen, participants $C_{1,1}$, $C_{7,1}$, and $C_{9,1}$ can also talk, but all call out devices have both their microphone and speakers muted, meaning only an authenticated SDNP client can hear or comment in private mode. In this way, a group call with a mix of SDNP clients of assured identity, and with call out connections with unknown parties can mutually participate in the public portion of a call but without revealing confidential information to the call out devices. The "call out" callers are removed from private discussions simply by having any SDNP participant click their private icon before speaking or texting. At the end of the private discussion, the private button is released and they are reconnected. During the time the call out callers are disconnected, i.e. essentially placed "on hold", the SDNP system can either play waiting music, go silent, or play white noise (like ocean or rain sounds).

Text messages in a group chat can also be managed in the same manner. In a regular group chat all text messages are sent to the SDNP app on SDNP client devices and sent by SMS text message to all call out chat members. Text messages can be sent only by participants. Text messages sent from "Listeners" or "Read Only" chat members are ignored and will not be forwarded to the chat group. If a participant clicks the lock or privacy icon before sending a message, the message will be sent only to SDNP clients and not to any call out clients. For SDNP clients receiving a private message, if they have authenticated their identity the message will visible for reading. If they have not authenticated their identity, the message will be obscured, covered, hidden, or represented by an icon, e.g. a lock, until the viewer performs an authentication to confirm their identity.

By combining authentication of identity with privacy privileges regulated by SDNP network system authorization, hacking the device is insufficient to open a private text or listen to a private call, even in group chats and group calls. This feature cannot be guaranteed by relying only on device security parameters—information that can be hacked locally. System parameters are much harder to trick because fake security and identity credentials will not match the system logs and will be rejected as invalid SDNP clients.

An additional degree of privacy can also be added in executing group calls and group chats. This unique embodiment of the HyperSecure Last Mile described in the table shown in FIG. 79B is referred to herein as a hyper-private call or a hyper-private chat. Hyper-privacy requires a caller or message conform to four criteria:

All recipients of the communiqué on the group call must be an SDNP client, not a call out device, The call or text must be selected a priori as a hyper-private communiqué, whether a call, text, image, etc.

The recipient of the communiqué on the group call or chat must have authenticated their connection to insure their identity The recipient of any hyper-private communiqué must be preselected as a "private" participant or private listener.

Although the first three criteria are essentially the same as those in the aforementioned example of private parties in a group call, the fourth criterion, the requirement that any caller eligible to receive hyper-private calls or text must be loaded on a predefined list of clients as a "private" SDNP client, is unique and further limits access to sensitive information. For example, as shown in tabular form, SDNP participant clients $C_{1,1}$ and $C_{7,1}$, and SDNP listener client $C_{9,4}$ are all designated as "private" parties in the group call. In contrast SDNP client $C_{9,1}$ is only designated as a participant but not as a private participant. By definition, no call participant or listener can be registered as a private party.

As in the previous example, during a regular call all participants, i.e., SDNP clients $C_{1,1}$, $C_{7,1}$, and $C_{9,1}$ and call out participant Ph #1, can hear all conversations and read all text messages as well as talk or text at any time, while "listeners," comprising clients $C_{9,3}$ and Ph #2, can hear all conversations and see texts but cannot talk or send messages in the group call or chat. In a hyper-private call, however, selecting a switch or icon to designate a hyper-private communiqué automatically blocks not only all unauthenticated parties on the group call or chat, but it also disables any party other than "private" parties. It also disables all call out connections and all unauthenticated users. So in operation, when any private participant selects the privacy icon, only private participants (including the private group host), can see, read, talk or text to the group. All other parties have their microphones and speakers muted, and likewise are unable to receive or send texts or attachments to the group. Specifically, in in hyper-private mode, once authenticated, only clients $C_{1,1}$, and $C_{7,1}$ can both listen and talk as well as read and send text while private client $C_{9,4}$ can only listen to a conversation or read group text.

With the above Last Mile routing control capabilities, group calls and group chats can be managed in any number of ways. For example, the group call host can determine who can join the call or group, who can talk and text, and who can only listen and read. In a standard private call, selecting the private mode enables all SDNP clients, once authenticated, to engage in communiqués with the same privileges they had during standard non-private group communication. In the hyper-private mode, only SDNP clients defined as private participants and private listeners can communicate during hyper-private mode operation.

Selection of who is qualified to be part of a hyper-private communiqué, i.e. who is identified as a private participant or listener, and who is not, can be established in several ways. In ad hoc hyper-private group communication, the group host decides who is a private caller and who is not. In SDNP "system defined" hyper-private group communication, the SDNP network operator decides in advance who is private caller and who is not. In rules-based hyper-private group communication, the SDNP network has defined rules to determine who is eligible to be a private caller and who is not. These rules may be based on a company employment list, e.g. where only vice-president and higher may participate in a hyper-private call. In government and security organizations, the criteria may be set by national security clearance, passport number, police badge number, etc. The SDNP-enabled Last Mile communication methods defined herein can support any of these exemplary scenarios, or employ any other criteria to bifurcate a population into two groups, thereby establishing those that have hyper-private communiqué access and those that do not.

While the concept can be extended to more than one group, hierarchical access criteria are generally more applicable to dispatcher-based professional communication systems than to telephony. The application of SDNP methods for professional communications will therefore not be addressed further in this application.

One challenge for group calls is the problem of everyone trying to talk at the same time. Overlapping speech is confusing, hard to hear, and may also result in unwanted static. This issue can be remedied by using the push-to-talk feature, a function emulating a walkie-talkie or CB radio. In push-to-talk or PTT operation only one participant can be speaking at a time. When a participant wishes to talk, depressing a switch mutes all other on the network microphones putting every other party in the group call into a listen only mode. As shown in the table of FIG. 80A, in a regular PTT conversation when the host depresses the PTT button, as shown in the column labeled Host PTT, they take priority over the group call and override every other caller, even those who have pressed their talk button. All other callers, including call-out phone connections, automatically have their microphones muted and become listeners only. Provided the host does not depress their PPT button, then as shown in the column labeled "other PTT", then the PTT capability is surrendered to any other SDNP participant on a first come, first served basis. SDNP nodes designated as listeners and call out devices such as $C_{9,4}$ and Ph #1 can listen to the PTT conversation but have their microphones muted during the entire group call.

Using the SDNP Last Mile capability for identifying callers that have authenticated their identity to the network, the PTT feature can be extended to private push-to-talk functions. Whenever the privacy feature or icon is selected, all unauthenticated parties are removed from the group call, muting their speakers and microphones. Call out connections by definition cannot be authenticated and therefore are muted as well. Muting is bidirectional, preventing the excluded parties from listening to the conversation but also disconnecting the excluded participant's microphones as well. For those parties that are authenticated, operation precedes the same as a regular PTT, where the host has priority to talk and otherwise any authenticated participant can invoke the PTT talk feature on a first come, first served basis.

The table in FIG. 80B illustrates the concept of a hyper-private group call can be extended to the PTT function. In regular operation, PTT functionality is identical to the previously described case. But in hyper-private mode, only authenticated parties who have been previously designated as either private participants or private listeners can engage in hyper-private conversations. For example in hyper-private mode, SDNP clients $C_{9,1}$ and $C_{9,5}$ are cut off from talking or listening because they were not previously listed as private participants or listeners. Similarly, all call out connected devices are muted during hyper-private mode operation. In this way, access to the various parties in a PTT group call can be explicitly controlled. Muting is the process of excluding some participants (e.g. the call out listeners) from receiving data packets carrying the conversation's sound while continuing to supply the data packets to participants who ae not muted. In this disclosed method, data packets and individually sent to all participants in normal conversation and only to a subset of the list when muting is activated by the client's user.

In an alternative embodiment data packets are sent in broadcast mode to all participants in the group call but using different encryption methods. In the case of normal conference calls the data packets are sent to all users using an encryption where all participants have a copy of the decryption key. In private mode or mute mode the data packets broadcasted to the users utilize a different encryption where only select users share the decryption key. Those with the key are able to participant in the call and those without are excluded. The advantage of using a broadcast packet is that it requires less bandwidth for last mile communication than sending separate packets demands. In yet another embodiment a single packet is sent to the gateway, and the signaling server clones the packet for distribution to all participants in normal call mode and to select callers in private or mute mode.

HyperSecure File Storage—

Although the secure dynamic communication network and protocol was invented and developed as a HyperSecure communication system for telephony and real time data transport, the security mechanisms intrinsic to the SDNP network and protocol render it perfectly suited for HyperSecure file and data storage. In its simplest description, if a HyperSecure call involves anonymous fragmented data transport of scrambled encrypted data from one caller to another, i.e. end-to-end communication from one SDNP client to another SDNP client, then HyperSecure file and data storage can be envisioned as a communication that is stopped halfway and stored in a buffer indefinitely until recalled. Another name for Hypersecure distributed file storage is Disaggregated Data Storage.

This simplified description, that storage is a communication that is stopped in the middle of packet delivery, is technically more accurate than it may first appear. In the above-referenced U.S. application Ser. No. 14/803,869 the buffering of data packets temporarily until other packets catch up was explicitly disclosed and described operationally. While buffering within the nodes of the SDNP cloud occurs in a scale of milliseconds rather than months, the SDNP system has the ability to wait or hold data without losing the information recovered to recover the original content. Of course, such a simplified implementation lacks certain features needed for long-term file management such as directories, menus, recycling of files, refreshing of security credentials and other such features.

Figure 81:
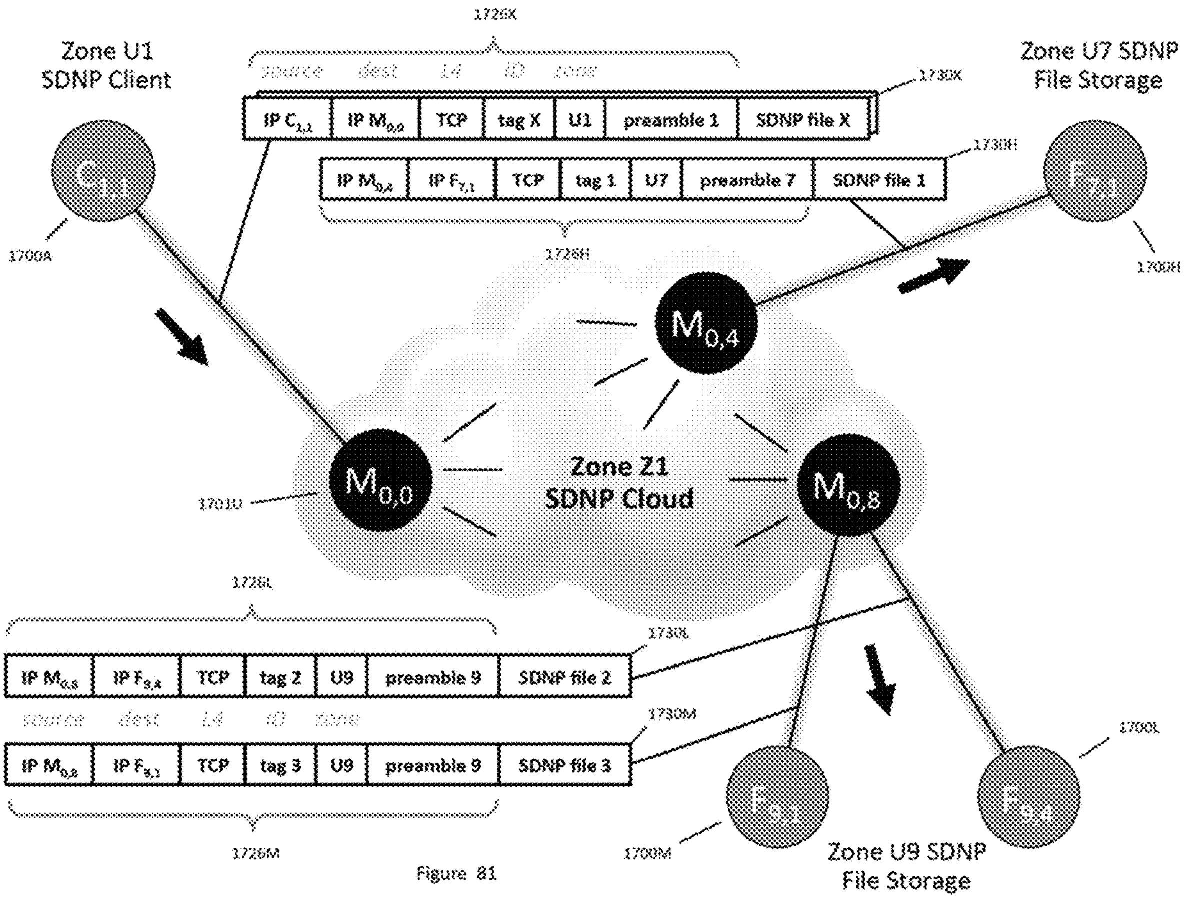

An example of the data transport from a client to a fragmented data storage network is shown in FIG. 81. As shown, SDNP client 1700A with an IP address IP $C_{1,1}$ transports a series of data packets over the SDNP cloud to SDNP file storage servers 1700H, 1700M and 1700L with corresponding IP addresses IP $F_{7,1}$, IP $F_{9,1}$, and IP $F_{9,4}$. In operation, client node $C_{1,1}$ sends a series of data packets 1730X with corresponding headers 1726X from address IP $C_{1,1}$ to SDNP gateway $M_{0,0}$. Data packets 1730X are exemplified by data packets 1730H, 1730L and 1730M with corresponding headers 1726H, 1726L and 1726M. To insure accuracy, Layer 4 transport uses TCP rather than UDP. The packets include a SDNP Zip or other ID labeled tag X used to identify them for routing, in the case of data packets 1730H, 1730L and 1730M, tag 1, tag 2 and tag 3. The payload portion of each packet carries unique data, e.g. in a three part fragmented file SDNP file 1, SDNP file 2, and SDNP file 3. Security credentials in this Last Mile use zone U1 information with a corresponding preamble 1.

Once the data packets enter the SDNP cloud they are routed to different destinations in accordance with their identity and the instructions of a signaling server (not shown). The data packet 1730H with header 1626H and tag 1 carrying SDNP file 1 is routed to SDNP gateway node $M_{0,4}$. SDNP gateway node $M_{0,4}$ then routes the packet 1730H to file storage node $F_{7,1}$ using security credentials for zone U7. Meanwhile, the packet 1730L with its ID as tag 2 carrying SDNP file 2 is independently routed to SDNP gateway node $M_{0,8}$. SDNP gateway node Ws then routes the packet 1730L to file storage node $F_{9,4}$ using security credentials for zone U9.

Nearly contemporaneously, the packet 1730M with its ID as tag 3 carrying SDNP file 3 is independently also routed to SDNP gateway node $M_{0,8}$, not necessarily using the same meshed routing path as data packet 1730L with an ID of tag 2. SDNP gateway node Ws also routes the packet 1730M with tag 3 to file storage node $F_{9,1}$ also using security credentials for zone U9.

In this manner, SDNP file 1 is delivered to file storage node $F_{7,1}$ using security credentials for zone U7, while SDNP file 2 and SDNP file 3 are delivered to file storage nodes $F_{9,4}$ $F_{9,1}$ respectively with both using security credentials for zone 9. Although the files are owned by client node $C_{1,1}$, the client does not have access to the security credentials used to encode and protect the contents of the files. Since no one file storage node contains all the data, and since the client owning the data does not have access to the security credentials used to store the data, it is difficult for a hacker to steal the files' contents because (i) they are fragmented into incongruent and unusable pieces (ii) all the files use different security credentials to scramble and encrypt the data, (iii) they are stored in different locations and on different Last Mile networks and (iv) there is no way to tell the various stored data comes from the same SDNP source file. Zones containing the file storage servers may also be referred to as "storage side" zones to distinguish them from the zone where the file owner is located, i.e. on opposite sides of the SDNP cloud. By this definition, zone U1 is the SDNP client zone, also referred to the as "file owner" zone, while zones U7 and U9 are "storage-side" zones.

Figure 82A:
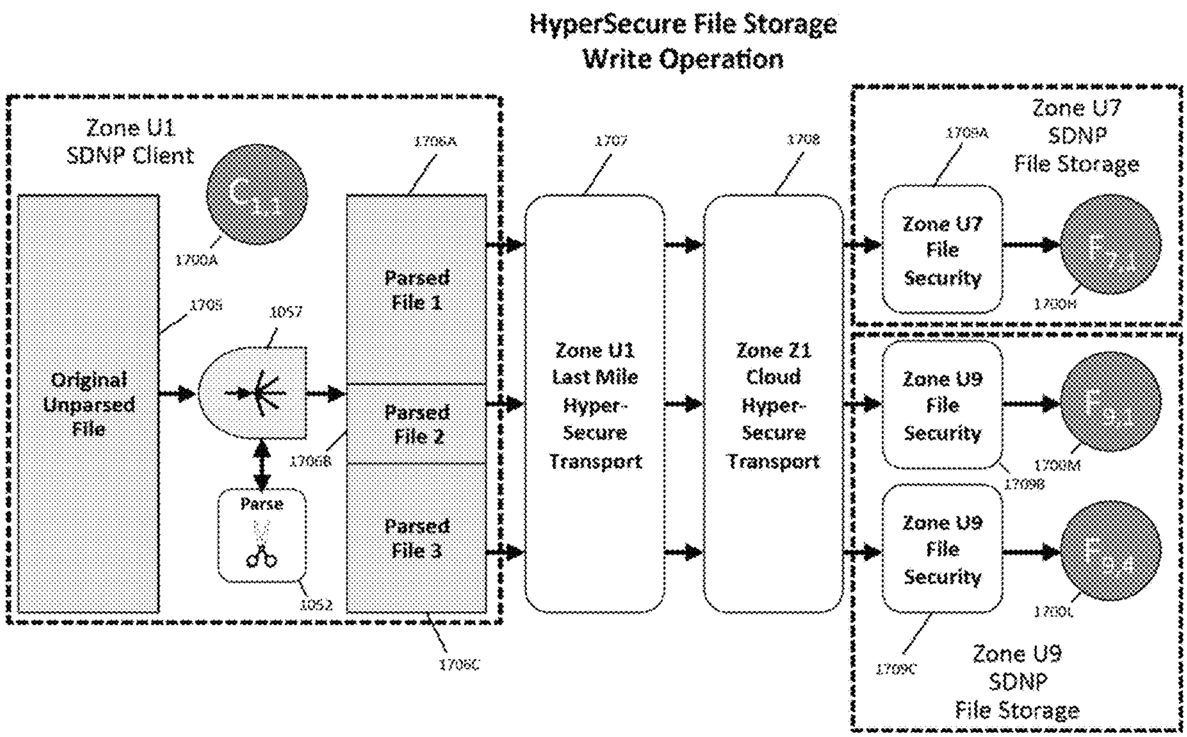

The application of the SDNP network communication protocols on file storage is further illustrated is the flow chart of FIG. 82A illustrating the "write operation", the general steps where a SDNP client and file owner stores, i.e. writes, their data onto HyperSecure file storage servers. As shown, SDNP client 1700A splits unparsed file 1705 using SDNP splitting operation 1057 and parsing function 1052 to produce a multipart file or document, in the example shown a three-part file comprising parsed files 1706A, 1706B, and 1706C. Optionally, the file's contents may be scrambled before splitting. These three files are then transported across the SDNP network as unrelated data or communiqués. The steps involved in their routing across the SDNP network to their final destinations utilize the same methods disclosed herein for HyperSecure Last Mile communication and previously described for meshed routing in the SDNP cloud. Specifically Last Mile HyperSecure transport 1707 uses security credentials in accordance with Zone U1. HyperSecure meshed transport 1708 in the SDNP cloud employs zone Z1 security credentials. Although, these HyperSecure data transport operations are represented as large blocks, packet transport actually occurs across a network of routers, servers, and soft-switches as described in this disclosure using a distributed system having no master key, no central control, and no access to packet content.

While zone U1 Last Mile routing may involve sending the data packets over a infrastructure involving a limited number of routing choices, the methods described for HyperSecure Last Mile communication, including multi-PHY last link routing, routing of sequential packets to multiple SDNP gateways, and the use of dynamic source addressing, i.e. changing the name of the client's IP address, are equally applicable to HyperSecure file storage operations. Once the data packets reach the SDNP cloud, their transport utilizes anonymous meshed routing with scrambled dynamically encrypted data preventing monitoring of the file content or even the metadata associated with the communication. Ultimately, all three data packets arrive at different SDNP file storage servers 1700H, 1700M, and 1700L with corresponding SDNP node names $F_{7,1}$, $F_{9,1}$, and $F_{9,4}$ located in different security zones. After network transport, parsed file 1 is processed in accordance with zone U7 file security operation 1709A and stored on SDNP file storage node $F_{7,1}$. Parsed files 2 and 3 are processed in accordance with zone U9 file security operations 1709B and 1709C and stored on SDNP file storage nodes $F_{9,1}$ and $F_{9,4}$. In this manner, no one file contains all the data, and no single security credential can unlock all the component files to recreate the original.

Figure 82B:
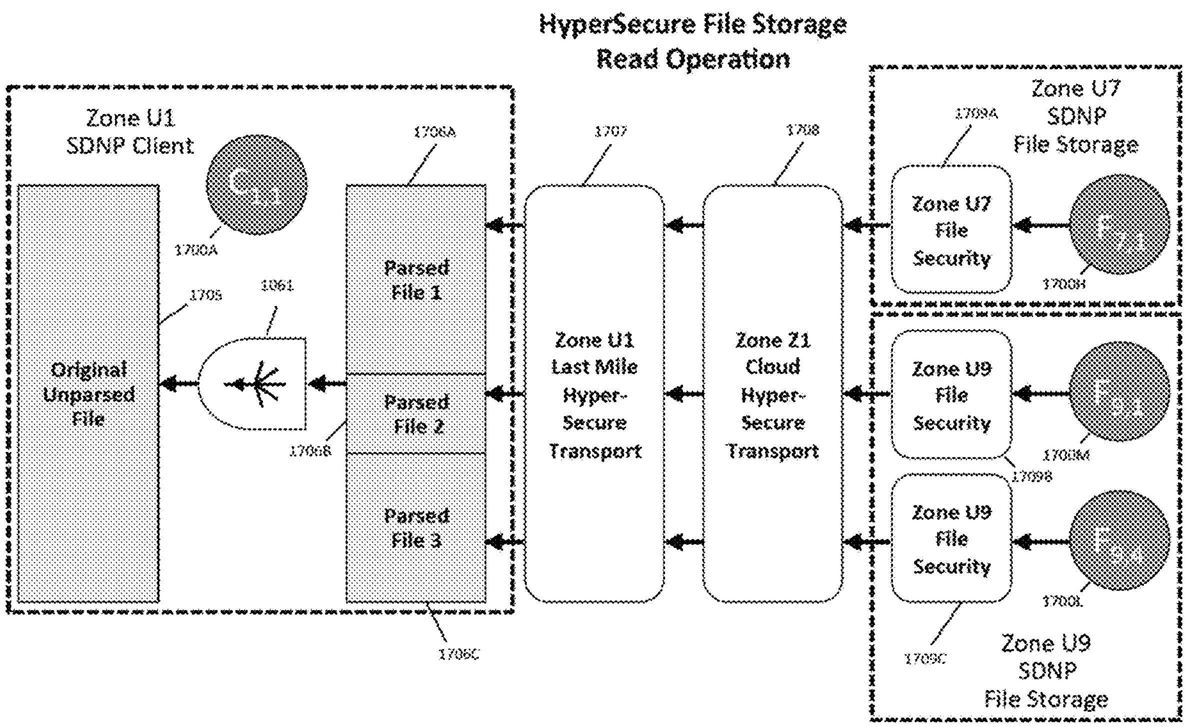

In the "read operation" of a HyperSecure stored file shown in FIG. 82B, the sequence of data transfers between the file storage servers and the SDNP client, i.e. the file owner, is reversed. Reading a HyperSecure file involves undoing the process by which the file was originally saved in reverse order involving (i) identifying the parsed files in each storage server, (ii) removing the local storage security provisions from each parsed file (iii) transporting each recovered parsed file back to the SDNP client across the SDNP cloud and HyperSecure Last Mile, (iv) collecting the parsed files from the various related communiqué s, and (v) merging (un-splitting) and as applicable unscrambling the parsed files using the client's local security credentials to recover the original file. To further elaborate in the described HyperSecure file "read operation", the relevant contents of file storage server 1700H saved in file storage node $F_{7,1}$ is processed using Zone U7 file security operations 1709A to recover parsed file 1. Independently of parsed files 2 or 3, parsed file 1 is communicated back to SDNP client node $C_{1,1}$ using the SDNP cloud shown in simplified form by HyperSecure transport operation 1708 using zone Z1 security credentials, and then by zone U1 Last Mile HyperSecure transport operation 1707. Concurrently, the relevant contents of file storage server 1700M saved in file storage node $F_{9,1}$ is processed using Zone U9 file security operations 1709B to recover parsed file 2. Independently of parsed files 1 or 3, parsed file 2 is communicated back to SDNP client node $C_{1,1}$ using the SDNP cloud shown in simplified form by HyperSecure transport operation 1708 using zone Z1 security credentials, and then by zone U1 Last Mile HyperSecure transport operation 1707. Meanwhile, the relevant contents of file storage server 1700L saved in file storage node $F_{9,4}$ is processed using Zone U9 file security operations 1709C to recover parsed file 3. Independently of parsed files 1 or 2, parsed file 3 is communicated back to SDNP client node $C_{1,1}$ using the SDNP cloud shown in simplified form by HyperSecure transport operation 1708 using zone Z1 security credentials, and then by zone U1 Last Mile HyperSecure transport operation 1707.

Figure 83:
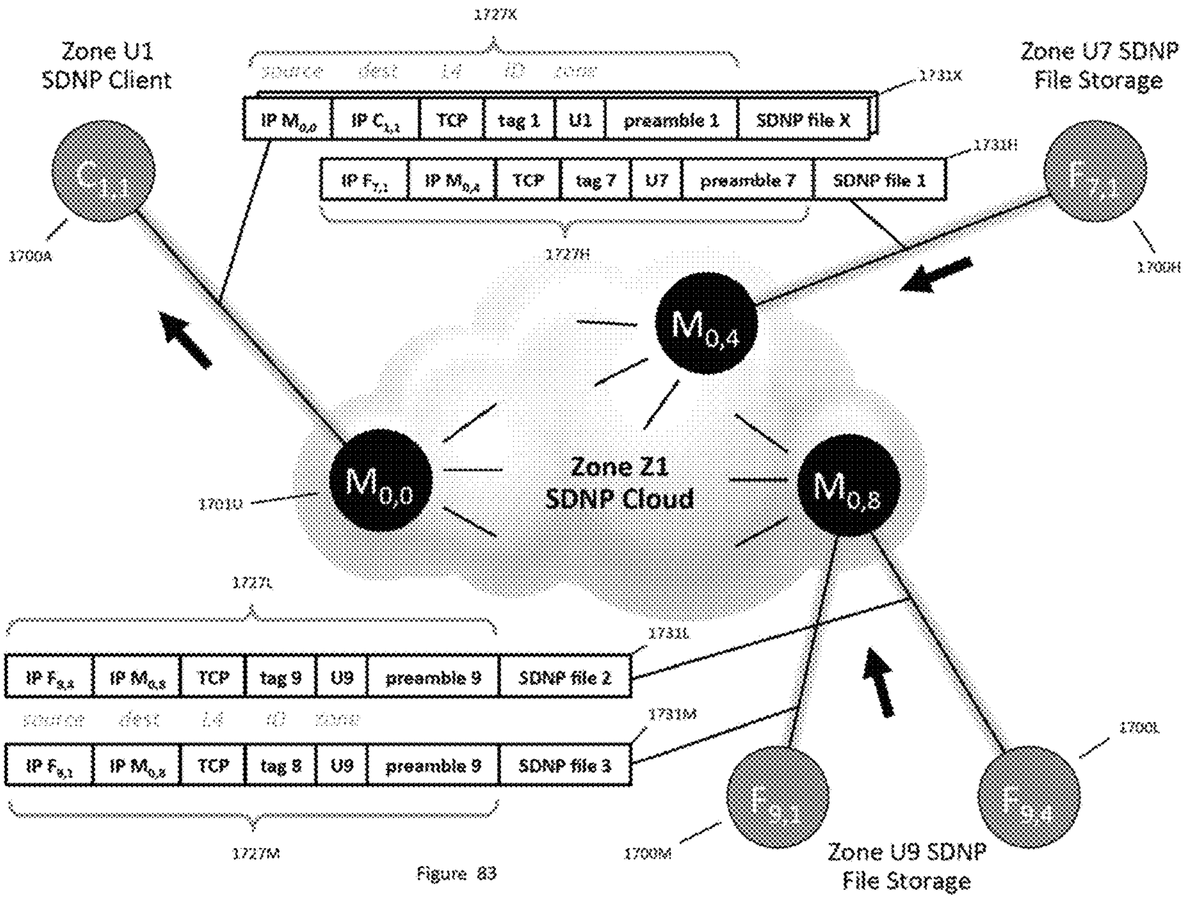

The independent packet routing of the three constituent parsed files during the read operation is exemplified in FIG. 83, where server node 1700H sends data packet 1731H carrying SDNP file 1 and with ID "tag 7" using TCP transport from file storage address IP $F_{7,1}$ to SDNP gateway server at address IP $M_{0,4}$. Packet 1731H includes header 1727H containing preamble 7 and other information that in tri-channel communication was provided previously in a command and control packet delivered by the signaling server.

Meanwhile, server node 1700L sends data packet 1731L carrying SDNP file 2 and with ID "tag 9" using TCP transport from file storage address IP $F_{9,4}$ to SDNP gateway server at address IP $M_{0,8}$. Packet 1731L includes header 1727L containing preamble 9 and other information that in tri-channel communication was provided previously in a command and control packet delivered by the signaling server. Independently and concurrently server node 1700M sends data packet 1731M carrying SDNP file 3 and with ID "tag 8" using TCP transport from file storage address IP $F_{9,1}$ to SDNP gateway server also at address IP $M_{0,8}$.

Packet 1731M includes header 1727M containing preamble 9 and other information provided in tri-channel communication previously using a command and control packet delivered by the signaling server. The three data packets 1731H, 1731L, and 1731M traverse the SDNP cloud using zone Z1 security credentials till they finally emerge from SDNP gateway $M_{0,0}$ hosted by SDNP cloud server 1701U where the data packets are sequentially sent by successive data packets 1731X using corresponding zone headers 1727X and zone U1 security credentials to client device 1700A at address IP $C_{1,1}$ Referring again to FIG. 82B, after the three parsed files 1, 2, and 3, namely 1706A, 1706B and 1706C are delivered to SDNP client device 1700A using independent routing, they are merged into a single unparsed file 1705 using mixing operation 1061 and as applicable followed by an unscrambling operation (not shown) performed in accordance with zone U1 security credentials.

Rather than adding extra file server operations to secure stored data, the security operations 1709A, 1709B and 1709C actually comprise Last Mile HyperSecure communication between the SDNP cloud and the corresponding storage-servers 1700H, 1700M, and 1700L. As an artifact of Layer 3 network connectivity using the SDNP communication protocol, SDNP file storage is intrinsically HyperSecure, comprising scrambled, fragmented, encrypted data stored across distributed nonvolatile data drives including the use of data deception methods such as junk data insertions and junk files. Aside from the foregoing data security methods, HyperSecure storage as disclosed herein utilizes anonymous file names lacking any meaningful metadata, traceability to the file owner, routing by which the file was delivered, or the identity of any other file storage server holding missing components from the original source file.

Figure 84A:
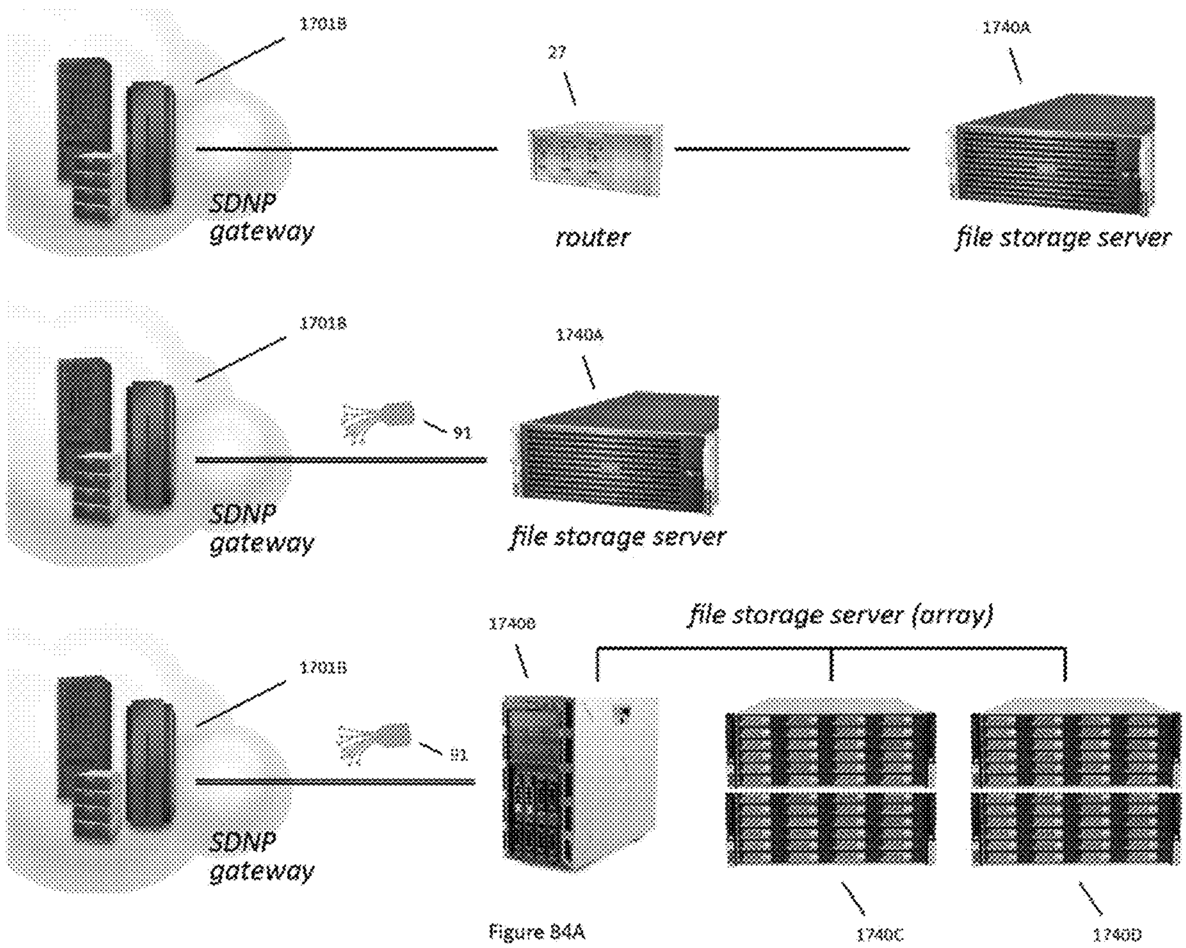

Despite the interoperability on the SDNP network, the physical realization of the storage servers, i.e. their Layer 1 PHY implementation and Layer 2 transport, protocols may vary substantially without impacting storage functionality, access times, or global accessibility. FIG. 84A illustrates by example, physical realization of SDNP file storage servers including the topmost drawing showing SDNP gateway 1701B connected to SDNP file storage server 1740A via router 27. For higher network performance and further resiliency to attack, the middle illustration shows a direct connection between SDNP gateway 1701B and SDNP file storage server 1740A using optical fiber 91 with no intervening routers. As shown in the bottom example, the file storage server may comprise a larger memory array with a server controller 1740B and the storage drives 1740C and 1740D. The drives may comprise any media including hard disk drive or flash drive based nonvolatile memory. To further limit access, the SDNP gateway and the SDNP file storage server may be physically located in the same location and facility with only a fiber link connecting them. They may even share a common room, e.g. physically locked in a vault, with strictly managed access control and surveillance monitoring of anyone entering the facility.

Figure 84B:
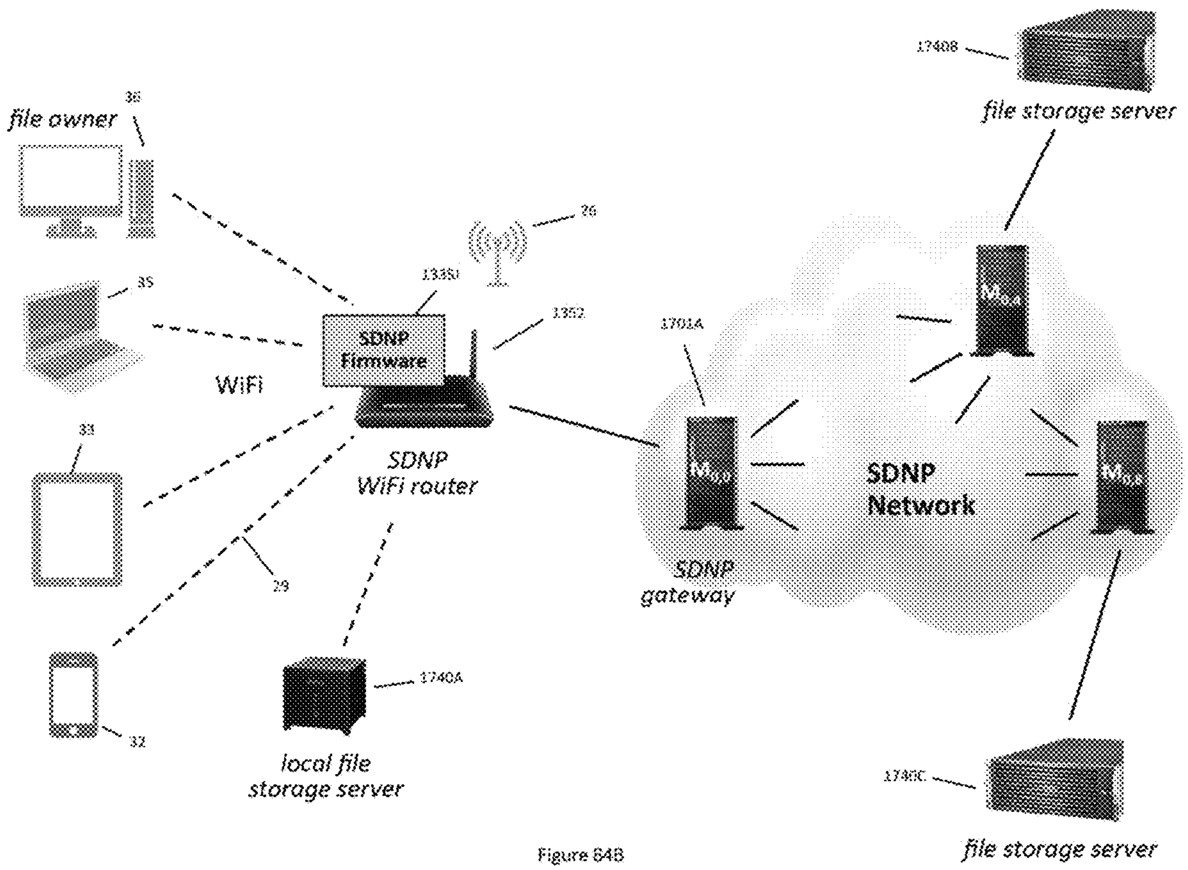

FIG. 84B further illustrates than some portion of the fragmented data file may be stored locally at the site of the file owner. As shown, the file owner's desktop 36 may store a distributed file across several devices including (i) local file storage server 1740A accessed over WiFi router 1352, which is connected to SDNP gateway node $M_{0,0}$ on server 1701A, (ii) file storage server 1740B connected to SDNP gateway node $M_{0,4}$, and (iii) file storage server 1740C connected to SDNP gateway node $M_{0,8}$. Because the data is fragmented as saved across distributed drives 1740A, 1740B, and 1740C, other devices including notebook 35, tablet 33, and cell phone 29 do not have access to the saved file even though local file server 1740A and file owner desktop 36 share the same WiFi 1352. The process of storing each parsed portion of a file uniquely into separate file storage servers, referred to non-redundant HyperSecure file mapping, is illustrated in FIG. 85A. As shown, client device 1700A comprising SDNP client node $C_{1,1}$ stores parsed file 1706A exclusively in file storage server 1700H, parsed file 1706B exclusively in file storage server 1700M, and parsed file 1706C exclusively in file storage server 1700L, corresponding to a one-to-one file mapping between parsed files 1, 2, and 3 with storage nodes $F_{7,1}$, $F_{9,1}$, and $F_{9,4}$, respectively. Delivery of the files utilizes HyperSecure Last Mile communication, securing the transfer of the data as well as its storage. One disadvantage of non-redundant file mapping is that the loss of any one of the file storage servers, either temporarily or permanently, jeopardizes file access and recovery. In the context of this application, the terms "resilience" and "resilient" are used to define guaranteed and timely access to stored data, i.e. the confidence that stored data is not lost or its access is impaired for a substantial durations. By this token, the non-redundant HyperSecure file mapping shown exhibits poor resilience because a single point failure prevents file access. Poor resilience can be overcome by a redundant system, one where the same data is saved in more than one file storage server, Another metric describing or rating the data storage system's resiliency is a metric defined herein as read redundancy factor RRF, a term defining the number of backup systems providing data access in case the primary data storage is unavailable. In the example shown, there is one location for each unique piece of data. This results in a read redundancy factor of zero, or mathematically RRF=0, meaning that a single point connection or file server failure may result in temporary or permanent data loss because the file cannot be read by the file owner.

An alternative file mapping with a read redundancy factor of RRF=1 is shown in FIG. 85B. In this example, parsed file 1 is stored on file storage server nodes $F_{9,4}$ and $F_{7,1}$, parsed file 2 is stored on file storage server nodes $F_{9,1}$ and $F_{7,1}$, and parsed file 3 is stored on file storage server nodes $F_{9,4}$ and $F_{9,1}$. In such an implementation, if file storage server node $F_{9,1}$ became impaired or unavailable, parsed file 3 could still be accessed from file storage server node $F_{9,4}$ and parsed file 2 could still be accessed from file storage server node $F_{7,1}$. As such, any single storage node failure will not prevent read access to the HyperSecure file. FIG. 85C illustrates HyperSecure File mapping with a RRF=2. The file mapping retains file storage servers 1700L, 1700M, and 1700H but adds a second set of file storage servers 1700J, 1700E, and 1700F for realizing file storage server nodes $F_{8,2}$, $F_{4,4}$, and $F_{6,8}$, respectively. As such, file storage server 1700J acts as a backup for file storage server 1700L, file storage server 1700E acts as a backup for file storage server 1700M, and file storage server 1700F acts as a backup for file storage server 1700H. Although the examples shown comprise a file parsed into 3 sections, it is understood that a document may be parsed into a greater number of sections if desired. To insure HyperSecure storage, the original file should never be parsed into fewer than two and ideally no fewer than three sections.

To illustrate the process by which redundant files are stored and read using HyperSecure file storage, it is beneficial to illustrate the transactional sequence of communiqués and file transfer functions overlaid atop the SDNP network used to facilitate the storage process. The network shown in FIG. 86, for example, includes client device 1700A implementing client node $C_{1,1}$, router 1702G, signaling server 1715 implementing SDNP node S, name server 1714 implementing SDNP node NS, cloud servers 1701U implementing SDNP cloud nodes $M_{0,0}$, $M_{0,4}$, and $M_{0,8}$, and SDNP file storage servers 1700H, 1700L, and 1700M realizing SDNP file storage nodes $F_{7,1}$, $F_{9,4}$ and $F_{9,1}$ respectively.

In FIG. 87A client device 1700A at address "IP $C_{1,1}$" makes a file write request to signaling server 1715 at address "IP S' by means of data packet 1710A including C&C payload 1711A, in turn comprising a description of the file size and requested level of security and redundancy. In FIG. 87B signaling server 1715 sends data packet 1710B to name server 1714 requesting the IP or SDNP addresses of the file storage server nodes $F_{7,1}$, $F_{9,4}$ and $F_{9,1}$. The selection of the file address server nodes to be used can be chosen randomly from a list of storage nodes, or selected based geographically on one node available near the client or on those in disaster free regions. Selection may also be based on a performance parameter such as unused memory capacity of the node, propagation time to the file storage node, uptime reliability rating of the node, or other such considerations. In FIG. 87C name server 1714 sends signaling server 1715 data packet 1710C containing the IP or SDNP addresses of the file storage server nodes $F_{7,1}$, $F_{9,4}$ and $F_{9,1}$. The signaling server 1715 then calculates Last Mile and meshed cloud delivery of the parsed files to the file storage servers 1700H, 1700L and 1700M.

In FIG. 87D, signaling server 1715 sends data packet 1710D to client device 1700A, the packet being routed from address "IP S" to "IP $C_{1,1}$" through router 1702G. Data packet 1711D contains C&C payload 1711D containing Last Mile routing for the impending file transfer in zone U1, the client zone, specifically routing multiple packets from address "IP $C_{1,1}$" to SDNP gateway at "IP $M_{0,0}$" with tag 1, tag 2 and tag 3 identification of each packet (labeled as "tag X" for simplicity). Concurrently, signaling server 1715 also sends data packet 1710E to SDNP gateway 1701U, the packet being routed from address "IP S" to "IP $M_{0,0}$". This packet includes C&C payload 1711E showing SDNP cloud routing using zone Z1 security credentials for a packet with ID tag X, in this case from SDNP gateway address "SDNP $M_{0,0}$" to the next node in the cloud, e.g. at address "SDNP $M_{0,5}$" (not shown). In accordance with the Secure Dynamic Communication Network and Protocol, the routing of data packets throughout the SDNP cloud using meshed anonymous fragmented transport is dynamically selected based on the current condition of the real time network. Specifically, routing within the SDNP cloud of real time data packets arriving at any SDNP gateway depends on node-to-node propagation delays within the SDNP cloud and on the urgency of each real time data packet assigned by the signaling servers.

In FIG. 87E, signaling server 1715 sends C&C data packets to the Last Mile nodes located on the storage side, i.e. to zones U7 and U9. As shown, data packet 1710F is sent to SDNP gateway $M_{0,4}$, the packet being routed from address "IP S" to "IP $M_{0,4}$" containing C&C payload 1711F communicating that a data packet with tag 1 should be anticipated by gateway node $M_{0,4}$ and, when received, forwarded onto Last Mile address "IP $F_{7,1}$". A second data packet 1710G is forwarded from the signaling server 1715 to file storage server 1700H at address "IP $F_{7,1}$". The C&C payload for storage in zone U7 defines the incoming packet with ID tag 1 from source address "IP $M_{0,4}$" but because the function of the node is storage and not communication the destination field is left blank, i.e. filled with a null value. Once the command and control data packets are distributed to the network, the file transfer can ensue.

FIG. 88 illustrates the fragmented data transport during file HyperSecure storage where client device 1700A sends a series of data packets 1712X carrying SDNP data files 1, 2, and 3 from address "IP $C_{1,1}$" to the SDNP gateway at address "IP $M_{0,0}$" using TCP data transport. Each data packet has a unique identifier ID, namely tag 1, tag 2, and tag 3. These files are then transported through the SDNP cloud to other gateways, namely SDNP gateway nodes $M_{0,4}$ and $M_{0,8}$. The packet containing SDNP data 1 arriving at gateway node $M_{0,4}$ is transported in data packet 1712A from address "IP $M_{0,4}$" to "IP $F_{7,1}$" using TCP with zone U7 security credentials, while data 2 and data 3 packets arriving at gateway node Ws are transported with zone U9 security credentials in data packets 1712B and 1712C from address "IP $M_{0,8}$" to addresses "IP $F_{9,4}$" and "IP $F_{9,1}$" respectively. Storage may also include local encryption in the file server to prevent data scanning of the drive. This encryption process is local and is not related to the SDNP security provisions. The data packets' content SDNP data 1, SDNP data 2, and SDNP 3 contain the actual fragmented files being stored.

The preamble in each data packet, e.g. preamble 1 in data packet 1712A, may also contain an encryption key supplied by the client as part of a symmetric key encryption operation. Using symmetric key encryption, the SDNP client node $C_{1,1}$ generates a split key, one for encryption and its complement for decryption. The symmetric encryption key is then supplied to the file storage server node $F_{7,1}$ delivered by data packet 1712A in this example. In the future, whenever the client requests to read or access the contents of the stored file, file storage server node $F_{7,1}$ encrypts the requested file using this encryption key before sending the file back to the client. Because only the client possesses the associated decryption key, only the client can open the read file. While this method provides an extra layer of protection, it has the disadvantage that only a single client can access the file as a read operation, preventing the use of multiple client file "owners" needed to facilitate redundant access in the case the original client device is stolen, damaged, or lost.

Around the time of the data transfer and file storage process, the signaling server 1715 also sends instructions to file storage servers 1700H, 1700L and 1700M regarding "link reply" message routing. A link reply is a data packet and C&C payload confirming to the client that the write operation was successful and storage of each parsed file is complete. These messages are sent to the client file-owner independently from each file storage server involved in storing the transferred parsed files. The file servers send their write-confirmation replies to the client independently with no knowledge of one another, and the write-communication replies are transmitted using independent security credentials including unique states different than the states operative at the time of the write operation. Routing of these link reply messages does not necessarily utilize a reverse direction of the same routing path as those used to transfer the files. Such a reply could potentially be used by cyber-attackers as a trace back to find a file's owner. Instead, the link reply utilizes a packet ID to identify to the client that the stored files are part of the same file and stored as part of the same fragmented write-operation.

In operation, the signaling server sends routing for the link reply messages to the file storage servers, to the client file-owner, and to all the intermediate SDNP nodes involved in the link-reply message routing. The signaling server 1715 coordinates the link reply message routing as shown by example in FIG. 89A using data packets containing command and control payloads, e.g. file storage server 1700H receives data packet 1721G containing C&C payload 1722G containing header data for "link 1 reply" routing from address IP $F_{7,1}$ to address IP $M_{0,4}$. SDNP gateway node $M_{0,4}$ receives data packet 1712F containing C&C payload 1722F describing routing of the tag 1 data packet from address "SDNP $M_{0,4}$" to another node within the SDNP cloud (not shown), in this case at address "SDNP $M_{0,14}$". Similarly, signaling server 1715 sends file storage server 1700M data packet 1721M containing "link 3 reply" tag 3 packet Last Mile routing instructions from address "IP $F_{9,1}$" to "IP $M_{0,8}$". While the storage-side Last Mile routing for file data packets and their corresponding link reply messages may be identical or similar, routing of the reply messages through the SDNP cloud are most likely dissimilar due to the dynamic nature of the SDNP cloud.

The actual routing of the link reply messages from participating file storage server nodes is shown in FIG. 89B. As shown, file storage server 1700H replies with data packet 1720A identified by tag 1 and carrying a payload "FS link 1". The packet is routed from address "IP $F_{7,1}$" to SDNP gateway at address "IP $M_{0,4}$" using zone U7 security credentials. From the SDNP gateway, the tag 1 data packet is routed through the SDNP cloud to client side gateway at address "SDNP $M_{0,0}$" where the address is converted to Last Mile data packet 1720X and routed from address "IP $M_{0,0}$" to address "IP $C_{1,1}$" using TCP transport using zone U1 security credentials, and carrying tag 1 data, namely preamble 1 and FS link 1.

In a similar manner, file storage server 1700L replies with data packet 1720B identified by tag 2 and carrying a payload "FS link 2". The packet is routed from address "IP $F_{9,4}$" to SDNP gateway at address "IP $M_{0,8}$" using zone U9 security credentials. From the SDNP gateway, the tag 2 identified data packet is routed through the SDNP cloud (routing not shown) to client side gateway at address "SDNP $M_{0,0}$" where the address is converted to Last Mile data packet 1720X and routed from address "IP $M_{0,0}$" to address "IP $C_{1,1}$" using TCP transport using zone U1 security credentials, and carrying tag 2 data, namely preamble 2 and FS link 2.

The third piece of the parsed file identified by tag 3 and carrying a payload "FS link 3" is sent from file storage server 1700M via data packet 1720C. This tag 3 packet is routed from address "IP $F_{9,1}$" to SDNP gateway at address "IP $M_{0,8}$" using zone U9 security credentials. From the SDNP gateway, the tag 3 identified data packet is routed through the SDNP cloud to client side gateway at address "SDNP Mom" where the address is converted to Last Mile data packet 1720X and routed from address "IP Mom" to address "IP $C_{1,1}$" using TCP transport using zone U1 security credentials, and carrying tag 3 data, namely preamble 3 and FS link 3.

FIG. 89C illustrates an example of content of FS link data packet 1720A routed from file storage server 1700H back to the client and file owner. As shown, the data packet comprises Last Mile routing from address "IP $F_{7,1}$" to SDNP gateway at address "IP $M_{0,4}$" using TCP in a packet with ID tag 1 created in security zone U7. Reply preamble 1719A contains a description of the data payload 1741A and also contains optional security credentials used to execute or enhance the security of the FS link data packet 1720A being delivered to the client. In tri-channel communication, however, the reply security credentials contained within reply preamble 1719A are generally not required and unrelated to that used by the client to subsequently access and open the HyperSecure stored file. Access credentials needed to create a link from the client to the file stored in file storage node $F_{7,1}$ are instead contained within data field 1741A including

- A unique network tag, SDNP address, or pseudo-address needed to identify the file storage server where that portion of the fragmented file is stored.
- A description of the zone defining the security credentials used to encode the file in the "storage-side" security zone (not the client's zone).
- Seed 1 which may contain a numeric seed or the time or state 920 used during the file's encoding prior to storage.
- Seed 2 which may contain a numeric seed 929 used to execute file encoding as part of the storage operation.
- Key 1 containing a decryption key 1030 for decrypting the zone U7 "storage side" encryption. This key may be used in conjunction with shared secrets held in a DMZ server operating as part of the file storage server, or may represent a partial decryption key that can only be operated in conjunction with another security credential such as a numeric seed.
- Key 2 containing an encryption key 1022 sent to the client and used for sending secure instructions from the client to the file storage server using symmetric key encryption.
- A file name or other information used to help a client identify the stored file without revealing how it is stored.

The foregoing data packet is used for illustrative purposes and should not be viewed as limiting the data packet's contents to the precise elements or format as shown in the example. The FS links 1720X received by SDNP client node $C_{1,1}$ once received from the file storage servers participating in storing the fragmented file, are then processed to create a file link for the client's device. As illustrated in FIG. 89D, this operation combines FS links 1741A, 1741B, and 1741C using mix operation 1753 to create an FS link aggregate "file storage read link" 1754. The file storage link 1754 is posted on the client's HyperSecure text messenger or file management system for easy single-pushbutton recall of the HyperSecure file. HyperSecure operations are invisible to the user. The file owner need not be concerned with the fact that the file is actually fragmented, encoded, and stored across a distributed file storage system. File recall appears as if the file were resident locally. The FS link therefore is a key element to accessing any file stored across a distributed file storage system.

A simplified representation of the FS Link communication is shown in FIG. 90A where all three file storage servers send their respective FS links to client node $C_{1,1}$ and corresponding client device 1700A, specifically file storage server 1700H sends FS link 1, file storage server 1700M sends FS link 2, and file storage server 1700L sends FS link 3. Within client device 1700A, the SDNP app software in client node $C_{1,1}$ combines the three incoming FS links 1, 2, and 3 to form a link to the stored file. This combined link appears in the SDNP messenger as a file storage confirmation. In non-redundant file management, the FS link information is sent only to the client device. For user file management, the file link can be named either at the time the file storage was requested or upon receiving the confirmation message.

Since the file storage link is sent to the client directly from the file storage servers and not through a signaling server, only the client with the link has access to the file. This FS link is required to recall and read the fragmented file. Without the FS link, the stored file and its contents will be lost forever and become irreversibly irretrievable. To reduce the risk that the FS link may be lost, an alternative approach sends the FS link to two client devices—the client device and an auxiliary device. The auxiliary device may be a second device owned by the client or in business cases, a second device owned by the company. Alternatively, the second device may comprise another server with its own login security and user identity verification.

Redundant link access to fragmented distributed stored files made in accordance with this invention may applied to both read redundant, i.e. RRF≥1, and non-redundant file storage systems. The use of a redundant link in a HyperSecure distributed memory system lacking read redundancy (RRF=0) is illustrated in FIG. 90B. In such as system, file mapping between parsed files 1706A, 1706B, and 1706C and corresponding file-storage servers 1700H, 1700M, and 1700L is non-redundant. As shown, the FS links 1, 2, and 3 are sent to two client devices, namely 1700A hosting SDNP client node $C_{1,1}$ and auxiliary client device 1700B hosting a backup client node $C_{2,1}$. In the event that one of the FS links is lost or becomes unavailable for any reason, the FS link on backup client can be used for file recovery. In this regard, the SDNP distributed storage system describes a non-redundant read implementation with single link redundancy, i.e. RRF=0 and LRF=1.

An example of HyperSecure memory comprising both read and link redundancy is shown in FIG. 90C, where parsed files 1, 2, and 3 are each mapped to two file storage servers, i.e. to realize a read redundancy factor RRF=1, and with each FS link sent to two clients to achieve a link redundancy factor LRF=1. The immunity of the storage system to both read and link related failures means the system can be considered as a true redundant HyperSecure file management system with an overall storage redundancy factor SRF=1. We herein define the storage redundancy factor SRF as a redundancy factor equal to the lowest of RRF and LRF. For example, if RRF=0 and LRF=1, the SRF=0. If instead RRF=3 and LRF=2, then the overall storage redundancy is SRF=2. In order to implement an overall system SRF=3, each parsed file must be stored in four separate file storage servers (such as shown previously in FIG. 85C) and the FS links must be sent to four separate clients.

As such, the overall storage redundancy factor SRF is a direct measure of the resiliency of the distributed storage system from failure. This principle is summarized in the graph of FIG. 9I where the abscissa describes the # of file storage servers used in a file storage system and the ordinate describes the number of FS links sent to separate clients. As shown, a single file storage server has no redundancy, i.e.

RRF=0. Increasing the number of file storage devices improves the read redundancy but has no affect on the link redundancy. Conversely, sending a link to a single client offers no link redundancy, i.e. LRF=0 regardless of the number of available file storage servers. In either case, i.e. for one storage server or one client link, the overall storage redundancy factor SRF=0, meaning the file storage system has no resiliency as shown graphically by the L shaped region.

As shown, storing a three part parsed file on 3 file storage servers as shown previously results in a read redundancy factor RRF=1. Provided at least two clients receive the FS link, the link redundancy of LRF≥1 is achieved. The combination of either LRF=1 or RRF=1 produces L-shaped region 1724B where SRF=1, i.e. providing some degree of system resiliency. Note that even when 6 servers are employed, if the FS links are sent to only two clients the system still exhibits only a limited degree of resiliency, i.e. SRF=1.

By sending the FS links to 3 clients and storing data redundantly on 6 storage servers, region 1724C defines the conditions where SRF=2 offering a fairly robust degree of storage resiliency. Region 1724D illustrates a further enhancement in resiliency where SRF=3 using six file storage servers and 4 clients receiving keys. So the bottom-most row and leftmost column have the lowest storage resiliency and the upper right hand corner has the best storage resiliency.

HyperSecure distributed file storage made in accordance with this disclosure achieves long-term sustainable security by adapting, i.e. re-purposing, numerous inventive elements from SDNP communication. These inventive elements include:

- Parsing a file and distributing its fragmented content across a number of un-related network connected file storage servers,
- Transporting files between client and file storage servers using end-to-end HyperSecure communication comprising SDNP dynamically scrambled encrypted anonymous fragmented data transport with no master key,
- Storing the fragmented files in file storage servers in a manner where the storage servers lack access to client security credentials used to initially fragment and encode the stored data, i.e. where the file storage server does not possess the "client side" Last Mile security credentials required to decode, access, or read the file,
- Optionally encoding fragmented files in storage servers in a manner where a client (file owner) lacks the security credentials need to decode the stored data except through a secure link, i.e. where the "client-side" Last Mile does not possess the "storage side" Last Mile security credentials used to locally encode the files,
- Limiting the number of file storage links needed to locate and open the file and restricting user access to such links to the file owner's client device along with any redundant or backup devices,
- Requiring client multi-factor authentication and identity verification in order to execute a file link and invoke a read or erase operation,
- Utilizing anonymous data packet routing and anonymous file names whereby use of the file link for data recall provides reveals no information as to the location or encoding of the HyperSecure file storage and where, with exception of the file link, no routing information is stored in the SDNP network or HyperSecure file storage system,
- Distributing a fragmented file across a number of storage servers using undisclosed file server locations, and except through the file storage link, using anonymous identities unknown to the client, the SDNP network, or to other storage servers,
- Employing tri-channel communication where the SDNP signaling servers used to plan file routing for distributed storage have no access to the content of the fragmented files or the security credentials used to encode the files and where the SDNP media nodes used to transport the file content utilize single hop SDNP data packets lacking the identity or address of the client or the file storage server,
- Employing dynamic file renaming and data relocation at regular intervals and after repeated file access, regenerating encoding a security credentials at the time of the file rewrite operation, and
- Locally encrypting the file storage server directory to thwart file analysis.

Using the foregoing, the lack of any discernable file identity; the use of fragmented file distributed across a network (possibly on a global scale); and the use of zone-specific security credentials renders access to and reconstruction of a HyperSecure stored file inconceivable without access to file storage link. Such FS links, limited in number and distributed only through the SDNP communication system, are further secured by identity verification.

The execution of the foregoing features for HyperSecure file storage can be represented schematically in the same manner as HyperSecure communication using the functional symbols shown previously in FIG. 9A. For the sake of simplicity, as shown in the upper illustration of FIG. 92, any combination of scrambling 926, junk data insertion 1053, parsing 1052 and splitting 1057 and encryption 1026 using state or time 926C can be represented as a SDNP encode function 1750. Similarly, the decode function 1751 comprises decryption 1032, mixing 1061, junk data removal 1053B and unscrambling 928 using state or time 926B.

Using the aforementioned security functions, the top illustration of FIG. 93A illustrates the process of distributed file storage with client side encoding. As shown, file 1705 is parsed 1052 and split 1057 to create parsed file 1706 within client device 1700A used to realize SDNP client $C_{1,1}$. The resulting fragmented files are then encoded using zone U1 security credentials by SDNP encode operation 1750B for Last Mile communication performed in accordance with the methods disclosed in this application. The file fragments delivered in serial or multi-route Last Mile communication are then received by SDNP gateway $M_{0,0}$ and decoded using SDNP decode operation 1751C in accordance with zone U1 security credentials recovering the parsed file 1706. The parsed filed 1706 is then re-encoded by SDNP encode operation 1750C in accordance with SDNP cloud zone Z1 security credentials. During meshed transport, after a series of zone Z1 decoding and encoding operations in the SDNP cloud (not shown), the final data packets arrive at their respective SDNP gateways including, by example, gateway $M_{0,8}$ where SDNP decode operation 1751D recovers parsed file 1706, then re-encodes it using SDNP encode operation 1750D in accordance with zone U9 security credentials. In the example shown, parsed file 1706 is then fragmented (split) into two files, and the fragmented files 2 and 3 of parsed file 1706 are then recovered using SDNP decode function 1751E and stored in files storage servers 1740B and 1740C, respectively. In this method, the data files stored in the file storage servers are fragmented but otherwise (except for local drive encryption) the files are accessible by cyberattack of the drive data. As such, security is achieved by the file fragmentation and distributed storage.

A greater degree of file security is achieved by using the process shown in the lower illustration of FIG. 93A, which illustrates the process of distributed file storage with full client side encoding. As shown, file 1705 is processed by SDNP encode operation 1750A to create scrambled, encrypted, parsed file 1706 within client device 1700A used to realize SDNP client $C_{1,1}$. Operation 1750A also includes splitting file 1706 in three fragmented files 1, 2 and 3. The fragmented files 1, 2, and 3 are then encoded using zone U1 security credentials by SDNP encode operation 1750B for Last Mile communication performed in accordance with the methods disclosed in this application. The file fragments delivered in serial or multi-route Last Mile communication are then received by SDNP gateway $M_{0,0}$ and decoded using SDNP decode operation 1751C in accordance with zone U1 security credentials recovering the scrambled, encrypted, parsed file 1706. Parsed file 1706 is then re-encoded by SDNP encode operation 1750C in accordance with SDNP cloud zone Z1 security credentials.

During meshed transport, after a series of zone Z1 decoding and encoding operations in the SDNP cloud (not shown), the final data packets arrive at their respective SDNP gateways including, for example, gateway $M_{0,8}$ where SDNP decode operation 1751D recovers scrambled, encrypted, parsed file 1706, then re-encodes it using SDNP encode operation 1750D in accordance with zone U9 security credentials. The fragmented files 2 and 3 of scrambled, encrypted, parsed file 1706 are then recovered using SDNP decode function 1751E and stored respectively in file storage servers 1740B and 1740C. The file is therefore secured not only by fragmented distributed storage, but by some combination of scrambling, junk data, and encryption known only to the client's security zone. In a similar manner file 1 is transported through the SDNP cloud to gateway $M_{0,4}$ where it is stored in file storage 1700H in zone U7 as shown for packet 1712A in FIG. 88.

In both examples described, a greater degree of security can be achieved by eliminating the final SDNP decode operation 1751E shown in the illustrations of FIG. 93B. In this manner, the files stored on the file storage servers remain encoded by SDNP encode operation 1750D using zone U9 security credentials. In the upper illustration the files are fragmented by the client but encoded in accordance with storage side security credentials for zone U9. In the lower illustration, the files are encoded in accordance with client side security credentials U1 and then encoded a second time in accordance with storage side security credentials for zone U9. Such a double encoded file, aside from being secured by fragmented distributed file storage, represents nested HyperSecure storage because the file encoded by zone U9 security credentials contains a file encoded by U1 security credentials. The advantage of nested security as disclosed is that neither the client nor the storage server has the necessary information to open the stored file.

A summary of exemplary methods of implementing HyperSecure disaggregated file storage is shown in FIG. 94. In the examples shown, encoding and decoding used for HyperSecure communication and SDNP cloud routing are removed revealing only the net effect of file encoding. The upper left corner reveals the case for client zone fragmentation, where the document is fragmented in accordance with zone U1 security credentials but without any additional security provisions imposed by the network's storage side. The lower left corner reveals the case for client zone encoding, where the document is encoded by operation 1750B, i.e. scrambled, junked, fragmented, and encrypted in accordance with zone U1 security credentials but without introducing any security provisions on the network's storage side.

The upper right corner reveals the case for client zone U1 fragmentation, but where the extra step of SDNP encoding, i.e. scrambling, junk insertions, fragmentation, and encryption, is introduced on the storage side in accordance with zone U9. The lower right corner represents an example of full nested HyperSecure file storage where the file is encoded and fragmented in accordance by SDNP encode operation 1750B with the zone U1 client side security credentials, and then the file is encoded a second time in accordance with the zone U9 security credentials of the storage side Last Mile.

To recall and read the file, data recall must utilize security operations comprising anti-functions executed in the precise reverse order of the encoding, as illustrated in FIG. 95. In the upper left hand case to recall client zone fragmented data, the parsed file 1706 recalled from different file storage servers is recombined using merge operation 1061 to recover original file 1705. In the lower left hand case recalling client zone encoded data, parsed file 1706 recalled from different file storage servers is recovered to access original file 1705 using SDNP decode operation 1751H, the exact anti-function of splitting operation 1750B comprising mixing, decryption, unscrambling. In the upper right hand case of storage zone encoded, client zone fragmented files, the inverse operation comprises first performing SDNP decode operation 1751F to undo the effects of zone U9 security operations to recover parsed file 1706, followed by file merge operation 1061 to cancel the effect of file splitting operation 1057 made in accordance with zone Z1 security credentials.

In the lower right hand example to read a fully-nested HyperSecure file, data stored on different file storage servers is decoded by SDNP decode operation 1751D using zone U9 security credentials to reconstitute file 1706, a multipart file still scrambled, junked, parsed, and encrypted in accordance with zone Z1 security credentials. Zone Z1 specific SDNP decode operation 1751H then performs the sequential anti-functions of encoder 1750B, an operation comprising mixing, decryption, unscrambling to recall original file 1705 The operation of executing a sequential anti-function to recover a file should occur in the inverse order of the sequence used to create it. For example, if encoding involves splitting, then scrambling, and then encrypting, the inverse or anti-function, i.e. decoding, should comprise the operational sequence of decrypting, then unscrambling, and then mixing. If, however, encoding sequentially involves scrambling, then encrypting, and then splitting a packet, then the inverse or anti-function, i.e. decoding, should comprise the sequence of mixing, then decrypting and finally unscrambling the data packets To invoke a file recall or "file read operation" the client invokes the aggregated file link by clicking on the "file storage read link" to initiate the steps needed to recall and read a file stored on the system's HyperSecure file storage system. The read process involves the following steps as illustrated in FIG. 96A:

File owner and client 1700A or authorized user clicks on the "file storage read link" in a SDNP application such as a SDNP enabled HyperSecure messenger 1196, file manager, or other SDNP enabled interface.

Using a dialog interface 1765 or optionally a command line instruction, client 1700A specifies their file request 1761, including read file, edit file (make a copy of the file with write privileges), erase file (delete), refresh link (reissue security credentials), or redistribute file (move the file fragments to different file storage servers and issue a new file storage read link to the file owner client or clients).

In "verify clients" operation 1762, SDNP signaling server 1715 confirms the identity of the client or clients requesting the file (authentication). Using dialog box 1767, the client must confirm their identity using a PIN and optionally a second factor such detecting a device or security token. Alternatively, a SMS text may be sent to another device owned by the same client. In files requiring access approval by multiple clients, the identity of every user must be verified (multi-authentication).

In the "verify privileges" operation 1763, signaling server 1715 confirms the requesting client 1700A is authorized for access to the requested file with read or read/erase privileges (authorization). The result is displayed in dialog box 1768 before confirming whether the user still wishes to download or read the file. If the identity is not confirmed, the requestor may be instructed to try again. After a specified number of failed attempts, the file administrator 1700Z (if there is one) will be informed of the failed attempts, and the account locked. The dialog box may inform the user of the problem asking them to contact the file administrator or alternatively, if hacking is suspected, the box may go blank or even throw the user out of the SDNP application altogether.

In document request administration operation 1764, the SDNP signaling server 1715 informs the file storage administrator 1700Z about the file access request and the nature of the request (administration). This administrative step may (i) be skipped altogether, (ii) log the file access request in the file storage administrator's account, (iii) send a message to the file storage administrator immediately informing them of the attempted file access, or (iv) require the file storage administrator's approval through dialog box 1769 before the client requesting the file is granted access.

After these authentication, authorization, and administration (AAA) steps, upon approval, the client makes a request to access the file using the steps illustrated in the flow chart shown in FIG. 96B, shown here used for illustrative purposes as a read request. These steps involve the following:

In read request operation 1770, the requesting client 1700A sends a file read request to the SDNP signaling server 1715.

In storage server name request operation 1771, the SDNP signaling server 1715 sends a file storage server name request to the SDNP name server 1714 requesting the current SDNP addresses of the related file storage servers, e.g. file storage server 1700M. In accordance with the SDNP method, the SDNP address for SDNP clients (including file servers) changes at least once daily to prevent long-term client traceability.

In storage name delivery operation 1772, the SDNP name server 1714 delivers the requested file names "FS addresses" to the SDNP signaling server 1715 whereby the SDNP signaling server maps out the file recall routing.

In routing instruction operation 1773, the SDNP signaling server sends file routing instructions to the client 1700A, to nodes in the SDNP cloud such as server 1700U, and to file storage servers with zone specific security credentials such as file storage server 1700M with zone U9 security credentials including state or time 920, numeric seed 923, decryption key 1030, and optional encryption key 1022 (used in symmetric key encrypted communication).

In local file recovery operation 1774, utilizing applicable security credentials including state or time information specific to the file's creation, the DMZ server in every storage side Last Mile decodes and recovers the parsed file and arranges the data into one or more data packets in preparation for transport.

In file delivery operation 1775, each parsed file is delivered to the requesting client using independent delivery across the SDNP network in accordance with the SDNP signaling server's routing instructions, e.g. where file storage server 1700M sends it file to client 1700A The incoming parsed data files are further decoded in accordance with the client zone security credentials and the parsed file are merged to recreate the original unparsed file ready for viewing or transfer.

The steps are represented in the following sequence of illustrations. In FIG. 97A client device at address "IP $C_{1,1}$" makes a file read request to signaling server 1715 at address "IP S" using data packet 1810A, which includes C&C payload 1811A specifying TCP transport, file related header information, and two or more FS links. The FS links describe the locations of the stored file fragments anonymously using tags or pseudo addresses that must be converted into SDNP addresses or IP addresses for routing. The signaling server 1715, however, does not know the current SDNP addresses for these named user IDs and must request the current information from SDNP name server 1714. In FIG. 97B signaling server 1715 sends data packet 1810B to name server 1714 requesting the IP or SDNP addresses of the file storage server nodes $F_{7,1}$, $F_{9,4}$ and $F_{9,1}$. In FIG. 97C name server 1714 sends signaling server 1715 data packet 1810C containing the IP or SDNP addresses of the file storage server nodes $F_{7,1}$, $F_{9,4}$ and $F_{9,1}$. The signaling server 1715 then calculates Last Mile and meshed cloud delivery of the parsed files to the file storage servers.

In FIG. 97D, signaling server 1715 sends C&C data packets to the Last Mile nodes located on the storage side, i.e. to zones U7 and U9. As shown, data packet 1810G is forwarded from signaling server 1715 at address S to file storage server 1700H at address "IP $F_{7,1}$" carrying a C&C payload comprising "File 1 Read Instruction" 1811G. This packet instructs the file storage server to send the file with ID tag 1 from its address "IP $F_{7,1}$" to SDNP gateway at address "IP $M_{0,4}$" using U7 security credentials. Concurrently, data packet 1810F is sent to SDNP gateway $M_{0,4}$, the packet being routed from address "IP S" to "IP $M_{0,4}$" containing C&C payload 1811F communicating that a data packet with tag 1 should be anticipated by gateway node $M_{0,4}$ and when received forwarded onward in the SDNP cloud using Z1 security credentials, for example to address SDNP $M_{0,31}$.

A second data packet 18101 is sent from SDNP signaling server 1715 at address "IP S" to file storage server 1700M at address "IP $F_{9,1}$" containing a C&C payload 18111 containing a "File 3 Read Instruction". This instruction commands file storage server 1700M to send a file with ID tag 3 to SDNP gateway ate address IP $M_{0,8}$ using zone U9 security credentials. Other C&C packets (not shown) are similarly sent to the other file storage servers and gateways such as nodes $F_{9,4}$ and $M_{0,8}$ as well as the nodes in the SDNP cloud.

In FIG. 97E, signaling server 1715 sends data packet 1810D to client device 1700A, the packet being routed from address "IP S" to "IP $C_{1,1}$" through router 1702G. Data packet 1810D contains C&C payload 1811D informing the client to expect multiple incoming data packets with tag 1, tag 2 etc. from SDNP gateway 1701U at address "IP $M_{0,0}$" using zone U1 security credentials. Concurrently, signaling server 1715 also sends data packet 1810E to SDNP gateway 1701U, the packet being routed from address "IP S" to "IP $M_{0,0}$". This packet includes C&C payload 1811E for Last Mile routing in zone U1 applicable for incoming data packets identified as tag 1, tag 2 and tag 3 packets transported from within the SDNP cloud.

Once the command and control data packets are distributed to the network, the file transfer can ensue. The first step in the transfer is shown in FIG. 98, where data packet 1741R comprising FS Link 3 provides information to SDNP decode operation 1751R including exemplary state 920, numeric seed 929, decryption key 1030, and encryption key 1022. On behalf of SDNP decode operation 1751R this information is processed by DMZ server 1752 to execute function involving shared secrets such as packet decryption 1032R, mixing 1061R, de-junking 1053R, and unscrambling 928R, all performed at state 920, the state when the parsed file was last encoded. Note that encryption key 1022 is not specifically needed to decode the file, but may be used in symmetric key encryption for transporting the parsed file back to the client and file owner.

File routing and data transport is shown in FIG. 99 including TCP data packet 1720A carrying file 1 from address "IP $F_{7,1}$" to "IP $M_{0,4}$" using U7 security credentials, TCP data packet 1720B carrying file 2 from address "IP $F_{9,4}$" to "IP $M_{0,8}$" using U9 security credentials, and TCP data packet 1720C carrying file 3 from address "IP $F_{9,1}$" to "IP $M_{0,8}$" using U9 security credentials. After transport through the SDNP cloud (not shown), the series of data packets 1720X are delivered from the SDNP gateway at address "IP $M_{0,0}$" to client address "IP $C_{1,1}$".

In the read operation, the data is loaded into the SDNP app in its "read only" form. As long as the file remains sandboxed within a SDNP application, the file is protected by the features of the SDNP application and network and does not rely on the device's operating system's login procedures and weak security provisions. The need for read only access to private documents is pervasive in business. Files generated by a corporation's finance, legal, manufacturing, engineering, and quality departments illustrate examples of material that frequently represent read-only content. In many cases these company private files must be forwarded, i.e. distributed electronically, to corporate executives for review prior to their release.

Accidental or premature disclosure of the communicated information can be devastating, carrying severe economic and even legal consequences for a company and personal liability for its officers. For example, a public company's unreleased financial report is strictly confidential until it is published. In the United States, regulation FD or "fair disclosure" means the information must be made publically available to everyone at the same time without preference. If any outside party gains access to that information prior to its public release, it is a violation of regulation FD. If a court determines that the regulation FD violation occurred because the company was negligent in its duty to maintain and insure the document's confidentiality, then the company may penalized for its infraction and its officers may be held personally liable, even if no insider trading resulted from the selective disclosure.

Within the SDNP app, a retrieved file is compartmentalized (sandboxed) to prevent transfer of the data from one account identity to another, e.g. files may not be swapped between business and personal accounts. Depending on the reader's authorization privileges, a user may or may not be allowed to download the retrieved file out of the SDNP application and into un-encoded storage in device memory. Downloading the file outside a SDNP enabled application compromises the security of the file and the data it contains. For data residing within a SDNP application, access is controlled, a user's actions are limited, and both the device and the SDNP network must verify the user's identity. Such a multi-tiered multi-factor authentication is far more difficult to overcome than defeating the simple 4-number pin needed to open a phone. In contrast, once a file is downloaded into a computer, tablet, or cell phone, it is nearly impossible to prevent unauthorized access, to determine who has access, or who has made a copy of the file.

So using SDNP communication, a file owner can lock, i.e. compartmentalize, sensitive documents and files so that others may read them but not download them into their phone. Additional steps can be used to prevent screen shots or photographs of the LCD display screen. In other cases where security or privacy are not required, transfer of retrieved files from the SDNP app into the phone's memory is enabled and available for use without restriction.

In an edit operation, an editable form of the file is downloaded into the device and passed into an application program needed to edit the file. To execute a file request and data exchange, there is no fundamental difference in the SDNP network operation between a file read request and a file edit request other than in the operation of the client's SDNP application—from the perspective of the SDNP network's transfer of data, the operations are functionally equivalent. The differences between the read and edit operations therefore can be considered to reside primarily in the execution of Layer 5 through Layer 7 comprising application specific files.

To edit the retrieved file, the application may be (i) an device embedded application (such as Simpletext) native to the device's operating system but operating outside of the SDNP application, (ii) a third party application running atop the device's operating system but outside of the SDNP application, e.g. Microsoft Word, Adobe Acrobat, etc., or (iii) a secure application running inside the SDNP application and not directly accessible by the device or its operating system. For example, a corporate press release may be edited within the SDNP application sandbox but cannot be downloaded into the phone's memory. As an added provision for maintaining business security, any file owned by a business, i.e. sandboxed in the SDNP business account compartment, cannot be transferred into the user's personal SDNP account even though both personal and business profiles are running within the same SDNP application.

After editing, storage of the edited file back onto the SDNP's file storage servers does not overwrite the existing unless the file owner specifically requests to do so. Instead the second version is stored in addition to the first and elimination of the earlier version requires the user to execute an erase operation. Because HyperSecure file storage invariably requires identity verification, the process of saving the edited file may include unique system features not available from file storage lacking dedicated HyperSecure network communication. Once such unique feature is a signature verification function used to sign and date (or in Asia to stamp/chop and date) the file. The signature function may include a registered receipt sent to the document holder and to the original document creator.

For HyperSecure data storage made in accordance with this invention, an erase operation involves overwriting all the existing parsed files with random numbers and optionally doing it again one hour later to further obscure small but potentially detectable analog variations in the electric charge or magnetic field of the stored bit. The file record is also overwritten to confound the data drive's file record. After erasing the data and file record, the client's data link is destroyed in the client device using the SDNP system's self-destructing message feature, and any remnant of the FS link is purged from the SDNP system. If however, a file system administrator has been tracking activity of their user base with third party software, the administrator may still retain metadata on the file's history including its owner, its creation date, who accessed the file and when, and when it was erased, even though they have no access to the file itself.

The SDNP network and HyperSecure Last Mile functions may also support different features and operating procedures for corporate accounts than for personal account profiles. As described previously, the erase operation on a personal account involves rewriting junk data into the file, purging the drive's index record of the file's existence, and destroying all FS links to the file's previous fragmented storage locations using self-destructing messages. For corporate accounts, however, a file storage administrator may require their prior approval to permanently destroy a file, e.g. using an approval process similar to dialog box 1769 in FIG. 96A but sent to the administrator rather than the file owner.

If the company's file administrator chooses not to allow the files deletion, several scenarios may occur including (i) the file owner is notified the file will not be deleted and the file read link is retained in their SDNP application or SDNP communicator message history, (ii) the file owner is notified the file will not be deleted, e.g. it will be preserved for "archive purposes", but their personal file read link will be removed from their SDNP application using the SDNP system's self destructing messages provision, meaning once the owner tries to delete the file only the file storage administrator can recall it, or (iii) the file owner's personal file read link will be removed from their SDNP application using the SDNP system's self destructing messages provision but they are not informed the file has been retained by the company.

Because of Last Mile HyperSecurity intrinsic to the operation of the disclosed anonymous fragmented distributed file storage system, without a "file storage read link" the stored files are un-retrievable, even by the file storage administrator. For the administrator to gain access to a file, they must be the corresponding file storage read link whenever a file is saved or edited. While this level of monitoring is possible for a corporate account, the copious amounts of data generated in tracking every change to every file will invariably will overwhelm any file management system. An intelligent filter possible with the disclosed SDNP system as is disclosed is to track only attempted file erasures. In this approach, the administrator does not monitor the creation of files but tracks only attempts to delete them. Whenever a file owner attempts to delete a file, then and only then, is the corresponding file storage read link transferred to the administrator's database or console for approval or archiving.

The database size can further be minimized by identifying specific employees and contractors to which monitoring is required. For example, if a company becomes involved in a financial audit or a patent lawsuit, normally the parties are informed not to erase any relevant data or erase any files. Using file management features enabled by the disclosed SDNP file storage system, any file erasure attempts of staff related to the investigation can be tracked by logging the attempted erasure, and "at that time" sending a copy of the file storage link to the file storage administrator or to the independent investigator as the case may be. Such a method is beneficial because it limits the amount of data to be monitored and it naturally alerts management to suspicious activity suggesting an attempted cover-up of wrongdoing. To prevent the accidental or malicious loss of a file storage name link by destruction of the client and file owner's device itself, the use of redundant file storage links as disclosed previously is imperative. In corporate cases, the backup copy may be maintained on computer located within a secured office, or in a centralized company server.

In cases of extreme security, e.g. in cases of national security, erasing a file may comprise a multistep method including (i) overwriting the file with random data, (ii) copying all other files off of the storage drive onto some other storage device (iii) performing a bulk erase of the drive, (iv) reformatting the drive, (v) overwriting the drive's storage fields with random numbers, and optionally (vi) copying back the preserved files as required. Unlike a conventional data overwrite of a file a bulk erase process affects the read-write storage medium itself naturally randomizing its electrical, magnetic, or optical properties at the molecular level. Bulk erasing of a magnetic drive can utilize a large electromagnet, bulk erasing of flash may involve elevating the ICs to a high temperature and possibly subjecting them to ionizing radiation at elevated operated voltages. Magneto-optical drives can be bulk erased using high magnetic fields. Re-writable optical drives can be bulked erased using a bright scanning laser scanned transverse to the disk format tracks. In any event, bulk erasing represents the extreme case where the storage media after erasing is either completely devoid of data, even at risk of damaging the storage media so that is may never be used again.

Another important factor in a HyperSecure distributed file storage system is to maintain the integrity of the file data and the link access. To insure the link is not accidently lost, from time-to-time it is beneficial to reestablish, i.e. reconfirm, the file storage read link and reissue the security credentials. This process, referred to herein as a "refresh link" command can be initiated from the client manually or automatically, and may also be initiated from a file storage server after some predefined interval. For requests initiated from the client, the SDNP signaling server communicates a command and control packet to the corresponding servers. Once a link refresh is initiated as shown in FIG. 100, the files are read and decoded by SDNP decode operation 1751F at state 320X, the "old" state at time $t_1$ at which they were previously created using zone U9 security credentials. The file is then re-encoded by SDNP encode operation 1750D using new state 920Y at time t2 and saved to the storage drive. The refreshed storage link, e.g. FS link 3, is then sent over the SDNP network back to the file owner, client device 1700A. The resulting file comprises encoded data updated with zone U9 security credentials at time t2. The client's security credentials in zone U1 used to create and parse the file originally are not updated however. To read the file, the read operation must first decode the file using zone U9 security credentials at the state corresponding to time t2, and then, after transport to client node $C_{1,1}$, decode the file using zone Z1 security credentials associated with the time the file was first made.

As another provision for enhanced security, the redistribute file operation moves every parsed file for a selected file storage link to new or different file storage servers. The operation may send the parsed files to completely new servers, or alternatively the files may be redistributed among existing storage nodes. In each case, the security credentials are updated and a new file FS link issued and sent to the client or clients with access to the file. This operation is shown by example in FIG. 101 where the content of file storage SDNP node $F_{7,1}$ in zone U7 is decoded by SDNP decode operation 1751H using state 920X, the state at time $t_1$ when the file was created. The file is then transported over the SDNP network (not shown) to file storage SDNP node $F_{9,4}$ where it is encoded by SDNP encode operation 1750L using zone U9 security credential as state 920Y corresponding to time t2. The file is then stored and an updated FS link 2 is sent to the file owner and other clients with file access.

Concurrent to the aforementioned file transfer, the content of file storage SDNP node $F_{9,4}$ in zone U9 is decoded by SDNP decode operation 1751L using state 920X, the state at time $t_1$ when the file was created. The file is then transported over the SDNP network (not shown) to file storage SDNP node $F_{9,1}$ where it is encoded by SDNP encode operation 1750M using zone U9 security credential as state 920Y corresponding to time t2. The file is then stored and an updated FS link 3 is sent to the file owner and other clients with file access. In a similar manner, the content of file storage SDNP node $F_{9,1}$ in zone U9 is decoded by SDNP decode operation 1751M using state 920X, the state at time $t_1$ when the file was created. The file is then transported over the SDNP network (not shown) to file storage SDNP node $F_{7,1}$ where it is encoded by SDNP encode operation 1750H using zone U7 security credential as state 920Y corresponding to time t2. The file is then stored and an updated FS link 1 is sent to the file owner and other clients with file access. In this manner all three files are relocated and issued new security credentials and the clients with authorized access are issued new file storage read links based on updated FS links 1, 2, and 3.

Another necessary maintenance function performed by the HyperSecure file storage system is the operation used to check for files lacking any live links, i.e. "zombie files." The operation is similar to that of the refresh link operation except that the file storage server, rather than the client or file owner initiates it. In operation, each file storage server tracks the time since a file was last accessed. If the last operation on the file exceeds a specified interval, e.g. one month with no activity, the file storage server contacts the client or clients to confirm if the link is still active. The file storage server is able to contact the client using the same method employed to send the FS link to the client. At the time a file is stored, the file storage server retains a SDNP zip or pseudo-address of the client.

Should no activity occur during the specified interval, the file storage server then contacts the SDNP signaling server with a request to reconfirm that the link remains active. The SDNP signaling server then plans the delivery route of the FS link verification request for each participating file storage server. Each file storage server then sends its request to the client via the SDNP network. Every participating SDNP client node responds with a confirmation that the file link is still present in the device. If the file link is confirmed, at that time the client has the option to perform a link refresh. If, however, no device responds, i.e. no active file read link remains, then the file storage server informs the administrator that a file link has gone stale or is missing, and after some interval such as one to three months, the unclaimed zombie file is permanently and irrevocably erased.

Registered Communication—

Another feature of SDNP communication made in accordance with this invention is the network's ability to deliver or store "registered communications". Registered communication involves the HyperSecure delivery of communiqués or the HyperSecure storage of files as signed time-stamped messages including the ability to e-sign and e-chop the communication for purposes of establishing legal validity. Registered communication also includes the ability to send a "certified message" a handshaking method confirming receipt of a document or file using a signed or chopped time-stamped reply. All registered communication, while initiated by the SDNP application in a client device, is certified through Last Mile communication, i.e. communication across the Last Mile of the SDNP network. Any attempt by a client to fraudulently alter a stamp confirmation will result in a inconsistency between the message and the network record of the stamp confirmation, i.e. the return receipt.

Because of the use of "state" in SDNP communication, i.e. where time and other unique variables are employed to establish the message specific security credentials in communiqués and in file storage, time stamping is an intrinsic feature of SDNP communication. This point is exemplified in SDNP communicator application window 1800 shown in FIG. 102 where each text message sent and received has a corresponding set of time stamps 1801A and 1801B showing when the message was sent, when it was received, and when it was read. Time information comprising a global time reference established by the SDNP signaling server is delivered to the client over the Last Mile network. The SDNP client app then integrates the time stamp into information display.

In a registered communication, the communiqué generates an official stamp as part of the process. One example of a registered communication process is shown in FIG. 103 where a HyperSecure message is executed starting with the optional attach file step 1802 involving dialog box 1803 where the client sending the message or file, i.e. the sender, chooses whether to attach a file to the message and if so using a directory browser to find the file. The command dialog 1804 is next used to send the registered message in accordance with dialog box 1805 choosing whether to use regular or registered delivery. The message is then sent using HyperSecure communication made in accordance with this invention.

In "message accepted" step 1806, the receiving party completes a series of steps needed to confirm their identity to access the message and to send an authenticated receipt confirming their acceptance of the incoming message and file. This process starts with receipt authentication operation 1807 where the receiving client is asked to confirm their identity. Without authenticating their identity, the receiving party will not be able to access the message, the message will be destroyed and the sender will be notified of the failed authentication step. In this manner, the sender may be alerted to the possibility that the receiving party may have had their device stolen. Once the identity is confirmed, the receiving party is asked in receipt authorization operation 1808 whether they wish to accept the incoming message and attachment or reject it. If the message in rejected the sender is informed.

If the receiving party accepts the message by choosing yes, they must complete receipt administration step 1809 to sign for accepting the message, either by choosing an electronic signature (e-sig), and/or selecting a stamp/chop (e-chop). The sender can specify the options required. In some countries both a chop and a signature are required to be legally binding. A subsequent dialog box (not shown) directs the user to locate their signature or chop in the device's file directory. Alternatively, an audio/video recording may be used as confirmation. The recipient will be instructed what to read during the recording. Once the message is signed, then the message becomes visible to the recipient and the attached file becomes available for viewing and possibly for downloading depending on the sender's requirements.

Upon accepting the document, a signed time-stamped message receipt 1811 identifying the message recipient, the embedded text and attached filename received, the data and time the message was received, and a signature comprising either an e-sig, an e-chop, an audio recording, an audio-video recording, or some combination thereof is sent to the send in acknowledgment operation 1810. In archive receipt option 1812 the sender has the opportunity to save a copy of the signed time stamped message receipt 1811 to the system's HyperSecure file storage system, for which the sender will receive file read link 1813 needed to recall the message. Alternatively, message receipt 1811 may be available for download into the sender's device.

Issues with Encryption Based Security—

Governmental security agencies argue that in today's world of corporate fraud, IP theft, cybercrime, hacking, criminal gangs, drug cartels, Mafioso, Yakuza, jihadists, and terrorists, any communication system providing callers with untraceable anonymous communication, i.e. systems using encryption to secure data and hide the identity of the caller (metaphorically, a payphone), represents a reckless and irresponsible business practice for the network operator, application developer, and device manufacturer.

Unfortunately, it is true that communication relying on encryption to achieve security protects criminals and law-abiding citizens alike. As mentioned previously, this subject has become the focus of countless news stories about the criminal activity of ISIS terrorists and their attacks on Paris and Belgium using a phone application program called Telegram. This app facilitates secure communication using end-to-end encryption, also known as end-user based encryption. Because the decryption keys are held only by the two communicating parties and not by the intervening network or its operator, end-to-end encryption is especially troublesome for security agencies. Security agencies rallying against Telegram argue that large-key end-to-end encryption represents a national and even a global security risk enabling terrorists to operate secretly using open communications. Arguments favoring Telegram support personal privacy at any cost. The privacy debate arose again in regards to the Dec. 2, 2015 shooting in San Bernardino, Calif., killing 14 and injuring 22 when a federal judge ruled in favor of the FBI ordering Apple to assist in "opening" a locked phone allegedly owned by the shooter. In a Feb. 17, 2016, Washington Post article entitled "Apple Vows to Resist FBI Demand to crack iPhone Linked to San Bernardino Attacks". Apple and their CEO cited several reasons for their refusal to comply with the court order. The article is available online at (https://www.washingtonpost.com/world/national-security/us-wants-apple-to-help-unlock-iphone-used-by-san-bernardino-shooter/2016/02/16/69b903ee-d4d9-11e5-9823-02b905009f99_story.html), Most notably, Apple steadfastly maintained that it was unable to unlock its newer iPhones for law enforcement, even when officers obtain a warrant, because they are engineered in such a way that Apple does not hold the decryption key—essentially raising the specter of yet another example of the challenge of end-to-end encryption. Apple contended that only the phone's user—or someone who knew the password would be able to unlock the phone. The government rebutted that it does not need them to unlock the encryption feature, just disable the features that wipes the phone's memory after ten unsuccessful login attempts. In an online statement, Apple's CEO Tim Cook countered such a step would dangerously weaken iPhone security. "Once created," he wrote, "the technique could be used over and over again, on any number of devices. In the physical world, it would be the equivalent of a master key, capable of opening hundreds of millions of locks—from restaurants and banks to stores and homes. No reasonable person would find that acceptable." He continued, "Opposing this order is not something we take lightly. We feel we must speak up in the face of what we see as an overreach by the U.S. government."

The last point advanced by Apple, that the US justice department was overreaching its authority, is a legal argument not a technical position, one echoing the sentiments of constitutionalists and privacy advocates that the state doesn't have the legal right to monitor communications or invade a person's privacy without probable cause. While the particular San Bernardino case clearly meets the bar of probable cause, the idea of creating a universal backdoor that can open any communication device it is argued, invites abuse by authorities. In their Feb. 23, 2016 article, the publication The Atlantic agreed "Apple Is Right: The FBI Wants to Break Into Lots of Phones". The same day The Guardian reported "FBI seeking access to a dozen iPhones, Apple claims".

Oddly, the same pro-privacy position was taken by the United States Congress. On March $1^{st}$ in a follow up story by the Guardian entitled "Congress tells FBI that forcing Apple to unlock iPhones is 'a fool's errand'", US legislators accused the US Justice Department of overreaching and undermining privacy. "The path to hell starts at the backdoor," Microsoft's general counsel, Brad Smith, told the RSA Conference in San Francisco. Smith challenged the computer security industry represented at the gathering to "stand up with Apple in this important case".

During the firestorm, numerous security experts including NSA whistleblower Edward Snowden promulgated the position that unlocking the phone is not as difficult as the FBI purported. Talking via video link from Moscow to the Common Cause Blueprint for a Great Democracy conference (March 8-9), Snowden said: "The FBI says Apple has the 'exclusive technical means' to unlock the phone. Respectfully, that's bullshit." Before the case could even come to court, the FBI reported they had already found a way to break into the locked iPhone. In a Mar. 29, 2016, article Fortune Magazine reported "FBI Might Not Tell Apple How It Cracked the iPhone."

The legal and geopolitical fallout of the Apple-FBI case is far reaching. Following the FBI's lead, other nations are expected to insist on backdoors to all communication devices connected to their network—including phones carried by US citizens traveling abroad. Moreover, now that the iPhone has been successfully hacked, criminals will invariably discover or re-invent these methods to engage in new forms of cybercrime and identity theft. Not to be outsmarted by criminals, governments may seek to employ the same methods for expanding surveillance and espionage, and even various departments within the same government may use these methods to spy on the activities of one another. In related stories, various governments are considering limiting the level of encryption used in end-to-end communication.

Collectively, these events clearly reinforce the realization that no obvious combination of existing security methods presently available in the public domain insure both security and privacy, at least not without also aiding criminals and terrorists. The problem stems from the exclusive reliance of encryption to achieve both network security and end-to-end security and its associated caller privacy. Increasing the security of text, voice, or files by increasing the bit size of an encryption key makes any communiqué more secure and difficult to crack. The enhanced security protects business and law-abiding citizens in maintaining security and privacy, and in combatting identity theft. Unfortunately, the same enhanced security indiscriminately protects criminals and terrorists from detection, allowing them to operate with impunity and invisibility.

This point is illustrated in FIG. 104A where caller 1825A communicates to callee 1825Q over an unsecured network such as Internet 1821 suffering from many avenues of cyber-assaults, i.e. the network has a large "attack surface" of vulnerability. To reduce the attack surface encryption 1026 and decryption 1032 are employed to form an encrypted pipe or tunnel 1820 having a smaller attack surface than network 1821. The problem is determining how big of an encryption key should be used. As shown in table 1824, the larger the encryption key, the more combinations exist and the harder it is to crack the encryption. The encryption is used for two purposes (i) to provide network security for preventing man-in-the middle attacks, and (ii) to insure caller privacy through end to-end security. As shown by line 1823, any improvement in network security results in an equivalent increase in end-to-end security. While high network security is beneficial to prevent malicious outsider attacks, excessive end-to-end encryption is a twin-edged sword. If a large key size, e.g. AES256 or AES512, is employed the system delivers "top secret" network performance and naturally provides the same grade security for the callers. In the event that the caller is a suspected criminal or terrorist, however, neither the network operator nor the government can detect or monitor the caller's activities.

The key size tradeoff is complex. If the encryption key is too small, criminals can attack the network and its users as targets. If the encryption key is too large, criminals can use the network to hide their illegal activities and thwart investigator's efforts to detect ongoing fraud and malfeasance. In corporate environments, the company's security policy may reject end-to-end encryption altogether because it prevents monitoring of employee activities or complying with corporate investigations and IP lawsuits.

Even determining what size key is breakable and what is secure is challenging, changing with evolution of technology. Referring again to table 1824, the number of possible combinations that must be analyzed in a brute force attack is calculated as a function of a cipher's key size. While a 16-bit key only has 65 k combinations, a 56-bit key has $10^{16}$ combinations, and a 128-bit key has more than $10^{38}$ combinations. A 256-bit key has combinations 39 orders-of-magnitude larger than the 128-bit key. Ignoring the use of pattern recognition, a brute force attack tries every combination to it cracks a code. In an EETimes article entitled "How secure is AES against brute force attacks?" (http://www.eetimes.com/document.asp?doc_id=1279619), the authors estimate the time required for a circa 2012 supercomputer capable of 10.5 petaflops to perform a brute force attack. A petaflop is a thousand trillion or $10^{15}$ floating point operations per second, or one thousand teraflops. As such, a 56-bit key requires only 399 seconds, a 128-bit key requires $1.02\times10^{18}$ years, a 192-bit key requires $1.872\times10^{37}$ years, and a 256-bit key requires $3.31\times10^{56}$ years.

The time required to mount a brute force attack also is changing. Since the article was written, the world's fastest computer has already tripled in speed. Reported in the BBC news article Jul. 30, 2015, entitled "Supercomputers: Obama Orders World's Fastest Computer," investigators report the targeted speed of the next gen supercomputer is twenty times faster than the record holder, i.e. a machine capable of one exoflop, or a billion-billion floating point operations per second. This means that the time needed to crack encryption continues to erode with every passing year. Another newer approach to cracking encryption is to employ massively parallel processing, the same method as Bitcoin mining. Instead of having one super computer, using thousands or millions of computers in parallel allows an attack to proceed concurrently reducing the time proportionately. Today's fastest microprocessors already break 1.1 teraflops so thirty thousand best-in-class microprocessors operating conjunctively equal the world's fastest computer at the present time. Only one million microprocessors are needed to realize an exoflop computer. Dedicated ASICs can further erode the security while quantum computing promises to change compute power by many orders of magnitude.

In conclusion, large key end-to-end encryption is not a good solution to achieve privacy and security in communications. The alternative approach enabled by the SDNP network and HyperSecure Last Mile communication as disclosed herein separates end-to-end encryption from network security. As shown in FIG. 104B, communication between SDNP clients 1700A and 1700Q, representing caller and callee respectively, is carried by SDNP network 1831. The network's small attack surface is realized by anonymous multi-route and meshed data transport using dynamic scrambling, fragmentation, junk insertions, and hop-by-hop encryption, routed using tri-channel communication for control. Although Last Mile communication and every hop within the SDNP cloud involves dynamically changing security credentials, the process is represented in simplified form by SDNP encode operation 1832 and SDNP decode operation 1833.

As described by table 1834 and illustrated by line segment 1830, these methods in various combinations achieve security equivalent to secret or top-secret encryption standards without exclusively relying on encryption. Since line segment 1830 is flat, it means there is no interdependence between end-to-end encryption shown on the y-axis, and network security shown on the x-axis. Instead, the network security level can be adjusted from case A to case D by applying a variety of SDNP security methods. These security operations are performed by SDNP software in a manner where the caller and callee are unaware of the security credentials used to transport the data packets across SDNP network 1831 and its various security zones. In particular, the conversing clients do not knowingly participate in any encryption Last Mile network's key exchange. As a distributed network, the use of encryption within the SDNP cloud is unrelated to Last Mile security, and no master keys exist for the system. As such, SDNP network 1831 security does not depend on end-to-end encryption performed by encryption 1026 and decryption 1032 to produce encrypted pipe or tunnel 1820.

Encryption used by SDNP network 1831 need not utilize the same size keys as end-to-end encrypted tunnel 1820. As shown in the graph, commercial and corporate security applications of end-to end encryption can employ **128*b* key encryption (such as AES128) illustrated by dotted line 1835** even if the single-hop dynamic encryption within the SDNP cloud employs AES256. In fact, end-to-end encryption can utilize RSA or other cyphers without compromising network security. The SDNP network 1831 is still protected by AES encryption compliant with FIPS 140-2 military grade security even if the end-to-end encryption tunnel 1820 is not. As described, the SDNP network 1831 protects against all outside cyber-assaults and man-in-the-middle attacks. The end-to-end encrypted tunnel 1820 protects callers from intervention from network operator and other “inside” hack jobs. In this regard, end-to-end encryption in this disclosure is primarily used for insuring caller privacy, not to achieve data packet transport security.

Because the end-to-end encryption can be increased or decreased in strength or even eliminated without risking the network’s security, the method is adaptable for a wide range of applications. For example, if the 128b key encryption illustrated by dotted line 1835 is too rigorous for small companies or personal use the number of bits can be decreased without giving up personal privacy. In military or government applications the encryption key length can be increased to 192b, 256b or even 512b as required. In this regard, the disclosed SDNP system overcomes the deficiencies with present day encryption based communication, offering features unavailable by any alternative application, device, or network.

Security Administration—

Another key feature of SDNP communication is its unique approach to security administration. Security administration is required in numerous situations including:

- Monitoring of employee communications performed in accordance with HR policies or employee investigations,
- Monitoring and recording of employee communications in support of financial audits, forensic accounting, or fiscal reporting,
- Documenting intercompany communications as part of a merger and acquisition transaction,
- Documenting intercompany communication as part of IP or corporate litigation,
- Complying with demands for communiqués and documents in accordance with subpoenas and criminal investigations,
- Complying with legal orders for account information, call and message monitoring, and file access in matters of national security.

With proper authorization, a SDNP network administrator can facilitate access of SDNP network traffic to a designated “SDNP security agent” for the purpose of communication monitoring and data surveillance. The process by which a SDNP security agent is established and enabled involves a multi-tiered approval and authentication process necessarily performed in advance of the monitoring activity. To prevent abuse, no one individual is capable of independently commencing monitoring, not even a SDNP network administrator. Because of the dynamic nature of SDNP communication as a distributed network lacking central control, having no master network keys, and employing dynamic SDNP encoding and decoding executed using zone-specific security credentials operating in offline in DMZ servers, there is no mechanism to recover data or recall conversations ex post facto. Data resides within the SDNP network for only short durations, typically less than 100 milliseconds. As a distributed system, by design the SDNP network intrinsically lacks central control, without which even metadata of prior calls is unavailable. As such, the SDNP network only supports a priori security monitoring, meaning monitoring by a designated SDNP security agent must be established in advance of intercepting communiqués.

Moreover, because of the dynamic nature of fragmented meshed communication within the SDNP cloud, no SDNP node within the cloud, i.e. beyond the SDNP gateway, carries the data packets of a complete conversation. Most nodes carry no more than 5% of the data and typically only for 10 ms at a time before the routing changes. In accordance with SDNP communication, dynamic routing constantly redirects communication through different media servers. As such, cloud access is not useful for recovery or monitoring of communiqués. Although the SDNP cloud’s data packets can be captured, they comprise a useless jumble of unrelated sounds, data, conversations, and junk data. Instead, monitoring by a designated SDNP security agent can only productively occur in the Last Mile where the complete set of related data packets necessarily traverse, either within the client device or preferably in the SDNP gateway.

An example of data packet routing in security monitoring is shown schematically in FIG. 105A where SDNP security agent 1840 monitors a conversation between SDNP client device 1600A and SDNP client device 1600H. While the conversation occurs using data packets sent from SDNP client device 1600A through Last Mile router 1602G to SDNP gateway 1701U and through the SDNP cloud, data packets sent from client device 1600A are closed by SDNP gateway 1700U and securely routed to designated SDNP security agent 1840. Specifically, during UDP transport, Last Mile data packet 1630A carries SDNP data 1 from the SDNP client at address “IP $C_{1,1}$” to SDNP gateway at address “IP $M_{0,0}$” emerging from SDNP gateway at address “IP $M_{0,4}$” and being delivered over zone U7 Last Mile to SDNP client address “IP $C_{7,1}$”. During authorized monitoring, cloned SDNP data 1 is securely delivered to SDNP security agent 1840 at SDNP address “IP SA”. The cloned monitoring data packet 1841 operates in the same manner as a SDNP group-call except that the duplicate data clones are invisible to the callers. The callers are therefore unaware they are being monitored.

Security monitoring works for incoming calls as well. In FIG. 105B, SDNP data 7 is sent from client device 1600H with address “IP $C_{7,1}$” to SDNP gateway at address “IP $M_{0,4}$”. After SDNP cloud transport, the data is delivered from SDNP gateway at address “IP $M_{0,0}$” to two destinations. The first destination, client 1600A at address “IP $C_{1,1}$”, receives reply data packet 1640A containing SDNP data 7. The second destination, SDNP security agent 1840 receives an identical payload containing cloned data “SDNP data 7” via data packet 1842. Delivery of data packet 1842 is invisible to the callers so they are unaware they are being monitored.

The same method is applicable for monitoring of fragmented distributed file storage. Rather than capturing the fragmented data files, however, the security agent need only receive a copy of related FS links. Such as example is shown in FIG. 106 where SDNP file storage device 1700H sends data packet 1740H containing FS Link 1 from address “IP $F_{1,1}$” to gateway address “IP $M_{0,4}$” which after being routed through the SDNP cloud is forwarded to client 1600A by data packet 1740A. The cloned payload “FS link 1” is also delivered to SDNP security agent 1840 at address “IP SA” by data packet 1843 sent from gateway address “IP $M_{0,0}$”. As in the case of real time communication, the file owner, client 1600A, is unaware of being monitored by the SDNP security agent.

The same monitoring mechanism works for multi-route Last Mile communication where data packets enter and leave the SDNP cloud through more than one SDNP gateway. This case is illustrated in FIG. 107 where Last Mile communication from client device 1600A comprises split data packets 1630A containing payload SDNP data 1 and data packet 1630B carrying payload SDNP data 2 entering the cloud through SDNP gateways 1701U and 1701V respectively. After SDNP cloud routing the data packets recombine and are shown emerging from the cloud as a single data packet 1630L with a payload containing the combined data SDNP data 3. In operation, SDNP gateways with addresses "IP $M_{0,0}$" and "IP $M_{0,11}$" are instructed by the signaling server to create clones of incoming SDNP data 1 and SDNP data 2 from client node $C_{1,1}$ and to direct them to SDNP security agent 1840 at address "IP SA". The cloned data is sent in data packets 1841A and 1841B using the same HyperSecure methods used for all SDNP data transport except that the security agent operates in its own unique security zone, i.e. zone SA using credentials unavailable to any other device. As such, there is no record or proof that a designated security agent ever monitored a particular conversation.

Because SDNP monitoring activities are clandestine and essentially equivalent to an undetectable invisible conference call, it is critical to the SDNP system employs independent checks to approve and confirm the use of network monitoring and to designate and confirm the SDNP security agent authorized to execute the monitoring. The SDNP security agent can be any SDNP client except for the network administrator. As a safeguard against system corruption, any SDNP network operator or SDNP administrator is not allowed to act as a SDNP security agent, i.e. those administrating the network cannot subvert its capabilities for their own use even should they be threatened or blackmailed.

The SDNP security agent may constitute an individual, a government agent, a government designated representative, or a law officer. The particular requisite qualifications of a designated security agent vary by company or country in accordance with applicable local law. A SDNP security agent's monitoring hardware may comprise a communication device or a computer server with recording, data storage, and sophisticated decryption capability. All communication sent from the SDNP network to the designated SDNP security agent is transported with the same HyperSecure communication as the client's communiqués themselves, and therefore security monitoring does not compromise the confidentiality of the call or the caller's privacy except for the monitoring performed by the authorized security agent.

Moreover, the implementation of monitoring and the allowed capabilities of an authorized SDNP agent does not compromise network integrity and security in a means whatsoever. No operating details or DMZ shared secrets are revealed to the network operator or to any security agents—operation of the SDNP system occurs automatically and autonomously without the intervention or involvement of human operators while the DMZ servers provide security using zone specific credentials not available through online access. Security monitoring, therefore, does not degrade system security or render the SDNP network vulnerable to cyber-attacks.

Data payloads are delivered to SDNP security agent in the same form they are created by the caller. As part of delivery to the SDNP security agent, all network SDNP encoding is decoded so that no network security provisions are present in the delivered data packets. If, however, the client employs end-to-end encryption, the SDNP security agent will have to break the client's end-to-end encryption unless the client agrees in advance to share end-to-end decryption keys with the network or to use and independent key server utility accessible by the SDNP network. To reiterate, such end-to-end encryption and decryption keys are primarily included in the SDNP method for privacy purposes and are unrelated to any encryption used in the SDNP dynamic encoding function.

To minimize the risk of monitoring abuse, SDNP administration used to establish and authorize a designated SDNP security agent to monitor a client or group of clients is a multistep process. While the SDNP system includes provisions for performing monitoring, the legal application of this feature is the responsibility of the network operator, the network administrator, and authorizing agency or agents. Together these parties are personally responsible to insure monitoring is performed legally and in compliance with the laws of the country in which the monitoring is performed.

The need for monitoring could arise from any number of situations. In a company, a whistleblower complaint or a claim of sexual harassment could trigger a HR investigation or precipitate forensic accounting. A court subpoena associated with a litigation matter (potentially including a gag order) may also require monitoring. In corporate matters, communication using the company SDNP network is generally limited to company communiqués and does not cover private and personal communications. In most countries, private communication is protected unless criminal intent is suspected. In cases of national security or law enforcement actions, both public and private SDNP accounts of a caller may be subject to monitoring. In such cases, the corporate SDNP network operator for the company would implement the monitoring process for company communications, while independent telecommunication SDNP network operator would be the only provider in a position to execute monitoring of the caller's private communications. In some countries, the government must present a judge-approved subpoena to commence monitoring of private citizens while in other countries a government may assert the authority to monitor any and all private communication on a de facto basis. In cases of international communication, it is more difficult to determine which laws are applicable and what the network's position on enabling call monitoring should be.

One example of the AAA process used to enable monitoring is illustrated in FIG. 108. The process to approve the monitoring of a client involves the network administrator 1850 used to set up the monitoring operation, the security agent 1840 in charge of monitoring the client, and three authorizing agents 1851A 1851B, and 1851C used to approve the monitoring process, preferably operating autonomously and independently from the network operator or network administration. The process starts with the network administrator 1850 seeking monitor request 1862 in response to an investigation or court order. Using a command dialog box 1862, the administrator identifies the phone number of the individual for which monitoring is being requested. If the request is to monitor a group of people, they can be entered one by one into the system of a file listing the all the parties and their associated phone numbers can be uploaded into the system.

In authorization step 1863, the network administrator 1850 identifies a candidate security agent 1840 recommended for performing the monitoring function using exemplary dialog box 1864. In corporate cases, the individual may be an HR director, legal counsel, a member of the audit committee, and independent accounting firm representative, or an independent investigator. In legal cases the security agent may be a law officer, district attorney, FBI agent or other duly appointed investigating committee member, e.g. in cases of government malfeasance such as a special prosecution committee investigations panel. The system then checks with SDNP name server 1714 to insure that the security agent has an SDNP account and that they comply with the rules specified by the company or network operator. In some cases involving national security a follow-on investigation of the proposed security agents credentials and criminal record may be performed before they are approved.

Once the security agent is approved, in authorization step 1865 the request for monitoring is forwarded to authorizing agents 1851A, 1851B, and 1851C, who review the information presented in dialog box 1866 including the name of description of the subject, the name or position of the security agent tasked to perform the monitoring, the expected duration of the monitoring probe, and the reason for the probe. Each authorizing agent can accept or reject the request. The rules of the network operator or company then determine if the monitoring operation is approved based on unanimous approval of the authorizing agents or by simple majority. The identity of the authorizing agents may be known, as in corporate cases, or in criminal cases their identities may remain anonymous protected by the anonymous communication features of the SDNP network.

Once the monitoring is approved, in administration step 1867, the database 1868 of clients is updated in name server 1714 to tag the SDNP client to be monitored and to identify the SDNP client authorized as the security agent, in this example the shaded row of data. The SDNP addresses in this database are updated together on a daily basis when the SDNP addresses are shuffled to maintain the same relationship between the client being monitored and the designated security agent. Once the date of the probe expires, the monitoring link is automatically severed. In administrative step 1869, the SDNP security agent 1840 is sent a link enabling them to receive all ongoing communication of the identified client being monitored. Their use of this information is not a matter of SDNP network operation. The unauthorized release of a person's private information by the security agent may constitute a crime for which the security agent is wholly responsible.

Through this inventive monitoring method, the SDNP network is thereby capable of supporting criminal investigations of malfeasance and potential terrorist activities while maintaining a secure communication medium for law-abiding citizens. The SDNP network is able to securely deliver to authorities private client communication in compliance with legal court orders without risking the privacy of innocent civilians or compromising the security of the SDNP global communication network. Since no backdoor or master key was employed in honoring the court order future communication over the SDNP network remains anonymous and HyperSecure. In this manner the secure dynamic communication network and protocol and its HyperSecure Last Mile communication is able to offer security features not available by any other means and completely avoids the risk of aiding criminality and terrorism created by the excessive reliance on end-to-end encryption employed by OTTs and virtually every messenger and communicator app.

Overcoming SS7 Vulnerabilities—

If the Apple-FBI controversy was not enough trouble for the communications and security industries, a 60 Minutes episode (http://www.cbsnews.com/news/60-minutes-hacking-your-phone/) revealed severe security vulnerability with Signaling System 7 or SS7, the signal control channel for conventional wireless telephony. As clearly demonstrated in the show, the SS7 vulnerability potentially exposes every smartphone and connected device to packet sniffing and cyber-attacks, allowing eavesdropping of wireless conversations and viewing of SMS text, attached files, and pictures simply by knowing a person's phone number.

Signaling System 7 is a telephony signaling protocol developed in 1975 used in all forms of digital telephony globally. It comprises a message transfer part or "MTP" operating on PHY layer 1, data link layer 2, and network layer 3 to handle the routing of calls. End-to-end routing is managed using a signaling connection control part or "SCCP" operating at the transport Layer 4. The protocol also includes a number of application Layer 7 functions involved in billing, roaming, and call authorization. The SS7 protocol, albeit unavoidably necessary, is extremely vulnerable to attack and represents a severe risk to securing conventional telephony.

In April 2016 (https://en.wikipedia.org/wiki/Signalling System No. 7) a U.S. Congress oversight committee reported "the applications for this vulnerability are seemingly limitless, from criminals monitoring individual targets to foreign entities conducting economic espionage on American companies to nation states monitoring US government officials . . . . The vulnerability has serious ramifications not only for individual privacy, but also for American innovation, competitiveness and national security. Many innovations in digital security—such as multi-factor authentication using text messages—may be rendered useless."

SS7 cyber-attacks essentially come under the category of packet sniffing, intercepting both content and metadata by using the specific formatting of SS7 information as a guide. The SS7 protocol essentially provides an information template by which packet information can be interpreted. As shown in FIG. 109, the problem starts with the SIM card or "subscriber identity module", containing various types of personal information about a subscriber and their account. As shown, carrier SIM card 1880, generally issued by a network provider, is used to identify a phone 32 to a cellular network illustrated by antennas 25A, 25B, and 25C with corresponding radio links 28A, 28B, and 28C. Each SIM card includes a unique identifier, the ICCID or "integrated circuit card ID" an 18- or 19-digit number used to internationally identify the SIM card. The international mobile subscriber identity or IMSI identifies the individual operator network, i.e. the home network that the SIM card works on. The local network provider uses the IMSI number to communicate with the SIM card to establish calls.

The SIM card also includes a "mobile country code" or MCC a three-digit number to identify the country where the SIM card originated. When placing international cellular phone calls from a mobile phone, the MCC is required as part of the dialing sequence. Examples of MCCs include 310-316 for the United States, 234-235 for the United Kingdom, 460 for China, 208 for France, 250 for Russia, 262 for Germany, 302 for Canada, and 724 for Brazil. The MCC is used in conjunction with a "mobile network code" or MNC to identify the network provider that issued the SIM card. A complete list of codes is listed online at https://en.wikipedia.org/wiki/Mobile_country_code. The SIM card also includes a 15-digit "mobile station international subscriber directory number" or MSISDN to uniquely define the subscriber and the type of network the SIM operates on. The SIM card also holds a user phone number and a SMS text directory including a record of incoming and outgoing calls and texts sent along with time and date information. In recent years, carriers have begun using specialized SIM cards with so-called secure elements to store credit card credentials in order to facilitate mobile payments.

Because the MCC, MNC and MSISDN codes are transmitted as part of the connection process, the home country and carrier of any SIM card and the subscriber's associated phone number can easily be identified by SS7 intrusions and packet sniffing. The transmitted data 1881 can easily be used to trace the identity of the caller through phone directories, online information, or social media, i.e. through profiling. Once identified and correlated, the phone number and SIM can be used to monitor the activities of the subscriber no matter where they may travel globally. Encryption does not obscure the underlying call information or metadata. Even with end-to-end encryption, data packets can easily be identified as being from the same conversation, captured and stored for subsequent deciphering attempts.

Aside from metadata and content, a caller's location is also compromised by the SS7 vulnerability. In any cellular network, the phone sends out messages to the local cell towers identifying it is available in the particular cell. These registration packets are sent at regular intervals. Monitoring these packets allows the location of a phone with a particular SIM card to be located even if the phone is not in a call and even if GPS is turned off. In such a manner, the location and travel of a subscriber can be tracked without their knowledge.

Despite SS7 intrinsic vulnerabilities, HyperSecure Last Mile communication made in accordance with the secure dynamic communication network and protocol repels SS7 attacks by obscuring meaningful call data in the Last Link. In particular, HyperSecure Last Mile communication offers significant security advantages over conventional telephony or OTT Internet communications including the following:

- HyperSecure Last Mile communication does not reveal the phone number or IP address of the party being called or messaged, even if that party is not a SDNP client.
- HyperSecure Last Mile communication does not identify if sequential data packets are part of the same call or represent unrelated data packets with differing destinations.
- By hiding the call specificity of data packets, HyperSecure Last Mile communication obscures metadata regarding call times.
- HyperSecure Last Mile communication dynamically encodes payloads, preventing unauthorized access to packet contents and protecting the privacy of voice, video, and text communication as well as pictures, files and other content.

So as described, communication using the disclosed secure dynamic communication network and protocol and HyperSecure Last Mile communication is not affected by SS7 vulnerability. Since SDNP communication occurs using its own protocol and is carried by encoded payloads, no call data or content can be extracted from an SDNP data packet even for packets carried over an open unencrypted channel such as 2G, 3G, and 4G/LTE telephony. Packet sniffing is, therefore, ineffective in launching cyber-attacks against SDNP coding and fragmented data transport.

SDNP Camouflaging—

Given the foregoing, the only impact SS7 vulnerability has on SDNP communication is in revealing a caller's location. Because the phone number in a carrier's SIM is linked to each user's identity, whenever the cell phone is turned on it necessarily communicates with the nearest cell phone towers even when no phone call is occurring. This cell tower information can then be used to triangulate a user's location and trace a subscriber's travels even with GPS turned off. Since such unauthorized tracking relies on SS7, devices using a conventional carrier's SIM cards are vulnerable to location tracking, even those operating as SDNP clients.

As shown in simplified network schematic FIG. 110, an enhancement to Last Mile HyperSecure communication referred to herein as "SDNP camouflaging" thwarts subscriber tracking altogether. To implement this feature, the normal carrier SIM card 1880 is replaced with a SDNP SIM card 1882. The SDNP SIM card is registered to the SDNP network operator, not to the subscriber, so that no personal subscriber information is contained with SDNP SIM card 1882. The SDNP SIM card 1882 is similar to a prepaid SIM card in that it has network access but lacks any personal information. Instead personal information of the account holder is all safely contained within the SDNP network name servers and not accessible to hackers or susceptible to cyber-attacks.

In operation, SDNP camouflaging hides the true identity of the owner by employing a SIM card 1882, known only to the SDNP network operator. As such, the phone number contained within the SIM card is used to establish a PHY Layer 1 and data link Layer 2 connection 28B between cell phone 32 and cell tower 25B but not to provide routing. Instead the data packet source and destination addresses for Last Mile routing are managed by SDNP app 1335A and SDNP gateway 1601A in accordance with instructions from SDNP signaling server 1603A.

Routed through SDNP gateway 1601A, calls from the SDNP app appear with a different number than the SIM card number. This translation from the physical SIM card number to the SDNP phone number is performed by SDNP name server 1604A, which during call routing translates the SDNP phone number into the SIM phone number in accordance with translation table 1885, thereby camouflaging the physical SIM card number to any users. Using SDNP camouflaging, the true identity of the phone's owner is completely hidden. To place a call to the SDNP client, outside callers place their call to the SDNP # even if they are not SDNP clients themselves. The SDNP network automatically routes the call to the SDNP client without ever revealing the SIM card phone number. Similarly a SDNP client places a call out to non-SDNP callee, the call recipient sees an incoming call from the SDNP #, not from the SIM card number. In this manner, the SDNP performs a function in telephony similar to that of a NAT gateway in Internet communication except that the SDNP system is a real time network and the Internet is not.

Because the true user identity of phone 32 is never revealed by call 28B, triangulating the location of the phone is not useful because its user and all communication remain anonymous. As such, tracking the location of unidentified cell phones is not beneficial to hackers, and circumvents SS7 vulnerabilities. In the event that an SDNP client is traveling internationally, the traveler can purchase a local prepaid SIM card and link it to their SDNP number. The SDNP subscriber will still receive calls placed to their SDNP phone number, but the Last Link will occur using the local SIM card thereby avoiding roaming charges. In this manner a single SDNP phone number functions as a global number without long distance expenses.

SDNP Subnets—

Using its unique SoftSwitch software-based communication nodes, the SDNP communication cloud can be deployed remotely across any network of interconnected computers, private or publically hosted. Examples of server networks include privately owned publically leased networks such as those hosted by Microsoft, Google, and Amazon. FIG. 111 illustrates two SDNP clouds deployed across two separate server networks. As shown, the SDNP cloud comprising servers 1901A, 1901B, 1901C, and 1901D hosts SDNP communication nodes $M_{0,0}$, $M_{0,4}$, $M_{0,7}$, and $M_{0,8}$, respectively. A second SDNP cloud comprising servers 1902A, 1902B, and 1902C hosts SDNP nodes $M_{10,0}$, $M_{10,1}$, and $M_{10,2}$, respectively. Because they utilize separate security credentials, zone Z0 and zone Z10 respectively, the two SDNP clouds are completely distinct and unable to share information directly. A single SDNP client shown as cell phone 32 running SDNP app 1335 may however with proper authorization access both clouds even though they are hosted by different computer server lease providers. As shown by example, SDNP client $C_{1,1}$ is able to access SDNP gateway node $M_{0,7}$ in the zone Z0 cloud using HyperSecure Last Mile communication through router 1910 and to access SDNP gateway node $M_{10,0}$ in the zone Z10 cloud using HyperSecure Last Mile communication through the same router 1910 without risk of comingling the conversations or data packets.

Access to the two independent clouds is made through a common communicator application UI/UX 1920. Access to each cloud is compartmentalized in separate dialog sandboxes 1921A and 1921B. Although information may be downloaded from personal account sandbox 1921A into the phone, exporting data from business account sandbox 1921B depends on the business and the company's security administration.

Connecting a device to the SDNP clouds requires installation of a SDNP app, either as software or firmware, into the device. Installation involves (i) downloading the application (ii) confirming the device identity with a SDNP network generated authorization code (iii) establishing personal identification credentials, and (iv) receiving approval to join a specific SDNP cloud. Once activated, the SDNP application creates HyperSecure Last Mile connection to the independent SDNP clouds. In many cases identity validation and user authentication for the business account are more elaborate than that needed for personal account access, and may entail multi-factor authentication methods.

Because of SDNP communication is software-based, with distinct and separate security credentials for each communication cloud, there is no interaction between any installed SDNP communication networks even when hosted by the same servers. With zone specific security credentials uniquely defining each customized SDNP cloud, no two SDNP clouds are alike and are therefore unable to share data directly. Beneficially, multiple SDNP clouds can co-exist within the same server or server network with no risk of data leakage. Access to a business network is controlled, as defined in accordance with the cloud owner's requirement. As such, comingling of the two accounts and communication clouds is prohibited when sharing common host servers, operating with the same security as if two different phones were required to connect to the two separate networks. The autonomy of zone specific SDNP clouds, or "subnets" is further demonstrated in FIG. 112 where servers 1901A, 1901B, 1901C, and 1901D host two clouds simultaneously—one cloud comprising zone-Z0 SDNP communication nodes $M_{0,0}$, $M_{0,4}$, $M_{0,7}$, and $M_{0,8}$, respectively, and a second comprising zone-Z7 SDNP communication nodes $M_{7,0}$, $M_{7,4}$, $M_{7,7}$, and $M_{7,8}$. Despite operating within the same servers, HyperSecure communication using the SDNP established protocols prevents any direct data exchange. Access is therefore managed by Last Mile communication, not through direct inter-cloud data exchange.

SDNP communication is not limited to privately leased publically available servers but may also be customized for different types of corporations or government agencies. In fact, private corporations often prefer to host their own networks, especially in business critical applications. Examples of private networks include FedEx, Walmart, IBM, etc. For confidentiality's sake, networks used by research institutes, universities, and medical centers are also frequently self-hosted. Private server networks are also employed to host global business cloud applications such as SalesForce.com, Box.com, Dropbox, eTrade, SAP, etc.; ecommerce platforms and comparison-shopping networks like eBay, Amazon.com, Priceline.com, e-Insurance; media streaming services like YouTube, Amazon Prime, Netflix, Hulu, Comcast Xfinity; and social media such as Facebook, Twitter, and Snapchat.

In larger corporations, the IT department may choose to operate separate networks for the parent entity and its subsidiaries. In many privately hosted businesses, however, infrastructure costs are considered an important factor in network design. Rather than supporting two completely different hardware based systems, the SDNP system offers a company the ability to deploy its networks using a combination of separate and shared server resources. As illustrated in FIG. 113, two legal entities, e.g. a parent corporation and its subsidiary, co-host a server network comprising both separate and shared servers. In particular, servers 1903, 1904B, 1904C, and 1904D host zone Z7 communication nodes $M_{7,0}$, $M_{7,4}$, $M_{7,7}$, and $M_{7,8}$, respectively for the parent corporate entity while servers 1901A, 1901B, 1901C, and 1903 host corresponding zone Z0 communication nodes $M_{0,0}$, $M_{0,4}$, $M_{0,7}$, and $M_{0,8}$ for the company's local subsidiary. As illustrated, server 1903, by example, hosts two SDNP communication nodes, namely node $M_{7,0}$, for the parent entity and node $M_{0,8}$ for the subsidiary. Because of their distinct security credentials, no data is shared directly between parent and subsidiary SDNP clouds even though server 1903 and others (not shown) are shared by both entities. While employees are generally limited to accessing only the cloud of their employer, in the case of corporate officers, access to both clouds may be required. Properly authorized users like that shown by SDNP communicator app UI/UX 1920 include separate dialog sandboxes 1921C and 1921D for the various legal entities. In this way one cell phone or tablet can access multiple SDNP clouds of different legal entities with no risk of comingling data, as if the user were carrying multiple phones.

The multi-profile feature of the SDNP app using Last Mile HyperSecure security credentials to enable or prohibit access to multiple SDNP clouds supports a limitless number of account profiles from a single SDNP app. In FIG. 114 for example, SDNP client $C_{1,1}$ is able to place global calls without long distance fees over the zone Z99 global SDNP telco comprising servers 1909A through 1909E hosting SDNP nodes $M_{99,1}$ through $M_{99,5}$ respectively but also to gain access to other clouds, e.g. zone Z9 corporate cloud comprising servers 1905A, 1905B, and 1905C hosting SDNP nodes $M_{9,0}$, $M_{9,4}$, and $M_{9,8}$ and also to call to subscribers of zone Z0 cloud through servers 1901A, 1901B, and 1901C hosting SDNP nodes $M_{0,0}$, $M_{0,4}$, and $M_{0,8}$ respectively. Access privileges to any given cloud are enforced through Last Mile communication to the SDNP gateway and managed by the system's SDNP signaling server and SDNP name server used to administer authorized users.

SDNP communication is equally applicable in high security and restricted access networks needed for government and security. For example, in the United States security restricted communication is needed by a variety of departments including local and state law enforcement, FBI, US National Guard, U.S. National Security Agency, U.S. armed forces (separately and jointly), the U.S. state department, along with congressional and legislative server networks. Other countries similarly host separate networks for various government agencies.

To support access to a specific cloud on a "need-to-know" basis, nested subnet architectures can be implemented using SDNP communication methods and technology. For example, in FIG. 115 a nested SDNP cloud structure includes a secure cloud comprising leased computer servers 1907A through 1907D hosting SDNP communication nodes $M_{0,0}$, $M_{0,4}$, $M_{0,5}$, and $M_{0,9}$, respectively. Communication in this outer network "shell" involves zone Z0 security credentials and is displayed in "secret" level dialog sandbox 1912E as displayed in SDNP communicator 1920. The nested cloud also includes an enhanced security inner core with zone Z8 security credentials comprising government-hosted servers 1906A, 1906B and 1906C and corresponding SDNP server nodes $M_{8,0}$, $M_{8,2}$, and $M_{8,4}$. For client $C_{1,1}$ to gain access to the zone Z8 core they must have "top secret" security clearance, and communicate through hardened communication sandbox 1921F. One exemplary government application of this technology is in the U.S. State Department where top-secret communication in zone Z8 is restricted to access by ambassadors and the Secretary of State, while other U.S. embassy staff across the world are limited to HyperSecure "secret" communication using zone Z0 security credentials.

We claim:

1. A method of transmitting data packets from a client device to a cloud, the data packets being comprised in a communication, the cloud comprising a plurality of media nodes and a plurality of gateway nodes, wherein:

the client device transmits a call request to a signaling server, the call request containing contact information regarding a party to be called;

the signaling server develops routes for a communication directed to the party to be called, a first route comprising a first gateway node and a second route comprising a second gateway node, neither the first gateway node, the second gateway node; nor any other media node having information describing either the first route or the second route in total;

the signaling server transmits routing instruction packets to the client device, the first gateway node and the second gateway node, respectively; and in response to a routing instruction packet, the client device transmits a first data packet in the communication from the client device to the first gateway node; and a second data packet in the communication from the client device to the second gateway node.

2. The method of claim 1 comprising transmitting the first data packet from the client device to the first gateway node over a first physical medium and transmitting the second data packet and from the client device to the second gateway node over a second physical medium.

3. The method of claim 2 wherein the first physical medium comprises a cellular telephone link and the second physical medium comprises a WiFi channel.

4. The method of claim 2 comprising providing the first data packet with a first IP source address and providing the second data packet with a second IP source address.

5. The method of claim 1 comprising providing the first data packet with a first IP source address and providing the second data packet with a second IP source address.

6. A method of transmitting data packets from a client device to a cloud, the data packets being comprised in a communication, the cloud comprising a plurality of media nodes and a plurality of gateway nodes, the method comprising:

transmitting a first data packet from the client device to a first gateway node through at least one router;

providing the first data packet with a first IP source address and a first MAC source address;

transmitting a second data packet from the client device to a second gateway node through at least one router; and providing the second data packet with a second IP source address and a second MAC source address.

7. The method of claim 6 comprising transmitting the first data packet from the client device to the first gateway node over a first physical medium and-transmitting a second data packet and from the client device to the second gateway node over a second physical medium.

8. The method of claim 6 wherein the first physical medium comprises a cellular telephone link and the second physical medium comprises a WiFi channel.

9. A method of transmitting data packets from a client device to a cloud through at least one router, the data packets being comprised in a communication, the cloud comprising a plurality of media nodes and a plurality of gateway nodes, the method comprising:

providing a first data packet with a first IP source address and a first MAC source address; and providing a second data packet with a second IP source address and a second MAC source address.

10. The method of claim 1 wherein before the signaling server transmits routing instruction packets to the client device, the first gateway node and the second gateway node, respectively, the signaling server contacts a name server with the contact information regarding a party to be called.

11. The method of claim 10 wherein the contact information regarding the party to be called comprises a confidential identification of the party to be called and wherein the name server converts the confidential identification into an SDNP address of the party to be called, the signaling server using the SDNP address of the party to be called in developing the routes for the communication from the client device to the party to be called.

12. The method of claim 10 wherein the contact information regarding the party to be called comprises a phone number and wherein the name server converts the phone number into an address of a gateway node closest to the location of the party to be called, the signaling server using the address of a gateway node closest to the location of the of the party to be called in developing the routes for the communication from the client device to the party to be called.

13. The method of claim 10 where the client device passes information to the name server whenever the device connects to the network.

14. The method of claim 1 wherein the routing instruction packet that the signaling server sends to the client device contains a first routing instruction to send the first data packet to the first gateway node and a second routing instruction to send the second data packet to the second gateway node.

15. The method of claim 14 wherein each of the first gateway node and the second gateway node has a first address for communication with the client device and a second address for communication within the cloud.

16. The method of claim 5 wherein the client device transmits the first and second data packets to the first and second gateway nodes, respectively, through a router, the method further comprising providing the first data packet with a first MAC source address and providing the second data packet with a second MAC source address.

17. The method of claim 1 comprising providing a plurality of signaling servers, wherein the signaling servers divide the task of routing the packets from the client device to the party to be called, and wherein no single signaling server has information describing the entire route of a packet.

18. The method of claim 1 further comprising concealing the content of at least one of the first data packet and the second data packet using a combination of concealment methods, the concealment methods comprising encryption, scrambling, junk data insertions, splitting and/or mixing and being based on a state.

19. The method of claim 18 wherein the state comprises a time, a node number, a network identity, or a GPS location.

20. The method of claim 2 wherein the first physical medium comprises a cellular telephone link modulated using a first carrier frequency and the second physical medium comprises a cellular telephone link modulated using a second carrier frequency.

21. The method of claim 2 wherein the first physical medium comprises a WiFi channel modulated using a first carrier frequency and the second physical medium comprises a WiFi channel modulated using a second carrier frequency.

22. The method of claim 7 wherein the first physical medium comprises a cellular telephone link modulated using a first carrier frequency and the second physical medium comprises a cellular telephone link modulated using a second carrier frequency.

23. The method of claim 7 wherein the first physical medium comprises a WiFi channel modulated using a first carrier frequency and the second physical medium comprises a WiFi channel modulated using a second carrier frequency.

24. The method of claim 6 further comprising concealing the content of at least one of the first data packet and the second data packet using a combination of concealment methods, the concealment methods comprising encryption, scrambling, junk data insertions, splitting and/or mixing and being based on a state.

25. The method of claim 24 wherein the state comprises a time, a node number, a network identity, or a GPS location.

* * * * *

UNITED STATES PATENT AND TRADEMARK OFFICE

CERTIFICATE OF CORRECTION

PATENT NO. : 11,627,639 B2
APPLICATION NO. : 15/943418
DATED : April 11, 2023
INVENTOR(S) : Ievgen Verzun, Oleksandr Holub and Richard K. Williams It is certified that error appears in the above-identified patent and that said Letters Patent is hereby corrected as shown below:

In the Claims

Column 182, Lines 23-25 Claim 8 is corrected to read as follows:
8. The method of claim 7 wherein the first physical medium comprises a cellular telephone link and the second physical medium comprises a WiFi channel.

Signed and Sealed this
First Day of August, 2023

Katherine Kelly Vidal

Katherine Kelly Vidal
*Director of the United States Patent and Trademark Office*